US008364608B2

(12) United States Patent
Hammer et al.

(10) Patent No.: US 8,364,608 B2
(45) Date of Patent: Jan. 29, 2013

(54) MANAGING CONSISTENT INTERFACES FOR EXPORT DECLARATION AND EXPORT DECLARATION REQUEST BUSINESS OBJECTS ACROSS HETEROGENEOUS SYSTEMS

(75) Inventors: Thomas Hammer, Walldorf (DE); Florian Hoffmann, Ladenburg (DE); Andre Adam, Walldorf (DE); Waldemar Kramer, Hockenheim (DE); Thilo Kraehmer, Heidelberg (DE); Michael Seubert, Sinsheim (DE); Flavio Baita, Wiesloch (DE); Matthaeus Martynus, Mannheim-Friedrichsfeld (DE)

(73) Assignee: SAP AG, Walldorf ( * ) Notice: Subject to any disclaimer, the term of this patent is extended or adjusted under 35 U.S.C. 154(b) by 254 days.

(21) Appl. No.: 12/816,293

(22) Filed: Jun. 15, 2010

(65) Prior Publication Data

US 2011/0307405 A1 Dec. 15, 2011

(51) Int. Cl.
*G06Q 10/00* (2012.01)
*G06Q 30/00* (2012.01)

(52) U.S. Cl. .......... 705/342; 705/346; 705/331; 705/1.1

(58) Field of Classification Search .................. 705/342, 705/346, 330, 331, 1.1, 30, 35, 64
See application file for complete search history.

(56) References Cited

U.S. PATENT DOCUMENTS 3,223,321 A 12/1965 Baumgartner
5,126,936 A 6/1992 Champion et al.
5,210,686 A 5/1993 Jernigan
5,247,575 A 9/1993 Sprague et al.
5,255,181 A 10/1993 Chapman et al.
5,321,605 A 6/1994 Chapman et al.
5,463,555 A 10/1995 Ward et al.
5,787,237 A 7/1998 Reilly
5,812,987 A 9/1998 Luskin et al.
5,966,695 A 10/1999 Melchione et al.
5,970,465 A 10/1999 Dietrich et al.
5,970,475 A 10/1999 Barnes et al.
5,983,284 A 11/1999 Argade
6,047,264 A 4/2000 Fisher et al.
6,073,137 A 6/2000 Brown et al.
6,092,196 A 7/2000 Reiche
6,104,393 A 8/2000 Santos-Gomez
6,115,690 A 9/2000 Wong
6,125,391 A 9/2000 Meltzer et al.
6,138,118 A 10/2000 Koppstein et al.
6,154,732 A 11/2000 Tarbox
6,222,533 B1 4/2001 Notani et al.
6,226,675 B1 5/2001 Meltzer et al.

(Continued)

FOREIGN PATENT DOCUMENTS

CN 1501296 6/2004

(Continued)

OTHER PUBLICATIONS

SAP Structured Entity Relationship Model (SAP-SERM) for R/3 System Release 4.0 Introduction and Index; Dec. 1998; 26 pages.

(Continued)

*Primary Examiner* — Igor Borissov
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to an export declaration and/or an export declaration request business object.

12 Claims, 801 Drawing Sheets

U.S. PATENT DOCUMENTS

| | | | |
|---|---|---|---|
| 6,229,551 | B1 | 5/2001 | Huang |
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,542,912 | B2 | 4/2003 | Meltzer et al. |
| 6,591,260 | B1 | 7/2003 | Schwarzhoff et al. |
| 6,725,122 | B2 | 4/2004 | Mori et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,536,697 | B2 | 5/2009 | Wiseman et al. |
| 7,574,383 | B1 | 8/2009 | Parasnis et al. |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,788,319 | B2 | 8/2010 | Schmidt et al. |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 | 2/2011 | Spence et al. |
| 7,941,236 | B2 | 5/2011 | Spearman |
| 2001/0042032 | A1 | 11/2001 | Crawshaw et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0069648 | A1 | 4/2003 | Douglas et al. |
| 2003/0086594 | A1 | 5/2003 | Gross |
| 2003/0120502 | A1 | 6/2003 | Robb et al. |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0195815 | A1 | 10/2003 | Li et al. |
| 2003/0204452 | A1 | 10/2003 | Wheeler |
| 2003/0208389 | A1 | 11/2003 | Kurihara et al. |
| 2003/0212614 | A1 | 11/2003 | Chu et al. |
| 2003/0216978 | A1 | 11/2003 | Sweeney et al. |
| 2003/0220875 | A1 | 11/2003 | Lam et al. |
| 2003/0229522 | A1 | 12/2003 | Thompson et al. |
| 2003/0229550 | A1 | 12/2003 | DiPrima et al. |
| 2003/0233295 | A1 | 12/2003 | Tozawa et al. |
| 2003/0236748 | A1 | 12/2003 | Gressel et al. |
| 2004/0015366 | A1 | 1/2004 | Wiseman et al. |
| 2004/0024662 | A1 | 2/2004 | Gray et al. |
| 2004/0034577 | A1 | 2/2004 | Van Hoose et al. |
| 2004/0039665 | A1 | 2/2004 | Ouchi |
| 2004/0073510 | A1 | 4/2004 | Logan |
| 2004/0083201 | A1 | 4/2004 | Sholl et al. |
| 2004/0083233 | A1 | 4/2004 | Willoughby |
| 2004/0133445 | A1 | 7/2004 | Rajan et al. |
| 2004/0138942 | A1 | 7/2004 | Pearson et al. |
| 2004/0148227 | A1 | 7/2004 | Tabuchi et al. |
| 2004/0172360 | A1 | 9/2004 | Mabrey et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038744 | A1 | 2/2005 | Viijoen |
| 2005/0049903 | A1 | 3/2005 | Raja |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |
| 2005/0197878 | A1 | 9/2005 | Fotteler et al. |
| 2005/0197881 | A1 | 9/2005 | Fotteler et al. |
| 2005/0197882 | A1 | 9/2005 | Fotteler et al. |
| 2005/0197886 | A1 | 9/2005 | Veit |
| 2005/0197887 | A1 | 9/2005 | Zuerl et al. |
| 2005/0197896 | A1 | 9/2005 | Veit et al. |
| 2005/0197897 | A1 | 9/2005 | Veit et al. |
| 2005/0197898 | A1 | 9/2005 | Veit et al. |
| 2005/0197899 | A1 | 9/2005 | Veit et al. |
| 2005/0197900 | A1 | 9/2005 | Veit |
| 2005/0197901 | A1 | 9/2005 | Veit et al. |
| 2005/0197902 | A1 | 9/2005 | Veit |
| 2005/0197928 | A1 | 9/2005 | Fotteler et al. |
| 2005/0197941 | A1 | 9/2005 | Veit |
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0216421 | A1 | 9/2005 | Barry et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0228821 | A1 | 10/2005 | Gold |
| 2005/0234754 | A1 | 10/2005 | Veit |
| 2005/0246240 | A1 | 11/2005 | Padilla |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026552 | A1 | 2/2006 | Mazzitelli et al. |
| 2006/0026586 | A1 | 2/2006 | Remmel et al. |
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0059005 | A1 | 3/2006 | Horn et al. |

| | | | |
|---|---|---|---|
| 2006/0059059 | A1 | 3/2006 | Horn et al. |
| 2006/0059060 | A1 | 3/2006 | Horn et al. |
| 2006/0069598 | A1 | 3/2006 | Schweitzer et al. |
| 2006/0069629 | A1 | 3/2006 | Schweitzer et al. |
| 2006/0069632 | A1 | 3/2006 | Kahn et al. |
| 2006/0074728 | A1 | 4/2006 | Schweitzer et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 | 4/2006 | Seubert et al. |
| 2006/0089885 | A1 | 4/2006 | Finke et al. |
| 2006/0095373 | A1 | 5/2006 | Venkatasubramanian et al. |
| 2006/0184435 | A1 | 8/2006 | Mostowfi |
| 2006/0212376 | A1 | 9/2006 | Snyder et al. |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |
| 2007/0055688 | A1 | 3/2007 | Blattner |
| 2007/0078799 | A1 | 4/2007 | Huber-Buschbeck et al. |
| 2007/0112574 | A1 | 5/2007 | Greene |
| 2007/0124227 | A1 | 5/2007 | Dembo et al. |
| 2007/0129978 | A1 | 6/2007 | Shirasu et al. |
| 2007/0132585 | A1 | 6/2007 | Llorca et al. |
| 2007/0150387 | A1 | 6/2007 | Seubert et al. |
| 2007/0150836 | A1 | 6/2007 | Deggelmann et al. |
| 2007/0156428 | A1 | 7/2007 | Brecht-Tillinger et al. |
| 2007/0156545 | A1 | 7/2007 | Lin |
| 2007/0156552 | A1 | 7/2007 | Manganiello |
| 2007/0156690 | A1 | 7/2007 | Moser et al. |
| 2007/0165622 | A1 | 7/2007 | O'Rourke et al. |
| 2007/0214065 | A1 | 9/2007 | Kahlon et al. |
| 2007/0225949 | A1 | 9/2007 | Sundararajan et al. |
| 2007/0226090 | A1 | 9/2007 | Stratton |
| 2007/0255639 | A1 | 11/2007 | Seifert |
| 2007/0265860 | A1 | 11/2007 | Herrmann et al. |
| 2007/0265862 | A1 | 11/2007 | Freund et al. |
| 2007/0294159 | A1 | 12/2007 | Cottle |
| 2008/0005012 | A1 | 1/2008 | Deneef |
| 2008/0021754 | A1 | 1/2008 | Horn et al. |
| 2008/0040243 | A1 | 2/2008 | Chang et al. |
| 2008/0046104 | A1 | 2/2008 | Van Camp et al. |
| 2008/0046421 | A1 | 2/2008 | Bhatia et al. |
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0133303 | A1 | 6/2008 | Singh et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0196108 | A1 | 8/2008 | Dent et al. |
| 2008/0215354 | A1 | 9/2008 | Halverson et al. |
| 2008/0243578 | A1 | 10/2008 | Veit |
| 2008/0288317 | A1 | 11/2008 | Kakar |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0164497 | A1 | 6/2009 | Steinmaier et al. |
| 2009/0192926 | A1 | 7/2009 | Tarapata |
| 2009/0193432 | A1 | 7/2009 | McKegney et al. |
| 2009/0222360 | A1 | 9/2009 | Schmitt et al. |
| 2009/0248431 | A1 | 10/2009 | Schoknecht et al. |
| 2009/0248547 | A1 | 10/2009 | Doenig et al. |
| 2009/0271245 | A1 | 10/2009 | Joshi et al. |
| 2009/0300578 | A1 | 12/2009 | Neil |
| 2009/0326988 | A1 | 12/2009 | Barth et al. |
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0161425 | A1 | 6/2010 | Sideman |
| 2011/0046775 | A1 | 2/2011 | Bailey et al. |

FOREIGN PATENT DOCUMENTS

| | | |
|---|---|---|
| CN | 1609866 | 4/2005 |
| CN | 1632806 | 6/2005 |
| CN | 1767537 | 5/2006 |
| CN | 101174957 | 5/2008 |

OTHER PUBLICATIONS

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; <http://www.omg.org/news/meetings/workshops/uml_presentations.htm> retrieved on Mar. 17, 2005.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3. Retrieved on Mar. 17, 2005.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of CORBA Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML"; ICSE '02; May 19-25, 2002; pp. 155-165.

Stumptner, Markus et al.; "On the Road to Behavior-Based Integration"; First Asia-Pacific Conferences on Conceptual Modelling; Dunedin, New Zealand; Jan. 2004; pp. 15-22.

Gosain, Sanjay et al.; "The Impact of Common E-Business Interfaces"; Communications of the ACM; vol. 46, No. 2; Dec. 2003; pp. 186-195.

Damodaran, Suresh; "B2B Integration over the Internet with XML—RosettaNet Successes and Challenges"; WWW2004; May 17-22, 2004; pp. 188-195.

Schulze, Wolfgang et al.; "Standardising on Workflow-Management—The OMG Workflow Management Facility"; SIGGROUP Bulletin; vol. 19, No. 1; Apr. 1998; pp. 24-30.

Sutherland, Jeff; "Business Objects in Corporate Information Systems"; ACM Computing Surveys; vol. 27, No. 2; Jun. 1995; pp. 274-276.

Arsanjani, Ali; "Developing and Integrating Enterprise Components and Services"; Communications of the ACM; vol. 45, No. 10; Oct. 2002; pp. 31-34.

Kim, Dan Jong et al.; "A Comparison of B2B E-Service Solutions"; Communications of the ACM; vol. 46, No. 12; Dec. 2003; pp. 317-324.

Hasselbring, Wilhelm; "Information System Integration"; Communications of the ACM; vol. 43, No. 6; Jun. 2000; pp. 33-38.

Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.

Hogg, K. et al.; "An Evaluation of Web Services in the Design of a B2B Application"; 27th Australasian Computer Science Conference; Dunedin, New Zealand; 2004; pp. 331-340.

Gruhn, Volker et al.; "Workflow Management Based on Process Model Repositories"; IEEE 1998; pp. 379-388.

Kim, HyoungDo; "Conceptual Modeling and Specification Generation for B2B Business Processes Based on ebXML"; SIGMOD Record; vol. 31, No. 1; Mar. 2002; pp. 37-42.

Siegel, Jon; "OMG Overview: CORBA and the OMA in Enterprise Computing"; Communications of the ACM; vol. 41, No. 10; Oct. 1998; pp. 37-43.

Yang, Jian et al.; "Interoperation Support for Electronic Business"; Communications of the ACM; vol. 43, No. 6; Jun. 2000; pp. 39-47.

Levi, Keith et al.; "A Goal-Driven Approach to Enterprise Component Identification and Specification"; Communications of the ACM; vol. 45, No. 10; Oct. 2002; pp. 45-52.

Terai, Koichi et al.; "Coordinating Web Services Based on Business Models"; 2003; pp. 473-478.

Aversano, Lerina et al.; "Introducing eServices in Business Process Models"; SEKE '02; Ischia Italy; Jul. 15-19, 2002; pp. 481-488.

Quix, Christoph et al.; "Business Data Management for Business-to-Business Electronic Commerce"; SIGMOD Record; vol. 31, No. 1; Mar. 2002; pp. 49-54.

Sutherland, Jeff; "Why I Love the OMG: Emergence of a Business Object Component Architecture"; StandardView; vol. 6, No. 1; Mar. 1998; pp. 4-13.

Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.

Lee, Jinyoul et al.; "Enterprise Integration with ERP and EAI"; Communications of the ACM; vol. 46, No. 2; Feb. 2003; pp. 54-60.

Bratthall, Lars G. et al.; "Integrating Hundreds of Products through One Architecture—The Industrial IT Architecture"; ICSE '02; Orlando, Florida; May 19-25, 2002; pp. 604-614.

Fingar, Peter; "Component-Based Frameworks for E-Commerce"; Communications of the ACM; vol. 43, No. 10; Oct. 2000; pp. 61-66.

Sprott, David; "Componentizing the Enterprise Application Packages"; Communications of the ACM; vol. 43, No. 4; Apr. 2000; pp. 63-69.

Gokhale, Aniruddha et al.; "Applying Model-Integrated Computing to Component Middleware and Enterprise Applications"; Communications of the ACM; vol. 45, No. 10; Oct. 2002; pp. 65-70.

Bussler, Christoph; "The Role of B2B Engines in B2B Integration Architectures"; Sigmod Record; vol. 31, No. 1; Mar. 2002; pp. 67-72.

Fremantle, Paul et al.; "Enterprise Services"; Communications of the ACM; vol. 45, No. 10; Oct. 2002; pp. 77-79.

Trastour, David et al.; "Semantic Web Support for the Business-to-Business E-Commerce Lifecycle"; WWW2002, Honolulu, Hawaii; May 7-11, 2002; pp. 89-98.

Jaeger, Dirk et al.; "Using UML for Software Process Modeling"; 1999; pp. 91-108.

Han, Zaw Z. et al.; "Interoperability from Electronic Commerce to Litigation Using XML Rules"; 2003; pp. 93-94.

Carlson, David A.; "Designing XML Vocabularies with UML"; OOPSLA 2000 Companion; Minneapolis, Minnesota; 2000; pp. 95-96.

Stonebraker, Michael; "Too Much Middleware"; SIGMOD Record; vol. 31, No. 1; Mar. 2002; pp. 97-106.

Maamar, Zakaria et al.; "Toward Intelligent Business Objects"; Communications of the ACM; vol. 43, No. 10; Oct. 2000; pp. 99-101.

Tenenbaum, Jay M. et al.; "Eco System: An Internet Commerce Architecture"; IEEE; May 1997; pp. 48-55.

Eyal, Anat et al.; "Integrating and Customizing Heterogeneous E-Commerce Applications"; The VLDB Journal; Aug. 2001; pp. 16-38.

He, Ning et al.; "B2B Contract Implementation Using Windows DNS"; 2001; pp. 71-79.

FSML-Financial Services Markup Language (Jul. 14, 1999) http://xml.coverpages.org/FSML-v1500a.pdf; pp. 1-159 (2 parts).

Webster's Revised Unabridged Dictionary (1913+1828); Def. "merchandise"; <http://machaut.uchicago.edu/?resource=Webster%27s&word=merchandise&use1913=on&u>. Retrieved on Sep. 1, 2009.

Statement in Accordance with the Notice from the European Patent Office dated Oct. 1, 2007 Concerning Business Methods—EPC; Official Journal of the European Patent Office; Munich; Nov. 1, 2007; pp. 592-593.

Lynn, Chris; "Sony Enters Brand Asset Management Market"; The Seybold Report; Analyzing Publishing Technologies; Aug. 4, 2004; <www.Seybold365.com>; 3 pages.

"Header", Newton's Telecom Dictionary; 12th Edition, 2004; pp. 389-390.

Newton's Telecom Dictionary; 18th Edition; 2002; pp. 347, 454.

Baker, Stacy; "Benefits of Assortment Planning"; Assortment Planning for Apparel Retailers—2005 Management Briefing; Just Style; Jun. 2005; 3 pages.

"Visual and Quantitative Assortment Planning Applications Drive Partnership and Profit"; PR Newswire; Jan. 12, 2006; 3 pages.

"DOTS Inc. Selects Compass Software's smartmerchandising for Merchandise Planning and Assortment Planning"; PR Newswire; Dec. 11, 2002; 2 pages.

SAP; "BC-Central Maintenance and Transport Objects"; Release 4.6C; Apr. 2001; 15 pages.

Annevelink et al.; "Heterogeneous Database Intergration in a Physician Workstation"; 1992; 5 pages.

Ketabchi et al.; "Object-Oriented Database Management Support for Software Maintenance and Reverse Engineering"; Department of Electrical Engineering and Computer Science, Santa Clara University; 1989; 4 pages.

Diehl et al.; "Service Architecture for an Object-Oriented Next Generation Profile Register"; date unknown; 8 pages.

International Search Report and Written Opinion of the International Searching Authority issued in International Application No. PCT/US2007/011378 on Apr. 30, 2008; 17 pages.

International Preliminary Report on Patentability under Chapter I issued in International Application No. PCT/US2007/011378 on Nov. 17, 2008; 11 pages.

International Search Report and Written Opinion of the International Searching Authority issued in International Application No. PCT/IB2006/001401 on Aug. 27, 2008; 8 pages.

International Search Report and Written Opinion of the International Searching Authority issued in International Application No. PCT/US2005/019961 on Sep. 22, 2005; 8 pages.

International Preliminary Report on Patentability under Chapter I issued in International Application No. PCT/US2005/019961 on Dec. 4, 2006; 6 pages.

International Search Report and Written Opinion of the International Searching Authority issued in International Application No. PCT/US2005/021481 on Apr. 11, 2006; 7 pages.

International Search Report and Written Opinion of the International Searching Authority issued in International Application No. PCT/US2005/021481 on May 29, 2007; 6 pages.

International Preliminary Report on Patentability under Chapter I issued in International Application No. PCT/US2005/021481 on Dec. 20, 2006; 6 pages.

International Preliminary Report on Patentability under Chapter I issued in International Application No. PCT/US2005/021481 on Jul. 15, 2008; 5 pages.

International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) EPC issued in related European Application No. 05757432.9 on Jan. 26, 2009; 4 pages.
Communication Pursuant to Article 94(3) issued in European Application No. 05757432.9 on Apr. 12, 2011; 5 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 12/060,171 on Jul. 1, 2010; 19 pages.
Office Action issued in related U.S. Appl. No. 12/060,171 on Jan. 26, 2011; 17 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.

Office Action issued in U.S. Appl. No. 11/864,811 on Mar. 18, 2011; 10 pages.
Office Action issued in U.S. Appl. No. 11/864,811 on Jul. 26, 2011; 7 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Office Action issued in related U.S. Appl. No. 11/864,871 on Apr. 21, 2010; 20 pages.
Office Action issued in related U.S. Appl. No. 11/864,871 on Oct. 1, 2010; 30 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Notice of Allowance issued in related U.S. Appl. No. 11/803,178 on May 17, 2011; 13 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
"SAP Labs and HP Team to Advance Internet-Based Supply Chain Collaboration"; Business Editors and Technology Writers; Business Wire; New York; Feb. 3, 2000; 4 pages.
Communication Pursuant to Article 94(3) issued in European Application No. 05766672.9 on Jul. 14, 2011; 4 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/323,116 on Jan. 27, 2012; 7 pages.
Notice of Allowance issued in U.S. Appl. No. 12/323,139 on Mar. 14, 2012; 10 pages.
Office Action issued in U.S. Appl. No. 12/571,140 on Sep. 26, 2011; 14 pages.
Notice of Allowance issued in U.S. Appl. No. 12/571,140 on Mar. 20, 2012; 16 pages.
Office Action issued in U.S. Appl. No. 12/571,154 on Apr. 2, 2012; 13 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,192 on Sep. 6, 2011; 18 pages.
Notice of Allowance issued in U.S. Appl. No. 12/060,192 on Mar. 2, 2012; 18 pages.
Notice of Allowance issued in related U.S. Appl. No. 12/060,178 on Sep. 2, 2011; 9 pages.
Notice of Allowance issued in U.S. Appl. No. 12/060,062 on Mar. 20, 2012; 16 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in related U.S. Appl. No. 11/864,866 on Mar. 13, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jan. 9, 2012;12 pages.
Office Action issued in related U.S. Appl. No. 11/864,863 on Dec. 22, 2011; 20 pages.
Notice of Allowance issued in U.S. Appl. No. 11/640,422 on Sep. 29, 2011; 7 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Office Action issued in U.S. Appl. No. 13/349,477 on Jun. 29, 2012; 13 pages.
Notice of Allowance issued in U.S. Appl. No. 12/323,116 on Jun. 11, 2012; 10 pages.
Notice of Allowance issued in U.S. Appl. No. 12/060,155 on Apr. 24, 2012; 15 pages.
Notice of Allowance issued in U.S. Appl. No. 12/815,618 on May 10, 2012; 7 pages.
Office Action issued in U.S. Appl. No. 12/816,083 on May 9, 2012; 20 pages.
Office Action issued in U.S. Appl. No. 12/815,639 on May 24, 2012; 7 pages.
Notice of Allowance issued in U.S. Appl. No. 11/640,422 on May 22, 2012; 7 pages.

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| ExportDeclarationProcessingCancellationRequest 430000 | | | ExportDeclarationProcessingCancellationRequest 430002 | | | | | | | | | ExportDeclarationProcessingCancellationRequestMessage 430004 |
| | MessageHeader 430006 | | | MessageHeader 430008 | | | | | | | 1 430010 | BusinessDocumentMessageHeader 430012 |
| | | | | | ID 430014 | | | | | | 0..1 430016 | BusinessDocumentMessageID 430018 |
| | | | | | UUID 430020 | | | | | | 0..1 430022 | UUID 430024 |

FIG. 43-2

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | ReferenceID 430026 | | | | | | 0..1 430028 | BusinessDocumentMessageID 430030 |
| | | | | | ReferenceUUID 430032 | | | | | | 0..1 430034 | UUID 430036 |
| | | | | | CreationDateTime 430038 | | | | | | 1 430040 | GLOBAL_DateTime 430042 |
| | | | | | TestDataIndicator 430044 | | | | | | 0..1 430046 | Indicator 430048 |
| | | | | | ReconciliationIndicator 430050 | | | | | | 0..1 430052 | Indicator 430054 |

FIG. 43-3

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | SenderBusinessSystemID 430056 | | | | | | 0..1 430058 | BusinessSystemID 430060 |
| | | | RecipientBusinessSystemID 430062 | | | | | | 0..1 430064 | BusinessSystemID 430066 |
| Party 430068 | | | SenderParty 430070 | | | | | | 0..1 430072 | BusinessDocumentMessageHeaderParty 430074 |
| | | | | InternalID 430076 | | | | | 0..1 430078 | PartyInternalID 430080 |
| | | | | StandardID 430082 | | | | | 0..N 430084 | PartyStandardID 430086 |

FIG. 43-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ContactPerson 430088 | | | | | 0..1 430090 | BusinessDocumentMessageHeaderPartyContactPerson 430092 |
| | | | | | InternalID 430094 | | | | 0..1 430096 | ContactPersonInternalID 430098 |
| | | | | | OrganisationFormattedName 430100 | | | | 0..N 430102 | LANGUAGEINDEPENDENT_MEDIUM_Name 430104 |
| | | | | | PersonFormattedName 430106 | | | | 0..N 430108 | LANGUAGEINDEPENDENT_LONG_Name 430110 |
| | | | | | PhoneNumber 430114 | | | | 0..N 430116 | PhoneNumber 430118 |

FIG. 43-5

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FaxNumber 430122 | | | | 0..N 430124 | PhoneNumber 430126 |
| | | | | | EmailURI 430128 | | | | 0..N 430130 | EmailURI 430132 |
| | | | RecipientParty 430136 | | | | | | 0..N 430138 | BusinessDocumentMessageHeaderParty 430140 |
| | | | | InternalID 430142 | | | | | 0..1 430144 | PartyInternalID 430146 |
| | | | | StandardID 430148 | | | | | 0..N 430150 | PartyStandardID 430152 |
| | | | | ContactPerson 430154 | | | | | 0..1 430156 | BusinessDocumentMessageHeaderPartyContactPerson 430158 |

FIG. 43-6

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | InternalID 430160 | | | | 0..1 430162 | ContactPersonInternalID 430164 |
| | | | | | OrganisationFormattedName 430166 | | | | 0..N 430168 | LANGUAGEINDEPENDENT_MEDIUM_Name 430170 |
| | | | | | PersonFormattedName 430172 | | | | 0..N 430174 | LANGUAGEINDEPENDENT_LONG_Name 430176 |
| | | | | | PhoneNumber 430180 | | | | 0..N 430182 | PhoneNumber 430184 |
| | | | | | FaxNumber 430188 | | | | 0..N 430190 | PhoneNumber 430192 |

FIG. 43-7

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | EmailURI 430194 | | | | 0..N 430196 | EmailURI 430198 |
| | | Business Scope 430200 | | | | Business Scope 430202 | | | | | | 0..N 430204 | BusinessScope 430206 |
| | Export Declaration 430208 | | | | ExportDeclaration 430210 | | | | | | | 1 430212 | ExportDeclarationProcessingCancellationRequest 430214 |
| | | | | | | ExportMessageSubTypeCode 430216 | | | | | | 0..1 430218 | ExportMessageSubTypeCode 430220 |
| | | | | | | ExportMessageID 430222 | | | | | | 0..1 430224 | CustomsProcessMessageID 430226 |

FIG. 43-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | ExportMessageReferenceID 430228 | | | | | | 0..N 430230 | CustomsProcessMessageID 430232 |
| | | | CustomsAuthorityCountryCode 430234 | | | | | | 0..1 430236 | CountryCode 430238 |
| | | | MajorVersionCustomsAuthorityID 430240 | | | | | | 0..1 430242 | VersionPartyID 430244 |
| | | | MinorVersionCustomsAuthorityID 430246 | | | | | | 0..1 430248 | VersionPartyID 430250 |

FIG. 43-9

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | MainTestCaseID 430252 | | | | | | 0..1 430254 | TestCaseID 430256 |
| | | | SubTestCaseID 430258 | | | | | | 0..1 430260 | TestCaseID 430262 |
| | | | CustomsMessageExchangeServerFileID 430264 | | | | | | 0..1 430266 | CustomsMessageExchangeServerFileID 430268 |
| | | | CustomsProcessCustomsAuthorityID 430270 | | | | | | 0..1 430272 | CustomsProcessID 430274 |

FIG. 43-10

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | ExportDeclarationCancellationTypeCode 430276 | | | | | | 0..1 430278 | ExportDeclarationCancellationTypeCode 430280 |
| | | | | | | CustomsAuthenticationID 430282 | | | | | | 0..1 430284 | CustomsAuthenticationID 430286 |
| | | TimePoint 430288 | | | | TimePoint 430290 | | | | | | 0..N 430292 | ExportDeclarationProcessingCancellationRequestTimePoint 430294 |
| | | | | | | | TimePointRoleCode 430296 | | | | | 0..1 430298 | TimePointRoleCode 430300 |

FIG. 43-11

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | DateTime 430302 | | | | | 0..1 430304 | LOCAL_DateTime 430306 |
| | | | | | | | Date 430308 | | | | | 0..1 430310 | Date 430312 |
| | | BasicText 430314 | | | | BasicText 430316 | | | | | | 0..N 430318 | TextCollectionBasicText 430320 |
| | | | | | | | TypeCode 430322 | | | | | 0..1 430324 | TextCollectionTextTypeCode 430326 |
| | | | | | | | ContentText 430328 | | | | | 1 430330 | Text 430332 |

FIG. 43-12

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | CustomsOffice 430334 | | | | | Customs Office 430336 | | | | | | 0..N 430338 | ExportDeclarationProcessingCancellationRequestCustomsOffice 430340 |
| | | | | | | | | RoleCategoryCode 430342 | | | | | 0..1 430344 | PartyRoleCategoryCode 430346 |
| | | | Identification 430348 | | | | | Identification 430350 | | | | | 0..N 430352 | ExportDeclarationProcessingCancellationRequestCustomsOfficeIdentification 430354 |
| | | | | | | | | | PartyIdentifierTypeCode 430356 | | | | 0..1 430358 | PartyIdentifierTypeCode 430360 |

FIG. 43-13

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | PartyID 430362 | | | | 0..1 430364 | NOALPHANUMERICCONVERSION_PartyID 430366 |
| Party 430368 | | | Party 430370 | | | | | | 0..N 430372 | ExportDeclarationProcessingCancellationRequestParty 430374 |
| | | | | RoleCategoryCode 430376 | | | | | 0..1 430378 | PartyRoleCategoryCode 430380 |
| | | | | Address 430382 | | | | | 0..1 430384 | Address 430386 |
| | | | | | OrganisationFormOfAddress 430388 | | | | 0..1 430390 | FormOfAddress 430392 |

FIG. 43-14

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | OrganisationFormattedName 430394 | | | | 0..N 430396 | LANGUAGEINDEPENDENT_MEDIUM_Name 430398 |
| | | | | | | | | | | PersonName 430400 | | | | 0..1 430402 | PersonName 430404 |
| | | | | | | | | | | FunctionalTitleName 430406 | | | | 0..1 430408 | LANGUAGEINDEPENDENT_MEDIUM_Name 430410 |
| | | | | | | | | | | DepartmentName 430412 | | | | 0..1 430414 | LANGUAGEINDEPENDENT_MEDIUM_Name 430416 |
| | | | | Address 430418 | | | | | | Office 430420 | | | | 0..1 430422 | Office 430424 |

FIG. 43-15

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | Physical Address 430428 | | | | 0..1 430430 | PhysicalAddress 430432 |
| | | | | | | | | | | | CountryCode 430434 | | | 0..1 430436 | CountryCode 430438 |
| | | | | | | | | | | | CountryName 430440 | | | 0..1 430442 | MEDIUM_Name 430444 |
| | | | | | | | | | | | RegionCode 430446 | | | 0..1 430448 | RegionCode 430450 |
| | | | | | | | | | | | RegionName 430452 | | | 0..1 430454 | LANGUAGEINDEPENDENT_MEDIUM_Name 430456 |

FIG. 43-16

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | StreetPostalCode 430458 | | | 0..1 430460 | PostalCode 430462 |
| | | | | | | | | | | | POBoxPostalCode 430464 | | | 0..1 430466 | PostalCode 430468 |
| | | | | | | | | | | | CompanyPostalCode 430470 | | | 0..1 430472 | PostalCode 430474 |
| | | | | | | | | | | | CityName 430476 | | | 0..1 430478 | LANGUAGEINDEPENDENT_MEDIUM_Name 430480 |
| | | | | | | | | | | | AdditionalCityName 430482 | | | 0..1 430484 | LANGUAGEINDEPENDENT_MEDIUM_Name 430486 |

FIG. 43-17

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | DistrictName 430488 | | | 0..1 430490 | LANGUAGEINDEPENDENT_MEDIUM_Name 430492 |
| | | | | | | POBoxID 430494 | | | 0..1 430496 | POBoxID 430498 |
| | | | | | | POBoxIndicator 430500 | | | 0..1 430502 | Indicator 430504 |
| | | | | | | POBoxCountryCode 430506 | | | 0..1 430508 | CountryCode 430510 |
| | | | | | | POBoxCountryName 430512 | | | 0..1 430514 | MEDIUM_Name 430516 |

FIG. 43-18

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionCode 430518 | | | 0..1 430520 | RegionCode 430522 |
| | | | | | | POBoxRegionName 430524 | | | 0..1 430526 | LANGUAGEINDEPENDENT_MEDIUM_Name 430528 |
| | | | | | | POBoxCityName 430530 | | | 0..1 430532 | LANGUAGEINDEPENDENT_MEDIUM_Name 430534 |
| | | | | | | StreetName 430536 | | | 0..1 430538 | StreetName 430540 |
| | | | | | | StreetPrefixName 430542 | | | 0..N 430544 | LANGUAGEINDEPENDENT_MEDIUM_Name 430546 |

FIG. 43-19

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetSuffixName 430548 | | | 0..N 430550 | LANGUAGEINDEPENDENT_MEDIUM_Name 430552 |
| | | | | | | HouseID 430554 | | | 0..1 430556 | HouseID 430558 |
| | | | | | | AdditionalHouseID 430560 | | | 0..1 430562 | HouseID 430564 |
| | | | | | | BuildingID 430566 | | | 0..1 430568 | BuildingID 430570 |
| | | | | | | FloorID 430572 | | | 0..1 430574 | FloorID 430576 |
| | | | | | | RoomID 430578 | | | 0..1 430580 | RoomID 430582 |

FIG. 43-20

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | CareOfName 430584 | | | 0..1 430586 | LANGUAGEINDEPENDENT_MEDIUM_Name 430588 |
| | | | | | | | | | | | Description 430590 | | | 0..N 430592 | Description 430594 |
| | | | | | | | | | | TaxJurisdictionCode 430596 | | | | 0..1 430598 | TaxJurisdiction Code 430600 |
| | | | | | | | | | | TimeZoneDifferenceValue 430602 | | | | 0..1 430604 | TimeZoneDifferenceValue 430606 |
| | | | | | | | | | | GeoCoordinates 430608 | | | | 0..1 430610 | GeoCoordinates 430612 |

FIG. 43-21

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Communication 430616 | | | | 0..1 430618 | Communication 430620 |
| | | | | | | CorrespondenceLanguageCode 430622 | | | 0..1 430624 | LanguageCode 430626 |
| | | | | | | CorrespondenceLanguageName 430628 | | | 0..1 430630 | MEDIUM_Name 430632 |
| | | | | | | Telephone 430634 | | | 0..N 430636 | Telephone 430638 |
| | | | | | | | Number 430640 | | 1 430642 | PhoneNumber 430644 |

FIG. 43-22

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 430646 | | 0..1 430648 | Indicator 430650 |
| | | | | | | | NumberDefaultIndicator 430652 | | 1 430654 | Indicator 430656 |
| | | | | | | | NumberDescription 430658 | | 0..N 430660 | Description 430662 |
| | | | | | | | NumberUsageDenialIndicator 430664 | | 1 430666 | Indicator 430668 |
| | | | | | | MobilePhone 430670 | | | 0..N 430672 | Telephone 430674 |

FIG. 43-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 430676 | | 1 430678 | PhoneNumber 430680 |
| | | | | | | | SMSEnabledIndicator 430682 | | 0..1 430684 | Indicator 430686 |
| | | | | | | | NumberDefaultIndicator 430688 | | 1 430690 | Indicator 430692 |
| | | | | | | | NumberDescription 430694 | | 0..N 430696 | Description 430698 |
| | | | | | | | NumberUsageDenialIndicator 430700 | | 1 430702 | Indicator 430704 |

FIG. 43-24

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Facsimile 430706 | | | 0..N 430708 | Facsimile 430710 |
| | | | | | | | Number 430712 | | 1 430714 | PhoneNumber 430716 |
| | | | | | | | NumberDefaultIndicator 430718 | | 1 430720 | Indicator 430722 |
| | | | | | | | NumberDescription 430724 | | 0..N 430726 | Description 430728 |
| | | | | | | | NumberUsageDenialIndicator 430730 | | 1 430732 | Indicator 430734 |

FIG. 43-25

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Email 430736 | | | 0..N 430738 | Email 430740 |
| | | | | | | | URI 430742 | | 1 430744 | EmailURI 430746 |
| | | | | | | | URIDefaultIndicator 430748 | | 1 430750 | Indicator 430752 |
| | | | | | | | URIDescription 430754 | | 0..N 430756 | Description 430758 |
| | | | | | | | URIUsageDenialIndicator 430760 | | 1 430762 | Indicator 430764 |
| | | | | | | Web 430766 | | | 0..N 430768 | Web 430770 |

FIG. 43-26

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | URI 430772 | | 1 430774 | WebURI 430776 |
| | | | | | | | | | | | | URIDefaultIndicator 430778 | | 1 430780 | Indicator 430782 |
| | | | | | | | | | | | | URIDescription 430784 | | 0..N 430786 | Description 430788 |
| | | | | | | | | | PostalRegulationsCompliantStreetDescription 430790 | | | | | 0..1 430792 | LANGUAGEINDEPENDENT_MEDIUM_Description 430794 |

FIG. 43-27

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | PartyIdentification 430796 | | | | | Identification 430798 | | | | | 0..N 430800 | ExportDeclarationProcessingCancellationRequestPartyIdentification 430802 |
| | | | | | | | | | PartyIdentifierTypeCode 430804 | | | | 0..1 430806 | PartyIdentifierTypeCode 430808 |
| | | | | | | | | | PartyID 430810 | | | | 0..1 430812 | NOALPHANUMERICCONVERSION_PartyID 430814 |
| | | | PartyContactParty 430816 | | | | | ContactParty 430818 | | | | | 0..1 430820 | ExportDeclarationProcessingCancellationRequestPartyContactParty 430822 |

FIG. 43-28

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Address 430824 | | | | 0..1 430826 | Address 430828 |
| | | | | | | OrganisationFormOfAddress 430830 | | | 0..1 430832 | FormOfAddress 430834 |
| | | | | | | OrganisationFormattedName 430836 | | | 0..N 430838 | LANGUAGEINDEPENDENT_MEDIUM_Name 430840 |
| | | | | | | PersonName 430842 | | | 0..1 430844 | PersonName 430846 |
| | | | | | | FunctionalTitleName 430848 | | | 0..1 430850 | LANGUAGEINDEPENDENT_MEDIUM_Name 430852 |

FIG. 43-29

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | DepartmentName 430854 | | | 0..1 430856 | LANGUAGEINDEPENDENT_MEDIUM_Name 430858 |
| | | | | | Address 430860 | | | | | | Office 430862 | | | 0..1 430864 | Office 430866 |
| | | | | | | | | | | | Physical Address 430870 | | | 0..1 430872 | PhysicalAddress 430874 |
| | | | | | | | | | | | | CountryCode 430876 | | 0..1 430878 | CountryCode 430880 |
| | | | | | | | | | | | | CountryName 430882 | | 0..1 430884 | MEDIUM_Name 430886 |
| | | | | | | | | | | | | RegionCode 430888 | | 0..1 430890 | RegionCode 430892 |

FIG. 43-30

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | RegionName 430894 | | 0..1 430896 | LANGUAGEINDEPENDENT_MEDIUM_Name 430898 |
| | | | | | | | | | | | | StreetPostalCode 430900 | | 0..1 430902 | PostalCode 430904 |
| | | | | | | | | | | | | POBoxPostalCode 430906 | | 0..1 430908 | PostalCode 430910 |
| | | | | | | | | | | | | CompanyPostalCode 430912 | | 0..1 430914 | PostalCode 430916 |
| | | | | | | | | | | | | CityName 430918 | | 0..1 430920 | LANGUAGEINDEPENDENT_MEDIUM_Name 430922 |

FIG. 43-31

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | AdditionalCityName 430924 | | 0..1 430926 | LANGUAGEINDEPENDENT_MEDIUM_Name 430928 |
| | | | | | | | DistrictName 430930 | | 0..1 430932 | LANGUAGEINDEPENDENT_MEDIUM_Name 430934 |
| | | | | | | | POBoxID 430936 | | 0..1 430938 | POBoxID 430940 |
| | | | | | | | POBoxIndicator 430942 | | 0..1 430944 | Indicator 430946 |
| | | | | | | | POBoxCountryCode 430948 | | 0..1 430950 | CountryCode 430952 |

FIG. 43-32

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxCountryName 430954 | | 0..1 430956 | MEDIUM_Name 430958 |
| | | | | | | | POBoxRegionCode 430960 | | 0..1 430962 | RegionCode 430964 |
| | | | | | | | POBoxRegionName 430966 | | 0..1 430968 | LANGUAGEINDEPENDENT_MEDIUM_Name 430970 |
| | | | | | | | POBoxCityName 430972 | | 0..1 430974 | LANGUAGEINDEPENDENT_MEDIUM_Name 430976 |
| | | | | | | | StreetName 430978 | | 0..1 430980 | StreetName 430982 |

FIG. 43-33

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetPrefixName 430984 | | 0..N 430986 | LANGUAGEINDEPENDENT_MEDIUM_Name 430988 |
| | | | | | | | StreetSuffixName 430990 | | 0..N 430992 | LANGUAGEINDEPENDENT_MEDIUM_Name 430994 |
| | | | | | | | HouseID 430996 | | 0..1 430998 | HouseID 431000 |
| | | | | | | | AdditionalHouseID 431002 | | 0..1 431004 | HouseID 431006 |
| | | | | | | | BuildingID 431008 | | 0..1 431010 | BuildingID 431012 |

FIG. 43-34

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | FloorID 431014 | | 0..1 431016 | FloorID 431018 |
| | | | | | | | RoomID 431020 | | 0..1 431022 | RoomID 431024 |
| | | | | | | | CareOfName 431026 | | 0..1 431028 | LANGUAGEINDEPENDENT_MEDIUM_Name 431030 |
| | | | | | | | Description 431032 | | 0..N 431034 | Description 431036 |
| | | | | | | TaxJurisdictionCode 431038 | | | 0..1 431040 | TaxJurisdictionCode 431042 |

FIG. 43-35

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | TimeZoneDifferenceValue 431044 | | | 0..1 431046 | TimeZoneDifferenceValue 431048 |
| | | | | | | GeoCoordinates 431050 | | | 0..1 431052 | GeoCoordinates 431054 |
| | | | | | | Communication 431058 | | | 0..1 431060 | Communication 431062 |
| | | | | | | | CorrespondenceLanguageCode 431064 | | 0..1 431066 | LanguageCode 431068 |

FIG. 43-36

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageName 431070 | | 0..1 431072 | MEDIUM_Name 431074 |
| | | | | | | | Telephone 431076 | | 0..N 431078 | Telephone 431080 |
| | | | | | | | | Number 431082 | 1 431084 | PhoneNumber 431086 |
| | | | | | | | | SMSEnabledIndicator 431088 | 0..1 431090 | Indicator 431092 |
| | | | | | | | | NumberDefaultIndicator 431094 | 1 431096 | Indicator 431098 |

FIG. 43-37

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | | NumberDescription 431100 | 0..N 431102 | Description 431104 |
| | | | | | | | | | | | | | NumberUsageDenialIndicator 431106 | 1 431108 | Indicator 431110 |
| | | | | | | | | | | | | MobilePhone 431112 | | 0..N 431114 | Telephone 431116 |
| | | | | | | | | | | | | | Number 431118 | 1 431120 | PhoneNumber 431122 |
| | | | | | | | | | | | | | SMSEnabledIndicator 431124 | 0..1 431126 | Indicator 431128 |

FIG. 43-38

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number DefaultIndicator 431130 | 1 431132 | Indicator 431134 |
| | | | | | | | | Number Description 431136 | 0..N 431138 | Description 431140 |
| | | | | | | | | Number UsageDenialIndicator 431142 | 1 431144 | Indicator 431146 |
| | | | | | | | Facsimile 431148 | | 0..N 431150 | Facsimile 431152 |
| | | | | | | | | Number 431154 | 1 431156 | PhoneNumber 431158 |

FIG. 43-39

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 431160 | 1 431162 | Indicator 431164 |
| | | | | | | | | NumberDescription 431166 | 0..N 431168 | Description 431170 |
| | | | | | | | | NumberUsageDenialIndicator 431172 | 1 431174 | Indicator 431176 |
| | | | | | | | Email 431178 | | 0..N 431180 | Email 431182 |
| | | | | | | | | URI 431184 | 1 431186 | EmailURI 431188 |

FIG. 43-40

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 431190 | 1 431192 | Indicator 431194 |
| | | | | | | | | URIDescription 431196 | 0..N 431198 | Description 431200 |
| | | | | | | | | URIUsageDenialIndicator 431202 | 1 431204 | Indicator 431206 |
| | | | | | | | Web 431208 | | 0..N 431210 | Web 431212 |
| | | | | | | | | URI 431214 | 1 431216 | WebURI 431218 |

FIG. 43-41

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 431220 | 1 431222 | Indicator 431224 |
| | | | | | | | | URIDescription 431226 | 0..N 431228 | Description 431230 |
| | | | | | BusinessPartnerFormattedName 431232 | | | | 0..1 431234 | LANGUAGEINDEPENDENT_EXTENDED_Name 431236 |
| | | | | | FormattedConventionalPhoneNumberDescription 431238 | | | | 0..1 431240 | LANGUAGEINDEPENDENT_SHORT_Description 431242 |

FIG. 43-42

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | FormattedFacsimileNumberDescription 431244 | | | | 0..1 431246 | LANGUAGEINDEPENDENT_SHORT_Description 431248 |

FIG. 44-1

| Package | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|
| ExportDeclarationProcessingConfirmation 440000 | | | ExportDeclarationProcessingConfirmation 440002 | | | | | | | | | | ExportDeclarationProcessingConfirmationMessage 440004 |
| | MessageHeader 440006 | | | MessageHeader 440008 | | | | | | | | 1 440010 | BusinessDocumentMessageHeader 440012 |
| | | | | | ID 440014 | | | | | | | 0..1 440016 | BusinessDocumentMessageID 440018 |

FIG. 44-2

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | UUID 440020 | | | | | | | 0..1 440022 | UUID 440024 |
| | | | ReferenceID 440026 | | | | | | | 0..1 440028 | BusinessDocumentMessageID 440030 |
| | | | ReferenceUUID 440032 | | | | | | | 0..1 440034 | UUID 440036 |
| | | | CreationDateTime 440038 | | | | | | | 1 440040 | GLOBAL_DateTime 440042 |

FIG. 44-3

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | TestDataIndicator 440044 | | | | | | | 0..1 440046 | Indicator 440048 |
| | | | ReconciliationIndicator 440050 | | | | | | | 0..1 440052 | Indicator 440054 |
| | | | SenderBusinessSystemID 440056 | | | | | | | 0..1 440058 | BusinessSystemID 440060 |

FIG. 44-4

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | RecipientBusinessSystemID 440062 | | | | | | | 0..1 440064 | BusinessSystemID 440066 |
| | | Party 440068 | | | | SenderParty 440070 | | | | | | | 0..1 440072 | BusinessDocumentMessageHeaderParty 440074 |
| | | | | | | | InternalID 440076 | | | | | | 0..1 440078 | PartyInternalID 440080 |
| | | | | | | | StandardID 440082 | | | | | | 0..N 440084 | PartyStandardID 440086 |

FIG. 44-5

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Contact Person 440088 | | | | | | 0..1 440090 | BusinessDocumentMessageHeaderPartyContactPerson 440092 |
| | | | | | Internal ID 440094 | | | | | 0..1 440096 | ContactPersonInternalID 440098 |
| | | | | | OrganisationFormattedName 440100 | | | | | 0..N 440102 | LANGUAGEINDEPENDENT_MEDIUM_Name 440104 |

FIG. 44-6

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PersonFormattedName 440106 | | | | | 0..N 440108 | LANGUAGEINDEPENDENT_LONG_Name 440110 |
| | | | | | PhoneNumber 440114 | | | | | 0..N 440116 | PhoneNumber 440118 |
| | | | | | FaxNumber 440122 | | | | | 0..N 440124 | PhoneNumber 440126 |
| | | | | | EmailURI 440128 | | | | | 0..N 440130 | EmailURI 440132 |

FIG. 44-7

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | RecipientParty 440136 | | | | | | | 0..N 440138 | BusinessDocumentMessageHeaderParty 440140 |
| | | | | InternalID 440142 | | | | | | 0..1 440144 | PartyInternalID 440146 |
| | | | | StandardID 440148 | | | | | | 0..N 440150 | PartyStandardID 440152 |

FIG. 44-8

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Contact Person 440154 | | | | | | 0..1 440156 | BusinessDocumentMessageHeaderPartyContactPerson 440158 |
| | | | | | Internal ID 440160 | | | | | 0..1 440162 | ContactPersonInternalID 440164 |
| | | | | | OrganisationFormattedName 440166 | | | | | 0..N 440168 | LANGUAGEINDEPENDENT_MEDIUM_Name 440170 |

FIG. 44-9

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PersonFormattedName 440172 | | | | | 0..N 440174 | LANGUAGEINDEPENDENT_LONG_Name 440176 |
| | | | | | PhoneNumber 440180 | | | | | 0..N 440182 | PhoneNumber 440184 |
| | | | | | FaxNumber 440188 | | | | | 0..N 440190 | PhoneNumber 440192 |
| | | | | | EmailURI 440194 | | | | | 0..N 440196 | EmailURI 440198 |

FIG. 44-10

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Business Scope 440200 | | | | BusinessScope 440202 | | | | | | | 0..N 440204 | Business Scope 440206 |
| | Export Declaration 440208 | | | | Export Declaration 440210 | | | | | | | | 1 440212 | ExportDeclarationProcessingConfirmation 440214 |
| | | | | | | ExportMessageSubTypeCode 440216 | | | | | | | 0..1 440218 | ExportMessageSubTypeCode 440220 |

FIG. 44-11

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportMessageID 440222 | | | | | | | 0..1 440224 | CustomsProcessMessageID 440226 |
| | | | ExportMessageReferenceID 440228 | | | | | | | 0..N 440230 | CustomsProcessMessageID 440232 |
| | | | MajorVersionCustomsAuthorityID 440234 | | | | | | | 0..1 440236 | VersionPartyID 440238 |

FIG. 44-12

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | MinorVersionCustomsAuthorityID 440240 | | | | | | | 0..1 440242 | VersionPartyID 440244 |
| | | | MainTestCaseID 440246 | | | | | | | 0..1 440248 | TestCaseID 440250 |
| | | | SubTestCaseID 440252 | | | | | | | 0..1 440254 | TestCaseID 440256 |

FIG. 44-13

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | CustomsProcessID 440258 | | | | | | | 0..1 440260 | CustomsProcessID 440262 |
| | | | CustomsProcessPartyID 440264 | | | | | | | 0..1 440266 | CustomsProcessID 440268 |
| | | | CustomsProcessCustomsAuthorityID 440270 | | | | | | | 0..1 440272 | CustomsProcessID 440274 |

FIG. 44-14

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportDeclarationTypeCode 440276 | | | | | | | 0..1 440278 | ExportDeclarationTypeCode 440280 |
| | | | ExportTypeCode 440282 | | | | | | | 0..1 440284 | ExportTypeCode 440286 |
| | | | ExportExportingCountryCode 440288 | | | | | | | 0..1 440290 | ExportExportingCountryCode 440292 |

FIG. 44-15

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportDestinationCountryCode 440294 | | | | | | | 0..1 440296 | ExportDestinationCountryCode 440298 |
| | | | ExportSpecialCircumstancesCode 440300 | | | | | | | 0..1 440302 | ExportSpecialCircumstancesCode 440304 |

FIG. 44-16

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportTransportCostPaymentFormCode 440306 | | | | | | | 0..1 440308 | ExportTransportCostPaymentFormCode 440310 |
| | | | ContainerUsedIndicator 440312 | | | | | | | 0..1 440314 | Indicator 440316 |
| | | | ExportPartyRepresentationCode 440318 | | | | | | | 0..1 440320 | ExportPartyRepresentationCode 440322 |

FIG. 44-17

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ItemTotalNumberValue 440324 | | | | | | | 0..1 440326 | NumberValue 440328 |
| | | | TotalGrossWeightQuantity 440330 | | | | | | | 0..1 440332 | Quantity 440334 |
| | | | TotalGrossWeightQuantityTypeCode 440336 | | | | | | | 0..1 440338 | QuantityTypeCode 440340 |

FIG. 44-18

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ConsignmentExportID 440342 | | | | | | | 0..1 440344 | ConsignmentExportID 440346 |
| | | | PackageTotalNumberValue 440348 | | | | | | | 0..1 440350 | NumberValue 440352 |
| | | | InlandExportTransportModeCode 440354 | | | | | | | 0..1 440356 | ExportTransportModeCode 440358 |

FIG. 44-19

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | CrossBorderExportTransportModeCode 440360 | | | | | | | 0..1 440362 | ExportTransportModeCode 440364 |
| | | | CrossBorderExportTransportMeansTypeCode 440366 | | | | | | | 0..1 440368 | ExportTransportMeansTypeCode 440370 |

FIG. 44-20

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | CrossBorderTransportMeansID 440372 | | | | | | | 0..1 440374 | TransportMeansID_V1 440376 |
| | | | | | | ExportCrossBorderTransportMeansNationalityCode 440378 | | | | | | | 0..1 440380 | ExportCrossBorderTransportMeansNationalityCode 440382 |

FIG. 44-21

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | ExportBusinessTransactionTypeCode 440384 | | | | | | | 0..1 440386 | ExportBusinessTransactionTypeCode 440388 |
| | | | | | | InvoiceTotalNetAmount 440390 | | | | | | | 0..1 440392 | Amount 440394 |
| | | | | | | ExportIncotermsClassificationCode 440396 | | | | | | | 0..1 440398 | ExportIncotermsClassificationCode 440400 |

FIG. 44-22

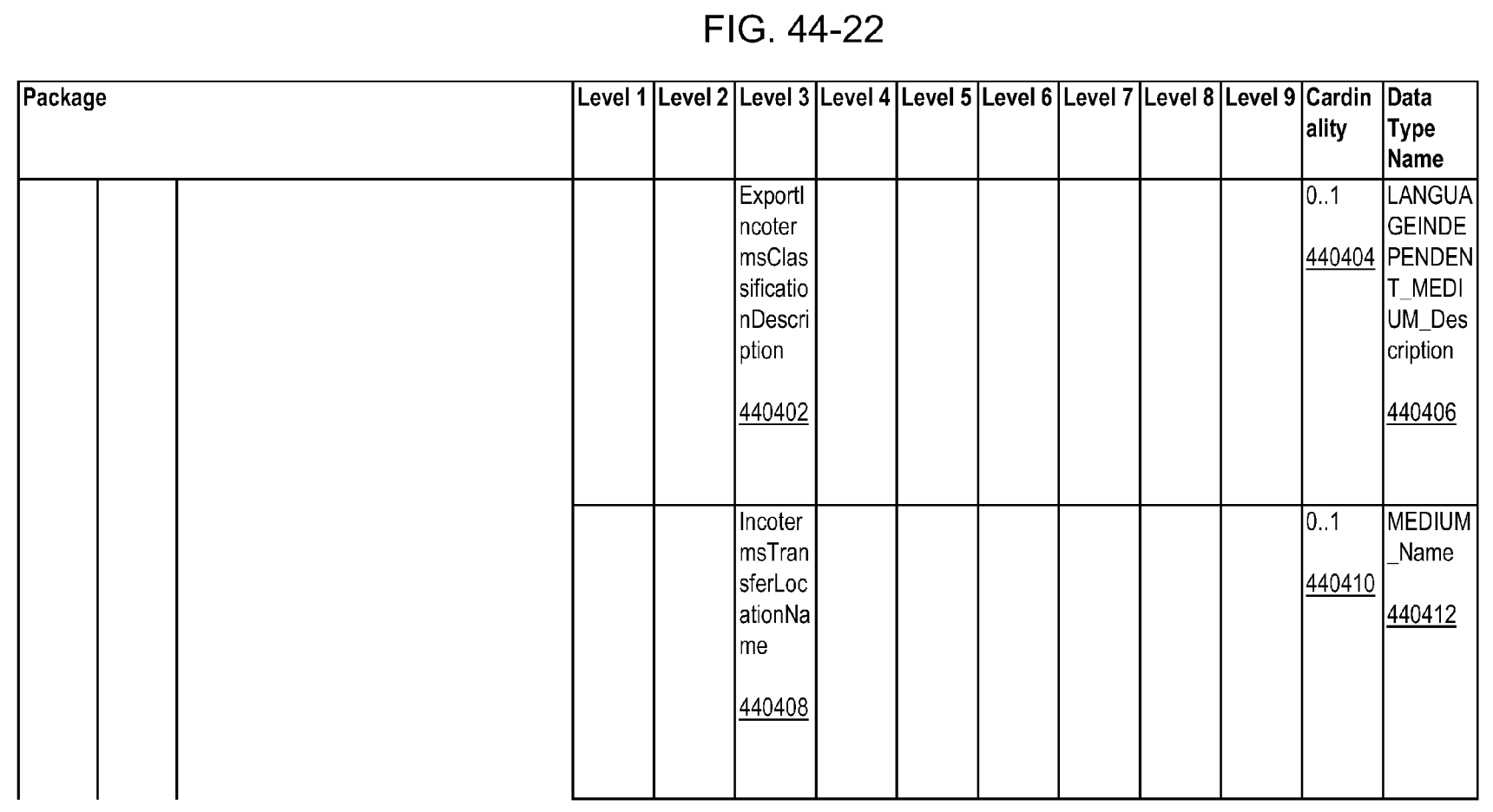

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportIncotermsClassificationDescription 440402 | | | | | | | 0..1 440404 | LANGUAGEINDEPENDENT_MEDIUM_Description 440406 |
| | | | IncotermsTransferLocationName 440408 | | | | | | | 0..1 440410 | MEDIUM_Name 440412 |

FIG. 44-23

| Package | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|
| | | | | | ExportDeclarationCustomsProcessingStatusCode 440414 | | | | | | | 0..1 440416 | ExportDeclarationCustomsProcessingStatusCode 440418 |
| | | | | | CommunicationDateTime 440420 | | | | | | | 0..1 440422 | GLOBAL_DateTime 440424 |

FIG. 44-24

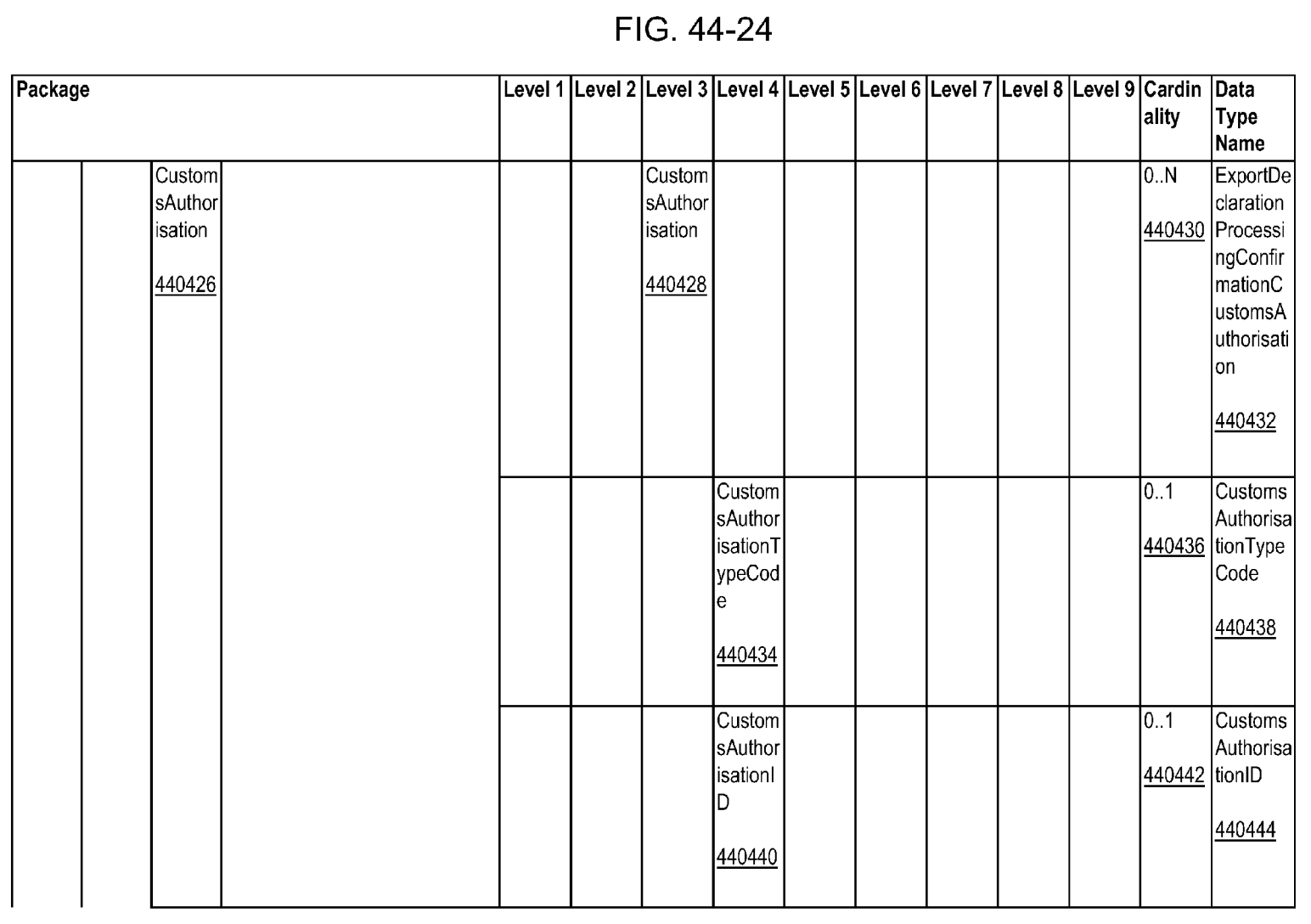

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | CustomsAuthorisation 440426 | | | | CustomsAuthorisation 440428 | | | | | | | 0..N 440430 | ExportDeclarationProcessingConfirmationCustomsAuthorisation 440432 |
| | | | | | | | CustomsAuthorisationTypeCode 440434 | | | | | | 0..1 440436 | CustomsAuthorisationTypeCode 440438 |
| | | | | | | | CustomsAuthorisationID 440440 | | | | | | 0..1 440442 | CustomsAuthorisationID 440444 |

FIG. 44-25

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | TimePoint 440446 | | | | TimePoint 440448 | | | | | | | 0..N 440450 | ExportDeclarationProcessingConfirmationTimePoint 440452 |
| | | | | | | | TimePointRoleCode 440454 | | | | | | 0..1 440456 | TimePointRoleCode 440458 |
| | | | | | | | DateTime 440460 | | | | | | 0..1 440462 | LOCAL_DateTime 440464 |
| | | | | | | | Date 440466 | | | | | | 0..1 440468 | Date 440470 |

FIG. 44-26

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | BasicText 440472 | | | | BasicText 440474 | | | | | | | 0..N 440476 | TextCollectionBasicText 440478 |
| | | | | | | | TypeCode 440480 | | | | | | 0..1 440482 | TextCollectionTextTypeCode 440484 |
| | | | | | | | ContentText 440486 | | | | | | 1 440488 | Text 440490 |
| | | Location 440492 | | | | Location 440494 | | | | | | | 0..N 440496 | ExportDeclarationProcessingConfirmationLocation 440498 |

FIG. 44-27

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | LocationRoleCategoryCode 440500 | | | | | | 0..1 440502 | LocationRoleCategoryCode 440504 |
| | | | | CustomsAuthorityID 440506 | | | | | | 0..1 440508 | LocationPartyID 440510 |
| | | | | Address 440512 | | | | | | 0..1 440514 | Address 440516 |

FIG. 44-28

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormOfAddress 440518 | | | | | 0..1 440520 | FormOfAddress 440522 |
| | | | | | OrganisationFormattedName 440524 | | | | | 0..N 440526 | LANGUAGEINDEPENDENT_MEDIUM_Name 440528 |
| | | | | | PersonName 440530 | | | | | 0..1 440532 | PersonName 440534 |

FIG. 44-29

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | FunctionalTitleName 440536 | | | | | 0..1 440538 | LANGUAGEINDEPENDENT_MEDIUM_Name 440540 |
| | | | | | | | | | | DepartmentName 440542 | | | | | 0..1 440544 | LANGUAGEINDEPENDENT_MEDIUM_Name 440546 |
| | | | | Address 440548 | | | | | | Office 440550 | | | | | 0..1 440552 | Office 440554 |
| | | | | | | | | | | PhysicalAddress 440558 | | | | | 0..1 440560 | PhysicalAddress 440562 |

FIG. 44-30

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Country Code 440564 | | | | 0..1 440566 | CountryCode 440568 |
| | | | | | | Country Name 440570 | | | | 0..1 440572 | MEDIUM_Name 440574 |
| | | | | | | Region Code 440576 | | | | 0..1 440578 | RegionCode 440580 |
| | | | | | | Region Name 440582 | | | | 0..1 440584 | LANGUAGEINDEPENDENT_MEDIUM_Name 440586 |

FIG. 44-31

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetPostalCode 440588 | | | | 0..1 440590 | PostalCode 440592 |
| | | | | | | POBoxPostalCode 440594 | | | | 0..1 440596 | PostalCode 440598 |
| | | | | | | CompanyPostalCode 440600 | | | | 0..1 440602 | PostalCode 440604 |

FIG. 44-32

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CityName 440606 | | | | 0..1 440608 | LANGUAGEINDEPENDENT_MEDIUM_Name 440610 |
| | | | | | | AdditionalCityName 440612 | | | | 0..1 440614 | LANGUAGEINDEPENDENT_MEDIUM_Name 440616 |
| | | | | | | DistrictName 440618 | | | | 0..1 440620 | LANGUAGEINDEPENDENT_MEDIUM_Name 440622 |

FIG. 44-33

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBoxID 440624 | | | | 0..1 440626 | POBoxID 440628 |
| | | | | | | POBoxIndicator 440630 | | | | 0..1 440632 | Indicator 440634 |
| | | | | | | POBox Country Code 440636 | | | | 0..1 440638 | CountryCode 440640 |
| | | | | | | POBox Country Name 440642 | | | | 0..1 440644 | MEDIUM_Name 440646 |

FIG. 44-34

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Region Code 440648 | | | | 0..1 440650 | RegionCode 440652 |
| | | | | | | POBox Region Name 440654 | | | | 0..1 440656 | LANGUAGEINDEPENDENT_MEDIUM_Name 440658 |
| | | | | | | POBox CityName 440660 | | | | 0..1 440662 | LANGUAGEINDEPENDENT_MEDIUM_Name 440664 |

FIG. 44-35

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetName 440666 | | | | 0..1 440668 | StreetName 440670 |
| | | | | | | StreetPrefixName 440672 | | | | 0..N 440674 | LANGUAGEINDEPENDENT_MEDIUM_Name 440676 |
| | | | | | | StreetSuffixName 440678 | | | | 0..N 440680 | LANGUAGEINDEPENDENT_MEDIUM_Name 440682 |
| | | | | | | HouseID 440684 | | | | 0..1 440686 | HouseID 440688 |

FIG. 44-36

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalHouseID 440690 | | | | 0..1 440692 | HouseID 440694 |
| | | | | | | BuildingID 440696 | | | | 0..1 440698 | BuildingID 440700 |
| | | | | | | FloorID 440702 | | | | 0..1 440704 | FloorID 440706 |
| | | | | | | RoomID 440708 | | | | 0..1 440710 | RoomID 440712 |

FIG. 44-37

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CareOf Name 440714 | | | | 0..1 440716 | LANGUAGEINDEPENDENT_MEDIUM_Name 440718 |
| | | | | | | Description 440720 | | | | 0..N 440722 | Description 440724 |
| | | | | | TaxJurisdiction Code 440726 | | | | | 0..1 440728 | TaxJurisdictionCode 440730 |

FIG. 44-38

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TimeZoneDifferenceValue 440732 | | | | | 0..1 440734 | TimeZoneDifferenceValue 440736 |
| | | | | | GeoCoordinates 440738 | | | | | 0..1 440740 | GeoCoordinates 440742 |
| | | | | | Communication 440746 | | | | | 0..1 440748 | Communication 440750 |

FIG. 44-39

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 440752 | | | | 0..1 440754 | LanguageCode 440756 |
| | | | | | | CorrespondenceLanguageName 440758 | | | | 0..1 440760 | MEDIUM_Name 440762 |
| | | | | | | Telephone 440764 | | | | 0..N 440766 | Telephone 440768 |

FIG. 44-40

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number 440770 | | | 1 440772 | PhoneNumber 440774 |
| | | | | | | | SMSEnabledIndicator 440776 | | | 0..1 440778 | Indicator 440780 |
| | | | | | | | NumberDefaultIndicator 440782 | | | 1 440784 | Indicator 440786 |
| | | | | | | | NumberDescription 440788 | | | 0..N 440790 | Description 440792 |

FIG. 44-41

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 440794 | | | 1 440796 | Indicator 440798 |
| | | | | | | MobilePhone 440800 | | | | 0..N 440802 | Telephone 440804 |
| | | | | | | | Number 440806 | | | 1 440808 | PhoneNumber 440810 |
| | | | | | | | SMSEnabledIndicator 440812 | | | 0..1 440814 | Indicator 440816 |

FIG. 44-42

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberDefaultIndicator 440818 | | | 1 440820 | Indicator 440822 |
| | | | | | | | NumberDescription 440824 | | | 0..N 440826 | Description 440828 |
| | | | | | | | NumberUsageDenialIndicator 440830 | | | 1 440832 | Indicator 440834 |

FIG. 44-43

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Facsimile 440836 | | | | 0..N 440838 | Facsimile 440840 |
| | | | | | | | Number 440842 | | | 1 440844 | PhoneNumber 440846 |
| | | | | | | | NumberDefaultIndicator 440848 | | | 1 440850 | Indicator 440852 |
| | | | | | | | NumberDescription 440854 | | | 0..N 440856 | Description 440858 |

FIG. 44-44

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 440860 | | | 1 440862 | Indicator 440864 |
| | | | | | | Email 440866 | | | | 0..N 440868 | Email 440870 |
| | | | | | | | URI 440872 | | | 1 440874 | EmailURI 440876 |
| | | | | | | | URIDefaultIndicator 440878 | | | 1 440880 | Indicator 440882 |

FIG. 44-45

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | URIDescription 440884 | | | 0..N 440886 | Description 440888 |
| | | | | | | | URIUsageDenialIndicator 440890 | | | 1 440892 | Indicator 440894 |
| | | | | | | Web 440896 | | | | 0..N 440898 | Web 440900 |
| | | | | | | | URI 440902 | | | 1 440904 | WebURI 440906 |

FIG. 44-46

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | URIDefaultIndicator 440908 | | | 1 440910 | Indicator 440912 |
| | | | | | | | URIDescription 440914 | | | 0..N 440916 | Description 440918 |
| | | | | PostalRegulationsCompliantStreetDescription 440920 | | | | | | 0..1 440922 | LANGUAGEINDEPENDENT_MEDIUM_Description 440924 |

FIG. 44-47

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | CustomsOffice 440926 | | | | CustomsOffice 440928 | | | | | | | 0..N 440930 | ExportDeclarationProcessingConfirmationCustomsOffice 440932 |
| | | | | | | | RoleCategoryCode 440934 | | | | | | 0..1 440936 | PartyRoleCategoryCode 440938 |

FIG. 44-48

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Identification 440940 | | | | | Identification 440942 | | | | | | 0..1 440944 | ExportDeclarationProcessingConfirmationCustomsOfficeIdentification 440946 |
| | | | | | | | | | PartyIdentifierTypeCode 440948 | | | | | 0..1 440950 | PartyIdentifierTypeCode 440952 |
| | | | | | | | | | PartyID 440954 | | | | | 0..1 440956 | NOALPHANUMERICCONVERSION_PartyID 440958 |

FIG. 44-49

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Party 440960 | | | | Party 440962 | | | | | | | 0..N 440964 | ExportDeclarationProcessingConfirmationParty 440966 |
| | | | | | | | RoleCategoryCode 440968 | | | | | | 0..1 440970 | PartyRoleCategoryCode 440972 |
| | | | | | | | Address 440974 | | | | | | 0..1 440976 | Address 440978 |

FIG. 44-50

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormOfAddress 440980 | | | | | 0..1 440982 | FormOfAddress 440984 |
| | | | | | OrganisationFormattedName 440986 | | | | | 0..N 440988 | LANGUAGEINDEPENDENT_MEDIUM_Name 440990 |
| | | | | | PersonName 440992 | | | | | 0..1 440994 | PersonName 440996 |

FIG. 44-51

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | FunctionalTitleName 440998 | | | | | 0..1 441000 | LANGUAGEINDEPENDENT_MEDIUM_Name 441002 |
| | | | | | DepartmentName 441004 | | | | | 0..1 441006 | LANGUAGEINDEPENDENT_MEDIUM_Name 441008 |
| Address 441010 | | | | | Office 441012 | | | | | 0..1 441014 | Office 441016 |
| | | | | | PhysicalAddress 441020 | | | | | 0..1 441022 | PhysicalAddress 441024 |

FIG. 44-52

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Country Code 441026 | | | | 0..1 441028 | CountryCode 441030 |
| | | | | | | Country Name 441032 | | | | 0..1 441034 | MEDIUM_Name 441036 |
| | | | | | | Region Code 441038 | | | | 0..1 441040 | RegionCode 441042 |
| | | | | | | Region Name 441044 | | | | 0..1 441046 | LANGUAGEINDEPENDENT_MEDIUM_Name 441048 |

FIG. 44-53

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetPostalCode 441050 | | | | 0..1 441052 | PostalCode 441054 |
| | | | | | | POBoxPostalCode 441056 | | | | 0..1 441058 | PostalCode 441060 |
| | | | | | | CompanyPostalCode 441062 | | | | 0..1 441064 | PostalCode 441066 |

FIG. 44-54

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CityName 441068 | | | | 0..1 441070 | LANGUAGEINDEPENDENT_MEDIUM_Name 441072 |
| | | | | | | AdditionalCityName 441074 | | | | 0..1 441076 | LANGUAGEINDEPENDENT_MEDIUM_Name 441078 |
| | | | | | | DistrictName 441080 | | | | 0..1 441082 | LANGUAGEINDEPENDENT_MEDIUM_Name 441084 |

FIG. 44-55

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBoxID 441086 | | | | 0..1 441088 | POBoxID 441090 |
| | | | | | | POBoxIndicator 441092 | | | | 0..1 441094 | Indicator 441096 |
| | | | | | | POBox Country Code 441098 | | | | 0..1 441100 | CountryCode 441102 |
| | | | | | | POBox Country Name 441104 | | | | 0..1 441106 | MEDIUM_Name 441108 |

FIG. 44-56

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Region Code 441110 | | | | 0..1 441112 | RegionCode 441114 |
| | | | | | | POBox Region Name 441116 | | | | 0..1 441118 | LANGUAGEINDEPENDENT_MEDIUM_Name 441120 |
| | | | | | | POBox CityName 441122 | | | | 0..1 441124 | LANGUAGEINDEPENDENT_MEDIUM_Name 441126 |

FIG. 44-57

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetName 441128 | | | | 0..1 441130 | StreetName 441132 |
| | | | | | | StreetPrefixName 441134 | | | | 0..N 441136 | LANGUAGEINDEPENDENT_MEDIUM_Name 441138 |
| | | | | | | StreetSuffixName 441140 | | | | 0..N 441142 | LANGUAGEINDEPENDENT_MEDIUM_Name 441144 |
| | | | | | | HouseID 441146 | | | | 0..1 441148 | HouseID 441150 |

FIG. 44-58

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalHouseID 441152 | | | | 0..1 441154 | HouseID 441156 |
| | | | | | | BuildingID 441158 | | | | 0..1 441160 | BuildingID 441162 |
| | | | | | | FloorID 441164 | | | | 0..1 441166 | FloorID 441168 |
| | | | | | | RoomID 441170 | | | | 0..1 441172 | RoomID 441174 |

FIG. 44-59

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CareOf Name 441176 | | | | 0..1 441178 | LANGUAGEINDEPENDENT_MEDIUM_Name 441180 |
| | | | | | | Description 441182 | | | | 0..N 441184 | Description 441186 |
| | | | | | TaxJurisdictionCode 441188 | | | | | 0..1 441190 | TaxJurisdictionCode 441192 |

FIG. 44-60

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TimeZoneDifferenceValue 441194 | | | | | 0..1 441196 | TimeZoneDifferenceValue 441198 |
| | | | | | GeoCoordinates 441200 | | | | | 0..1 441202 | GeoCoordinates 441204 |
| | | | | | Communication 441208 | | | | | 0..1 441210 | Communication 441212 |

FIG. 44-61

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 441214 | | | | 0..1 441216 | LanguageCode 441218 |
| | | | | | | CorrespondenceLanguageName 441220 | | | | 0..1 441222 | MEDIUM_Name 441224 |
| | | | | | | Telephone 441226 | | | | 0..N 441228 | Telephone 441230 |

FIG. 44-62

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number 441232 | | | 1 441234 | PhoneNumber 441236 |
| | | | | | | | SMSEnabledIndicator 441238 | | | 0..1 441240 | Indicator 441242 |
| | | | | | | | NumberDefaultIndicator 441244 | | | 1 441246 | Indicator 441248 |
| | | | | | | | NumberDescription 441250 | | | 0..N 441252 | Description 441254 |

FIG. 44-63

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 441256 | | | 1 441258 | Indicator 441260 |
| | | | | | | MobilePhone 441262 | | | | 0..N 441264 | Telephone 441266 |
| | | | | | | | Number 441268 | | | 1 441270 | PhoneNumber 441272 |
| | | | | | | | SMSEnabledIndicator 441274 | | | 0..1 441276 | Indicator 441278 |

FIG. 44-64

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberDefaultIndicator 441280 | | | 1 441282 | Indicator 441284 |
| | | | | | | | NumberDescription 441286 | | | 0..N 441288 | Description 441290 |
| | | | | | | | NumberUsageDenialIndicator 441292 | | | 1 441294 | Indicator 441296 |

FIG. 44-65

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Facsimile 441298 | | | | 0..N 441300 | Facsimile 441302 |
| | | | | | | | Number 441304 | | | 1 441306 | PhoneNumber 441308 |
| | | | | | | | NumberDefaultIndicator 441310 | | | 1 441312 | Indicator 441314 |
| | | | | | | | NumberDescription 441316 | | | 0..N 441318 | Description 441320 |

FIG. 44-66

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 441322 | | | 1 441324 | Indicator 441326 |
| | | | | | | Email 441328 | | | | 0..N 441330 | Email 441332 |
| | | | | | | | URI 441334 | | | 1 441336 | EmailURI 441338 |
| | | | | | | | URIDefaultIndicator 441340 | | | 1 441342 | Indicator 441344 |

FIG. 44-67

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | URIDescription 441346 | | | 0..N 441348 | Description 441350 |
| | | | | | | | URIUsageDenialIndicator 441352 | | | 1 441354 | Indicator 441356 |
| | | | | | | Web 441358 | | | | 0..N 441360 | Web 441362 |
| | | | | | | | URI 441364 | | | 1 441366 | WebURI 441368 |

FIG. 44-68

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | URIDefaultIndicator 441370 | | | 1 441372 | Indicator 441374 |
| | | | | | | | URIDescription 441376 | | | 0..N 441378 | Description 441380 |
| | | | | PostalRegulationsCompliantStreetDescription 441382 | | | | | | 0..1 441384 | LANGUAGEINDEPENDENT_MEDIUM_Description 441386 |

FIG. 44-69

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | PartyIdentification 441388 | | | | | Identification 441390 | | | | | | 0..N 441392 | ExportDeclarationProcessingConfirmationPartyIdentification 441394 |
| | | | | | | | | | PartyIdentifierTypeCode 441396 | | | | | 0..1 441398 | PartyIdentifierTypeCode 441400 |
| | | | | | | | | | PartyID 441402 | | | | | 0..1 441404 | NOALPHANUMERICCONVERSION_PartyID 441406 |

FIG. 44-70

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| PartyContactParty 441408 | | | | Contact Party 441410 | | | | | | 0..1 441412 | ExportDeclarationProcessingConfirmationPartyContactParty 441414 |
| | | | | | Address 441416 | | | | | 0..1 441418 | Address 441420 |
| | | | | | | OrganisationFormOfAddress 441422 | | | | 0..1 441424 | FormOfAddress 441426 |

FIG. 44-71

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormattedName 441428 | | | | 0..N 441430 | LANGUAGEINDEPENDENT_MEDIUM_Name 441432 |
| | | | | | | PersonName 441434 | | | | 0..1 441436 | PersonName 441438 |
| | | | | | | FunctionalTitleName 441440 | | | | 0..1 441442 | LANGUAGEINDEPENDENT_MEDIUM_Name 441444 |

FIG. 44-72

| Package | Level 1 | Level 2 | Level 3 | Level 4 | Level 5 | Level 6 | Level 7 | Level 8 | Level 9 | Cardin ality | Data Type Name |
|---|---|---|---|---|---|---|---|---|---|---|---|
| | | | | | | Depart mentNa me 441446 | | | | 0..1 441448 | LANGUA GEINDE PENDEN T_MEDI UM_Nam e 441450 |
| Addres s 441452 | | | | | | Office 441454 | | | | 0..1 441456 | Office 441458 |
| | | | | | | Physica lAddres s 441462 | | | | 0..1 441464 | Physical Address 441466 |
| | | | | | | | Country Code 441468 | | | 0..1 441470 | CountryC ode 441472 |

FIG. 44-73

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Country Name 441474 | | | 0..1 441476 | MEDIUM_Name 441478 |
| | | | | | | | Region Code 441480 | | | 0..1 441482 | RegionCode 441484 |
| | | | | | | | Region Name 441486 | | | 0..1 441488 | LANGUAGEINDEPENDENT_MEDIUM_Name 441490 |
| | | | | | | | StreetPostalCode 441492 | | | 0..1 441494 | PostalCode 441496 |

FIG. 44-74

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxPostalCode 441498 | | | 0..1 441500 | PostalCode 441502 |
| | | | | | | | CompanyPostalCode 441504 | | | 0..1 441506 | PostalCode 441508 |
| | | | | | | | CityName 441510 | | | 0..1 441512 | LANGUAGEINDEPENDENT_MEDIUM_Name 441514 |

FIG. 44-75

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalCityName 441516 | | | 0..1 441518 | LANGUAGEINDEPENDENT_MEDIUM_Name 441520 |
| | | | | | | | District Name 441522 | | | 0..1 441524 | LANGUAGEINDEPENDENT_MEDIUM_Name 441526 |
| | | | | | | | POBoxID 441528 | | | 0..1 441530 | POBoxID 441532 |

FIG. 44-76

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxIndicator 441534 | | | 0..1 441536 | Indicator 441538 |
| | | | | | | | POBox Country Code 441540 | | | 0..1 441542 | CountryCode 441544 |
| | | | | | | | POBox Country Name 441546 | | | 0..1 441548 | MEDIUM_Name 441550 |

FIG. 44-77

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBox Region Code 441552 | | | 0..1 441554 | RegionCode 441556 |
| | | | | | | | POBox Region Name 441558 | | | 0..1 441560 | LANGUAGEINDEPENDENT_MEDIUM_Name 441562 |
| | | | | | | | POBox CityName 441564 | | | 0..1 441566 | LANGUAGEINDEPENDENT_MEDIUM_Name 441568 |

FIG. 44-78

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 441570 | | | 0..1 441572 | StreetName 441574 |
| | | | | | | | StreetPrefixName 441576 | | | 0..N 441578 | LANGUAGEINDEPENDENT_MEDIUM_Name 441580 |
| | | | | | | | StreetSuffixName 441582 | | | 0..N 441584 | LANGUAGEINDEPENDENT_MEDIUM_Name 441586 |
| | | | | | | | HouseID 441588 | | | 0..1 441590 | HouseID 441592 |

FIG. 44-79

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 441594 | | | 0..1 441596 | HouseID 441598 |
| | | | | | | | BuildingID 441600 | | | 0..1 441602 | BuildingID 441604 |
| | | | | | | | FloorID 441606 | | | 0..1 441608 | FloorID 441610 |
| | | | | | | | RoomID 441612 | | | 0..1 441614 | RoomID 441616 |

FIG. 44-80

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CareOf Name 441618 | | | 0..1 441620 | LANGUAGEINDEPENDENT_MEDIUM_Name 441622 |
| | | | | | | | Description 441624 | | | 0..N 441626 | Description 441628 |
| | | | | | | TaxJurisdiction Code 441630 | | | | 0..1 441632 | TaxJurisdictionCode 441634 |

FIG. 44-81

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | TimeZoneDifferenceValue 441636 | | | | 0..1 441638 | TimeZoneDifferenceValue 441640 |
| | | | | | | | | | | | | GeoCoordinates 441642 | | | | 0..1 441644 | GeoCoordinates 441646 |
| | | | | | | | | | | | | Communication 441650 | | | | 0..1 441652 | Communication 441654 |

FIG. 44-82

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 441656 | | | 0..1 441658 | LanguageCode 441660 |
| | | | | | | | CorrespondenceLanguageName 441662 | | | 0..1 441664 | MEDIUM_Name 441666 |
| | | | | | | | Telephone 441668 | | | 0..N 441670 | Telephone 441672 |

FIG. 44-83

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 441674 | | 1 441676 | PhoneNumber 441678 |
| | | | | | | | | SMSEnabledIndicator 441680 | | 0..1 441682 | Indicator 441684 |
| | | | | | | | | NumberDefaultIndicator 441686 | | 1 441688 | Indicator 441690 |
| | | | | | | | | NumberDescription 441692 | | 0..N 441694 | Description 441696 |

FIG. 44-84

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 441698 | | 1 441700 | Indicator 441702 |
| | | | | | | | MobilePhone 441704 | | | 0..N 441706 | Telephone 441708 |
| | | | | | | | | Number 441710 | | 1 441712 | PhoneNumber 441714 |
| | | | | | | | | SMSEnabledIndicator 441716 | | 0..1 441718 | Indicator 441720 |

FIG. 44-85

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberDefaultIndicator 441722 | | 1 441724 | Indicator 441726 |
| | | | | | | | | NumberDescription 441728 | | 0..N 441730 | Description 441732 |
| | | | | | | | | NumberUsageDenialIndicator 441734 | | 1 441736 | Indicator 441738 |

FIG. 44-86

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | Facsimile 441740 | | | 0..N 441742 | Facsimile 441744 |
| | | | | | | | | | | | | | | Number 441746 | | 1 441748 | PhoneNumber 441750 |
| | | | | | | | | | | | | | | NumberDefaultIndicator 441752 | | 1 441754 | Indicator 441756 |
| | | | | | | | | | | | | | | NumberDescription 441758 | | 0..N 441760 | Description 441762 |

FIG. 44-87

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 441764 | | 1 441766 | Indicator 441768 |
| | | | | | | | Email 441770 | | | 0..N 441772 | Email 441774 |
| | | | | | | | | URI 441776 | | 1 441778 | EmailURI 441780 |
| | | | | | | | | URIDefaultIndicator 441782 | | 1 441784 | Indicator 441786 |

FIG. 44-88

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | URIDescription 441788 | | 0..N 441790 | Description 441792 |
| | | | | | | | | | | | | | | URIUsageDenialIndicator 441794 | | 1 441796 | Indicator 441798 |
| | | | | | | | | | | | | | Web 441800 | | | 0..N 441802 | Web 441804 |
| | | | | | | | | | | | | | | URI 441806 | | 1 441808 | WebURI 441810 |

FIG. 44-89

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIDefaultIndicator 441812 | | 1 441814 | Indicator 441816 |
| | | | | | | | | URIDescription 441818 | | 0..N 441820 | Description 441822 |
| | | | | | BusinessPartnerFormattedName 441824 | | | | | 0..1 441826 | LANGUAGEINDEPENDENT_EXTENDED_Name 441828 |

FIG. 44-90

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | FormattedConventionalPhoneNumberDescription 441830 | | | | | 0..1 441832 | LANGUAGEINDEPENDENT_SHORT_Description 441834 |
| | | | | | | | | | | | FormattedFacsimileNumberDescription 441836 | | | | | 0..1 441838 | LANGUAGEINDEPENDENT_SHORT_Description 441840 |

FIG. 44-91

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | TransportRouteCountry 441842 | | | | TransportRouteCountry 441844 | | | | | | | 0..N 441846 | ExportDeclarationProcessingConfirmationTransportRouteCountry 441848 |
| | | | | | | | Ordinal Number Value 441850 | | | | | | 0..1 441852 | OrdinalNumberValue 441854 |

FIG. 44-92

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | | ExportTransportRouteCountryCode 441856 | | | | | | 0..1 441858 | ExportTransportRouteCountryCode 441860 |
| | | Item 441862 | | | | Item 441864 | | | | | | | 0..N 441866 | ExportDeclarationProcessingConfirmationItem 441868 |
| | | | | | | | CustomsAuthorityID 441870 | | | | | | 0..1 441872 | CustomsDeclarationItemCustomsAuthorityID 441874 |

FIG. 44-93

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Description 441876 | | | | | | 0..1 441878 | Description 441880 |
| | | | | CustomsProcessPartyID 441882 | | | | | | 0..1 441884 | CustomsProcessID 441886 |
| | | | | ConsignmentExportID 441888 | | | | | | 0..1 441890 | ConsignmentExportID 441892 |
| | | | | OriginExportRegionCode 441894 | | | | | | 0..1 441896 | ExportRegionCode 441898 |

FIG. 44-94

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | NetWeightQuantity 441900 | | | | | | 0..1 441902 | Quantity 441904 |
| | | | | NetWeightQuantityTypeCode 441906 | | | | | | 0..1 441908 | QuantityTypeCode 441910 |
| | | | | Gross Weight Quantity 441912 | | | | | | 0..1 441914 | Quantity 441916 |

FIG. 44-95

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | GrossWeightQuantityTypeCode 441918 | | | | | | 0..1 441920 | QuantityTypeCode 441922 |
| | | | | DangerousGoodsID 441924 | | | | | | 0..1 441926 | DangerousGoodsID 441928 |
| | | | | ExportTransportCostPaymentFormCode 441930 | | | | | | 0..1 441932 | ExportTransportCostPaymentFormCode 441934 |

FIG. 44-96

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | | CustomsCommodityClassificationCode 441936 | | | | | | 0..1 441938 | CustomsCommodityClassificationCode 441940 |
| | | | | | | | ExportProcedureTypeCode 441942 | | | | | | 0..1 441944 | ExportProcedureTypeCode 441946 |

FIG. 44-97

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ExportPreviousProcedureTypeCode 441948 | | | | | | 0..1 441950 | ExportPreviousProcedureTypeCode 441952 |
| | | | | ExportAdditionalProcedureTypeCode 441954 | | | | | | 0..1 441956 | ExportAdditionalProcedureTypeCode 441958 |
| | | | | LegalComplianceQuantity 441960 | | | | | | 0..1 441962 | Quantity 441964 |

FIG. 44-98

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | LegalComplianceQuantityTypeCode 441966 | | | | | | 0..1 441968 | QuantityTypeCode 441970 |
| | | | | LegalComplianceAmount 441972 | | | | | | 0..1 441974 | Amount 441976 |
| Party 441978 | | | | Party 441980 | | | | | | 0..N 441982 | ExportDeclarationProcessingConfirmationItemParty 441984 |

FIG. 44-99

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RoleCategoryCode 441986 | | | | | 0..1 441988 | PartyRoleCategoryCode 441990 |
| | | | | | Address 441992 | | | | | 0..1 441994 | Address 441996 |
| | | | | | | OrganisationFormOfAddress 441998 | | | | 0..1 442000 | FormOfAddress 442002 |

FIG. 44-100

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormattedName 442004 | | | | 0..N 442006 | LANGUAGEINDEPENDENT_MEDIUM_Name 442008 |
| | | | | | | PersonName 442010 | | | | 0..1 442012 | PersonName 442014 |
| | | | | | | FunctionalTitleName 442016 | | | | 0..1 442018 | LANGUAGEINDEPENDENT_MEDIUM_Name 442020 |

FIG. 44-101

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | DepartmentName 442022 | | | | 0..1 442024 | LANGUAGEINDEPENDENT_MEDIUM_Name 442026 |
| | | | | | Address 442028 | | | | | | | Office 442030 | | | | 0..1 442032 | Office 442034 |
| | | | | | | | | | | | | PhysicalAddress 442038 | | | | 0..1 442040 | PhysicalAddress 442042 |
| | | | | | | | | | | | | | CountryCode 442044 | | | 0..1 442046 | CountryCode 442048 |

FIG. 44-102

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | Country Name 442050 | | | 0..1 442052 | MEDIUM_Name 442054 |
| | | | | | | | | | | | | | Region Code 442056 | | | 0..1 442058 | RegionCode 442060 |
| | | | | | | | | | | | | | Region Name 442062 | | | 0..1 442064 | LANGUAGEINDEPENDENT_MEDIUM_Name 442066 |
| | | | | | | | | | | | | | StreetPostalCode 442068 | | | 0..1 442070 | PostalCode 442072 |

FIG. 44-103

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | POBox PostalCode 442074 | | | 0..1 442076 | PostalCode 442078 |
| | | | | | | | | | | | | | CompanyPostalCode 442080 | | | 0..1 442082 | PostalCode 442084 |
| | | | | | | | | | | | | | CityName 442086 | | | 0..1 442088 | LANGUAGEINDEPENDENT_MEDIUM_Name 442090 |

FIG. 44-104

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalCityName 442092 | | | 0..1 442094 | LANGUAGEINDEPENDENT_MEDIUM_Name 442096 |
| | | | | | | | District Name 442098 | | | 0..1 442100 | LANGUAGEINDEPENDENT_MEDIUM_Name 442102 |
| | | | | | | | POBoxID 442104 | | | 0..1 442106 | POBoxID 442108 |

FIG. 44-105

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxIndicator 442110 | | | 0..1 442112 | Indicator 442114 |
| | | | | | | | POBox Country Code 442116 | | | 0..1 442118 | CountryCode 442120 |
| | | | | | | | POBox Country Name 442122 | | | 0..1 442124 | MEDIUM_Name 442126 |

FIG. 44-106

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBox Region Code 442128 | | | 0..1 442130 | RegionCode 442132 |
| | | | | | | | POBox Region Name 442134 | | | 0..1 442136 | LANGUAGEINDEPENDENT_MEDIUM_Name 442138 |
| | | | | | | | POBox CityName 442140 | | | 0..1 442142 | LANGUAGEINDEPENDENT_MEDIUM_Name 442144 |

FIG. 44-107

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 442146 | | | 0..1 442148 | StreetName 442150 |
| | | | | | | | StreetPrefixName 442152 | | | 0..N 442154 | LANGUAGEINDEPENDENT_MEDIUM_Name 442156 |
| | | | | | | | StreetSuffixName 442158 | | | 0..N 442160 | LANGUAGEINDEPENDENT_MEDIUM_Name 442162 |
| | | | | | | | HouseID 442164 | | | 0..1 442166 | HouseID 442168 |

FIG. 44-108

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 442170 | | | 0..1 442172 | HouseID 442174 |
| | | | | | | | BuildingID 442176 | | | 0..1 442178 | BuildingID 442180 |
| | | | | | | | FloorID 442182 | | | 0..1 442184 | FloorID 442186 |
| | | | | | | | RoomID 442188 | | | 0..1 442190 | RoomID 442192 |

FIG. 44-109

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CareOf Name 442194 | | | 0..1 442196 | LANGUAGEINDEPENDENT_MEDIUM_Name 442198 |
| | | | | | | | Description 442200 | | | 0..N 442202 | Description 442204 |
| | | | | | | TaxJurisdictionCode 442206 | | | | 0..1 442208 | TaxJurisdictionCode 442210 |

FIG. 44-110

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | TimeZoneDifferenceValue 442212 | | | | 0..1 442214 | TimeZoneDifferenceValue 442216 |
| | | | | | | | | | | | | GeoCoordinates 442218 | | | | 0..1 442220 | GeoCoordinates 442222 |
| | | | | | | | | | | | | Communication 442226 | | | | 0..1 442228 | Communication 442230 |

FIG. 44-111

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 442232 | | | 0..1 442234 | LanguageCode 442236 |
| | | | | | | | CorrespondenceLanguageName 442238 | | | 0..1 442240 | MEDIUM_Name 442242 |
| | | | | | | | Telephone 442244 | | | 0..N 442246 | Telephone 442248 |

FIG. 44-112

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 442250 | | 1 442252 | PhoneNumber 442254 |
| | | | | | | | | SMSEnabledIndicator 442256 | | 0..1 442258 | Indicator 442260 |
| | | | | | | | | NumberDefaultIndicator 442262 | | 1 442264 | Indicator 442266 |
| | | | | | | | | NumberDescription 442268 | | 0..N 442270 | Description 442272 |

FIG. 44-113

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 442274 | | 1 442276 | Indicator 442278 |
| | | | | | | | MobilePhone 442280 | | | 0..N 442282 | Telephone 442284 |
| | | | | | | | | Number 442286 | | 1 442288 | PhoneNumber 442290 |
| | | | | | | | | SMSEnabledIndicator 442292 | | 0..1 442294 | Indicator 442296 |

FIG. 44-114

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | NumberDefaultIndicator 442298 | | 1 442300 | Indicator 442302 |
| | | | | | | | | | | | | | | NumberDescription 442304 | | 0..N 442306 | Description 442308 |
| | | | | | | | | | | | | | | NumberUsageDenialIndicator 442310 | | 1 442312 | Indicator 442314 |

FIG. 44-115

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Facsimile 442316 | | | 0..N 442318 | Facsimile 442320 |
| | | | | | | | | Number 442322 | | 1 442324 | PhoneNumber 442326 |
| | | | | | | | | NumberDefaultIndicator 442328 | | 1 442330 | Indicator 442332 |
| | | | | | | | | NumberDescription 442334 | | 0..N 442336 | Description 442338 |

FIG. 44-116

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 442340 | | 1 442342 | Indicator 442344 |
| | | | | | | | Email 442346 | | | 0..N 442348 | Email 442350 |
| | | | | | | | | URI 442352 | | 1 442354 | EmailURI 442356 |
| | | | | | | | | URIDefaultIndicator 442358 | | 1 442360 | Indicator 442362 |

FIG. 44-117

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIDescription 442364 | | 0..N 442366 | Description 442368 |
| | | | | | | | | URIUsageDenialIndicator 442370 | | 1 442372 | Indicator 442374 |
| | | | | | | | Web 442376 | | | 0..N 442378 | Web 442380 |
| | | | | | | | | URI 442382 | | 1 442384 | WebURI 442386 |

FIG. 44-118

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | URIDefaultIndicator 442388 | | 1 442390 | Indicator 442392 |
| | | | | | | | | | | | | | | URIDescription 442394 | | 0..N 442396 | Description 442398 |
| | | | | | | | | | | | PostalRegulationsCompliantStreetDescription 442400 | | | | | 0..1 442402 | LANGUAGEINDEPENDENT_MEDIUM_Description 442404 |

FIG. 44-119

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | Identification 442406 | | | | | | Identification 442408 | | | | | 0..N 442410 | ExportDeclarationProcessingConfirmationItemPartyIdentification 442412 |
| | | | | | | | | | | | PartyIdentifierTypeCode 442414 | | | | 0..1 442416 | PartyIdentifierTypeCode 442418 |
| | | | | | | | | | | | PartyID 442420 | | | | 0..1 442422 | NOALPHANUMERICCONVERSION_PartyID 442424 |

FIG. 44-120

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | Contact Party 442426 | | | | | | Contact Party 442428 | | | | | 0..1 442430 | ExportDeclarationProcessingConfirmationItemPartyContactParty 442432 |
| | | | | | | | | | | | Address 442434 | | | | 0..1 442436 | Address 442438 |
| | | | | | | | | | | | | OrganisationFormOfAddress 442440 | | | 0..1 442442 | FormOfAddress 442444 |

FIG. 44-121

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | OrganisationFormattedName 442446 | | | 0..N 442448 | LANGUAGEINDEPENDENT_MEDIUM_Name 442450 |
| | | | | | | | PersonName 442452 | | | 0..1 442454 | PersonName 442456 |
| | | | | | | | FunctionalTitleName 442458 | | | 0..1 442460 | LANGUAGEINDEPENDENT_MEDIUM_Name 442462 |

FIG. 44-122

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | DepartmentName 442464 | | | 0..1 442466 | LANGUAGEINDEPENDENT_MEDIUM_Name 442468 |
| | | | | | | Address 442470 | | | | | | | Office 442472 | | | 0..1 442474 | Office 442476 |
| | | | | | | | | | | | | | PhysicalAddress 442480 | | | 0..1 442482 | PhysicalAddress 442484 |
| | | | | | | | | | | | | | | Country Code 442486 | | 0..1 442488 | CountryCode 442490 |

FIG. 44-123

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Country Name 442492 | | 0..1 442494 | MEDIUM_Name 442496 |
| | | | | | | | | Region Code 442498 | | 0..1 442500 | RegionCode 442502 |
| | | | | | | | | Region Name 442504 | | 0..1 442506 | LANGUAGEINDEPENDENT_MEDIUM_Name 442508 |
| | | | | | | | | StreetPostalCode 442510 | | 0..1 442512 | PostalCode 442514 |

FIG. 44-124

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBoxPostalCode 442516 | | 0..1 442518 | PostalCode 442520 |
| | | | | | | | | CompanyPostalCode 442522 | | 0..1 442524 | PostalCode 442526 |
| | | | | | | | | CityName 442528 | | 0..1 442530 | LANGUAGEINDEPENDENT_MEDIUM_Name 442532 |

FIG. 44-125

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | AdditionalCityName 442534 | | 0..1 442536 | LANGUAGEINDEPENDENT_MEDIUM_Name 442538 |
| | | | | | | | | | | | | | | District Name 442540 | | 0..1 442542 | LANGUAGEINDEPENDENT_MEDIUM_Name 442544 |
| | | | | | | | | | | | | | | POBoxID 442546 | | 0..1 442548 | POBoxID 442550 |

FIG. 44-126

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBoxIndicator 442552 | | 0..1 442554 | Indicator 442556 |
| | | | | | | | | POBox Country Code 442558 | | 0..1 442560 | CountryCode 442562 |
| | | | | | | | | POBox Country Name 442564 | | 0..1 442566 | MEDIUM_Name 442568 |

FIG. 44-127

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBox Region Code 442570 | | 0..1 442572 | RegionCode 442574 |
| | | | | | | | | POBox Region Name 442576 | | 0..1 442578 | LANGUAGEINDEPENDENT_MEDIUM_Name 442580 |
| | | | | | | | | POBox CityName 442582 | | 0..1 442584 | LANGUAGEINDEPENDENT_MEDIUM_Name 442586 |

FIG. 44-128

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | StreetName 442588 | | 0..1 442590 | StreetName 442592 |
| | | | | | | | | StreetPrefixName 442594 | | 0..N 442596 | LANGUAGEINDEPENDENT_MEDIUM_Name 442598 |
| | | | | | | | | StreetSuffixName 442600 | | 0..N 442602 | LANGUAGEINDEPENDENT_MEDIUM_Name 442604 |
| | | | | | | | | HouseID 442606 | | 0..1 442608 | HouseID 442610 |

FIG. 44-129

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | AdditionalHouseID 442612 | | 0..1 442614 | HouseID 442616 |
| | | | | | | | | BuildingID 442618 | | 0..1 442620 | BuildingID 442622 |
| | | | | | | | | FloorID 442624 | | 0..1 442626 | FloorID 442628 |
| | | | | | | | | RoomID 442630 | | 0..1 442632 | RoomID 442634 |

FIG. 44-130

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | CareOf Name 442636 | | 0..1 442638 | LANGUAGEINDEPENDENT_MEDIUM_Name 442640 |
| | | | | | | | | Description 442642 | | 0..N 442644 | Description 442646 |
| | | | | | | | TaxJurisdiction Code 442648 | | | 0..1 442650 | TaxJurisdictionCode 442652 |

FIG. 44-131

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TimeZoneDifferenceValue 442654 | | | 0..1 442656 | TimeZoneDifferenceValue 442658 |
| | | | | | | | GeoCoordinates 442660 | | | 0..1 442662 | GeoCoordinates 442664 |
| | | | | | | | Communication 442668 | | | 0..1 442670 | Communication 442672 |

FIG. 44-132

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | CorrespondenceLanguageCode 442674 | | 0..1 442676 | LanguageCode 442678 |
| | | | | | | | | CorrespondenceLanguageName 442680 | | 0..1 442682 | MEDIUM_Name 442684 |
| | | | | | | | | Telephone 442686 | | 0..N 442688 | Telephone 442690 |

FIG. 44-133

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | Number 442692 | 1 442694 | PhoneNumber 442696 |
| | | | | | | | | | SMSEnabledIndicator 442698 | 0..1 442700 | Indicator 442702 |
| | | | | | | | | | NumberDefaultIndicator 442704 | 1 442706 | Indicator 442708 |
| | | | | | | | | | NumberDescription 442710 | 0..N 442712 | Description 442714 |

FIG. 44-134

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | NumberUsageDenialIndicator 442716 | 1 442718 | Indicator 442720 |
| | | | | | | | | MobilePhone 442722 | | 0..N 442724 | Telephone 442726 |
| | | | | | | | | | Number 442728 | 1 442730 | PhoneNumber 442732 |
| | | | | | | | | | SMSEnabledIndicator 442734 | 0..1 442736 | Indicator 442738 |

FIG. 44-135

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | NumberDefaultIndicator 442740 | 1 442742 | Indicator 442744 |
| | | | | | | | | | NumberDescription 442746 | 0..N 442748 | Description 442750 |
| | | | | | | | | | NumberUsageDenialIndicator 442752 | 1 442754 | Indicator 442756 |

FIG. 44-136

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Facsimile 442758 | | 0..N 442760 | Facsimile 442762 |
| | | | | | | | | | Number 442764 | 1 442766 | PhoneNumber 442768 |
| | | | | | | | | | NumberDefaultIndicator 442770 | 1 442772 | Indicator 442774 |
| | | | | | | | | | NumberDescription 442776 | 0..N 442778 | Description 442780 |

FIG. 44-137

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | NumberUsageDenialIndicator 442782 | 1 442784 | Indicator 442786 |
| | | | | | | | | Email 442788 | | 0..N 442790 | Email 442792 |
| | | | | | | | | | URI 442794 | 1 442796 | EmailURI 442798 |
| | | | | | | | | | URIDefaultIndicator 442800 | 1 442802 | Indicator 442804 |

FIG. 44-138

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | URIDescription 442806 | 0..N 442808 | Description 442810 |
| | | | | | | | | | URIUsageDenialIndicator 442812 | 1 442814 | Indicator 442816 |
| | | | | | | | | Web 442818 | | 0..N 442820 | Web 442822 |
| | | | | | | | | | URI 442824 | 1 442826 | WebURI 442828 |

FIG. 44-139

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | URIDefaultIndicator 442830 | 1 442832 | Indicator 442834 |
| | | | | | | | | | URIDescription 442836 | 0..N 442838 | Description 442840 |
| | | | | | | BusinessPartnerFormattedName 442842 | | | | 0..1 442844 | LANGUAGEINDEPENDENT_EXTENDED_Name 442846 |

FIG. 44-140

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FormattedConventionalPhoneNumberDescription 442848 | | | | 0..1 442850 | LANGUAGEINDEPENDENT_SHORT_Description 442852 |
| | | | | | | FormattedFacsimileNumberDescription 442854 | | | | 0..1 442856 | LANGUAGEINDEPENDENT_SHORT_Description 442858 |

FIG. 44-141

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Package 442860 | | | | | Package 442862 | | | | | | 0..N 442864 | ExportDeclarationProcessingConfirmationItemPackage 442866 |
| | | | | | | | | | OrdinalNumberValue 442868 | | | | | 0..1 442870 | OrdinalNumberValue 442872 |
| | | | | | | | | | ElementNumberValue 442874 | | | | | 0..1 442876 | NumberValue 442878 |

FIG. 44-142

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | ExportPackageTypeCode 442880 | | | | | 0..1 442882 | ExportPackageTypeCode 442884 |
| | | | | | | | | | | PackageExportID 442886 | | | | | 0..1 442888 | PackageExportID 442890 |
| | | | Container 442892 | | | | | | Container 442894 | | | | | | 0..N 442896 | ExportDeclarationProcessingConfirmationItemContainer 442898 |

FIG. 44-143

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | ContainerExportID 442900 | | | | | 0..1 442902 | ContainerExportID 442904 |
| | | | SupportingDocument 442906 | | | | | SupportingDocument 442908 | | | | | | 0..N 442910 | ExportDeclarationProcessingConfirmationItemSupportingDocument 442912 |
| | | | | | | | | | ExportSupportingDocumentTypeCode 442914 | | | | | 0..1 442916 | ExportSupportingDocumentTypeCode 442918 |

FIG. 44-144

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ExportSupportingDocumentID 442920 | | | | | 0..1 442922 | ExportSupportingDocumentID 442924 |
| | | | | | ExportSupportingDocumentAddendumID 442926 | | | | | 0..1 442928 | ExportSupportingDocumentAddendumID 442930 |

FIG. 44-145

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ExportSupportingDocumentDetailID 442932 | | | | | 0..1 442934 | ExportSupportingDocumentDetailID 442936 |
| | | | | | IssueDate 442938 | | | | | 0..1 442940 | Date 442942 |
| | | | | | ValidityEndDate 442944 | | | | | 0..1 442946 | Date 442948 |

FIG. 44-146

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | LicenceWriteOffAmount 442950 | | | | | 0..1 442952 | Amount 442954 |
| | | | | | LicenceWriteOffQuantity 442956 | | | | | 0..1 442958 | Quantity 442960 |
| | | | | | LicenceWriteOffQuantityTypeCode 442962 | | | | | 0..1 442964 | QuantityTypeCode 442966 |

FIG. 44-147

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | PreviousDocument 442968 | | | | | PreviousDocument 442970 | | | | | | 0..N 442972 | ExportDeclarationProcessingConfirmationItemPreviousDocument 442974 |
| | | | | | | | | | ExportPreviousDocumentTypeCode 442976 | | | | | 0..1 442978 | ExportPreviousDocumentTypeCode 442980 |

FIG. 44-148

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ExportPreviousDocumentID 442982 | | | | | 0..1 442984 | ExportPreviousDocumentID 442986 |
| | | | | | ExportPreviousDocumentDescription 442988 | | | | | 0..1 442990 | LANGUAGEINDEPENDENT_MEDIUM_Description 442992 |

FIG. 44-149

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | CustomsWarehouseDischarge 442994 | | | | | CustomsWarehouseDischarge 442996 | | | | | | 0..1 442998 | ExportDeclarationProcessingConfirmationItemCustomsWarehouseDischarge 443000 |
| | | | | | | | | | ClosingPortionTotalNumberValue 443002 | | | | | 0..1 443004 | NumberValue 443006 |

FIG. 44-150

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | CustomsAuthorisationID 443008 | | | | | 0..1 443010 | CustomsAuthorisationID 443012 |
| | | | | | ClosingPortion 443014 | | | | | 0..N 443016 | ExportDeclarationProcessingConfirmationItemCustomsWarehouseDischargeClosingPortio 443018 |

FIG. 44-151

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrdinalNumberValue 443020 | | | | 0..1 443022 | OrdinalNumberValue 443024 |
| | | | | | | CustomsProcessCustomsAuthorityID 443026 | | | | 0..1 443028 | CustomsProcessID 443030 |

FIG. 44-152

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CustomsDeclarationItemCustomsAuthorityID 443032 | | | | 0..1 443034 | CustomsDeclarationItemCustomsAuthorityID 443036 |
| | | | | | | CustomsCommodityClassificationCode 443038 | | | | 0..1 443040 | CustomsCommodityClassificationCode 443042 |

FIG. 44-153

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | UsualFormsOfHandlingAppliedIndicator 443044 | | | | 0..1 443046 | Indicator 443048 |
| | | | | | | ElectronicallyReportedIndicator 443050 | | | | 0..1 443052 | Indicator 443054 |
| | | | | | | Description 443056 | | | | 0..1 443058 | Description 443060 |

FIG. 44-154

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | | OriginalQuantity 443062 | | | | 0..1 443064 | Quantity 443066 |
| | | | | | | | | | | OriginalQuantityTypeCode 443068 | | | | 0..1 443070 | QuantityTypeCode 443072 |
| | | | | | | | | | | Quantity 443074 | | | | 0..1 443076 | Quantity 443078 |
| | | | | | | | | | | QuantityTypeCode 443080 | | | | 0..1 443082 | QuantityTypeCode 443084 |

FIG. 44-155

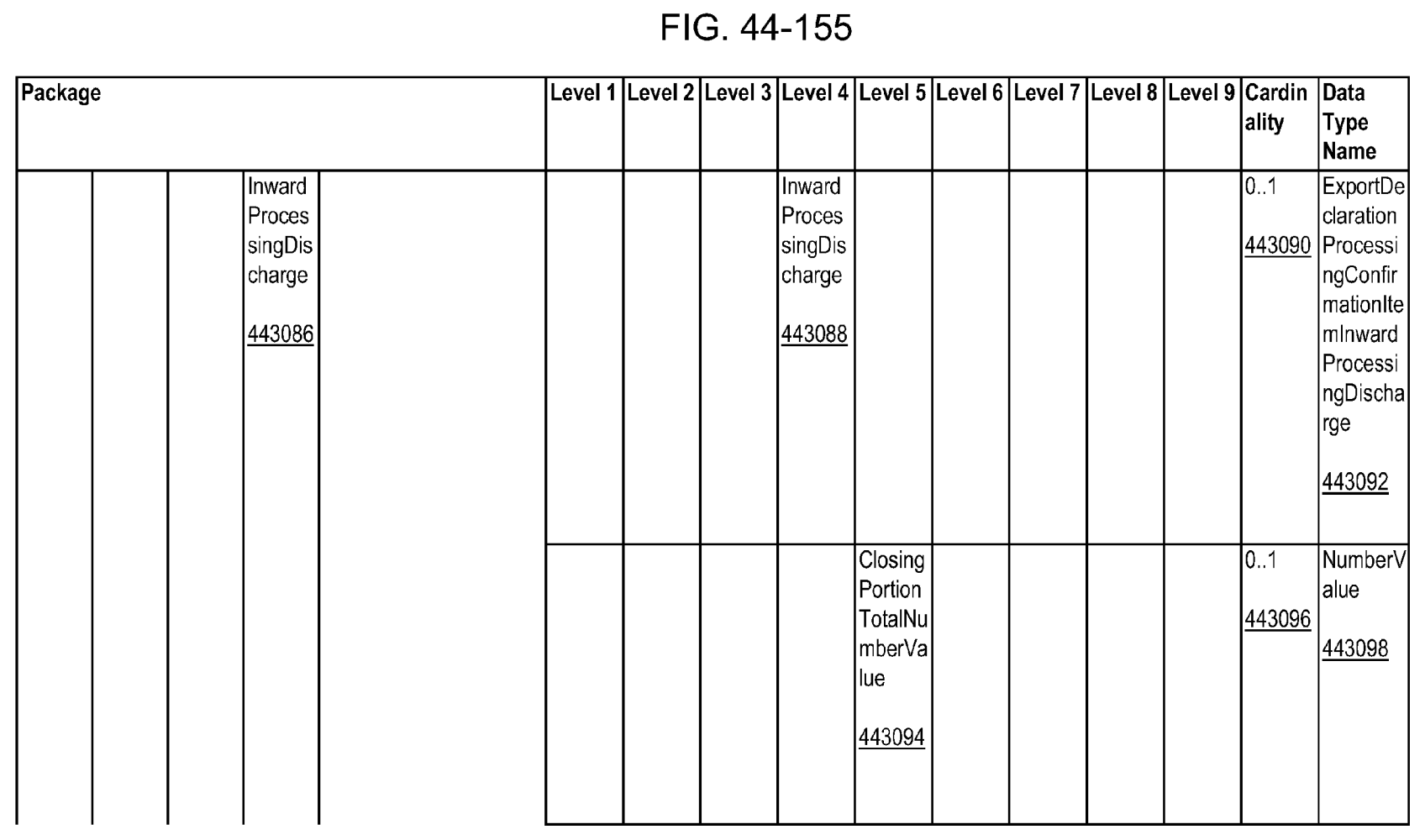

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | InwardProcessingDischarge 443086 | | | | | InwardProcessingDischarge 443088 | | | | | | 0..1 443090 | ExportDeclarationProcessingConfirmationItemInwardProcessingDischarge 443092 |
| | | | | | | | | | ClosingPortionTotalNumberValue 443094 | | | | | 0..1 443096 | NumberValue 443098 |

FIG. 44-156

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | CustomsAuthorisationID 443100 | | | | | 0..1 443102 | CustomsAuthorisationID 443104 |
| | | | | ItemInwardProcessingClosingPortion 443106 | | | | | | ClosingPortion 443108 | | | | | 0..N 443110 | ExportDeclarationProcessingConfirmationItemInwardProcessingDischargeClosingPortio 443112 |

FIG. 44-157

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrdinalNumberValue 443114 | | | | 0..1 443116 | OrdinalNumberValue 443118 |
| | | | | | | CustomsProcessCustomsAuthorityID 443120 | | | | 0..1 443122 | CustomsProcessID 443124 |

FIG. 44-158

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CustomsDeclarationItemCustomsAuthorityID 443126 | | | | 0..1 443128 | CustomsDeclarationItemCustomsAuthorityID 443130 |
| | | | | | | ElectronicallyReportedIndicator 443132 | | | | 0..1 443134 | Indicator 443136 |
| | | | | | | Description 443138 | | | | 0..1 443140 | Description 443142 |

FIG. 45-1

| Package | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|
| ExportDeclarationProcessingRequest 450000 | | ExportDeclarationProcessingRequest 450002 | | | | | | | | | | ExportDeclarationProcessingRequestMessage 450004 |
| | MessageHeader 450006 | | MessageHeader 450008 | | | | | | | | 1 450010 | BusinessDocumentMessageHeader 450012 |
| | | | | ID 450014 | | | | | | | 0..1 450016 | BusinessDocumentMessageID 450018 |
| | | | | UUID 450020 | | | | | | | 0..1 450022 | UUID 450024 |

FIG. 45-2

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ReferenceID 450026 | | | | | | | 0..1 450028 | BusinessDocumentMessageID 450030 |
| | | | ReferenceUUID 450032 | | | | | | | 0..1 450034 | UUID 450036 |
| | | | CreationDateTime 450038 | | | | | | | 1 450040 | GLOBAL_DateTime 450042 |
| | | | TestDataIndicator 450044 | | | | | | | 0..1 450046 | Indicator 450048 |

FIG. 45-3

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ReconciliationIndicator 450050 | | | | | | | 0..1 450052 | Indicator 450054 |
| | | | SenderBusinessSystemID 450056 | | | | | | | 0..1 450058 | BusinessSystemID 450060 |
| | | | RecipientBusinessSystemID 450062 | | | | | | | 0..1 450064 | BusinessSystemID 450066 |

FIG. 45-4

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Party 450068 | | | | Sender Party 450070 | | | | | | | 0..1 450072 | BusinessDocumentMessageHeaderParty 450074 |
| | | | | | | | Internal ID 450076 | | | | | | 0..1 450078 | PartyInternalID 450080 |
| | | | | | | | StandardID 450082 | | | | | | 0..N 450084 | PartyStandardID 450086 |
| | | | | | | | Contact Person 450088 | | | | | | 0..1 450090 | BusinessDocumentMessageHeaderPartyContactPerson 450092 |

FIG. 45-5

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | InternalID 450094 | | | | | 0..1 450096 | ContactPersonInternalID 450098 |
| | | | | | OrganisationFormattedName 450100 | | | | | 0..N 450102 | LANGUAGEINDEPENDENT_MEDIUM_Name 450104 |
| | | | | | PersonFormattedName 450106 | | | | | 0..N 450108 | LANGUAGEINDEPENDENT_LONG_Name 450110 |
| | | | | | PhoneNumber 450114 | | | | | 0..N 450116 | PhoneNumber 450118 |

FIG. 45-6

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | FaxNumber 450122 | | | | | 0..N 450124 | PhoneNumber 450126 |
| | | | | | EmailURI 450128 | | | | | 0..N 450130 | EmailURI 450132 |
| | | | RecipientParty 450136 | | | | | | | 0..N 450138 | BusinessDocumentMessageHeaderParty 450140 |
| | | | | InternalID 450142 | | | | | | 0..1 450144 | PartyInternalID 450146 |
| | | | | StandardID 450148 | | | | | | 0..N 450150 | PartyStandardID 450152 |

FIG. 45-7

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ContactPerson 450154 | | | | | | 0..1 450156 | BusinessDocumentMessageHeaderPartyContactPerson 450158 |
| | | | | | InternalID 450160 | | | | | 0..1 450162 | ContactPersonInternalID 450164 |
| | | | | | OrganisationFormattedName 450166 | | | | | 0..N 450168 | LANGUAGEINDEPENDENT_MEDIUM_Name 450170 |

FIG. 45-8

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PersonFormattedName 450172 | | | | | 0..N 450174 | LANGUAGEINDEPENDENT_LONG_Name 450176 |
| | | | | | PhoneNumber 450180 | | | | | 0..N 450182 | PhoneNumber 450184 |
| | | | | | FaxNumber 450188 | | | | | 0..N 450190 | PhoneNumber 450192 |
| | | | | | EmailURI 450194 | | | | | 0..N 450196 | EmailURI 450198 |

FIG. 45-9

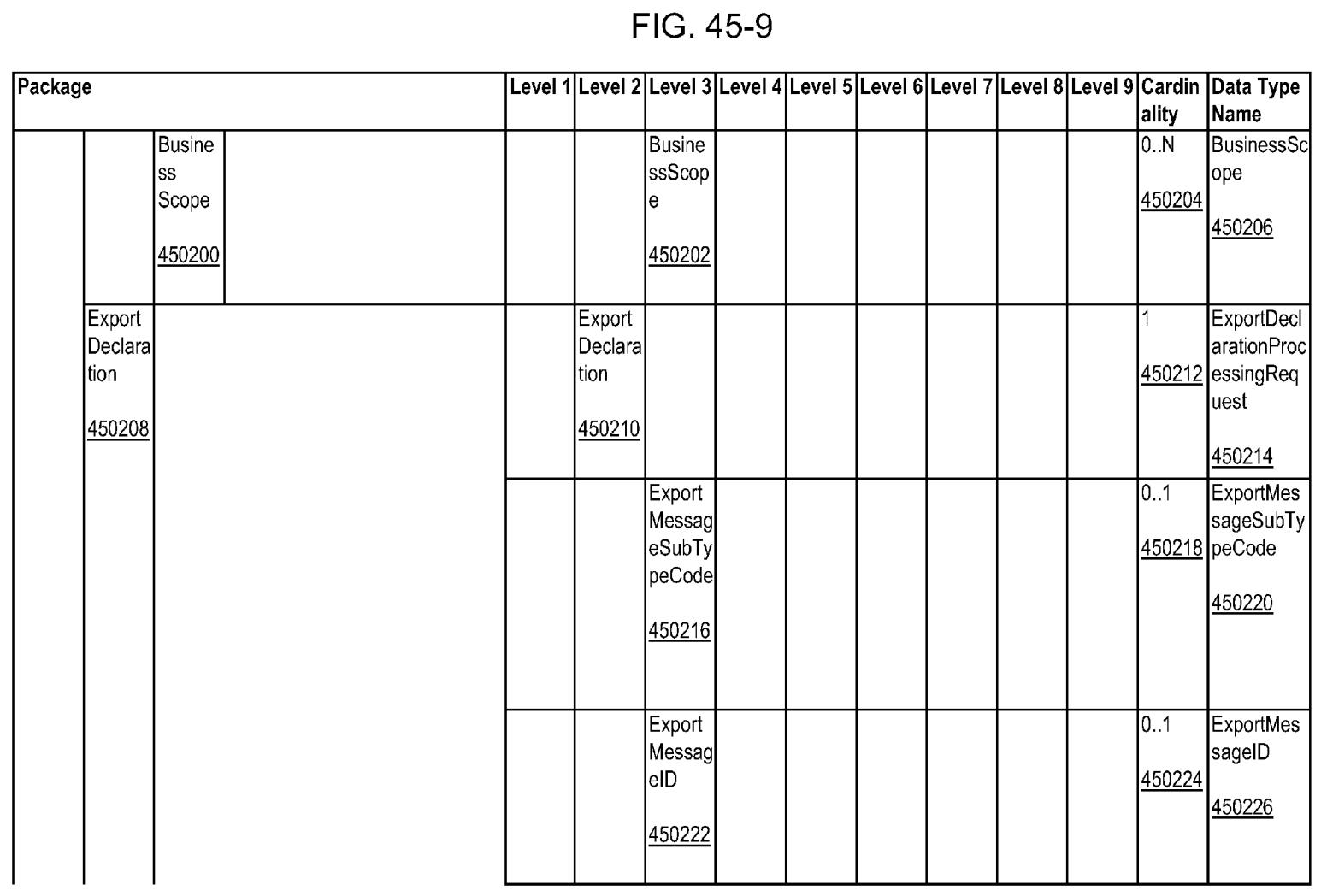

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Business Scope 450200 | | | | BusinessScope 450202 | | | | | | | 0..N 450204 | BusinessScope 450206 |
| | Export Declaration 450208 | | | | Export Declaration 450210 | | | | | | | | 1 450212 | ExportDeclarationProcessingRequest 450214 |
| | | | | | | Export MessageSubTypeCode 450216 | | | | | | | 0..1 450218 | ExportMessageSubTypeCode 450220 |
| | | | | | | Export MessageID 450222 | | | | | | | 0..1 450224 | ExportMessageID 450226 |

FIG. 45-10

| Package | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|
| | | | | | ExportMessageReferenceID 450228 | | | | | | | 0..N 450230 | ExportMessageID 450232 |
| | | | | | CustomsAuthorityCountryCode 450234 | | | | | | | 0..1 450236 | CountryCode 450238 |
| | | | | | MajorVersionCustomsAuthorityID 450240 | | | | | | | 0..1 450242 | VersionPartyID 450244 |

FIG. 45-11

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | MinorVersionCustomsAuthorityID 450246 | | | | | | | 0..1 450248 | VersionPartyID 450250 |
| | | | MainTestCaseID 450252 | | | | | | | 0..1 450254 | TestCaseID 450256 |
| | | | SubTestCaseID 450258 | | | | | | | 0..1 450260 | TestCaseID 450262 |

FIG. 45-12

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | CustomsMessageExchangeServerFileID 450264 | | | | | | | 0..1 450266 | CustomsMessageExchangeServerFileID 450268 |
| | | | CustomsProcessID 450270 | | | | | | | 0..1 450272 | CustomsProcessID 450274 |
| | | | CustomsProcessPartyID 450276 | | | | | | | 0..1 450278 | CustomsProcessID 450280 |

FIG. 45-13

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | CustomsProcessCustomsAuthorityID 450282 | | | | | | | 0..1 450284 | CustomsProcessID 450286 |
| | | | ExportDeclarationTypeCode 450288 | | | | | | | 0..1 450290 | ExportDeclarationTypeCode 450292 |
| | | | ExportTypeCode 450294 | | | | | | | 0..1 450296 | ExportTypeCode 450298 |

FIG. 45-14

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | Export ExportingCountryCode 450300 | | | | | | | 0..1 450302 | ExportExportingCountryCode 450304 |
| | | | Export DestinationCountryCode 450306 | | | | | | | 0..1 450308 | ExportDestinationCountryCode 450310 |
| | | | Export Special Circumstances Code 450312 | | | | | | | 0..1 450314 | ExportSpecialCircumstancesCode 450316 |

FIG. 45-15

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportTransportCostPaymentFormCode 450318 | | | | | | | 0..1 450320 | ExportTransportCostPaymentFormCode 450322 |
| | | | ContainerUsedIndicator 450324 | | | | | | | 0..1 450326 | Indicator 450328 |
| | | | ExportPartyRepresentationCode 450330 | | | | | | | 0..1 450332 | ExportPartyRepresentationCode 450334 |

FIG. 45-16

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ItemTotalNumberValue 450336 | | | | | | | 0..1 450338 | NumberValue 450340 |
| | | | TotalGrossWeightQuantity 450342 | | | | | | | 0..1 450344 | Quantity 450346 |
| | | | TotalGrossWeightQuantityTypeCode 450348 | | | | | | | 0..1 450350 | QuantityTypeCode 450352 |

FIG. 45-17

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ConsignmentExportID 450354 | | | | | | | 0..1 450356 | ConsignmentExportID 450358 |
| | | | InlandExportTransportModeCode 450360 | | | | | | | 0..1 450362 | ExportTransportModeCode 450364 |
| | | | CrossBorderExportTransportModeCode 450366 | | | | | | | 0..1 450368 | ExportTransportModeCode 450370 |

FIG. 45-18

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | CrossBorderExportTransportMeansTypeCode 450372 | | | | | | | 0..1 450374 | ExportTransportMeansTypeCode 450376 |
| | | | | | | CrossBorderTransportMeansID 450378 | | | | | | | 0..1 450380 | TransportMeansID_V2 450382 |

FIG. 45-19

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportCrossBorderTransportMeansNationalityCode 450384 | | | | | | | 0..1 450386 | ExportCrossBorderTransportMeansNationalityCode 450388 |
| | | | ExportBusinessTransactionTypeCode 450390 | | | | | | | 0..1 450392 | ExportBusinessTransactionTypeCode 450394 |

FIG. 45-20

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | InvoiceTotalNetAmount 450396 | | | | | | | 0..1 450398 | Amount 450400 |
| | | | | | | ExportIncotermsClassificationCode 450402 | | | | | | | 0..1 450404 | ExportIncotermsClassificationCode 450406 |
| | | | | | | ExportIncotermsClassificationDescription 450408 | | | | | | | 0..1 450410 | LANGUAGEINDEPENDENT_LONG_Description 450412 |

FIG. 45-21

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | ExportIncotermsTransferLocationName 450414 | | | | | | | 0..1 450416 | LANGUAGEINDEPENDENT_EXTENDED_Name 450418 |
| | | | | | | CustomsAuthenticationID 450420 | | | | | | | 0..1 450422 | CustomsAuthenticationID 450424 |
| | | CustomsAuthorisation 450426 | | | | CustomsAuthorisation 450428 | | | | | | | 0..N 450430 | ExportDeclarationProcessingRequestCustomsAuthorisation 450432 |

FIG. 45-22

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | CustomsAuthorisationTypeCode 450434 | | | | | | 0..1 450436 | CustomsAuthorisationTypeCode 450438 |
| | | | | | | | | CustomsAuthorisationID 450440 | | | | | | 0..1 450442 | CustomsAuthorisationID 450444 |
| | | TimePoint 450446 | | | | | TimePoint 450448 | | | | | | | 0..N 450450 | ExportDeclarationProcessingRequestTimePoint 450452 |

FIG. 45-23

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | TimePointRoleCode 450454 | | | | | | 0..1 450456 | TimePointRoleCode 450458 |
| | | | | | | | | DateTime 450460 | | | | | | 0..1 450462 | GLOBAL_DateTime 450464 |
| | | | | | | | | Date 450466 | | | | | | 0..1 450468 | Date 450470 |
| | | | BasicText 450472 | | | | BasicText 450474 | | | | | | | 0..N 450476 | TextCollectionBasicText 450478 |
| | | | | | | | | TypeCode 450480 | | | | | | 0..1 450482 | TextCollectionTextTypeCode 450484 |

FIG. 45-24

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | ContentText 450486 | | | | | | 1 450488 | Text 450490 |
| | | Location 450492 | | | | | Location 450494 | | | | | | | 0..N 450496 | ExportDeclarationProcessingRequestLocation 450498 |
| | | | | | | | | LocationRoleCategoryCode 450500 | | | | | | 0..1 450502 | LocationRoleCategoryCode 450504 |
| | | | | | | | | CustomsAuthorityID 450506 | | | | | | 0..1 450508 | CustomsAuthorityID 450510 |

FIG. 45-25

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Address 450512 | | | | | | 0..1 450514 | Address 450516 |
| | | | | | OrganisationFormOfAddress 450518 | | | | | 0..1 450520 | FormOfAddress 450522 |
| | | | | | OrganisationFormattedName 450524 | | | | | 0..N 450526 | LANGUAGEINDEPENDENT_MEDIUM_Name 450528 |
| | | | | | PersonName 450530 | | | | | 0..1 450532 | PersonName 450534 |

FIG. 45-26

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | FunctionalTitleName 450536 | | | | | 0..1 450538 | LANGUAGEINDEPENDENT_MEDIUM_Name 450540 |
| | | | | | | | | | | DepartmentName 450542 | | | | | 0..1 450544 | LANGUAGEINDEPENDENT_MEDIUM_Name 450546 |
| | | | | Address 450548 | | | | | | Office 450550 | | | | | 0..1 450552 | Office 450554 |
| | | | | | | | | | | PhysicalAddress 450558 | | | | | 0..1 450560 | PhysicalAddress 450562 |

FIG. 45-27

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Country Code 450564 | | | | 0..1 450566 | CountryCode 450568 |
| | | | | | | Country Name 450570 | | | | 0..1 450572 | MEDIUM_Name 450574 |
| | | | | | | Region Code 450576 | | | | 0..1 450578 | RegionCode 450580 |
| | | | | | | Region Name 450582 | | | | 0..1 450584 | LANGUAGEINDEPENDENT_MEDIUM_Name 450586 |

FIG. 45-28

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetPostalCode 450588 | | | | 0..1 450590 | PostalCode 450592 |
| | | | | | | POBoxPostalCode 450594 | | | | 0..1 450596 | PostalCode 450598 |
| | | | | | | CompanyPostalCode 450600 | | | | 0..1 450602 | PostalCode 450604 |
| | | | | | | CityName 450606 | | | | 0..1 450608 | LANGUAGEINDEPENDENT_MEDIUM_Name 450610 |

FIG. 45-29

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalCityName 450612 | | | | 0..1 450614 | LANGUAGEINDEPENDENT_MEDIUM_Name 450616 |
| | | | | | | DistrictName 450618 | | | | 0..1 450620 | LANGUAGEINDEPENDENT_MEDIUM_Name 450622 |
| | | | | | | POBoxID 450624 | | | | 0..1 450626 | POBoxID 450628 |
| | | | | | | POBoxIndicator 450630 | | | | 0..1 450632 | Indicator 450634 |

FIG. 45-30

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Country Code 450636 | | | | 0..1 450638 | CountryCode 450640 |
| | | | | | | POBox Country Name 450642 | | | | 0..1 450644 | MEDIUM_Name 450646 |
| | | | | | | POBox Region Code 450648 | | | | 0..1 450650 | RegionCode 450652 |

FIG. 45-31

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Region Name 450654 | | | | 0..1 450656 | LANGUAGEINDEPENDENT_MEDIUM_Name 450658 |
| | | | | | | POBox CityName 450660 | | | | 0..1 450662 | LANGUAGEINDEPENDENT_MEDIUM_Name 450664 |
| | | | | | | StreetName 450666 | | | | 0..1 450668 | StreetName 450670 |
| | | | | | | StreetPrefixName 450672 | | | | 0..N 450674 | LANGUAGEINDEPENDENT_MEDIUM_Name 450676 |

FIG. 45-32

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetSuffixName 450678 | | | | 0..N 450680 | LANGUAGEINDEPENDENT_MEDIUM_Name 450682 |
| | | | | | | HouseID 450684 | | | | 0..1 450686 | HouseID 450688 |
| | | | | | | AdditionalHouseID 450690 | | | | 0..1 450692 | HouseID 450694 |
| | | | | | | BuildingID 450696 | | | | 0..1 450698 | BuildingID 450700 |

FIG. 45-33

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FloorID 450702 | | | | 0..1 450704 | FloorID 450706 |
| | | | | | | RoomID 450708 | | | | 0..1 450710 | RoomID 450712 |
| | | | | | | CareOfName 450714 | | | | 0..1 450716 | LANGUAGEINDEPENDENT_MEDIUM_Name 450718 |
| | | | | | | Description 450720 | | | | 0..N 450722 | Description 450724 |

FIG. 45-34

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TaxJurisdictionCode 450726 | | | | | 0..1 450728 | TaxJurisdictionCode 450730 |
| | | | | | TimeZoneDifferenceValue 450732 | | | | | 0..1 450734 | TimeZoneDifferenceValue 450736 |
| | | | | | GeoCoordinates 450738 | | | | | 0..1 450740 | GeoCoordinates 450742 |
| | | | | | Communication 450746 | | | | | 0..1 450748 | Communication 450750 |

FIG. 45-35

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 450752 | | | | 0..1 450754 | LanguageCode 450756 |
| | | | | | | CorrespondenceLanguageName 450758 | | | | 0..1 450760 | MEDIUM_Name 450762 |
| | | | | | | Telephone 450764 | | | | 0..N 450766 | Telephone 450768 |

FIG. 45-36

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number 450770 | | | 1 450772 | PhoneNumber 450774 |
| | | | | | | | SMSEnabledIndicator 450776 | | | 0..1 450778 | Indicator 450780 |
| | | | | | | | NumberDefaultIndicator 450782 | | | 1 450784 | Indicator 450786 |
| | | | | | | | NumberDescription 450788 | | | 0..N 450790 | Description 450792 |

FIG. 45-37

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 450794 | | | 1 450796 | Indicator 450798 |
| | | | | | | MobilePhone 450800 | | | | 0..N 450802 | Telephone 450804 |
| | | | | | | | Number 450806 | | | 1 450808 | PhoneNumber 450810 |
| | | | | | | | SMSEnabledIndicator 450812 | | | 0..1 450814 | Indicator 450816 |

FIG. 45-38

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberDefaultIndicator 450818 | | | 1 450820 | Indicator 450822 |
| | | | | | | | NumberDescription 450824 | | | 0..N 450826 | Description 450828 |
| | | | | | | | NumberUsageDenialIndicator 450830 | | | 1 450832 | Indicator 450834 |
| | | | | | | Facsimile 450836 | | | | 0..N 450838 | Facsimile 450840 |

FIG. 45-39

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number 450842 | | | 1 450844 | PhoneNumber 450846 |
| | | | | | | | NumberDefaultIndicator 450848 | | | 1 450850 | Indicator 450852 |
| | | | | | | | NumberDescription 450854 | | | 0..N 450856 | Description 450858 |
| | | | | | | | NumberUsageDenialIndicator 450860 | | | 1 450862 | Indicator 450864 |

FIG. 45-40

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Email 450866 | | | | 0..N 450868 | Email 450870 |
| | | | | | | | URI 450872 | | | 1 450874 | EmailURI 450876 |
| | | | | | | | URIDefaultIndicator 450878 | | | 1 450880 | Indicator 450882 |
| | | | | | | | URIDescription 450884 | | | 0..N 450886 | Description 450888 |
| | | | | | | | URIUsageDenialIndicator 450890 | | | 1 450892 | Indicator 450894 |

FIG. 45-41

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Web 450896 | | | | 0..N 450898 | Web 450900 |
| | | | | | | | URI 450902 | | | 1 450904 | WebURI 450906 |
| | | | | | | | URIDefaultIndicator 450908 | | | 1 450910 | Indicator 450912 |
| | | | | | | | URIDescription 450914 | | | 0..N 450916 | Description 450918 |

FIG. 45-42

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | PostalRegulationsCompliantStreetDescription 450920 | | | | | | 0..1 450922 | LANGUAGEINDEPENDENT_MEDIUM_Description 450924 |
| | | CustomsOffice 450926 | | | | | | CustomsOffice 450928 | | | | | | | 0..N 450930 | ExportDeclarationProcessingRequestCustomsOffice 450932 |
| | | | | | | | | | RoleCategoryCode 450934 | | | | | | 0..1 450936 | PartyRoleCategoryCode 450938 |

FIG. 45-43

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Identification 450940 | | | | | Identification 450942 | | | | | | 0..N 450944 | ExportDeclarationProcessingRequestCustomsOfficeIdentification 450946 |
| | | | | | | | | | PartyIdentifierTypeCode 450948 | | | | | 0..1 450950 | PartyIdentifierTypeCode 450952 |
| | | | | | | | | | PartyID 450954 | | | | | 0..1 450956 | NOALPHANUMERICCONVERSION_PartyID 450958 |

FIG. 45-44

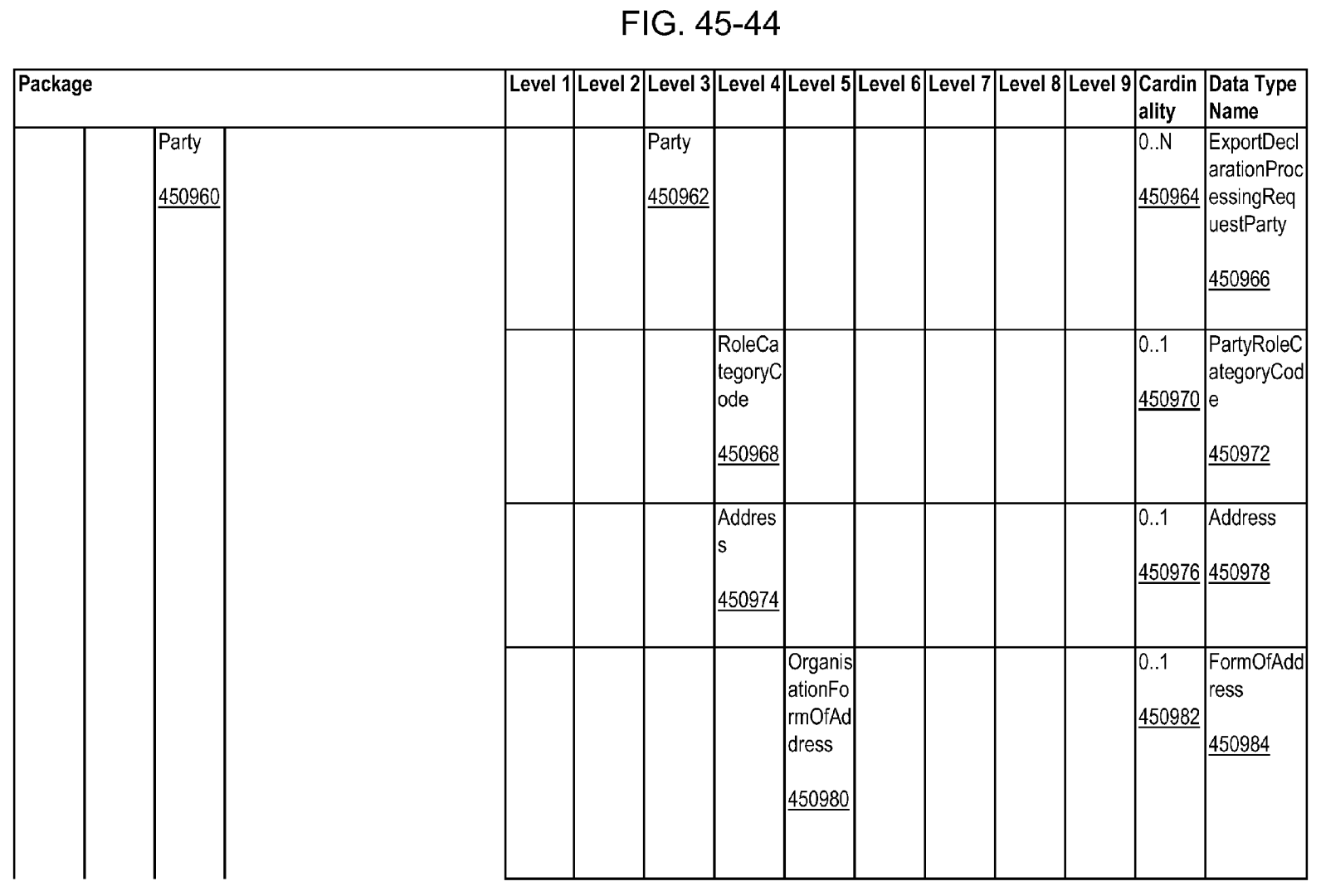

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Party 450960 | | | | Party 450962 | | | | | | | 0..N 450964 | ExportDeclarationProcessingRequestParty 450966 |
| | | | | | | | RoleCategoryCode 450968 | | | | | | 0..1 450970 | PartyRoleCategoryCode 450972 |
| | | | | | | | Address 450974 | | | | | | 0..1 450976 | Address 450978 |
| | | | | | | | | OrganisationFormOfAddress 450980 | | | | | 0..1 450982 | FormOfAddress 450984 |

FIG. 45-45

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormattedName 450986 | | | | | 0..N 450988 | LANGUAGEINDEPENDENT_MEDIUM_Name 450990 |
| | | | | | PersonName 450992 | | | | | 0..1 450994 | PersonName 450996 |
| | | | | | FunctionalTitleName 450998 | | | | | 0..1 451000 | LANGUAGEINDEPENDENT_MEDIUM_Name 451002 |

FIG. 45-46

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DepartmentName 451004 | | | | | 0..1 451006 | LANGUAGEINDEPENDENT_MEDIUM_Name 451008 |
| Address 451010 | | | | | Office 451012 | | | | | 0..1 451014 | Office 451016 |
| | | | | | PhysicalAddress 451020 | | | | | 0..1 451022 | PhysicalAddress 451024 |
| | | | | | | CountryCode 451026 | | | | 0..1 451028 | CountryCode 451030 |

FIG. 45-47

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Country Name 451032 | | | | 0..1 451034 | MEDIUM_Name 451036 |
| | | | | | | Region Code 451038 | | | | 0..1 451040 | RegionCode 451042 |
| | | | | | | Region Name 451044 | | | | 0..1 451046 | LANGUAGEINDEPENDENT_MEDIUM_Name 451048 |
| | | | | | | StreetPostalCode 451050 | | | | 0..1 451052 | PostalCode 451054 |

FIG. 45-48

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBoxPostalCode 451056 | | | | 0..1 451058 | PostalCode 451060 |
| | | | | | | CompanyPostalCode 451062 | | | | 0..1 451064 | PostalCode 451066 |
| | | | | | | CityName 451068 | | | | 0..1 451070 | LANGUAGEINDEPENDENT_MEDIUM_Name 451072 |

FIG. 45-49

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalCityName 451074 | | | | 0..1 451076 | LANGUAGEINDEPENDENT_MEDIUM_Name 451078 |
| | | | | | | DistrictName 451080 | | | | 0..1 451082 | LANGUAGEINDEPENDENT_MEDIUM_Name 451084 |
| | | | | | | POBoxID 451086 | | | | 0..1 451088 | POBoxID 451090 |
| | | | | | | POBoxIndicator 451092 | | | | 0..1 451094 | Indicator 451096 |

FIG. 45-50

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Country Code 451098 | | | | 0..1 451100 | CountryCode 451102 |
| | | | | | | POBox Country Name 451104 | | | | 0..1 451106 | MEDIUM_Name 451108 |
| | | | | | | POBox Region Code 451110 | | | | 0..1 451112 | RegionCode 451114 |

FIG. 45-51

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Region Name 451116 | | | | 0..1 451118 | LANGUAGEINDEPENDENT_MEDIUM_Name 451120 |
| | | | | | | POBox CityName 451122 | | | | 0..1 451124 | LANGUAGEINDEPENDENT_MEDIUM_Name 451126 |
| | | | | | | StreetName 451128 | | | | 0..1 451130 | StreetName 451132 |
| | | | | | | StreetPrefixName 451134 | | | | 0..N 451136 | LANGUAGEINDEPENDENT_MEDIUM_Name 451138 |

FIG. 45-52

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetSuffixName 451140 | | | | 0..N 451142 | LANGUAGEINDEPENDENT_MEDIUM_Name 451144 |
| | | | | | | HouseID 451146 | | | | 0..1 451148 | HouseID 451150 |
| | | | | | | AdditionalHouseID 451152 | | | | 0..1 451154 | HouseID 451156 |
| | | | | | | BuildingID 451158 | | | | 0..1 451160 | BuildingID 451162 |

FIG. 45-53

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FloorID 451164 | | | | 0..1 451166 | FloorID 451168 |
| | | | | | | RoomID 451170 | | | | 0..1 451172 | RoomID 451174 |
| | | | | | | CareOfName 451176 | | | | 0..1 451178 | LANGUAGEINDEPENDENT_MEDIUM_Name 451180 |
| | | | | | | Description 451182 | | | | 0..N 451184 | Description 451186 |

FIG. 45-54

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TaxJurisdictionCode 451188 | | | | | 0..1 451190 | TaxJurisdictionCode 451192 |
| | | | | | TimeZoneDifferenceValue 451194 | | | | | 0..1 451196 | TimeZoneDifferenceValue 451198 |
| | | | | | GeoCoordinates 451200 | | | | | 0..1 451202 | GeoCoordinates 451204 |
| | | | | | Communication 451208 | | | | | 0..1 451210 | Communication 451212 |

FIG. 45-55

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 451214 | | | | 0..1 451216 | LanguageCode 451218 |
| | | | | | | CorrespondenceLanguageName 451220 | | | | 0..1 451222 | MEDIUM_Name 451224 |
| | | | | | | Telephone 451226 | | | | 0..N 451228 | Telephone 451230 |

FIG. 45-56

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number 451232 | | | 1 451234 | PhoneNumber 451236 |
| | | | | | | | SMSEnabledIndicator 451238 | | | 0..1 451240 | Indicator 451242 |
| | | | | | | | NumberDefaultIndicator 451244 | | | 1 451246 | Indicator 451248 |
| | | | | | | | NumberDescription 451250 | | | 0..N 451252 | Description 451254 |

FIG. 45-57

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 451256 | | | 1 451258 | Indicator 451260 |
| | | | | | | MobilePhone 451262 | | | | 0..N 451264 | Telephone 451266 |
| | | | | | | | Number 451268 | | | 1 451270 | PhoneNumber 451272 |
| | | | | | | | SMSEnabledIndicator 451274 | | | 0..1 451276 | Indicator 451278 |

FIG. 45-58

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberDefaultIndicator 451280 | | | 1 451282 | Indicator 451284 |
| | | | | | | | NumberDescription 451286 | | | 0..N 451288 | Description 451290 |
| | | | | | | | NumberUsageDenialIndicator 451292 | | | 1 451294 | Indicator 451296 |
| | | | | | | Facsimile 451298 | | | | 0..N 451300 | Facsimile 451302 |

FIG. 45-59

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number 451304 | | | 1 451306 | PhoneNumber 451308 |
| | | | | | | | NumberDefaultIndicator 451310 | | | 1 451312 | Indicator 451314 |
| | | | | | | | NumberDescription 451316 | | | 0..N 451318 | Description 451320 |
| | | | | | | | NumberUsageDenialIndicator 451322 | | | 1 451324 | Indicator 451326 |

FIG. 45-60

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Email 451328 | | | | 0..N 451330 | Email 451332 |
| | | | | | | | URI 451334 | | | 1 451336 | EmailURI 451338 |
| | | | | | | | URIDefaultIndicator 451340 | | | 1 451342 | Indicator 451344 |
| | | | | | | | URIDescription 451346 | | | 0..N 451348 | Description 451350 |
| | | | | | | | URIUsageDenialIndicator 451352 | | | 1 451354 | Indicator 451356 |

FIG. 45-61

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Web 451358 | | | | 0..N 451360 | Web 451362 |
| | | | | | | | URI 451364 | | | 1 451366 | WebURI 451368 |
| | | | | | | | URIDefaultIndicator 451370 | | | 1 451372 | Indicator 451374 |
| | | | | | | | URIDescription 451376 | | | 0..N 451378 | Description 451380 |

FIG. 45-62

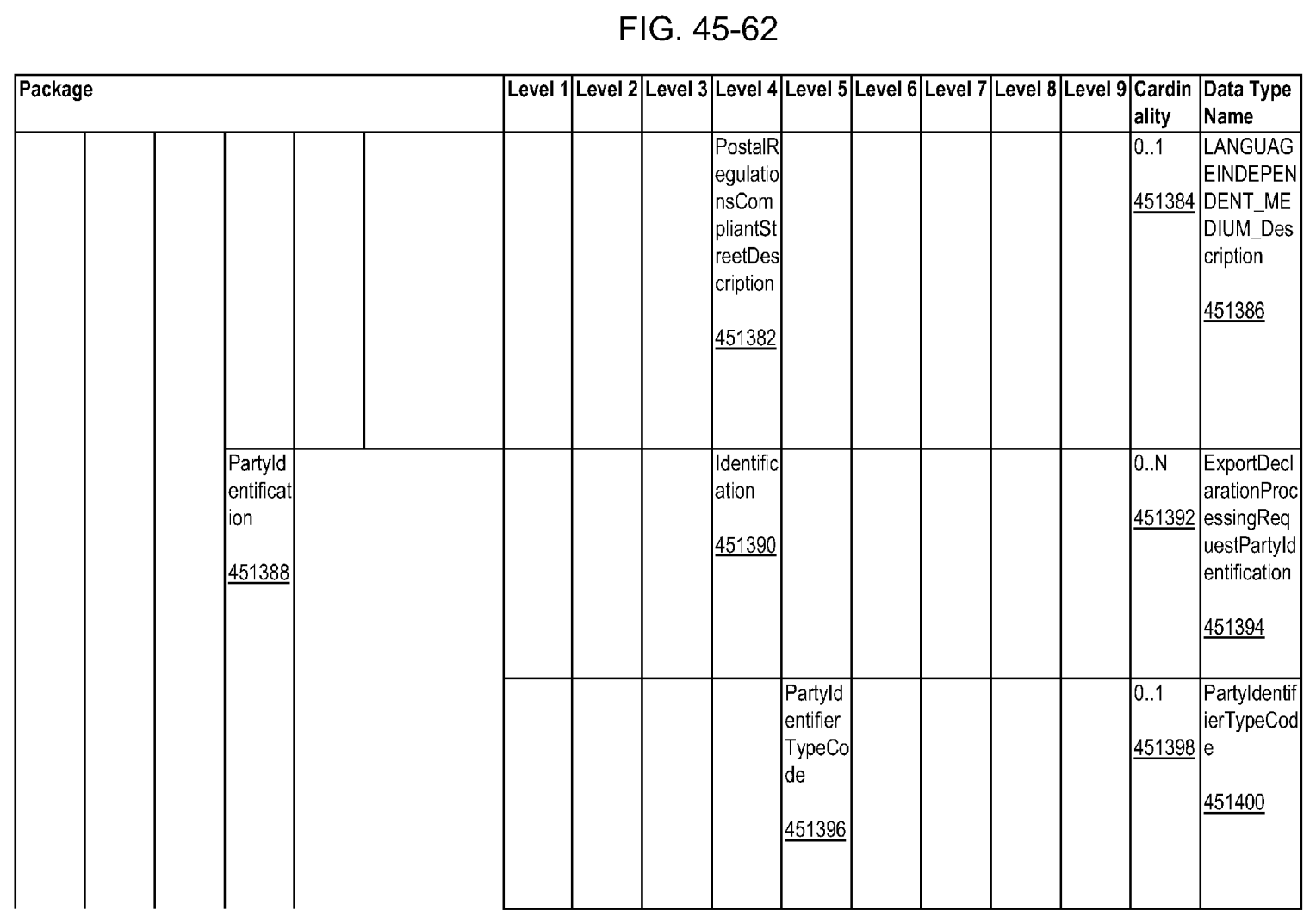

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | PostalRegulationsCompliantStreetDescription 451382 | | | | | | 0..1 451384 | LANGUAGEINDEPENDENT_MEDIUM_Description 451386 |
| PartyIdentification 451388 | | | | Identification 451390 | | | | | | 0..N 451392 | ExportDeclarationProcessingRequestPartyIdentification 451394 |
| | | | | | PartyIdentifierTypeCode 451396 | | | | | 0..1 451398 | PartyIdentifierTypeCode 451400 |

FIG. 45-63

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | PartyID 451402 | | | | | 0..1 451404 | NOALPHANUMERICCONVERSION_PartyID 451406 |
| | | | PartyContactParty 451408 | | | | | ContactParty 451410 | | | | | | 0..1 451412 | ExportDeclarationProcessingRequestPartyContactParty 451414 |
| | | | | | | | | | Address 451416 | | | | | 0..1 451418 | Address 451420 |

FIG. 45-64

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormOfAddress 451422 | | | | 0..1 451424 | FormOfAddress 451426 |
| | | | | | | OrganisationFormattedName 451428 | | | | 0..N 451430 | LANGUAGEINDEPENDENT_MEDIUM_Name 451432 |
| | | | | | | Person Name 451434 | | | | 0..1 451436 | PersonName 451438 |

FIG. 45-65

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | FunctionalTitleName 451440 | | | | 0..1 451442 | LANGUAGEINDEPENDENT_MEDIUM_Name 451444 |
| | | | | | | | | | | | | DepartmentName 451446 | | | | 0..1 451448 | LANGUAGEINDEPENDENT_MEDIUM_Name 451450 |
| | | | | | Address 451452 | | | | | | | Office 451454 | | | | 0..1 451456 | Office 451458 |
| | | | | | | | | | | | | PhysicalAddress 451462 | | | | 0..1 451464 | PhysicalAddress 451466 |

FIG. 45-66

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | Country Code 451468 | | | 0..1 451470 | CountryCode 451472 |
| | | | | | | | | | | | | | Country Name 451474 | | | 0..1 451476 | MEDIUM_Name 451478 |
| | | | | | | | | | | | | | Region Code 451480 | | | 0..1 451482 | RegionCode 451484 |
| | | | | | | | | | | | | | Region Name 451486 | | | 0..1 451488 | LANGUAGEINDEPENDENT_MEDIUM_Name 451490 |

FIG. 45-67

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetPostalCode 451492 | | | 0..1 451494 | PostalCode 451496 |
| | | | | | | | POBoxPostalCode 451498 | | | 0..1 451500 | PostalCode 451502 |
| | | | | | | | CompanyPostalCode 451504 | | | 0..1 451506 | PostalCode 451508 |
| | | | | | | | CityName 451510 | | | 0..1 451512 | LANGUAGEINDEPENDENT_MEDIUM_Name 451514 |

FIG. 45-68

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalCityName 451516 | | | 0..1 451518 | LANGUAGEINDEPENDENT_MEDIUM_Name 451520 |
| | | | | | | | DistrictName 451522 | | | 0..1 451524 | LANGUAGEINDEPENDENT_MEDIUM_Name 451526 |
| | | | | | | | POBoxID 451528 | | | 0..1 451530 | POBoxID 451532 |
| | | | | | | | POBoxIndicator 451534 | | | 0..1 451536 | Indicator 451538 |

FIG. 45-69

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | POBox Country Code 451540 | | | 0..1 451542 | CountryCode 451544 |
| | | | | | | | | | | | | | POBox Country Name 451546 | | | 0..1 451548 | MEDIUM_Name 451550 |
| | | | | | | | | | | | | | POBox Region Code 451552 | | | 0..1 451554 | RegionCode 451556 |

FIG. 45-70

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | POBox Region Name 451558 | | | 0..1 451560 | LANGUAGEINDEPENDENT_MEDIUM_Name 451562 |
| | | | | | | | | | | | | | POBox CityName 451564 | | | 0..1 451566 | LANGUAGEINDEPENDENT_MEDIUM_Name 451568 |
| | | | | | | | | | | | | | StreetName 451570 | | | 0..1 451572 | StreetName 451574 |
| | | | | | | | | | | | | | StreetPrefixName 451576 | | | 0..N 451578 | LANGUAGEINDEPENDENT_MEDIUM_Name 451580 |

FIG. 45-71

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetSuffixName 451582 | | | 0..N 451584 | LANGUAGEINDEPENDENT_MEDIUM_Name 451586 |
| | | | | | | | HouseID 451588 | | | 0..1 451590 | HouseID 451592 |
| | | | | | | | AdditionalHouseID 451594 | | | 0..1 451596 | HouseID 451598 |
| | | | | | | | BuildingID 451600 | | | 0..1 451602 | BuildingID 451604 |

FIG. 45-72

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | FloorID 451606 | | | 0..1 451608 | FloorID 451610 |
| | | | | | | | RoomID 451612 | | | 0..1 451614 | RoomID 451616 |
| | | | | | | | CareOfName 451618 | | | 0..1 451620 | LANGUAGEINDEPENDENT_MEDIUM_Name 451622 |
| | | | | | | | Description 451624 | | | 0..N 451626 | Description 451628 |

FIG. 45-73

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | TaxJurisdictionCode 451630 | | | | 0..1 451632 | TaxJurisdictionCode 451634 |
| | | | | | | | | | | | | TimeZoneDifferenceValue 451636 | | | | 0..1 451638 | TimeZoneDifferenceValue 451640 |
| | | | | | | | | | | | | GeoCoordinates 451642 | | | | 0..1 451644 | GeoCoordinates 451646 |
| | | | | | | | | | | | | Communication 451650 | | | | 0..1 451652 | Communication 451654 |

FIG. 45-74

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | CorrespondenceLanguageCode 451656 | | | 0..1 451658 | LanguageCode 451660 |
| | | | | | | | | | | | | | CorrespondenceLanguageName 451662 | | | 0..1 451664 | MEDIUM_Name 451666 |
| | | | | | | | | | | | | | Telephone 451668 | | | 0..N 451670 | Telephone 451672 |

FIG. 45-75

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 451674 | | 1 451676 | PhoneNumber 451678 |
| | | | | | | | | SMSEnabledIndicator 451680 | | 0..1 451682 | Indicator 451684 |
| | | | | | | | | NumberDefaultIndicator 451686 | | 1 451688 | Indicator 451690 |
| | | | | | | | | NumberDescription 451692 | | 0..N 451694 | Description 451696 |

FIG. 45-76

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 451698 | | 1 451700 | Indicator 451702 |
| | | | | | | | MobilePhone 451704 | | | 0..N 451706 | Telephone 451708 |
| | | | | | | | | Number 451710 | | 1 451712 | PhoneNumber 451714 |
| | | | | | | | | SMSEnabledIndicator 451716 | | 0..1 451718 | Indicator 451720 |

FIG. 45-77

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | NumberDefaultIndicator 451722 | | 1 451724 | Indicator 451726 |
| | | | | | | | | | | | | | | NumberDescription 451728 | | 0..N 451730 | Description 451732 |
| | | | | | | | | | | | | | | NumberUsageDenialIndicator 451734 | | 1 451736 | Indicator 451738 |
| | | | | | | | | | | | | | Facsimile 451740 | | | 0..N 451742 | Facsimile 451744 |

FIG. 45-78

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 451746 | | 1 451748 | PhoneNumber 451750 |
| | | | | | | | | NumberDefaultIndicator 451752 | | 1 451754 | Indicator 451756 |
| | | | | | | | | NumberDescription 451758 | | 0..N 451760 | Description 451762 |
| | | | | | | | | NumberUsageDenialIndicator 451764 | | 1 451766 | Indicator 451768 |

FIG. 45-79

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | Email 451770 | | | 0..N 451772 | Email 451774 |
| | | | | | | | | | | | | | | URI 451776 | | 1 451778 | EmailURI 451780 |
| | | | | | | | | | | | | | | URIDefaultIndicator 451782 | | 1 451784 | Indicator 451786 |
| | | | | | | | | | | | | | | URIDescription 451788 | | 0..N 451790 | Description 451792 |
| | | | | | | | | | | | | | | URIUsageDenialIndicator 451794 | | 1 451796 | Indicator 451798 |

FIG. 45-80

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Web 451800 | | | 0..N 451802 | Web 451804 |
| | | | | | | | | URI 451806 | | 1 451808 | WebURI 451810 |
| | | | | | | | | URIDefaultIndicator 451812 | | 1 451814 | Indicator 451816 |
| | | | | | | | | URIDescription 451818 | | 0..N 451820 | Description 451822 |

FIG. 45-81

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessPartnerFormattedName 451824 | | | | | 0..1 451826 | LANGUAGEINDEPENDENT_EXTENDED_Name 451828 |
| | | | | | FormattedConventionalPhoneNumberDescription 451830 | | | | | 0..1 451832 | LANGUAGEINDEPENDENT_SHORT_Description 451834 |

FIG. 45-82

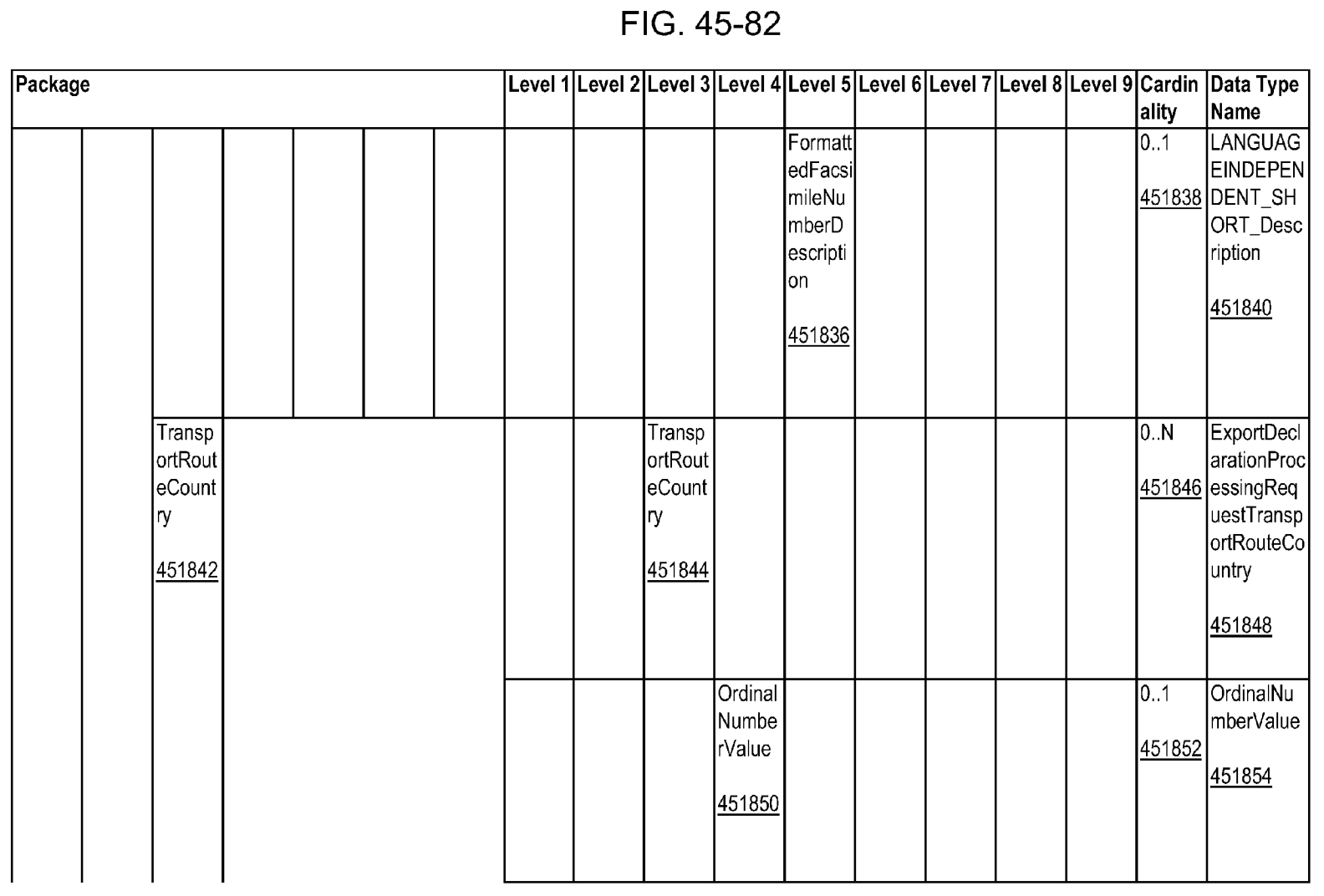

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | FormattedFacsimileNumberDescription 451836 | | | | | 0..1 451838 | LANGUAGEINDEPENDENT_SHORT_Description 451840 |
| | | TransportRouteCountry 451842 | | | | | | | TransportRouteCountry 451844 | | | | | | | 0..N 451846 | ExportDeclarationProcessingRequestTransportRouteCountry 451848 |
| | | | | | | | | | | OrdinalNumberValue 451850 | | | | | | 0..1 451852 | OrdinalNumberValue 451854 |

FIG. 45-83

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | | ExportTransportRouteCountryCode 451856 | | | | | | 0..1 451858 | ExportTransportRouteCountryCode 451860 |
| | | Item 451862 | | | | Item 451864 | | | | | | | 0..N 451866 | ExportDeclarationProcessingRequestItem 451868 |
| | | | | | | | CustomsAuthorityID 451870 | | | | | | 0..1 451872 | CustomsAuthorityID 451874 |

FIG. 45-84

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Description 451876 | | | | | | 0..1 451878 | Description 451880 |
| | | | | CustomsProcessPartyID 451882 | | | | | | 0..1 451884 | CustomsProcessID 451886 |
| | | | | ConsignmentExportID 451888 | | | | | | 0..1 451890 | ConsignmentExportID 451892 |
| | | | | OriginExportRegionCode 451894 | | | | | | 0..1 451896 | ExportRegionCode 451898 |

FIG. 45-85

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | NetWeightQuantity 451900 | | | | | | 0..1 451902 | Quantity 451904 |
| | | | | NetWeightQuantityTypeCode 451906 | | | | | | 0..1 451908 | QuantityTypeCode 451910 |
| | | | | GrossWeightQuantity 451912 | | | | | | 0..1 451914 | Quantity 451916 |

FIG. 45-86

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | GrossWeightQuantityTypeCode 451918 | | | | | | 0..1 451920 | QuantityTypeCode 451922 |
| | | | | DangerousGoodsID 451924 | | | | | | 0..1 451926 | DangerousGoodsID 451928 |
| | | | | ExportTransportCostPaymentFormCode 451930 | | | | | | 0..1 451932 | ExportTransportCostPaymentFormCode 451934 |

FIG. 45-87

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | | CustomsCommodityClassificationCode 451936 | | | | | | 0..1 451938 | CustomsCommodityClassificationCode 451940 |
| | | | | | | | ExportProcedureTypeCode 451942 | | | | | | 0..1 451944 | ExportProcedureTypeCode 451946 |
| | | | | | | | ExportPreviousProcedureTypeCode 451948 | | | | | | 0..1 451950 | ExportPreviousProcedureTypeCode 451952 |

FIG. 45-88

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ExportAdditionalProcedureTypeCode 451954 | | | | | | 0..1 451956 | ExportAdditionalProcedureTypeCode 451958 |
| | | | | LegalComplianceQuantity 451960 | | | | | | 0..1 451962 | Quantity 451964 |
| | | | | LegalComplianceQuantityTypeCode 451966 | | | | | | 0..1 451968 | QuantityTypeCode 451970 |

FIG. 45-89

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | LegalComplianceAmount 451972 | | | | | | 0..1 451974 | Amount 451976 |
| BasicText 451978 | | | | BasicText 451980 | | | | | | 0..N 451982 | TextCollectionBasicText 451984 |
| | | | | | TypeCode 451986 | | | | | 0..1 451988 | TextCollectionTextTypeCode 451990 |
| | | | | | ContentText 451992 | | | | | 1 451994 | Text 451996 |

FIG. 45-90

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Party 451998 | | | | | Party 452000 | | | | | | 0..N 452002 | ExportDeclarationProcessingRequestItemParty 452004 |
| | | | | | | | | | RoleCategoryCode 452006 | | | | | 0..1 452008 | PartyRoleCategoryCode 452010 |
| | | | | | | | | | Address 452012 | | | | | 0..1 452014 | Address 452016 |
| | | | | | | | | | | OrganisationFormOfAddress 452018 | | | | 0..1 452020 | FormOfAddress 452022 |

FIG. 45-91

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormattedName 452024 | | | | 0..N 452026 | LANGUAGEINDEPENDENT_MEDIUM_Name 452028 |
| | | | | | | PersonName 452030 | | | | 0..1 452032 | PersonName 452034 |
| | | | | | | FunctionalTitleName 452036 | | | | 0..1 452038 | LANGUAGEINDEPENDENT_MEDIUM_Name 452040 |

FIG. 45-92

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | DepartmentName 452042 | | | | 0..1 452044 | LANGUAGEINDEPENDENT_MEDIUM_Name 452046 |
| | | | | | | Address 452048 | | | | | | Office 452050 | | | | 0..1 452052 | Office 452054 |
| | | | | | | | | | | | | PhysicalAddress 452058 | | | | 0..1 452060 | PhysicalAddress 452062 |
| | | | | | | | | | | | | | CountryCode 452064 | | | 0..1 452066 | CountryCode 452068 |

FIG. 45-93

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | Country Name 452070 | | | 0..1 452072 | MEDIUM_Name 452074 |
| | | | | | | | | | | | | | Region Code 452076 | | | 0..1 452078 | RegionCode 452080 |
| | | | | | | | | | | | | | Region Name 452082 | | | 0..1 452084 | LANGUAGEINDEPENDENT_MEDIUM_Name 452086 |
| | | | | | | | | | | | | | StreetPostalCode 452088 | | | 0..1 452090 | PostalCode 452092 |

FIG. 45-94

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | POBoxPostalCode 452094 | | | 0..1 452096 | PostalCode 452098 |
| | | | | | | | | | | | | | CompanyPostalCode 452100 | | | 0..1 452102 | PostalCode 452104 |
| | | | | | | | | | | | | | CityName 452106 | | | 0..1 452108 | LANGUAGEINDEPENDENT_MEDIUM_Name 452110 |

FIG. 45-95

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalCityName 452112 | | | 0..1 452114 | LANGUAGEINDEPENDENT_MEDIUM_Name 452116 |
| | | | | | | | DistrictName 452118 | | | 0..1 452120 | LANGUAGEINDEPENDENT_MEDIUM_Name 452122 |
| | | | | | | | POBoxID 452124 | | | 0..1 452126 | POBoxID 452128 |
| | | | | | | | POBoxIndicator 452130 | | | 0..1 452132 | Indicator 452134 |

FIG. 45-96

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBox Country Code 452136 | | | 0..1 452138 | CountryCode 452140 |
| | | | | | | | POBox Country Name 452142 | | | 0..1 452144 | MEDIUM_Name 452146 |
| | | | | | | | POBox Region Code 452148 | | | 0..1 452150 | RegionCode 452152 |

FIG. 45-97

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBox Region Name 452154 | | | 0..1 452156 | LANGUAGEINDEPENDENT_MEDIUM_Name 452158 |
| | | | | | | | POBox CityName 452160 | | | 0..1 452162 | LANGUAGEINDEPENDENT_MEDIUM_Name 452164 |
| | | | | | | | StreetName 452166 | | | 0..1 452168 | StreetName 452170 |
| | | | | | | | StreetPrefixName 452172 | | | 0..N 452174 | LANGUAGEINDEPENDENT_MEDIUM_Name 452176 |

FIG. 45-98

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetSuffixName 452178 | | | 0..N 452180 | LANGUAGEINDEPENDENT_MEDIUM_Name 452182 |
| | | | | | | | HouseID 452184 | | | 0..1 452186 | HouseID 452188 |
| | | | | | | | AdditionalHouseID 452190 | | | 0..1 452192 | HouseID 452194 |
| | | | | | | | BuildingID 452196 | | | 0..1 452198 | BuildingID 452200 |

FIG. 45-99

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | FloorID 452202 | | | 0..1 452204 | FloorID 452206 |
| | | | | | | | | | | | | | RoomID 452208 | | | 0..1 452210 | RoomID 452212 |
| | | | | | | | | | | | | | CareOfName 452214 | | | 0..1 452216 | LANGUAGEINDEPENDENT_MEDIUM_Name 452218 |
| | | | | | | | | | | | | | Description 452220 | | | 0..N 452222 | Description 452224 |

FIG. 45-100

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TaxJurisdictionCode 452226 | | | | 0..1 452228 | TaxJurisdictionCode 452230 |
| | | | | | | TimeZoneDifferenceValue 452232 | | | | 0..1 452234 | TimeZoneDifferenceValue 452236 |
| | | | | | | GeoCoordinates 452238 | | | | 0..1 452240 | GeoCoordinates 452242 |
| | | | | | | Communication 452246 | | | | 0..1 452248 | Communication 452250 |

FIG. 45-101

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 452252 | | | 0..1 452254 | LanguageCode 452256 |
| | | | | | | | CorrespondenceLanguageName 452258 | | | 0..1 452260 | MEDIUM_Name 452262 |
| | | | | | | | Telephone 452264 | | | 0..N 452266 | Telephone 452268 |

FIG. 45-102

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 452270 | | 1 452272 | PhoneNumber 452274 |
| | | | | | | | | SMSEnabledIndicator 452276 | | 0..1 452278 | Indicator 452280 |
| | | | | | | | | NumberDefaultIndicator 452282 | | 1 452284 | Indicator 452286 |
| | | | | | | | | NumberDescription 452288 | | 0..N 452290 | Description 452292 |

FIG. 45-103

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 452294 | | 1 452296 | Indicator 452298 |
| | | | | | | | MobilePhone 452300 | | | 0..N 452302 | Telephone 452304 |
| | | | | | | | | Number 452306 | | 1 452308 | PhoneNumber 452310 |
| | | | | | | | | SMSEnabledIndicator 452312 | | 0..1 452314 | Indicator 452316 |

FIG. 45-104

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | NumberDefaultIndicator 452318 | | 1 452320 | Indicator 452322 |
| | | | | | | | | | | | | | | NumberDescription 452324 | | 0..N 452326 | Description 452328 |
| | | | | | | | | | | | | | | NumberUsageDenialIndicator 452330 | | 1 452332 | Indicator 452334 |
| | | | | | | | | | | | | | Facsimile 452336 | | | 0..N 452338 | Facsimile 452340 |

FIG. 45-105

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | Number 452342 | | 1 452344 | PhoneNumber 452346 |
| | | | | | | | | | | | | | | NumberDefaultIndicator 452348 | | 1 452350 | Indicator 452352 |
| | | | | | | | | | | | | | | NumberDescription 452354 | | 0..N 452356 | Description 452358 |
| | | | | | | | | | | | | | | NumberUsageDenialIndicator 452360 | | 1 452362 | Indicator 452364 |

FIG. 45-106

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Email 452366 | | | 0..N 452368 | Email 452370 |
| | | | | | | | | URI 452372 | | 1 452374 | EmailURI 452376 |
| | | | | | | | | URIDefaultIndicator 452378 | | 1 452380 | Indicator 452382 |
| | | | | | | | | URIDescription 452384 | | 0..N 452386 | Description 452388 |
| | | | | | | | | URIUsageDenialIndicator 452390 | | 1 452392 | Indicator 452394 |

FIG. 45-107

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | Web 452396 | | | 0..N 452398 | Web 452400 |
| | | | | | | | | | | | | | | URI 452402 | | 1 452404 | WebURI 452406 |
| | | | | | | | | | | | | | | URIDefaultIndicator 452408 | | 1 452410 | Indicator 452412 |
| | | | | | | | | | | | | | | URIDescription 452414 | | 0..N 452416 | Description 452418 |

FIG. 45-108

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | PostalRegulationsCompliantStreetDescription 452420 | | | | | 0..1 452422 | LANGUAGEINDEPENDENT_MEDIUM_Description 452424 |
| | | | | Identification 452426 | | | | | | | Identification 452428 | | | | | 0..N 452430 | ExportDeclarationProcessingRequestItemPartyIdentification 452432 |

FIG. 45-109

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | PartyIdentifierTypeCode 452434 | | | | 0..1 452436 | PartyIdentifierTypeCode 452438 |
| | | | | | | | | | | | PartyID 452440 | | | | 0..1 452442 | NOALPHANUMERICCONVERSION_PartyID 452444 |
| | | | | Contact Party 452446 | | | | | | Contact Party 452448 | | | | | 0..1 452450 | ExportDeclarationProcessingRequestItemPartyContactParty 452452 |

FIG. 45-110

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Address 452454 | | | | 0..1 452456 | Address 452458 |
| | | | | | | | OrganisationFormOfAddress 452460 | | | 0..1 452462 | FormOfAddress 452464 |
| | | | | | | | OrganisationFormattedName 452466 | | | 0..N 452468 | LANGUAGEINDEPENDENT_MEDIUM_Name 452470 |
| | | | | | | | PersonName 452472 | | | 0..1 452474 | PersonName 452476 |

FIG. 45-111

| Package | | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|---|
| | | | | | | | | | | | | | | FunctionalTitleName 452478 | | | 0..1 452480 | LANGUAGEINDEPENDENT_MEDIUM_Name 452482 |
| | | | | | | | | | | | | | | DepartmentName 452484 | | | 0..1 452486 | LANGUAGEINDEPENDENT_MEDIUM_Name 452488 |
| | | | | | | | Address 452490 | | | | | | | Office 452492 | | | 0..1 452494 | Office 452496 |
| | | | | | | | | | | | | | | PhysicalAddress 452500 | | | 0..1 452502 | PhysicalAddress 452504 |

FIG. 45-112

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Country Code 452506 | | 0..1 452508 | CountryCode 452510 |
| | | | | | | | | Country Name 452512 | | 0..1 452514 | MEDIUM_Name 452516 |
| | | | | | | | | Region Code 452518 | | 0..1 452520 | RegionCode 452522 |
| | | | | | | | | Region Name 452524 | | 0..1 452526 | LANGUAGEINDEPENDENT_MEDIUM_Name 452528 |

FIG. 45-113

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | StreetPostalCode 452530 | | 0..1 452532 | PostalCode 452534 |
| | | | | | | | | POBoxPostalCode 452536 | | 0..1 452538 | PostalCode 452540 |
| | | | | | | | | CompanyPostalCode 452542 | | 0..1 452544 | PostalCode 452546 |
| | | | | | | | | CityName 452548 | | 0..1 452550 | LANGUAGEINDEPENDENT_MEDIUM_Name 452552 |

FIG. 45-114

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | AdditionalCityName 452554 | | 0..1 452556 | LANGUAGEINDEPENDENT_MEDIUM_Name 452558 |
| | | | | | | | | DistrictName 452560 | | 0..1 452562 | LANGUAGEINDEPENDENT_MEDIUM_Name 452564 |
| | | | | | | | | POBoxID 452566 | | 0..1 452568 | POBoxID 452570 |
| | | | | | | | | POBoxIndicator 452572 | | 0..1 452574 | Indicator 452576 |

FIG. 45-115

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBox Country Code 452578 | | 0..1 452580 | CountryCode 452582 |
| | | | | | | | | POBox Country Name 452584 | | 0..1 452586 | MEDIUM_Name 452588 |
| | | | | | | | | POBox Region Code 452590 | | 0..1 452592 | RegionCode 452594 |

FIG. 45-116

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | POBoxRegionName 452596 | | 0..1 452598 | LANGUAGEINDEPENDENT_MEDIUM_Name 452600 |
| | | | | | | | | | | | | | | POBoxCityName 452602 | | 0..1 452604 | LANGUAGEINDEPENDENT_MEDIUM_Name 452606 |
| | | | | | | | | | | | | | | StreetName 452608 | | 0..1 452610 | StreetName 452612 |
| | | | | | | | | | | | | | | StreetPrefixName 452614 | | 0..N 452616 | LANGUAGEINDEPENDENT_MEDIUM_Name 452618 |

FIG. 45-117

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | StreetSuffixName 452620 | | 0..N 452622 | LANGUAGEINDEPENDENT_MEDIUM_Name 452624 |
| | | | | | | | | | | | | | | HouseID 452626 | | 0..1 452628 | HouseID 452630 |
| | | | | | | | | | | | | | | AdditionalHouseID 452632 | | 0..1 452634 | HouseID 452636 |
| | | | | | | | | | | | | | | BuildingID 452638 | | 0..1 452640 | BuildingID 452642 |

FIG. 45-118

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | FloorID 452644 | | 0..1 452646 | FloorID 452648 |
| | | | | | | | | RoomID 452650 | | 0..1 452652 | RoomID 452654 |
| | | | | | | | | CareOf Name 452656 | | 0..1 452658 | LANGUAGEINDEPENDENT_MEDIUM_Name 452660 |
| | | | | | | | | Description 452662 | | 0..N 452664 | Description 452666 |

FIG. 45-119

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TaxJurisdictionCode 452668 | | | 0..1 452670 | TaxJurisdictionCode 452672 |
| | | | | | | | TimeZoneDifferenceValue 452674 | | | 0..1 452676 | TimeZoneDifferenceValue 452678 |
| | | | | | | | GeoCoordinates 452680 | | | 0..1 452682 | GeoCoordinates 452684 |
| | | | | | | | Communication 452688 | | | 0..1 452690 | Communication 452692 |

FIG. 45-120

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | CorrespondenceLanguageCode 452694 | | 0..1 452696 | LanguageCode 452698 |
| | | | | | | | | CorrespondenceLanguageName 452700 | | 0..1 452702 | MEDIUM_Name 452704 |
| | | | | | | | | Telephone 452706 | | 0..N 452708 | Telephone 452710 |

FIG. 45-121

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | Number 452712 | 1 452714 | PhoneNumber 452716 |
| | | | | | | | | | SMSEnabledIndicator 452718 | 0..1 452720 | Indicator 452722 |
| | | | | | | | | | NumberDefaultIndicator 452724 | 1 452726 | Indicator 452728 |
| | | | | | | | | | NumberDescription 452730 | 0..N 452732 | Description 452734 |

FIG. 45-122

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | NumberUsageDenialIndicator 452736 | 1 452738 | Indicator 452740 |
| | | | | | | | | Mobile Phone 452742 | | 0..N 452744 | Telephone 452746 |
| | | | | | | | | | Number 452748 | 1 452750 | PhoneNumber 452752 |
| | | | | | | | | | SMSEnabledIndicator 452754 | 0..1 452756 | Indicator 452758 |

FIG. 45-123

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | | NumberDefaultIndicator 452760 | 1 452762 | Indicator 452764 |
| | | | | | | | | | | | | | | | NumberDescription 452766 | 0..N 452768 | Description 452770 |
| | | | | | | | | | | | | | | | NumberUsageDenialIndicator 452772 | 1 452774 | Indicator 452776 |
| | | | | | | | | | | | | | | Facsimile 452778 | | 0..N 452780 | Facsimile 452782 |

FIG. 45-124

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | | Number 452784 | 1 452786 | PhoneNumber 452788 |
| | | | | | | | | | | | | | | | NumberDefaultIndicator 452790 | 1 452792 | Indicator 452794 |
| | | | | | | | | | | | | | | | NumberDescription 452796 | 0..N 452798 | Description 452800 |
| | | | | | | | | | | | | | | | NumberUsageDenialIndicator 452802 | 1 452804 | Indicator 452806 |

FIG. 45-125

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Email 452808 | | 0..N 452810 | Email 452812 |
| | | | | | | | | | URI 452814 | 1 452816 | EmailURI 452818 |
| | | | | | | | | | URIDefaultIndicator 452820 | 1 452822 | Indicator 452824 |
| | | | | | | | | | URIDescription 452826 | 0..N 452828 | Description 452830 |
| | | | | | | | | | URIUsageDenialIndicator 452832 | 1 452834 | Indicator 452836 |

FIG. 45-126

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Web 452838 | | 0..N 452840 | Web 452842 |
| | | | | | | | | | URI 452844 | 1 452846 | WebURI 452848 |
| | | | | | | | | | URIDefaultIndicator 452850 | 1 452852 | Indicator 452854 |
| | | | | | | | | | URIDescription 452856 | 0..N 452858 | Description 452860 |

FIG. 45-127

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessPartnerFormattedName 452862 | | | | 0..1 452864 | LANGUAGEINDEPENDENT_EXTENDED_Name 452866 |
| | | | | | | FormattedConventionalPhoneNumberDescription 452868 | | | | 0..1 452870 | LANGUAGEINDEPENDENT_SHORT_Description 452872 |

FIG. 45-128

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | FormattedFacsimileNumberDescription 452874 | | | | 0..1 452876 | LANGUAGEINDEPENDENT_SHORT_Description 452878 |
| | | | Package 452880 | | | | | | | Package 452882 | | | | | | 0..N 452884 | ExportDeclarationProcessingRequestItemPackage 452886 |
| | | | | | | | | | | | OrdinalNumberValue 452888 | | | | | 0..1 452890 | OrdinalNumberValue 452892 |

FIG. 45-129

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ElementNumberValue 452894 | | | | | 0..1 452896 | NumberValue 452898 |
| | | | | | ExportPackageTypeCode 452900 | | | | | 0..1 452902 | ExportPackageTypeCode 452904 |
| | | | | | PackageExportID 452906 | | | | | 0..1 452908 | PackageExportID 452910 |

FIG. 45-130

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Container 452912 | | | | | Container 452914 | | | | | | 0..N 452916 | ExportDeclarationProcessingRequestItemContainer 452918 |
| | | | | | | | | | ContainerExportID 452920 | | | | | 0..1 452922 | ContainerExportID 452924 |
| | | | SupportingDocument 452926 | | | | | SupportingDocument 452928 | | | | | | 0..N 452930 | ExportDeclarationProcessingRequestItemSupportingDocument 452932 |

FIG. 45-131

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ExportSupportingDocumentTypeCode 452934 | | | | | 0..1 452936 | ExportSupportingDocumentTypeCode 452938 |
| | | | | | ExportSupportingDocumentID 452940 | | | | | 0..1 452942 | ExportSupportingDocumentID 452944 |

FIG. 45-132

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ExportSupportingDocumentAddendumID 452946 | | | | | 0..1 452948 | ExportSupportingDocumentAddendumID 452950 |
| | | | | | ExportSupportingDocumentDetailID 452952 | | | | | 0..1 452954 | ExportSupportingDocumentDetailID 452956 |
| | | | | | IssueDate 452958 | | | | | 0..1 452960 | Date 452962 |

FIG. 45-133

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ValidityEndDate 452964 | | | | | 0..1 452966 | Date 452968 |
| | | | | | LicenceWriteOffAmount 452970 | | | | | 0..1 452972 | Amount 452974 |
| | | | | | LicenceWriteOffQuantity 452976 | | | | | 0..1 452978 | Quantity 452980 |

FIG. 45-134

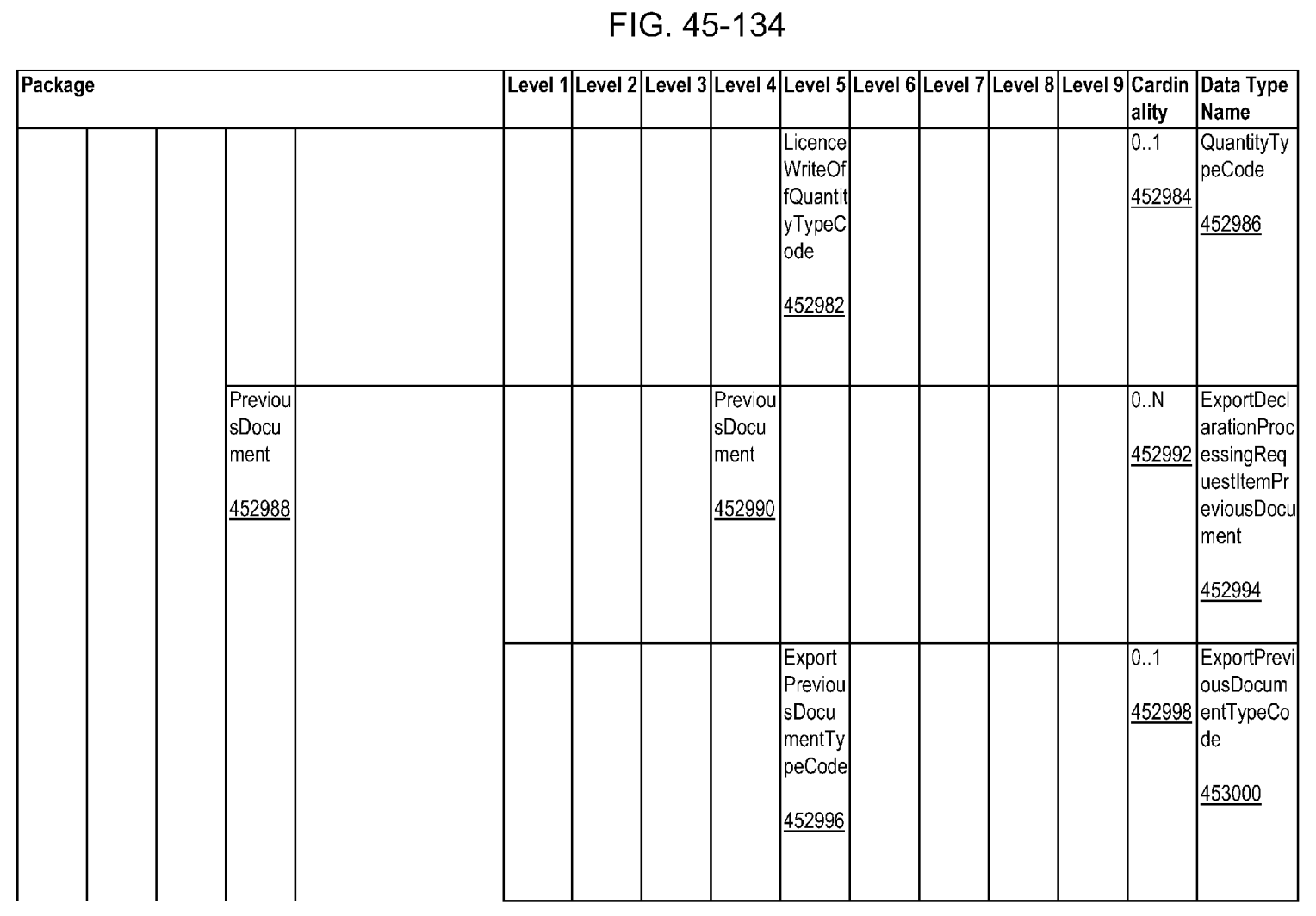

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | LicenceWriteOffQuantityTypeCode 452982 | | | | | 0..1 452984 | QuantityTypeCode 452986 |
| | | | PreviousDocument 452988 | | | | | PreviousDocument 452990 | | | | | | 0..N 452992 | ExportDeclarationProcessingRequestItemPreviousDocument 452994 |
| | | | | | | | | | ExportPreviousDocumentTypeCode 452996 | | | | | 0..1 452998 | ExportPreviousDocumentTypeCode 453000 |

FIG. 45-135

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | ExportPreviousDocumentID 453002 | | | | | 0..1 453004 | ExportPreviousDocumentID 453006 |
| | | | | | | | | | ExportPreviousDocumentDescription 453008 | | | | | 0..1 453010 | LANGUAGEINDEPENDENT_MEDIUM_Description 453012 |
| | | | CustomsWarehouseDischarge 453014 | | | | | CustomsWarehouseDischarge 453016 | | | | | | 0..1 453018 | ExportDeclarationProcessingRequestItemCustomsWarehouseDischarge 453020 |

FIG. 45-136

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ClosingPortionTotalNumberValue 453022 | | | | | 0..1 453024 | NumberValue 453026 |
| | | | | | CustomsAuthorisationID 453028 | | | | | 0..1 453030 | CustomsAuthorisationID 453032 |
| | | | | | ClosingPortion 453034 | | | | | 0..N 453036 | ExportDeclarationProcessingRequestItemCustomsWarehouseDischargeClosingPortion 453038 |

FIG. 45-137

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrdinalNumberValue 453040 | | | | 0..1 453042 | OrdinalNumberValue 453044 |
| | | | | | | CustomsProcessID 453046 | | | | 0..1 453048 | CustomsProcessID 453050 |
| | | | | | | CustomsDeclarationItemCustomsAuthorityID 453052 | | | | 0..1 453054 | CustomsDeclarationItemCustomsAuthorityID 453056 |

FIG. 45-138

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CustomsCommodityClassificationCode 453058 | | | | 0..1 453060 | CustomsCommodityClassificationCode 453062 |
| | | | | | | UsualFormsOfHandlingAppliedIndicator 453064 | | | | 0..1 453066 | Indicator 453068 |

FIG. 45-139

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | ElectronicallyReportedIndicator 453070 | | | | 0..1 453072 | Indicator 453074 |
| | | | | | | Description 453076 | | | | 0..1 453078 | Description 453080 |
| | | | | | | OriginalQuantity 453082 | | | | 0..1 453084 | Quantity 453086 |
| | | | | | | OriginalQuantityTypeCode 453088 | | | | 0..1 453090 | QuantityTypeCode 453092 |

FIG. 45-140

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | | Quantity 453094 | | | | 0..1 453096 | Quantity 453098 |
| | | | | | | | | | | QuantityTypeCode 453100 | | | | 0..1 453102 | QuantityTypeCode 453104 |
| | | | InwardProcessingDischarge 453106 | | | | | InwardProcessingDischarge 453108 | | | | | | 0..1 453110 | ExportDeclarationProcessingRequestItemInwardProcessingDischarge 453112 |

FIG. 45-141

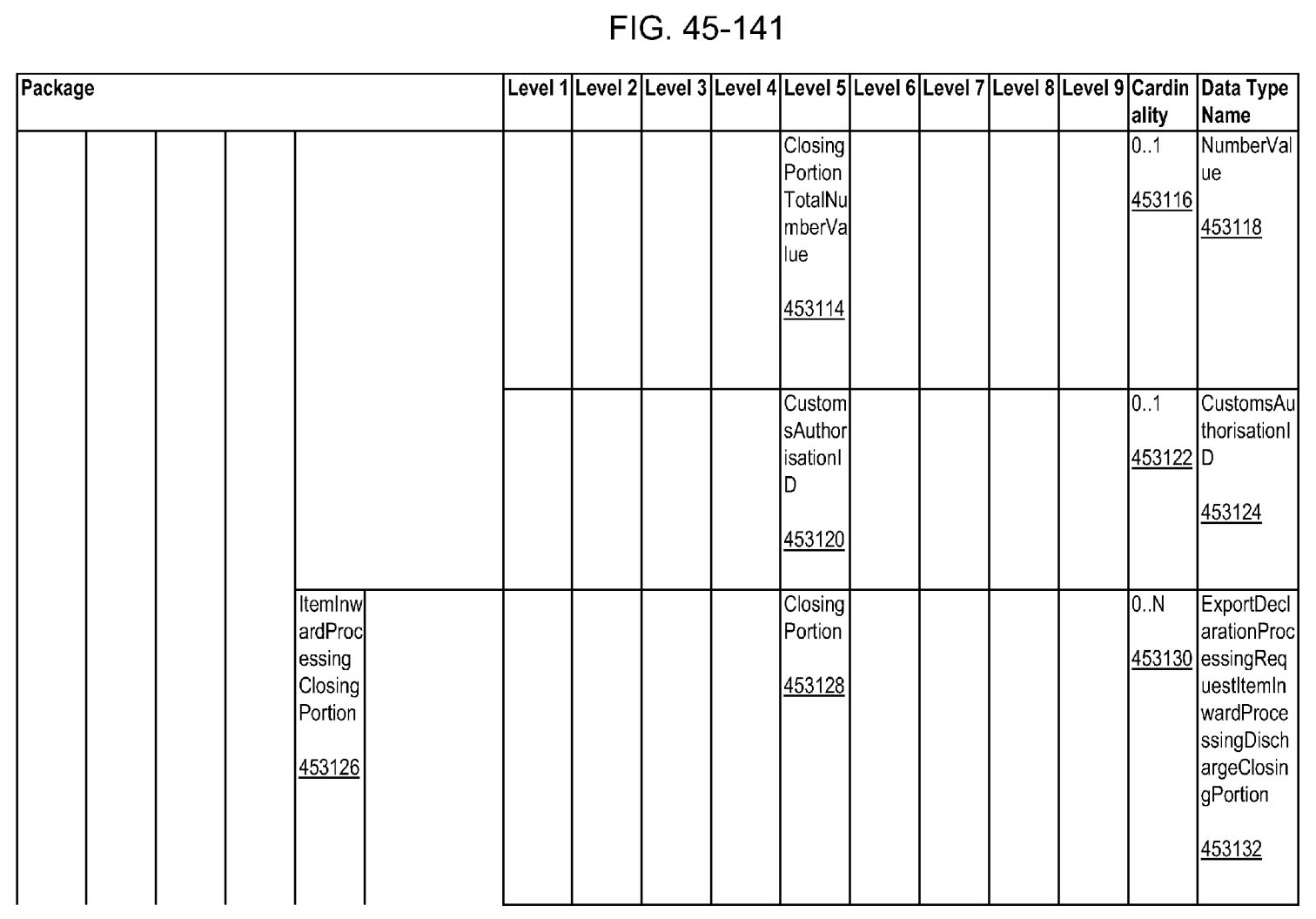

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | ClosingPortionTotalNumberValue 453114 | | | | | 0..1 453116 | NumberValue 453118 |
| | | | | | | | | | | CustomsAuthorisationID 453120 | | | | | 0..1 453122 | CustomsAuthorisationID 453124 |
| | | | | ItemInwardProcessingClosingPortion 453126 | | | | | | ClosingPortion 453128 | | | | | 0..N 453130 | ExportDeclarationProcessingRequestItemInwardProcessingDischargeClosingPortion 453132 |

FIG. 45-142

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrdinalNumberValue 453134 | | | | 0..1 453136 | OrdinalNumberValue 453138 |
| | | | | | | CustomsProcessID 453140 | | | | 0..1 453142 | CustomsProcessID 453144 |
| | | | | | | CustomsDeclarationItemCustomsAuthorityID 453146 | | | | 0..1 453148 | CustomsDeclarationItemCustomsAuthorityID 453150 |

FIG. 45-143

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | ElectronicallyReportedIndicator 453152 | | | | 0..1 453154 | Indicator 453156 |
| | | | | | | Description 453158 | | | | 0..1 453160 | Description 453162 |

FIG. 46-1

| Package | | | Level 1 | Level 2 | Level 3 | Level 4 | Level 5 | Cardinality | Data Type Name |
|---|---|---|---|---|---|---|---|---|---|
| Export Message Exchange Notification 460000 | | | Export Message Exchange Notification 460002 | | | | | | ExportMessageExchangeNotificationMessage 460004 |
| | Message Header 460006 | | | Message Header 460008 | | | | 1 460010 | BusinessDocumentMessageHeader 460012 |
| | | | | | ID 460014 | | | 0..1 460016 | BusinessDocumentMessageID 460018 |
| | | | | | UUID 460020 | | | 0..1 460022 | UUID 460024 |
| | | | | | ReferenceID 460026 | | | 0..1 460028 | BusinessDocumentMessageID 460030 |
| | | | | | ReferenceUUID 460032 | | | 0..1 460034 | UUID 460036 |

FIG. 46-2

| Package | | | | Level 1 | Level 2 | Level 3 | Level 4 | Level 5 | Cardinality | Data Type Name |
|---|---|---|---|---|---|---|---|---|---|---|
| | | | | | | CreationDateTime 460038 | | | 1 460040 | GLOBAL_DateTime 460042 |
| | | | | | | TestDataIndicator 460044 | | | 0..1 460046 | Indicator 460048 |
| | | | | | | ReconciliationIndicator 460050 | | | 0..1 460052 | Indicator 460054 |
| | | | | | | SenderBusinessSystemID 460056 | | | 0..1 460058 | BusinessSystemID 460060 |
| | | | | | | RecipientBusinessSystemID 460062 | | | 0..1 460064 | BusinessSystemID 460066 |
| | | Party 460068 | | | | SenderParty 460070 | | | 0..1 460072 | BusinessDocumentMessageHeaderParty 460074 |
| | | | | | | | InternalID 460076 | | 0..1 460078 | PartyInternalID 460080 |

FIG. 46-3

| Package | Level 1 | Level 2 | Level 3 | Level 4 | Level 5 | Cardinality | Data Type Name |
|---|---|---|---|---|---|---|---|
| | | | | StandardID 460082 | | 0..N 460084 | PartyStandardID 460086 |
| | | | | ContactPerson 460088 | | 0..1 460090 | BusinessDocumentMessageHeaderPartyContactPerson 460092 |
| | | | | | InternalID 460094 | 0..1 460096 | ContactPersonInternalID 460098 |
| | | | | | OrganisationFormattedName 460100 | 0..N 460102 | LANGUAGEINDEPENDENT_MEDIUM_Name 460104 |
| | | | | | PersonFormattedName 460106 | 0..N 460108 | LANGUAGEINDEPENDENT_LONG_Name 460110 |
| | | | | | PhoneNumber 460114 | 0..N 460116 | PhoneNumber 460118 |
| | | | | | FaxNumber 460122 | 0..N 460124 | PhoneNumber 460126 |

FIG. 46-4

| Package | Level 1 | Level 2 | Level 3 | Level 4 | Level 5 | Cardinality | Data Type Name |
|---|---|---|---|---|---|---|---|
| | | | | | EmailURI 460128 | 0..N 460130 | EmailURI 460132 |
| | | | RecipientParty 460136 | | | 0..N 460138 | BusinessDocumentMessageHeaderParty 460140 |
| | | | | InternalID 460142 | | 0..1 460144 | PartyInternalID 460146 |
| | | | | StandardID 460148 | | 0..N 460150 | PartyStandardID 460152 |
| | | | | ContactPerson 460154 | | 0..1 460156 | BusinessDocumentMessageHeaderPartyContactPerson 460158 |
| | | | | | InternalID 460160 | 0..1 460162 | ContactPersonInternalID 460164 |
| | | | | | OrganisationFormattedName 460166 | 0..N 460168 | LANGUAGEINDEPENDENT_MEDIUM_Name 460170 |

FIG. 46-5

| Package | | | | Level 1 | Level 2 | Level 3 | Level 4 | Level 5 | Cardinality | Data Type Name |
|---|---|---|---|---|---|---|---|---|---|---|
| | | | | | | | | PersonFormattedName 460172 | 0..N 460174 | LANGUAGEINDEPENDENT_LONG_Name 460176 |
| | | | | | | | | PhoneNumber 460180 | 0..N 460182 | PhoneNumber 460184 |
| | | | | | | | | FaxNumber 460188 | 0..N 460190 | PhoneNumber 460192 |
| | | | | | | | | EmailURI 460194 | 0..N 460196 | EmailURI 460198 |
| | | BusinessScope 460200 | | | | BusinessScope 460202 | | | 0..N 460204 | BusinessScope 460206 |
| | ExportMessage 460208 | | | | ExportMessage 460210 | | | | 1 460212 | ExportMessageExchangeNotification 460214 |
| | | | | | | ReferenceCustomsMessageExchangeServerFileID 460216 | | | 0..1 460218 | CustomsMessageExchangeServerFileID 460220 |

FIG. 46-6

| Package | | | | Level 1 | Level 2 | Level 3 | Level 4 | Level 5 | Cardinality | Data Type Name |
|---|---|---|---|---|---|---|---|---|---|---|
| | | | | | | CommunicationDateTime 460222 | | | 0..1 460224 | GLOBAL_DateTime 460226 |
| | | | | | | ExportMessageCommunicationStatusCode 460228 | | | 0..1 460230 | ExportMessageCommunicationStatusCode 460232 |
| | | Document 460234 | | | | Document 460236 | | | 0..N 460238 | ExportMessageExchangeNotificationDocument 460240 |
| | | | | | | | DocumentTypeCode 460242 | | 0..1 460244 | DocumentTypeCode 460246 |
| | | | | | | | FileContentBinaryObject 460248 | | 0..1 460250 | BinaryObject 460252 |

FIG. 47-1

| Package | Level 1 | Level 2 | Level 3 | Level 4 | Level 5 | Cardinality | Data Type Name |
|---|---|---|---|---|---|---|---|
| Export Message Semantic Error Notification 470000 | Export Message Semantic Error Notification 470002 | | | | | | ExportMessageSemanticErrorNotificationMessage 470004 |
| | | Message Header 470006 | | | | 1 470008 | BusinessDocumentMessageHeader 470010 |
| | | | ID 470012 | | | 0..1 470014 | BusinessDocumentMessageID 470016 |
| | | | UUID 470018 | | | 0..1 470020 | UUID 470022 |
| | | | ReferenceID 470024 | | | 0..1 470026 | BusinessDocumentMessageID 470028 |
| | | | ReferenceUUID 470030 | | | 0..1 470032 | UUID 470034 |

FIG. 47-2

| Package | | | Level 1 | Level 2 | Level 3 | Level 4 | Level 5 | Cardinality | Data Type Name |
|---|---|---|---|---|---|---|---|---|---|
| | | | | | CreationDateTime 470036 | | | 1 470038 | GLOBAL_DateTime 470040 |
| | | | | | TestDataIndicator 470042 | | | 0..1 470044 | Indicator 470046 |
| | | | | | ReconciliationIndicator 470048 | | | 0..1 470050 | Indicator 470052 |
| | | | | | SenderBusinessSystemID 470054 | | | 0..1 470056 | BusinessSystemID 470058 |
| | | | | | RecipientBusinessSystemID 470060 | | | 0..1 470062 | BusinessSystemID 470064 |
| | | Party 470066 | | | SenderParty 470068 | | | 0..1 470070 | BusinessDocumentMessageHeaderParty 470072 |
| | | | | | | InternalID 470074 | | 0..1 470076 | PartyInternalID 470078 |

FIG. 47-3

| Package | Level 1 | Level 2 | Level 3 | Level 4 | Level 5 | Cardinality | Data Type Name |
|---|---|---|---|---|---|---|---|
| | | | | StandardID 470080 | | 0..N 470082 | PartyStandardID 470084 |
| | | | | ContactPerson 470086 | | 0..1 470088 | BusinessDocumentMessageHeaderPartyContactPerson 470090 |
| | | | | | InternalID 470092 | 0..1 470094 | ContactPersonInternalID 470096 |
| | | | | | OrganisationFormattedName 470098 | 0..N 470100 | LANGUAGEINDEPENDENT_MEDIUM_Name 470102 |
| | | | | | PersonFormattedName 470104 | 0..N 470106 | LANGUAGEINDEPENDENT_LONG_Name 470108 |
| | | | | | PhoneNumber 470112 | 0..N 470114 | PhoneNumber 470116 |
| | | | | | FaxNumber 470120 | 0..N 470122 | PhoneNumber 470124 |

FIG. 47-4

| Package | | | | Level 1 | Level 2 | Level 3 | Level 4 | Level 5 | Cardinality | Data Type Name |
|---|---|---|---|---|---|---|---|---|---|---|
| | | | | | | | | EmailURI<br>470126 | 0..N<br>470128 | EmailURI<br>470130 |
| | | | | | | RecipientParty<br>470134 | | | 0..N<br>470136 | BusinessDocumentMessageHeaderParty<br>470138 |
| | | | | | | | InternalID<br>470140 | | 0..1<br>470142 | PartyInternalID<br>470144 |
| | | | | | | | StandardID<br>470146 | | 0..N<br>470148 | PartyStandardID<br>470150 |
| | | | | | | | ContactPerson<br>470152 | | 0..1<br>470154 | BusinessDocumentMessageHeaderPartyContactPerson<br>470156 |
| | | | | | | | | InternalID<br>470158 | 0..1<br>470160 | ContactPersonInternalID<br>470162 |
| | | | | | | | | OrganisationFormattedName<br>470164 | 0..N<br>470166 | LANGUAGEINDEPENDENT_MEDIUM_Name<br>470168 |

FIG. 47-5

| Package | | | | Level 1 | Level 2 | Level 3 | Level 4 | Level 5 | Cardinality | Data Type Name |
|---|---|---|---|---|---|---|---|---|---|---|
| | | | | | | | | PersonFormattedName 470170 | 0..N 470172 | LANGUAGEINDEPENDENT_LONG_Name 470174 |
| | | | | | | | | PhoneNumber 470178 | 0..N 470180 | PhoneNumber 470182 |
| | | | | | | | | FaxNumber 470186 | 0..N 470188 | PhoneNumber 470190 |
| | | | | | | | | EmailURI 470192 | 0..N 470194 | EmailURI 470196 |
| | | Business Scope 470198 | | | | BusinessScope 470200 | | | 0..N 470202 | BusinessScope 470204 |
| | ExportMessage 470206 | | | | ExportMessage 470208 | | | | 1 470210 | ExportMessageSemanticErrorNotification 470212 |
| | | | | | | ExportMessageSubTypeCode 470214 | | | 0..1 470216 | ExportMessageSubTypeCode 470218 |

FIG. 47-6

| Package | | | Level 1 | Level 2 | Level 3 | Level 4 | Level 5 | Cardinality | Data Type Name |
|---|---|---|---|---|---|---|---|---|---|
| | | | | | MajorVersionCustomsAuthorityID 470220 | | | 0..1 470222 | VersionPartyID 470224 |
| | | | | | MinorVersionCustomsAuthorityID 470226 | | | 0..1 470228 | VersionPartyID 470230 |
| | | | | | MainTestCaseID 470232 | | | 0..1 470234 | TestCaseID 470236 |
| | | | | | SubTestCaseID 470238 | | | 0..1 470240 | TestCaseID 470242 |
| | | | | | CustomsProcessID 470244 | | | 0..1 470246 | CustomsProcessID 470248 |
| | | | | | CustomsProcessPartyID 470250 | | | 0..1 470252 | CustomsProcessID 470254 |
| | | | | | CustomsProcessCustomsAuthorityID 470256 | | | 0..1 470258 | CustomsProcessID 470260 |

FIG. 47-7

| Package | | | Level 1 | Level 2 | Level 3 | Level 4 | Level 5 | Cardinality | Data Type Name |
|---|---|---|---|---|---|---|---|---|---|
| | | | | | CommunicationDateTime 470262 | | | 0..1 470264 | GLOBAL_DateTime 470266 |
| | | | | | LogItem 470268 | | | 0..N 470270 | LogItem 470272 |
| | | | | | Document 470274 | | | 0..N 470276 | ExportMessageSemanticErrorNotificationDocument 470278 |
| | | | | | | DocumentTypeCode 470280 | | 0..1 470282 | DocumentTypeCode 470284 |
| | | | | | | FileContentBinaryObject 470286 | | 0..1 470288 | BinaryObject 470290 |

FIG. 48-1

| Package | Level 1 | Level 2 | Level 3 | Level 4 | Level 5 | Cardinality | Data Type Name |
|---|---|---|---|---|---|---|---|
| Export Message Syntax Error Notification<br>480000 | Export Message Syntax Error Notification<br>480002 | | | | | | ExportMessageSyntaxErrorNotificationMessage<br>480004 |
| | | Message Header<br>480006 | | | | 1<br>480008 | BusinessDocumentMessageHeader<br>480010 |
| | | | ID<br>480012 | | | 0..1<br>480014 | BusinessDocumentMessageID<br>480016 |
| | | | UUID<br>480018 | | | 0..1<br>480020 | UUID<br>480022 |
| | | | ReferenceID<br>480024 | | | 0..1<br>480026 | BusinessDocumentMessageID<br>480028 |
| | | | ReferenceUUID<br>480030 | | | 0..1<br>480032 | UUID<br>480034 |

FIG. 48-2

| Package | | | Level 1 | Level 2 | Level 3 | Level 4 | Level 5 | Cardinality | Data Type Name |
|---|---|---|---|---|---|---|---|---|---|
| | | | | | CreationDateTime 480036 | | | 1 480038 | GLOBAL_DateTime 480040 |
| | | | | | TestDataIndicator 480042 | | | 0..1 480044 | Indicator 480046 |
| | | | | | ReconciliationIndicator 480048 | | | 0..1 480050 | Indicator 480052 |
| | | | | | SenderBusinessSystemID 480054 | | | 0..1 480056 | BusinessSystemID 480058 |
| | | | | | RecipientBusinessSystemID 480060 | | | 0..1 480062 | BusinessSystemID 480064 |
| | | Party 480066 | | | SenderParty 480068 | | | 0..1 480070 | BusinessDocumentMessageHeaderParty 480072 |
| | | | | | | InternalID 480074 | | 0..1 480076 | PartyInternalID 480078 |

FIG. 48-3

| Package | Level 1 | Level 2 | Level 3 | Level 4 | Level 5 | Cardinality | Data Type Name |
|---|---|---|---|---|---|---|---|
| | | | | StandardID 480080 | | 0..N 480082 | PartyStandardID 480084 |
| | | | | ContactPerson 480086 | | 0..1 480088 | BusinessDocumentMessageHeaderPartyContactPerson 480090 |
| | | | | | InternalID 480092 | 0..1 480094 | ContactPersonInternalID 480096 |
| | | | | | OrganisationFormattedName 480098 | 0..N 480100 | LANGUAGEINDEPENDENT_MEDIUM_Name 480102 |
| | | | | | PersonFormattedName 480104 | 0..N 480106 | LANGUAGEINDEPENDENT_LONG_Name 480108 |
| | | | | | PhoneNumber 480112 | 0..N 480114 | PhoneNumber 480116 |
| | | | | | FaxNumber 480120 | 0..N 480122 | PhoneNumber 480124 |

FIG. 48-4

| Package | Level 1 | Level 2 | Level 3 | Level 4 | Level 5 | Cardinality | Data Type Name |
|---|---|---|---|---|---|---|---|
| | | | | | EmailURI 480126 | 0..N 480128 | EmailURI 480130 |
| | | | RecipientParty 480134 | | | 0..N 480136 | BusinessDocumentMessageHeaderParty 480138 |
| | | | | InternalID 480140 | | 0..1 480142 | PartyInternalID 480144 |
| | | | | StandardID 480146 | | 0..N 480148 | PartyStandardID 480150 |
| | | | | ContactPerson 480152 | | 0..1 480154 | BusinessDocumentMessageHeaderPartyContactPerson 480156 |
| | | | | | InternalID 480158 | 0..1 480160 | ContactPersonInternalID 480162 |
| | | | | | OrganisationFormattedName 480164 | 0..N 480166 | LANGUAGEINDEPENDENT_MEDIUM_Name 480168 |

FIG. 48-5

| Package | | | | Level 1 | Level 2 | Level 3 | Level 4 | Level 5 | Cardinality | Data Type Name |
|---|---|---|---|---|---|---|---|---|---|---|
| | | | | | | | | PersonFormattedName 480170 | 0..N 480172 | LANGUAGEINDEPENDENT_LONG_Name 480174 |
| | | | | | | | | PhoneNumber 480178 | 0..N 480180 | PhoneNumber 480182 |
| | | | | | | | | FaxNumber 480186 | 0..N 480188 | PhoneNumber 480190 |
| | | | | | | | | EmailURI 480192 | 0..N 480194 | EmailURI 480196 |
| | | Business Scope 480198 | | | | BusinessScope 480200 | | | 0..N 480202 | BusinessScope 480204 |
| | ExportMessage 480206 | | | | ExportMessage 480208 | | | | 1 480210 | ExportMessageSyntaxErrorNotification 480212 |
| | | | | | | ExportMessageSubTypeCode 480214 | | | 0..1 480216 | ExportMessageSubTypeCode 480218 |

FIG. 48-6

| Package | | | Level 1 | Level 2 | Level 3 | Level 4 | Level 5 | Cardinality | Data Type Name |
|---|---|---|---|---|---|---|---|---|---|
| | | | | | MajorVersionCustomsAuthorityID 480220 | | | 0..1 480222 | VersionPartyID 480224 |
| | | | | | MinorVersionCustomsAuthorityID 480226 | | | 0..1 480228 | VersionPartyID 480230 |
| | | | | | MainTestCaseID 480232 | | | 0..1 480234 | TestCaseID 480236 |
| | | | | | SubTestCaseID 480238 | | | 0..1 480240 | TestCaseID 480242 |
| | | | | | CommunicationDateTime 480244 | | | 0..1 480246 | GLOBAL_DateTime 480248 |
| | | | | | ReferenceCustomsMessageExchangeServerFileID 480250 | | | 0..1 480252 | CustomsMessageExchangeServerFileID 480254 |

FIG. 48-7

| Package | | | Level 1 | Level 2 | Level 3 | Level 4 | Level 5 | Cardinality | Data Type Name |
|---|---|---|---|---|---|---|---|---|---|
| | | | | | LogItem<br>480256 | | | 0..N<br>480258 | LogItem<br>480260 |
| | | | | | Document<br>480262 | | | 0..N<br>480264 | ExportMessageSyntaxErrorNotificationDocument<br>480266 |
| | | | | | | DocumentTypeCode<br>480268 | | 0..1<br>480270 | DocumentTypeCode<br>480272 |
| | | | | | | FileContentBinaryObject<br>480274 | | 0..1<br>480276 | BinaryObject<br>480278 |

FIG. 49-1

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| ExportProcessingInformationConfirmation 490000 | | | ExportProcessingInformationConfirmation 490002 | | | | | | | | | ExportProcessingInformationConfirmationMessage 490004 |
| | MessageHeader 490006 | | | MessageHeader 490008 | | | | | | | 1 490010 | BusinessDocumentMessageHeader 490012 |
| | | | | | ID 490014 | | | | | | 0..1 490016 | BusinessDocumentMessageID 490018 |
| | | | | | UUID 490020 | | | | | | 0..1 490022 | UUID 490024 |

FIG. 49-2

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | ReferenceID 490026 | | | | | | 0..1 490028 | BusinessDocumentMessageID 490030 |
| | | | ReferenceUUID 490032 | | | | | | 0..1 490034 | UUID 490036 |
| | | | CreationDateTime 490038 | | | | | | 1 490040 | GLOBAL_DateTime 490042 |
| | | | TestDataIndicator 490044 | | | | | | 0..1 490046 | Indicator 490048 |
| | | | ReconciliationIndicator 490050 | | | | | | 0..1 490052 | Indicator 490054 |

FIG. 49-3

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | SenderBusinessSystemID 490056 | | | | | | 0..1 490058 | BusinessSystemID 490060 |
| | | | RecipientBusinessSystemID 490062 | | | | | | 0..1 490064 | BusinessSystemID 490066 |
| Party 490068 | | | SenderParty 490070 | | | | | | 0..1 490072 | BusinessDocumentMessageHeaderParty 490074 |
| | | | | InternalID 490076 | | | | | 0..1 490078 | PartyInternalID 490080 |
| | | | | StandardID 490082 | | | | | 0..N 490084 | PartyStandardID 490086 |

FIG. 49-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ContactPerson 490088 | | | | | 0..1 490090 | BusinessDocumentMessageHeaderPartyContactPerson 490092 |
| | | | | | InternalID 490094 | | | | 0..1 490096 | ContactPersonInternalID 490098 |
| | | | | | OrganisationFormattedName 490100 | | | | 0..N 490102 | LANGUAGEINDEPENDENT_MEDIUM_Name 490104 |
| | | | | | PersonFormattedName 490106 | | | | 0..N 490108 | LANGUAGEINDEPENDENT_LONG_Name 490110 |
| | | | | | PhoneNumber 490114 | | | | 0..N 490116 | PhoneNumber 490118 |

FIG. 49-5

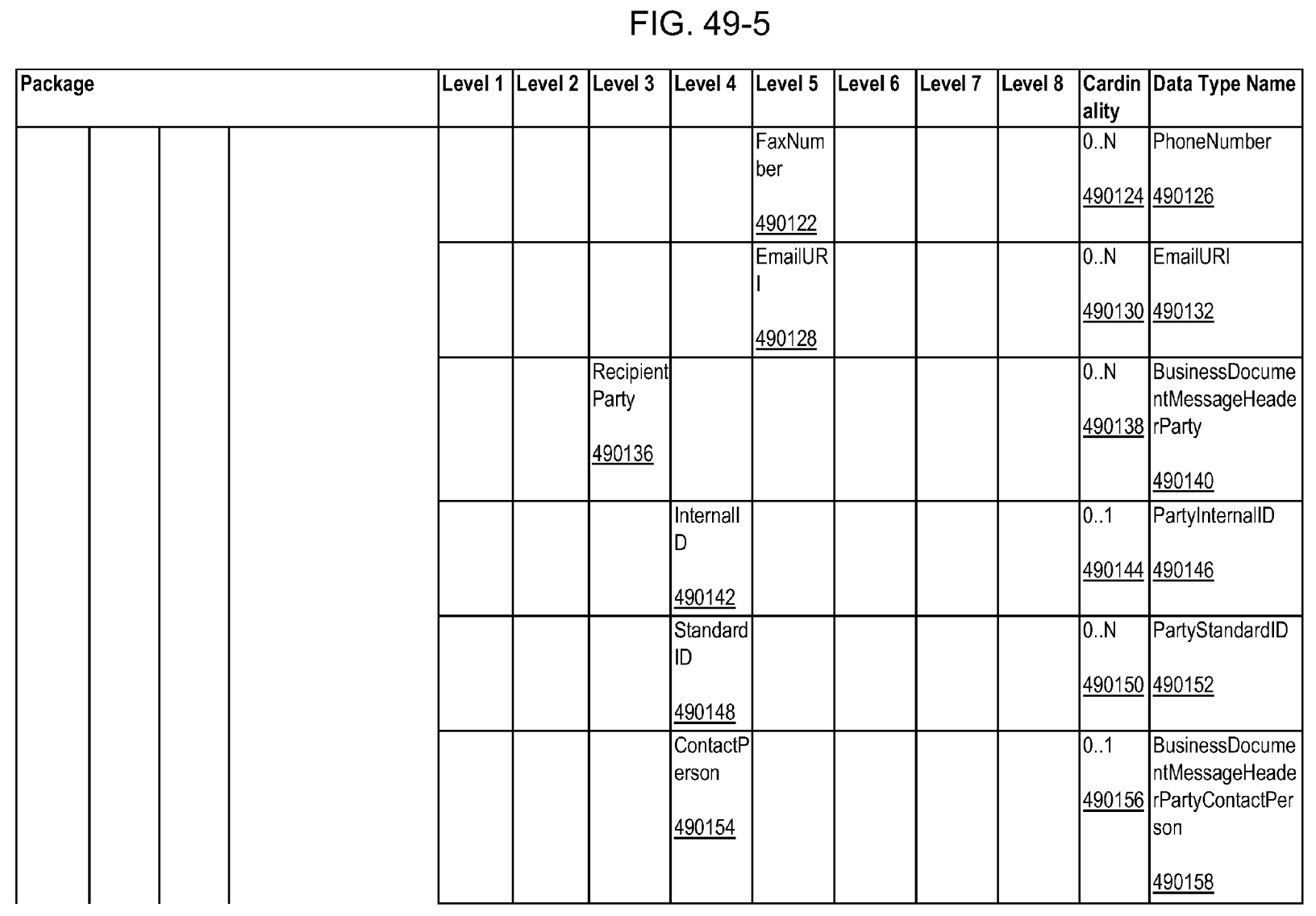

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FaxNumber 490122 | | | | 0..N 490124 | PhoneNumber 490126 |
| | | | | | EmailURI 490128 | | | | 0..N 490130 | EmailURI 490132 |
| | | | RecipientParty 490136 | | | | | | 0..N 490138 | BusinessDocumentMessageHeaderParty 490140 |
| | | | | InternalID 490142 | | | | | 0..1 490144 | PartyInternalID 490146 |
| | | | | StandardID 490148 | | | | | 0..N 490150 | PartyStandardID 490152 |
| | | | | ContactPerson 490154 | | | | | 0..1 490156 | BusinessDocumentMessageHeaderPartyContactPerson 490158 |

FIG. 49-6

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | InternalID 490160 | | | | 0..1 490162 | ContactPersonInternalID 490164 |
| | | | | | OrganisationFormattedName 490166 | | | | 0..N 490168 | LANGUAGEINDEPENDENT_MEDIUM_Name 490170 |
| | | | | | PersonFormattedName 490172 | | | | 0..N 490174 | LANGUAGEINDEPENDENT_LONG_Name 490176 |
| | | | | | PhoneNumber 490180 | | | | 0..N 490182 | PhoneNumber 490184 |
| | | | | | FaxNumber 490188 | | | | 0..N 490190 | PhoneNumber 490192 |

FIG. 49-7

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | EmailURI 490194 | | | | 0..N 490196 | EmailURI 490198 |
| | | Business Scope 490200 | | | | Business Scope 490202 | | | | | | 0..N 490204 | BusinessScope 490206 |
| | Export 490208 | | | | Export 490210 | | | | | | | 1 490212 | ExportProcessingInformationConfirmation 490214 |
| | | | | | | ExportMessageSubTypeCode 490216 | | | | | | 0..1 490218 | ExportMessageSubTypeCode 490220 |

FIG. 49-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | CustomsAuthorityCountryCode 490222 | | | | | | 0..1 490224 | CountryCode 490226 |
| | | | MajorVersionCustomsAuthorityID 490228 | | | | | | 0..1 490230 | VersionPartyID 490232 |
| | | | MinorVersionCustomsAuthorityID 490234 | | | | | | 0..1 490236 | VersionPartyID 490238 |
| | | | MainTestCaseID 490240 | | | | | | 0..1 490242 | TestCaseID 490244 |

FIG. 49-9

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | SubTestCaseID 490246 | | | | | | 0..1 490248 | TestCaseID 490250 |
| | | | CustomsMessageExchangeServerFileID 490252 | | | | | | 0..1 490254 | CustomsMessageExchangeServerFileID 490256 |
| | | | CustomsProcessCustomsAuthorityID 490258 | | | | | | 0..1 490260 | CustomsProcessID 490262 |
| | | | ExportExitStatusCode 490264 | | | | | | 0..1 490266 | ExportExitStatusCode 490268 |

FIG. 49-10

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | CustomsAuthenticationID 490270 | | | | | | 0..1 490272 | CustomsAuthenticationID 490274 |
| | | BasicText 490276 | | | | BasicText 490278 | | | | | | 0..N 490280 | TextCollectionBasicText 490282 |
| | | | | | | | TypeCode 490284 | | | | | 0..1 490286 | TextCollectionTextTypeCode 490288 |
| | | | | | | | ContentText 490290 | | | | | 1 490292 | Text 490294 |
| | | CustomsOffice 490296 | | | | CustomsOffice 490298 | | | | | | 0..N 490300 | ExportProcessingInformationConfirmationCustomsOffice 490302 |

FIG. 49-11

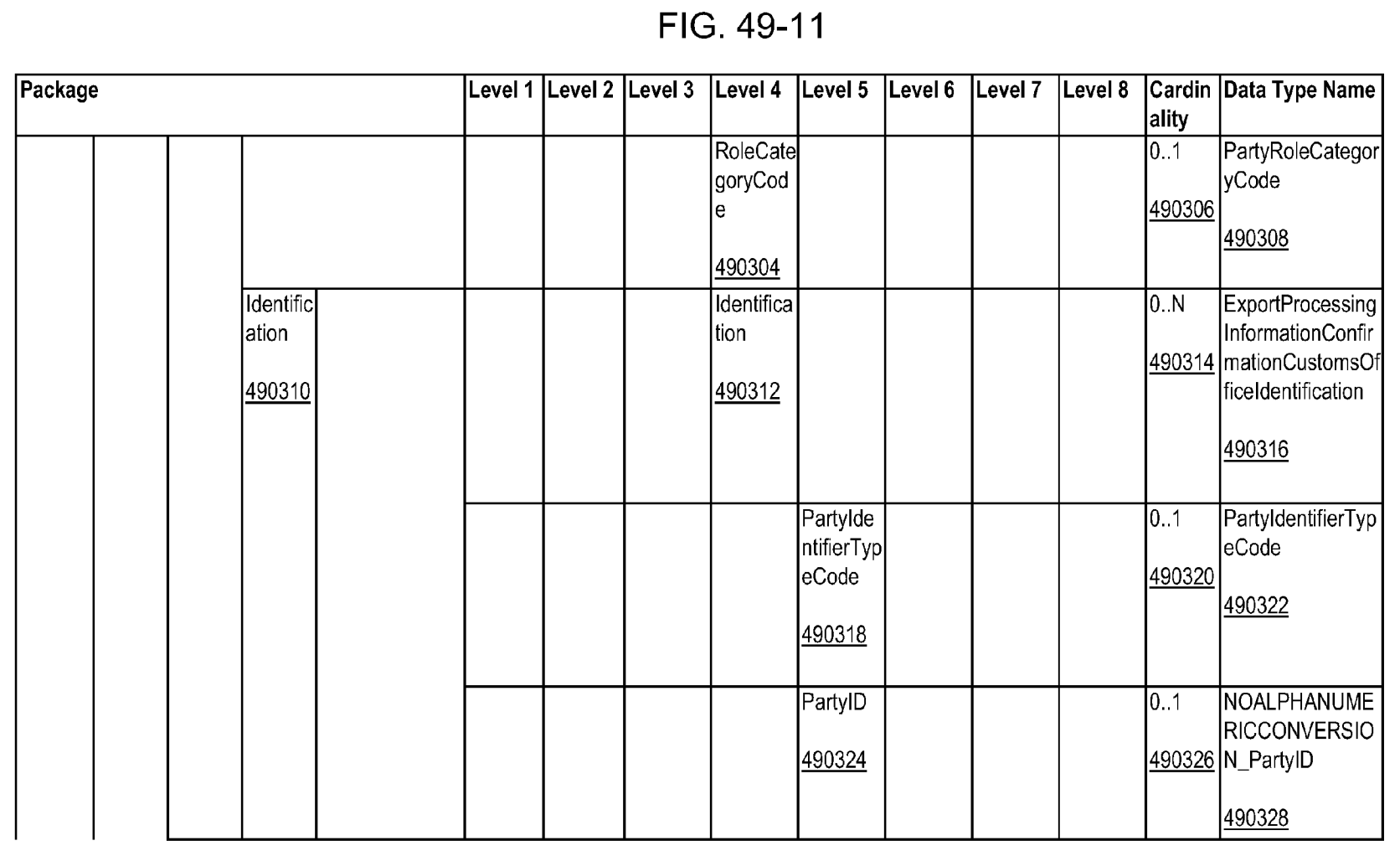

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | RoleCategoryCode 490304 | | | | | 0..1 490306 | PartyRoleCategoryCode 490308 |
| | | | Identification 490310 | | | | | Identification 490312 | | | | | 0..N 490314 | ExportProcessingInformationConfirmationCustomsOfficeIdentification 490316 |
| | | | | | | | | | PartyIdentifierTypeCode 490318 | | | | 0..1 490320 | PartyIdentifierTypeCode 490322 |
| | | | | | | | | | PartyID 490324 | | | | 0..1 490326 | NOALPHANUMERICCONVERSION_PartyID 490328 |

FIG. 49-12

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | Party 490330 | | | | Party 490332 | | | | | | 0..N 490334 | ExportProcessingInformationConfirmationParty 490336 |
| | | | | | | | RoleCategoryCode 490338 | | | | | 0..1 490340 | PartyRoleCategoryCode 490342 |
| | | | | | | | Address 490344 | | | | | 0..1 490346 | Address 490348 |
| | | | | | | | | OrganisationFormOfAddress 490350 | | | | 0..1 490352 | FormOfAddress 490354 |
| | | | | | | | | OrganisationFormattedName 490356 | | | | 0..N 490358 | LANGUAGEINDEPENDENT_MEDIUM_Name 490360 |

FIG. 49-13

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | PersonName 490362 | | | | 0..1 490364 | PersonName 490366 |
| | | | | | | | | | | FunctionalTitleName 490368 | | | | 0..1 490370 | LANGUAGEINDEPENDENT_MEDIUM_Name 490372 |
| | | | | | | | | | | DepartmentName 490374 | | | | 0..1 490376 | LANGUAGEINDEPENDENT_MEDIUM_Name 490378 |
| | | | | Address 490380 | | | | | | Office 490382 | | | | 0..1 490384 | Office 490386 |
| | | | | | | | | | | PhysicalAddress 490390 | | | | 0..1 490392 | PhysicalAddress 490394 |
| | | | | | | | | | | | CountryCode 490396 | | | 0..1 490398 | CountryCode 490400 |

FIG. 49-14

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Country Name 490402 | | | 0..1 490404 | MEDIUM_Name 490406 |
| | | | | | | RegionCode 490408 | | | 0..1 490410 | RegionCode 490412 |
| | | | | | | RegionName 490414 | | | 0..1 490416 | LANGUAGEINDEPENDENT_MEDIUM_Name 490418 |
| | | | | | | StreetPostalCode 490420 | | | 0..1 490422 | PostalCode 490424 |
| | | | | | | POBoxPostalCode 490426 | | | 0..1 490428 | PostalCode 490430 |

FIG. 49-15

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CompanyPostalCode 490432 | | | 0..1 490434 | PostalCode 490436 |
| | | | | | | CityName 490438 | | | 0..1 490440 | LANGUAGEINDEPENDENT_MEDIUM_Name 490442 |
| | | | | | | AdditionalCityName 490444 | | | 0..1 490446 | LANGUAGEINDEPENDENT_MEDIUM_Name 490448 |
| | | | | | | DistrictName 490450 | | | 0..1 490452 | LANGUAGEINDEPENDENT_MEDIUM_Name 490454 |
| | | | | | | POBoxID 490456 | | | 0..1 490458 | POBoxID 490460 |

FIG. 49-16

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxIndicator 490462 | | | 0..1 490464 | Indicator 490466 |
| | | | | | | POBoxCountryCode 490468 | | | 0..1 490470 | CountryCode 490472 |
| | | | | | | POBoxCountryName 490474 | | | 0..1 490476 | MEDIUM_Name 490478 |
| | | | | | | POBoxRegionCode 490480 | | | 0..1 490482 | RegionCode 490484 |
| | | | | | | POBoxRegionName 490486 | | | 0..1 490488 | LANGUAGEINDEPENDENT_MEDIUM_Name 490490 |

FIG. 49-17

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | POBoxCityName 490492 | | | 0..1 490494 | LANGUAGEINDEPENDENT_MEDIUM_Name 490496 |
| | | | | | | | | | | | StreetName 490498 | | | 0..1 490500 | StreetName 490502 |
| | | | | | | | | | | | StreetPrefixName 490504 | | | 0..N 490506 | LANGUAGEINDEPENDENT_MEDIUM_Name 490508 |
| | | | | | | | | | | | StreetSuffixName 490510 | | | 0..N 490512 | LANGUAGEINDEPENDENT_MEDIUM_Name 490514 |
| | | | | | | | | | | | HouseID 490516 | | | 0..1 490518 | HouseID 490520 |

FIG. 49-18

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | AdditionalHouseID 490522 | | | 0..1 490524 | HouseID 490526 |
| | | | | | | BuildingID 490528 | | | 0..1 490530 | BuildingID 490532 |
| | | | | | | FloorID 490534 | | | 0..1 490536 | FloorID 490538 |
| | | | | | | RoomID 490540 | | | 0..1 490542 | RoomID 490544 |
| | | | | | | CareOfName 490546 | | | 0..1 490548 | LANGUAGEINDEPENDENT_MEDIUM_Name 490550 |
| | | | | | | Description 490552 | | | 0..N 490554 | Description 490556 |

FIG. 49-19

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | TaxJurisdictionCode 490558 | | | | 0..1 490560 | TaxJurisdictionCode 490562 |
| | | | | | TimeZoneDifferenceValue 490564 | | | | 0..1 490566 | TimeZoneDifferenceValue 490568 |
| | | | | | GeoCoordinates 490570 | | | | 0..1 490572 | GeoCoordinates 490574 |
| | | | | | Communication 490578 | | | | 0..1 490580 | Communication 490582 |
| | | | | | | CorrespondenceLanguageCode 490584 | | | 0..1 490586 | LanguageCode 490588 |

FIG. 49-20

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageName 490590 | | | 0..1 490592 | MEDIUM_Name 490594 |
| | | | | | | Telephone 490596 | | | 0..N 490598 | Telephone 490600 |
| | | | | | | | Number 490602 | | 1 490604 | PhoneNumber 490606 |
| | | | | | | | SMSEnabledIndicator 490608 | | 0..1 490610 | Indicator 490612 |
| | | | | | | | NumberDefaultIndicator 490614 | | 1 490616 | Indicator 490618 |

FIG. 49-21

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number Description 490620 | | 0..N 490622 | Description 490624 |
| | | | | | | | Number UsageDenialIndicator 490626 | | 1 490628 | Indicator 490630 |
| | | | | | | MobilePhone 490632 | | | 0..N 490634 | Telephone 490636 |
| | | | | | | | Number 490638 | | 1 490640 | PhoneNumber 490642 |
| | | | | | | | SMSEnabledIndicator 490644 | | 0..1 490646 | Indicator 490648 |

FIG. 49-22

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | Number DefaultIndicator 490650 | | 1 490652 | Indicator 490654 |
| | | | | | | | | | | | | Number Description 490656 | | 0..N 490658 | Description 490660 |
| | | | | | | | | | | | | Number UsageDenialIndicator 490662 | | 1 490664 | Indicator 490666 |
| | | | | | | | | | | | Facsimile 490668 | | | 0..N 490670 | Facsimile 490672 |
| | | | | | | | | | | | | Number 490674 | | 1 490676 | PhoneNumber 490678 |

FIG. 49-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 490680 | | 1 490682 | Indicator 490684 |
| | | | | | | | NumberDescription 490686 | | 0..N 490688 | Description 490690 |
| | | | | | | | NumberUsageDenialIndicator 490692 | | 1 490694 | Indicator 490696 |
| | | | | | | Email 490698 | | | 0..N 490700 | Email 490702 |
| | | | | | | | URI 490704 | | 1 490706 | EmailURI 490708 |

FIG. 49-24

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 490710 | | 1 490712 | Indicator 490714 |
| | | | | | | | URIDescription 490716 | | 0..N 490718 | Description 490720 |
| | | | | | | | URIUsageDenialIndicator 490722 | | 1 490724 | Indicator 490726 |
| | | | | | | Web 490728 | | | 0..N 490730 | Web 490732 |
| | | | | | | | URI 490734 | | 1 490736 | WebURI 490738 |

FIG. 49-25

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | URIDefaultIndicator 490740 | | 1 490742 | Indicator 490744 |
| | | | | | | | | | | | | URIDescription 490746 | | 0..N 490748 | Description 490750 |
| | | | | | | | | | PostalRegulationsCompliantStreetDescription 490752 | | | | | 0..1 490754 | LANGUAGEINDEPENDENT_MEDIUM_Description 490756 |
| | | | PartyIdentification 490758 | | | | | | Identification 490760 | | | | | 0..N 490762 | ExportProcessingInformationConfirmationPartyIdentification 490764 |

FIG. 49-26

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | PartyIdentifierTypeCode 490766 | | | | 0..1 490768 | PartyIdentifierTypeCode 490770 |
| | | | | | | | | | | PartyID 490772 | | | | 0..1 490774 | NOALPHANUMERICCONVERSION_PartyID 490776 |
| | | | PartyContactParty 490778 | | | | | | ContactParty 490780 | | | | | 0..1 490782 | ExportProcessingInformationConfirmationPartyContactParty 490784 |
| | | | | | | | | | | Address 490786 | | | | 0..1 490788 | Address 490790 |
| | | | | | | | | | | | OrganisationFormOfAddress 490792 | | | 0..1 490794 | FormOfAddress 490796 |

FIG. 49-27

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | OrganisationFormattedName 490798 | | | 0..N 490800 | LANGUAGEINDEPENDENT_MEDIUM_Name 490802 |
| | | | | | | | | | | | PersonName 490804 | | | 0..1 490806 | PersonName 490808 |
| | | | | | | | | | | | FunctionalTitleName 490810 | | | 0..1 490812 | LANGUAGEINDEPENDENT_MEDIUM_Name 490814 |
| | | | | | | | | | | | DepartmentName 490816 | | | 0..1 490818 | LANGUAGEINDEPENDENT_MEDIUM_Name 490820 |
| | | | | | Address 490822 | | | | | | Office 490824 | | | 0..1 490826 | Office 490828 |

FIG. 49-28

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Physical Address 490832 | | | 0..1 490834 | PhysicalAddress 490836 |
| | | | | | | | Country Code 490838 | | 0..1 490840 | CountryCode 490842 |
| | | | | | | | Country Name 490844 | | 0..1 490846 | MEDIUM_Name 490848 |
| | | | | | | | RegionCode 490850 | | 0..1 490852 | RegionCode 490854 |
| | | | | | | | RegionName 490856 | | 0..1 490858 | LANGUAGEINDEPENDENT_MEDIUM_Name 490860 |
| | | | | | | | StreetPostalCode 490862 | | 0..1 490864 | PostalCode 490866 |

FIG. 49-29

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | POBoxPostalCode 490868 | | 0..1 490870 | PostalCode 490872 |
| | | | | | | | | | | | | CompanyPostalCode 490874 | | 0..1 490876 | PostalCode 490878 |
| | | | | | | | | | | | | CityName 490880 | | 0..1 490882 | LANGUAGEINDEPENDENT_MEDIUM_Name 490884 |
| | | | | | | | | | | | | AdditionalCityName 490886 | | 0..1 490888 | LANGUAGEINDEPENDENT_MEDIUM_Name 490890 |
| | | | | | | | | | | | | DistrictName 490892 | | 0..1 490894 | LANGUAGEINDEPENDENT_MEDIUM_Name 490896 |

FIG. 49-30

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxID 490898 | | 0..1 490900 | POBoxID 490902 |
| | | | | | | | POBoxIndicator 490904 | | 0..1 490906 | Indicator 490908 |
| | | | | | | | POBoxCountryCode 490910 | | 0..1 490912 | CountryCode 490914 |
| | | | | | | | POBoxCountryName 490916 | | 0..1 490918 | MEDIUM_Name 490920 |
| | | | | | | | POBoxRegionCode 490922 | | 0..1 490924 | RegionCode 490926 |

FIG. 49-31

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 490928 | | 0..1 490930 | LANGUAGEINDEPENDENT_MEDIUM_Name 490932 |
| | | | | | | | POBoxCityName 490934 | | 0..1 490936 | LANGUAGEINDEPENDENT_MEDIUM_Name 490938 |
| | | | | | | | StreetName 490940 | | 0..1 490942 | StreetName 490944 |
| | | | | | | | StreetPrefixName 490946 | | 0..N 490948 | LANGUAGEINDEPENDENT_MEDIUM_Name 490950 |
| | | | | | | | StreetSuffixName 490952 | | 0..N 490954 | LANGUAGEINDEPENDENT_MEDIUM_Name 490956 |

FIG. 49-32

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 490958 | | 0..1 490960 | HouseID 490962 |
| | | | | | | | AdditionalHouseID 490964 | | 0..1 490966 | HouseID 490968 |
| | | | | | | | BuildingID 490970 | | 0..1 490972 | BuildingID 490974 |
| | | | | | | | FloorID 490976 | | 0..1 490978 | FloorID 490980 |
| | | | | | | | RoomID 490982 | | 0..1 490984 | RoomID 490986 |
| | | | | | | | CareOfName 490988 | | 0..1 490990 | LANGUAGEINDEPENDENT_MEDIUM_Name 490992 |

FIG. 49-33

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 490994 | | 0..N 490996 | Description 490998 |
| | | | | | | TaxJurisdictionCode 491000 | | | 0..1 491002 | TaxJurisdictionCode 491004 |
| | | | | | | TimeZoneDifferenceValue 491006 | | | 0..1 491008 | TimeZoneDifferenceValue 491010 |
| | | | | | | GeoCoordinates 491012 | | | 0..1 491014 | GeoCoordinates 491016 |
| | | | | | | Communication 491020 | | | 0..1 491022 | Communication 491024 |

FIG. 49-34

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 491026 | | 0..1 491028 | LanguageCode 491030 |
| | | | | | | | CorrespondenceLanguageName 491032 | | 0..1 491034 | MEDIUM_Name 491036 |
| | | | | | | | Telephone 491038 | | 0..N 491040 | Telephone 491042 |
| | | | | | | | | Number 491044 | 1 491046 | PhoneNumber 491048 |
| | | | | | | | | SMSEnabledIndicator 491050 | 0..1 491052 | Indicator 491054 |

FIG. 49-35

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 491056 | 1 491058 | Indicator 491060 |
| | | | | | | | | NumberDescription 491062 | 0..N 491064 | Description 491066 |
| | | | | | | | | NumberUsageDenialIndicator 491068 | 1 491070 | Indicator 491072 |
| | | | | | | | MobilePhone 491074 | | 0..N 491076 | Telephone 491078 |
| | | | | | | | | Number 491080 | 1 491082 | PhoneNumber 491084 |

FIG. 49-36

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 491086 | 0..1 491088 | Indicator 491090 |
| | | | | | | | | NumberDefaultIndicator 491092 | 1 491094 | Indicator 491096 |
| | | | | | | | | NumberDescription 491098 | 0..N 491100 | Description 491102 |
| | | | | | | | | NumberUsageDenialIndicator 491104 | 1 491106 | Indicator 491108 |
| | | | | | | | Facsimile 491110 | | 0..N 491112 | Facsimile 491114 |

FIG. 49-37

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | | Number 491116 | 1 491118 | PhoneNumber 491120 |
| | | | | | | | | | | | | | NumberDefaultIndicator 491122 | 1 491124 | Indicator 491126 |
| | | | | | | | | | | | | | NumberDescription 491128 | 0..N 491130 | Description 491132 |
| | | | | | | | | | | | | | NumberUsageDenialIndicator 491134 | 1 491136 | Indicator 491138 |
| | | | | | | | | | | | | Email 491140 | | 0..N 491142 | Email 491144 |

FIG. 49-38

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URI 491146 | 1 491148 | EmailURI 491150 |
| | | | | | | | | URIDefaultIndicator 491152 | 1 491154 | Indicator 491156 |
| | | | | | | | | URIDescription 491158 | 0..N 491160 | Description 491162 |
| | | | | | | | | URIUsageDenialIndicator 491164 | 1 491166 | Indicator 491168 |
| | | | | | | | Web 491170 | | 0..N 491172 | Web 491174 |
| | | | | | | | | URI 491176 | 1 491178 | WebURI 491180 |

FIG. 49-39

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 491182 | 1 491184 | Indicator 491186 |
| | | | | | | | | URIDescription 491188 | 0..N 491190 | Description 491192 |
| | | | | | BusinessPartnerFormattedName 491194 | | | | 0..1 491196 | LANGUAGEINDEPENDENT_EXTENDED_Name 491198 |
| | | | | | FormattedConventionalPhoneNumberDescription 491200 | | | | 0..1 491202 | LANGUAGEINDEPENDENT_SHORT_Description 491204 |

FIG. 49-40

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | FormattedFacsimileNumberDescription 491206 | | | | 0..1 491208 | LANGUAGEINDEPENDENT_SHORT_Description 491210 |

FIG. 50-1

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| Export Processing Information Request 500000 | | | Export Processing Information Request 500002 | | | | | | | | | ExportProcessingInformationRequestMessage 500004 |
| | MessageHeader 500006 | | | MessageHeader 500008 | | | | | | | 1 500010 | BusinessDocumentMessageHeader 500012 |
| | | | | | ID 500014 | | | | | | 0..1 500016 | BusinessDocumentMessageID 500018 |
| | | | | | UUID 500020 | | | | | | 0..1 500022 | UUID 500024 |

FIG. 50-2

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | ReferenceID 500026 | | | | | | 0..1 500028 | BusinessDocumentMessageID 500030 |
| | | | ReferenceUUID 500032 | | | | | | 0..1 500034 | UUID 500036 |
| | | | CreationDateTime 500038 | | | | | | 1 500040 | GLOBAL_DateTime 500042 |
| | | | TestDataIndicator 500044 | | | | | | 0..1 500046 | Indicator 500048 |
| | | | ReconciliationIndicator 500050 | | | | | | 0..1 500052 | Indicator 500054 |

FIG. 50-3

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | SenderBusinessSystemID 500056 | | | | | | 0..1 500058 | BusinessSystemID 500060 |
| | | | | | | RecipientBusinessSystemID 500062 | | | | | | 0..1 500064 | BusinessSystemID 500066 |
| | | Party 500068 | | | | SenderParty 500070 | | | | | | 0..1 500072 | BusinessDocumentMessageHeaderParty 500074 |
| | | | | | | | InternalID 500076 | | | | | 0..1 500078 | PartyInternalID 500080 |
| | | | | | | | StandardID 500082 | | | | | 0..N 500084 | PartyStandardID 500086 |

FIG. 50-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ContactPerson 500088 | | | | | 0..1 500090 | BusinessDocumentMessageHeaderPartyContactPerson 500092 |
| | | | | | InternalID 500094 | | | | 0..1 500096 | ContactPersonInternalID 500098 |
| | | | | | OrganisationFormattedName 500100 | | | | 0..N 500102 | LANGUAGEINDEPENDENT_MEDIUM_Name 500104 |
| | | | | | PersonFormattedName 500106 | | | | 0..N 500108 | LANGUAGEINDEPENDENT_LONG_Name 500110 |
| | | | | | PhoneNumber 500114 | | | | 0..N 500116 | PhoneNumber 500118 |

FIG. 50-5

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FaxNumber 500122 | | | | 0..N 500124 | PhoneNumber 500126 |
| | | | | | EmailURI 500128 | | | | 0..N 500130 | EmailURI 500132 |
| | | | RecipientParty 500136 | | | | | | 0..N 500138 | BusinessDocumentMessageHeaderParty 500140 |
| | | | | InternalID 500142 | | | | | 0..1 500144 | PartyInternalID 500146 |
| | | | | StandardID 500148 | | | | | 0..N 500150 | PartyStandardID 500152 |
| | | | | ContactPerson 500154 | | | | | 0..1 500156 | BusinessDocumentMessageHeaderPartyContactPerson 500158 |

FIG. 50-6

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | InternalID 500160 | | | | 0..1 500162 | ContactPersonInternalID 500164 |
| | | | | | OrganisationFormattedName 500166 | | | | 0..N 500168 | LANGUAGEINDEPENDENT_MEDIUM_Name 500170 |
| | | | | | PersonFormattedName 500172 | | | | 0..N 500174 | LANGUAGEINDEPENDENT_LONG_Name 500176 |
| | | | | | PhoneNumber 500180 | | | | 0..N 500182 | PhoneNumber 500184 |
| | | | | | FaxNumber 500188 | | | | 0..N 500190 | PhoneNumber 500192 |

FIG. 50-7

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | EmailURI 500194 | | | | 0..N 500196 | EmailURI 500198 |
| | | Business Scope 500200 | | | | Business Scope 500202 | | | | | | 0..N 500204 | BusinessScope 500206 |
| | Export 500208 | | | | Export 500210 | | | | | | | 1 500212 | ExportProcessingInformationRequest 500214 |
| | | | | | | ExportMessageSubTypeCode 500216 | | | | | | 0..1 500218 | ExportMessageSubTypeCode 500220 |

FIG. 50-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | MajorVersionCustomsAuthorityID 500222 | | | | | | 0..1 500224 | VersionPartyID 500226 |
| | | | MinorVersionCustomsAuthorityID 500228 | | | | | | 0..1 500230 | VersionPartyID 500232 |
| | | | MainTestCaseID 500234 | | | | | | 0..1 500236 | TestCaseID 500238 |
| | | | SubTestCaseID 500240 | | | | | | 0..1 500242 | TestCaseID 500244 |

FIG. 50-9

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | CustomsProcessID 500246 | | | | | | 0..1 500248 | CustomsProcessID 500250 |
| | | | | | CustomsProcessCustomsAuthorityID 500252 | | | | | | 0..1 500254 | CustomsProcessID 500256 |
| | | | | | ExportPartyRepresentationCode 500258 | | | | | | 0..1 500260 | ExportPartyRepresentationCode 500262 |
| | | | | | CommunicationDateTime 500264 | | | | | | 0..1 500266 | GLOBAL_DateTime 500268 |

FIG. 50-10

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | Request Date 500270 | | | | | | 0..1 500272 | Date 500274 |
| | | | | | | | ResponseDeadlineDate 500276 | | | | | | 0..1 500278 | Date 500280 |
| | | CustomsOffice 500282 | | | | | Customs Office 500284 | | | | | | 0..N 500286 | ExportProcessingInformationRequestCustomsOffice 500288 |
| | | | | | | | | RoleCategoryCode 500290 | | | | | 0..1 500292 | PartyRoleCategoryCode 500294 |
| | | | Identification 500296 | | | | | Identification 500298 | | | | | 0..N 500300 | ExportProcessingInformationRequestCustomsOfficeIdentification 500302 |

FIG. 50-11

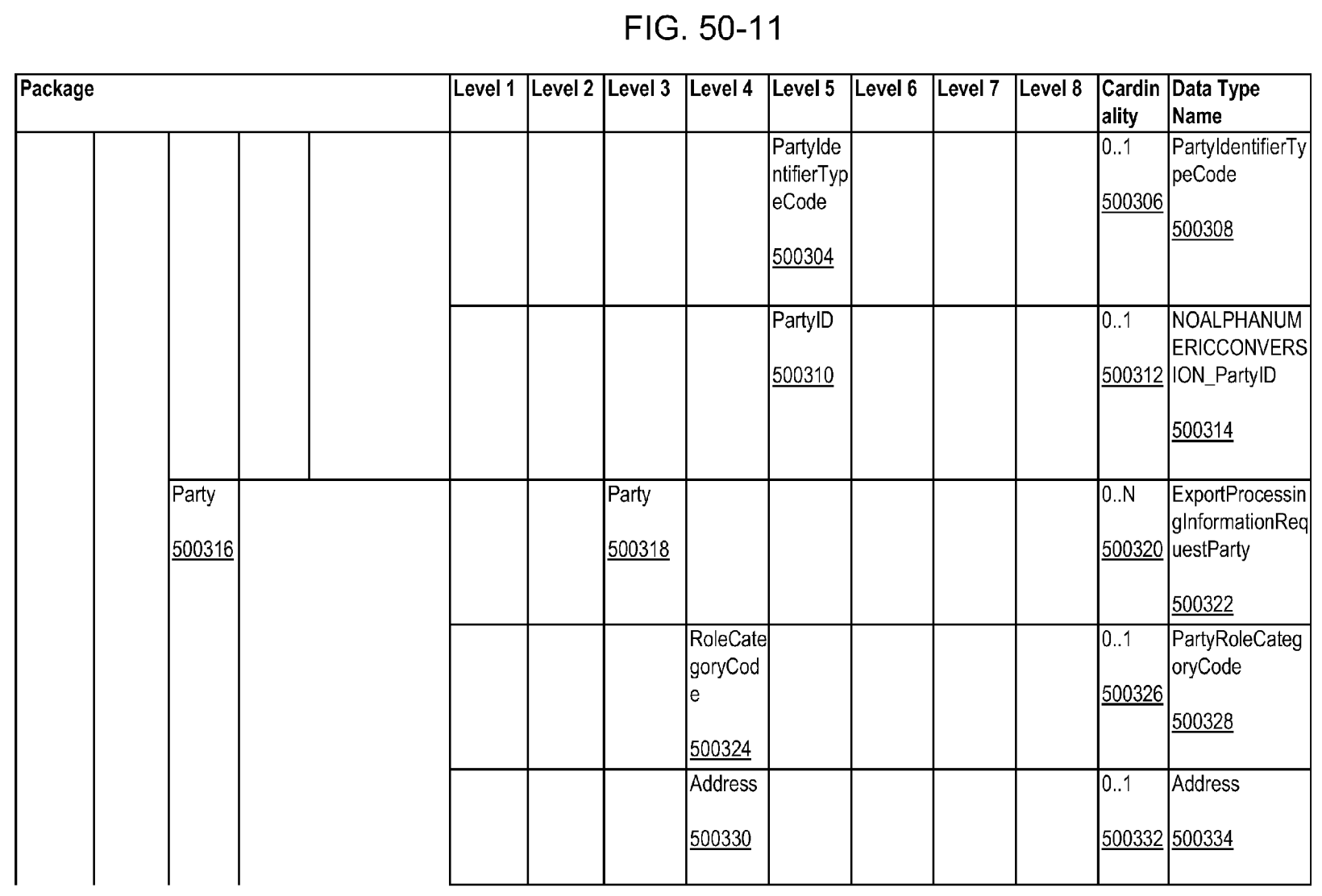

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | PartyIdentifierTypeCode 500304 | | | | 0..1 500306 | PartyIdentifierTypeCode 500308 |
| | | | | | | | | | PartyID 500310 | | | | 0..1 500312 | NOALPHANUMERICCONVERSION_PartyID 500314 |
| | | Party 500316 | | | | | Party 500318 | | | | | | 0..N 500320 | ExportProcessingInformationRequestParty 500322 |
| | | | | | | | | RoleCategoryCode 500324 | | | | | 0..1 500326 | PartyRoleCategoryCode 500328 |
| | | | | | | | | Address 500330 | | | | | 0..1 500332 | Address 500334 |

FIG. 50-12

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormOfAddress 500336 | | | | 0..1 500338 | FormOfAddress 500340 |
| | | | | | OrganisationFormattedName 500342 | | | | 0..N 500344 | LANGUAGEINDEPENDENT_MEDIUM_Name 500346 |
| | | | | | PersonName 500348 | | | | 0..1 500350 | PersonName 500352 |
| | | | | | FunctionalTitleName 500354 | | | | 0..1 500356 | LANGUAGEINDEPENDENT_MEDIUM_Name 500358 |

FIG. 50-13

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | DepartmentName 500360 | | | | 0..1 500362 | LANGUAGEINDEPENDENT_MEDIUM_Name 500364 |
| | | | | Address 500366 | | | | | | Office 500368 | | | | 0..1 500370 | Office 500372 |
| | | | | | | | | | | Physical Address 500376 | | | | 0..1 500378 | PhysicalAddress 500380 |
| | | | | | | | | | | | Country Code 500382 | | | 0..1 500384 | CountryCode 500386 |
| | | | | | | | | | | | Country Name 500388 | | | 0..1 500390 | MEDIUM_Name 500392 |
| | | | | | | | | | | | RegionCode 500394 | | | 0..1 500396 | RegionCode 500398 |

FIG. 50-14

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | RegionName 500400 | | | 0..1 500402 | LANGUAGEINDEPENDENT_MEDIUM_Name 500404 |
| | | | | | | StreetPostalCode 500406 | | | 0..1 500408 | PostalCode 500410 |
| | | | | | | POBoxPostalCode 500412 | | | 0..1 500414 | PostalCode 500416 |
| | | | | | | CompanyPostalCode 500418 | | | 0..1 500420 | PostalCode 500422 |
| | | | | | | CityName 500424 | | | 0..1 500426 | LANGUAGEINDEPENDENT_MEDIUM_Name 500428 |

FIG. 50-15

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | AdditionalCityName 500430 | | | 0..1 500432 | LANGUAGEINDEPENDENT_MEDIUM_Name 500434 |
| | | | | | | DistrictName 500436 | | | 0..1 500438 | LANGUAGEINDEPENDENT_MEDIUM_Name 500440 |
| | | | | | | POBoxID 500442 | | | 0..1 500444 | POBoxID 500446 |
| | | | | | | POBoxIndicator 500448 | | | 0..1 500450 | Indicator 500452 |
| | | | | | | POBoxCountryCode 500454 | | | 0..1 500456 | CountryCode 500458 |

FIG. 50-16

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | POBoxCountryName 500460 | | | 0..1 500462 | MEDIUM_Name 500464 |
| | | | | | | | | | | | POBoxRegionCode 500466 | | | 0..1 500468 | RegionCode 500470 |
| | | | | | | | | | | | POBoxRegionName 500472 | | | 0..1 500474 | LANGUAGEINDEPENDENT_MEDIUM_Name 500476 |
| | | | | | | | | | | | POBoxCityName 500478 | | | 0..1 500480 | LANGUAGEINDEPENDENT_MEDIUM_Name 500482 |
| | | | | | | | | | | | StreetName 500484 | | | 0..1 500486 | StreetName 500488 |

FIG. 50-17

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetPrefixName 500490 | | | 0..N 500492 | LANGUAGEINDEPENDENT_MEDIUM_Name 500494 |
| | | | | | | StreetSuffixName 500496 | | | 0..N 500498 | LANGUAGEINDEPENDENT_MEDIUM_Name 500500 |
| | | | | | | HouseID 500502 | | | 0..1 500504 | HouseID 500506 |
| | | | | | | AdditionalHouseID 500508 | | | 0..1 500510 | HouseID 500512 |
| | | | | | | BuildingID 500514 | | | 0..1 500516 | BuildingID 500518 |

FIG. 50-18

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | FloorID 500520 | | | 0..1 500522 | FloorID 500524 |
| | | | | | | | | | | | RoomID 500526 | | | 0..1 500528 | RoomID 500530 |
| | | | | | | | | | | | CareOfName 500532 | | | 0..1 500534 | LANGUAGEINDEPENDENT_MEDIUM_Name 500536 |
| | | | | | | | | | | | Description 500538 | | | 0..N 500540 | Description 500542 |
| | | | | | | | | | | TaxJurisdictionCode 500544 | | | | 0..1 500546 | TaxJurisdictionCode 500548 |

FIG. 50-19

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | TimeZoneDifferenceValue 500550 | | | | 0..1 500552 | TimeZoneDifferenceValue 500554 |
| | | | | | GeoCoordinates 500556 | | | | 0..1 500558 | GeoCoordinates 500560 |
| | | | | | Communication 500564 | | | | 0..1 500566 | Communication 500568 |
| | | | | | | CorrespondenceLanguageCode 500570 | | | 0..1 500572 | LanguageCode 500574 |

FIG. 50-20

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | CorrespondenceLanguageName 500576 | | | 0..1 500578 | MEDIUM_Name 500580 |
| | | | | | | | | | | | Telephone 500582 | | | 0..N 500584 | Telephone 500586 |
| | | | | | | | | | | | | Number 500588 | | 1 500590 | PhoneNumber 500592 |
| | | | | | | | | | | | | SMSEnabledIndicator 500594 | | 0..1 500596 | Indicator 500598 |
| | | | | | | | | | | | | NumberDefaultIndicator 500600 | | 1 500602 | Indicator 500604 |

FIG. 50-21

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | NumberDescription 500606 | | 0..N 500608 | Description 500610 |
| | | | | | | | | | | | | NumberUsageDenialIndicator 500612 | | 1 500614 | Indicator 500616 |
| | | | | | | | | | | | MobilePhone 500618 | | | 0..N 500620 | Telephone 500622 |
| | | | | | | | | | | | | Number 500624 | | 1 500626 | PhoneNumber 500628 |
| | | | | | | | | | | | | SMSEnabledIndicator 500630 | | 0..1 500632 | Indicator 500634 |

FIG. 50-22

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 500636 | | 1 500638 | Indicator 500640 |
| | | | | | | | NumberDescription 500642 | | 0..N 500644 | Description 500646 |
| | | | | | | | NumberUsageDenialIndicator 500648 | | 1 500650 | Indicator 500652 |
| | | | | | | Facsimile 500654 | | | 0..N 500656 | Facsimile 500658 |
| | | | | | | | Number 500660 | | 1 500662 | PhoneNumber 500664 |

FIG. 50-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 500666 | | 1 500668 | Indicator 500670 |
| | | | | | | | NumberDescription 500672 | | 0..N 500674 | Description 500676 |
| | | | | | | | NumberUsageDenialIndicator 500678 | | 1 500680 | Indicator 500682 |
| | | | | | | Email 500684 | | | 0..N 500686 | Email 500688 |
| | | | | | | | URI 500690 | | 1 500692 | EmailURI 500694 |

FIG. 50-24

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 500696 | | 1 500698 | Indicator 500700 |
| | | | | | | | URIDescription 500702 | | 0..N 500704 | Description 500706 |
| | | | | | | | URIUsageDenialIndicator 500708 | | 1 500710 | Indicator 500712 |
| | | | | | | Web 500714 | | | 0..N 500716 | Web 500718 |
| | | | | | | | URI 500720 | | 1 500722 | WebURI 500724 |

FIG. 50-25

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | URIDefaultIndicator 500726 | | 1 500728 | Indicator 500730 |
| | | | | | | | | | | | | URIDescription 500732 | | 0..N 500734 | Description 500736 |
| | | | | | | | | | PostalRegulationsCompliantStreetDescription 500738 | | | | | 0..1 500740 | LANGUAGEINDEPENDENT_MEDIUM_Description 500742 |
| | | | PartyIdentification 500744 | | | | | | Identification 500746 | | | | | 0..N 500748 | ExportProcessingInformationRequestPartyIdentification 500750 |

FIG. 50-26

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | PartyIdentifierTypeCode 500752 | | | | 0..1 500754 | PartyIdentifierTypeCode 500756 |
| | | | | | | | | | PartyID 500758 | | | | 0..1 500760 | NOALPHANUMERICCONVERSION_PartyID 500762 |
| | | | PartyContactParty 500764 | | | | | ContactParty 500766 | | | | | 0..1 500768 | ExportProcessingInformationRequestPartyContactParty 500770 |
| | | | | | | | | | Address 500772 | | | | 0..1 500774 | Address 500776 |

FIG. 50-27

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormOfAddress 500778 | | | 0..1 500780 | FormOfAddress 500782 |
| | | | | | | OrganisationFormattedName 500784 | | | 0..N 500786 | LANGUAGEINDEPENDENT_MEDIUM_Name 500788 |
| | | | | | | PersonName 500790 | | | 0..1 500792 | PersonName 500794 |
| | | | | | | FunctionalTitleName 500796 | | | 0..1 500798 | LANGUAGEINDEPENDENT_MEDIUM_Name 500800 |

FIG. 50-28

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | DepartmentName 500802 | | | 0..1 500804 | LANGUAGEINDEPENDENT_MEDIUM_Name 500806 |
| | | | | | Address 500808 | | | | | | Office 500810 | | | 0..1 500812 | Office 500814 |
| | | | | | | | | | | | Physical Address 500818 | | | 0..1 500820 | PhysicalAddress 500822 |
| | | | | | | | | | | | | Country Code 500824 | | 0..1 500826 | CountryCode 500828 |
| | | | | | | | | | | | | Country Name 500830 | | 0..1 500832 | MEDIUM_Name 500834 |
| | | | | | | | | | | | | RegionCode 500836 | | 0..1 500838 | RegionCode 500840 |

FIG. 50-29

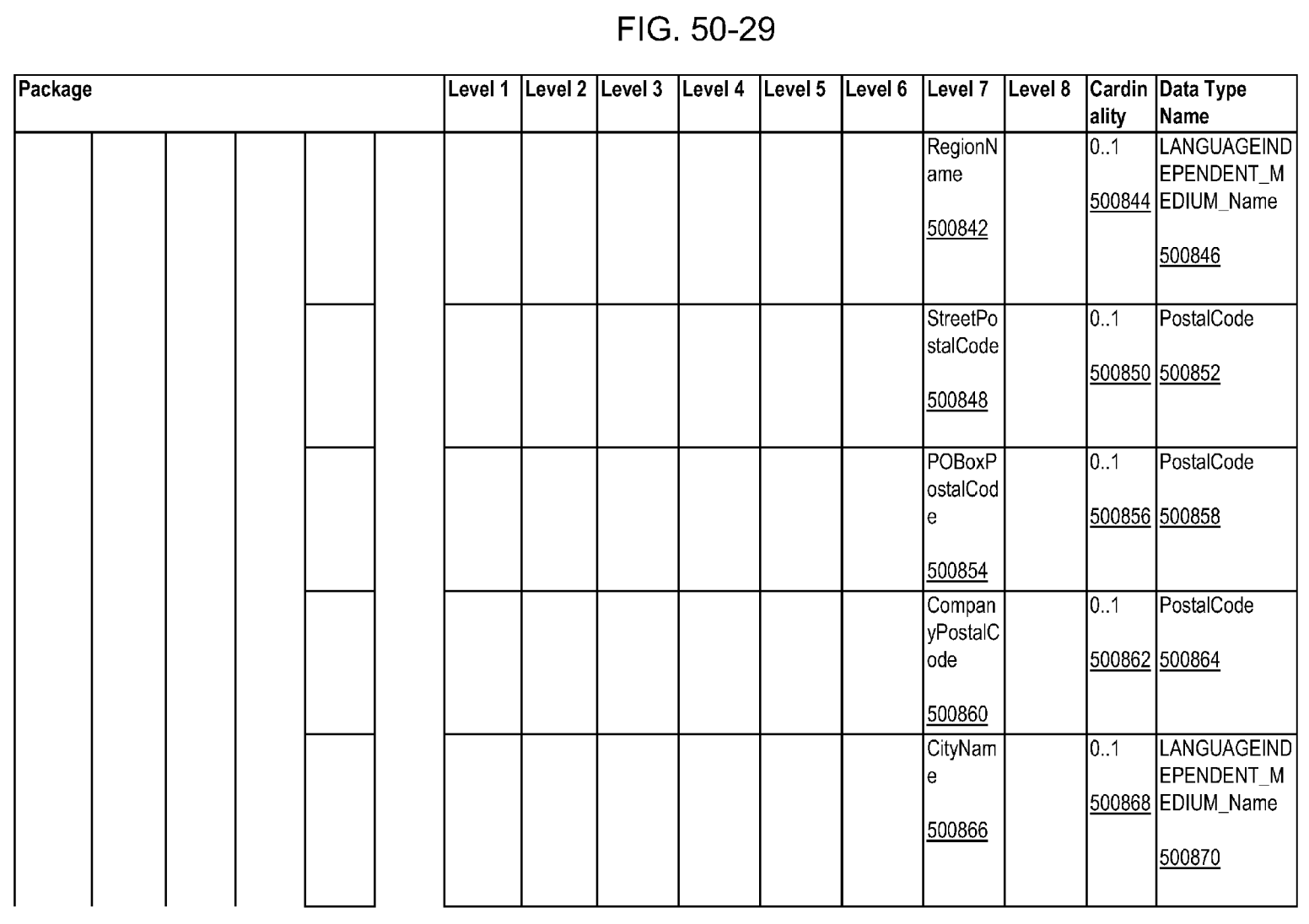

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | RegionName 500842 | | 0..1 500844 | LANGUAGEINDEPENDENT_MEDIUM_Name 500846 |
| | | | | | | | StreetPostalCode 500848 | | 0..1 500850 | PostalCode 500852 |
| | | | | | | | POBoxPostalCode 500854 | | 0..1 500856 | PostalCode 500858 |
| | | | | | | | CompanyPostalCode 500860 | | 0..1 500862 | PostalCode 500864 |
| | | | | | | | CityName 500866 | | 0..1 500868 | LANGUAGEINDEPENDENT_MEDIUM_Name 500870 |

FIG. 50-30

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | AdditionalCityName 500872 | | 0..1 500874 | LANGUAGEINDEPENDENT_MEDIUM_Name 500876 |
| | | | | | | | | | | | | DistrictName 500878 | | 0..1 500880 | LANGUAGEINDEPENDENT_MEDIUM_Name 500882 |
| | | | | | | | | | | | | POBoxID 500884 | | 0..1 500886 | POBoxID 500888 |
| | | | | | | | | | | | | POBoxIndicator 500890 | | 0..1 500892 | Indicator 500894 |
| | | | | | | | | | | | | POBoxCountryCode 500896 | | 0..1 500898 | CountryCode 500900 |

FIG. 50-31

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxCountryName 500902 | | 0..1 500904 | MEDIUM_Name 500906 |
| | | | | | | | POBoxRegionCode 500908 | | 0..1 500910 | RegionCode 500912 |
| | | | | | | | POBoxRegionName 500914 | | 0..1 500916 | LANGUAGEINDEPENDENT_MEDIUM_Name 500918 |
| | | | | | | | POBoxCityName 500920 | | 0..1 500922 | LANGUAGEINDEPENDENT_MEDIUM_Name 500924 |
| | | | | | | | StreetName 500926 | | 0..1 500928 | StreetName 500930 |

FIG. 50-32

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | StreetPrefixName 500932 | | 0..N 500934 | LANGUAGEINDEPENDENT_MEDIUM_Name 500936 |
| | | | | | | | | | | | | StreetSuffixName 500938 | | 0..N 500940 | LANGUAGEINDEPENDENT_MEDIUM_Name 500942 |
| | | | | | | | | | | | | HouseID 500944 | | 0..1 500946 | HouseID 500948 |
| | | | | | | | | | | | | AdditionalHouseID 500950 | | 0..1 500952 | HouseID 500954 |
| | | | | | | | | | | | | BuildingID 500956 | | 0..1 500958 | BuildingID 500960 |

FIG. 50-33

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | FloorID 500962 | | 0..1 500964 | FloorID 500966 |
| | | | | | | | RoomID 500968 | | 0..1 500970 | RoomID 500972 |
| | | | | | | | CareOfName 500974 | | 0..1 500976 | LANGUAGEINDEPENDENT_MEDIUM_Name 500978 |
| | | | | | | | Description 500980 | | 0..N 500982 | Description 500984 |
| | | | | | | TaxJurisdictionCode 500986 | | | 0..1 500988 | TaxJurisdictionCode 500990 |

FIG. 50-34

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | TimeZoneDifferenceValue 500992 | | | 0..1 500994 | TimeZoneDifferenceValue 500996 |
| | | | | | | GeoCoordinates 500998 | | | 0..1 501000 | GeoCoordinates 501002 |
| | | | | | | Communication 501006 | | | 0..1 501008 | Communication 501010 |
| | | | | | | | CorrespondenceLanguageCode 501012 | | 0..1 501014 | LanguageCode 501016 |

FIG. 50-35

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | CorrespondenceLanguageName 501018 | | 0..1 501020 | MEDIUM_Name 501022 |
| | | | | | | | | | | | | Telephone 501024 | | 0..N 501026 | Telephone 501028 |
| | | | | | | | | | | | | | Number 501030 | 1 501032 | PhoneNumber 501034 |
| | | | | | | | | | | | | | SMSEnabledIndicator 501036 | 0..1 501038 | Indicator 501040 |
| | | | | | | | | | | | | | NumberDefaultIndicator 501042 | 1 501044 | Indicator 501046 |

FIG. 50-36

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDescription 501048 | 0..N 501050 | Description 501052 |
| | | | | | | | | NumberUsageDenialIndicator 501054 | 1 501056 | Indicator 501058 |
| | | | | | | | MobilePhone 501060 | | 0..N 501062 | Telephone 501064 |
| | | | | | | | | Number 501066 | 1 501068 | PhoneNumber 501070 |
| | | | | | | | | SMSEnabledIndicator 501072 | 0..1 501074 | Indicator 501076 |

FIG. 50-37

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | | Number DefaultIndicator 501078 | 1 501080 | Indicator 501082 |
| | | | | | | | | | | | | | Number Description 501084 | 0..N 501086 | Description 501088 |
| | | | | | | | | | | | | | Number UsageDenialIndicator 501090 | 1 501092 | Indicator 501094 |
| | | | | | | | | | | | | Facsimile 501096 | | 0..N 501098 | Facsimile 501100 |
| | | | | | | | | | | | | | Number 501102 | 1 501104 | PhoneNumber 501106 |

FIG. 50-38

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 501108 | 1 501110 | Indicator 501112 |
| | | | | | | | | NumberDescription 501114 | 0..N 501116 | Description 501118 |
| | | | | | | | | NumberUsageDenialIndicator 501120 | 1 501122 | Indicator 501124 |
| | | | | | | | Email 501126 | | 0..N 501128 | Email 501130 |
| | | | | | | | | URI 501132 | 1 501134 | EmailURI 501136 |

FIG. 50-39

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | | URIDefaultIndicator 501138 | 1 501140 | Indicator 501142 |
| | | | | | | | | | | | | | URIDescription 501144 | 0..N 501146 | Description 501148 |
| | | | | | | | | | | | | | URIUsageDenialIndicator 501150 | 1 501152 | Indicator 501154 |
| | | | | | | | | | | | | Web 501156 | | 0..N 501158 | Web 501160 |
| | | | | | | | | | | | | | URI 501162 | 1 501164 | WebURI 501166 |

FIG. 50-40

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 501168 | 1 501170 | Indicator 501172 |
| | | | | | | | | URIDescription 501174 | 0..N 501176 | Description 501178 |
| | | | | | BusinessPartnerFormattedName 501180 | | | | 0..1 501182 | LANGUAGEINDEPENDENT_EXTENDED_Name 501184 |
| | | | | | FormattedConventionalPhoneNumberDescription 501186 | | | | 0..1 501188 | LANGUAGEINDEPENDENT_SHORT_Description 501190 |

FIG. 50-41

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | FormattedFacsimileNumberDescription 501192 | | | | 0..1 501194 | LANGUAGEINDEPENDENT_SHORT_Description 501196 |
| | | Document 501198 | | | | | | Document 501200 | | | | | | 0..N 501202 | ExportProcessingInformationRequestDocument 501204 |
| | | | | | | | | | DocumentTypeCode 501206 | | | | | 0..1 501208 | DocumentTypeCode 501210 |
| | | | | | | | | | FileContentBinaryObject 501212 | | | | | 0..1 501214 | FileContentBinaryObject 501216 |

FIG. 51-1

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| ExportProcessingNotification 510000 | ExportProcessingNotification 510002 | | | | | | | | | | ExportProcessingNotificationMessage 510004 |
| | | MessageHeader 510006 | | | | | | | | 1 510008 | BusinessDocumentMessageHeader 510010 |
| | | | ID 510012 | | | | | | | 0..1 510014 | BusinessDocumentMessageID 510016 |
| | | | UUID 510018 | | | | | | | 0..1 510020 | UUID 510022 |

FIG. 51-2

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | ReferenceID 510024 | | | | | | | 0..1 510026 | BusinessDocumentMessageID 510028 |
| | | | | | | | | | ReferenceUUID 510030 | | | | | | | 0..1 510032 | UUID 510034 |
| | | | | | | | | | CreationDateTime 510036 | | | | | | | 1 510038 | GLOBAL_DateTime 510040 |
| | | | | | | | | | TestDataIndicator 510042 | | | | | | | 0..1 510044 | Indicator 510046 |

FIG. 51-3

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | ReconciliationIndicator 510048 | | | | | | | 0..1 510050 | Indicator 510052 |
| | | | | | | | | | SenderBusinessSystemID 510054 | | | | | | | 0..1 510056 | BusinessSystemID 510058 |
| | | | | | | | | | RecipientBusinessSystemID 510060 | | | | | | | 0..1 510062 | BusinessSystemID 510064 |

FIG. 51-4

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Party 510066 | | | | Sender Party 510068 | | | | | | | 0..1 510070 | BusinessDocumentMessageHeaderParty 510072 |
| | | | | | | | Internal ID 510074 | | | | | | 0..1 510076 | PartyInternalID 510078 |
| | | | | | | | StandardID 510080 | | | | | | 0..N 510082 | PartyStandardID 510084 |
| | | | | | | | Contact Person 510086 | | | | | | 0..1 510088 | BusinessDocumentMessageHeaderPartyContactPerson 510090 |

FIG. 51-5

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | InternalID 510092 | | | | | 0..1 510094 | ContactPersonInternalID 510096 |
| | | | | | OrganisationFormattedName 510098 | | | | | 0..N 510100 | LANGUAGEINDEPENDENT_MEDIUM_Name 510102 |
| | | | | | PersonFormattedName 510104 | | | | | 0..N 510106 | LANGUAGEINDEPENDENT_LONG_Name 510108 |
| | | | | | PhoneNumber 510112 | | | | | 0..N 510114 | PhoneNumber 510116 |

FIG. 51-6

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | FaxNumber 510120 | | | | | 0..N 510122 | PhoneNumber 510124 |
| | | | | | EmailURI 510126 | | | | | 0..N 510128 | EmailURI 510130 |
| | | | RecipientParty 510134 | | | | | | | 0..N 510136 | BusinessDocumentMessageHeaderParty 510138 |
| | | | | InternalID 510140 | | | | | | 0..1 510142 | PartyInternalID 510144 |
| | | | | StandardID 510146 | | | | | | 0..N 510148 | PartyStandardID 510150 |

FIG. 51-7

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Contact Person 510152 | | | | | | 0..1 510154 | BusinessDocumentMessageHeaderPartyContactPerson 510156 |
| | | | | | Internal ID 510158 | | | | | 0..1 510160 | ContactPersonInternalID 510162 |
| | | | | | OrganisationFormattedName 510164 | | | | | 0..N 510166 | LANGUAGEINDEPENDENT_MEDIUM_Name 510168 |

FIG. 51-8

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | | | PersonFormattedName 510170 | | | | | 0..N 510172 | LANGUAGEINDEPENDENT_LONG_Name 510174 |
| | | | | | | | | PhoneNumber 510178 | | | | | 0..N 510180 | PhoneNumber 510182 |
| | | | | | | | | FaxNumber 510186 | | | | | 0..N 510188 | PhoneNumber 510190 |
| | | | | | | | | EmailURI 510192 | | | | | 0..N 510194 | EmailURI 510196 |

FIG. 51-9

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Business Scope 510198 | | | | BusinessScope 510200 | | | | | | | 0..N 510202 | BusinessScope 510204 |
| | Export 510206 | | | | ExportProcessingNotification 510208 | | | | | | | | 1 510210 | ExportProcessingNotification 510212 |
| | | | | | | ExportMessageSubTypeCode 510214 | | | | | | | 0..1 510216 | ExportMessageSubTypeCode 510218 |

FIG. 51-10

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | MajorVersionCustomsAuthorityID 510220 | | | | | | | 0..1 510222 | VersionPartyID 510224 |
| | | | MinorVersionCustomsAuthorityID 510226 | | | | | | | 0..1 510228 | VersionPartyID 510230 |
| | | | MainTestCaseID 510232 | | | | | | | 0..1 510234 | TestCaseID 510236 |

FIG. 51-11

| Package | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|
| | | | | | SubTestCaseID 510238 | | | | | | | 0..1 510240 | TestCaseID 510242 |
| | | | | | CustomsProcessID 510244 | | | | | | | 0..1 510246 | CustomsProcessID 510248 |
| | | | | | CustomsProcessPartyID 510250 | | | | | | | 0..1 510252 | CustomsProcessID 510254 |

FIG. 51-12

| Package | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|
| | | | | | CustomsProcessCustomsAuthorityID 510256 | | | | | | | 0..1 510258 | CustomsProcessID 510260 |
| | | | | | ExportDeclarationTypeCode 510262 | | | | | | | 0..1 510264 | ExportDeclarationTypeCode 510266 |
| | | | | | ExportTypeCode 510268 | | | | | | | 0..1 510270 | ExportTypeCode 510272 |

FIG. 51-13

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportExportingCountryCode 510274 | | | | | | | 0..1 510276 | ExportExportingCountryCode 510278 |
| | | | ExportDestinationCountryCode 510280 | | | | | | | 0..1 510282 | ExportDestinationCountryCode 510284 |
| | | | ExportPartyRepresentationCode 510286 | | | | | | | 0..1 510288 | ExportPartyRepresentationCode 510290 |

FIG. 51-14

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ItemTotalNumberValue 510292 | | | | | | | 0..1 510294 | NumberValue 510296 |
| | | | TotalGrossWeightQuantity 510298 | | | | | | | 0..1 510300 | Quantity 510302 |
| | | | TotalGrossWeightQuantityTypeCode 510304 | | | | | | | 0..1 510306 | QuantityTypeCode 510308 |

FIG. 51-15

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ConsignmentExportID 510310 | | | | | | | 0..1 510312 | ConsignmentExportID 510314 |
| | | | PackageTotalNumberValue 510316 | | | | | | | 0..1 510318 | NumberValue 510320 |
| | | | ExportBusinessTransactionTypeCode 510322 | | | | | | | 0..1 510324 | ExportBusinessTransactionTypeCode 510326 |

FIG. 51-16

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | InvoiceTotalNetAmount 510328 | | | | | | | 0..1 510330 | Amount 510332 |
| | | | | | | ExportIncotermsClassificationCode 510334 | | | | | | | 0..1 510336 | ExportIncotermsClassificationCode 510338 |
| | | | | | | ExportIncotermsClassificationDescription 510340 | | | | | | | 0..1 510342 | LANGUAGEINDEPENDENT_MEDIUM_Description 510344 |

FIG. 51-17

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ExportIncotermsTransferLocationName 510346 | | | | | | | 0..1 510348 | IncotermsTransferLocationName 510350 |
| | | | CommunicationDateTime 510352 | | | | | | | 0..1 510354 | GLOBAL_DateTime 510356 |
| | | | ShortfallIndicator 510358 | | | | | | | 0..1 510360 | Indicator 510362 |

FIG. 51-18

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | ExportExitConfirmationMethodCode 510364 | | | | | | | 0..1 510366 | ExportExitConfirmationMethodCode 510368 |
| | | TimePoint 510370 | | | | TimePoint 510372 | | | | | | | 0..N 510374 | ExportProcessingNotificationTimePoint 510376 |
| | | | | | | | TimePointRoleCode 510378 | | | | | | 0..1 510380 | TimePointRoleCode 510382 |
| | | | | | | | DateTime 510384 | | | | | | 0..1 510386 | GLOBAL_DateTime 510388 |

FIG. 51-19

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | Date 510390 | | | | | | 0..1 510392 | Date 510394 |
| | | CustomsOffice 510396 | | | | | CustomsOffice 510398 | | | | | | | 0..N 510400 | ExportProcessingNotificationCustomsOffice 510402 |
| | | | | | | | | RoleCategoryCode 510404 | | | | | | 0..1 510406 | PartyRoleCategoryCode 510408 |
| | | | Identification 510410 | | | | | Identification 510412 | | | | | | 0..N 510414 | ExportProcessingNotificationCustomsOfficeIdentification 510416 |

FIG. 51-20

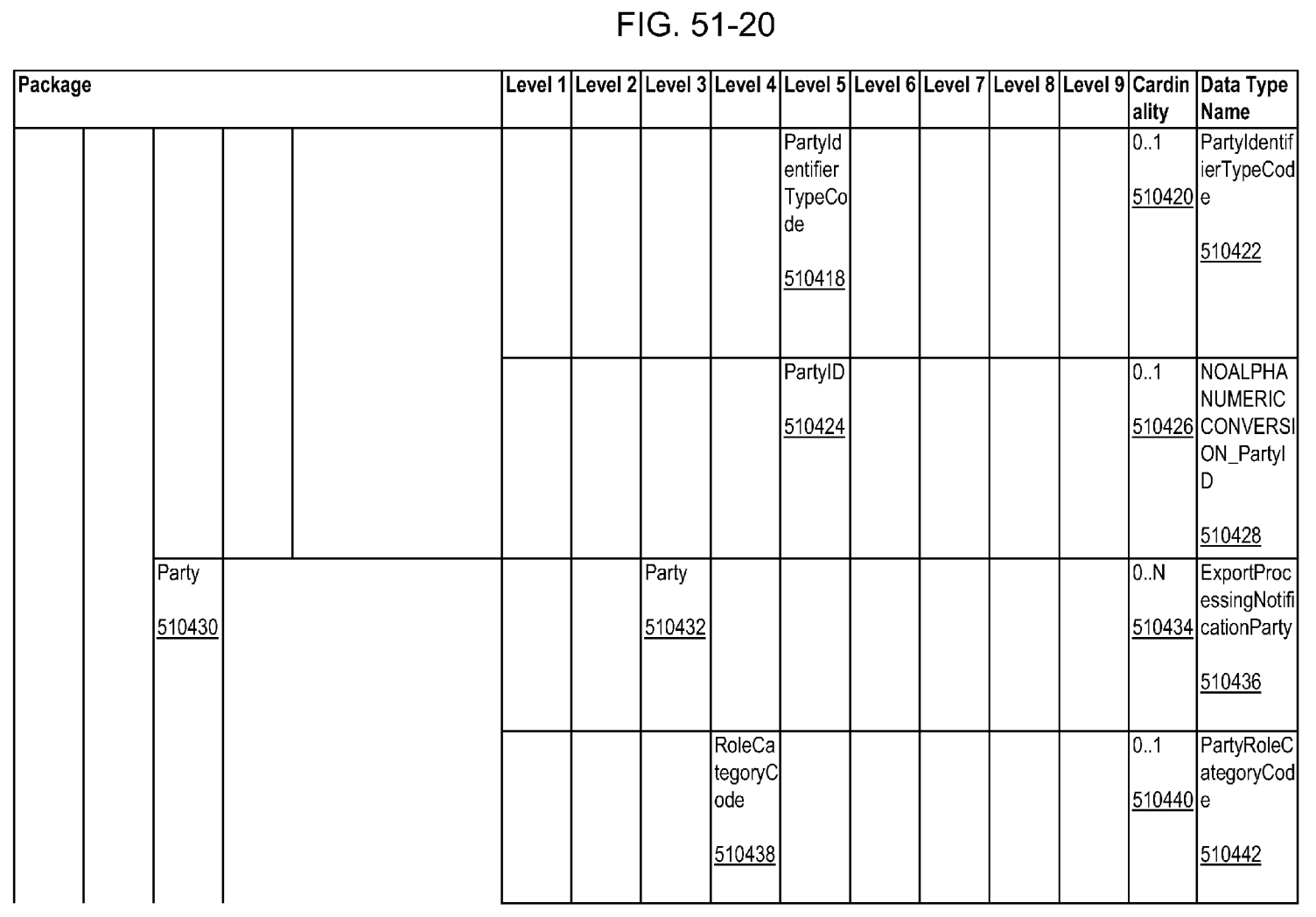

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | PartyIdentifierTypeCode 510418 | | | | | 0..1 510420 | PartyIdentifierTypeCode 510422 |
| | | | | | | | | | PartyID 510424 | | | | | 0..1 510426 | NOALPHANUMERICCONVERSION_PartyID 510428 |
| | | Party 510430 | | | | | Party 510432 | | | | | | | 0..N 510434 | ExportProcessingNotificationParty 510436 |
| | | | | | | | | RoleCategoryCode 510438 | | | | | | 0..1 510440 | PartyRoleCategoryCode 510442 |

FIG. 51-21

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Address 510444 | | | | | | 0..1 510446 | Address 510448 |
| | | | | | OrganisationFormOfAddress 510450 | | | | | 0..1 510452 | FormOfAddress 510454 |
| | | | | | OrganisationFormattedName 510456 | | | | | 0..N 510458 | LANGUAGEINDEPENDENT_MEDIUM_Name 510460 |
| | | | | | PersonName 510462 | | | | | 0..1 510464 | PersonName 510466 |

FIG. 51-22

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | FunctionalTitleName 510468 | | | | | 0..1 510470 | LANGUAGEINDEPENDENT_MEDIUM_Name 510472 |
| | | | | | | | | | | DepartmentName 510474 | | | | | 0..1 510476 | LANGUAGEINDEPENDENT_MEDIUM_Name 510478 |
| | | | | Address 510480 | | | | | | Office 510482 | | | | | 0..1 510484 | Office 510486 |
| | | | | | | | | | | PhysicalAddress 510490 | | | | | 0..1 510492 | PhysicalAddress 510494 |

FIG. 51-23

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Country Code 510496 | | | | 0..1 510498 | CountryCode 510500 |
| | | | | | | Country Name 510502 | | | | 0..1 510504 | MEDIUM_Name 510506 |
| | | | | | | Region Code 510508 | | | | 0..1 510510 | RegionCode 510512 |
| | | | | | | Region Name 510514 | | | | 0..1 510516 | LANGUAGEINDEPENDENT_MEDIUM_Name 510518 |

FIG. 51-24

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetPostalCode 510520 | | | | 0..1 510522 | PostalCode 510524 |
| | | | | | | POBoxPostalCode 510526 | | | | 0..1 510528 | PostalCode 510530 |
| | | | | | | CompanyPostalCode 510532 | | | | 0..1 510534 | PostalCode 510536 |
| | | | | | | CityName 510538 | | | | 0..1 510540 | LANGUAGEINDEPENDENT_MEDIUM_Name 510542 |

FIG. 51-25

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalCityName 510544 | | | | 0..1 510546 | LANGUAGEINDEPENDENT_MEDIUM_Name 510548 |
| | | | | | | DistrictName 510550 | | | | 0..1 510552 | LANGUAGEINDEPENDENT_MEDIUM_Name 510554 |
| | | | | | | POBoxID 510556 | | | | 0..1 510558 | POBoxID 510560 |
| | | | | | | POBoxIndicator 510562 | | | | 0..1 510564 | Indicator 510566 |

FIG. 51-26

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Country Code 510568 | | | | 0..1 510570 | CountryCode 510572 |
| | | | | | | POBox Country Name 510574 | | | | 0..1 510576 | MEDIUM_ Name 510578 |
| | | | | | | POBox Region Code 510580 | | | | 0..1 510582 | RegionCode 510584 |

FIG. 51-27

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBox Region Name 510586 | | | | 0..1 510588 | LANGUAGEINDEPENDENT_MEDIUM_Name 510590 |
| | | | | | | POBox CityName 510592 | | | | 0..1 510594 | LANGUAGEINDEPENDENT_MEDIUM_Name 510596 |
| | | | | | | StreetName 510598 | | | | 0..1 510600 | StreetName 510602 |
| | | | | | | StreetPrefixName 510604 | | | | 0..N 510606 | LANGUAGEINDEPENDENT_MEDIUM_Name 510608 |

FIG. 51-28

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetSuffixName 510610 | | | | 0..N 510612 | LANGUAGEINDEPENDENT_MEDIUM_Name 510614 |
| | | | | | | HouseID 510616 | | | | 0..1 510618 | HouseID 510620 |
| | | | | | | AdditionalHouseID 510622 | | | | 0..1 510624 | HouseID 510626 |
| | | | | | | BuildingID 510628 | | | | 0..1 510630 | BuildingID 510632 |

FIG. 51-29

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FloorID 510634 | | | | 0..1 510636 | FloorID 510638 |
| | | | | | | RoomID 510640 | | | | 0..1 510642 | RoomID 510644 |
| | | | | | | CareOfName 510646 | | | | 0..1 510648 | LANGUAGEINDEPENDENT_MEDIUM_Name 510650 |
| | | | | | | Description 510652 | | | | 0..N 510654 | Description 510656 |

FIG. 51-30

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TaxJurisdictionCode 510658 | | | | | 0..1 510660 | TaxJurisdictionCode 510662 |
| | | | | | TimeZoneDifferenceValue 510664 | | | | | 0..1 510666 | TimeZoneDifferenceValue 510668 |
| | | | | | GeoCoordinates 510670 | | | | | 0..1 510672 | GeoCoordinates 510674 |
| | | | | | Communication 510678 | | | | | 0..1 510680 | Communication 510682 |

FIG. 51-31

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 510684 | | | | 0..1 510686 | LanguageCode 510688 |
| | | | | | | CorrespondenceLanguageName 510690 | | | | 0..1 510692 | MEDIUM_Name 510694 |
| | | | | | | Telephone 510696 | | | | 0..N 510698 | Telephone 510700 |

FIG. 51-32

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number <u>510702</u> | | | 1 <u>510704</u> | PhoneNumber <u>510706</u> |
| | | | | | | | SMSEnabledIndicator <u>510708</u> | | | 0..1 <u>510710</u> | Indicator <u>510712</u> |
| | | | | | | | NumberDefaultIndicator <u>510714</u> | | | 1 <u>510716</u> | Indicator <u>510718</u> |
| | | | | | | | NumberDescription <u>510720</u> | | | 0..N <u>510722</u> | Description <u>510724</u> |

FIG. 51-33

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 510726 | | | 1 510728 | Indicator 510730 |
| | | | | | | Mobile Phone 510732 | | | | 0..N 510734 | Telephone 510736 |
| | | | | | | | Number 510738 | | | 1 510740 | PhoneNumber 510742 |
| | | | | | | | SMSEnabledIndicator 510744 | | | 0..1 510746 | Indicator 510748 |

FIG. 51-34

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberDefaultIndicator 510750 | | | 1 510752 | Indicator 510754 |
| | | | | | | | NumberDescription 510756 | | | 0..N 510758 | Description 510760 |
| | | | | | | | NumberUsageDenialIndicator 510762 | | | 1 510764 | Indicator 510766 |
| | | | | | | Facsimile 510768 | | | | 0..N 510770 | Facsimile 510772 |

FIG. 51-35

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Number 510774 | | | 1 510776 | PhoneNumber 510778 |
| | | | | | | | NumberDefaultIndicator 510780 | | | 1 510782 | Indicator 510784 |
| | | | | | | | NumberDescription 510786 | | | 0..N 510788 | Description 510790 |
| | | | | | | | NumberUsageDenialIndicator 510792 | | | 1 510794 | Indicator 510796 |

FIG. 51-36

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Email 510798 | | | | 0..N 510800 | Email 510802 |
| | | | | | | | URI 510804 | | | 1 510806 | EmailURI 510808 |
| | | | | | | | URIDefaultIndicator 510810 | | | 1 510812 | Indicator 510814 |
| | | | | | | | URIDescription 510816 | | | 0..N 510818 | Description 510820 |
| | | | | | | | URIUsageDenialIndicator 510822 | | | 1 510824 | Indicator 510826 |

FIG. 51-37

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Web 510828 | | | | 0..N 510830 | Web 510832 |
| | | | | | | | URI 510834 | | | 1 510836 | WebURI 510838 |
| | | | | | | | URIDefaultIndicator 510840 | | | 1 510842 | Indicator 510844 |
| | | | | | | | URIDescription 510846 | | | 0..N 510848 | Description 510850 |

FIG. 51-38

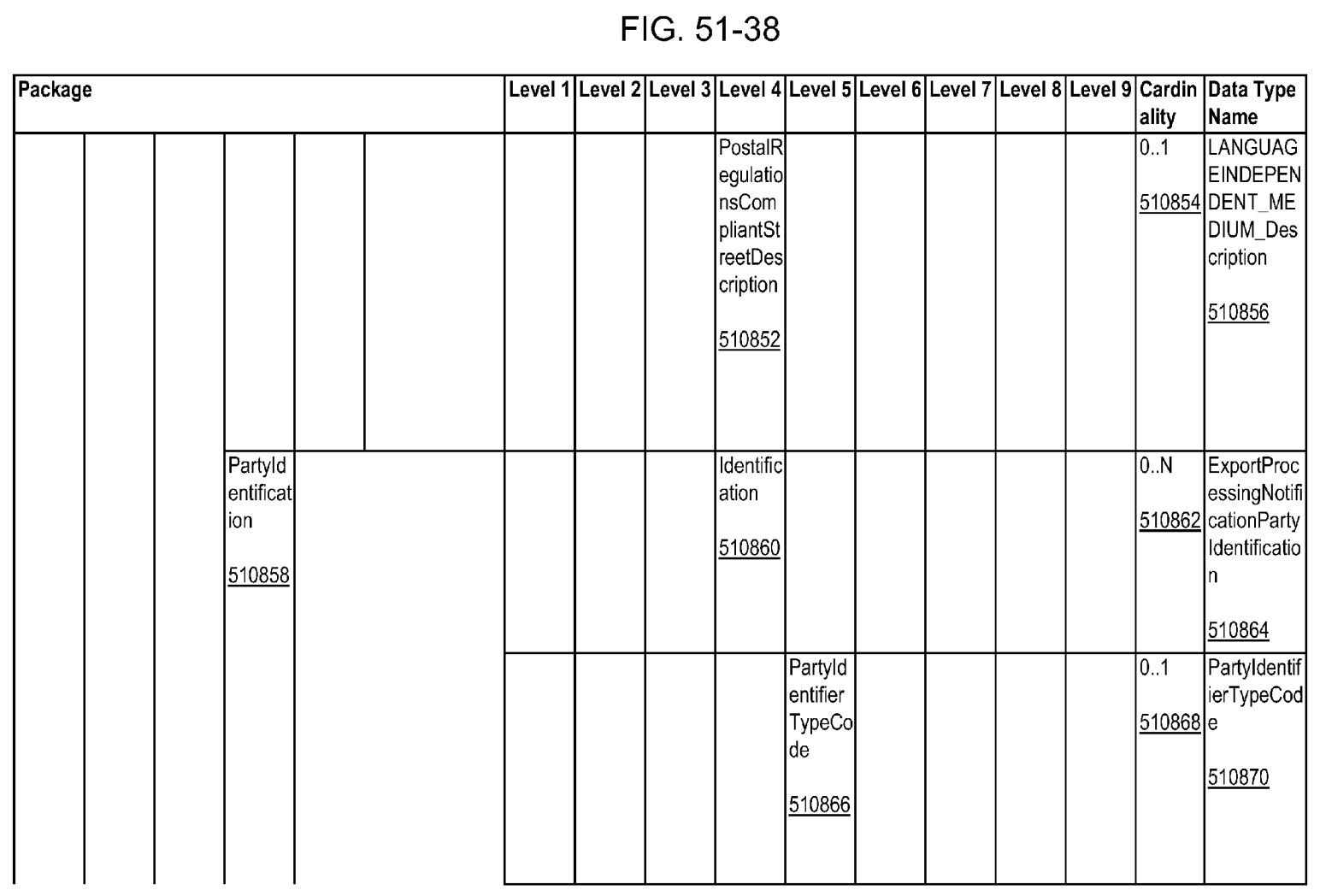

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | PostalRegulationsCompliantStreetDescription 510852 | | | | | | 0..1 510854 | LANGUAGEINDEPENDENT_MEDIUM_Description 510856 |
| | | | PartyIdentification 510858 | | | | | | Identification 510860 | | | | | | 0..N 510862 | ExportProcessingNotificationPartyIdentification 510864 |
| | | | | | | | | | | PartyIdentifierTypeCode 510866 | | | | | 0..1 510868 | PartyIdentifierTypeCode 510870 |

FIG. 51-39

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | PartyID 510872 | | | | | 0..1 510874 | NOALPHANUMERICCONVERSION_PartyID 510876 |
| | | | PartyContactParty 510878 | | | | | ContactParty 510880 | | | | | | 0..1 510882 | ExportProcessingNotificationPartyContactParty 510884 |
| | | | | | | | | | Address 510886 | | | | | 0..1 510888 | Address 510890 |
| | | | | | | | | | | OrganisationFormOfAddress 510892 | | | | 0..1 510894 | FormOfAddress 510896 |

FIG. 51-40

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormattedName 510898 | | | | 0..N 510900 | LANGUAGEINDEPENDENT_MEDIUM_Name 510902 |
| | | | | | | PersonName 510904 | | | | 0..1 510906 | PersonName 510908 |
| | | | | | | FunctionalTitleName 510910 | | | | 0..1 510912 | LANGUAGEINDEPENDENT_MEDIUM_Name 510914 |

FIG. 51-41

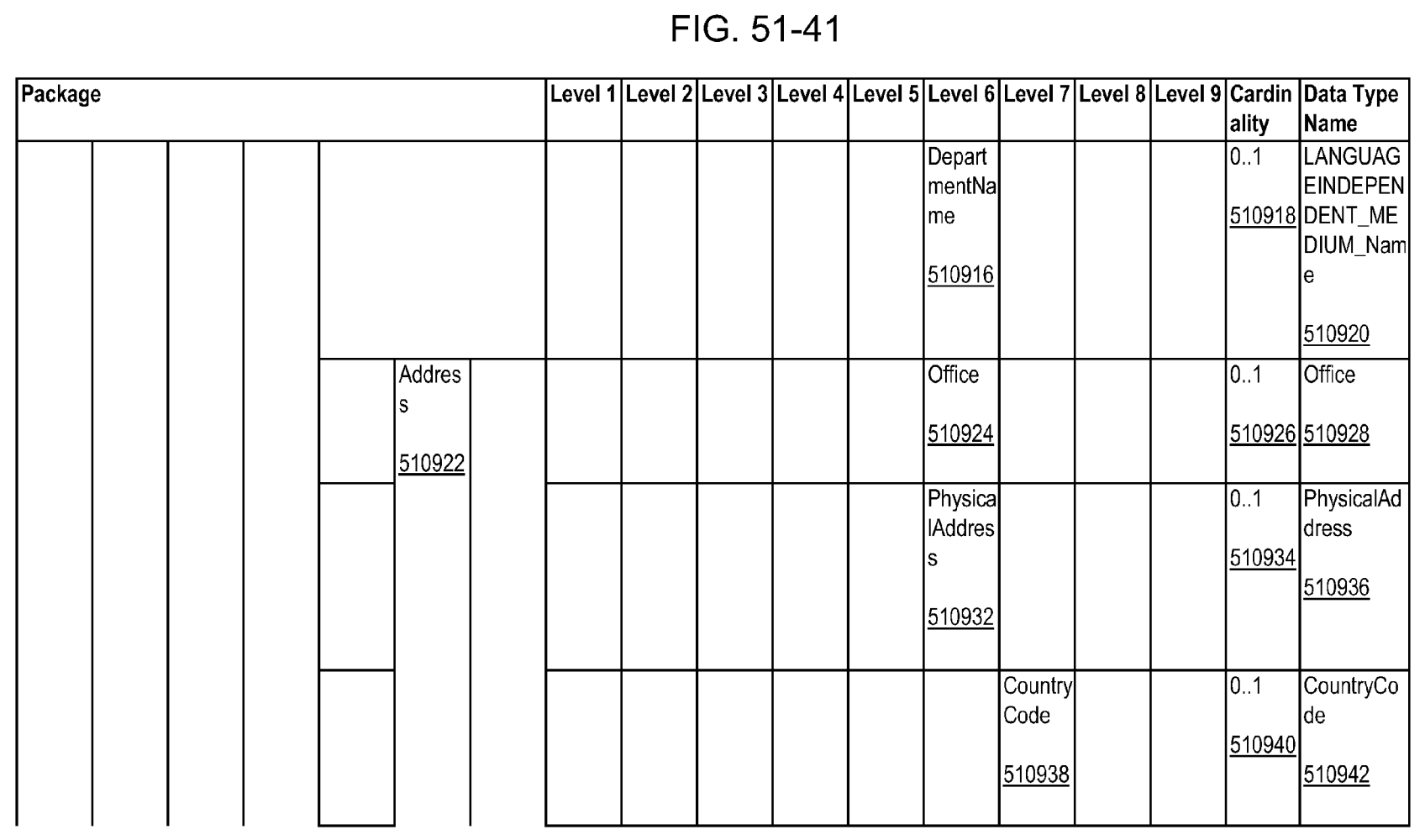

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | DepartmentName 510916 | | | | 0..1 510918 | LANGUAGEINDEPENDENT_MEDIUM_Name 510920 |
| | | | | | Address 510922 | | | | | | | Office 510924 | | | | 0..1 510926 | Office 510928 |
| | | | | | | | | | | | | PhysicalAddress 510932 | | | | 0..1 510934 | PhysicalAddress 510936 |
| | | | | | | | | | | | | | CountryCode 510938 | | | 0..1 510940 | CountryCode 510942 |

FIG. 51-42

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Country Name 510944 | | | 0..1 510946 | MEDIUM_Name 510948 |
| | | | | | | | Region Code 510950 | | | 0..1 510952 | RegionCode 510954 |
| | | | | | | | Region Name 510956 | | | 0..1 510958 | LANGUAGEINDEPENDENT_MEDIUM_Name 510960 |
| | | | | | | | StreetPostalCode 510962 | | | 0..1 510964 | PostalCode 510966 |

FIG. 51-43

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | POBoxPostalCode 510968 | | | 0..1 510970 | PostalCode 510972 |
| | | | | | | | | | | | | | CompanyPostalCode 510974 | | | 0..1 510976 | PostalCode 510978 |
| | | | | | | | | | | | | | CityName 510980 | | | 0..1 510982 | LANGUAGEINDEPENDENT_MEDIUM_Name 510984 |

FIG. 51-44

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalCityName 510986 | | | 0..1 510988 | LANGUAGEINDEPENDENT_MEDIUM_Name 510990 |
| | | | | | | | DistrictName 510992 | | | 0..1 510994 | LANGUAGEINDEPENDENT_MEDIUM_Name 510996 |
| | | | | | | | POBoxID 510998 | | | 0..1 511000 | POBoxID 511002 |
| | | | | | | | POBoxIndicator 511004 | | | 0..1 511006 | Indicator 511008 |

FIG. 51-45

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBox Country Code 511010 | | | 0..1 511012 | CountryCode 511014 |
| | | | | | | | POBox Country Name 511016 | | | 0..1 511018 | MEDIUM_Name 511020 |
| | | | | | | | POBox Region Code 511022 | | | 0..1 511024 | RegionCode 511026 |

FIG. 51-46

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxRegionName 511028 | | | 0..1 511030 | LANGUAGEINDEPENDENT_MEDIUM_Name 511032 |
| | | | | | | | POBoxCityName 511034 | | | 0..1 511036 | LANGUAGEINDEPENDENT_MEDIUM_Name 511038 |
| | | | | | | | StreetName 511040 | | | 0..1 511042 | StreetName 511044 |
| | | | | | | | StreetPrefixName 511046 | | | 0..N 511048 | LANGUAGEINDEPENDENT_MEDIUM_Name 511050 |

FIG. 51-47

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetSuffixName 511052 | | | 0..N 511054 | LANGUAGEINDEPENDENT_MEDIUM_Name 511056 |
| | | | | | | | HouseID 511058 | | | 0..1 511060 | HouseID 511062 |
| | | | | | | | AdditionalHouseID 511064 | | | 0..1 511066 | HouseID 511068 |
| | | | | | | | BuildingID 511070 | | | 0..1 511072 | BuildingID 511074 |

FIG. 51-48

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | FloorID 511076 | | | 0..1 511078 | FloorID 511080 |
| | | | | | | | | | | | | | RoomID 511082 | | | 0..1 511084 | RoomID 511086 |
| | | | | | | | | | | | | | CareOf Name 511088 | | | 0..1 511090 | LANGUAGEINDEPENDENT_MEDIUM_Name 511092 |
| | | | | | | | | | | | | | Description 511094 | | | 0..N 511096 | Description 511098 |

FIG. 51-49

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | TaxJurisdictionCode 511100 | | | | 0..1 511102 | TaxJurisdictionCode 511104 |
| | | | | | | | | | | | | TimeZoneDifferenceValue 511106 | | | | 0..1 511108 | TimeZoneDifferenceValue 511110 |
| | | | | | | | | | | | | GeoCoordinates 511112 | | | | 0..1 511114 | GeoCoordinates 511116 |
| | | | | | | | | | | | | Communication 511120 | | | | 0..1 511122 | Communication 511124 |

FIG. 51-50

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 511126 | | | 0..1 511128 | LanguageCode 511130 |
| | | | | | | | CorrespondenceLanguageName 511132 | | | 0..1 511134 | MEDIUM_Name 511136 |
| | | | | | | | Telephone 511138 | | | 0..N 511140 | Telephone 511142 |

FIG. 51-51

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 511144 | | 1 511146 | PhoneNumber 511148 |
| | | | | | | | | SMSEnabledIndicator 511150 | | 0..1 511152 | Indicator 511154 |
| | | | | | | | | NumberDefaultIndicator 511156 | | 1 511158 | Indicator 511160 |
| | | | | | | | | NumberDescription 511162 | | 0..N 511164 | Description 511166 |

FIG. 51-52

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | NumberUsageDenialIndicator 511168 | | 1 511170 | Indicator 511172 |
| | | | | | | | | | | | | | Mobile Phone 511174 | | | 0..N 511176 | Telephone 511178 |
| | | | | | | | | | | | | | | Number 511180 | | 1 511182 | PhoneNumber 511184 |
| | | | | | | | | | | | | | | SMSEnabledIndicator 511186 | | 0..1 511188 | Indicator 511190 |

FIG. 51-53

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | NumberDefaultIndicator 511192 | | 1 511194 | Indicator 511196 |
| | | | | | | | | | | | | | | NumberDescription 511198 | | 0..N 511200 | Description 511202 |
| | | | | | | | | | | | | | | NumberUsageDenialIndicator 511204 | | 1 511206 | Indicator 511208 |
| | | | | | | | | | | | | | Facsimile 511210 | | | 0..N 511212 | Facsimile 511214 |

FIG. 51-54

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | Number 511216 | | 1 511218 | PhoneNumber 511220 |
| | | | | | | | | | | | | | | NumberDefaultIndicator 511222 | | 1 511224 | Indicator 511226 |
| | | | | | | | | | | | | | | NumberDescription 511228 | | 0..N 511230 | Description 511232 |
| | | | | | | | | | | | | | | NumberUsageDenialIndicator 511234 | | 1 511236 | Indicator 511238 |

FIG. 51-55

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Email 511240 | | | 0..N 511242 | Email 511244 |
| | | | | | | | | URI 511246 | | 1 511248 | EmailURI 511250 |
| | | | | | | | | URIDefaultIndicator 511252 | | 1 511254 | Indicator 511256 |
| | | | | | | | | URIDescription 511258 | | 0..N 511260 | Description 511262 |
| | | | | | | | | URIUsageDenialIndicator 511264 | | 1 511266 | Indicator 511268 |

FIG. 51-56

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Web 511270 | | | 0..N 511272 | Web 511274 |
| | | | | | | | | URI 511276 | | 1 511278 | WebURI 511280 |
| | | | | | | | | URIDefaultIndicator 511282 | | 1 511284 | Indicator 511286 |
| | | | | | | | | URIDescription 511288 | | 0..N 511290 | Description 511292 |

FIG. 51-57

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessPartnerFormattedName 511294 | | | | | 0..1 511296 | LANGUAGEINDEPENDENT_EXTENDED_Name 511298 |
| | | | | | FormattedConventionalPhoneNumberDescription 511300 | | | | | 0..1 511302 | LANGUAGEINDEPENDENT_SHORT_Description 511304 |

FIG. 51-58

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | FormattedFacsimileNumberDescription 511306 | | | | | 0..1 511308 | LANGUAGEINDEPENDENT_SHORT_Description 511310 |
| | | Document 511312 | | | | | | | Document 511314 | | | | | | | 0..N 511316 | ExportProcessingNotificationDocument 511318 |
| | | | | | | | | | | DocumentTypeCode 511320 | | | | | | 0..1 511322 | DocumentTypeCode 511324 |

FIG. 51-59

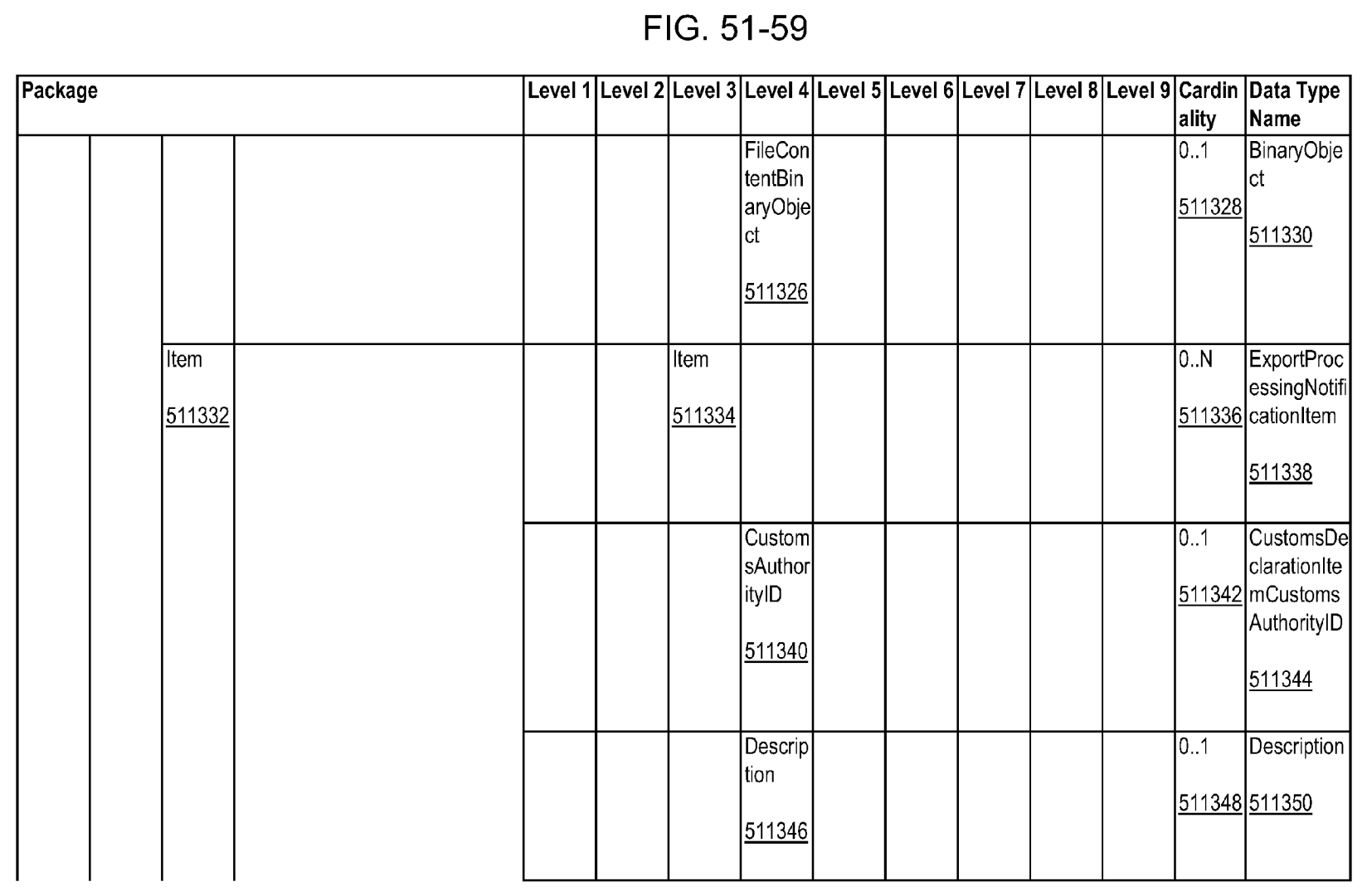

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | | FileContentBinaryObject 511326 | | | | | | 0..1 511328 | BinaryObject 511330 |
| | | Item 511332 | | | | Item 511334 | | | | | | | 0..N 511336 | ExportProcessingNotificationItem 511338 |
| | | | | | | | CustomsAuthorityID 511340 | | | | | | 0..1 511342 | CustomsDeclarationItemCustomsAuthorityID 511344 |
| | | | | | | | Description 511346 | | | | | | 0..1 511348 | Description 511350 |

FIG. 51-60

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | CustomsProcessPartyID 511352 | | | | | | 0..1 511354 | CustomsProcessID 511356 |
| | | | | ConsignmentExportID 511358 | | | | | | 0..1 511360 | ConsignmentExportID 511362 |
| | | | | NetWeightQuantity 511364 | | | | | | 0..1 511366 | Quantity 511368 |

FIG. 51-61

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | NetWeightQuantityTypeCode 511370 | | | | | | 0..1 511372 | QuantityTypeCode 511374 |
| | | | | Gross Weight Quantity 511376 | | | | | | 0..1 511378 | Quantity 511380 |
| | | | | Gross Weight QuantityTypeCode 511382 | | | | | | 0..1 511384 | QuantityTypeCode 511386 |

FIG. 51-62

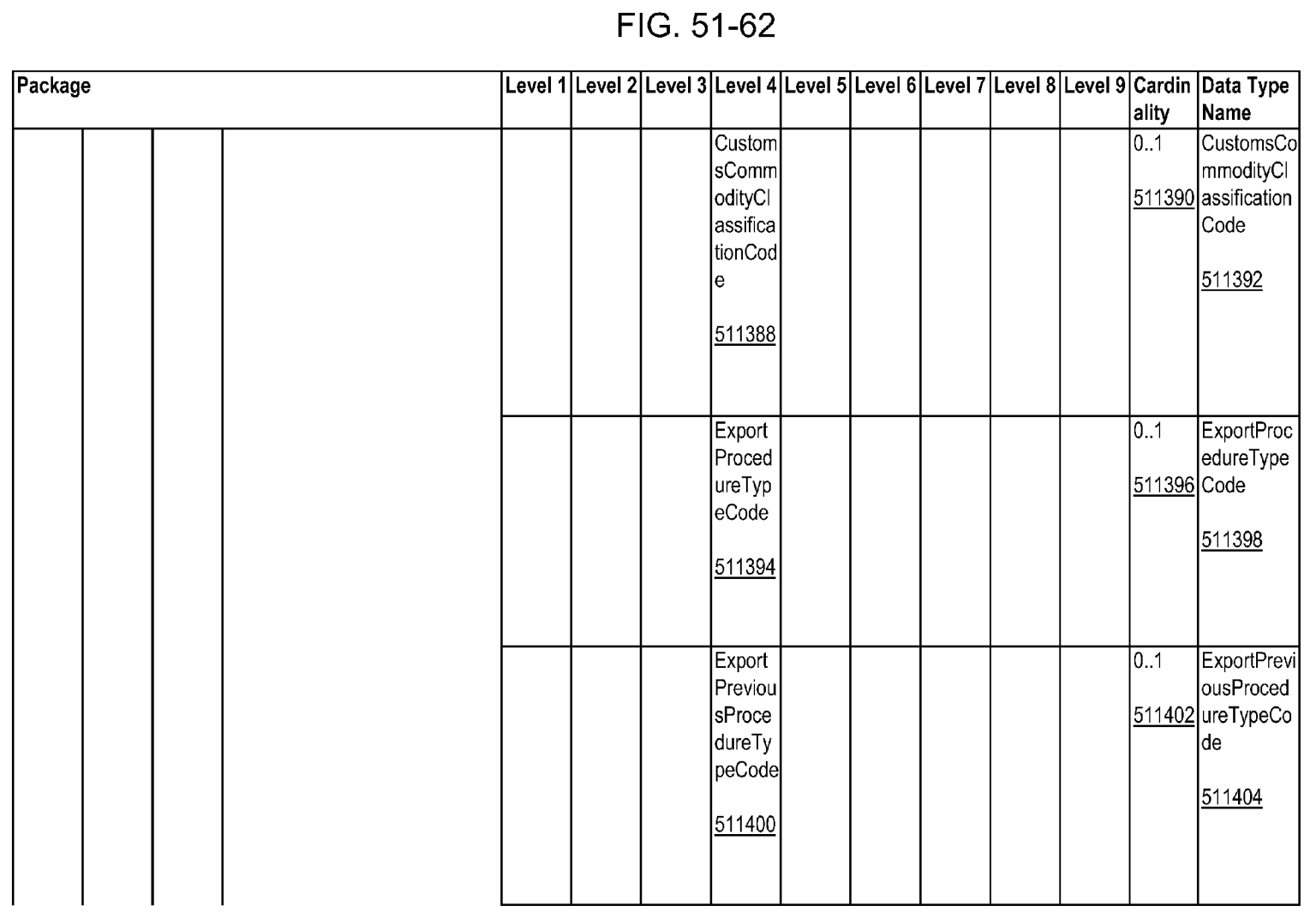

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | CustomsCommodityClassificationCode 511388 | | | | | | 0..1 511390 | CustomsCommodityClassificationCode 511392 |
| | | | | ExportProcedureTypeCode 511394 | | | | | | 0..1 511396 | ExportProcedureTypeCode 511398 |
| | | | | ExportPreviousProcedureTypeCode 511400 | | | | | | 0..1 511402 | ExportPreviousProcedureTypeCode 511404 |

FIG. 51-63

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | ExportAdditionalProcedureTypeCode 511406 | | | | | | 0..1 511408 | ExportAdditionalProcedureTypeCode 511410 |
| | | | | Party 511412 | | | | | Party 511414 | | | | | | 0..N 511416 | ExportProcessingNotificationItemParty 511418 |
| | | | | | | | | | | RoleCategoryCode 511420 | | | | | 0..1 511422 | PartyRoleCategoryCode 511424 |
| | | | | | | | | | | Address 511426 | | | | | 0..1 511428 | Address 511430 |

FIG. 51-64

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormOfAddress 511432 | | | | 0..1 511434 | FormOfAddress 511436 |
| | | | | | | OrganisationFormattedName 511438 | | | | 0..N 511440 | LANGUAGEINDEPENDENT_MEDIUM_Name 511442 |
| | | | | | | PersonName 511444 | | | | 0..1 511446 | PersonName 511448 |

FIG. 51-65

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | FunctionalTitleName 511450 | | | | 0..1 511452 | LANGUAGEINDEPENDENT_MEDIUM_Name 511454 |
| | | | | | | | | | | | | DepartmentName 511456 | | | | 0..1 511458 | LANGUAGEINDEPENDENT_MEDIUM_Name 511460 |
| | | | | | Address 511462 | | | | | | | Office 511464 | | | | 0..1 511466 | Office 511468 |
| | | | | | | | | | | | | PhysicalAddress 511472 | | | | 0..1 511474 | PhysicalAddress 511476 |

FIG. 51-66

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Country Code 511478 | | | 0..1 511480 | CountryCode 511482 |
| | | | | | | | Country Name 511484 | | | 0..1 511486 | MEDIUM_Name 511488 |
| | | | | | | | Region Code 511490 | | | 0..1 511492 | RegionCode 511494 |
| | | | | | | | Region Name 511496 | | | 0..1 511498 | LANGUAGEINDEPENDENT_MEDIUM_Name 511500 |

FIG. 51-67

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetPostalCode 511502 | | | 0..1 511504 | PostalCode 511506 |
| | | | | | | | POBoxPostalCode 511508 | | | 0..1 511510 | PostalCode 511512 |
| | | | | | | | CompanyPostalCode 511514 | | | 0..1 511516 | PostalCode 511518 |
| | | | | | | | CityName 511520 | | | 0..1 511522 | LANGUAGEINDEPENDENT_MEDIUM_Name 511524 |

FIG. 51-68

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalCityName 511526 | | | 0..1 511528 | LANGUAGEINDEPENDENT_MEDIUM_Name 511530 |
| | | | | | | | DistrictName 511532 | | | 0..1 511534 | LANGUAGEINDEPENDENT_MEDIUM_Name 511536 |
| | | | | | | | POBoxID 511538 | | | 0..1 511540 | POBoxID 511542 |
| | | | | | | | POBoxIndicator 511544 | | | 0..1 511546 | Indicator 511548 |

FIG. 51-69

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBox Country Code 511550 | | | 0..1 511552 | CountryCode 511554 |
| | | | | | | | POBox Country Name 511556 | | | 0..1 511558 | MEDIUM_Name 511560 |
| | | | | | | | POBox Region Code 511562 | | | 0..1 511564 | RegionCode 511566 |

FIG. 51-70

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | POBox Region Name 511568 | | | 0..1 511570 | LANGUAGEINDEPENDENT_MEDIUM_Name 511572 |
| | | | | | | | | | | | | | POBox CityName 511574 | | | 0..1 511576 | LANGUAGEINDEPENDENT_MEDIUM_Name 511578 |
| | | | | | | | | | | | | | StreetName 511580 | | | 0..1 511582 | StreetName 511584 |
| | | | | | | | | | | | | | StreetPrefixName 511586 | | | 0..N 511588 | LANGUAGEINDEPENDENT_MEDIUM_Name 511590 |

FIG. 51-71

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetSuffixName 511592 | | | 0..N 511594 | LANGUAGEINDEPENDENT_MEDIUM_Name 511596 |
| | | | | | | | HouseID 511598 | | | 0..1 511600 | HouseID 511602 |
| | | | | | | | AdditionalHouseID 511604 | | | 0..1 511606 | HouseID 511608 |
| | | | | | | | BuildingID 511610 | | | 0..1 511612 | BuildingID 511614 |

FIG. 51-72

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | FloorID 511616 | | | 0..1 511618 | FloorID 511620 |
| | | | | | | | RoomID 511622 | | | 0..1 511624 | RoomID 511626 |
| | | | | | | | CareOfName 511628 | | | 0..1 511630 | LANGUAGEINDEPENDENT_MEDIUM_Name 511632 |
| | | | | | | | Description 511634 | | | 0..N 511636 | Description 511638 |

FIG. 51-73

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | TaxJurisdictionCode 511640 | | | | 0..1 511642 | TaxJurisdictionCode 511644 |
| | | | | | | | | | | | | TimeZoneDifferenceValue 511646 | | | | 0..1 511648 | TimeZoneDifferenceValue 511650 |
| | | | | | | | | | | | | GeoCoordinates 511652 | | | | 0..1 511654 | GeoCoordinates 511656 |
| | | | | | | | | | | | | Communication 511660 | | | | 0..1 511662 | Communication 511664 |

FIG. 51-74

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 511666 | | | 0..1 511668 | LanguageCode 511670 |
| | | | | | | | CorrespondenceLanguageName 511672 | | | 0..1 511674 | MEDIUM_Name 511676 |
| | | | | | | | Telephone 511678 | | | 0..N 511680 | Telephone 511682 |

FIG. 51-75

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 511684 | | 1 511686 | PhoneNumber 511688 |
| | | | | | | | | SMSEnabledIndicator 511690 | | 0..1 511692 | Indicator 511694 |
| | | | | | | | | NumberDefaultIndicator 511696 | | 1 511698 | Indicator 511700 |
| | | | | | | | | NumberDescription 511702 | | 0..N 511704 | Description 511706 |

FIG. 51-76

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 511708 | | 1 511710 | Indicator 511712 |
| | | | | | | | Mobile Phone 511714 | | | 0..N 511716 | Telephone 511718 |
| | | | | | | | | Number 511720 | | 1 511722 | PhoneNumber 511724 |
| | | | | | | | | SMSEnabledIndicator 511726 | | 0..1 511728 | Indicator 511730 |

FIG. 51-77

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberDefaultIndicator 511732 | | 1 511734 | Indicator 511736 |
| | | | | | | | | NumberDescription 511738 | | 0..N 511740 | Description 511742 |
| | | | | | | | | NumberUsageDenialIndicator 511744 | | 1 511746 | Indicator 511748 |
| | | | | | | | Facsimile 511750 | | | 0..N 511752 | Facsimile 511754 |

FIG. 51-78

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Number 511756 | | 1 511758 | PhoneNumber 511760 |
| | | | | | | | | NumberDefaultIndicator 511762 | | 1 511764 | Indicator 511766 |
| | | | | | | | | NumberDescription 511768 | | 0..N 511770 | Description 511772 |
| | | | | | | | | NumberUsageDenialIndicator 511774 | | 1 511776 | Indicator 511778 |

FIG. 51-79

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Email 511780 | | | 0..N 511782 | Email 511784 |
| | | | | | | | | URI 511786 | | 1 511788 | EmailURI 511790 |
| | | | | | | | | URIDefaultIndicator 511792 | | 1 511794 | Indicator 511796 |
| | | | | | | | | URIDescription 511798 | | 0..N 511800 | Description 511802 |
| | | | | | | | | URIUsageDenialIndicator 511804 | | 1 511806 | Indicator 511808 |

FIG. 51-80

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Web 511810 | | | 0..N 511812 | Web 511814 |
| | | | | | | | | URI 511816 | | 1 511818 | WebURI 511820 |
| | | | | | | | | URIDefaultIndicator 511822 | | 1 511824 | Indicator 511826 |
| | | | | | | | | URIDescription 511828 | | 0..N 511830 | Description 511832 |

FIG. 51-81

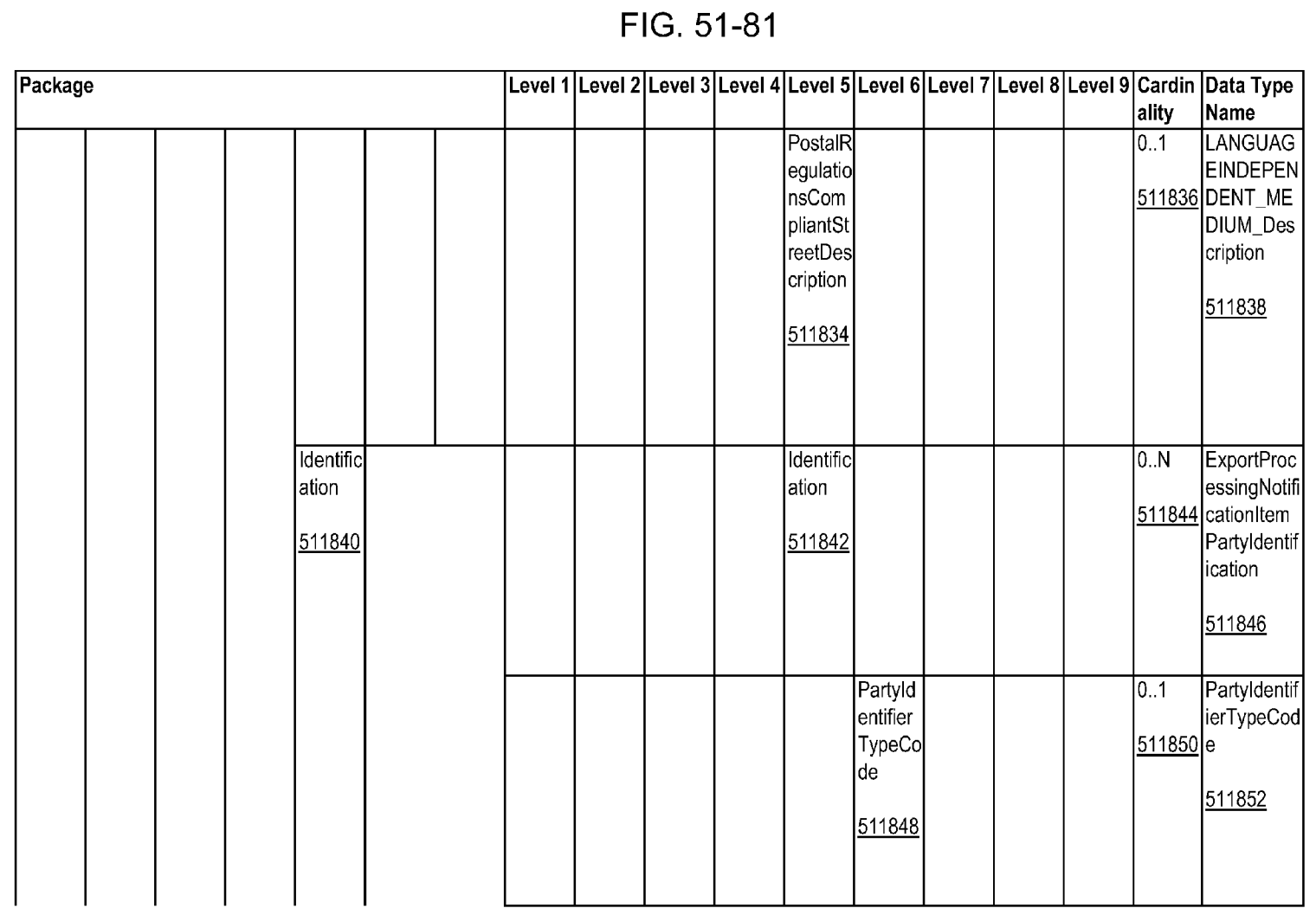

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | PostalRegulationsCompliantStreetDescription 511834 | | | | | 0..1 511836 | LANGUAGEINDEPENDENT_MEDIUM_Description 511838 |
| | | | | Identification 511840 | | | | | | | Identification 511842 | | | | | 0..N 511844 | ExportProcessingNotificationItemPartyIdentification 511846 |
| | | | | | | | | | | | | PartyIdentifierTypeCode 511848 | | | | 0..1 511850 | PartyIdentifierTypeCode 511852 |

FIG. 51-82

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | PartyID 511854 | | | | 0..1 511856 | NOALPHANUMERICCONVERSION_PartyID 511858 |
| | | | | Contact Party 511860 | | | | | | Contact Party 511862 | | | | | 0..1 511864 | ExportProcessingNotificationItemPartyContactParty 511866 |
| | | | | | | | | | | | Address 511868 | | | | 0..1 511870 | Address 511872 |

FIG. 51-83

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | OrganisationFormOfAddress 511874 | | | 0..1 511876 | FormOfAddress 511878 |
| | | | | | | | OrganisationFormattedName 511880 | | | 0..N 511882 | LANGUAGEINDEPENDENT_MEDIUM_Name 511884 |
| | | | | | | | PersonName 511886 | | | 0..1 511888 | PersonName 511890 |

FIG. 51-84

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | FunctionalTitleName 511892 | | | 0..1 511894 | LANGUAGEINDEPENDENT_MEDIUM_Name 511896 |
| | | | | | | | | | | | | | DepartmentName 511898 | | | 0..1 511900 | LANGUAGEINDEPENDENT_MEDIUM_Name 511902 |
| | | | | | | Address 511904 | | | | | | | Office 511906 | | | 0..1 511908 | Office 511910 |
| | | | | | | | | | | | | | PhysicalAddress 511914 | | | 0..1 511916 | PhysicalAddress 511918 |

FIG. 51-85

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Country Code 511920 | | 0..1 511922 | CountryCode 511924 |
| | | | | | | | | Country Name 511926 | | 0..1 511928 | MEDIUM_Name 511930 |
| | | | | | | | | Region Code 511932 | | 0..1 511934 | RegionCode 511936 |
| | | | | | | | | Region Name 511938 | | 0..1 511940 | LANGUAGEINDEPENDENT_MEDIUM_Name 511942 |

FIG. 51-86

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | StreetPostalCode 511944 | | 0..1 511946 | PostalCode 511948 |
| | | | | | | | | POBoxPostalCode 511950 | | 0..1 511952 | PostalCode 511954 |
| | | | | | | | | CompanyPostalCode 511956 | | 0..1 511958 | PostalCode 511960 |
| | | | | | | | | CityName 511962 | | 0..1 511964 | LANGUAGEINDEPENDENT_MEDIUM_Name 511966 |

FIG. 51-87

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | AdditionalCityName 511968 | | 0..1 511970 | LANGUAGEINDEPENDENT_MEDIUM_Name 511972 |
| | | | | | | | | | | | | | | DistrictName 511974 | | 0..1 511976 | LANGUAGEINDEPENDENT_MEDIUM_Name 511978 |
| | | | | | | | | | | | | | | POBoxID 511980 | | 0..1 511982 | POBoxID 511984 |
| | | | | | | | | | | | | | | POBoxIndicator 511986 | | 0..1 511988 | Indicator 511990 |

FIG. 51-88

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBox Country Code 511992 | | 0..1 511994 | CountryCode 511996 |
| | | | | | | | | POBox Country Name 511998 | | 0..1 512000 | MEDIUM_Name 512002 |
| | | | | | | | | POBox Region Code 512004 | | 0..1 512006 | RegionCode 512008 |

FIG. 51-89

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBox Region Name 512010 | | 0..1 512012 | LANGUAGEINDEPENDENT_MEDIUM_Name 512014 |
| | | | | | | | | POBox CityName 512016 | | 0..1 512018 | LANGUAGEINDEPENDENT_MEDIUM_Name 512020 |
| | | | | | | | | StreetName 512022 | | 0..1 512024 | StreetName 512026 |
| | | | | | | | | StreetPrefixName 512028 | | 0..N 512030 | LANGUAGEINDEPENDENT_MEDIUM_Name 512032 |

FIG. 51-90

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | StreetSuffixName 512034 | | 0..N 512036 | LANGUAGEINDEPENDENT_MEDIUM_Name 512038 |
| | | | | | | | | | | | | | | HouseID 512040 | | 0..1 512042 | HouseID 512044 |
| | | | | | | | | | | | | | | AdditionalHouseID 512046 | | 0..1 512048 | HouseID 512050 |
| | | | | | | | | | | | | | | BuildingID 512052 | | 0..1 512054 | BuildingID 512056 |

FIG. 51-91

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | FloorID 512058 | | 0..1 512060 | FloorID 512062 |
| | | | | | | | | RoomID 512064 | | 0..1 512066 | RoomID 512068 |
| | | | | | | | | CareOfName 512070 | | 0..1 512072 | LANGUAGEINDEPENDENT_MEDIUM_Name 512074 |
| | | | | | | | | Description 512076 | | 0..N 512078 | Description 512080 |

FIG. 51-92

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TaxJurisdictionCode 512082 | | | 0..1 512084 | TaxJurisdictionCode 512086 |
| | | | | | | | TimeZoneDifferenceValue 512088 | | | 0..1 512090 | TimeZoneDifferenceValue 512092 |
| | | | | | | | GeoCoordinates 512094 | | | 0..1 512096 | GeoCoordinates 512098 |
| | | | | | | | Communication 512102 | | | 0..1 512104 | Communication 512106 |

FIG. 51-93

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | CorrespondenceLanguageCode 512108 | | 0..1 512110 | LanguageCode 512112 |
| | | | | | | | | CorrespondenceLanguageName 512114 | | 0..1 512116 | MEDIUM_Name 512118 |
| | | | | | | | | Telephone 512120 | | 0..N 512122 | Telephone 512124 |

FIG. 51-94

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | Number 512126 | 1 512128 | PhoneNumber 512130 |
| | | | | | | | | | SMSEnabledIndicator 512132 | 0..1 512134 | Indicator 512136 |
| | | | | | | | | | NumberDefaultIndicator 512138 | 1 512140 | Indicator 512142 |
| | | | | | | | | | NumberDescription 512144 | 0..N 512146 | Description 512148 |

FIG. 51-95

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | NumberUsageDenialIndicator 512150 | 1 512152 | Indicator 512154 |
| | | | | | | | | Mobile Phone 512156 | | 0..N 512158 | Telephone 512160 |
| | | | | | | | | | Number 512162 | 1 512164 | PhoneNumber 512166 |
| | | | | | | | | | SMSEnabledIndicator 512168 | 0..1 512170 | Indicator 512172 |

FIG. 51-96

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | NumberDefaultIndicator 512174 | 1 512176 | Indicator 512178 |
| | | | | | | | | | NumberDescription 512180 | 0..N 512182 | Description 512184 |
| | | | | | | | | | NumberUsageDenialIndicator 512186 | 1 512188 | Indicator 512190 |
| | | | | | | | | Facsimile 512192 | | 0..N 512194 | Facsimile 512196 |

FIG. 51-97

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | Number 512198 | 1 512200 | PhoneNumber 512202 |
| | | | | | | | | | NumberDefaultIndicator 512204 | 1 512206 | Indicator 512208 |
| | | | | | | | | | NumberDescription 512210 | 0..N 512212 | Description 512214 |
| | | | | | | | | | NumberUsageDenialIndicator 512216 | 1 512218 | Indicator 512220 |

FIG. 51-98

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | Email 512222 | | 0..N 512224 | Email 512226 |
| | | | | | | | | | | | | | | | URI 512228 | 1 512230 | EmailURI 512232 |
| | | | | | | | | | | | | | | | URIDefaultIndicator 512234 | 1 512236 | Indicator 512238 |
| | | | | | | | | | | | | | | | URIDescription 512240 | 0..N 512242 | Description 512244 |
| | | | | | | | | | | | | | | | URIUsageDenialIndicator 512246 | 1 512248 | Indicator 512250 |

FIG. 51-99

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | | | Web 512252 | | 0..N 512254 | Web 512256 |
| | | | | | | | | | | | | | | | URI 512258 | 1 512260 | WebURI 512262 |
| | | | | | | | | | | | | | | | URIDefaultIndicator 512264 | 1 512266 | Indicator 512268 |
| | | | | | | | | | | | | | | | URIDescription 512270 | 0..N 512272 | Description 512274 |

FIG. 51-100

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | BusinessPartnerFormattedName 512276 | | | | 0..1 512278 | LANGUAGEINDEPENDENT_EXTENDED_Name 512280 |
| | | | | | | | | | | | | FormattedConventionalPhoneNumberDescription 512282 | | | | 0..1 512284 | LANGUAGEINDEPENDENT_SHORT_Description 512286 |

FIG. 51-101

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | | FormattedFacsimileNumberDescription 512288 | | | | 0..1 512290 | LANGUAGEINDEPENDENT_SHORT_Description 512292 |
| | | | Package 512294 | | | | | | | Package 512296 | | | | | | 0..N 512298 | ExportProcessingNotificationItemPackage 512300 |
| | | | | | | | | | | | OrdinalNumberValue 512302 | | | | | 0..1 512304 | OrdinalNumberValue 512306 |

FIG. 51-102

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | ElementNumberValue 512308 | | | | | 0..1 512310 | NumberValue 512312 |
| | | | | | | | | | ExportPackageTypeCode 512314 | | | | | 0..1 512316 | ExportPackageTypeCode 512318 |
| | | | | | | | | | PackageExportID 512320 | | | | | 0..1 512322 | PackageExportID 512324 |

FIG. 52-1

| Package | | | Level 1 | Level 2 | Level 3 | Level 4 | Level 5 | Level 6 | Cardinality | Data Type Name |
|---|---|---|---|---|---|---|---|---|---|---|
| Form Export Declaration Processing in Fallback Procedure Request 520000 | | | Form Export Declaration Processing in Fallback Procedure Request 520002 | | | | | | | FormExportDeclarationProcessingInFallbackProcedureRequestMessage 520004 |
| | ExportDeclaration 520006 | | | ExportDeclaration 520008 | | | | | 1 520010 | FormExportDeclarationProcessingInFallbackProcedureRequest 520012 |
| | | | | | CustomsAuthorityCountryCode 520014 | | | | 0..1 520016 | CountryCode 520018 |

FIG. 52-2

| Package | Level 1 | Level 2 | Level 3 | Level 4 | Level 5 | Level 6 | Cardinality | Data Type Name |
|---|---|---|---|---|---|---|---|---|
| | | | CustomsProcessID 520020 | | | | 0..1 520022 | CustomsProcessID 520024 |
| | | | ExportDeclarationTypeCode 520026 | | | | 0..1 520028 | ExportDeclarationTypeCode 520030 |
| | | | ExportTypeCode 520032 | | | | 0..1 520034 | ExportTypeCode 520036 |
| | | | ExportExportingCountryCode 520038 | | | | 0..1 520040 | ExportExportingCountryCode 520042 |
| | | | ExportDestinationCountryCode 520044 | | | | 0..1 520046 | ExportDestinationCountryCode 520048 |

FIG. 52-3

| Package | Level 1 | Level 2 | Level 3 | Level 4 | Level 5 | Level 6 | Cardinality | Data Type Name |
|---|---|---|---|---|---|---|---|---|
| | | | ExportSpecialCircumstancesCode 520050 | | | | 0..1 520052 | ExportSpecialCircumstancesCode 520054 |
| | | | ExportTransportCostPaymentFormCode 520056 | | | | 0..1 520058 | ExportTransportCostPaymentFormCode 520060 |
| | | | ContainerUsedIndicator 520062 | | | | 0..1 520064 | Indicator 520066 |
| | | | ExportPartyRepresentationCode 520068 | | | | 0..1 520070 | ExportPartyRepresentationCode 520072 |

FIG. 52-4

| Package | | | Level 1 | Level 2 | Level 3 | Level 4 | Level 5 | Level 6 | Cardinality | Data Type Name |
|---|---|---|---|---|---|---|---|---|---|---|
| | | | | | ItemTotalNumberValue 520074 | | | | 0..1 520076 | NumberValue 520078 |
| | | | | | InlandExportTransportModeCode 520080 | | | | 0..1 520082 | ExportTransportModeCode 520084 |
| | | | | | CrossBorderExportTransportModeCode 520086 | | | | 0..1 520088 | ExportTransportModeCode 520090 |
| | | | | | CrossBorderTransportMeansID 520092 | | | | 0..1 520094 | TransportMeansID_V1 520096 |

FIG. 52-5

| Package | Level 1 | Level 2 | Level 3 | Level 4 | Level 5 | Level 6 | Cardinality | Data Type Name |
|---|---|---|---|---|---|---|---|---|
| | | | ExportCrossBorderTransportMeansNationalityCode 520098 | | | | 0..1 520100 | ExportCrossBorderTransportMeansNationalityCode 520102 |
| | | | ExportBusinessTransactionTypeCode 520104 | | | | 0..1 520106 | ExportBusinessTransactionTypeCode 520108 |
| | | | InvoiceTotalNetAmount 520110 | | | | 0..1 520112 | Amount 520114 |
| | | | ExportIncotermsClassificationCode 520116 | | | | 0..1 520118 | ExportIncotermsClassificationCode 520120 |

FIG. 52-6

| Package | Level 1 | Level 2 | Level 3 | Level 4 | Level 5 | Level 6 | Cardinality | Data Type Name |
|---|---|---|---|---|---|---|---|---|
| | | | IncotermsTransferLocationName 520122 | | | | 0..1 520124 | MEDIUM_Name 520126 |
| | | | CustomsFallbackProcedureIncidentID 520128 | | | | 0..1 520130 | CustomsFallbackProcedureIncidentID 520132 |
| | | | CustomsFallbackProcedureIncidentStartDateTime 520134 | | | | 0..1 520136 | LOCAL_DateTime 520138 |
| | | | CreationDateTime 520140 | | | | 0..1 520142 | LOCAL_DateTime 520144 |

FIG. 52-7

| Package | | | | Level 1 | Level 2 | Level 3 | Level 4 | Level 5 | Level 6 | Cardinality | Data Type Name |
|---|---|---|---|---|---|---|---|---|---|---|---|
| | | CustomsAuthorisation 520146 | | | | CustomsAuthorisation 520148 | | | | 0..1 520150 | FormExportDeclarationProcessingInFallbackProcedureRequestCustomsAuthorisation 520152 |
| | | | | | | | TypeCode 520154 | | | 0..1 520156 | CustomsAuthorisationTypeCode 520158 |
| | | | | | | | ID 520160 | | | 0..1 520162 | CustomsAuthorisationID 520164 |
| | | | | | | | ReleaseStampPrintingAllowedIndicator 520166 | | | 0..1 520168 | Indicator 520170 |

FIG. 52-8

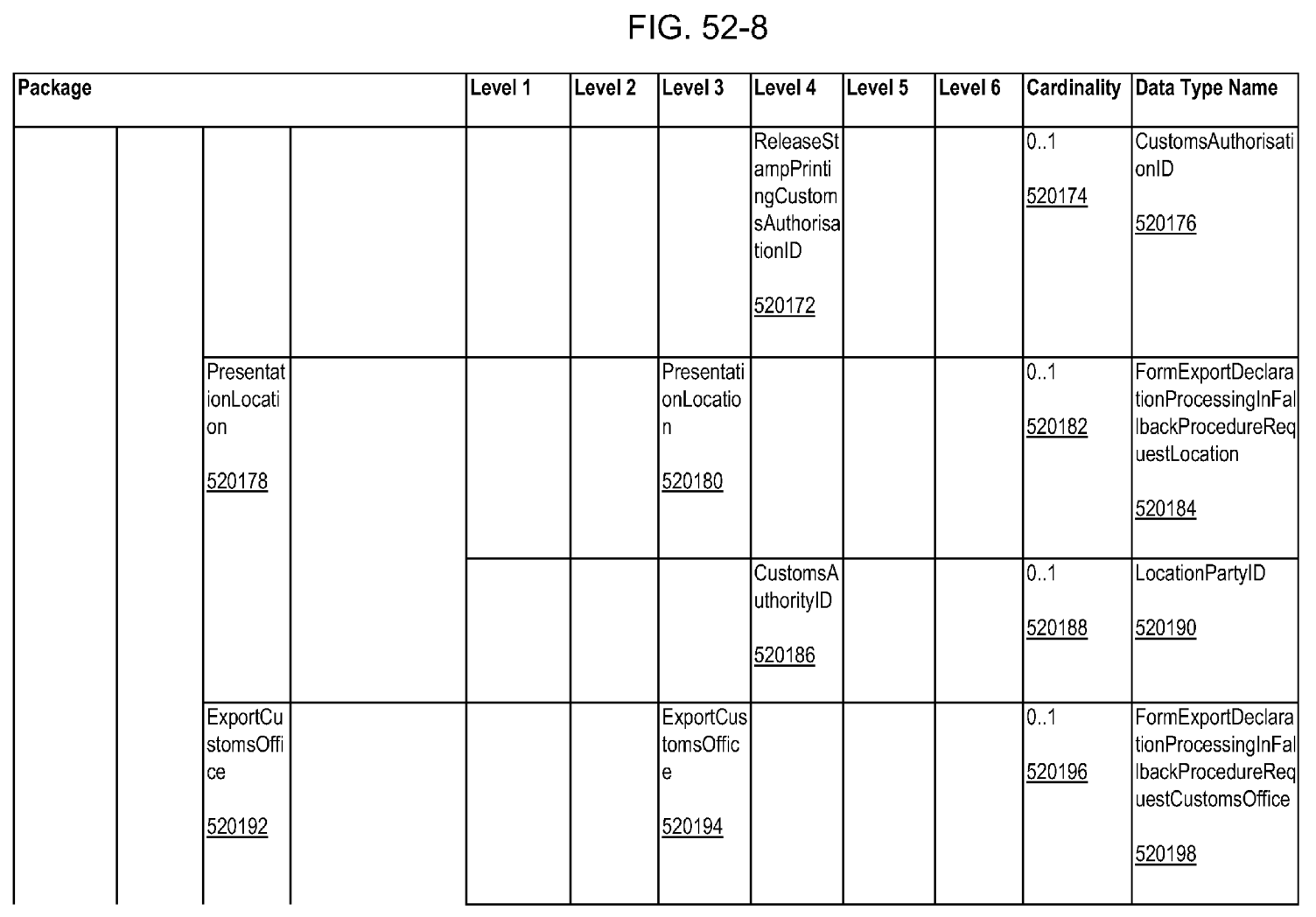

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ReleaseStampPrintingCustomsAuthorisationID 520172 | | | 0..1 520174 | CustomsAuthorisationID 520176 |
| | | PresentationLocation 520178 | | | | PresentationLocation 520180 | | | | 0..1 520182 | FormExportDeclarationProcessingInFallbackProcedureRequestLocation 520184 |
| | | | | | | | CustomsAuthorityID 520186 | | | 0..1 520188 | LocationPartyID 520190 |
| | | ExportCustomsOffice 520192 | | | | ExportCustomsOffice 520194 | | | | 0..1 520196 | FormExportDeclarationProcessingInFallbackProcedureRequestCustomsOffice 520198 |

FIG. 52-9

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | Address 520200 | | | 0..1 520202 | FormAddress 520204 |
| | | | | | | | EUCustomsOfficeNumberPartyID 520206 | | | 0..1 520208 | NOALPHANUMERICCONVERSION_PartyID 520210 |
| | | ExitCustomsOffice 520212 | | | | ExitCustomsOffice 520214 | | | | 0..1 520216 | FormExportDeclarationProcessingInFallbackProcedureRequestCustomsOffice 520218 |
| | | | | | | | Address 520220 | | | 0..1 520222 | FormAddress 520224 |
| | | | | | | | EUCustomsOfficeNumberPartyID 520226 | | | 0..1 520228 | NOALPHANUMERICCONVERSION_PartyID 520230 |

FIG. 52-10

| Package | | | | Level 1 | Level 2 | Level 3 | Level 4 | Level 5 | Level 6 | Cardinality | Data Type Name |
|---|---|---|---|---|---|---|---|---|---|---|---|
| | | SupplementaryExportCustomsOffice 520232 | | | | SupplementaryExportCustomsOffice 520234 | | | | 0..1 520236 | FormExportDeclarationProcessingInFallbackProcedureRequestCustomsOffice 520238 |
| | | | | | | | Address 520240 | | | 0..1 520242 | FormAddress 520244 |
| | | | | | | | EUCustomsOfficeNumberPartyID 520246 | | | 0..1 520248 | NOALPHANUMERICCONVERSION_PartyID 520250 |
| | | PlannedExitCustomsOffice 520252 | | | | PlannedExitCustomsOffice 520254 | | | | 0..1 520256 | FormExportDeclarationProcessingInFallbackProcedureRequestCustomsOffice 520258 |
| | | | | | | | Address 520260 | | | 0..1 520262 | FormAddress 520264 |

FIG. 52-11

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | EUCustomsOfficeNumberPartyID 520266 | | | 0..1 520268 | NOALPHANUMERICCONVERSION_PartyID 520270 |
| | | ExporterParty 520272 | | | | ExporterParty 520274 | | | | 0..1 520276 | FormExportDeclarationProcessingInFallbackProcedureRequestParty 520278 |
| | | | | | | | Address 520280 | | | 0..1 520282 | FormAddress 520284 |
| | | | | | | | GermanCustomsNumberPartyID 520286 | | | 0..1 520288 | NOALPHANUMERICCONVERSION_PartyID 520290 |

FIG. 52-12

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | ContactParty 520292 | | | | | ContactParty 520294 | | | 0..1 520296 | FormExportDeclarationProcessingInFallbackProcedureRequestPartyContactParty 520298 |
| | | | | | | | | | Address 520300 | | 0..1 520302 | FormAddress 520304 |
| | | Declarant Party 520306 | | | | | Declarant Party 520308 | | | | 0..1 520310 | FormExportDeclarationProcessingInFallbackProcedureRequestParty 520312 |
| | | | | | | | | Address 520314 | | | 0..1 520316 | FormAddress 520318 |
| | | | | | | | | GermanCustomsNumberPartyID 520320 | | | 0..1 520322 | NOALPHANUMERICCONVERSION_PartyID 520324 |

FIG. 52-13

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | ContactParty 520326 | | | | | ContactParty 520328 | | | 0..1 520330 | FormExportDeclarationProcessingInFallbackProcedureRequestPartyContactParty 520332 |
| | | | | | | | | | Address 520334 | | 0..1 520336 | FormAddress 520338 |
| | | RepresentativeDeclarantParty 520340 | | | | | RepresentativeDeclarantParty 520342 | | | | 0..1 520344 | FormExportDeclarationProcessingInFallbackProcedureRequestParty 520346 |
| | | | | | | | | Address 520348 | | | 0..1 520350 | FormAddress 520352 |
| | | | | | | | | GermanCustomsNumberPartyID 520354 | | | 0..1 520356 | NOALPHANUMERICCONVERSION_PartyID 520358 |

FIG. 52-14

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | ContactParty 520360 | | | | | ContactParty 520362 | | | 0..1 520364 | FormExportDeclarationProcessingInFallbackProcedureRequestPartyContactParty 520366 |
| | | | | | | | | | Address 520368 | | 0..1 520370 | FormAddress 520372 |
| | | SubContractingParty 520374 | | | | | SubContractingParty 520376 | | | | 0..1 520378 | FormExportDeclarationProcessingInFallbackProcedureRequestParty 520380 |
| | | | | | | | | Address 520382 | | | 0..1 520384 | FormAddress 520386 |
| | | | | | | | | GermanCustomsNumberPartyID 520388 | | | 0..1 520390 | NOALPHANUMERICCONVERSION_PartyID 520392 |

FIG. 52-15

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | ContactParty 520394 | | | | | ContactParty 520396 | | | 0..1 520398 | FormExportDeclarationProcessingInFallbackProcedureRequestPartyContactParty 520400 |
| | | | | | | | | | Address 520402 | | 0..1 520404 | FormAddress 520406 |
| | | ProductRecipientParty 520408 | | | | | ProductRecipientParty 520410 | | | | 0..1 520412 | FormExportDeclarationProcessingInFallbackProcedureRequestParty 520414 |
| | | | | | | | | Address 520416 | | | 0..1 520418 | FormAddress 520420 |
| | | | | | | | | GermanCustomsNumberPartyID 520422 | | | 0..1 520424 | NOALPHANUMERICCONVERSION_PartyID 520426 |

FIG. 52-16

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | ContactParty 520428 | | | | | ContactParty 520430 | | | 0..1 520432 | FormExportDeclarationProcessingInFallbackProcedureRequestPartyContactParty 520434 |
| | | | | | | | | | Address 520436 | | 0..1 520438 | FormAddress 520440 |
| | | TransportRouteCountry 520442 | | | | | TransportRouteCountry 520444 | | | | 0..1 520446 | FormExportDeclarationProcessingInFallbackProcedureRequestTransportRouteCountry 520448 |
| | | | | | | | | OrdinalNumberValue 520450 | | | 0..1 520452 | NumberValue 520454 |

FIG. 52-17

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ExportTransportRouteCountryCode 520456 | | | 0..1 520458 | ExportTransportRouteCountryCode 520460 |
| | | Item 520462 | | | | Item 520464 | | | | 0..N 520466 | FormExportDeclarationProcessingInFallbackProcedureRequestItem 520468 |
| | | | | | | | CustomsAuthorityID 520470 | | | 0..1 520472 | CustomsDeclarationItemCustomsAuthorityID 520474 |
| | | | | | | | Description 520476 | | | 0..1 520478 | Description 520480 |
| | | | | | | | OriginExportRegionCode 520482 | | | 0..1 520484 | ExportRegionCode 520486 |

FIG. 52-18

| Package | Level 1 | Level 2 | Level 3 | Level 4 | Level 5 | Level 6 | Cardinality | Data Type Name |
|---|---|---|---|---|---|---|---|---|
| | | | | NetWeightQuantity 520488 | | | 0..1 520490 | Quantity 520492 |
| | | | | NetWeightQuantityTypeCode 520494 | | | 0..1 520496 | QuantityTypeCode 520498 |
| | | | | GrossWeightQuantity 520500 | | | 0..1 520502 | Quantity 520504 |
| | | | | GrossWeightQuantityTypeCode 520506 | | | 0..1 520508 | QuantityTypeCode 520510 |

FIG. 52-19

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ExportTransportCostPaymentFormCode 520512 | | | 0..1 520514 | ExportTransportCostPaymentFormCode 520516 |
| | | | | | | | CustomsCommodityClassificationCode 520518 | | | 0..1 520520 | CustomsCommodityClassificationCode 520522 |
| | | | | | | | ExportProcedureTypeCode 520524 | | | 0..1 520526 | ExportProcedureTypeCode 520528 |
| | | | | | | | ExportPreviousProcedureTypeCode 520530 | | | 0..1 520532 | ExportPreviousProcedureTypeCode 520534 |

FIG. 52-20

| Package | Level 1 | Level 2 | Level 3 | Level 4 | Level 5 | Level 6 | Cardinality | Data Type Name |
|---|---|---|---|---|---|---|---|---|
| | | | | ExportAdditionalProcedureTypeCode 520536 | | | 0..1 520538 | ExportAdditionalProcedureTypeCode 520540 |
| | | | | LegalComplianceQuantity 520542 | | | 0..1 520544 | Quantity 520546 |
| | | | | LegalComplianceQuantityTypeCode 520548 | | | 0..1 520550 | QuantityTypeCode 520552 |
| | | | | PackageText 520554 | | | 0..1 520556 | Text 520558 |

FIG. 52-21

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | | | | | | AdditionalInformationText 520560 | | | 0..1 520562 | Text 520564 |
| | | | | | | | | PreviousDocumentText 520566 | | | 0..1 520568 | Text 520570 |
| | | | | | | | | LegalComplianceAmount 520572 | | | 0..1 520574 | Amount 520576 |
| | | | ProductRecipientParty 520578 | | | | | ProductRecipientParty 520580 | | | 0..1 520582 | FormExportDeclarationProcessingInFallbackProcedureRequestItemParty 520584 |
| | | | | | | | | | Address 520586 | | 0..1 520588 | FormAddress 520590 |

FIG. 52-22

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | | | | | | | GermanCustomsNumberPartyID 520592 | | 0..1 520594 | NOALPHANUMERICCONVERSION_PartyID 520596 |
| | | | | ContactParty 520598 | | | | | ContactParty 520600 | | 0..1 520602 | FormExportDeclarationProcessingInFallbackProcedureRequestItemPartyContactParty 520604 |
| | | | | | | | | | | Address 520606 | 0..1 520608 | FormAddress 520610 |

| Package | | Level 1 | Level 2 | Level 3 | Level 4 | Level 5 | Level 6 | Level 7 | Level 8 | Cardinality | Data Type Name |
|---|---|---|---|---|---|---|---|---|---|---|---|
| ExportDeclarationRequestRequest 550000 | | ExportDeclarationRequestRequest 550002 | | | | | | | | | ExportDeclarationRequestMessage 550004 |
| | MessageHeader 550006 | | MessageHeader 550008 | | | | | | | 1 550010 | BusinessDocumentMessageHeader 550012 |
| | | | | ID 550014 | | | | | | 0..1 550016 | BusinessDocumentMessageID 550018 |
| | | | | UUID 550020 | | | | | | 0..1 550022 | UUID 550024 |
| | | | | ReferenceID 550026 | | | | | | 0..1 550028 | BusinessDocumentMessageID 550030 |

FIG. 55-2

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | ReferenceUUID 550032 | | | | | | 0..1 550034 | UUID 550036 |
| | | | CreationDateTime 550038 | | | | | | 1 550040 | GLOBAL_DateTime 550042 |
| | | | TestDataIndicator 550044 | | | | | | 0..1 550046 | Indicator 550048 |
| | | | ReconciliationIndicator 550050 | | | | | | 0..1 550052 | Indicator 550054 |
| | | | SenderBusinessSystemID 550056 | | | | | | 0..1 550058 | BusinessSystemID 550060 |

FIG. 55-3

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | RecipientBusinessSystemID 550062 | | | | | | 0..1 550064 | BusinessSystemID 550066 |
| Party 550068 | | | SenderParty 550070 | | | | | | 0..1 550072 | BusinessDocumentMessageHeaderParty 550074 |
| | | | | InternalID 550076 | | | | | 0..1 550078 | PartyInternalID 550080 |
| | | | | StandardID 550082 | | | | | 0..N 550084 | PartyStandardID 550086 |
| | | | | ContactPerson 550088 | | | | | 0..1 550090 | BusinessDocumentMessageHeaderPartyContactPerson 550092 |

FIG. 55-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | InternalID 550094 | | | | 0..1 550096 | ContactPersonInternalID 550098 |
| | | | | | OrganisationFormattedName 550100 | | | | 0..N 550102 | LANGUAGEINDEPENDENT_MEDIUM_Name 550104 |
| | | | | | PersonFormattedName 550106 | | | | 0..N 550108 | LANGUAGEINDEPENDENT_LONG_Name 550110 |
| | | | | | PhoneNumber 550114 | | | | 0..N 550116 | PhoneNumber 550118 |
| | | | | | FaxNumber 550122 | | | | 0..N 550124 | PhoneNumber 550126 |

FIG. 55-5

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | EmailURI 550128 | | | | 0..N 550130 | EmailURI 550132 |
| | | | Recipient Party 550136 | | | | | | 0..N 550138 | BusinessDocumentMessageHeaderParty 550140 |
| | | | | InternalID 550142 | | | | | 0..1 550144 | PartyInternalID 550146 |
| | | | | StandardID 550148 | | | | | 0..N 550150 | PartyStandardID 550152 |
| | | | | ContactPerson 550154 | | | | | 0..1 550156 | BusinessDocumentMessageHeaderPartyContactPerson 550158 |
| | | | | | InternalID 550160 | | | | 0..1 550162 | ContactPersonInternalID 550164 |

FIG. 55-6

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | OrganisationFormattedName 550166 | | | | 0..N 550168 | LANGUAGEINDEPENDENT_MEDIUM_Name 550170 |
| | | | | | | | | PersonFormattedName 550172 | | | | 0..N 550174 | LANGUAGEINDEPENDENT_LONG_Name 550176 |
| | | | | | | | | PhoneNumber 550180 | | | | 0..N 550182 | PhoneNumber 550184 |
| | | | | | | | | FaxNumber 550188 | | | | 0..N 550190 | PhoneNumber 550192 |
| | | | | | | | | EmailURI 550194 | | | | 0..N 550196 | EmailURI 550198 |

FIG. 55-7

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | Business Scope 550200 | | | | Business Scope 550202 | | | | | | 0..N 550204 | BusinessScope 550206 |
| | ExportDeclarationRequest 550208 | | | | ExportDeclarationRequest 550210 | | | | | | | 1 550212 | ExportDeclarationRequest 550214 |
| | | | | | | @reconciliationPeriodCounterValue 550216 | | | | | | 1 550218 | CounterValue 550220 |
| | | | | | | @itemListCompleteTransmissionIndicator 550222 | | | | | | 1 550224 | Indicator 550226 |

FIG. 55-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | BaseBusinessTransactionDocumentTypeCode 550228 | | | | | | 1 550230 | BusinessTransactionDocumentTypeCode 550232 |
| | | | Incoterms 550234 | | | | | | 0..1 550236 | Incoterms 550238 |
| | | | TransportModeCode 550240 | | | | | | 0..1 550242 | TransportModeCode 550244 |
| | | | TransportMeans 550246 | | | | | | 0..1 550248 | TransportMeans 550250 |
| | | | TotalNetWeightQuantity 550252 | | | | | | 0..1 550254 | Quantity 550256 |

FIG. 55-9

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | TotalNetWeightQuantityTypeCode 550258 | | | | | | 0..1 550260 | QuantityTypeCode 550262 |
| | | | TotalGrossWeightQuantity 550264 | | | | | | 0..1 550266 | Quantity 550268 |
| | | | TotalGrossWeightQuantityTypeCode 550270 | | | | | | 0..1 550272 | QuantityTypeCode 550274 |
| | | | ExportDeclarationBlockIndicator 550276 | | | | | | 1 550278 | Indicator 550280 |

FIG. 55-10

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | ExportDeclarationCancelIndicator 550282 | | | | | | 1 550284 | Indicator 550286 |
| Party 550288 | | | VendorParty 550290 | | | | | | 0..1 550292 | BusinessTransactionDocumentParty 550294 |
| | | | | InternalID 550296 | | | | | 0..1 550298 | PartyInternalID 550300 |
| | | | | StandardID 550302 | | | | | 0..N 550304 | PartyStandardID 550306 |
| | | | | BuyerID 550308 | | | | | 0..1 550310 | PartyPartyID 550312 |
| | | | | SellerID 550314 | | | | | 0..1 550316 | PartyPartyID 550318 |

FIG. 55-11

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ProductRecipientID 550320 | | | | | 0..1 550322 | PartyPartyID 550324 |
| | | | | VendorID 550326 | | | | | 0..1 550328 | PartyPartyID 550330 |
| | | | | BillToID 550332 | | | | | 0..1 550334 | PartyPartyID 550336 |
| | | | | BillFromID 550338 | | | | | 0..1 550340 | PartyPartyID 550342 |
| | | | | BidderID 550344 | | | | | 0..1 550346 | PartyPartyID 550348 |
| | | | | PaymentTransactionInitiatorID 550350 | | | | | 0..1 550352 | PartyPartyID 550354 |

FIG. 55-12

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PaymentTransactionDestinatedID 550356 | | | | | 0..1 550358 | PartyPartyID 550360 |
| | | | | TaxID 550362 | | | | | 0..1 550364 | PartyTaxID 550366 |
| | | | | ClearingHouseID 550368 | | | | | 0..1 550370 | PartyPartyID 550372 |
| | | | | TypeCode 550374 | | | | | 0..1 550376 | BusinessObjectTypeCode 550378 |
| | | | | DeterminationMethodCode 550380 | | | | | 0..1 550382 | PartyDeterminationMethodCode 550384 |

FIG. 55-13

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | AddressReference 550386 | | | | | 0..1 550388 | PartyAddressReference 550390 |
| | | | Address 550392 | | | | | Address 550394 | | | | | 0..1 550396 | Address 550398 |
| | | | | | | | | | OrganisationFormOfAddress 550400 | | | | 0..1 550402 | FormOfAddress 550404 |
| | | | | | | | | | OrganisationFormattedName 550406 | | | | 0..N 550408 | LANGUAGEINDEPENDENT_MEDIUM_Name 550410 |
| | | | | | | | | | PersonName 550412 | | | | 0..1 550414 | PersonName 550416 |

FIG. 55-14

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FunctionalTitleName 550418 | | | | 0..1 550420 | LANGUAGEINDEPENDENT_MEDIUM_Name 550422 |
| | | | | | DepartmentName 550424 | | | | 0..1 550426 | LANGUAGEINDEPENDENT_MEDIUM_Name 550428 |
| | | | | | Office 550432 | | | | 0..1 550434 | Office 550436 |
| | | | | | Physical Address 550440 | | | | 0..1 550442 | PhysicalAddress 550444 |
| | | | | | | CountryCode 550446 | | | 0..1 550448 | CountryCode 550450 |
| | | | | | | CountryName 550452 | | | 0..1 550454 | MEDIUM_Name 550456 |

FIG. 55-15

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | RegionCode 550458 | | | 0..1 550460 | RegionCode 550462 |
| | | | | | | RegionName 550464 | | | 0..1 550466 | LANGUAGEINDEPENDENT_MEDIUM_Name 550468 |
| | | | | | | StreetPostalCode 550470 | | | 0..1 550472 | PostalCode 550474 |
| | | | | | | POBoxPostalCode 550476 | | | 0..1 550478 | PostalCode 550480 |
| | | | | | | CompanyPostalCode 550482 | | | 0..1 550484 | PostalCode 550486 |

FIG. 55-16

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CityName 550488 | | | 0..1 550490 | LANGUAGEINDEPENDENT_MEDIUM_Name 550492 |
| | | | | | | AdditionalCityName 550494 | | | 0..1 550496 | LANGUAGEINDEPENDENT_MEDIUM_Name 550498 |
| | | | | | | DistrictName 550500 | | | 0..1 550502 | LANGUAGEINDEPENDENT_MEDIUM_Name 550504 |
| | | | | | | POBoxID 550506 | | | 0..1 550508 | POBoxID 550510 |
| | | | | | | POBoxIndicator 550512 | | | 0..1 550514 | Indicator 550516 |

FIG. 55-17

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxCountryCode 550518 | | | 0..1 550520 | CountryCode 550522 |
| | | | | | | POBoxCountryName 550524 | | | 0..1 550526 | MEDIUM_Name 550528 |
| | | | | | | POBoxRegionCode 550530 | | | 0..1 550532 | RegionCode 550534 |
| | | | | | | POBoxRegionName 550536 | | | 0..1 550538 | LANGUAGEINDEPENDENT_MEDIUM_Name 550540 |
| | | | | | | POBoxCityName 550542 | | | 0..1 550544 | LANGUAGEINDEPENDENT_MEDIUM_Name 550546 |

FIG. 55-18

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetName 550548 | | | 0..1 550550 | StreetName 550552 |
| | | | | | | StreetPrefixName 550554 | | | 0..N 550556 | LANGUAGEINDEPENDENT_MEDIUM_Name 550558 |
| | | | | | | StreetSuffixName 550560 | | | 0..N 550562 | LANGUAGEINDEPENDENT_MEDIUM_Name 550564 |
| | | | | | | HouseID 550566 | | | 0..1 550568 | HouseID 550570 |
| | | | | | | AdditionalHouseID 550572 | | | 0..1 550574 | HouseID 550576 |
| | | | | | | BuildingID 550578 | | | 0..1 550580 | BuildingID 550582 |

FIG. 55-19

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | FloorID 550584 | | | 0..1 550586 | FloorID 550588 |
| | | | | | | RoomID 550590 | | | 0..1 550592 | RoomID 550594 |
| | | | | | | CareOfName 550596 | | | 0..1 550598 | LANGUAGEINDEPENDENT_MEDIUM_Name 550600 |
| | | | | | | Description 550602 | | | 0..N 550604 | Description 550606 |
| | | | | | TaxJurisdictionCode 550608 | | | | 0..1 550610 | TaxJurisdictionCode 550612 |
| | | | | | TimeZoneDifferenceValue 550614 | | | | 0..1 550616 | TimeZoneDifferenceValue 550618 |

FIG. 55-20

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | GeoCoordinates 550620 | | | | 0..1 550622 | GeoCoordinates 550624 |
| | | | | | Communication 550628 | | | | 0..1 550630 | Communication 550632 |
| | | | | | | CorrespondenceLanguageCode 550634 | | | 0..1 550636 | LanguageCode 550638 |
| | | | | | | CorrespondenceLanguageName 550640 | | | 0..1 550642 | MEDIUM_Name 550644 |
| | | | | | | Telephone 550646 | | | 0..N 550648 | Telephone 550650 |

FIG. 55-21

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 550652 | | 1 550654 | PhoneNumber 550656 |
| | | | | | | | SMSEnabledIndicator 550658 | | 0..1 550660 | Indicator 550662 |
| | | | | | | | NumberDefaultIndicator 550664 | | 1 550666 | Indicator 550668 |
| | | | | | | | NumberDescription 550670 | | 0..N 550672 | Description 550674 |
| | | | | | | | NumberUsageDenialIndicator 550676 | | 1 550678 | Indicator 550680 |

FIG. 55-22

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | MobilePhone 550682 | | | 0..N 550684 | Telephone 550686 |
| | | | | | | | Number 550688 | | 1 550690 | PhoneNumber 550692 |
| | | | | | | | SMSEnabledIndicator 550694 | | 0..1 550696 | Indicator 550698 |
| | | | | | | | NumberDefaultIndicator 550700 | | 1 550702 | Indicator 550704 |
| | | | | | | | NumberDescription 550706 | | 0..N 550708 | Description 550710 |

FIG. 55-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 550712 | | 1 550714 | Indicator 550716 |
| | | | | | | Facsimile 550718 | | | 0..N 550720 | Facsimile 550722 |
| | | | | | | | Number 550724 | | 1 550726 | PhoneNumber 550728 |
| | | | | | | | NumberDefaultIndicator 550730 | | 1 550732 | Indicator 550734 |
| | | | | | | | NumberDescription 550736 | | 0..N 550738 | Description 550740 |

FIG. 55-24

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 550742 | | 1 550744 | Indicator 550746 |
| | | | | | | Email 550748 | | | 0..N 550750 | Email 550752 |
| | | | | | | | URI 550754 | | 1 550756 | EmailURI 550758 |
| | | | | | | | URIDefaultIndicator 550760 | | 1 550762 | Indicator 550764 |
| | | | | | | | URIDescription 550766 | | 0..N 550768 | Description 550770 |
| | | | | | | | URIUsageDenialIndicator 550772 | | 1 550774 | Indicator 550776 |

FIG. 55-25

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | Web 550778 | | | 0..N 550780 | Web 550782 |
| | | | | | | | | | | | URI 550784 | | 1 550786 | WebURI 550788 |
| | | | | | | | | | | | URIDefaultIndicator 550790 | | 1 550792 | Indicator 550794 |
| | | | | | | | | | | | URIDescription 550796 | | 0..N 550798 | Description 550800 |
| | | | Contact Person 550802 | | | | | ContactPerson 550804 | | | | | 0..N 550806 | ContactPerson 550808 |
| | | | | | | | | | InternalID 550810 | | | | 0..1 550812 | ContactPersonInternalID 550814 |
| | | | | | | | | | BuyerID 550816 | | | | 0..1 550818 | ContactPersonPartyID 550820 |

FIG. 55-26

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | SellerID 550822 | | | | 0..1 550824 | ContactPersonPartyID 550826 |
| | | | | | ProductRecipientID 550828 | | | | 0..1 550830 | ContactPersonPartyID 550832 |
| | | | | | VendorID 550834 | | | | 0..1 550836 | ContactPersonPartyID 550838 |
| | | | | | BillToID 550840 | | | | 0..1 550842 | ContactPersonPartyID 550844 |
| | | | | | BillFromID 550846 | | | | 0..1 550848 | ContactPersonPartyID 550850 |
| | | | | | BidderID 550852 | | | | 0..1 550854 | ContactPersonPartyID 550856 |

FIG. 55-27

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | AddressReference 550858 | | | | 0..1 550860 | PartyAddressReference 550862 |
| Address 550864 | | | | | Address 550866 | | | | 0..1 550868 | Address 550870 |
| | | | | | | OrganisationFormOfAddress 550872 | | | 0..1 550874 | FormOfAddress 550876 |
| | | | | | | OrganisationFormattedName 550878 | | | 0..N 550880 | LANGUAGEINDEPENDENT_MEDIUM_Name 550882 |
| | | | | | | PersonName 550884 | | | 0..1 550886 | PersonName 550888 |

FIG. 55-28

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | FunctionalTitleName 550890 | | | 0..1 550892 | LANGUAGEINDEPENDENT_MEDIUM_Name 550894 |
| | | | | | | DepartmentName 550896 | | | 0..1 550898 | LANGUAGEINDEPENDENT_MEDIUM_Name 550900 |
| | | | | | | Office 550904 | | | 0..1 550906 | Office 550908 |
| | | | | | | Physical Address 550912 | | | 0..1 550914 | PhysicalAddress 550916 |
| | | | | | | | Country Code 550918 | | 0..1 550920 | CountryCode 550922 |
| | | | | | | | Country Name 550924 | | 0..1 550926 | MEDIUM_Name 550928 |

FIG. 55-29

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | RegionCode 550930 | | 0..1 550932 | RegionCode 550934 |
| | | | | | | | RegionName 550936 | | 0..1 550938 | LANGUAGEINDEPENDENT_MEDIUM_Name 550940 |
| | | | | | | | StreetPostalCode 550942 | | 0..1 550944 | PostalCode 550946 |
| | | | | | | | POBoxPostalCode 550948 | | 0..1 550950 | PostalCode 550952 |
| | | | | | | | CompanyPostalCode 550954 | | 0..1 550956 | PostalCode 550958 |

FIG. 55-30

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CityName 550960 | | 0..1 550962 | LANGUAGEINDEPENDENT_MEDIUM_Name 550964 |
| | | | | | | | AdditionalCityName 550966 | | 0..1 550968 | LANGUAGEINDEPENDENT_MEDIUM_Name 550970 |
| | | | | | | | DistrictName 550972 | | 0..1 550974 | LANGUAGEINDEPENDENT_MEDIUM_Name 550976 |
| | | | | | | | POBoxID 550978 | | 0..1 550980 | POBoxID 550982 |
| | | | | | | | POBoxIndicator 550984 | | 0..1 550986 | Indicator 550988 |

FIG. 55-31

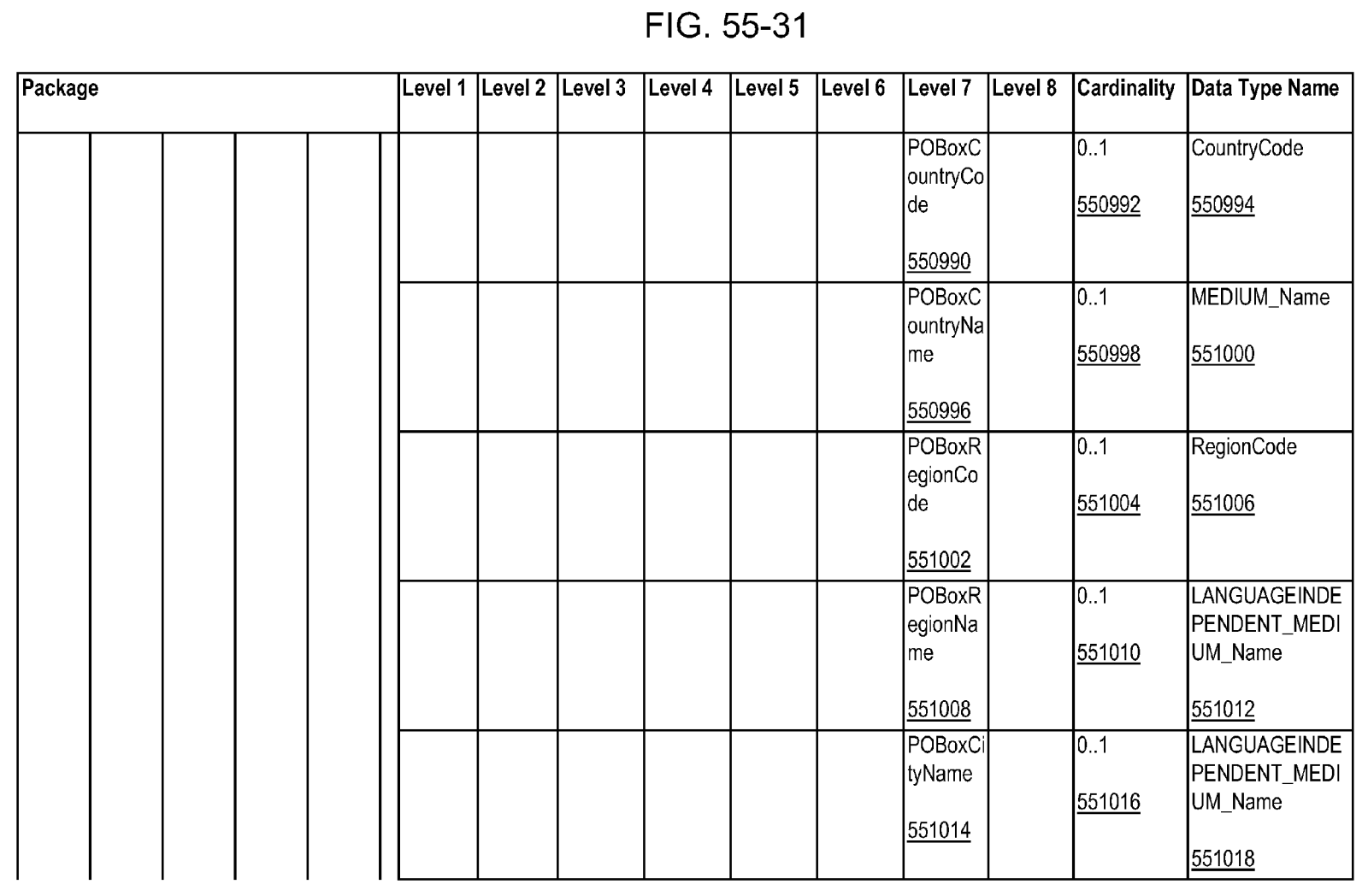

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxCountryCode 550990 | | 0..1 550992 | CountryCode 550994 |
| | | | | | | | POBoxCountryName 550996 | | 0..1 550998 | MEDIUM_Name 551000 |
| | | | | | | | POBoxRegionCode 551002 | | 0..1 551004 | RegionCode 551006 |
| | | | | | | | POBoxRegionName 551008 | | 0..1 551010 | LANGUAGEINDEPENDENT_MEDIUM_Name 551012 |
| | | | | | | | POBoxCityName 551014 | | 0..1 551016 | LANGUAGEINDEPENDENT_MEDIUM_Name 551018 |

FIG. 55-32

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetName 551020 | | 0..1 551022 | StreetName 551024 |
| | | | | | | | StreetPrefixName 551026 | | 0..N 551028 | LANGUAGEINDEPENDENT_MEDIUM_Name 551030 |
| | | | | | | | StreetSuffixName 551032 | | 0..N 551034 | LANGUAGEINDEPENDENT_MEDIUM_Name 551036 |
| | | | | | | | HouseID 551038 | | 0..1 551040 | HouseID 551042 |
| | | | | | | | AdditionalHouseID 551044 | | 0..1 551046 | HouseID 551048 |
| | | | | | | | BuildingID 551050 | | 0..1 551052 | BuildingID 551054 |

FIG. 55-33

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | FloorID 551056 | | 0..1 551058 | FloorID 551060 |
| | | | | | | | RoomID 551062 | | 0..1 551064 | RoomID 551066 |
| | | | | | | | CareOfName 551068 | | 0..1 551070 | LANGUAGEINDEPENDENT_MEDIUM_Name 551072 |
| | | | | | | | Description 551074 | | 0..N 551076 | Description 551078 |
| | | | | | | TaxJurisdictionCode 551080 | | | 0..1 551082 | TaxJurisdictionCode 551084 |
| | | | | | | TimeZoneDifferenceValue 551086 | | | 0..1 551088 | TimeZoneDifferenceValue 551090 |

FIG. 55-34

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | GeoCoordinates 551092 | | | 0..1 551094 | GeoCoordinates 551096 |
| | | | | | | Communication 551100 | | | 0..1 551102 | Communication 551104 |
| | | | | | | | CorrespondenceLanguageCode 551106 | | 0..1 551108 | LanguageCode 551110 |
| | | | | | | | CorrespondenceLanguageName 551112 | | 0..1 551114 | MEDIUM_Name 551116 |
| | | | | | | | Telephone 551118 | | 0..N 551120 | Telephone 551122 |

FIG. 55-35

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 551124 | 1 551126 | PhoneNumber 551128 |
| | | | | | | | | SMSEnabledIndicator 551130 | 0..1 551132 | Indicator 551134 |
| | | | | | | | | NumberDefaultIndicator 551136 | 1 551138 | Indicator 551140 |
| | | | | | | | | NumberDescription 551142 | 0..N 551144 | Description 551146 |
| | | | | | | | | NumberUsageDenialIndicator 551148 | 1 551150 | Indicator 551152 |

FIG. 55-36

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | MobilePhone 551154 | | 0..N 551156 | Telephone 551158 |
| | | | | | | | | Number 551160 | 1 551162 | PhoneNumber 551164 |
| | | | | | | | | SMSEnabledIndicator 551166 | 0..1 551168 | Indicator 551170 |
| | | | | | | | | NumberDefaultIndicator 551172 | 1 551174 | Indicator 551176 |
| | | | | | | | | NumberDescription 551178 | 0..N 551180 | Description 551182 |

FIG. 55-37

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number UsageDenialIndicator 551184 | 1 551186 | Indicator 551188 |
| | | | | | | | Facsimile 551190 | | 0..N 551192 | Facsimile 551194 |
| | | | | | | | | Number 551196 | 1 551198 | PhoneNumber 551200 |
| | | | | | | | | Number DefaultIndicator 551202 | 1 551204 | Indicator 551206 |
| | | | | | | | | Number Description 551208 | 0..N 551210 | Description 551212 |

FIG. 55-38

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberUsageDenialIndicator 551214 | 1 551216 | Indicator 551218 |
| | | | | | | | Email 551220 | | 0..N 551222 | Email 551224 |
| | | | | | | | | URI 551226 | 1 551228 | EmailURI 551230 |
| | | | | | | | | URIDefaultIndicator 551232 | 1 551234 | Indicator 551236 |
| | | | | | | | | URIDescription 551238 | 0..N 551240 | Description 551242 |
| | | | | | | | | URIUsageDenialIndicator 551244 | 1 551246 | Indicator 551248 |

FIG. 55-39

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Web 551250 | | 0..N 551252 | Web 551254 |
| | | | | | | | | URI 551256 | 1 551258 | WebURI 551260 |
| | | | | | | | | URIDefaultIndicator 551262 | 1 551264 | Indicator 551266 |
| | | | | | | | | URIDescription 551268 | 0..N 551270 | Description 551272 |
| | | | ProductRecipientParty 551276 | | | | | | 0..1 551278 | BusinessTransactionDocumentParty 551280 |
| | | | | InternalID 551282 | | | | | 0..1 551284 | PartyInternalID 551286 |

FIG. 55-40

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | StandardID 551288 | | | | | 0..N 551290 | PartyStandardID 551292 |
| | | | | BuyerID 551294 | | | | | 0..1 551296 | PartyPartyID 551298 |
| | | | | SellerID 551300 | | | | | 0..1 551302 | PartyPartyID 551304 |
| | | | | ProductRecipientID 551306 | | | | | 0..1 551308 | PartyPartyID 551310 |
| | | | | VendorID 551312 | | | | | 0..1 551314 | PartyPartyID 551316 |
| | | | | BillToID 551318 | | | | | 0..1 551320 | PartyPartyID 551322 |
| | | | | BillFromID 551324 | | | | | 0..1 551326 | PartyPartyID 551328 |

FIG. 55-41

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | BidderID 551330 | | | | | 0..1 551332 | PartyPartyID 551334 |
| | | | | PaymentTransactionInitiatorID 551336 | | | | | 0..1 551338 | PartyPartyID 551340 |
| | | | | PaymentTransactionDestinatedID 551342 | | | | | 0..1 551344 | PartyPartyID 551346 |
| | | | | TaxID 551348 | | | | | 0..1 551350 | PartyTaxID 551352 |
| | | | | ClearingHouseID 551354 | | | | | 0..1 551356 | PartyPartyID 551358 |

FIG. 55-42

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | TypeCode 551360 | | | | | 0..1 551362 | BusinessObjectTypeCode 551364 |
| | | | | | | | | | DeterminationMethodCode 551366 | | | | | 0..1 551368 | PartyDeterminationMethodCode 551370 |
| | | | | | | | | | AddressReference 551372 | | | | | 0..1 551374 | PartyAddressReference 551376 |
| | | | | Address 551378 | | | | | Address 551380 | | | | | 0..1 551382 | Address 551384 |
| | | | | | | | | | | OrganisationFormOfAddress 551386 | | | | 0..1 551388 | FormOfAddress 551390 |

FIG. 55-43

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 551392 | | | | 0..N 551394 | LANGUAGEINDEPENDENT_MEDIUM_Name 551396 |
| | | | | | PersonName 551398 | | | | 0..1 551400 | PersonName 551402 |
| | | | | | FunctionalTitleName 551404 | | | | 0..1 551406 | LANGUAGEINDEPENDENT_MEDIUM_Name 551408 |
| | | | | | DepartmentName 551410 | | | | 0..1 551412 | LANGUAGEINDEPENDENT_MEDIUM_Name 551414 |
| | | | | | Office 551418 | | | | 0..1 551420 | Office 551422 |

FIG. 55-44

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Physical Address 551426 | | | | 0..1 551428 | PhysicalAddress 551430 |
| | | | | | | CountryCode 551432 | | | 0..1 551434 | CountryCode 551436 |
| | | | | | | CountryName 551438 | | | 0..1 551440 | MEDIUM_Name 551442 |
| | | | | | | RegionCode 551444 | | | 0..1 551446 | RegionCode 551448 |
| | | | | | | RegionName 551450 | | | 0..1 551452 | LANGUAGEINDEPENDENT_MEDIUM_Name 551454 |
| | | | | | | StreetPostalCode 551456 | | | 0..1 551458 | PostalCode 551460 |

FIG. 55-45

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxPostalCode 551462 | | | 0..1 551464 | PostalCode 551466 |
| | | | | | | CompanyPostalCode 551468 | | | 0..1 551470 | PostalCode 551472 |
| | | | | | | CityName 551474 | | | 0..1 551476 | LANGUAGEINDEPENDENT_MEDIUM_Name 551478 |
| | | | | | | AdditionalCityName 551480 | | | 0..1 551482 | LANGUAGEINDEPENDENT_MEDIUM_Name 551484 |
| | | | | | | DistrictName 551486 | | | 0..1 551488 | LANGUAGEINDEPENDENT_MEDIUM_Name 551490 |

FIG. 55-46

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 551492 | | | 0..1 551494 | POBoxID 551496 |
| | | | | | | POBoxIndicator 551498 | | | 0..1 551500 | Indicator 551502 |
| | | | | | | POBoxCountryCode 551504 | | | 0..1 551506 | CountryCode 551508 |
| | | | | | | POBoxCountryName 551510 | | | 0..1 551512 | MEDIUM_Name 551514 |
| | | | | | | POBoxRegionCode 551516 | | | 0..1 551518 | RegionCode 551520 |

FIG. 55-47

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionName 551522 | | | 0..1 551524 | LANGUAGEINDEPENDENT_MEDIUM_Name 551526 |
| | | | | | | POBoxCityName 551528 | | | 0..1 551530 | LANGUAGEINDEPENDENT_MEDIUM_Name 551532 |
| | | | | | | StreetName 551534 | | | 0..1 551536 | StreetName 551538 |
| | | | | | | StreetPrefixName 551540 | | | 0..N 551542 | LANGUAGEINDEPENDENT_MEDIUM_Name 551544 |
| | | | | | | StreetSuffixName 551546 | | | 0..N 551548 | LANGUAGEINDEPENDENT_MEDIUM_Name 551550 |

FIG. 55-48

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 551552 | | | 0..1 551554 | HouseID 551556 |
| | | | | | | AdditionalHouseID 551558 | | | 0..1 551560 | HouseID 551562 |
| | | | | | | BuildingID 551564 | | | 0..1 551566 | BuildingID 551568 |
| | | | | | | FloorID 551570 | | | 0..1 551572 | FloorID 551574 |
| | | | | | | RoomID 551576 | | | 0..1 551578 | RoomID 551580 |
| | | | | | | CareOfName 551582 | | | 0..1 551584 | LANGUAGEINDEPENDENT_MEDIUM_Name 551586 |

FIG. 55-49

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description 551588 | | | 0..N 551590 | Description 551592 |
| | | | | | TaxJurisdictionCode 551594 | | | | 0..1 551596 | TaxJurisdictionCode 551598 |
| | | | | | TimeZoneDifferenceValue 551600 | | | | 0..1 551602 | TimeZoneDifferenceValue 551604 |
| | | | | | GeoCoordinates 551606 | | | | 0..1 551608 | GeoCoordinates 551610 |
| | | | | | Communication 551614 | | | | 0..1 551616 | Communication 551618 |

FIG. 55-50

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageCode 551620 | | | 0..1 551622 | LanguageCode 551624 |
| | | | | | | CorrespondenceLanguageName 551626 | | | 0..1 551628 | MEDIUM_Name 551630 |
| | | | | | | Telephone 551632 | | | 0..N 551634 | Telephone 551636 |
| | | | | | | | Number 551638 | | 1 551640 | PhoneNumber 551642 |
| | | | | | | | SMSEnabledIndicator 551644 | | 0..1 551646 | Indicator 551648 |

FIG. 55-51

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 551650 | | 1 551652 | Indicator 551654 |
| | | | | | | | NumberDescription 551656 | | 0..N 551658 | Description 551660 |
| | | | | | | | NumberUsageDenialIndicator 551662 | | 1 551664 | Indicator 551666 |
| | | | | | | MobilePhone 551668 | | | 0..N 551670 | Telephone 551672 |
| | | | | | | | Number 551674 | | 1 551676 | PhoneNumber 551678 |

FIG. 55-52

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 551680 | | 0..1 551682 | Indicator 551684 |
| | | | | | | | NumberDefaultIndicator 551686 | | 1 551688 | Indicator 551690 |
| | | | | | | | NumberDescription 551692 | | 0..N 551694 | Description 551696 |
| | | | | | | | NumberUsageDenialIndicator 551698 | | 1 551700 | Indicator 551702 |
| | | | | | | Facsimile 551704 | | | 0..N 551706 | Facsimile 551708 |

FIG. 55-53

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 551710 | | 1 551712 | PhoneNumber 551714 |
| | | | | | | | NumberDefaultIndicator 551716 | | 1 551718 | Indicator 551720 |
| | | | | | | | NumberDescription 551722 | | 0..N 551724 | Description 551726 |
| | | | | | | | NumberUsageDenialIndicator 551728 | | 1 551730 | Indicator 551732 |
| | | | | | | Email 551734 | | | 0..N 551736 | Email 551738 |
| | | | | | | | URI 551740 | | 1 551742 | EmailURI 551744 |

FIG. 55-54

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 551746 | | 1 551748 | Indicator 551750 |
| | | | | | | | URIDescription 551752 | | 0..N 551754 | Description 551756 |
| | | | | | | | URIUsageDenialIndicator 551758 | | 1 551760 | Indicator 551762 |
| | | | | | | Web 551764 | | | 0..N 551766 | Web 551768 |
| | | | | | | | URI 551770 | | 1 551772 | WebURI 551774 |
| | | | | | | | URIDefaultIndicator 551776 | | 1 551778 | Indicator 551780 |

FIG. 55-55

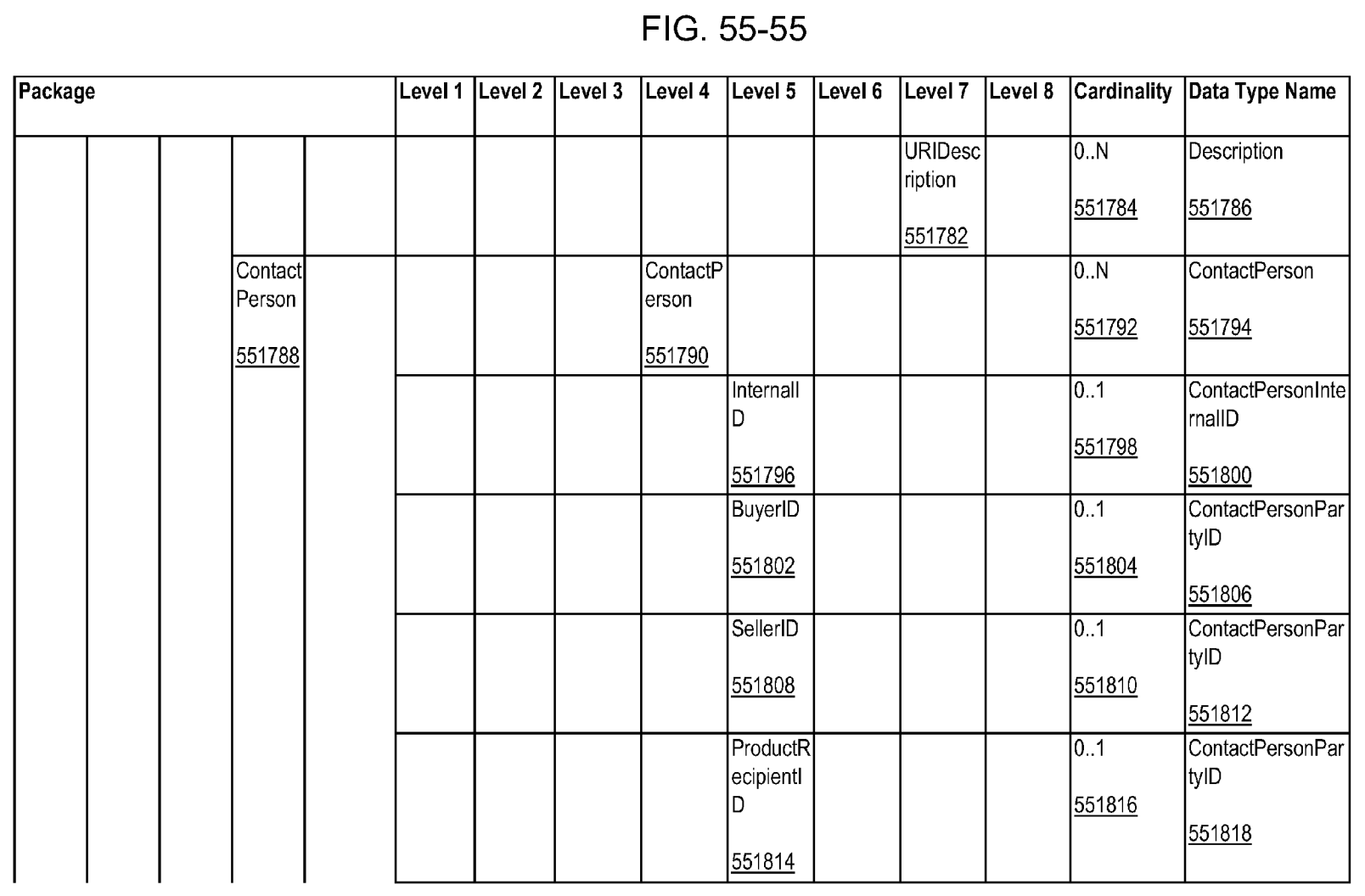

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | URIDescription 551782 | | 0..N 551784 | Description 551786 |
| | | | ContactPerson 551788 | | | | | ContactPerson 551790 | | | | | 0..N 551792 | ContactPerson 551794 |
| | | | | | | | | | InternalID 551796 | | | | 0..1 551798 | ContactPersonInternalID 551800 |
| | | | | | | | | | BuyerID 551802 | | | | 0..1 551804 | ContactPersonPartyID 551806 |
| | | | | | | | | | SellerID 551808 | | | | 0..1 551810 | ContactPersonPartyID 551812 |
| | | | | | | | | | ProductRecipientID 551814 | | | | 0..1 551816 | ContactPersonPartyID 551818 |

FIG. 55-56

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | VendorID 551820 | | | | 0..1 551822 | ContactPersonPartyID 551824 |
| | | | | | BillToID 551826 | | | | 0..1 551828 | ContactPersonPartyID 551830 |
| | | | | | BillFromID 551832 | | | | 0..1 551834 | ContactPersonPartyID 551836 |
| | | | | | BidderID 551838 | | | | 0..1 551840 | ContactPersonPartyID 551842 |
| | | | | | AddressReference 551844 | | | | 0..1 551846 | PartyAddressReference 551848 |
| Address 551850 | | | | | Address 551852 | | | | 0..1 551854 | Address 551856 |

FIG. 55-57

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormOfAddress 551858 | | | 0..1 551860 | FormOfAddress 551862 |
| | | | | | | OrganisationFormattedName 551864 | | | 0..N 551866 | LANGUAGEINDEPENDENT_MEDIUM_Name 551868 |
| | | | | | | PersonName 551870 | | | 0..1 551872 | PersonName 551874 |
| | | | | | | FunctionalTitleName 551876 | | | 0..1 551878 | LANGUAGEINDEPENDENT_MEDIUM_Name 551880 |
| | | | | | | DepartmentName 551882 | | | 0..1 551884 | LANGUAGEINDEPENDENT_MEDIUM_Name 551886 |

FIG. 55-58

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Office 551890 | | | 0..1 551892 | Office 551894 |
| | | | | | | Physical Address 551898 | | | 0..1 551900 | PhysicalAddress 551902 |
| | | | | | | | Country Code 551904 | | 0..1 551906 | CountryCode 551908 |
| | | | | | | | Country Name 551910 | | 0..1 551912 | MEDIUM_Name 551914 |
| | | | | | | | RegionC ode 551916 | | 0..1 551918 | RegionCode 551920 |
| | | | | | | | RegionN ame 551922 | | 0..1 551924 | LANGUAGEINDE PENDENT_MEDI UM_Name 551926 |

FIG. 55-59

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetPostalCode 551928 | | 0..1 551930 | PostalCode 551932 |
| | | | | | | | POBoxPostalCode 551934 | | 0..1 551936 | PostalCode 551938 |
| | | | | | | | CompanyPostalCode 551940 | | 0..1 551942 | PostalCode 551944 |
| | | | | | | | CityName 551946 | | 0..1 551948 | LANGUAGEINDEPENDENT_MEDIUM_Name 551950 |
| | | | | | | | AdditionalCityName 551952 | | 0..1 551954 | LANGUAGEINDEPENDENT_MEDIUM_Name 551956 |

FIG. 55-60

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | DistrictName 551958 | | 0..1 551960 | LANGUAGEINDEPENDENT_MEDIUM_Name 551962 |
| | | | | | | | POBoxID 551964 | | 0..1 551966 | POBoxID 551968 |
| | | | | | | | POBoxIndicator 551970 | | 0..1 551972 | Indicator 551974 |
| | | | | | | | POBoxCountryCode 551976 | | 0..1 551978 | CountryCode 551980 |
| | | | | | | | POBoxCountryName 551982 | | 0..1 551984 | MEDIUM_Name 551986 |

FIG. 55-61

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionCode 551988 | | 0..1 551990 | RegionCode 551992 |
| | | | | | | | POBoxRegionName 551994 | | 0..1 551996 | LANGUAGEINDEPENDENT_MEDIUM_Name 551998 |
| | | | | | | | POBoxCityName 552000 | | 0..1 552002 | LANGUAGEINDEPENDENT_MEDIUM_Name 552004 |
| | | | | | | | StreetName 552006 | | 0..1 552008 | StreetName 552010 |
| | | | | | | | StreetPrefixName 552012 | | 0..N 552014 | LANGUAGEINDEPENDENT_MEDIUM_Name 552016 |

FIG. 55-62

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetSuffixName 552018 | | 0..N 552020 | LANGUAGEINDEPENDENT_MEDIUM_Name 552022 |
| | | | | | | | HouseID 552024 | | 0..1 552026 | HouseID 552028 |
| | | | | | | | AdditionalHouseID 552030 | | 0..1 552032 | HouseID 552034 |
| | | | | | | | BuildingID 552036 | | 0..1 552038 | BuildingID 552040 |
| | | | | | | | FloorID 552042 | | 0..1 552044 | FloorID 552046 |
| | | | | | | | RoomID 552048 | | 0..1 552050 | RoomID 552052 |

FIG. 55-63

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CareOfName 552054 | | 0..1 552056 | LANGUAGEINDEPENDENT_MEDIUM_Name 552058 |
| | | | | | | | Description 552060 | | 0..N 552062 | Description 552064 |
| | | | | | | TaxJurisdictionCode 552066 | | | 0..1 552068 | TaxJurisdictionCode 552070 |
| | | | | | | TimeZoneDifferenceValue 552072 | | | 0..1 552074 | TimeZoneDifferenceValue 552076 |
| | | | | | | GeoCoordinates 552078 | | | 0..1 552080 | GeoCoordinates 552082 |

FIG. 55-64

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Communication 552086 | | | 0..1 552088 | Communication 552090 |
| | | | | | | | CorrespondenceLanguageCode 552092 | | 0..1 552094 | LanguageCode 552096 |
| | | | | | | | CorrespondenceLanguageName 552098 | | 0..1 552100 | MEDIUM_Name 552102 |
| | | | | | | | Telephone 552104 | | 0..N 552106 | Telephone 552108 |
| | | | | | | | | Number 552110 | 1 552112 | PhoneNumber 552114 |

FIG. 55-65

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 552116 | 0..1 552118 | Indicator 552120 |
| | | | | | | | | NumberDefaultIndicator 552122 | 1 552124 | Indicator 552126 |
| | | | | | | | | NumberDescription 552128 | 0..N 552130 | Description 552132 |
| | | | | | | | | NumberUsageDenialIndicator 552134 | 1 552136 | Indicator 552138 |
| | | | | | | | MobilePhone 552140 | | 0..N 552142 | Telephone 552144 |

FIG. 55-66

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 552146 | 1 552148 | PhoneNumber 552150 |
| | | | | | | | | SMSEnabledIndicator 552152 | 0..1 552154 | Indicator 552156 |
| | | | | | | | | NumberDefaultIndicator 552158 | 1 552160 | Indicator 552162 |
| | | | | | | | | NumberDescription 552164 | 0..N 552166 | Description 552168 |
| | | | | | | | | NumberUsageDenialIndicator 552170 | 1 552172 | Indicator 552174 |

FIG. 55-67

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Facsimile 552176 | | 0..N 552178 | Facsimile 552180 |
| | | | | | | | | Number 552182 | 1 552184 | PhoneNumber 552186 |
| | | | | | | | | NumberDefaultIndicator 552188 | 1 552190 | Indicator 552192 |
| | | | | | | | | NumberDescription 552194 | 0..N 552196 | Description 552198 |
| | | | | | | | | NumberUsageDenialIndicator 552200 | 1 552202 | Indicator 552204 |
| | | | | | | | Email 552206 | | 0..N 552208 | Email 552210 |

FIG. 55-68

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URI 552212 | 1 552214 | EmailURI 552216 |
| | | | | | | | | URIDefaultIndicator 552218 | 1 552220 | Indicator 552222 |
| | | | | | | | | URIDescription 552224 | 0..N 552226 | Description 552228 |
| | | | | | | | | URIUsageDenialIndicator 552230 | 1 552232 | Indicator 552234 |
| | | | | | | | Web 552236 | | 0..N 552238 | Web 552240 |
| | | | | | | | | URI 552242 | 1 552244 | WebURI 552246 |

FIG. 55-69

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 552248 | 1 552250 | Indicator 552252 |
| | | | | | | | | URIDescription 552254 | 0..N 552256 | Description 552258 |
| | | | SellerParty 552262 | | | | | | 0..1 552264 | BusinessTransactionDocumentParty 552266 |
| | | | | InternalID 552268 | | | | | 0..1 552270 | PartyInternalID 552272 |
| | | | | StandardID 552274 | | | | | 0..N 552276 | PartyStandardID 552278 |
| | | | | BuyerID 552280 | | | | | 0..1 552282 | PartyPartyID 552284 |

FIG. 55-70

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | SellerID 552286 | | | | | 0..1 552288 | PartyPartyID 552290 |
| | | | | ProductRecipientID 552292 | | | | | 0..1 552294 | PartyPartyID 552296 |
| | | | | VendorID 552298 | | | | | 0..1 552300 | PartyPartyID 552302 |
| | | | | BillToID 552304 | | | | | 0..1 552306 | PartyPartyID 552308 |
| | | | | BillFromID 552310 | | | | | 0..1 552312 | PartyPartyID 552314 |
| | | | | BidderID 552316 | | | | | 0..1 552318 | PartyPartyID 552320 |

FIG. 55-71

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PaymentTransactionInitiatorID 552322 | | | | | 0..1 552324 | PartyPartyID 552326 |
| | | | | PaymentTransactionDestinatedID 552328 | | | | | 0..1 552330 | PartyPartyID 552332 |
| | | | | TaxID 552334 | | | | | 0..1 552336 | PartyTaxID 552338 |
| | | | | ClearingHouseID 552340 | | | | | 0..1 552342 | PartyPartyID 552344 |
| | | | | TypeCode 552346 | | | | | 0..1 552348 | BusinessObjectTypeCode 552350 |

FIG. 55-72

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | DeterminationMethodCode 552352 | | | | | 0..1 552354 | PartyDeterminationMethodCode 552356 |
| | | | | | | | | AddressReference 552358 | | | | | 0..1 552360 | PartyAddressReference 552362 |
| | | | Address 552364 | | | | | Address 552366 | | | | | 0..1 552368 | Address 552370 |
| | | | | | | | | | OrganisationFormOfAddress 552372 | | | | 0..1 552374 | FormOfAddress 552376 |
| | | | | | | | | | OrganisationFormattedName 552378 | | | | 0..N 552380 | LANGUAGEINDEPENDENT_MEDIUM_Name 552382 |

FIG. 55-73

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | PersonName 552384 | | | | 0..1 552386 | PersonName 552388 |
| | | | | | FunctionalTitleName 552390 | | | | 0..1 552392 | LANGUAGEINDEPENDENT_MEDIUM_Name 552394 |
| | | | | | DepartmentName 552396 | | | | 0..1 552398 | LANGUAGEINDEPENDENT_MEDIUM_Name 552400 |
| | | | | | Office 552404 | | | | 0..1 552406 | Office 552408 |
| | | | | | PhysicalAddress 552412 | | | | 0..1 552414 | PhysicalAddress 552416 |
| | | | | | | CountryCode 552418 | | | 0..1 552420 | CountryCode 552422 |

FIG. 55-74

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CountryName 552424 | | | 0..1 552426 | MEDIUM_Name 552428 |
| | | | | | | RegionCode 552430 | | | 0..1 552432 | RegionCode 552434 |
| | | | | | | RegionName 552436 | | | 0..1 552438 | LANGUAGEINDEPENDENT_MEDIUM_Name 552440 |
| | | | | | | StreetPostalCode 552442 | | | 0..1 552444 | PostalCode 552446 |
| | | | | | | POBoxPostalCode 552448 | | | 0..1 552450 | PostalCode 552452 |

FIG. 55-75

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CompanyPostalCode 552454 | | | 0..1 552456 | PostalCode 552458 |
| | | | | | | CityName 552460 | | | 0..1 552462 | LANGUAGEINDEPENDENT_MEDIUM_Name 552464 |
| | | | | | | AdditionalCityName 552466 | | | 0..1 552468 | LANGUAGEINDEPENDENT_MEDIUM_Name 552470 |
| | | | | | | DistrictName 552472 | | | 0..1 552474 | LANGUAGEINDEPENDENT_MEDIUM_Name 552476 |
| | | | | | | POBoxID 552478 | | | 0..1 552480 | POBoxID 552482 |

FIG. 55-76

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxIndicator 552484 | | | 0..1 552486 | Indicator 552488 |
| | | | | | | POBoxCountryCode 552490 | | | 0..1 552492 | CountryCode 552494 |
| | | | | | | POBoxCountryName 552496 | | | 0..1 552498 | MEDIUM_Name 552500 |
| | | | | | | POBoxRegionCode 552502 | | | 0..1 552504 | RegionCode 552506 |
| | | | | | | POBoxRegionName 552508 | | | 0..1 552510 | LANGUAGEINDEPENDENT_MEDIUM_Name 552512 |

FIG. 55-77

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxCityName 552514 | | | 0..1 552516 | LANGUAGEINDEPENDENT_MEDIUM_Name 552518 |
| | | | | | | StreetName 552520 | | | 0..1 552522 | StreetName 552524 |
| | | | | | | StreetPrefixName 552526 | | | 0..N 552528 | LANGUAGEINDEPENDENT_MEDIUM_Name 552530 |
| | | | | | | StreetSuffixName 552532 | | | 0..N 552534 | LANGUAGEINDEPENDENT_MEDIUM_Name 552536 |
| | | | | | | HouseID 552538 | | | 0..1 552540 | HouseID 552542 |

FIG. 55-78

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | AdditionalHouseID 552544 | | | 0..1 552546 | HouseID 552548 |
| | | | | | | BuildingID 552550 | | | 0..1 552552 | BuildingID 552554 |
| | | | | | | FloorID 552556 | | | 0..1 552558 | FloorID 552560 |
| | | | | | | RoomID 552562 | | | 0..1 552564 | RoomID 552566 |
| | | | | | | CareOfName 552568 | | | 0..1 552570 | LANGUAGEINDEPENDENT_MEDIUM_Name 552572 |
| | | | | | | Description 552574 | | | 0..N 552576 | Description 552578 |

FIG. 55-79

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | TaxJurisdictionCode 552580 | | | | 0..1 552582 | TaxJurisdictionCode 552584 |
| | | | | | TimeZoneDifferenceValue 552586 | | | | 0..1 552588 | TimeZoneDifferenceValue 552590 |
| | | | | | GeoCoordinates 552592 | | | | 0..1 552594 | GeoCoordinates 552596 |
| | | | | | Communication 552600 | | | | 0..1 552602 | Communication 552604 |
| | | | | | | CorrespondenceLanguageCode 552606 | | | 0..1 552608 | LanguageCode 552610 |

FIG. 55-80

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageName 552612 | | | 0..1 552614 | MEDIUM_Name 552616 |
| | | | | | | Telephone 552618 | | | 0..N 552620 | Telephone 552622 |
| | | | | | | | Number 552624 | | 1 552626 | PhoneNumber 552628 |
| | | | | | | | SMSEnabledIndicator 552630 | | 0..1 552632 | Indicator 552634 |
| | | | | | | | NumberDefaultIndicator 552636 | | 1 552638 | Indicator 552640 |

FIG. 55-81

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDescription 552642 | | 0..N 552644 | Description 552646 |
| | | | | | | | NumberUsageDenialIndicator 552648 | | 1 552650 | Indicator 552652 |
| | | | | | | MobilePhone 552654 | | | 0..N 552656 | Telephone 552658 |
| | | | | | | | Number 552660 | | 1 552662 | PhoneNumber 552664 |
| | | | | | | | SMSEnabledIndicator 552666 | | 0..1 552668 | Indicator 552670 |

FIG. 55-82

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number DefaultIndicator 552672 | | 1 552674 | Indicator 552676 |
| | | | | | | | Number Description 552678 | | 0..N 552680 | Description 552682 |
| | | | | | | | Number UsageDenialIndicator 552684 | | 1 552686 | Indicator 552688 |
| | | | | | | Facsimile 552690 | | | 0..N 552692 | Facsimile 552694 |
| | | | | | | | Number 552696 | | 1 552698 | PhoneNumber 552700 |

FIG. 55-83

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 552702 | | 1 552704 | Indicator 552706 |
| | | | | | | | NumberDescription 552708 | | 0..N 552710 | Description 552712 |
| | | | | | | | NumberUsageDenialIndicator 552714 | | 1 552716 | Indicator 552718 |
| | | | | | | Email 552720 | | | 0..N 552722 | Email 552724 |
| | | | | | | | URI 552726 | | 1 552728 | EmailURI 552730 |
| | | | | | | | URIDefaultIndicator 552732 | | 1 552734 | Indicator 552736 |

FIG. 55-84

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDescription 552738 | | 0..N 552740 | Description 552742 |
| | | | | | | | URIUsageDenialIndicator 552744 | | 1 552746 | Indicator 552748 |
| | | | | | | Web 552750 | | | 0..N 552752 | Web 552754 |
| | | | | | | | URI 552756 | | 1 552758 | WebURI 552760 |
| | | | | | | | URIDefaultIndicator 552762 | | 1 552764 | Indicator 552766 |
| | | | | | | | URIDescription 552768 | | 0..N 552770 | Description 552772 |

FIG. 55-85

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | ContactPerson 552774 | | | | | ContactPerson 552776 | | | | | 0..N 552778 | ContactPerson 552780 |
| | | | | | | | | | InternalID 552782 | | | | 0..1 552784 | ContactPersonInternalID 552786 |
| | | | | | | | | | BuyerID 552788 | | | | 0..1 552790 | ContactPersonPartyID 552792 |
| | | | | | | | | | SellerID 552794 | | | | 0..1 552796 | ContactPersonPartyID 552798 |
| | | | | | | | | | ProductRecipientID 552800 | | | | 0..1 552802 | ContactPersonPartyID 552804 |
| | | | | | | | | | VendorID 552806 | | | | 0..1 552808 | ContactPersonPartyID 552810 |

FIG. 55-86

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BillToID 552812 | | | | 0..1 552814 | ContactPersonPartyID 552816 |
| | | | | | BillFromID 552818 | | | | 0..1 552820 | ContactPersonPartyID 552822 |
| | | | | | BidderID 552824 | | | | 0..1 552826 | ContactPersonPartyID 552828 |
| | | | | | AddressReference 552830 | | | | 0..1 552832 | PartyAddressReference 552834 |
| Address 552836 | | | | | Address 552838 | | | | 0..1 552840 | Address 552842 |
| | | | | | | OrganisationFormOfAddress 552844 | | | 0..1 552846 | FormOfAddress 552848 |

FIG. 55-87

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormattedName 552850 | | | 0..N 552852 | LANGUAGEINDEPENDENT_MEDIUM_Name 552854 |
| | | | | | | PersonName 552856 | | | 0..1 552858 | PersonName 552860 |
| | | | | | | FunctionalTitleName 552862 | | | 0..1 552864 | LANGUAGEINDEPENDENT_MEDIUM_Name 552866 |
| | | | | | | DepartmentName 552868 | | | 0..1 552870 | LANGUAGEINDEPENDENT_MEDIUM_Name 552872 |
| | | | | | | Office 552876 | | | 0..1 552878 | Office 552880 |

FIG. 55-88

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Physical Address 552884 | | | 0..1 552886 | PhysicalAddress 552888 |
| | | | | | | | Country Code 552890 | | 0..1 552892 | CountryCode 552894 |
| | | | | | | | Country Name 552896 | | 0..1 552898 | MEDIUM_Name 552900 |
| | | | | | | | RegionC ode 552902 | | 0..1 552904 | RegionCode 552906 |
| | | | | | | | RegionN ame 552908 | | 0..1 552910 | LANGUAGEINDE PENDENT_MEDI UM_Name 552912 |
| | | | | | | | StreetPo stalCode 552914 | | 0..1 552916 | PostalCode 552918 |

FIG. 55-89

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 552920 | | 0..1 552922 | PostalCode 552924 |
| | | | | | | | CompanyPostalCode 552926 | | 0..1 552928 | PostalCode 552930 |
| | | | | | | | CityName 552932 | | 0..1 552934 | LANGUAGEINDEPENDENT_MEDIUM_Name 552936 |
| | | | | | | | AdditionalCityName 552938 | | 0..1 552940 | LANGUAGEINDEPENDENT_MEDIUM_Name 552942 |
| | | | | | | | DistrictName 552944 | | 0..1 552946 | LANGUAGEINDEPENDENT_MEDIUM_Name 552948 |

FIG. 55-90

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxID 552950 | | 0..1 552952 | POBoxID 552954 |
| | | | | | | | POBoxIndicator 552956 | | 0..1 552958 | Indicator 552960 |
| | | | | | | | POBoxCountryCode 552962 | | 0..1 552964 | CountryCode 552966 |
| | | | | | | | POBoxCountryName 552968 | | 0..1 552970 | MEDIUM_Name 552972 |
| | | | | | | | POBoxRegionCode 552974 | | 0..1 552976 | RegionCode 552978 |

FIG. 55-91

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 552980 | | 0..1 552982 | LANGUAGEINDEPENDENT_MEDIUM_Name 552984 |
| | | | | | | | POBoxCityName 552986 | | 0..1 552988 | LANGUAGEINDEPENDENT_MEDIUM_Name 552990 |
| | | | | | | | StreetName 552992 | | 0..1 552994 | StreetName 552996 |
| | | | | | | | StreetPrefixName 552998 | | 0..N 553000 | LANGUAGEINDEPENDENT_MEDIUM_Name 553002 |
| | | | | | | | StreetSuffixName 553004 | | 0..N 553006 | LANGUAGEINDEPENDENT_MEDIUM_Name 553008 |

FIG. 55-92

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 553010 | | 0..1 553012 | HouseID 553014 |
| | | | | | | | AdditionalHouseID 553016 | | 0..1 553018 | HouseID 553020 |
| | | | | | | | BuildingID 553022 | | 0..1 553024 | BuildingID 553026 |
| | | | | | | | FloorID 553028 | | 0..1 553030 | FloorID 553032 |
| | | | | | | | RoomID 553034 | | 0..1 553036 | RoomID 553038 |
| | | | | | | | CareOfName 553040 | | 0..1 553042 | LANGUAGEINDEPENDENT_MEDIUM_Name 553044 |

FIG. 55-93

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 553046 | | 0..N 553048 | Description 553050 |
| | | | | | | TaxJurisdictionCode 553052 | | | 0..1 553054 | TaxJurisdictionCode 553056 |
| | | | | | | TimeZoneDifferenceValue 553058 | | | 0..1 553060 | TimeZoneDifferenceValue 553062 |
| | | | | | | GeoCoordinates 553064 | | | 0..1 553066 | GeoCoordinates 553068 |
| | | | | | | Communication 553072 | | | 0..1 553074 | Communication 553076 |

FIG. 55-94

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 553078 | | 0..1 553080 | LanguageCode 553082 |
| | | | | | | | CorrespondenceLanguageName 553084 | | 0..1 553086 | MEDIUM_Name 553088 |
| | | | | | | | Telephone 553090 | | 0..N 553092 | Telephone 553094 |
| | | | | | | | | Number 553096 | 1 553098 | PhoneNumber 553100 |
| | | | | | | | | SMSEnabledIndicator 553102 | 0..1 553104 | Indicator 553106 |

FIG. 55-95

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 553108 | 1 553110 | Indicator 553112 |
| | | | | | | | | NumberDescription 553114 | 0..N 553116 | Description 553118 |
| | | | | | | | | NumberUsageDenialIndicator 553120 | 1 553122 | Indicator 553124 |
| | | | | | | | MobilePhone 553126 | | 0..N 553128 | Telephone 553130 |
| | | | | | | | | Number 553132 | 1 553134 | PhoneNumber 553136 |

FIG. 55-96

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 553138 | 0..1 553140 | Indicator 553142 |
| | | | | | | | | NumberDefaultIndicator 553144 | 1 553146 | Indicator 553148 |
| | | | | | | | | NumberDescription 553150 | 0..N 553152 | Description 553154 |
| | | | | | | | | NumberUsageDenialIndicator 553156 | 1 553158 | Indicator 553160 |
| | | | | | | | Facsimile 553162 | | 0..N 553164 | Facsimile 553166 |

FIG. 55-97

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 553168 | 1 553170 | PhoneNumber 553172 |
| | | | | | | | | Number DefaultIndicator 553174 | 1 553176 | Indicator 553178 |
| | | | | | | | | Number Description 553180 | 0..N 553182 | Description 553184 |
| | | | | | | | | Number UsageDenialIndicator 553186 | 1 553188 | Indicator 553190 |
| | | | | | | | Email 553192 | | 0..N 553194 | Email 553196 |
| | | | | | | | | URI 553198 | 1 553200 | EmailURI 553202 |

FIG. 55-98

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 553204 | 1 553206 | Indicator 553208 |
| | | | | | | | | URIDescription 553210 | 0..N 553212 | Description 553214 |
| | | | | | | | | URIUsageDenialIndicator 553216 | 1 553218 | Indicator 553220 |
| | | | | | | | Web 553222 | | 0..N 553224 | Web 553226 |
| | | | | | | | | URI 553228 | 1 553230 | WebURI 553232 |
| | | | | | | | | URIDefaultIndicator 553234 | 1 553236 | Indicator 553238 |

FIG. 55-99

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 553240 | 0..N 553242 | Description 553244 |
| | | | BuyerParty 553248 | | | | | | 0..1 553250 | BusinessTransactionDocumentParty 553252 |
| | | | | InternalID 553254 | | | | | 0..1 553256 | PartyInternalID 553258 |
| | | | | StandardID 553260 | | | | | 0..N 553262 | PartyStandardID 553264 |
| | | | | BuyerID 553266 | | | | | 0..1 553268 | PartyPartyID 553270 |
| | | | | SellerID 553272 | | | | | 0..1 553274 | PartyPartyID 553276 |

FIG. 55-100

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ProductRecipientID 553278 | | | | | 0..1 553280 | PartyPartyID 553282 |
| | | | | VendorID 553284 | | | | | 0..1 553286 | PartyPartyID 553288 |
| | | | | BillToID 553290 | | | | | 0..1 553292 | PartyPartyID 553294 |
| | | | | BillFromID 553296 | | | | | 0..1 553298 | PartyPartyID 553300 |
| | | | | BidderID 553302 | | | | | 0..1 553304 | PartyPartyID 553306 |
| | | | | PaymentTransactionInitiatorID 553308 | | | | | 0..1 553310 | PartyPartyID 553312 |

FIG. 55-101

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PaymentTransactionDestinatedID 553314 | | | | | 0..1 553316 | PartyPartyID 553318 |
| | | | | TaxID 553320 | | | | | 0..1 553322 | PartyTaxID 553324 |
| | | | | ClearingHouseID 553326 | | | | | 0..1 553328 | PartyPartyID 553330 |
| | | | | TypeCode 553332 | | | | | 0..1 553334 | BusinessObjectTypeCode 553336 |
| | | | | DeterminationMethodCode 553338 | | | | | 0..1 553340 | PartyDeterminationMethodCode 553342 |

FIG. 55-102

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | AddressReference 553344 | | | | | 0..1 553346 | PartyAddressReference 553348 |
| | | | Address 553350 | | | | | Address 553352 | | | | | 0..1 553354 | Address 553356 |
| | | | | | | | | | OrganisationFormOfAddress 553358 | | | | 0..1 553360 | FormOfAddress 553362 |
| | | | | | | | | | OrganisationFormattedName 553364 | | | | 0..N 553366 | LANGUAGEINDEPENDENT_MEDIUM_Name 553368 |
| | | | | | | | | | PersonName 553370 | | | | 0..1 553372 | PersonName 553374 |

FIG. 55-103

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FunctionalTitleName 553376 | | | | 0..1 553378 | LANGUAGEINDEPENDENT_MEDIUM_Name 553380 |
| | | | | | DepartmentName 553382 | | | | 0..1 553384 | LANGUAGEINDEPENDENT_MEDIUM_Name 553386 |
| | | | | | Office 553390 | | | | 0..1 553392 | Office 553394 |
| | | | | | Physical Address 553398 | | | | 0..1 553400 | PhysicalAddress 553402 |
| | | | | | | CountryCode 553404 | | | 0..1 553406 | CountryCode 553408 |
| | | | | | | CountryName 553410 | | | 0..1 553412 | MEDIUM_Name 553414 |

FIG. 55-104

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | RegionCode 553416 | | | 0..1 553418 | RegionCode 553420 |
| | | | | | | RegionName 553422 | | | 0..1 553424 | LANGUAGEINDEPENDENT_MEDIUM_Name 553426 |
| | | | | | | StreetPostalCode 553428 | | | 0..1 553430 | PostalCode 553432 |
| | | | | | | POBoxPostalCode 553434 | | | 0..1 553436 | PostalCode 553438 |
| | | | | | | CompanyPostalCode 553440 | | | 0..1 553442 | PostalCode 553444 |

FIG. 55-105

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CityName 553446 | | | 0..1 553448 | LANGUAGEINDEPENDENT_MEDIUM_Name 553450 |
| | | | | | | AdditionalCityName 553452 | | | 0..1 553454 | LANGUAGEINDEPENDENT_MEDIUM_Name 553456 |
| | | | | | | DistrictName 553458 | | | 0..1 553460 | LANGUAGEINDEPENDENT_MEDIUM_Name 553462 |
| | | | | | | POBoxID 553464 | | | 0..1 553466 | POBoxID 553468 |
| | | | | | | POBoxIndicator 553470 | | | 0..1 553472 | Indicator 553474 |

FIG. 55-106

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | POBoxCountryCode 553476 | | | 0..1 553478 | CountryCode 553480 |
| | | | | | | | | | | POBoxCountryName 553482 | | | 0..1 553484 | MEDIUM_Name 553486 |
| | | | | | | | | | | POBoxRegionCode 553488 | | | 0..1 553490 | RegionCode 553492 |
| | | | | | | | | | | POBoxRegionName 553494 | | | 0..1 553496 | LANGUAGEINDEPENDENT_MEDIUM_Name 553498 |
| | | | | | | | | | | POBoxCityName 553500 | | | 0..1 553502 | LANGUAGEINDEPENDENT_MEDIUM_Name 553504 |

FIG. 55-107

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetName 553506 | | | 0..1 553508 | StreetName 553510 |
| | | | | | | StreetPrefixName 553512 | | | 0..N 553514 | LANGUAGEINDEPENDENT_MEDIUM_Name 553516 |
| | | | | | | StreetSuffixName 553518 | | | 0..N 553520 | LANGUAGEINDEPENDENT_MEDIUM_Name 553522 |
| | | | | | | HouseID 553524 | | | 0..1 553526 | HouseID 553528 |
| | | | | | | AdditionalHouseID 553530 | | | 0..1 553532 | HouseID 553534 |
| | | | | | | BuildingID 553536 | | | 0..1 553538 | BuildingID 553540 |

FIG. 55-108

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | FloorID 553542 | | | 0..1 553544 | FloorID 553546 |
| | | | | | | | | | | | RoomID 553548 | | | 0..1 553550 | RoomID 553552 |
| | | | | | | | | | | | CareOfName 553554 | | | 0..1 553556 | LANGUAGEINDEPENDENT_MEDIUM_Name 553558 |
| | | | | | | | | | | | Description 553560 | | | 0..N 553562 | Description 553564 |
| | | | | | | | | | | TaxJurisdictionCode 553566 | | | | 0..1 553568 | TaxJurisdictionCode 553570 |
| | | | | | | | | | | TimeZoneDifferenceValue 553572 | | | | 0..1 553574 | TimeZoneDifferenceValue 553576 |

FIG. 55-109

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | GeoCoordinates 553578 | | | | 0..1 553580 | GeoCoordinates 553582 |
| | | | | | Communication 553586 | | | | 0..1 553588 | Communication 553590 |
| | | | | | | CorrespondenceLanguageCode 553592 | | | 0..1 553594 | LanguageCode 553596 |
| | | | | | | CorrespondenceLanguageName 553598 | | | 0..1 553600 | MEDIUM_Name 553602 |
| | | | | | | Telephone 553604 | | | 0..N 553606 | Telephone 553608 |

FIG. 55-110

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 553610 | | 1 553612 | PhoneNumber 553614 |
| | | | | | | | SMSEnabledIndicator 553616 | | 0..1 553618 | Indicator 553620 |
| | | | | | | | NumberDefaultIndicator 553622 | | 1 553624 | Indicator 553626 |
| | | | | | | | NumberDescription 553628 | | 0..N 553630 | Description 553632 |
| | | | | | | | NumberUsageDenialIndicator 553634 | | 1 553636 | Indicator 553638 |

FIG. 55-111

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | MobilePhone 553640 | | | 0..N 553642 | Telephone 553644 |
| | | | | | | | Number 553646 | | 1 553648 | PhoneNumber 553650 |
| | | | | | | | SMSEnabledIndicator 553652 | | 0..1 553654 | Indicator 553656 |
| | | | | | | | NumberDefaultIndicator 553658 | | 1 553660 | Indicator 553662 |
| | | | | | | | NumberDescription 553664 | | 0..N 553666 | Description 553668 |

FIG. 55-112

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 553670 | | 1 553672 | Indicator 553674 |
| | | | | | | Facsimile 553676 | | | 0..N 553678 | Facsimile 553680 |
| | | | | | | | Number 553682 | | 1 553684 | PhoneNumber 553686 |
| | | | | | | | NumberDefaultIndicator 553688 | | 1 553690 | Indicator 553692 |
| | | | | | | | NumberDescription 553694 | | 0..N 553696 | Description 553698 |

FIG. 55-113

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 553700 | | 1 553702 | Indicator 553704 |
| | | | | | | Email 553706 | | | 0..N 553708 | Email 553710 |
| | | | | | | | URI 553712 | | 1 553714 | EmailURI 553716 |
| | | | | | | | URIDefaultIndicator 553718 | | 1 553720 | Indicator 553722 |
| | | | | | | | URIDescription 553724 | | 0..N 553726 | Description 553728 |
| | | | | | | | URIUsageDenialIndicator 553730 | | 1 553732 | Indicator 553734 |

FIG. 55-114

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | Web 553736 | | | 0..N 553738 | Web 553740 |
| | | | | | | | | | | | URI 553742 | | 1 553744 | WebURI 553746 |
| | | | | | | | | | | | URIDefaultIndicator 553748 | | 1 553750 | Indicator 553752 |
| | | | | | | | | | | | URIDescription 553754 | | 0..N 553756 | Description 553758 |
| | | | ContactPerson 553760 | | | | | ContactPerson 553762 | | | | | 0..N 553764 | ContactPerson 553766 |
| | | | | | | | | | InternalID 553768 | | | | 0..1 553770 | ContactPersonInternalID 553772 |
| | | | | | | | | | BuyerID 553774 | | | | 0..1 553776 | ContactPersonPartyID 553778 |

FIG. 55-115

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | SellerID 553780 | | | | 0..1 553782 | ContactPersonPartyID 553784 |
| | | | | | ProductRecipientID 553786 | | | | 0..1 553788 | ContactPersonPartyID 553790 |
| | | | | | VendorID 553792 | | | | 0..1 553794 | ContactPersonPartyID 553796 |
| | | | | | BillToID 553798 | | | | 0..1 553800 | ContactPersonPartyID 553802 |
| | | | | | BillFromID 553804 | | | | 0..1 553806 | ContactPersonPartyID 553808 |
| | | | | | BidderID 553810 | | | | 0..1 553812 | ContactPersonPartyID 553814 |

FIG. 55-116

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | Address Reference 553816 | | | | 0..1 553818 | PartyAddressReference 553820 |
| | | | | Address 553822 | | | | | | Address 553824 | | | | 0..1 553826 | Address 553828 |
| | | | | | | | | | | | OrganisationFormOfAddress 553830 | | | 0..1 553832 | FormOfAddress 553834 |
| | | | | | | | | | | | OrganisationFormattedName 553836 | | | 0..N 553838 | LANGUAGEINDEPENDENT_MEDIUM_Name 553840 |
| | | | | | | | | | | | PersonName 553842 | | | 0..1 553844 | PersonName 553846 |

FIG. 55-117

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | FunctionalTitleName 553848 | | | 0..1 553850 | LANGUAGEINDEPENDENT_MEDIUM_Name 553852 |
| | | | | | | DepartmentName 553854 | | | 0..1 553856 | LANGUAGEINDEPENDENT_MEDIUM_Name 553858 |
| | | | | | | Office 553862 | | | 0..1 553864 | Office 553866 |
| | | | | | | Physical Address 553870 | | | 0..1 553872 | PhysicalAddress 553874 |
| | | | | | | | Country Code 553876 | | 0..1 553878 | CountryCode 553880 |
| | | | | | | | Country Name 553882 | | 0..1 553884 | MEDIUM_Name 553886 |

FIG. 55-118

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | RegionCode 553888 | | 0..1 553890 | RegionCode 553892 |
| | | | | | | | RegionName 553894 | | 0..1 553896 | LANGUAGEINDEPENDENT_MEDIUM_Name 553898 |
| | | | | | | | StreetPostalCode 553900 | | 0..1 553902 | PostalCode 553904 |
| | | | | | | | POBoxPostalCode 553906 | | 0..1 553908 | PostalCode 553910 |
| | | | | | | | CompanyPostalCode 553912 | | 0..1 553914 | PostalCode 553916 |

FIG. 55-119

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CityName 553918 | | 0..1 553920 | LANGUAGEINDEPENDENT_MEDIUM_Name 553922 |
| | | | | | | | AdditionalCityName 553924 | | 0..1 553926 | LANGUAGEINDEPENDENT_MEDIUM_Name 553928 |
| | | | | | | | DistrictName 553930 | | 0..1 553932 | LANGUAGEINDEPENDENT_MEDIUM_Name 553934 |
| | | | | | | | POBoxID 553936 | | 0..1 553938 | POBoxID 553940 |
| | | | | | | | POBoxIndicator 553942 | | 0..1 553944 | Indicator 553946 |

FIG. 55-120

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxCountryCode 553948 | | 0..1 553950 | CountryCode 553952 |
| | | | | | | | POBoxCountryName 553954 | | 0..1 553956 | MEDIUM_Name 553958 |
| | | | | | | | POBoxRegionCode 553960 | | 0..1 553962 | RegionCode 553964 |
| | | | | | | | POBoxRegionName 553966 | | 0..1 553968 | LANGUAGEINDEPENDENT_MEDIUM_Name 553970 |
| | | | | | | | POBoxCityName 553972 | | 0..1 553974 | LANGUAGEINDEPENDENT_MEDIUM_Name 553976 |

FIG. 55-121

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetName 553978 | | 0..1 553980 | StreetName 553982 |
| | | | | | | | StreetPrefixName 553984 | | 0..N 553986 | LANGUAGEINDEPENDENT_MEDIUM_Name 553988 |
| | | | | | | | StreetSuffixName 553990 | | 0..N 553992 | LANGUAGEINDEPENDENT_MEDIUM_Name 553994 |
| | | | | | | | HouseID 553996 | | 0..1 553998 | HouseID 554000 |
| | | | | | | | AdditionalHouseID 554002 | | 0..1 554004 | HouseID 554006 |
| | | | | | | | BuildingID 554008 | | 0..1 554010 | BuildingID 554012 |

FIG. 55-122

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | FloorID 554014 | | 0..1 554016 | FloorID 554018 |
| | | | | | | | RoomID 554020 | | 0..1 554022 | RoomID 554024 |
| | | | | | | | CareOfName 554026 | | 0..1 554028 | LANGUAGEINDEPENDENT_MEDIUM_Name 554030 |
| | | | | | | | Description 554032 | | 0..N 554034 | Description 554036 |
| | | | | | | TaxJurisdictionCode 554038 | | | 0..1 554040 | TaxJurisdictionCode 554042 |
| | | | | | | TimeZoneDifferenceValue 554044 | | | 0..1 554046 | TimeZoneDifferenceValue 554048 |

FIG. 55-123

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | GeoCoordinates 554050 | | | 0..1 554052 | GeoCoordinates 554054 |
| | | | | | | Communication 554058 | | | 0..1 554060 | Communication 554062 |
| | | | | | | | CorrespondenceLanguageCode 554064 | | 0..1 554066 | LanguageCode 554068 |
| | | | | | | | CorrespondenceLanguageName 554070 | | 0..1 554072 | MEDIUM_Name 554074 |
| | | | | | | | Telephone 554076 | | 0..N 554078 | Telephone 554080 |

FIG. 55-124

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 554082 | 1 554084 | PhoneNumber 554086 |
| | | | | | | | | SMSEnabledIndicator 554088 | 0..1 554090 | Indicator 554092 |
| | | | | | | | | NumberDefaultIndicator 554094 | 1 554096 | Indicator 554098 |
| | | | | | | | | NumberDescription 554100 | 0..N 554102 | Description 554104 |
| | | | | | | | | NumberUsageDenialIndicator 554106 | 1 554108 | Indicator 554110 |

FIG. 55-125

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | MobilePhone 554112 | | 0..N 554114 | Telephone 554116 |
| | | | | | | | | Number 554118 | 1 554120 | PhoneNumber 554122 |
| | | | | | | | | SMSEnabledIndicator 554124 | 0..1 554126 | Indicator 554128 |
| | | | | | | | | NumberDefaultIndicator 554130 | 1 554132 | Indicator 554134 |
| | | | | | | | | NumberDescription 554136 | 0..N 554138 | Description 554140 |

FIG. 55-126

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberUsageDenialIndicator 554142 | 1 554144 | Indicator 554146 |
| | | | | | | | Facsimile 554148 | | 0..N 554150 | Facsimile 554152 |
| | | | | | | | | Number 554154 | 1 554156 | PhoneNumber 554158 |
| | | | | | | | | NumberDefaultIndicator 554160 | 1 554162 | Indicator 554164 |
| | | | | | | | | NumberDescription 554166 | 0..N 554168 | Description 554170 |

FIG. 55-127

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberUsageDenialIndicator 554172 | 1 554174 | Indicator 554176 |
| | | | | | | | Email 554178 | | 0..N 554180 | Email 554182 |
| | | | | | | | | URI 554184 | 1 554186 | EmailURI 554188 |
| | | | | | | | | URIDefaultIndicator 554190 | 1 554192 | Indicator 554194 |
| | | | | | | | | URIDescription 554196 | 0..N 554198 | Description 554200 |
| | | | | | | | | URIUsageDenialIndicator 554202 | 1 554204 | Indicator 554206 |

FIG. 55-128

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Web 554208 | | 0..N 554210 | Web 554212 |
| | | | | | | | | URI 554214 | 1 554216 | WebURI 554218 |
| | | | | | | | | URIDefaultIndicator 554220 | 1 554222 | Indicator 554224 |
| | | | | | | | | URIDescription 554226 | 0..N 554228 | Description 554230 |
| Location 554232 | | | ShipFromLocation 554234 | | | | | | 0..1 554236 | BusinessTransactionDocumentLocation 554238 |
| | | | | InternalID 554240 | | | | | 0..1 554242 | LocationInternalID 554244 |

FIG. 55-129

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | StandardID 554246 | | | | | 0..N 554248 | LocationStandardID 554250 |
| | | | | BuyerID 554252 | | | | | 0..1 554254 | LocationPartyID 554256 |
| | | | | SellerID 554258 | | | | | 0..1 554260 | LocationPartyID 554262 |
| | | | | ProductRecipientID 554264 | | | | | 0..1 554266 | LocationPartyID 554268 |
| | | | | VendorID 554270 | | | | | 0..1 554272 | LocationPartyID 554274 |
| | | | | BillToID 554276 | | | | | 0..1 554278 | LocationPartyID 554280 |
| | | | | BillFromID 554282 | | | | | 0..1 554284 | LocationPartyID 554286 |

FIG. 55-130

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | BidderID 554288 | | | | | 0..1 554290 | LocationPartyID 554292 |
| | | | | DeterminationMethodCode 554294 | | | | | 0..1 554296 | LocationDeterminationMethodCode 554298 |
| | | | | AddressReference 554300 | | | | | 0..1 554302 | LocationAddressReference 554304 |
| Address 554306 | | | | Address 554308 | | | | | 0..1 554310 | Address 554312 |
| | | | | | OrganisationFormOfAddress 554314 | | | | 0..1 554316 | FormOfAddress 554318 |

FIG. 55-131

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 554320 | | | | 0..N 554322 | LANGUAGEINDEPENDENT_MEDIUM_Name 554324 |
| | | | | | PersonName 554326 | | | | 0..1 554328 | PersonName 554330 |
| | | | | | FunctionalTitleName 554332 | | | | 0..1 554334 | LANGUAGEINDEPENDENT_MEDIUM_Name 554336 |
| | | | | | DepartmentName 554338 | | | | 0..1 554340 | LANGUAGEINDEPENDENT_MEDIUM_Name 554342 |
| | | | | | Office 554346 | | | | 0..1 554348 | Office 554350 |

FIG. 55-132

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Physical Address 554354 | | | | 0..1 554356 | PhysicalAddress 554358 |
| | | | | | | CountryCode 554360 | | | 0..1 554362 | CountryCode 554364 |
| | | | | | | CountryName 554366 | | | 0..1 554368 | MEDIUM_Name 554370 |
| | | | | | | RegionCode 554372 | | | 0..1 554374 | RegionCode 554376 |
| | | | | | | RegionName 554378 | | | 0..1 554380 | LANGUAGEINDEPENDENT_MEDIUM_Name 554382 |
| | | | | | | StreetPostalCode 554384 | | | 0..1 554386 | PostalCode 554388 |

FIG. 55-133

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxPostalCode 554390 | | | 0..1 554392 | PostalCode 554394 |
| | | | | | | CompanyPostalCode 554396 | | | 0..1 554398 | PostalCode 554400 |
| | | | | | | CityName 554402 | | | 0..1 554404 | LANGUAGEINDEPENDENT_MEDIUM_Name 554406 |
| | | | | | | AdditionalCityName 554408 | | | 0..1 554410 | LANGUAGEINDEPENDENT_MEDIUM_Name 554412 |
| | | | | | | DistrictName 554414 | | | 0..1 554416 | LANGUAGEINDEPENDENT_MEDIUM_Name 554418 |

FIG. 55-134

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 554420 | | | 0..1 554422 | POBoxID 554424 |
| | | | | | | POBoxIndicator 554426 | | | 0..1 554428 | Indicator 554430 |
| | | | | | | POBoxCountryCode 554432 | | | 0..1 554434 | CountryCode 554436 |
| | | | | | | POBoxCountryName 554438 | | | 0..1 554440 | MEDIUM_Name 554442 |
| | | | | | | POBoxRegionCode 554444 | | | 0..1 554446 | RegionCode 554448 |

FIG. 55-135

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionName 554450 | | | 0..1 554452 | LANGUAGEINDEPENDENT_MEDIUM_Name 554454 |
| | | | | | | POBoxCityName 554456 | | | 0..1 554458 | LANGUAGEINDEPENDENT_MEDIUM_Name 554460 |
| | | | | | | StreetName 554462 | | | 0..1 554464 | StreetName 554466 |
| | | | | | | StreetPrefixName 554468 | | | 0..N 554470 | LANGUAGEINDEPENDENT_MEDIUM_Name 554472 |
| | | | | | | StreetSuffixName 554474 | | | 0..N 554476 | LANGUAGEINDEPENDENT_MEDIUM_Name 554478 |

FIG. 55-136

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 554480 | | | 0..1 554482 | HouseID 554484 |
| | | | | | | AdditionalHouseID 554486 | | | 0..1 554488 | HouseID 554490 |
| | | | | | | BuildingID 554492 | | | 0..1 554494 | BuildingID 554496 |
| | | | | | | FloorID 554498 | | | 0..1 554500 | FloorID 554502 |
| | | | | | | RoomID 554504 | | | 0..1 554506 | RoomID 554508 |
| | | | | | | CareOfName 554510 | | | 0..1 554512 | LANGUAGEINDEPENDENT_MEDIUM_Name 554514 |

FIG. 55-137

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description 554516 | | | 0..N 554518 | Description 554520 |
| | | | | | TaxJurisdictionCode 554522 | | | | 0..1 554524 | TaxJurisdictionCode 554526 |
| | | | | | TimeZoneDifferenceValue 554528 | | | | 0..1 554530 | TimeZoneDifferenceValue 554532 |
| | | | | | GeoCoordinates 554534 | | | | 0..1 554536 | GeoCoordinates 554538 |
| | | | | | Communication 554542 | | | | 0..1 554544 | Communication 554546 |

FIG. 55-138

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageCode 554548 | | | 0..1 554550 | LanguageCode 554552 |
| | | | | | | CorrespondenceLanguageName 554554 | | | 0..1 554556 | MEDIUM_Name 554558 |
| | | | | | | Telephone 554560 | | | 0..N 554562 | Telephone 554564 |
| | | | | | | | Number 554566 | | 1 554568 | PhoneNumber 554570 |
| | | | | | | | SMSEnabledIndicator 554572 | | 0..1 554574 | Indicator 554576 |

FIG. 55-139

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 554578 | | 1 554580 | Indicator 554582 |
| | | | | | | | NumberDescription 554584 | | 0..N 554586 | Description 554588 |
| | | | | | | | NumberUsageDenialIndicator 554590 | | 1 554592 | Indicator 554594 |
| | | | | | | MobilePhone 554596 | | | 0..N 554598 | Telephone 554600 |
| | | | | | | | Number 554602 | | 1 554604 | PhoneNumber 554606 |

FIG. 55-140

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 554608 | | 0..1 554610 | Indicator 554612 |
| | | | | | | | NumberDefaultIndicator 554614 | | 1 554616 | Indicator 554618 |
| | | | | | | | NumberDescription 554620 | | 0..N 554622 | Description 554624 |
| | | | | | | | NumberUsageDenialIndicator 554626 | | 1 554628 | Indicator 554630 |
| | | | | | | Facsimile 554632 | | | 0..N 554634 | Facsimile 554636 |

FIG. 55-141

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 554638 | | 1 554640 | PhoneNumber 554642 |
| | | | | | | | NumberDefaultIndicator 554644 | | 1 554646 | Indicator 554648 |
| | | | | | | | NumberDescription 554650 | | 0..N 554652 | Description 554654 |
| | | | | | | | NumberUsageDenialIndicator 554656 | | 1 554658 | Indicator 554660 |
| | | | | | | Email 554662 | | | 0..N 554664 | Email 554666 |
| | | | | | | | URI 554668 | | 1 554670 | EmailURI 554672 |

FIG. 55-142

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 554674 | | 1 554676 | Indicator 554678 |
| | | | | | | | URIDescription 554680 | | 0..N 554682 | Description 554684 |
| | | | | | | | URIUsageDenialIndicator 554686 | | 1 554688 | Indicator 554690 |
| | | | | | | Web 554692 | | | 0..N 554694 | Web 554696 |
| | | | | | | | URI 554698 | | 1 554700 | WebURI 554702 |
| | | | | | | | URIDefaultIndicator 554704 | | 1 554706 | Indicator 554708 |

FIG. 55-143

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDescription 554710 | | 0..N 554712 | Description 554714 |
| | | | | Note 554716 | | | | | 0..1 554718 | Note 554720 |
| | | | ShipToLocation 554724 | | | | | | 0..1 554726 | BusinessTransactionDocumentLocation 554728 |
| | | | | InternalID 554730 | | | | | 0..1 554732 | LocationInternalID 554734 |
| | | | | StandardID 554736 | | | | | 0..N 554738 | LocationStandardID 554740 |
| | | | | BuyerID 554742 | | | | | 0..1 554744 | LocationPartyID 554746 |
| | | | | SellerID 554748 | | | | | 0..1 554750 | LocationPartyID 554752 |

FIG. 55-144

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ProductRecipientID 554754 | | | | | 0..1 554756 | LocationPartyID 554758 |
| | | | | VendorID 554760 | | | | | 0..1 554762 | LocationPartyID 554764 |
| | | | | BillToID 554766 | | | | | 0..1 554768 | LocationPartyID 554770 |
| | | | | BillFromID 554772 | | | | | 0..1 554774 | LocationPartyID 554776 |
| | | | | BidderID 554778 | | | | | 0..1 554780 | LocationPartyID 554782 |
| | | | | DeterminationMethodCode 554784 | | | | | 0..1 554786 | LocationDeterminationMethodCode 554788 |

FIG. 55-145

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | AddressReference 554790 | | | | | 0..1 554792 | LocationAddressReference 554794 |
| | | | Address 554796 | | | | | Address 554798 | | | | | 0..1 554800 | Address 554802 |
| | | | | | | | | | OrganisationFormOfAddress 554804 | | | | 0..1 554806 | FormOfAddress 554808 |
| | | | | | | | | | OrganisationFormattedName 554810 | | | | 0..N 554812 | LANGUAGEINDEPENDENT_MEDIUM_Name 554814 |
| | | | | | | | | | PersonName 554816 | | | | 0..1 554818 | PersonName 554820 |

FIG. 55-146

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FunctionalTitleName 554822 | | | | 0..1 554824 | LANGUAGEINDEPENDENT_MEDIUM_Name 554826 |
| | | | | | DepartmentName 554828 | | | | 0..1 554830 | LANGUAGEINDEPENDENT_MEDIUM_Name 554832 |
| | | | | | Office 554836 | | | | 0..1 554838 | Office 554840 |
| | | | | | PhysicalAddress 554844 | | | | 0..1 554846 | PhysicalAddress 554848 |
| | | | | | | CountryCode 554850 | | | 0..1 554852 | CountryCode 554854 |
| | | | | | | CountryName 554856 | | | 0..1 554858 | MEDIUM_Name 554860 |

FIG. 55-147

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | RegionCode 554862 | | | 0..1 554864 | RegionCode 554866 |
| | | | | | | RegionName 554868 | | | 0..1 554870 | LANGUAGEINDEPENDENT_MEDIUM_Name 554872 |
| | | | | | | StreetPostalCode 554874 | | | 0..1 554876 | PostalCode 554878 |
| | | | | | | POBoxPostalCode 554880 | | | 0..1 554882 | PostalCode 554884 |
| | | | | | | CompanyPostalCode 554886 | | | 0..1 554888 | PostalCode 554890 |

FIG. 55-148

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CityName 554892 | | | 0..1 554894 | LANGUAGEINDEPENDENT_MEDIUM_Name 554896 |
| | | | | | | AdditionalCityName 554898 | | | 0..1 554900 | LANGUAGEINDEPENDENT_MEDIUM_Name 554902 |
| | | | | | | DistrictName 554904 | | | 0..1 554906 | LANGUAGEINDEPENDENT_MEDIUM_Name 554908 |
| | | | | | | POBoxID 554910 | | | 0..1 554912 | POBoxID 554914 |
| | | | | | | POBoxIndicator 554916 | | | 0..1 554918 | Indicator 554920 |

FIG. 55-149

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxCountryCode 554922 | | | 0..1 554924 | CountryCode 554926 |
| | | | | | | POBoxCountryName 554928 | | | 0..1 554930 | MEDIUM_Name 554932 |
| | | | | | | POBoxRegionCode 554934 | | | 0..1 554936 | RegionCode 554938 |
| | | | | | | POBoxRegionName 554940 | | | 0..1 554942 | LANGUAGEINDEPENDENT_MEDIUM_Name 554944 |
| | | | | | | POBoxCityName 554946 | | | 0..1 554948 | LANGUAGEINDEPENDENT_MEDIUM_Name 554950 |

FIG. 55-150

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetName 554952 | | | 0..1 554954 | StreetName 554956 |
| | | | | | | StreetPrefixName 554958 | | | 0..N 554960 | LANGUAGEINDEPENDENT_MEDIUM_Name 554962 |
| | | | | | | StreetSuffixName 554964 | | | 0..N 554966 | LANGUAGEINDEPENDENT_MEDIUM_Name 554968 |
| | | | | | | HouseID 554970 | | | 0..1 554972 | HouseID 554974 |
| | | | | | | AdditionalHouseID 554976 | | | 0..1 554978 | HouseID 554980 |
| | | | | | | BuildingID 554982 | | | 0..1 554984 | BuildingID 554986 |

FIG. 55-151

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | FloorID 554988 | | | 0..1 554990 | FloorID 554992 |
| | | | | | | RoomID 554994 | | | 0..1 554996 | RoomID 554998 |
| | | | | | | CareOfName 555000 | | | 0..1 555002 | LANGUAGEINDEPENDENT_MEDIUM_Name 555004 |
| | | | | | | Description 555006 | | | 0..N 555008 | Description 555010 |
| | | | | | TaxJurisdictionCode 555012 | | | | 0..1 555014 | TaxJurisdictionCode 555016 |
| | | | | | TimeZoneDifferenceValue 555018 | | | | 0..1 555020 | TimeZoneDifferenceValue 555022 |

FIG. 55-152

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | GeoCoordinates 555024 | | | | 0..1 555026 | GeoCoordinates 555028 |
| | | | | | Communication 555032 | | | | 0..1 555034 | Communication 555036 |
| | | | | | | CorrespondenceLanguageCode 555038 | | | 0..1 555040 | LanguageCode 555042 |
| | | | | | | CorrespondenceLanguageName 555044 | | | 0..1 555046 | MEDIUM_Name 555048 |
| | | | | | | Telephone 555050 | | | 0..N 555052 | Telephone 555054 |

FIG. 55-153

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 555056 | | 1 555058 | PhoneNumber 555060 |
| | | | | | | | SMSEnabledIndicator 555062 | | 0..1 555064 | Indicator 555066 |
| | | | | | | | NumberDefaultIndicator 555068 | | 1 555070 | Indicator 555072 |
| | | | | | | | NumberDescription 555074 | | 0..N 555076 | Description 555078 |
| | | | | | | | NumberUsageDenialIndicator 555080 | | 1 555082 | Indicator 555084 |

FIG. 55-154

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | MobilePhone 555086 | | | 0..N 555088 | Telephone 555090 |
| | | | | | | | Number 555092 | | 1 555094 | PhoneNumber 555096 |
| | | | | | | | SMSEnabledIndicator 555098 | | 0..1 555100 | Indicator 555102 |
| | | | | | | | NumberDefaultIndicator 555104 | | 1 555106 | Indicator 555108 |
| | | | | | | | NumberDescription 555110 | | 0..N 555112 | Description 555114 |

FIG. 55-155

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 555116 | | 1 555118 | Indicator 555120 |
| | | | | | | Facsimile 555122 | | | 0..N 555124 | Facsimile 555126 |
| | | | | | | | Number 555128 | | 1 555130 | PhoneNumber 555132 |
| | | | | | | | NumberDefaultIndicator 555134 | | 1 555136 | Indicator 555138 |
| | | | | | | | NumberDescription 555140 | | 0..N 555142 | Description 555144 |

FIG. 55-156

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 555146 | | 1 555148 | Indicator 555150 |
| | | | | | | Email 555152 | | | 0..N 555154 | Email 555156 |
| | | | | | | | URI 555158 | | 1 555160 | EmailURI 555162 |
| | | | | | | | URIDefaultIndicator 555164 | | 1 555166 | Indicator 555168 |
| | | | | | | | URIDescription 555170 | | 0..N 555172 | Description 555174 |
| | | | | | | | URIUsageDenialIndicator 555176 | | 1 555178 | Indicator 555180 |

FIG. 55-157

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Web 555182 | | | 0..N 555184 | Web 555186 |
| | | | | | | | URI 555188 | | 1 555190 | WebURI 555192 |
| | | | | | | | URIDefaultIndicator 555194 | | 1 555196 | Indicator 555198 |
| | | | | | | | URIDescription 555200 | | 0..N 555202 | Description 555204 |
| | | | | Note 555206 | | | | | 0..1 555208 | Note 555210 |

FIG. 55-158

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | BusinessTransactionDocumentReference 555212 | | | | DeliveryReference 555214 | | | | | | 1 555216 | BusinessTransactionDocumentReference 555218 |
| | | Package 555220 | | | | Package 555222 | | | | | | 0..N 555224 | ExportDeclarationRequestPackage 555226 |
| | | | | | | | OrdinalNumber 555228 | | | | | 1 555230 | OrdinalNumberValue 555232 |
| | | | | | | | TypeCode 555234 | | | | | 1 555236 | PackageTypeCode 555238 |

FIG. 55-159

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PackageExportID 555240 | | | | | 0..1 555242 | PackageExportID 555244 |
| | | | | ElementNumberValue 555246 | | | | | 1 555248 | NumberValue 555250 |
| | | | | ParentPackageOrdinalNumber 555252 | | | | | 0..1 555254 | OrdinalNumberValue 555256 |
| | | | | NetWeightQuantity 555258 | | | | | 0..1 555260 | Quantity 555262 |
| | | | | NetWeightQuantityTypeCode 555264 | | | | | 0..1 555266 | QuantityTypeCode 555268 |

FIG. 55-160

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | GrossWeightQuantity 555270 | | | | | 0..1 555272 | Quantity 555274 |
| | | | | | | | GrossWeightQuantityTypeCode 555276 | | | | | 0..1 555278 | QuantityTypeCode 555280 |
| | | Item 555282 | | | | Item 555284 | | | | | | 0..N 555286 | ExportDeclarationRequestItem 555288 |
| | | | | | | | Description 555290 | | | | | 0..1 555292 | SHORT_Description 555294 |
| | | | | | | | Quantity 555296 | | | | | 0..1 555298 | Quantity 555300 |
| | | | | | | | QuantityTypeCode 555302 | | | | | 0..1 555304 | QuantityTypeCode 555306 |

FIG. 55-161

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | NetWeightQuantity 555308 | | | | | 0..1 555310 | Quantity 555312 |
| | | | | NetWeightQuantityTypeCode 555314 | | | | | 0..1 555316 | QuantityTypeCode 555318 |
| | | | | GrossWeightQuantity 555320 | | | | | 0..1 555322 | Quantity 555324 |
| | | | | GrossWeightQuantityTypeCode 555326 | | | | | 0..1 555328 | QuantityTypeCode 555330 |
| | | | | InvoiceNetAmount 555332 | | | | | 0..1 555334 | Amount 555336 |

FIG. 55-162

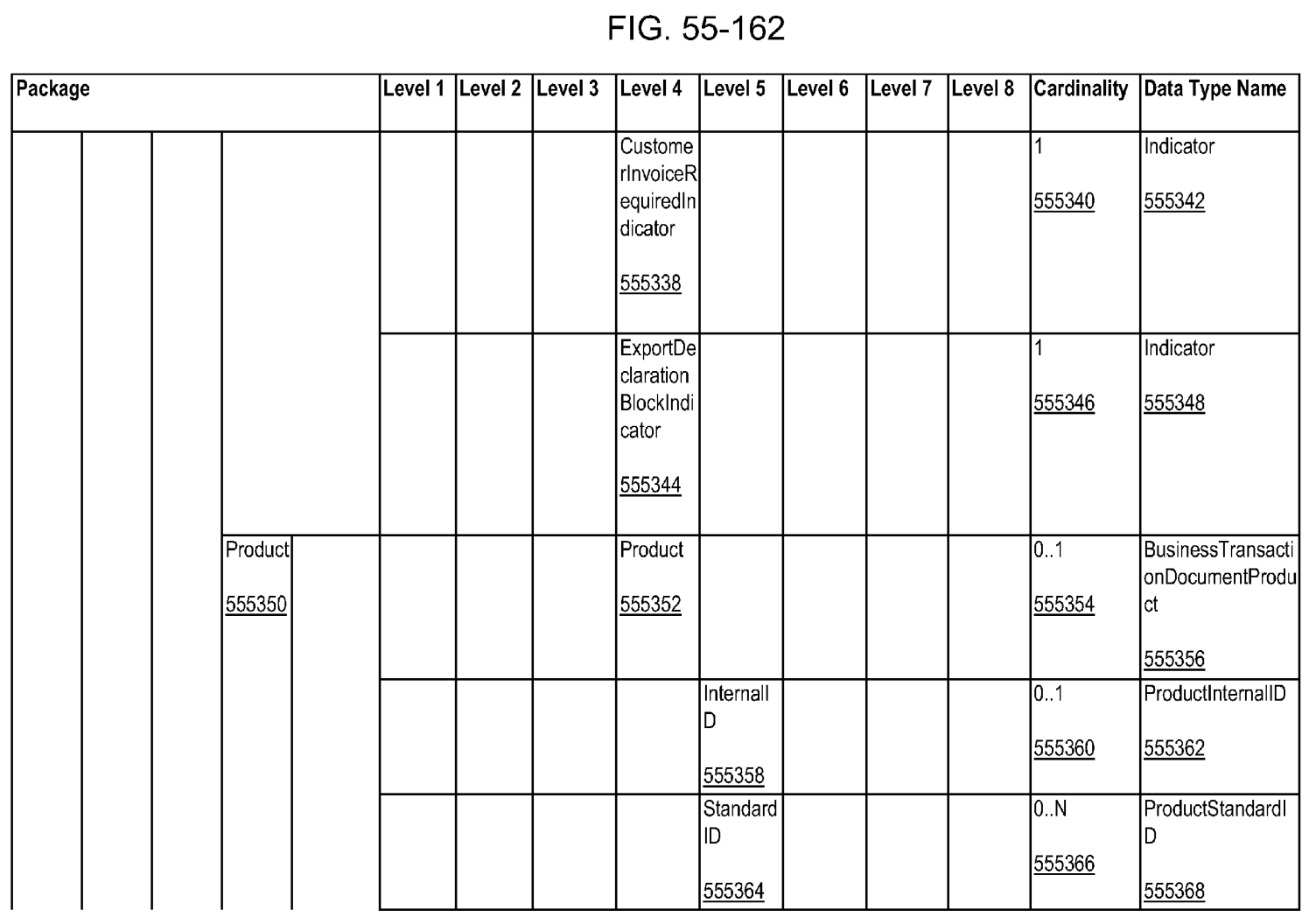

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | CustomerInvoiceRequiredIndicator 555338 | | | | | 1 555340 | Indicator 555342 |
| | | | | ExportDeclarationBlockIndicator 555344 | | | | | 1 555346 | Indicator 555348 |
| Product 555350 | | | | Product 555352 | | | | | 0..1 555354 | BusinessTransactionDocumentProduct 555356 |
| | | | | | InternalID 555358 | | | | 0..1 555360 | ProductInternalID 555362 |
| | | | | | StandardID 555364 | | | | 0..N 555366 | ProductStandardID 555368 |

FIG. 55-163

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BuyerID 555370 | | | | 0..1 555372 | ProductPartyID 555374 |
| | | | | | SellerID 555376 | | | | 0..1 555378 | ProductPartyID 555380 |
| | | | | | ProductRecipientID 555382 | | | | 0..1 555384 | ProductPartyID 555386 |
| | | | | | VendorID 555388 | | | | 0..1 555390 | ProductPartyID 555392 |
| | | | | | ManufacturerID 555394 | | | | 0..1 555396 | ProductPartyID 555398 |
| | | | | | BillToID 555400 | | | | 0..1 555402 | ProductPartyID 555404 |
| | | | | | BillFromID 555406 | | | | 0..1 555408 | ProductPartyID 555410 |

FIG. 55-164

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BidderID 555412 | | | | 0..1 555414 | ProductPartyID 555416 |
| | | | | | TypeCode 555418 | | | | 0..1 555420 | ProductTypeCode 555422 |
| | | | | | Note 555424 | | | | 0..1 555426 | Note 555428 |
| | | | | | ChangeID 555430 | | | | 0..1 555432 | ProductChangeID 555434 |
| | | | | | DiscontinuationIndicator 555436 | | | | 0..1 555438 | Indicator 555440 |
| | | | | | Package Quantity 555442 | | | | 0..1 555444 | Quantity 555446 |

FIG. 55-165

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | PackageAssignment 555448 | | | | | PackageAssignment 555450 | | | | | 0..N 555452 | ExportDeclarationRequestItemPackageAssignment 555454 |
| | | | | | | | | | PackageOrdinalNumber 555456 | | | | 1 555458 | OrdinalNumberValue 555460 |
| | | | | | | | | | ProductQuantity 555462 | | | | 0..1 555464 | Quantity 555466 |
| | | | | | | | | | ProductQuantityTypeCode 555468 | | | | 0..1 555470 | QuantityTypeCode 555472 |

FIG. 55-166

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | BusinessTransactionDocumentReference 555474 | | | | | DeliveryReference 555476 | | | | | 1 555478 | BusinessTransactionDocumentReference 555480 |
| | | | | | | | | CustomerInvoiceReference 555484 | | | | | 0..N 555486 | BusinessTransactionDocumentReference 555488 |
| | | | | | | | | SalesOrderReference 555492 | | | | | 0..1 555494 | BusinessTransactionDocumentReference 555496 |

FIG. 55-167

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | IntraCompanyStockTransferRequirementReference 555500 | | | | | 0..1 555502 | BusinessTransactionDocumentReference 555504 |
| | | | | | | | | ServiceOrderReference 555508 | | | | | 0..1 555510 | BusinessTransactionDocumentReference 555512 |
| | | | | | | | | PurchaseOrderReference 555516 | | | | | 0..1 555518 | BusinessTransactionDocumentReference 555520 |

MANAGING CONSISTENT INTERFACES FOR EXPORT DECLARATION AND EXPORT DECLARATION REQUEST BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a tangible computer readable medium includes program code for providing a message-based interface for exchanging information regarding a declaration to a customs authority for exporting goods according to legal requirements. The medium comprises program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for a request for processing an export declaration that includes a first message package derived from the common business object model and hierarchically organized in memory as an export declaration processing request message header entity and an export declaration package comprising an export declaration entity.

The medium further comprises program code for processing the first message according to the hierarchical organization of the first message package, where processing the first message includes unpacking the first message package based on the common business object model.

The medium further comprises program code for sending a second message to the heterogeneous application responsive to the first message, where the second message includes a second message package derived from the common business object model to provide consistent semantics with the first message package.

Implementations can include the following. The export declaration package further comprises at least one of the following: a customs authorization package, a time point package, a basic text package, a location package, a customs office package, a party package, a transport route country package, and an item package. The export declaration entity comprises at least one of the following: an export message sub type code, an export message identifier (ID), an export message reference ID, a customs authority country code, a major version customs authority ID, a minor version customs authority ID, a main test case ID, a sub test case ID, a customs message exchange server file ID, a customs process ID, a customs process party ID, a customs process customs authority ID, an export declaration type code, an export type code, an export exporting country code, an export destination country code, an export special circumstances code, an export transport cost payment form code, a container used indicator, an export party representation code, an item total number value, a total gross weight quantity, a total gross weight quantity type code, a consignment export ID, an inland export transport mode code, a cross border export transport mode code, a cross border export transport means type code, a cross border transport means ID, an export cross border transport means nationality code, an export business transaction type code, an invoice total net amount, an export incoterms classification code, an export incoterms classification description, an export incoterms transfer location name, and a customs authentication ID.

In another aspect, a distributed system operates in a landscape of computer systems providing message-based services defined in a service registry. The system comprises a graphical user interface comprising computer readable instructions, embedded on tangible media, for a request for processing an export declaration using a request.

The system further comprises a first memory storing a user interface controller for processing the request and involving a message including a message package derived from a common business object model, where the common business object model includes business objects having relationships that enable derivation of message-based service interfaces and message packages, the message package hierarchically organized as an export declaration processing request message header entity and an export declaration package comprising an export declaration entity.

The system further comprises a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

Implementations can include the following. The first memory is remote from the graphical user interface. The first memory is remote from the second memory.

In another aspect, a tangible computer readable medium includes program code for providing a message-based interface for exchanging information for a request to create or update an export declaration using customs-relevant business transactions. The medium comprises program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for a request for an export declaration request that includes a first message package derived from the common business object model and hierarchically organized in memory as an export declaration request request message entity and an export declaration request package comprising an export declaration request entity, where the export declaration request entity includes a reconciliation period counter value, an item list complete transmission indicator, a base business transaction document type code, an export declaration block indicator, and an export declaration cancel indicator.

The medium further comprises program code for processing the first message according to the hierarchical organization of the first message package, where processing the first message includes unpacking the first message package based on the common business object model.

The medium further comprises program code for sending a second message to the heterogeneous application responsive to the first message, where the second message includes a second message package derived from the common business object model to provide consistent semantics with the first message package.

Implementations can include the following. The export declaration request package further comprises at least one of the following: a party package, a location package, a business transaction document reference package, a package package, and an item package. The export declaration request entity comprises at least one of the following: an incoterms, a transport mode code, a transport means, a total net weight quantity, a total net weight quantity type code, a total gross weight quantity, and a total gross weight quantity type code.

In another aspect, a distributed system operates in a landscape of computer systems providing message-based services defined in a service registry. The system comprises a graphical user interface comprising computer readable instructions, embedded on tangible media, for a request for an export declaration request using a request.

The system further comprises a first memory storing a user interface controller for processing the request and involving a message including a message package derived from a common business object model, where the common business object model includes business objects having relationships that enable derivation of message-based service interfaces and message packages, the message package hierarchically organized as an export declaration request request message entity and an export declaration request package comprising an export declaration request entity, where the export declaration request entity includes a reconciliation period counter value, an item list complete transmission indicator, a base business transaction document type code, an export declaration block indicator, and an export declaration cancel indicator.

The system further comprises a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

Implementations can include the following. The first memory is remote from the graphical user interface. The first memory is remote from the second memory.

BRIEF DESCRIPTION OF THE DRAWINGS

FIGS. 32-1 through 32-6 depict an example object model for a business object Export Declaration.

FIGS. 34-1 through 34-2 depict an example Export Declaration Processing Confirmation Message Data Type.

FIGS. 35-1 through 35-2 depict an example Export Declaration Processing Request Message Data Type.

FIGS. 41-1 through 41-2 depict an example Export Processing Notification Message Data Type.

FIGS. 42-1 through 42-4 depict an example Form Export Declaration Processing in Fallback Procedure Request Message Data Type.

FIGS. 43-1 through 43-42 show an example configuration of an Element Structure that includes an ExportDeclarationProcessingCancellationRequest package.

FIGS. 44-1 through 44-158 show an example configuration of an Element Structure that includes an ExportDeclarationProcessingConfirmation package.

FIGS. 45-1 through 45-143 show an example configuration of an Element Structure that includes an ExportDeclarationProcessingRequest package.

FIGS. 46-1 through 46-6 show an example configuration of an Element Structure that includes an ExportMessageExchangeNotification package.

FIGS. 47-1 through 47-7 show an example configuration of an Element Structure that includes an ExportMessageSemanticErrorNotification package.

FIGS. 48-1 through 48-7 show an example configuration of an Element Structure that includes an ExportMessageSyntaxErrorNotification package.

FIGS. 49-1 through 49-40 show an example configuration of an Element Structure that includes an ExportProcessingInformationConfirmation package.

FIGS. 50-1 through 50-41 show an example configuration of an Element Structure that includes an ExportProcessingInformationRequest package.

FIGS. 51-1 through 51-102 show an example configuration of an Element Structure that includes an ExportProcessingNotification package.

FIGS. 52-1 through 52-22 show an example configuration of an Element Structure that includes a FormExportDeclarationProcessingInFallbackProcedureRequest package.

FIGS. 53-1 through 53-6 depict an example object model for a business object Export Declaration Request.

FIGS. 54-1 through 54-2 depict an example Export Declaration Request Request Message Data Type.

FIGS. 55-1 through 55-167 show an example configuration of an Element Structure that includes an ExportDeclarationRequestRequest package.

DETAILED DESCRIPTION

A. Overview

Figure 1:
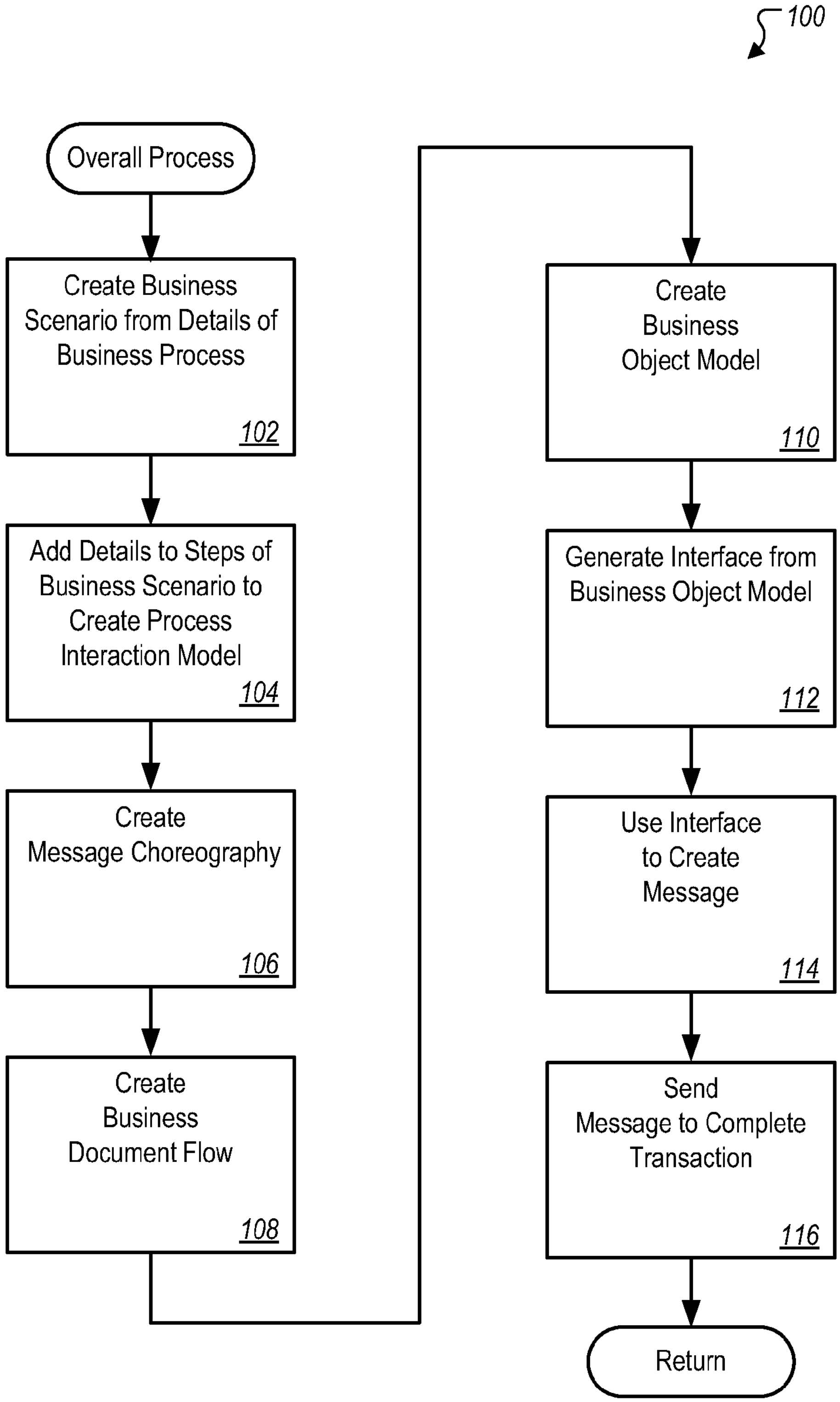
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
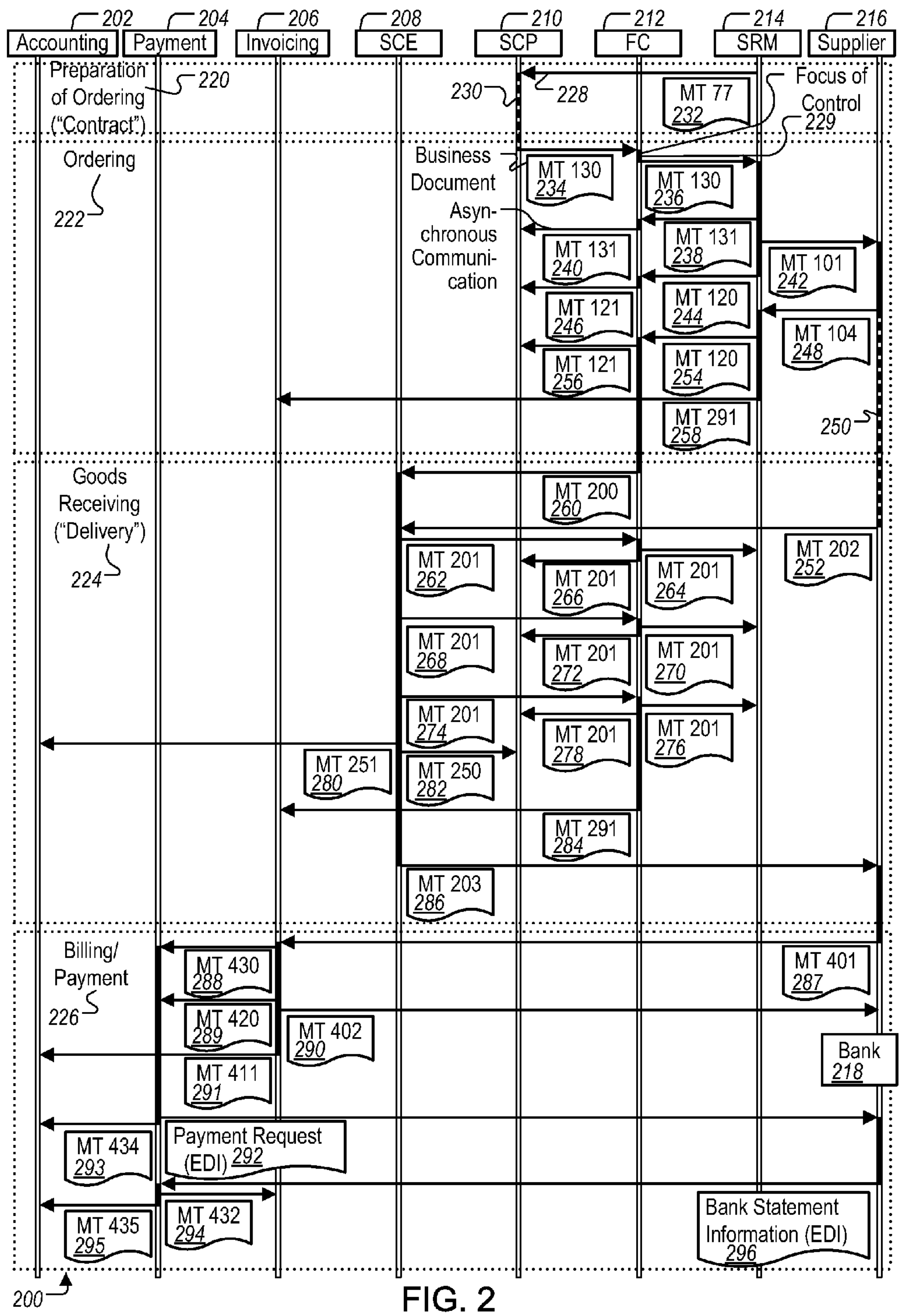
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
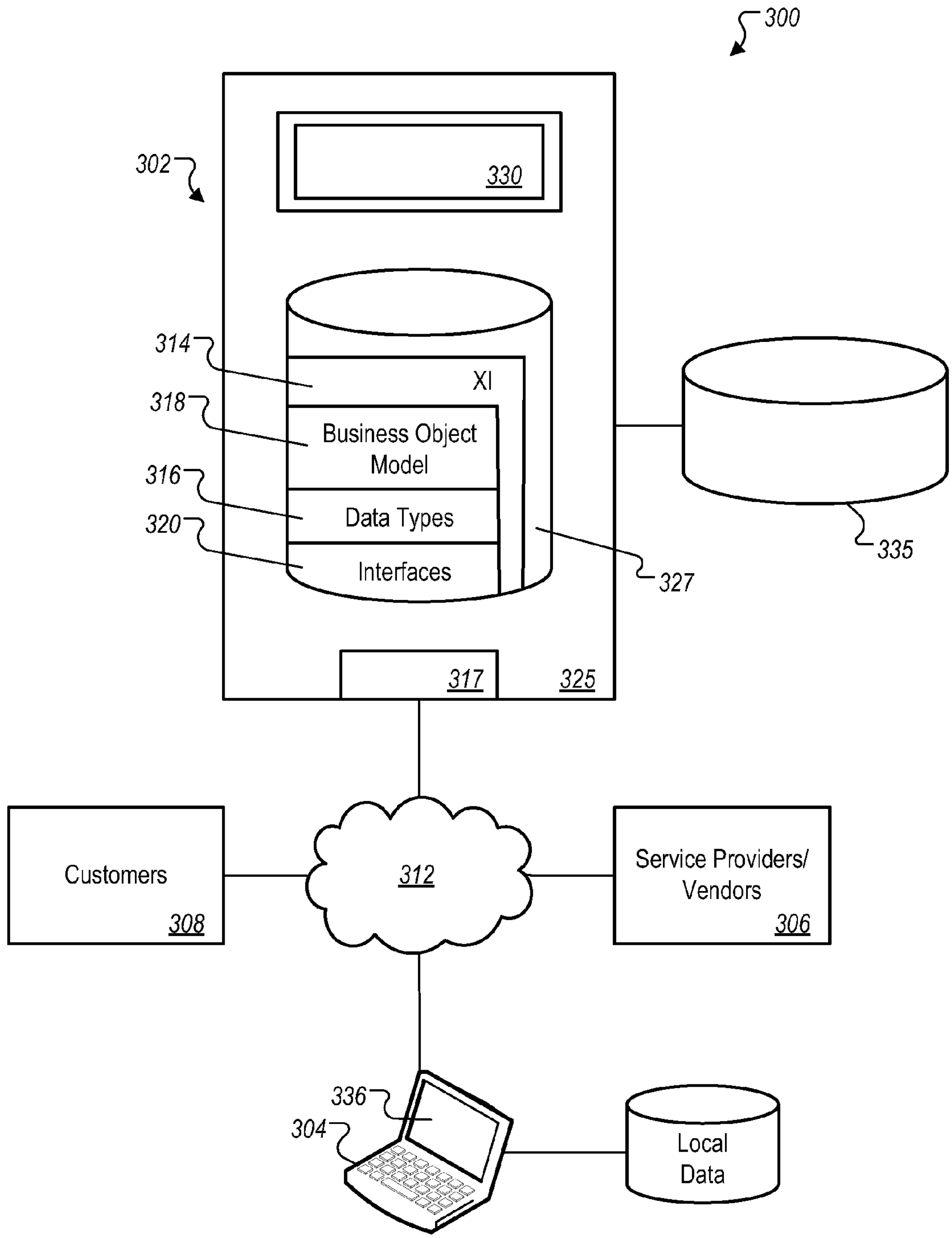
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
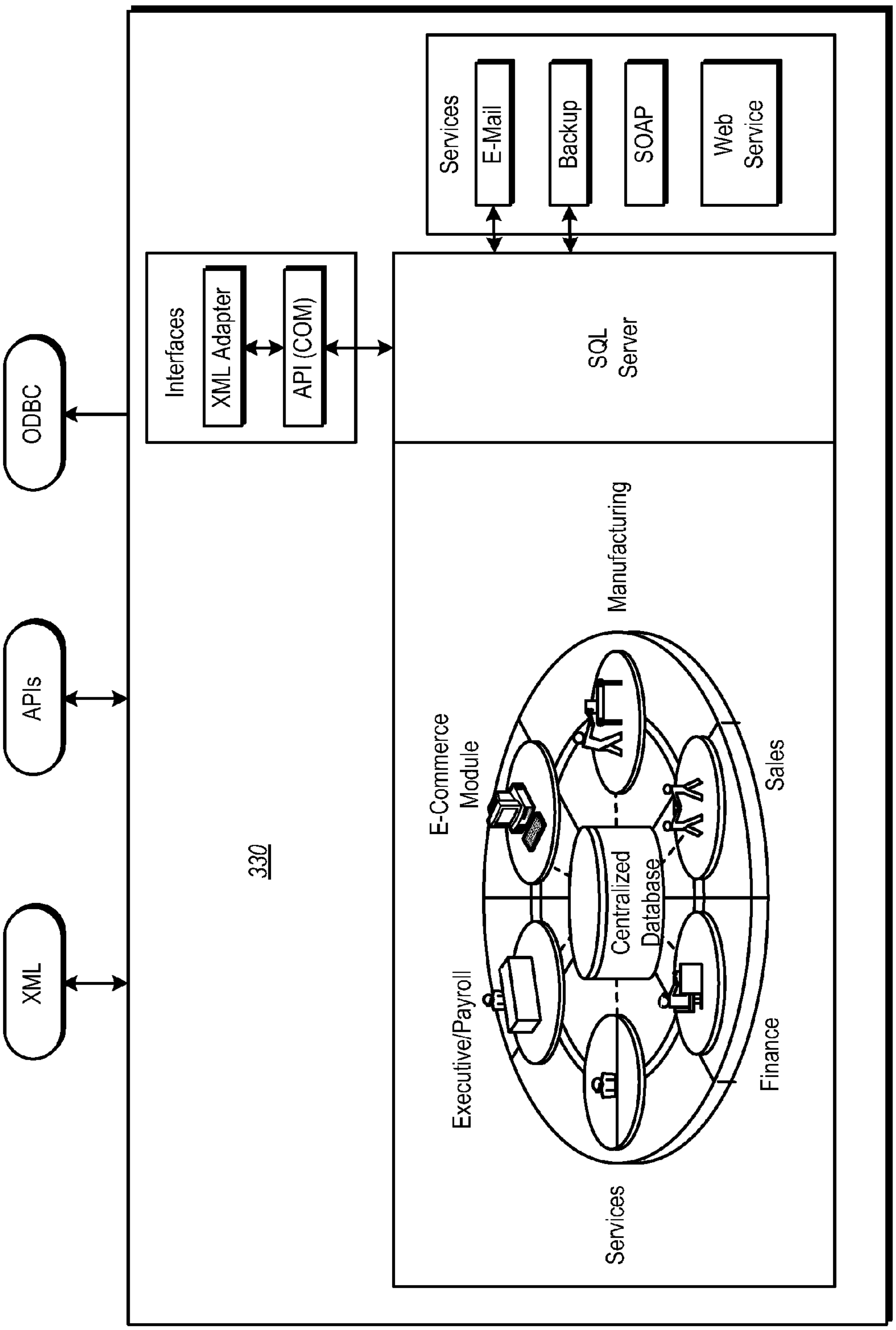
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
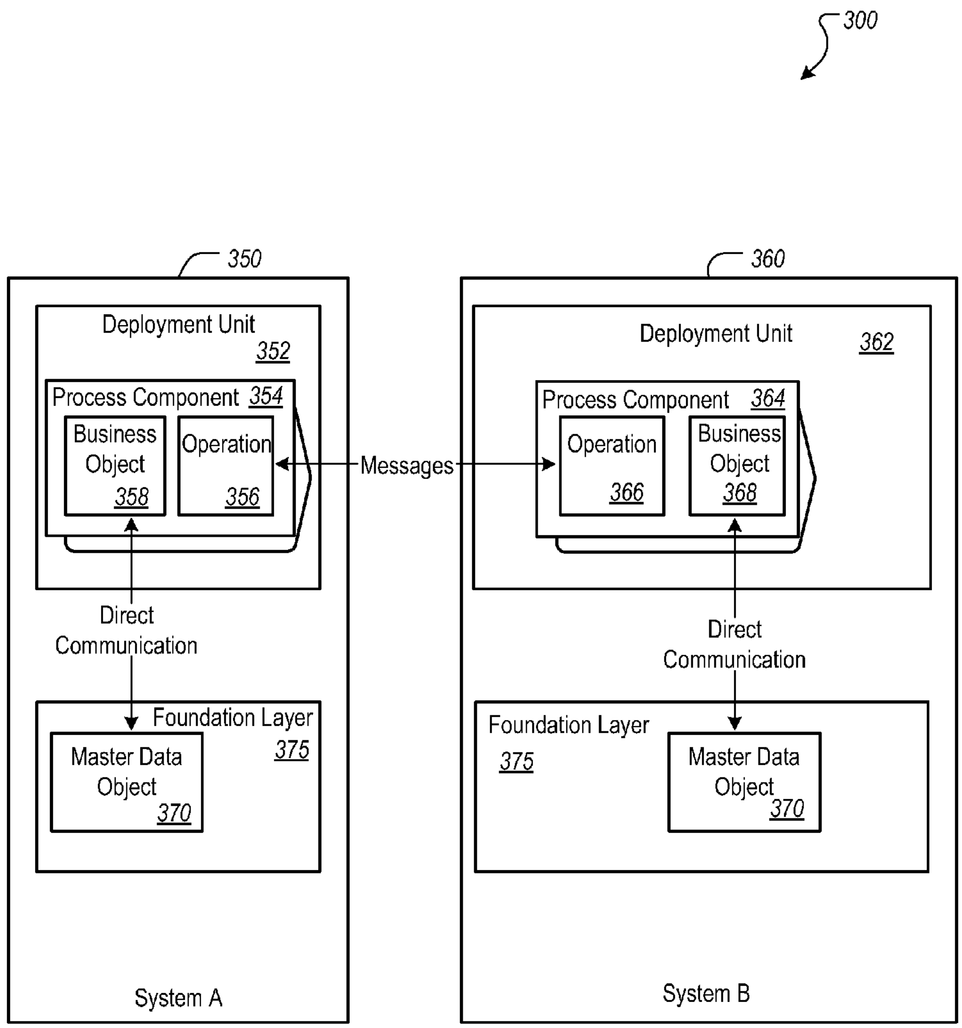

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
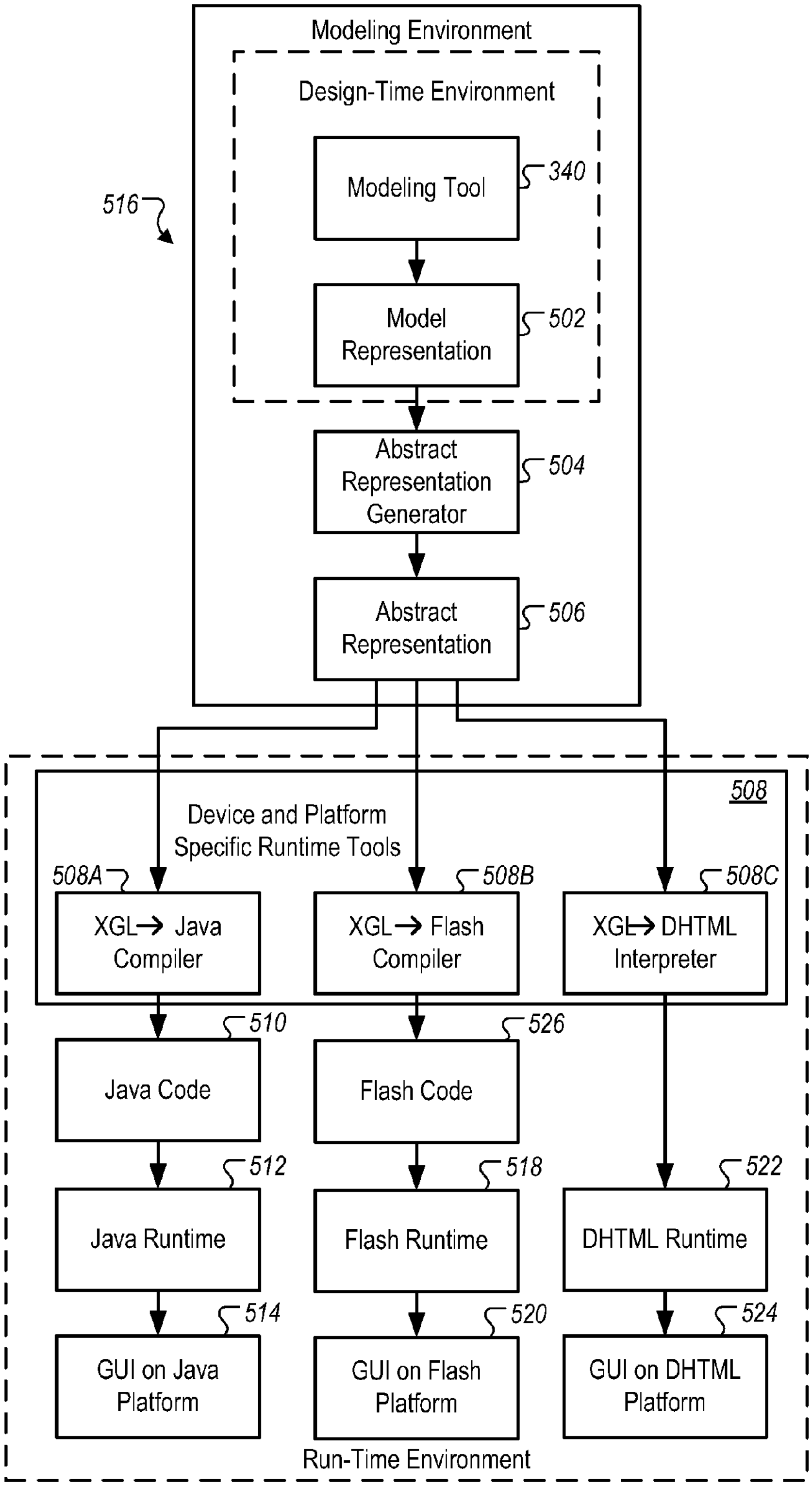
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
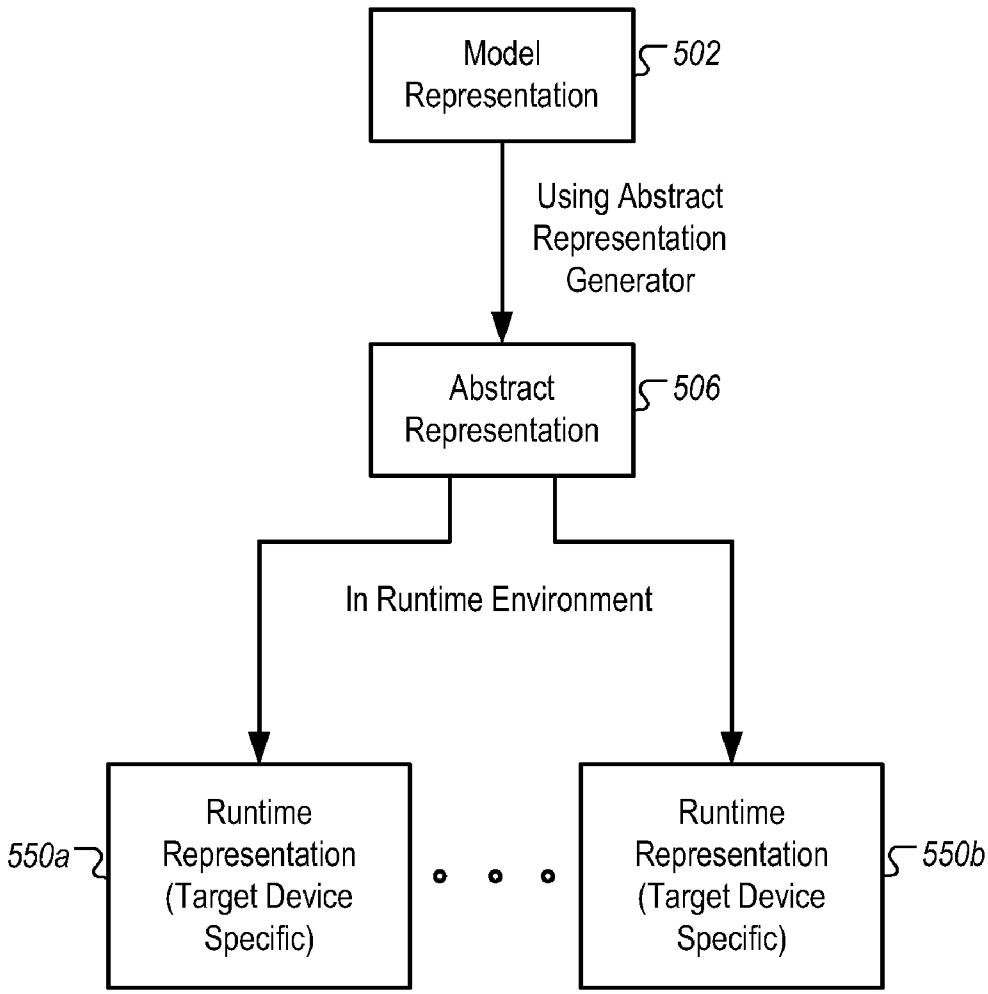
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
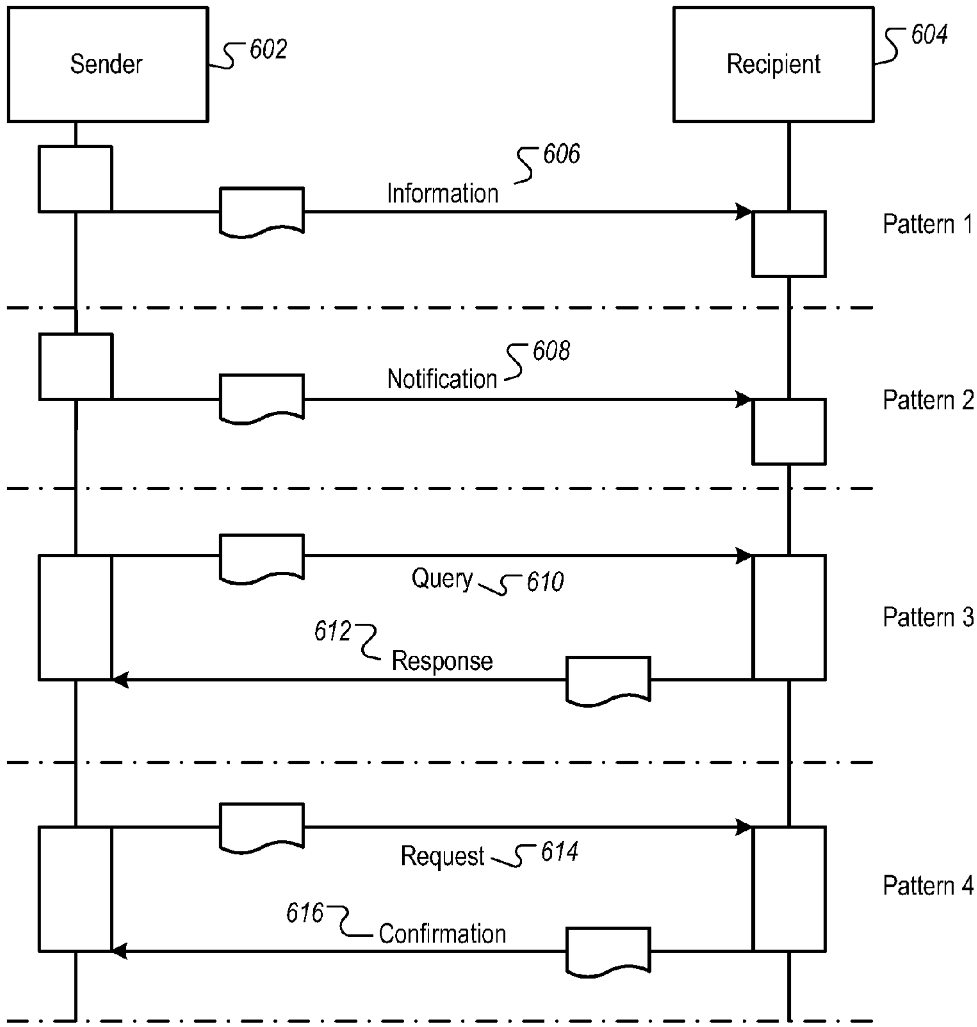
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
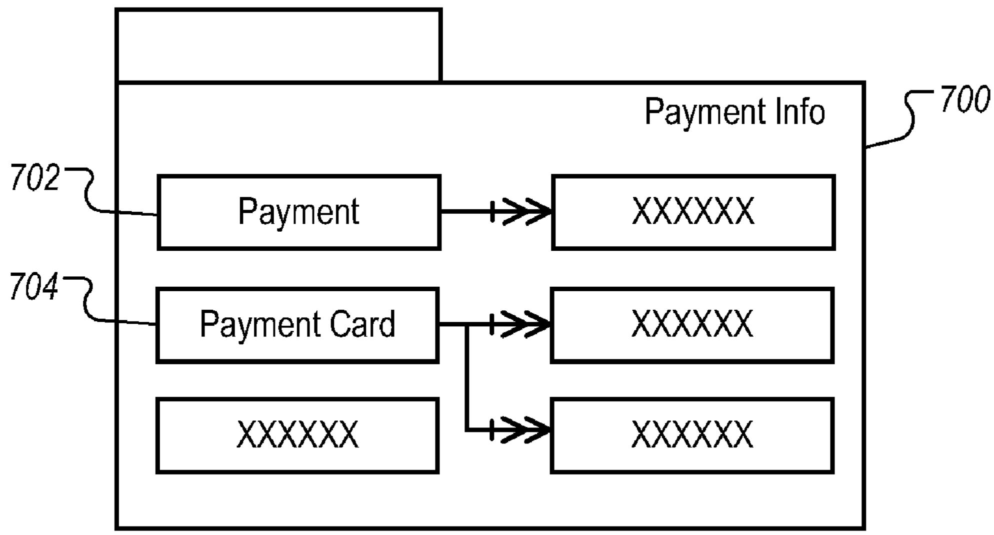
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
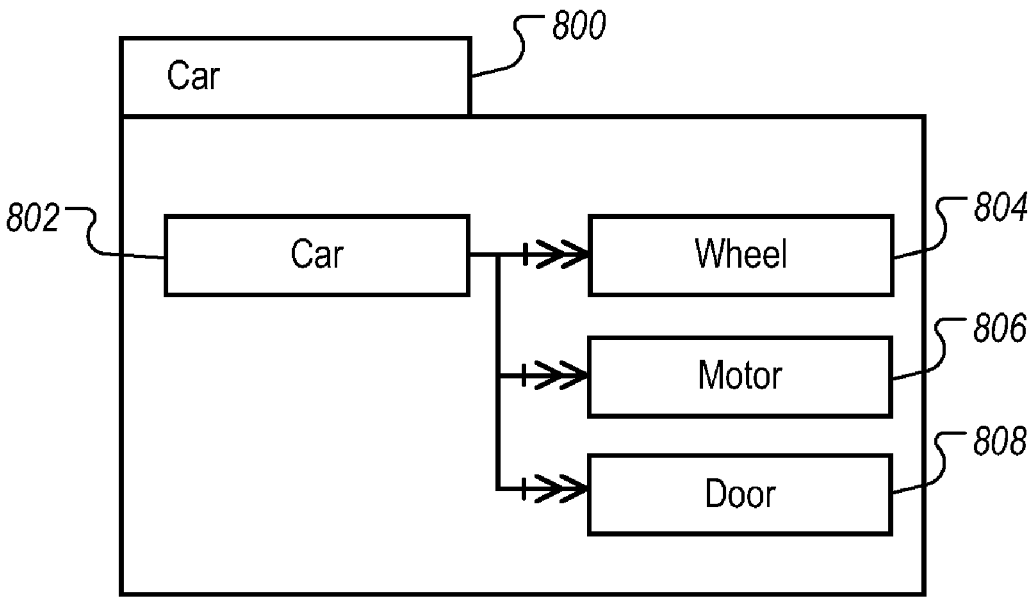
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
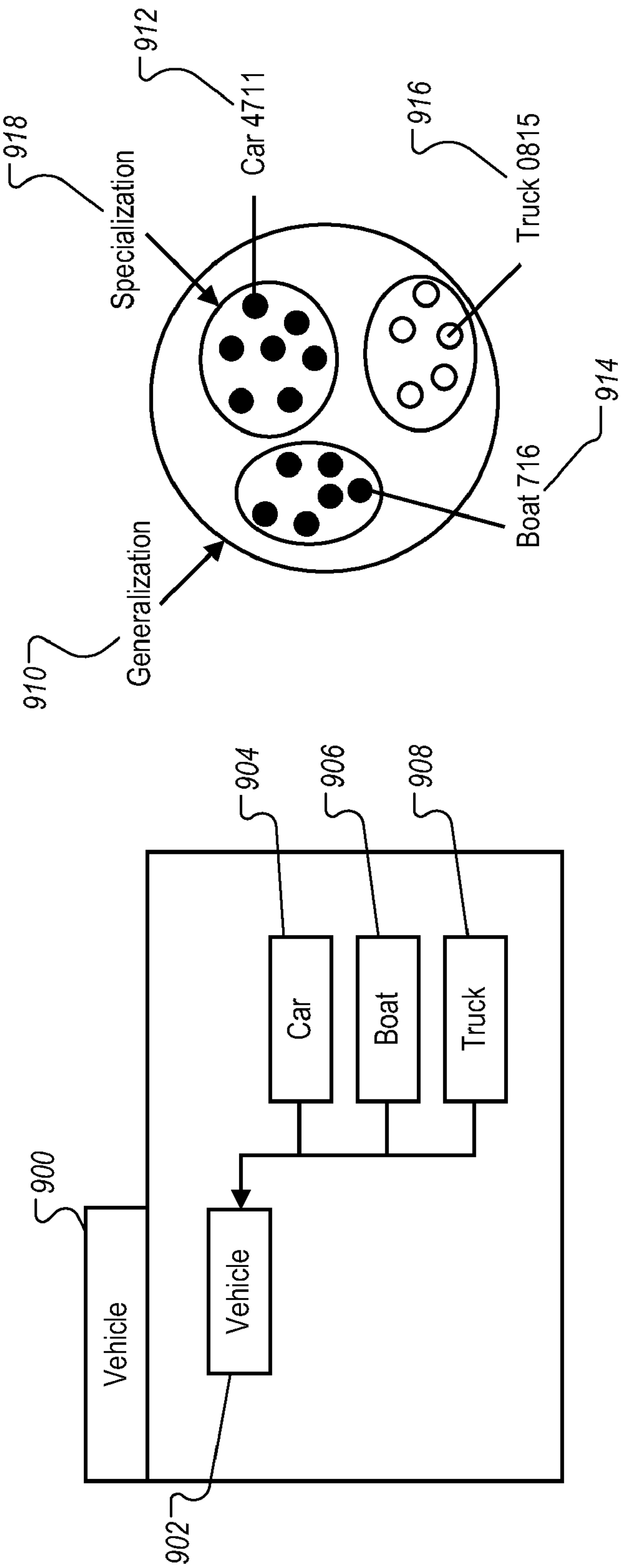
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
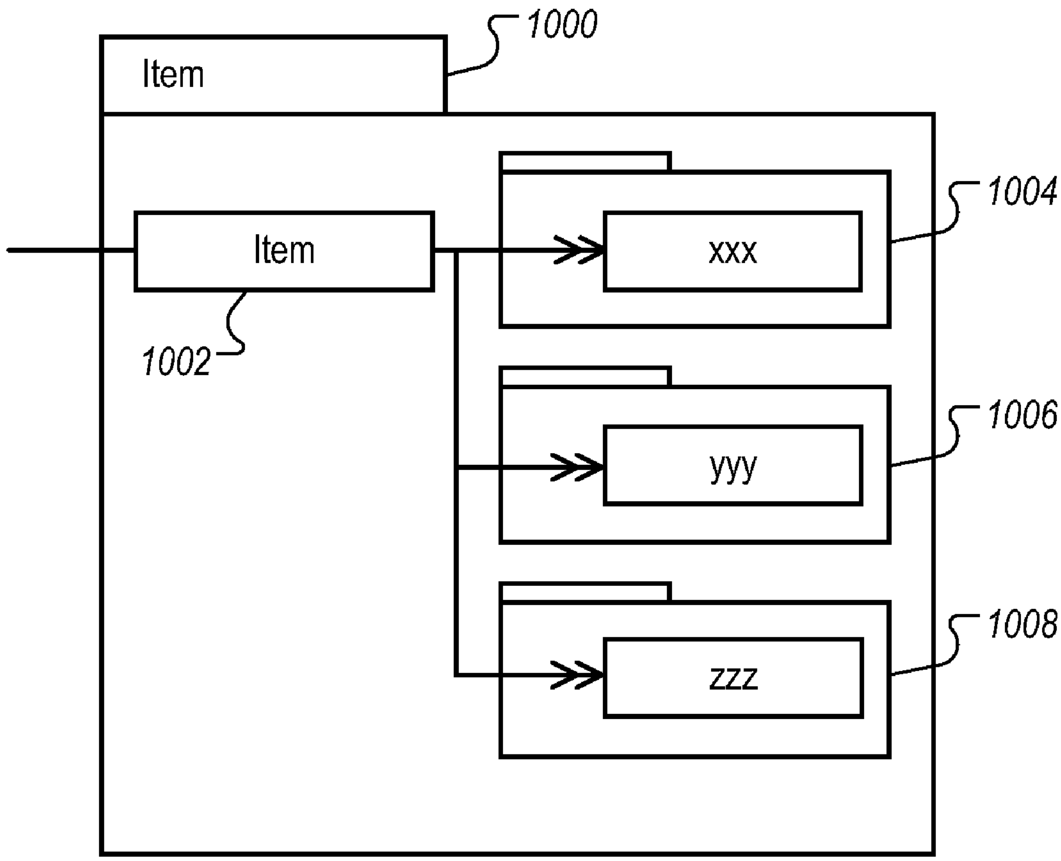
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
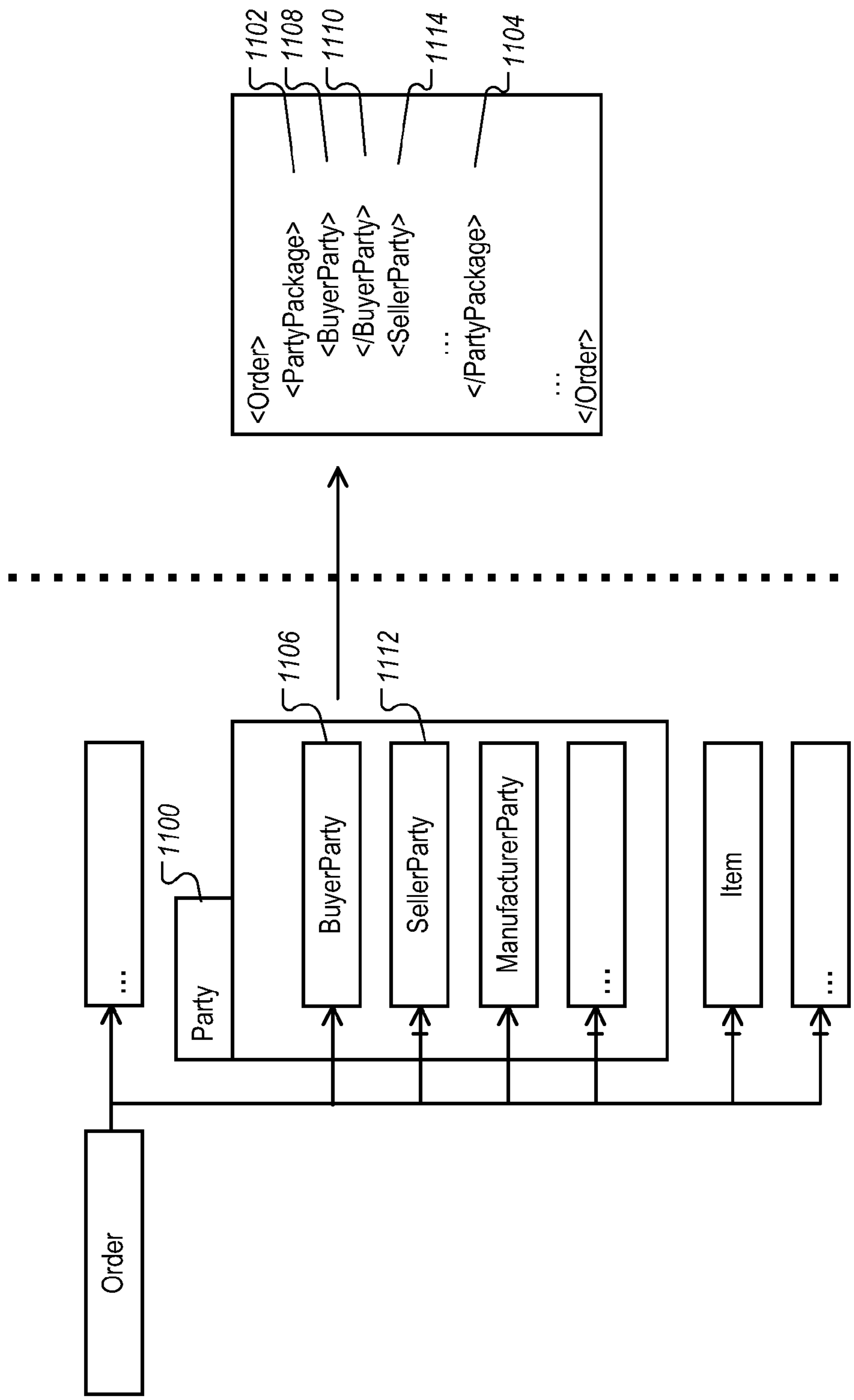
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
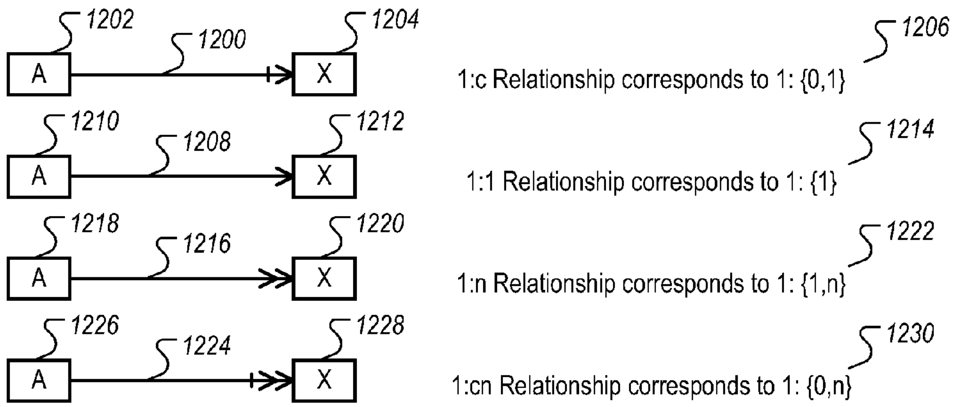
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
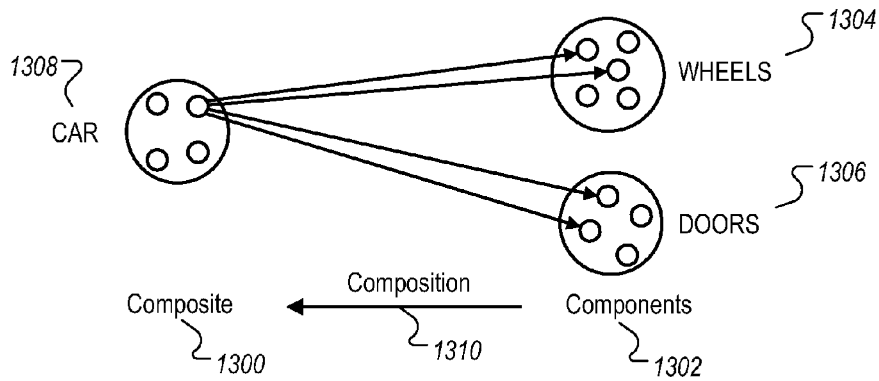
FIG. 13 depicts an example of a composition in accordance with methods and systems consistent with the subject matter described herein.
Figure 14:
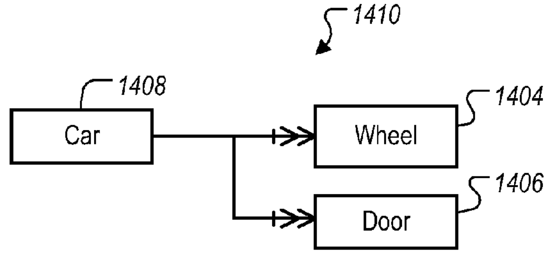
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
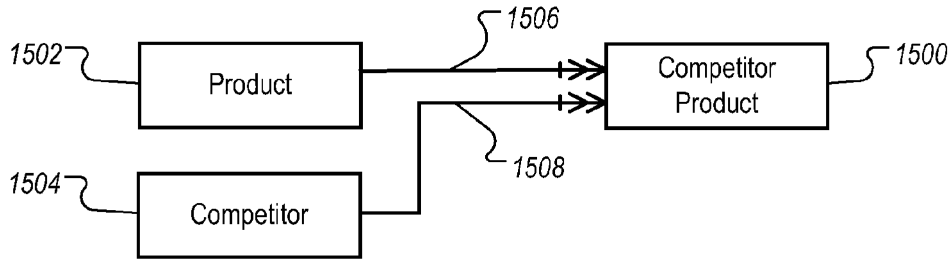
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
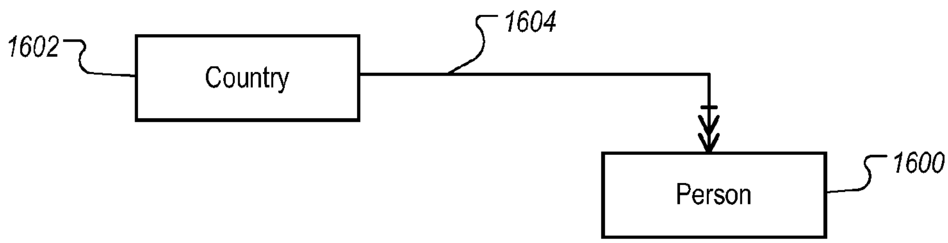
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
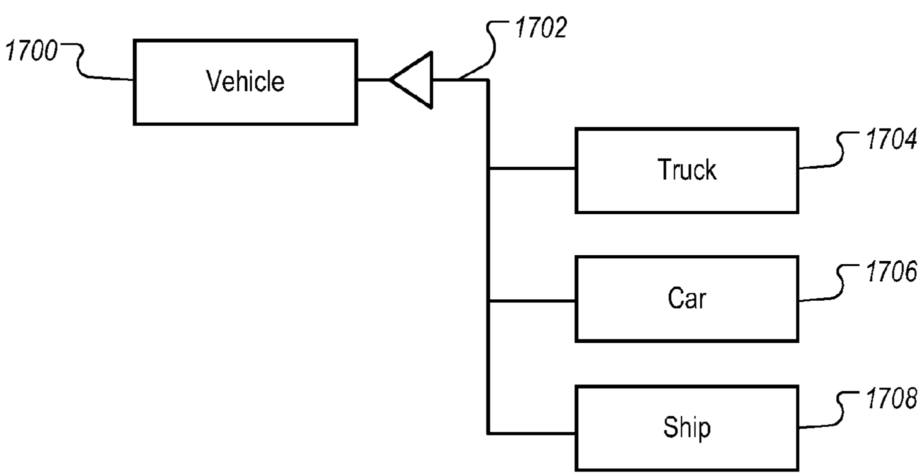
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, “drop anchor” can be applied to ships. If outgoing relationships to a specific object are restricted to a subset, then a subtype can be defined which reflects this subset.

Figure 18:
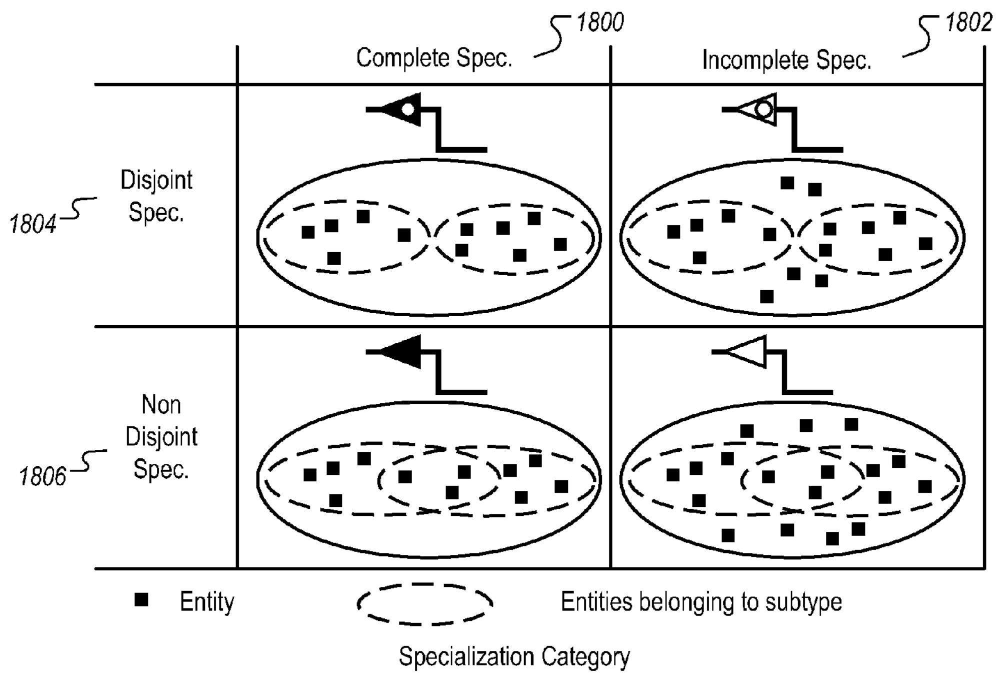
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
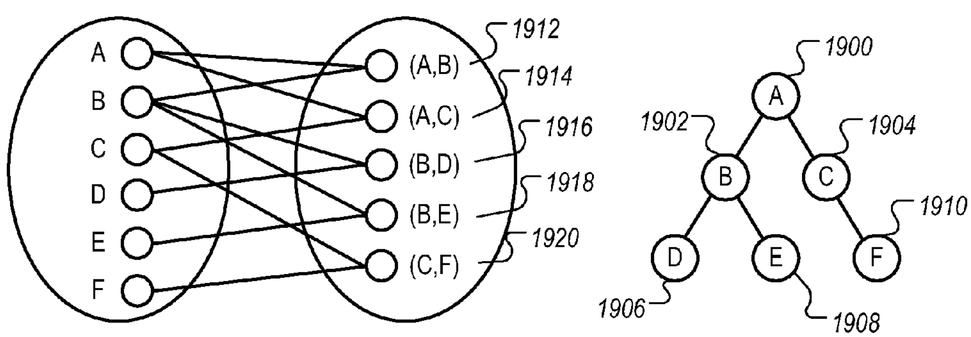
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
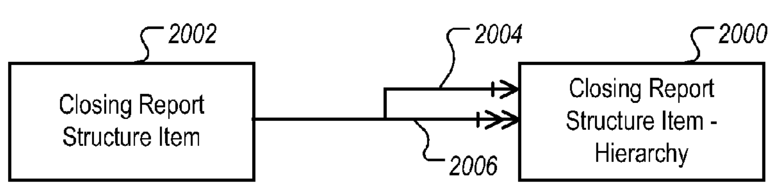
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
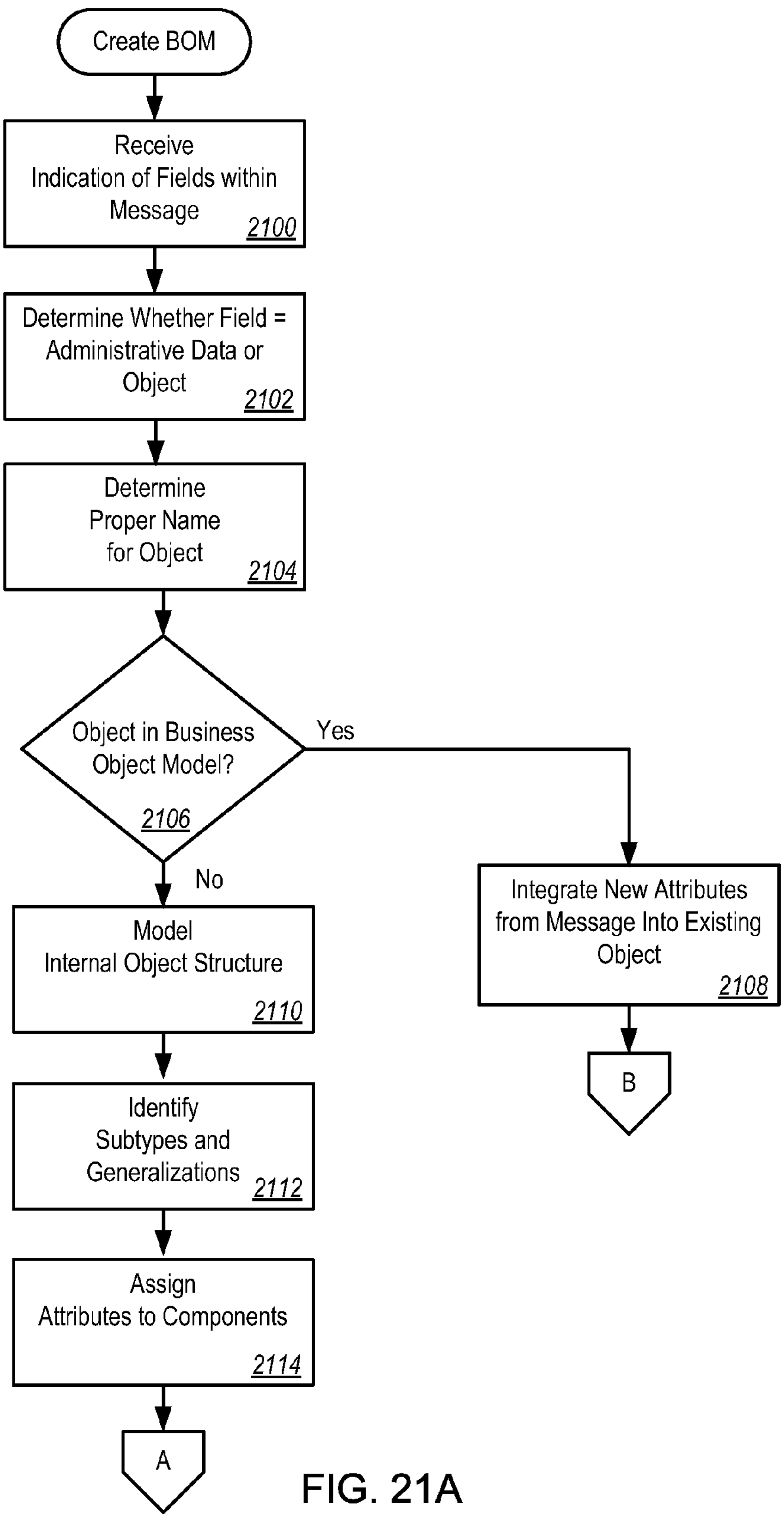
FIGS. 21A-B depict a flow diagram of the steps performed to create a business object model in accordance with methods and systems consistent with the subject matter described herein.
Figure 21B:
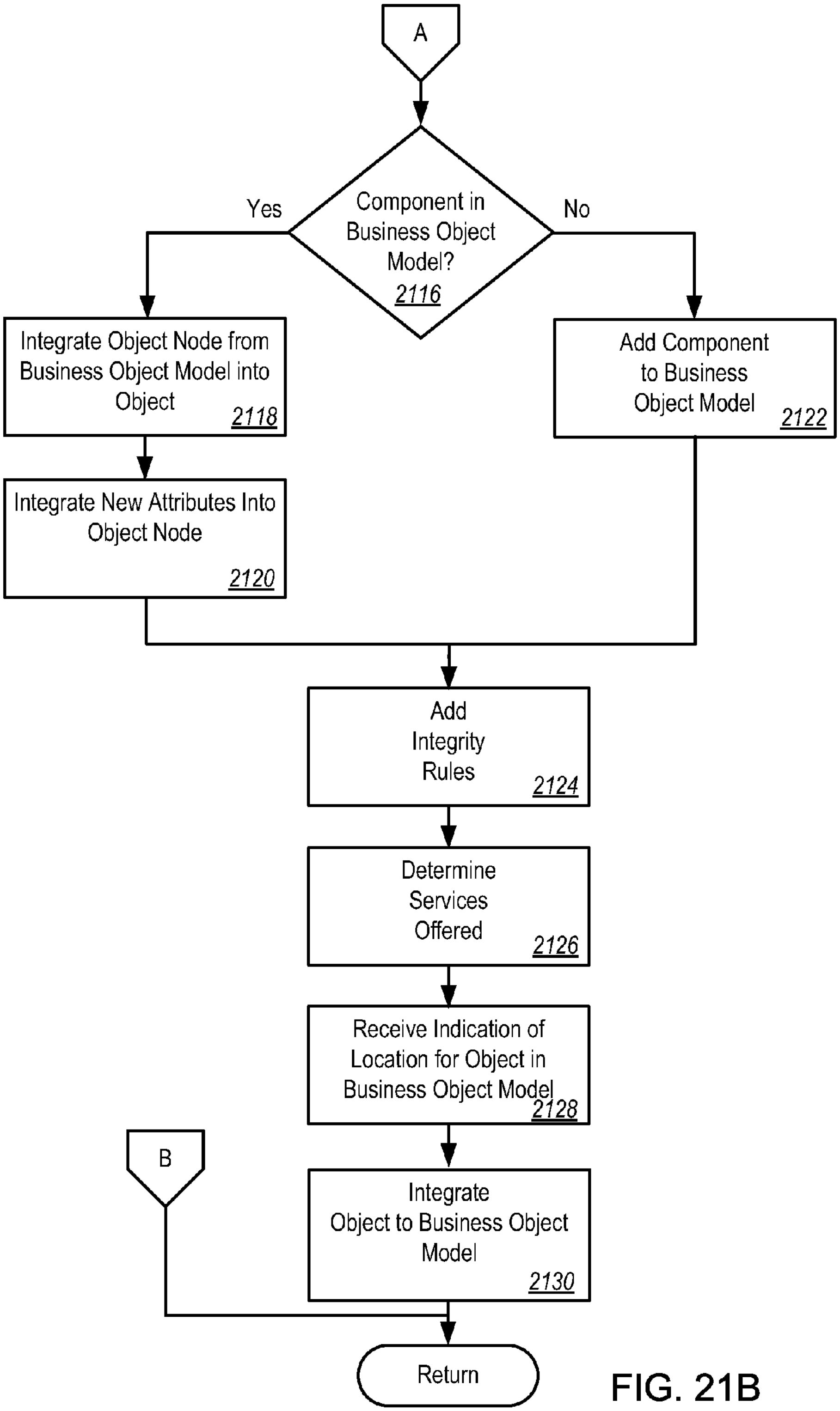

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |

-continued

| |
|---|
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | | |
|---|---|---|---|
| ID | Purchase Order | | |
| AdditionalID | | | |
| PostingDate | | | |
| LastChangeDate | | | |
| AcceptanceStatus | | | |
| Note | | | |
| CompleteTransmission Indicator | | | |
| Buyer | | Buyer | |
| BuyerOrganisationName | | | |
| Person Name | | | |
| FunctionalTitle | | | |
| DepartmentName | | | |
| CountryCode | | | |
| StreetPostalCode | | | |
| POBox Postal Code | | | |
| Company Postal Code | | | |
| City Name | | | |
| DistrictName | | | |
| PO Box ID | | | |
| PO Box Indicator | | | |
| PO Box Country Code | | | |
| PO Box Region Code | | | |
| PO Box City Name | | | |
| Street Name | | | |
| House ID | | | |
| Building ID | | | |
| Floor ID | | | |
| Room ID | | | |
| Care Of Name | | | |
| AddressDescription | | | |
| Telefonnumber | | | |
| MobileNumber | | | |
| Facsimile | | | |
| Email | | | |
| Seller | | Seller | |
| SellerAddress | | | |
| Location | | Location | |
| LocationType | | | |
| DeliveryItemGroupID | | DeliveryTerms | |
| DeliveryPriority | | | |
| DeliveryCondition | | | |
| TransferLocation | | | |
| NumberofPartialDelivery | | | |
| QuantityTolerance | | | |
| MaximumLeadTime | | | |
| TransportServiceLevel | | | |
| TranportCondition | | | |
| TransportDescription | | | |
| CashDiscountTerms | | | |
| PaymentForm | | Payment | |
| PaymentCardID | | | |
| PaymentCardReferenceID | | | |
| SequenceID | | | |
| Holder | | | |
| ExpirationDate | | | |
| AttachmentID | | | |
| AttachmentFilename | | | |
| DescriptionofMessage | | | |
| ConfirmationDescriptionof Message | | | |
| FollowUpActivity | | | |
| ItemID | | Purchase Order Item | |
| ParentItemID | | | |
| HierarchyType | | | |
| ProductID | | | Product |
| ProductType | | | |
| ProductNote | | | |
| ProductCategoryID | | | ProductCategory |
| Amount | | | |
| BaseQuantity | | | |

-continued

| | |
|---|---|
| ConfirmedAmount | |
| ConfirmedBaseQuantity | |
| ItemBuyer | Buyer |
| ItemBuyerOrganisation | |
| Name | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |

-continued

| | |
|---|---|
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
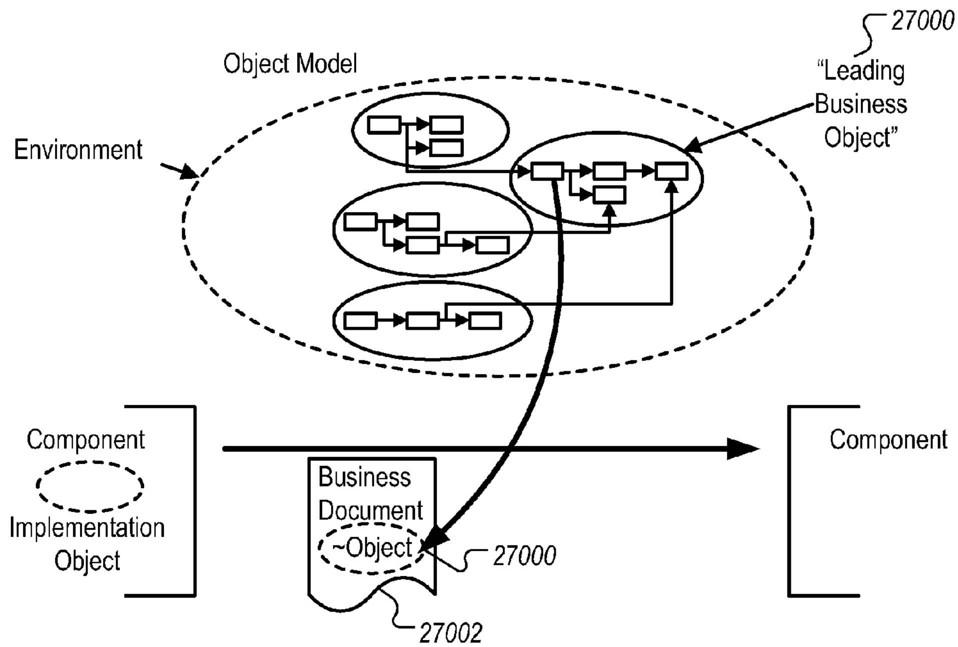
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
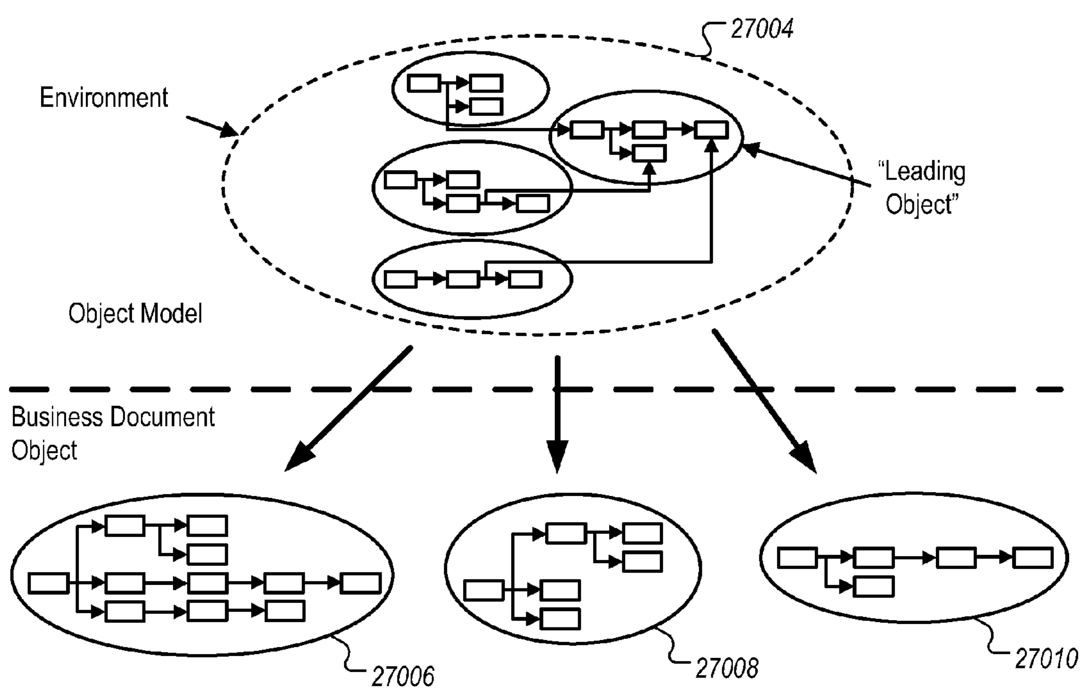

As illustrated in FIG. 27B, several business document objects 27006, 27008, and 27010 as overlapping views may be derived for a given leading object 27004. Each business document object results from the object model by hierarchization.

Figure 27C:
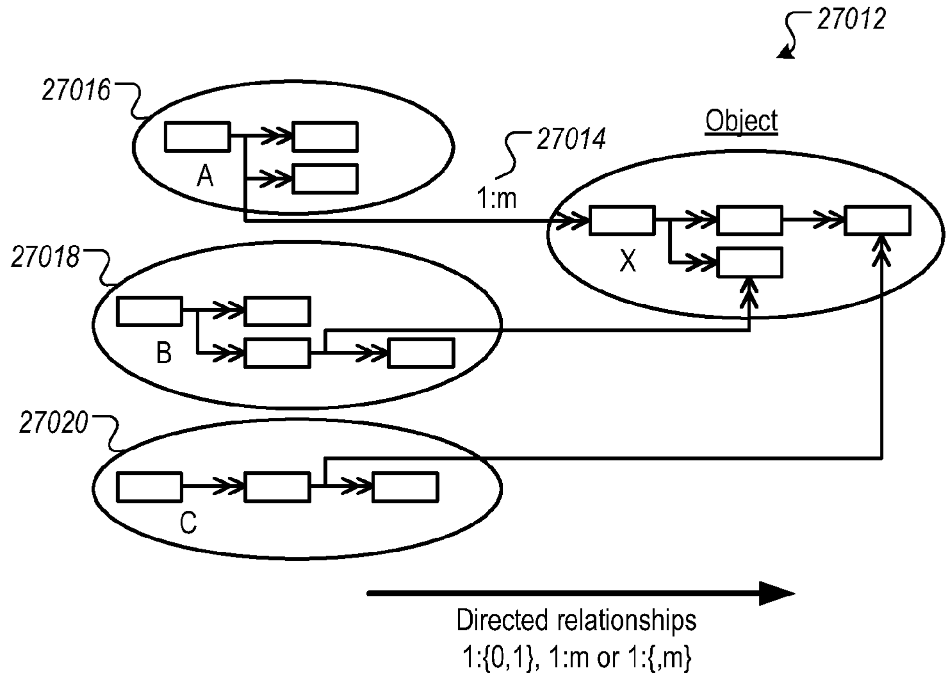

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
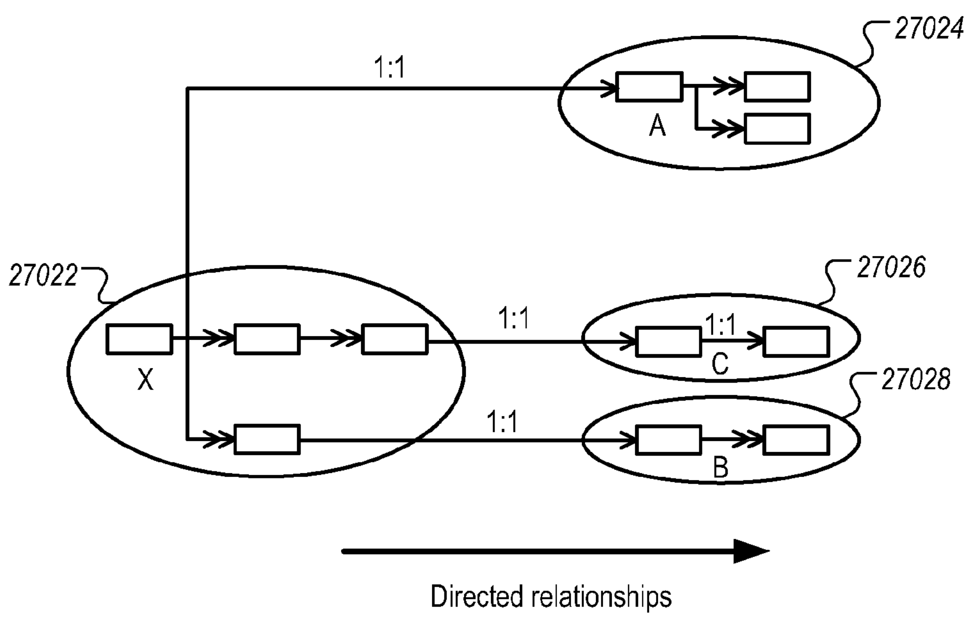

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
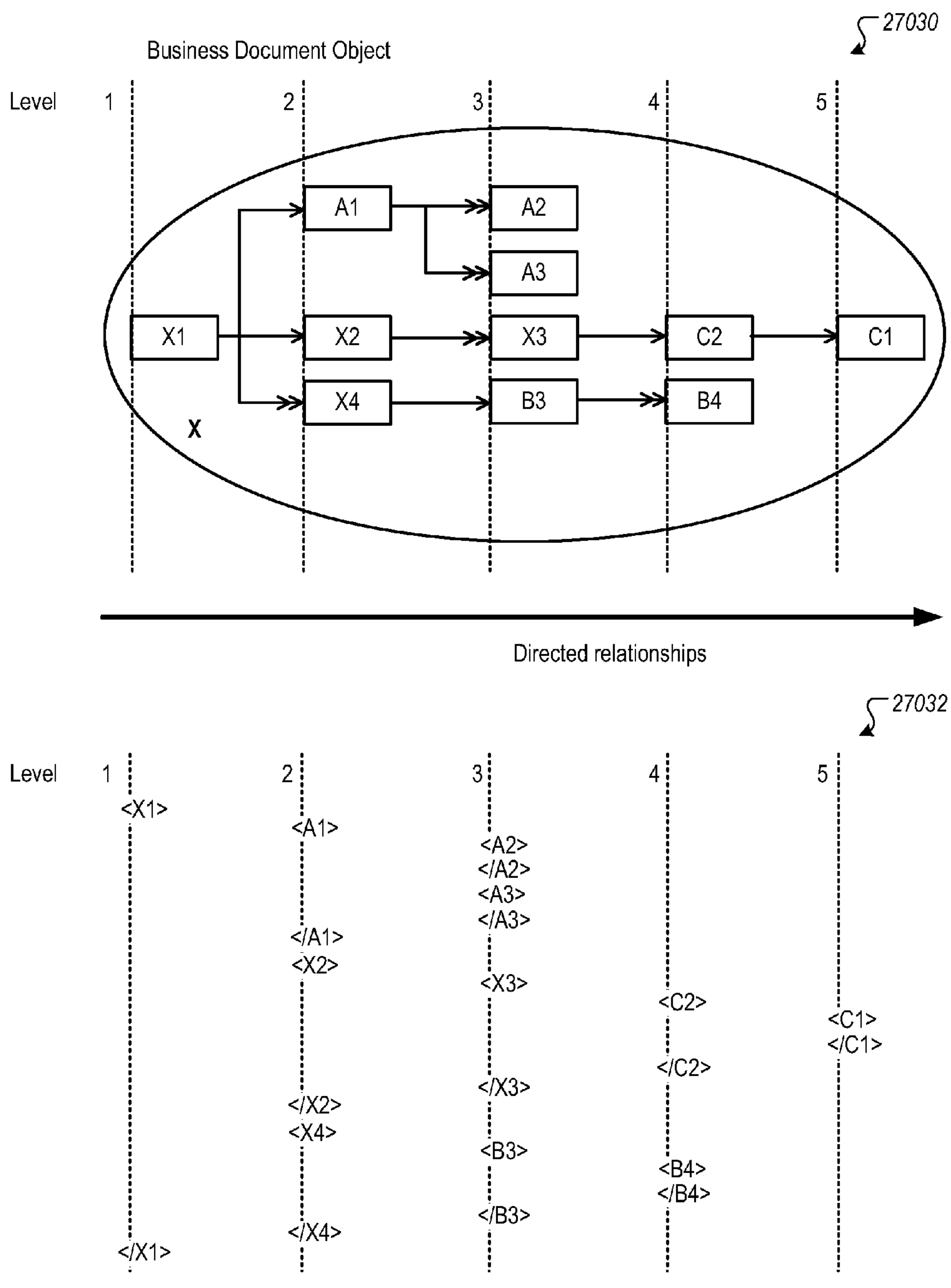

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
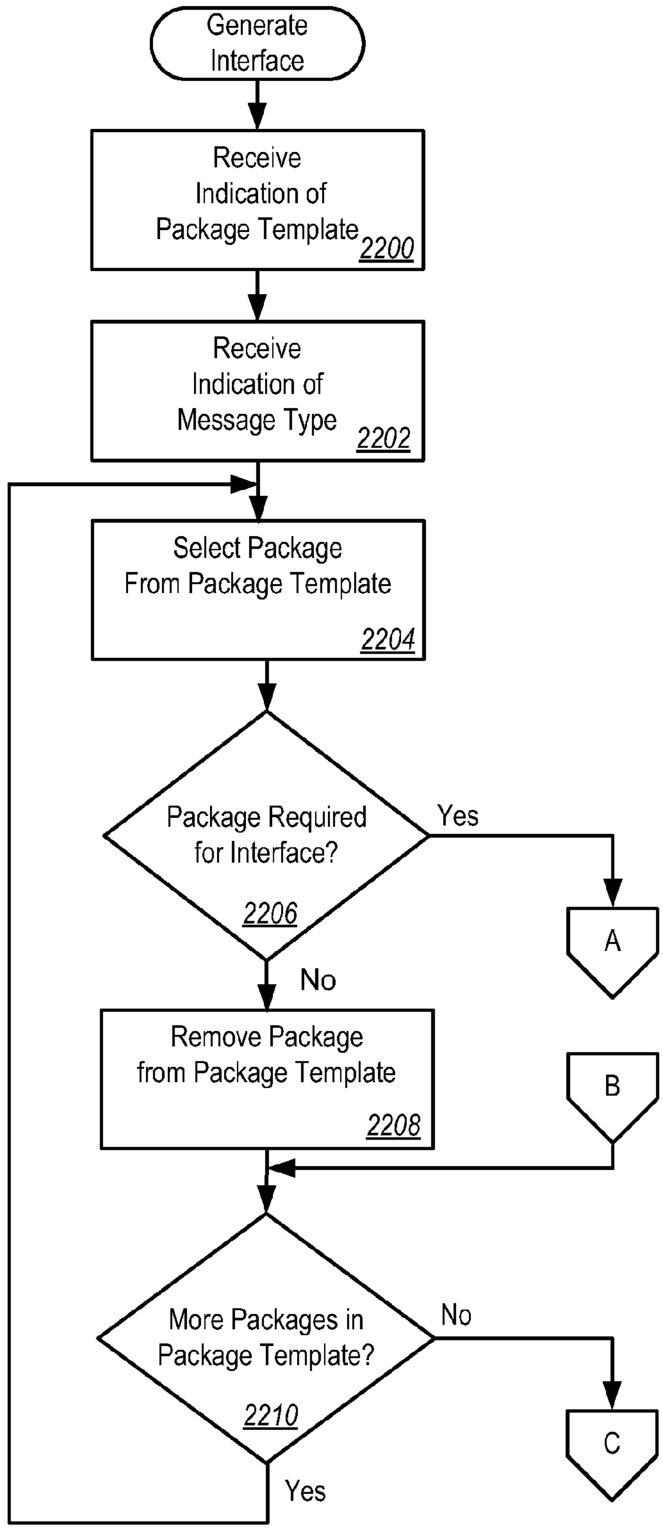
FIGS. 22A-F depict a flow diagram of the steps performed to generate an interface from the business object model in accordance with methods and systems consistent with the subject matter described herein.
Figure 22B:
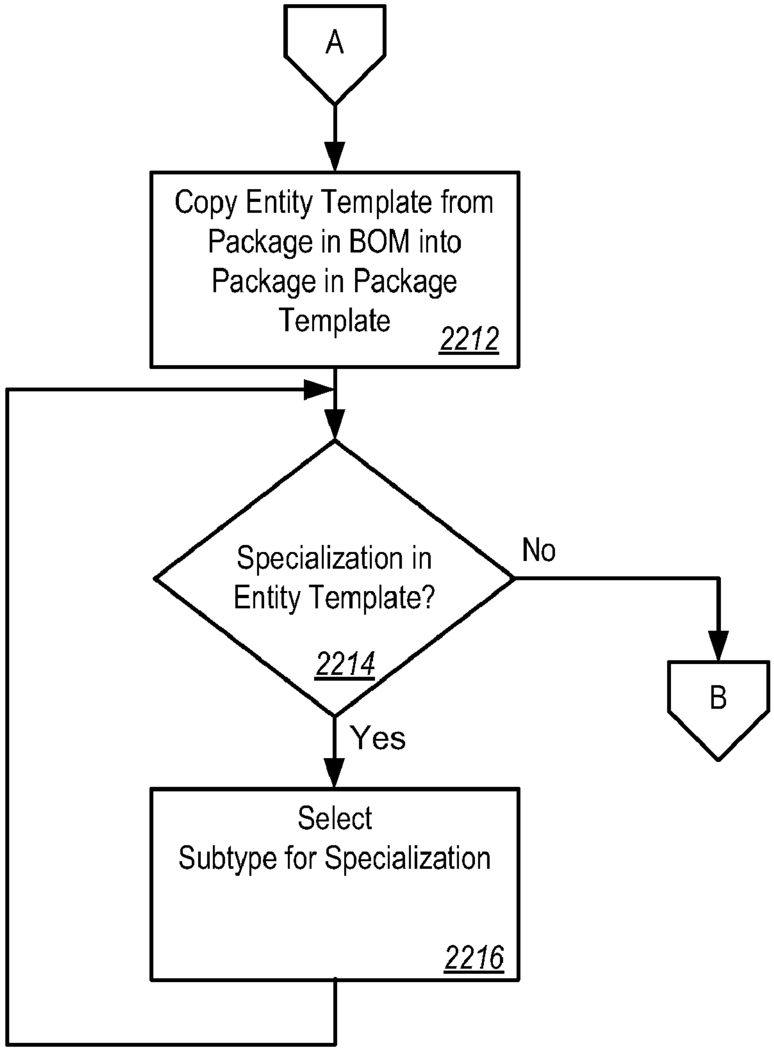
Figure 22C:
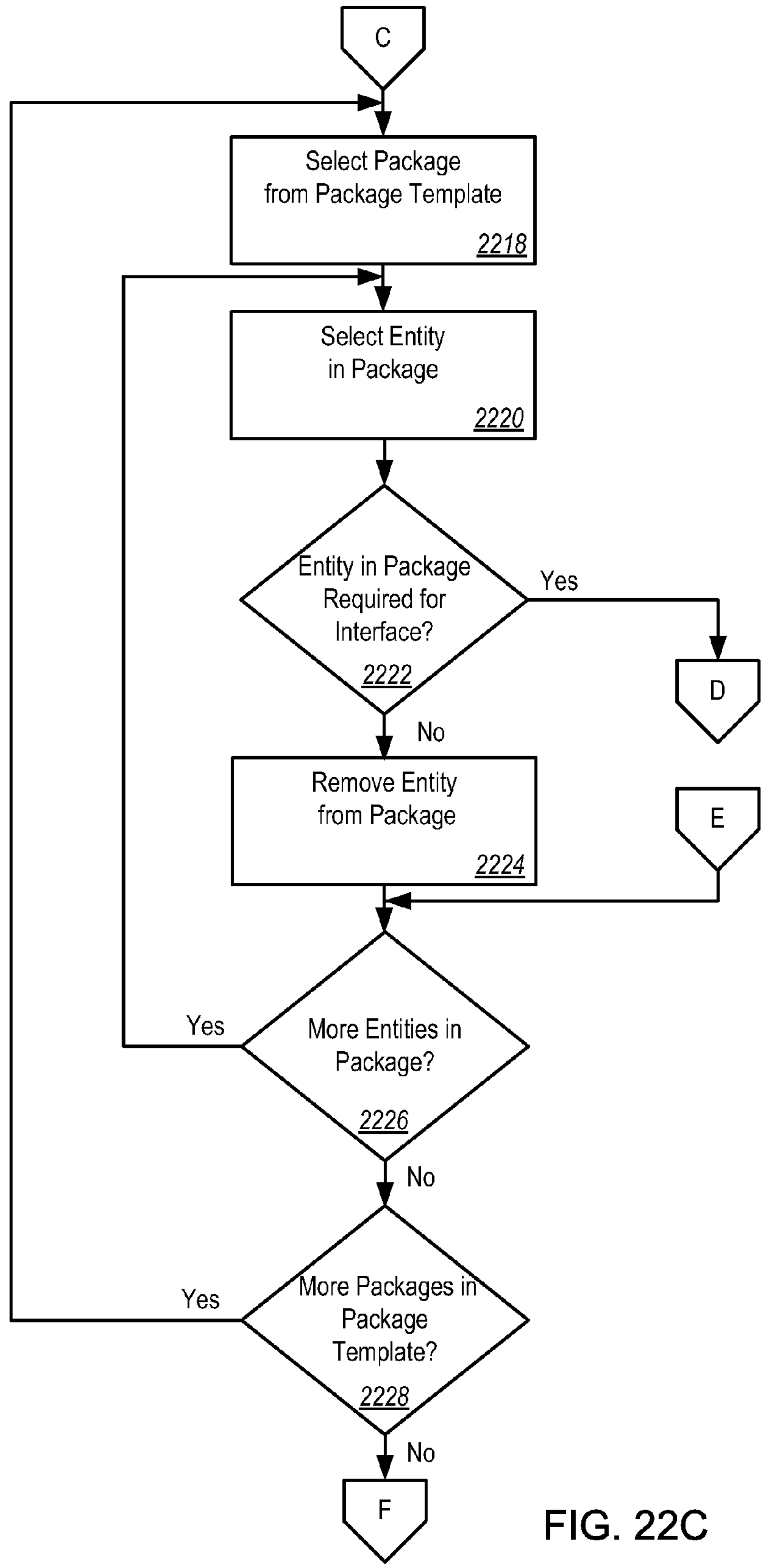

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
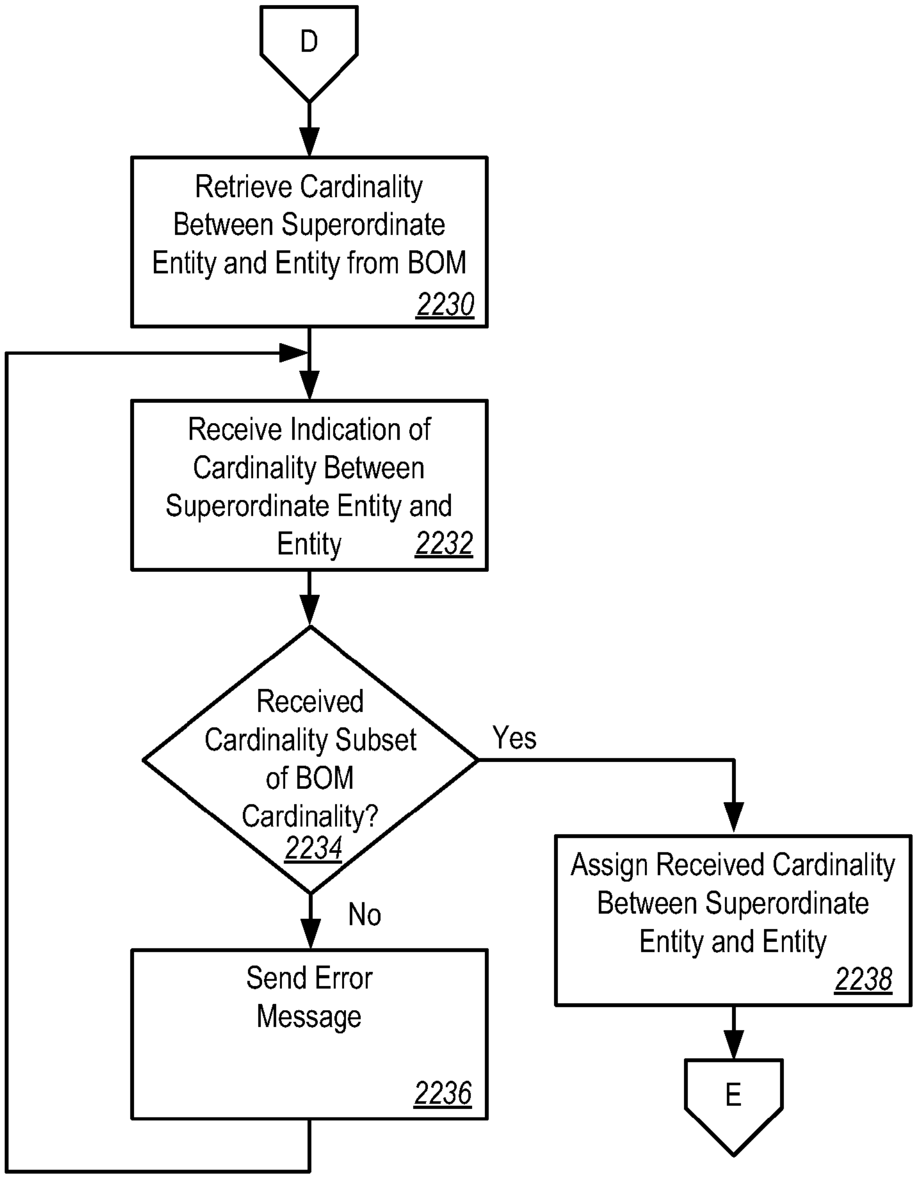

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
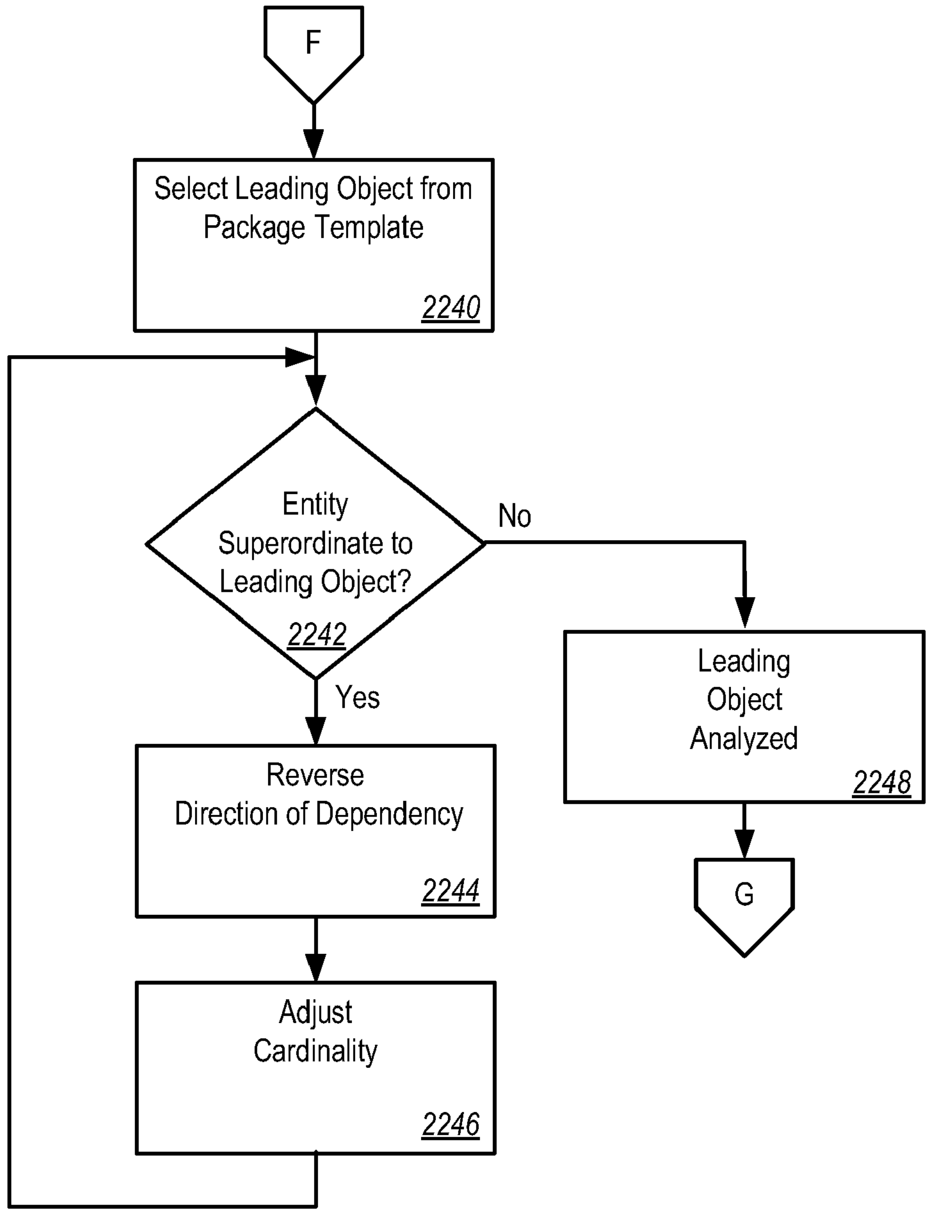

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
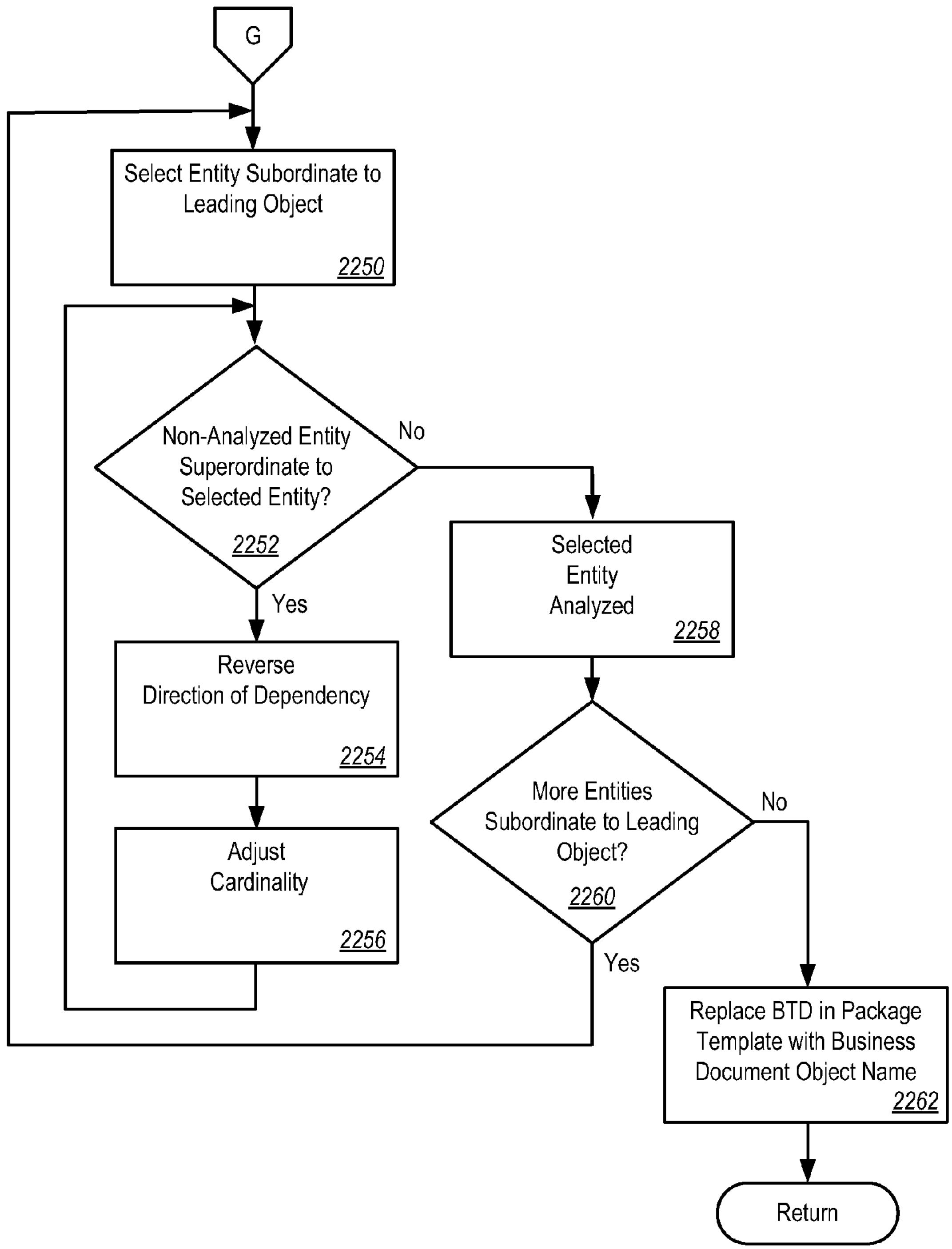

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
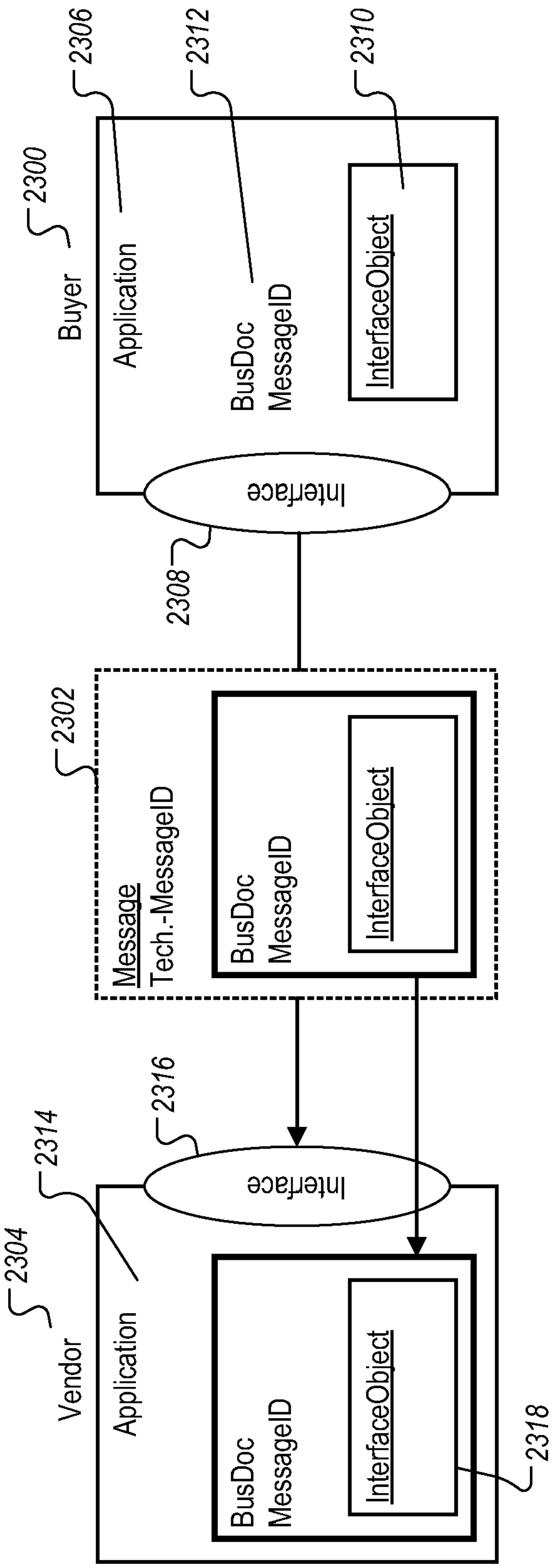
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
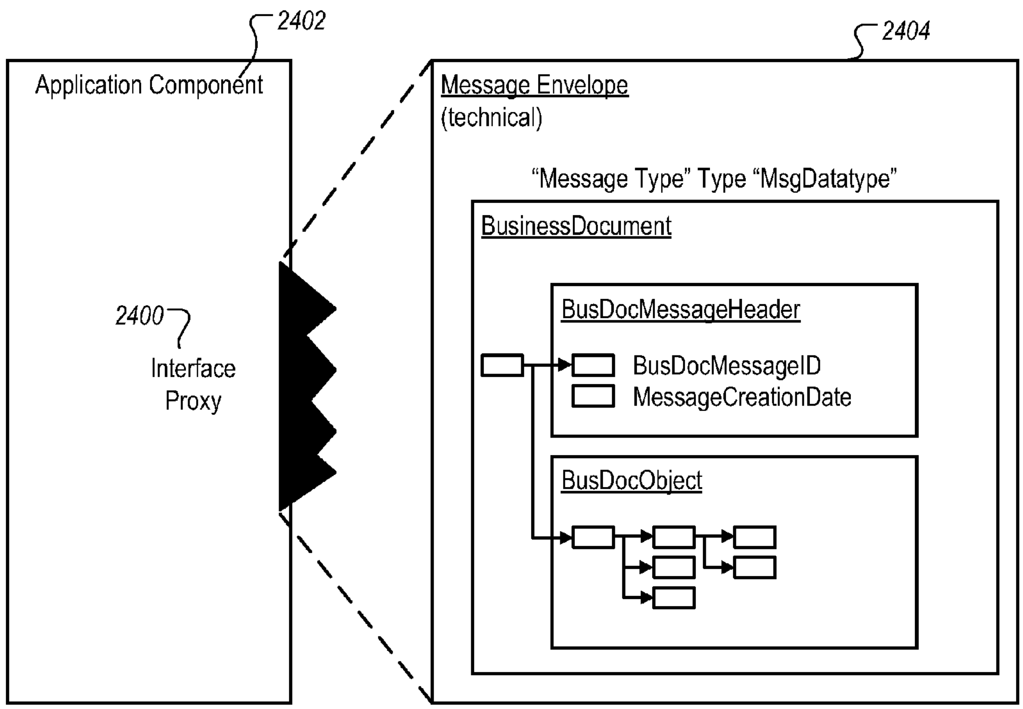
FIG. 24 depicts an interface proxy in accordance with methods and systems consistent with the subject matter described herein.
Figure 25:
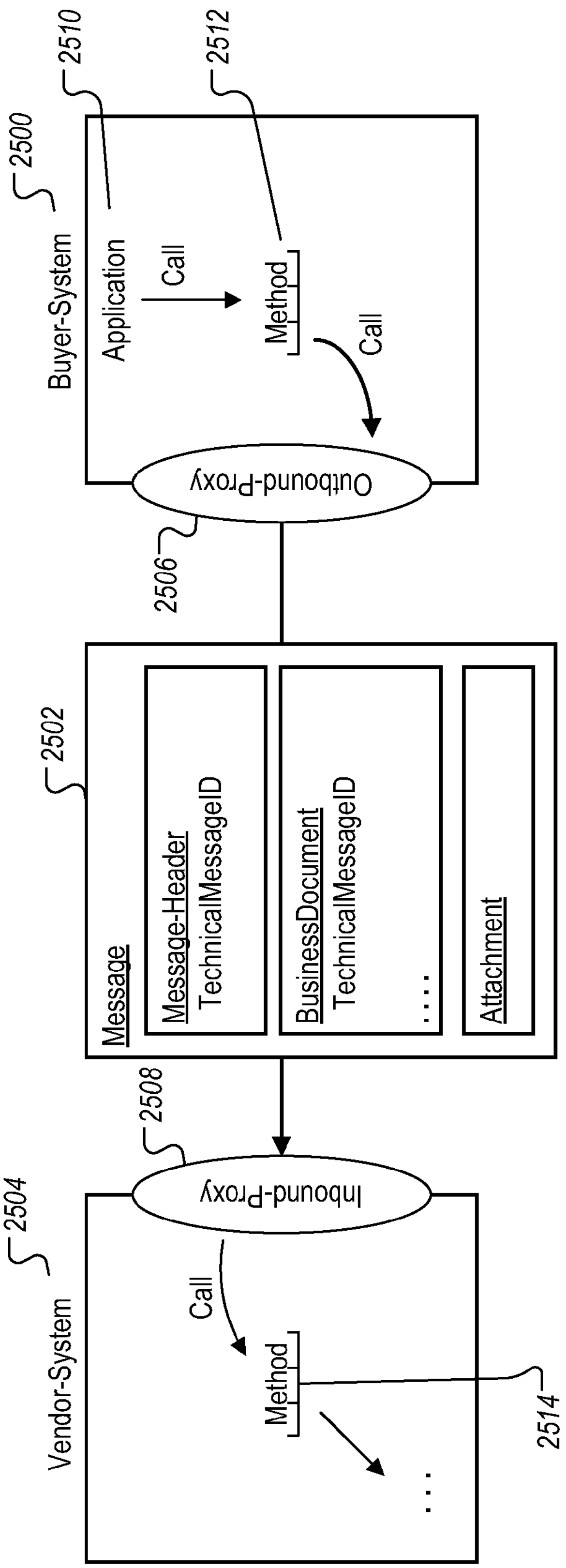
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
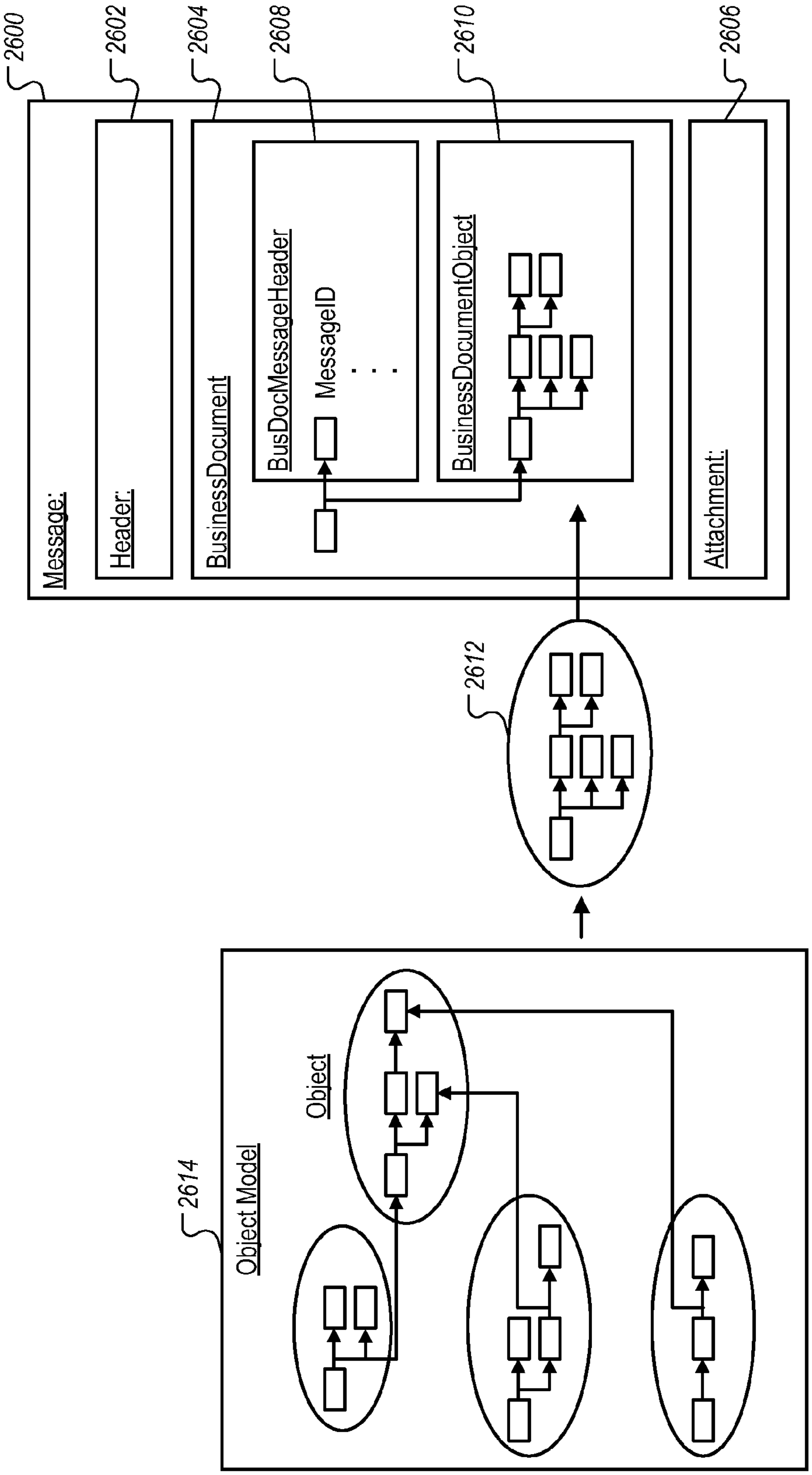
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
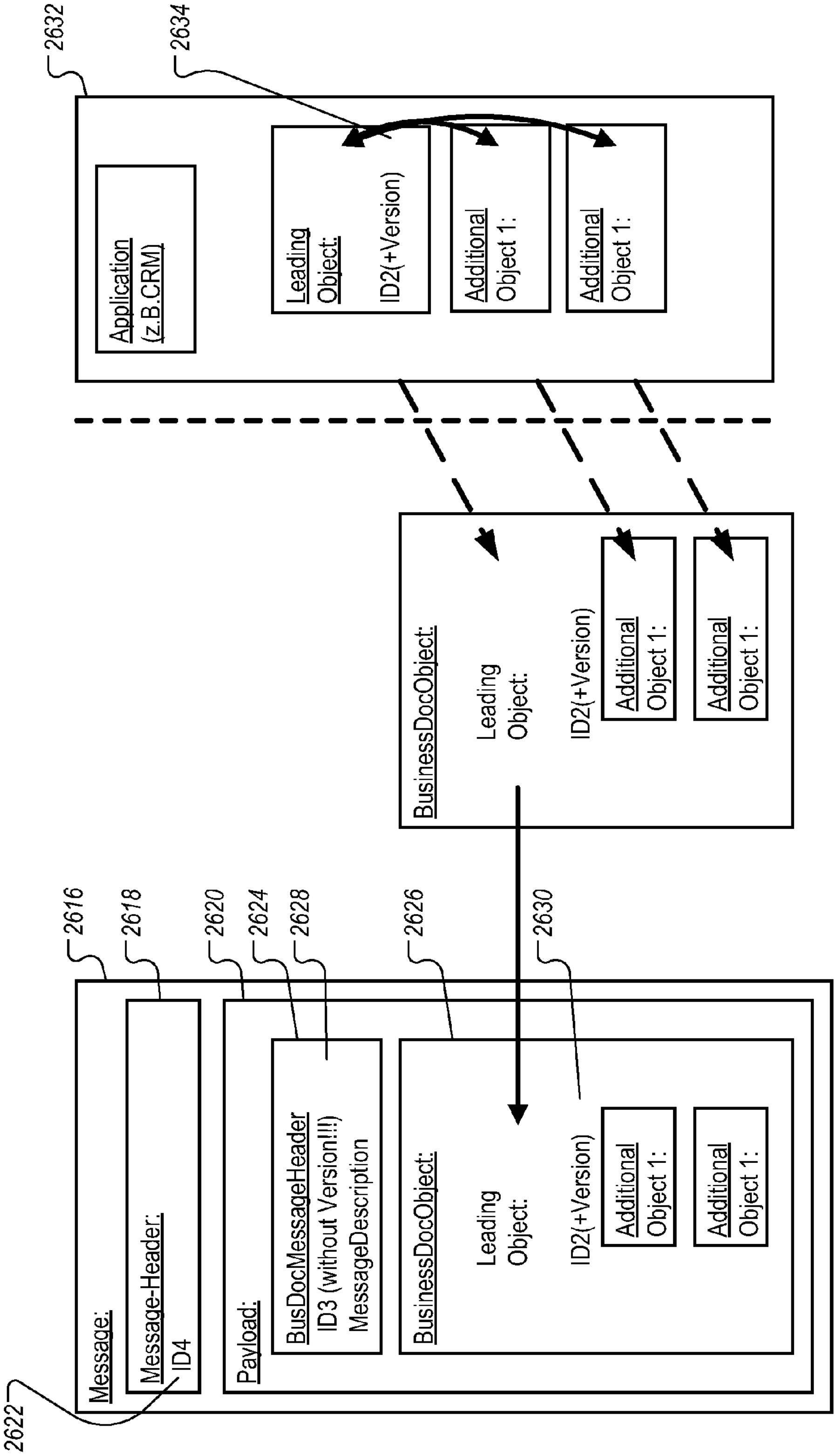
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
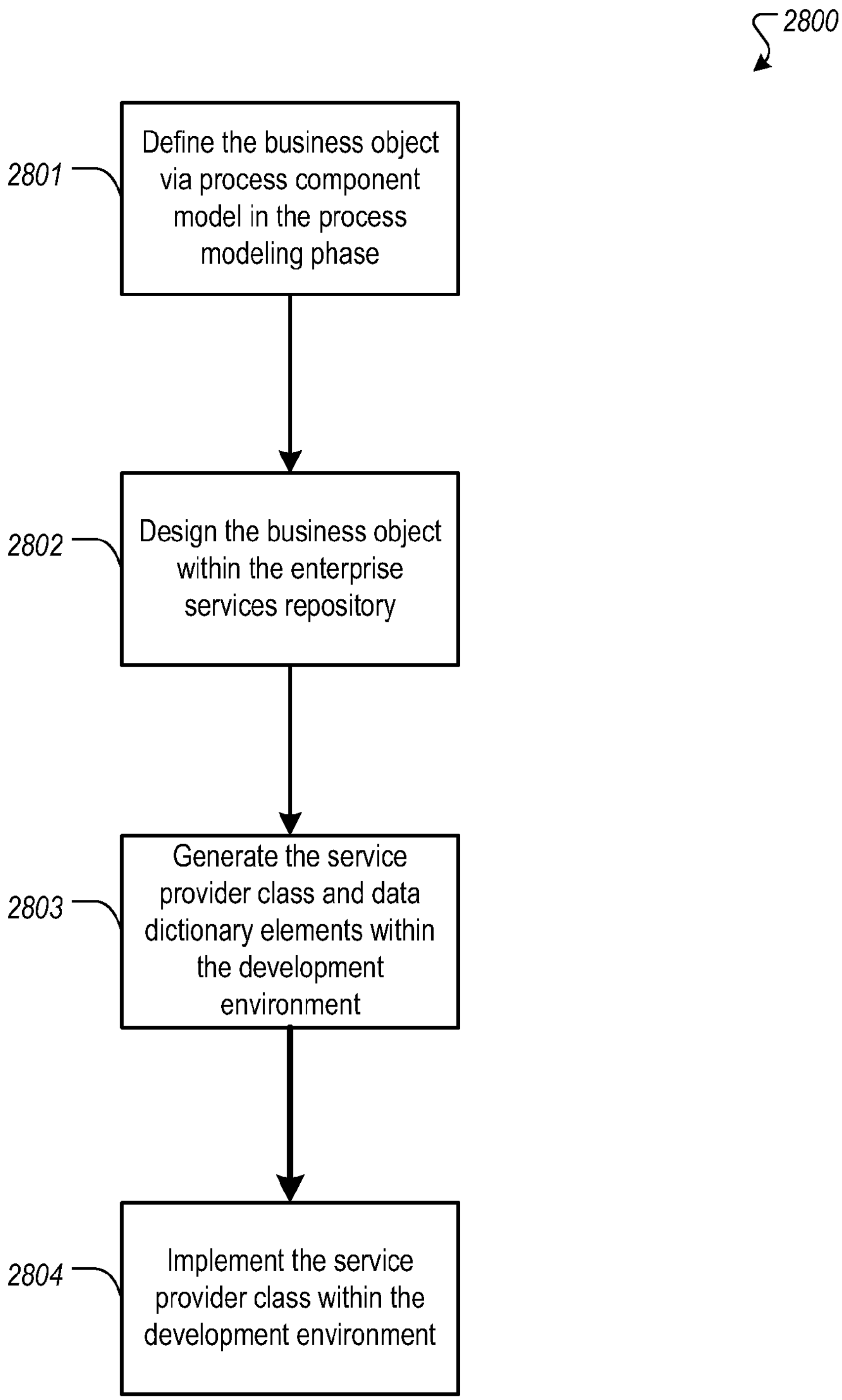
FIG. 28 illustrates an example method for service enabling in accordance with one embodiment of the present disclosure.
Figure 29:
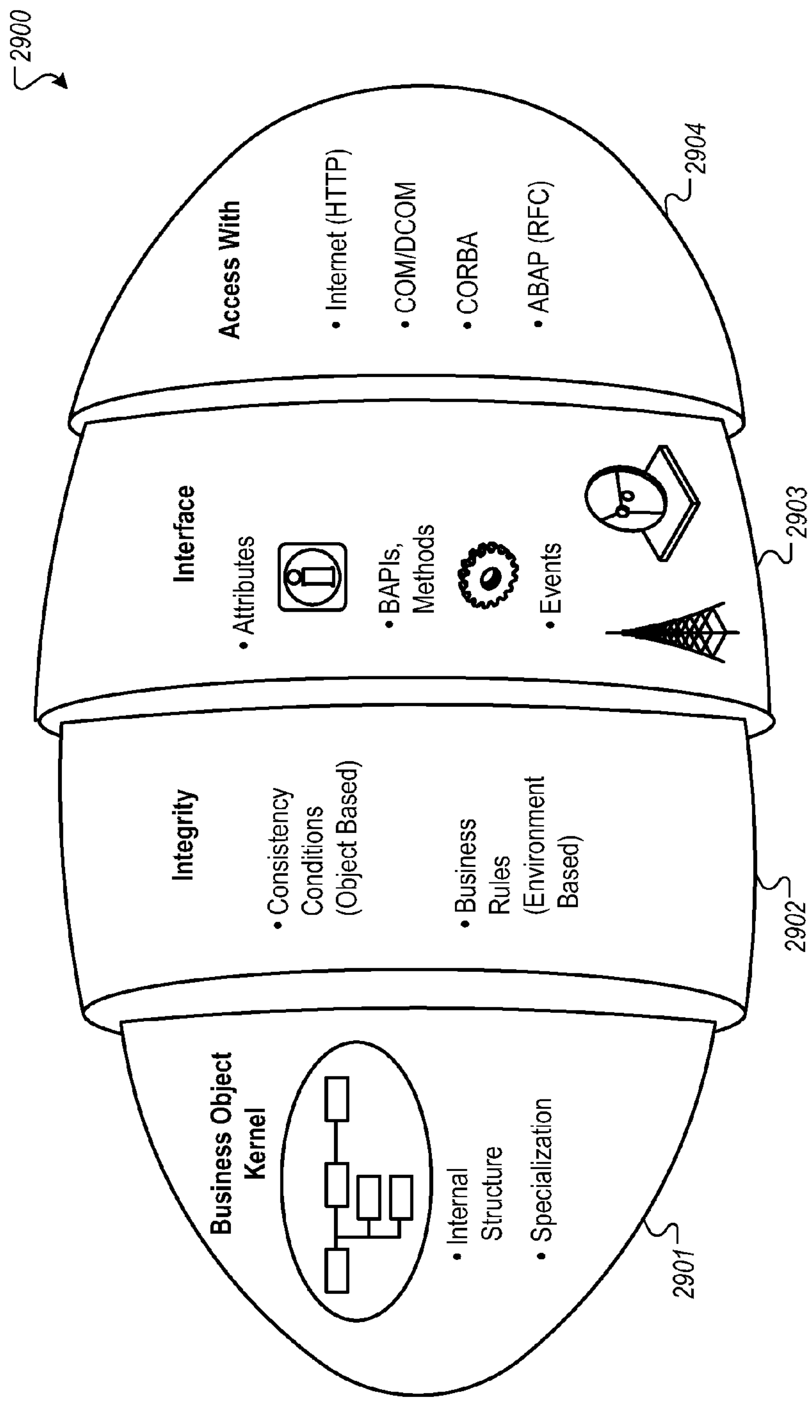
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
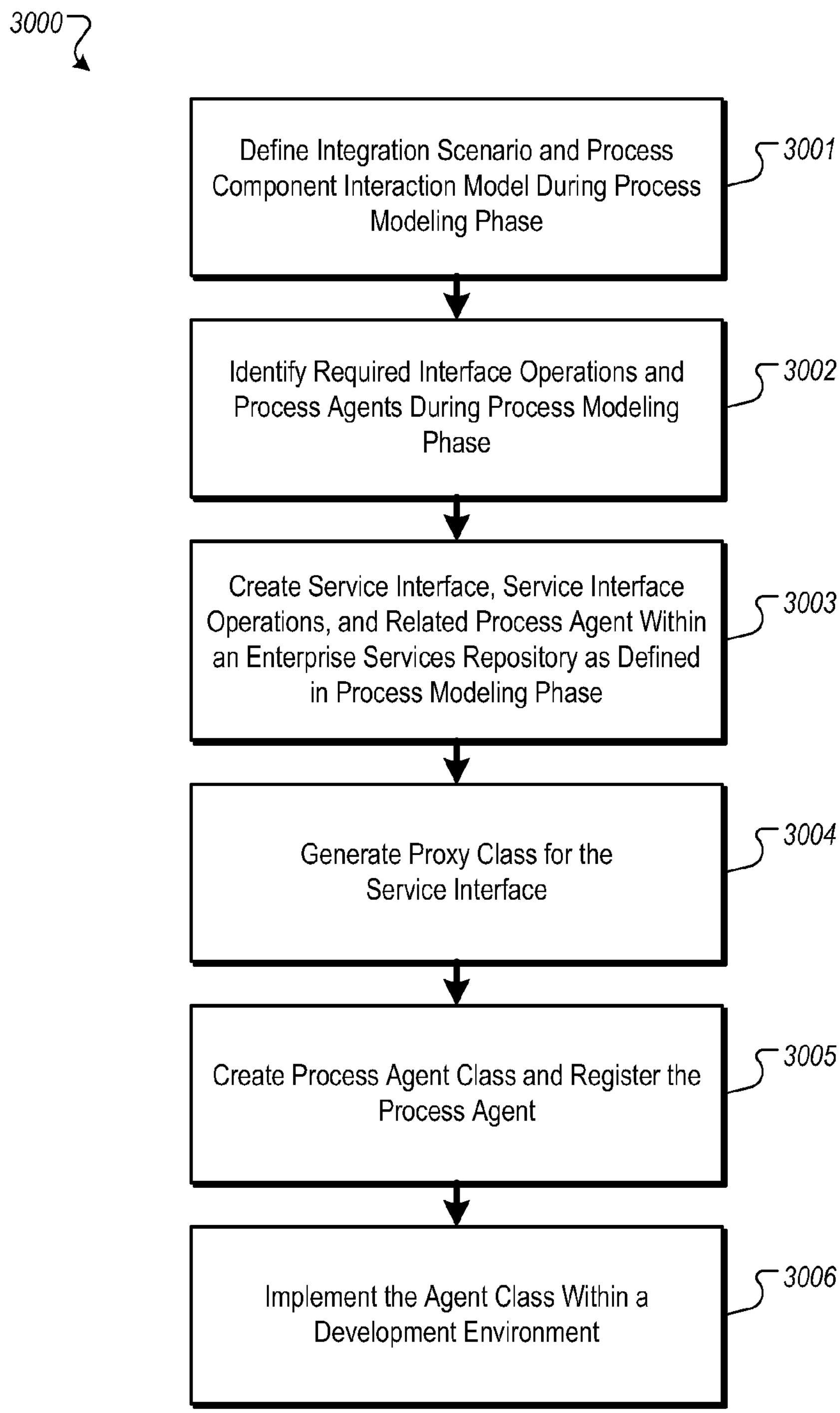
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
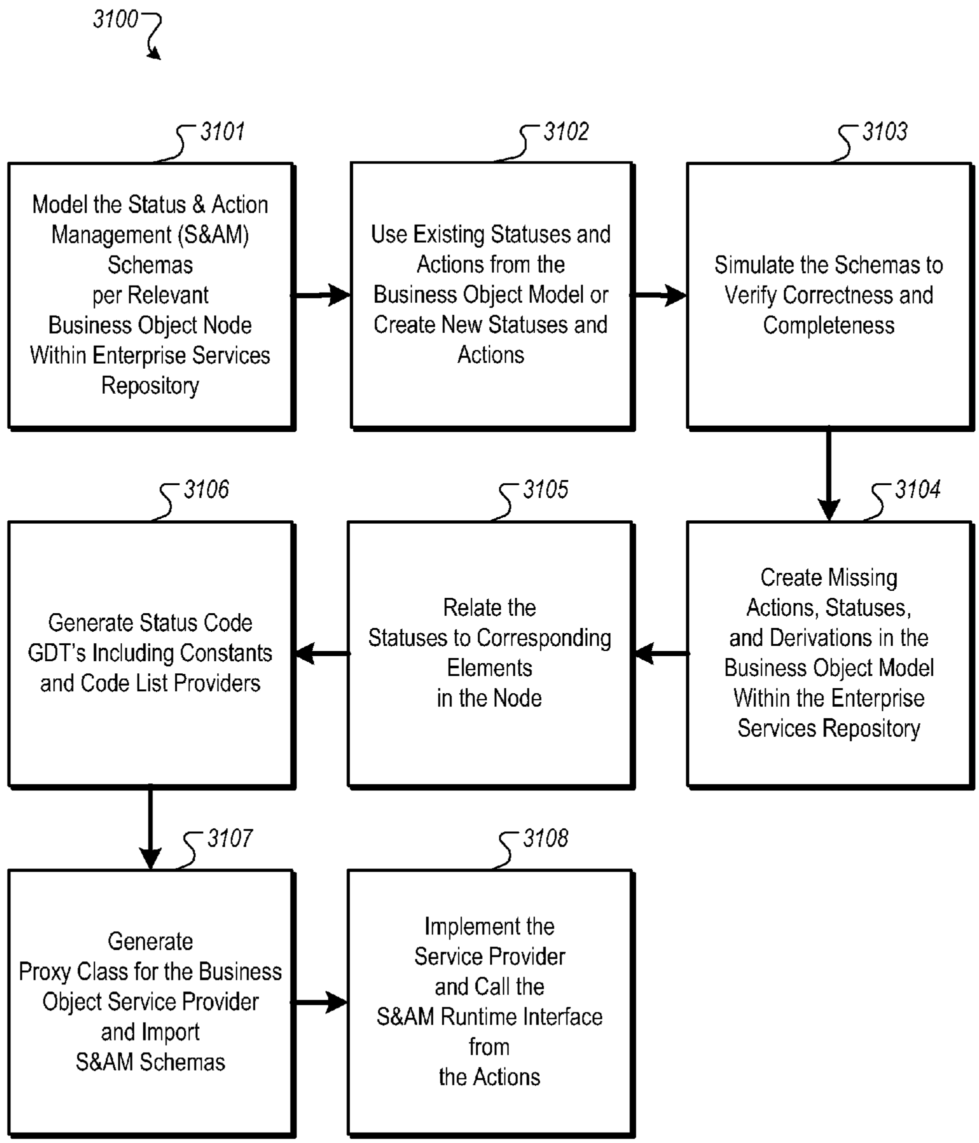
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figures 1, 32:
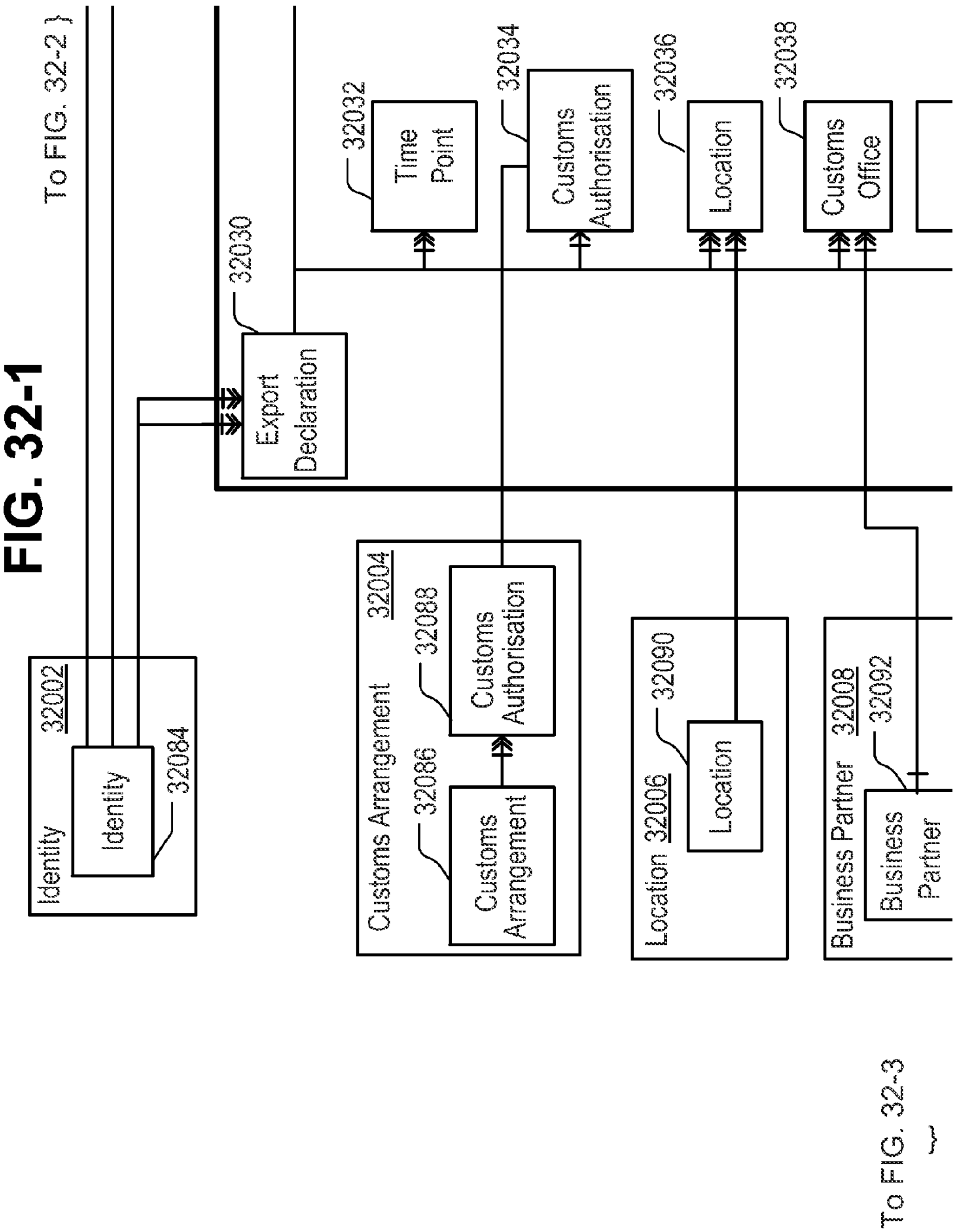
Figures 2, 32:
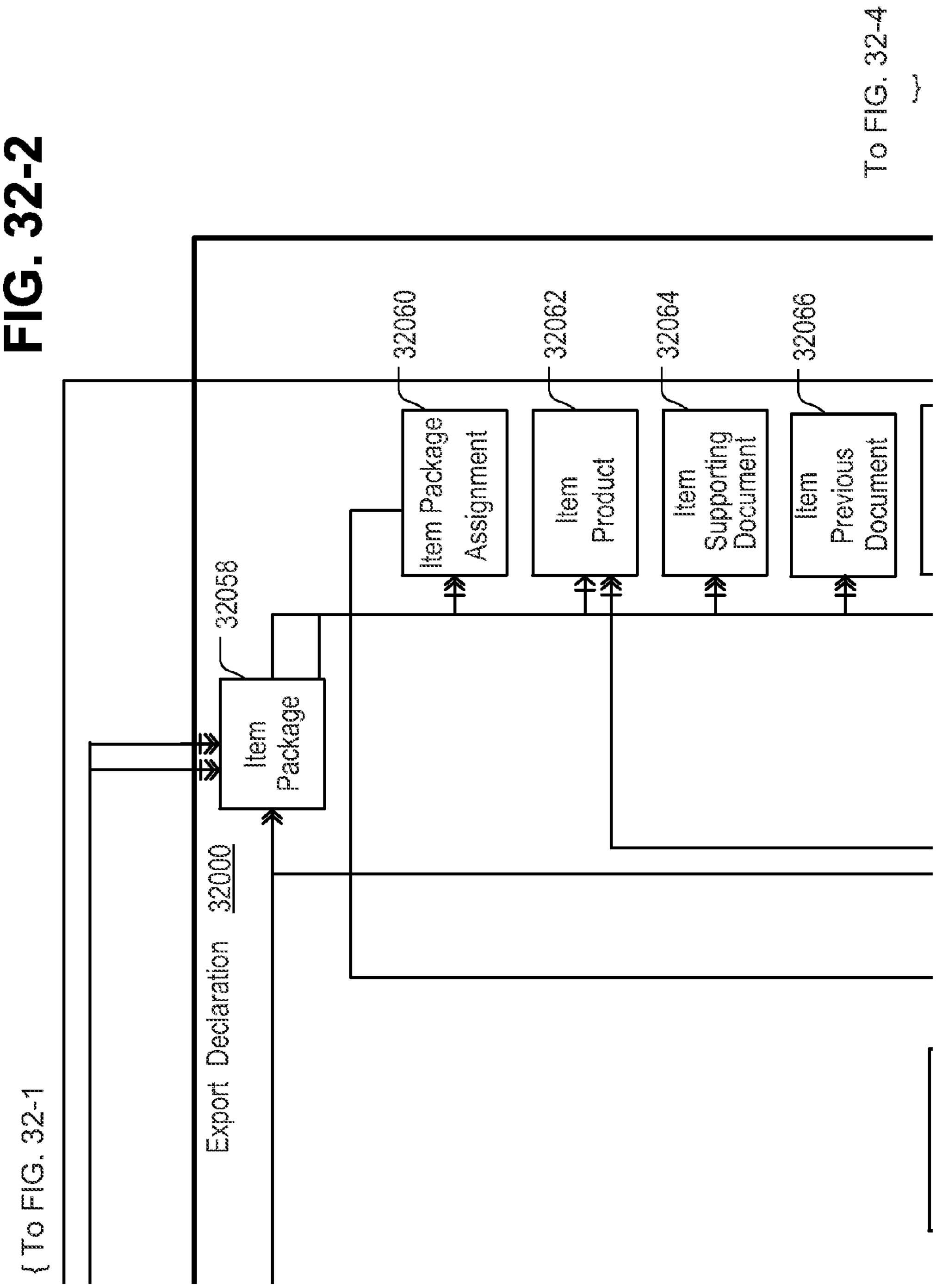
Figures 3, 32:
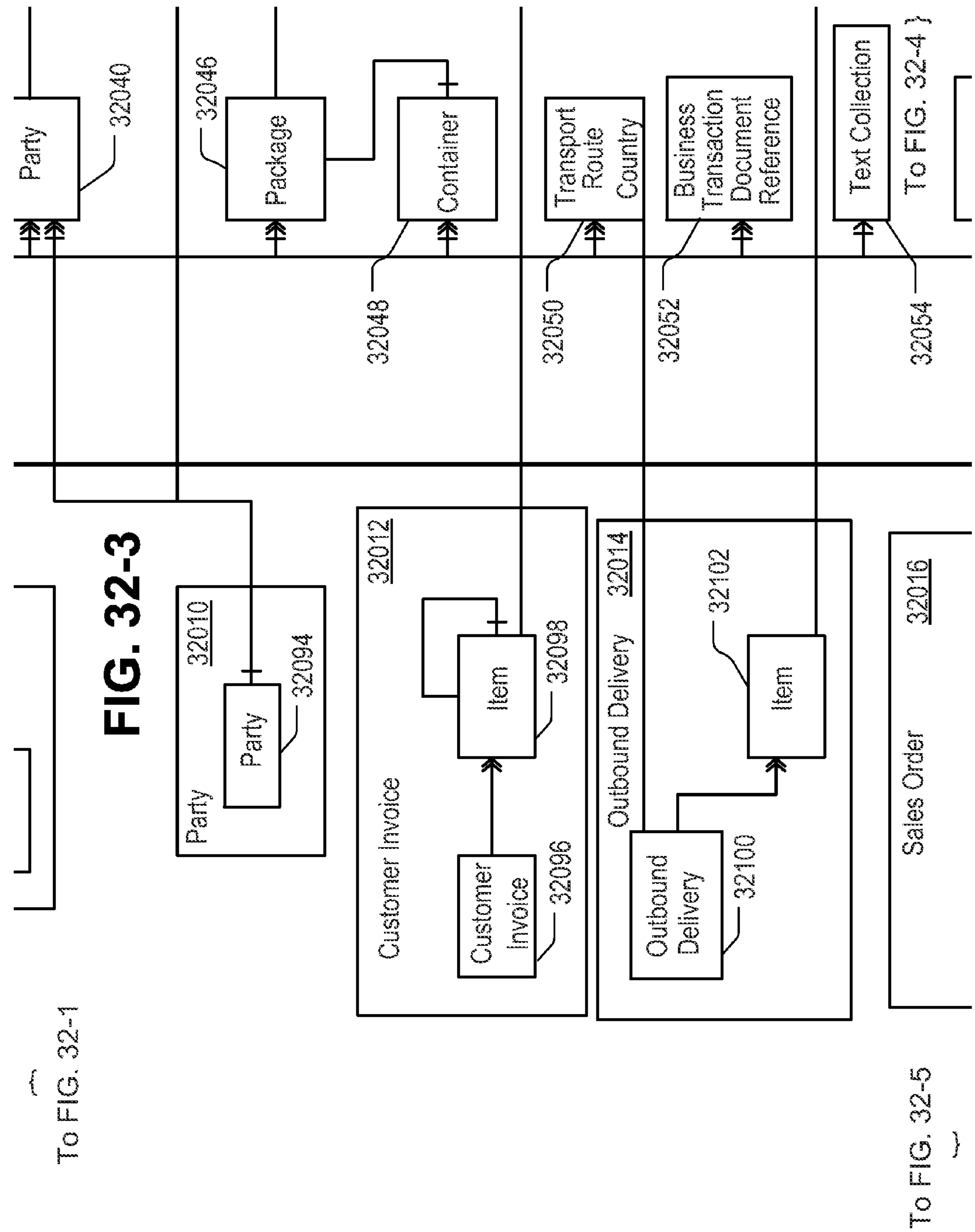
Figures 4, 32:
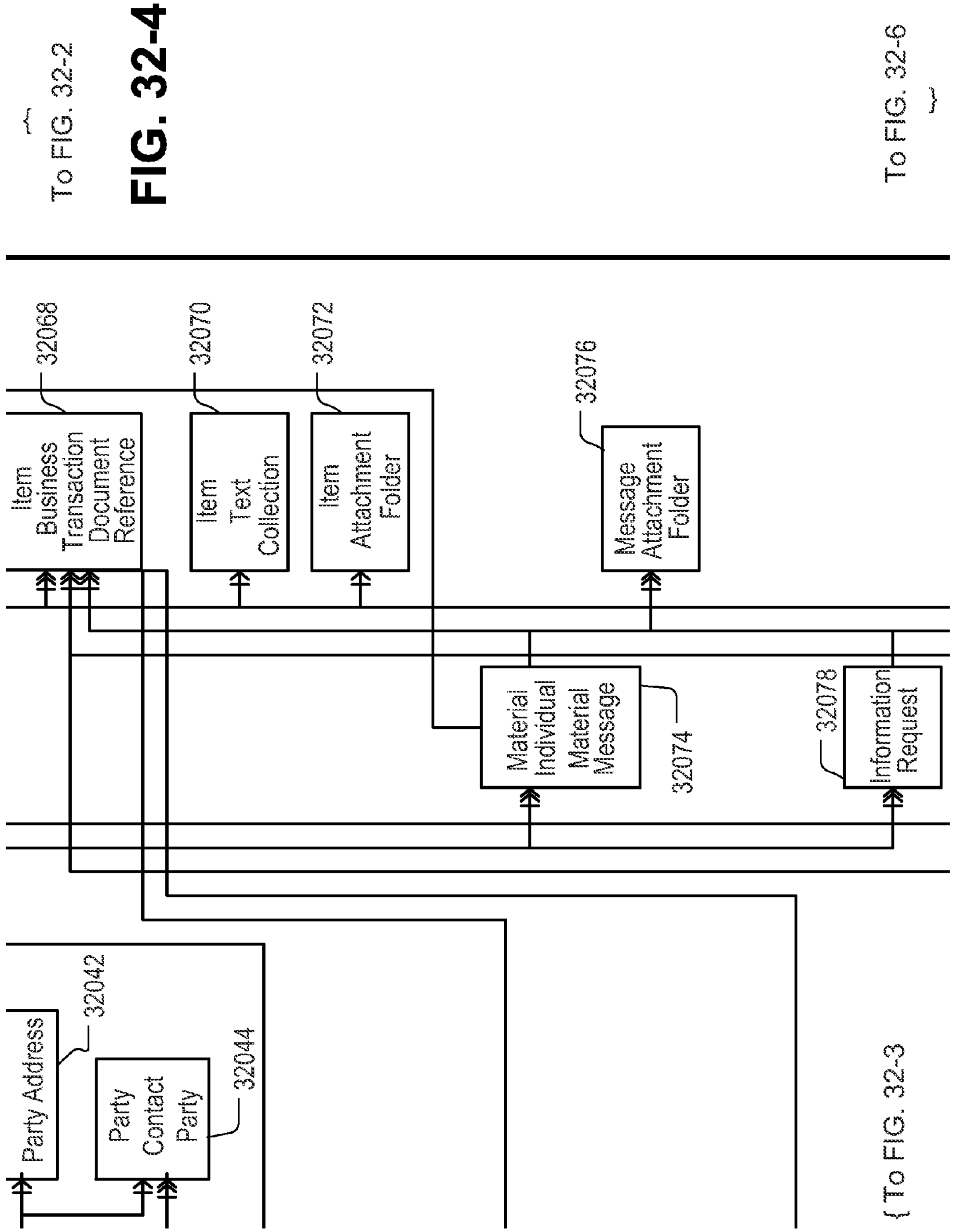
Figures 5, 32:
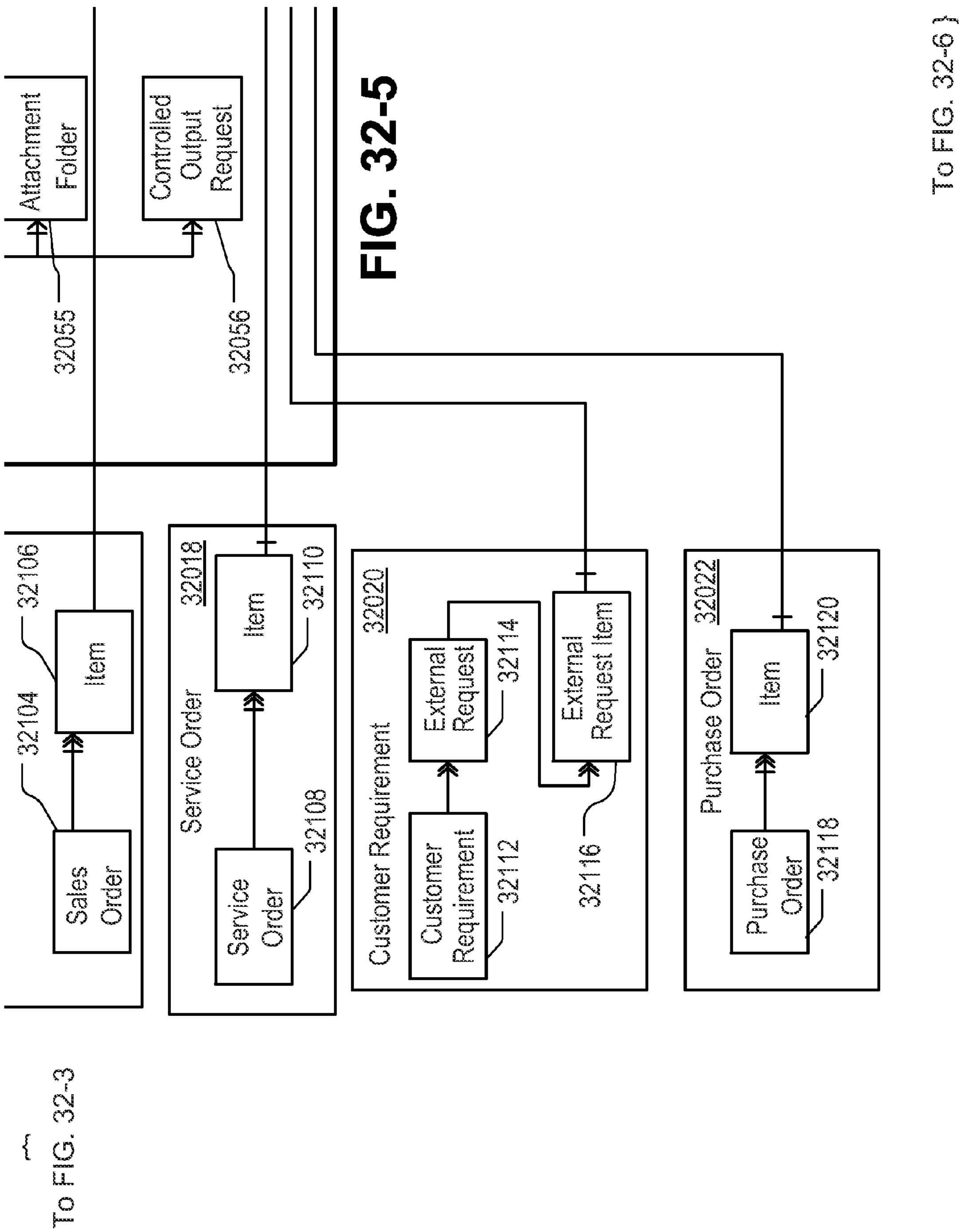
Figures 6, 32:
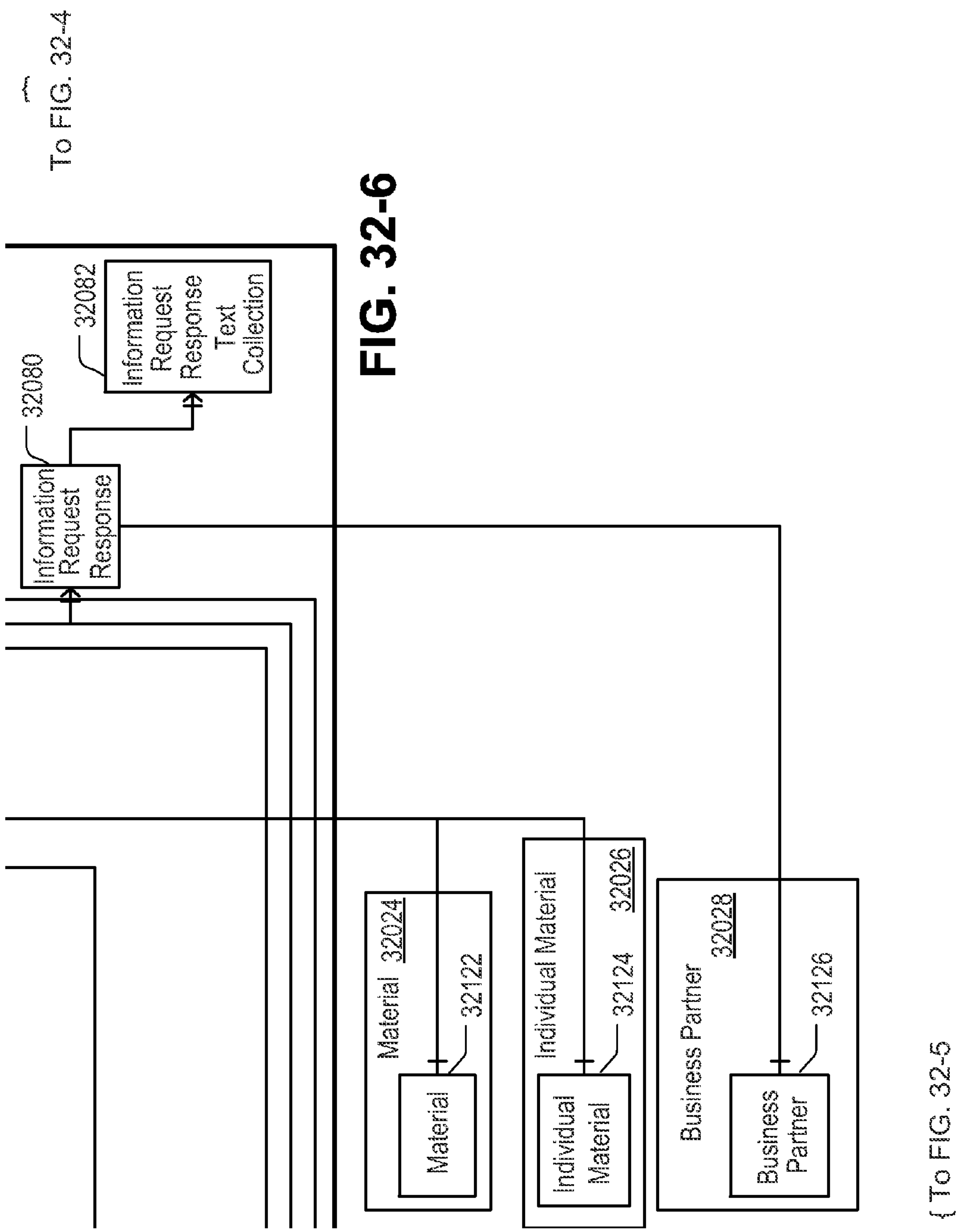

FIGS. 32-1 through 32-6 depict an example object model for a business object Export Declaration 32000. The business object 32000 has relationships with other objects 32002-32028, as shown with lines and arrows. The business object 32000 hierarchically comprises elements 32030-32082. The other objects 32002-32028 include respective elements 32084-32126 as shown.

The business object Export Declaration is a declaration to a customs authority for exporting goods according to legal requirements. The business object Export Declaration belongs to the process component Customs Processing. An export declaration can be a text file including customs-relevant data in EDIFACT (Electronic Data Interchange For Administration, Commerce and Transport) format, which may be sent to a customs authority using a communication method (e.g. x.400). An export declaration includes business transaction databout goods that are transported out of a customs territory, for example, quantities, values, and other customs-relevant information. The business object Export Declaration is involved in the following Process Component Interaction Models: Customs Message Exchange Server at Communication Partner_Customs Processing, Customs Processing at Customs Authority_Customs Processing_EP Notification, Customs Processing at Customs Authority_Customs Processing_EPI Requesting, Customs Processing at Customs Authority_Customs Processing_Error Notification, Customs Processing_Customs Processing at Customs Authority_ED Processing, and Customs Processing_Customs Processing at Customs Authority_Form ED Fallback Proc.

The business object Export Declaration can include a root node Export Declaration, which may be time dependent on Time Point. Goods to be exported are described by items. The root node gives information about an export procedure. The elements located directly at the node Export Declaration are defined by the data type ExportDeclarationElements. These elements include: UUID, ID, CustomsAuthorityCountryCode, TypeCode, ExportTypeCode, CustomsProcessID, CustomsProcessPartyID, ExportDestinationCountryCode, ExportSpecialCircumstancesCode, ExportTransportCostPaymentFormCode, ExportPartyRepresentationCode, ItemTotalNumberValue, InconsistentItemsTotalNumberValue, TotalpackageNumberValue, TotalGrossWeightQuantity, TotalGrossWeightQuantityTypeCode, ShortfallIndicator, ExportExitConfirmationMethodCode, ConsignmentExportID, InlandExportTransportModeCode, CrossBorderExportTransportModeCode, CrossBorderExportTransportMeansTypeCode, CrossBorderTransportMeansID, ExportCrossBorderTransportMeansNationalityCode, ExportBusinessTransactionTypeCode, InvoiceTotalNetAmount, ExportIncotermsClassificationCode, ExportIncotermsClassificationDescription, IncotermsTransferLocationName, Status, CustomsProcessingStatusCode, CustomsExportSoftwareVersionCode, SystemAdministrativeData, ApplicationLogID, ApplicationLogUUID, CustomsFallbackProcedureIncidentID, MainTestCaseID, and SubTestCaseID. UUID may be an alternative key, is an internally assigned globally unique identifier of an ExportDeclaration, and may be based on datatype GDT: UUID. ID may be an alternative key, is an internally assigned identifier for an ExportDeclaration, may be unique in a context of a deployment unit, and may be based on datatype GDT: BusinessTransactionDocumentID. CustomsAuthorityCountryCode is a country to whose customs authority an export declaration was or will be submitted, and may be based on datatype GDT: CountryCode, with a qualifier of CustomsAuthority. TypeCode is a type of an export declaration, and may be based on datatype GDT: ExportDeclarationTypeCode. Examples for an export declaration type are complete export declaration, incomplete export declaration, and supplementary export declaration. ExportTypeCode is a type of an export, and may be based on datatype GDT: ExportTypeCode. CustomsProcessID is an identifier for an export, may be assigned internally, and may be based on datatype GDT: CustomsProcessID. CustomsProcessPartyID is an identifier for an export, may be assigned by an external party, and may be based on datatype GDT: CustomsProcessID, with a qualifier of Party. CustomsProcessCustomsAuthorityID is an identifier for an export, may be assigned by a customs authority, and may be based on datatype GDT: CustomsProcessID, with a qualifier of Customs Authority. ExportExportingCountryCode is a country from which goods are exported, and may be based on datatype GDT: ExportExportingCountryCode. The ExportExportingCountryCode can differ from the CustomsAuthorityCountryCode, such as for cases (e.g., in the European Union) in which an export is declared in one country but the goods ship from another country. ExportDestinationCountryCode is a destination country of an export, and may be based on datatype GDT: ExportDestinationCountryCode. ExportSpecialCircumstancesCode documents circumstances that accompany an export, and may be based on datatype GDT: ExportSpecialCircumstancesCode. Special circumstances are a collection of highly diverse concepts that can have great impact on an export approval process, for example "exporting" operating equipment for an aircraft to international airspace, or an involvement of a highly privileged Authorised Economic Operator (AEO). ExportTransportCostPaymentFormCode is a payment form of a transport cost for an export, and may be based on datatype GDT: ExportTransportCostPaymentFormCode. Examples for a payment form are cash or cheque. ExportPartyRepresentationCode is a representation situation of parties, and may be based on datatype GDT: ExportPartyRepresentationCode. ExportPartyRepresentationCode specifies if parties are represented by other parties, and if so, which party is represented by whom. ItemTotalNumberValue is a total number of items in an export declaration, and may be based on datatype GDT: NumberValue, with a qualifier of Total. InconsistentItemsTotalNumberValue is a total number of inconsistent items in an export declaration, and may be based on datatype GDT: NumberValue, with a qualifier of Total. TotalpackageNumberValue is a total number of packages in an export declaration, and may be based on datatype GDT: NumberValue, with a qualifier of package. TotalGrossWeightQuantity is a total gross weight of export goods, and may be based on datatype GDT: Quantity, with a qualifier of Weight. Gross weight includes a weight of all items and packages. TotalGrossWeightQuantityTypeCode is a type of TotalGrossWeight- Quantity, and may be based on datatype GDT: QuantityTypeCode, with a qualifier of Weight. ShortfallIndicator indicates whether there is a quantity shortfall, and may be based on datatype GDT: Indicator, with a qualifier of Shortfall. Quantity shortfall in this context means that a quantity of goods that left a customs territory is smaller than the quantity announced earlier in an export declaration. A shortfall may be reported by a customs office that monitors an exit of goods at a border. ExportExitConfirmationMethodCode is a method used to give an exit confirmation, and may be based on datatype GDT: ExportExitConfirmationMethodCode. An exit confirmation can, for example, be received electronically or in paper. ConsignmentExportID is a unique identifier of a consignment, may be used to reference an export to external parties, and may be based on datatype GDT: ConsignmentExportID. Examples for a consignment identifier are a shipment document identifier and the Unique Consignment Reference (UCR). InlandExportTransportModeCode is a transport mode used for transporting export goods inland, to a location where the goods are presented to a customs authority, and may be based on datatype GDT: ExportTransportModeCode, with a qualifier of Inland. CrossBorderExportTransportModeCode is a transport mode used for transporting export goods across a border, and may be based on datatype GDT: ExportTransportModeCode, with a qualifier of CrossBorder. CrossBorderExportTransportMeansTypeCode is a transport means used to transport export goods across a border, and may be based on datatype GDT: ExportTransportMeansTypeCode, with a qualifier of CrossBorder. CrossBorderTransportMeansID is an identifier of a transport vehicle used to transport export goods across a border, and may be based on datatype GDT: TransportMeansID_V1, with a qualifier of CrossBorder. ExportCrossBorderTransportMeansNationalityCode is a nationality of a transport means used to transport export goods across a border, and may be based on datatype GDT: ExportCrossBorderTransportMeansNationalityCode. ExportBusinessTransactionTypeCode is a type of business transaction that underlies an export, and may be based on datatype GDT: ExportBusinessTransactionTypeCode. Examples for a type of business transaction are sale and return of goods. InvoiceTotalNetAmount is a total net amount invoiced for an export, and may be based on datatype GDT: Amount, with a qualifier of Net. ExportIncotermsClassificationCode is delivery terms of an export, and may be based on datatype GDT: ExportIncotermsClassificationCode. Examples for delivery terms are factory, duty paid, and duty unpaid. ExportIncotermsClassificationDescription is a description of delivery terms, and may be based on datatype GDT: LANGUAGEINDEPENDENT_MEDIUM_Description, with a qualifier of ExportIncotermsClassification. ExportIncotermsClassificationDescription may be a representation of information given by an ExportIncotermsClassificationCode, in natural language. IncotermsTransferLocationName is a location to which delivery terms apply, and may be based on datatype GDT: MEDIUM_Name. Status is a status of an export declaration, and may be based on datatype BOIDT: ExportDeclarationStatus. CustomsProcessingStatusCode is a processing status of an export declaration at a customs authority, may be based on datatype GDT: ExportDeclarationCustomsProcessingStatusCode, and may be reported by a customs authority. CustomsExportSoftwareVersionCode is a version of export software of a customs authority that was active for an ExportDeclaration during a last action on a business object, and may be based on datatype GDT: CustomsExportSoftwareVersionCode. The version may be determined from an associated CustomsArrangement. SystemAdministrativeData is a Administrative data on a business object node, and may be based on datatype GDT: SystemAdministrativeData. ApplicationLogID is an identifier for an application log associated with an export declaration, and may be based on datatype GDT: ApplicationLogID. ApplicationLogUUID is a universally unique identifier for an application log associated with an export declaration, and may be based on datatype GDT: UUID. CustomsFallbackProcedureIncidentID is an identifier for an incident for which a fallback procedure for communication with a customs authority is used, and may be based on datatype GDT: CustomsFallbackProcedureIncidentID. MainTestCaseID is an identifier for a main test case an ExportDeclaration is used for, and may be based on datatype GDT: TestCaseID. SubTestCaseID is an identifier for a sub test case an ExportDeclaration is used for, and may be based on datatype GDT: TestCaseID.

The following composition relationships to subordinate nodes may exist: Item with a cardinality of 1:N, Time Point with a cardinality of 1:CN, Customs Authorisation with a cardinality of 1:C, Location with a cardinality of 1:CN, Customs Office with a cardinality of 1:CN, Party with a cardinality of 1:CN, Package with a cardinality of 1:CN, Container with a cardinality of 1:CN, Message with a cardinality of 1:CN, Transport Route Country with a cardinality of 1:CN, Business Transaction Document Reference with a cardinality of 1:CN, Text Collection with a cardinality of 1:C, Information Request with a cardinality of 1:CN, Attachment Folder with a cardinality of 1:C, and Controlled Output Request with a cardinality of 1:C. A Creation Identity inbound association relationship may exist from the business object Identity/node Identity, with a cardinality of 1:CN, which represents an identity that created an export declaration. A Last Changed Identity inbound association relationship may exist from the business object Identity/node Identity, with a cardinality of 1:CN, which represents an identity that last changed an export declaration. A OutboundDeliveryReference specialization association for navigation may exist to node BusinessTransactionDocumentReference, with a target cardinality of C. The following association may exist to node Party: ExporterParty, with a target cardinality of; DeclarantParty, with a target cardinality of 1, ProductRecipientParty, with a target cardinality of 1; RepresentativeDeclarantParty, with a target cardinality of C; SubContractingParty, with a target cardinality of C; and MessageExchangeServiceProviderParty, with a target cardinality of C. The following associations may exist to the node CustomsOffice: ExportCustomsOffice, with a target cardinality of C; SupplementaryExportCustomsOffice, with a target cardinality of C; PlannedExitCustomsOffice, with a target cardinality of C; and ExitCustomsOffice, with a target cardinality of C. A PresentationLocation association may exist to node Location, with a target cardinality of C. The following associations may exist to node TimePoint: PresentationToCustomsStartTimePoint, with a target cardinality of C; PresentationToCustomsEndTimePoint, with a target cardinality of C; and IssueTimePoint, with a cardinality of C. An ExportCustomsAuthorisation association may exist to node CustomsAuthorisation, with a target cardinality of C. In some implementations, a representation situation specified by ExportPartyRepresentationCode may be consistent with the parties in an export declaration. In some implementations, each location role appears only once per export declaration.

The following enterprise service infrastructure actions may be associated with Export Declaration: SwitchToFallbackProcedure, SwitchToStandardProcedure, Block, Unblock, RequestIssue, NotifyOfIssue, RequestAcceptance NotifyOfAcceptanceRejection, NotifyOfAcceptance, NotifyOfPartlyApproval, NotifyOfApproval, NotifyOfApproval- Rejection, NotifyOfFallbackApprovalRejection, NotifyOfRelease, NotifyOfReleaseRejection, NotifyOfFallbackReleaseRejection, NotifyOfExitConfirmation, NotifyOfFallbackExitConfirmation, Cancel, RevokeCancellation, RequestCancellation, NotifyOfCancellationDiscard, and NotifyOfCancellationCompletion. The SwitchToFallbackProcedure action may be used to designate a fallback procedure as a current customs procedure. The SwitchToFallbackProcedure may have a precondition that a Customs Procedure is in a status of "Standard". In response to the SwitchToFallbackProcedure action, a status variable Customs Procedure may be set to "Fallback."

The SwitchToStandardProcedure action may be used to designate a standard procedure as a current customs procedure. The SwitchToStandardProcedure action may have a precondition that a Customs Procedure is in status "Fallback". In response to the SwitchToStandardProcedure action, a Customs Procedure may be set to "Standard". The Block action prohibits the issuing of an Export Declaration. The Block action may have preconditions that Issue Blocking is in status "Not Blocked" and Export Declaration Issuing is in status "Not Issued". In response to the Block action, Issue Blocking may be set to "Blocked". The Unblock action allows the issuing of an Export Declaration. The Unblock action may have a precondition that Issue Blocking is in status "Blocked". In response to the Unblock action, Issue Blocking may be set to "Not Blocked". The RequestIssue action requests that an Export Declaration be issued. The Request action may have preconditions that Issue Blocking is in status "Not Blocked", that Consistency is in status "Consistent", and that Export Declaration Issuing is in status "Not Issued" or "Issued" while Customs Procedure is in status "Fallback". In response to the Request action, Export Declaration Issuing may be set to "Issue Requested". The NotifyOfIssue action states that an Export Declaration was successfully issued. The NotifyOfIssue action is an agent action, and may have a precondition that Export Declaration Issuing is in status "Issue Requested". In response to the NotifyOfissue action, Export Declaration Issuing may be set to "Issued". The RequestAcceptance action requests acceptance of an Export Declaration from a customs authority. The RequestAcceptance action may have preconditions that Export Declaration Acceptance is in status "Not Requested" or "Rejected", that Customs Procedure is in status "Standard", and that Export Declaration Issuing is in status "Issued". In response to the RequestAcceptance action, Export Declaration Acceptance may be set to "Acceptance Requested". The NotifyOfAcceptanceRejection action states that a customs authority rejected acceptance of an Export Declaration. The NotifyOfAcceptanceRejection may have preconditions that Export Declaration Acceptance is in status "Acceptance Requested", that Customs Procedure is in status "Standard", and that Export Declaration Issuing is in status "Issued". In response to the NotifyOfAcceptanceRejection action, Export Declaration Acceptance may be set to "Rejected". The NotifyOfAcceptance action states that an issue of an export declaration was accepted by a customs authority. The NotifyOfAcceptance action may have preconditions that Export Declaration Acceptance is in status "Acceptance Requested", that Customs Procedure is in status "Standard", and that Export Declaration Issuing is in status "Issued". In response to the NotifyOfAcceptance action, Export Declaration Acceptance may be set to "Accepted". The NotifyOfPartlyApproval action states that a customs authority generally but partly approved an export. The NotifyOfPartlyApproval action may have preconditions that Export Approval is in status "Not Approved", and that Export Declaration Acceptance is in status "Accepted". In response to the NotifyOfPartlyApproval action, Export Approval may be set to "Partly Approved". The NotifyOfApproval action states that a customs authority approved an export. The NotifyOfApproval action may have preconditions that Export Approval is in status "Not Approved" and that Export Declaration Acceptance is in status "Accepted". In response to the NotifyOfApproval action, Export Approval may be set to "Approved". The NotifyOfApprovalRejection action states that a customs authority rejected an export using a standard procedure. The NotifyOfApprovalRejection may have preconditions that Export Approval is in status "Not Approved" and that Export Declaration Acceptance is in status "Accepted". In response to the NotifyOfApprovalRejection action, Export Approval may be set to "Rejected". The NotifyOfFallbackApprovalRejection action states that a customs authority rejected an export in a fallback procedure. The NotifyOfFallbackApprovalRejection action may have preconditions that Export Approval is in status "Not Approved", that Export Declaration Issuing is in status "Issued", and that Customs Procedure is in status "Fallback". In response to the NotifyOfFallbackApprovalRejection action, Export Approval may be set to "Rejected". The NotifyOfRelease action states that a customs authority released an export completely. The NotifyOfRelease action may have preconditions that Export Release is in status "Not Released", and that Export Declaration Acceptance is in status "Accepted". In response to the NotifyOfRelease action, Export Release may be set to "Released". The NotifyOfReleaseRejection action states that a customs authority rejected a release of an export in a standard procedure. The NotifyOfReleaseRejection may have preconditions that Export Release is in status "Not Released" and that Export Declaration Acceptance is in status "Accepted". In response to the NotifyOfReleaseRejection action, Export Release may be set to "Rejected". The NotifyOfFallbackReleaseRejection action states that a customs authority rejected the release of an export in fallback procedure. The NotifyOfFallbackReleaseRejection may have preconditions that Export Release is in status "Not Released", that Export Declaration Issuing is in status "Issued", and that Customs Procedure is in status "Fallback". In response to the NotifyOfFallbackReleaseRejection action, Export Release may be set to "Rejected". The NotifyOfExitConfirmation action states that a customs authority confirmed in standard procedure that export goods have left a customs territory. The NotifyOfFallbackReleaseRejection action may have preconditions that Export Exit Confirmation is in status "Not Confirmed" and that Export Declaration Acceptance is in status "Accepted". In response to the NotifyOfFallbackReleaseRejection action, Export Exit Confirmation may be set to "Confirmed". The NotifyOfFallbackExitConfirmation action states that a customs authority confirmed in fallback procedure that export goods have left a customs territory. The NotifyOfFallbackExitConfirmation may have preconditions that Export Exit Confirmation is in status "Not Confirmed", that Export Declaration Issuing is in status "Issued", and that Customs Procedure is in status "Fallback". In response to the NotifyOfFallbackExitConfirmation action, Export Exit Confirmation may be set to "Confirmed". The Cancel action cancels an Export Declaration. The Cancel action may have preconditions that Cancellation is in status "Not Canceled", and that if Customs Procedure is in status "Standard", then Export Declaration Issuing is in status "Not Issued". In response to the Cancel action, Cancellation may be set to "Canceled". The RevokeCancellation action reverts the cancellation of an Export Declaration. The RevokeCancellation action may have a precondition that Cancellation is in status "Canceled". In response to the RevokeCancellation action, Cancellation may be set to “Not Canceled”. The RequestCancellation action sends a cancellation request to a customs authority. The RequestCancellation action may have preconditions that Customs Authority Cancellation is in status “Not Canceled”, that Export Declaration Acceptance is in status “Accepted”, and that Customs Procedure is in status “Standard”. In response to the RequestCancellation action, Customs Authority Cancellation may be set to “Cancellation Requested”. The NotifyOfCancellationDiscard action states that a customs authority rejected a cancellation request. The NotifyOfCancellationDiscard action may have a precondition that Customs Authority Cancellation is in status “Cancellation Requested”. In response to the NotifyOfCancellationDiscard action, Customs Authority Cancellation may be set to “Cancellation Discarded”. The NotifyOfCancellationCompletion action states that a customs authority approved a cancellation request. The NotifyOfCancellationCompletion action may have a precondition that Customs Authority Cancellation is in status “Not Canceled” or “Cancellation Requested”. In response to the NotifyOfCancellationCompletion action, Customs Authority Cancellation may be set to “Canceled.”

A Select All query provides the NodeIDs of all instances of a node and may be used to enable an initial load of data for a Fast Search Infrastructure. A Query By Elements query provides a list of all Export Declarations found based upon given parameters. The query elements are defined by the data type ExportDeclarationElementsQueryElements. These elements include: UUID, ID, CustomsProcessID, CustomsProcessCustomsAuthorityID, SystemAdministrativeData, CreationDateTime, CreationIdentityUUID, CreationIdentityID, CreationIdentityBusinessPartnerInternalID, CreationIdentityBusinessPartnerPersonFamilyName, CreationIdentityBusinessPartnerPersonGivenName, CreationIdentityEmployeeID, LastChangeDateTime, LastChangeIdentityUUID, LastChangeIdentityID, LastChangeIdentityBusinessPartnerInternalID, LastChangeIdentityBusinessPartnerPersonFamilyName, LastChangeIdentityBusinessPartnerPersonGivenName, LastChangeIdentityEmployeeID, CustomsAuthorityCountryCode, CustomsExportSoftwareVersionCode, TypeCode, ExportTypeCode, ExportExportingCountryCode, ExportDestinationCountryCode, PartyKey, PartyTypeCode, PartyID, PartyRoleCategoryCode, CustomsAuthorisationInternalID, BusinessTransactionDocumentReference, LifecycleStatusCode, ConsistencyStatusCode, InformationRequestStatusCode, CustomsProcedureStatusCode, and CustomsAuthorityCancellationStatusCode.

UUID may be optional, may be an alternative key, is an internally assigned globally unique identifier of an ExportDeclaration, and may be based on datatype GDT: UUID. ID may be optional, may be an alternative key, is an internally assigned identifier for an ExportDeclaration, unique in a context of this deployment unit, and may be based on datatype GDT: BusinessTransactionDocumentID. CustomsProcessID is an identifier of an export, may be assigned internally, and may be based on datatype GDT: CustomsProcessID. CustomsProcessCustomsAuthorityID is an identifier of an export, may be assigned by a customs authority, and may be based on datatype GDT: CustomsProcessID. SystemAdministrativeData is Administrative data on a business object node, and may be based on datatype QueryIDT: QueryElementSystemAdministrativeData. CreationDateTime is a point in time date and time stamp of a creation, and may be based on datatype GDT: GLOBAL_DateTime. CreationIdentityUUID is a globally unique identifier for an identity who performed a creation, and may be based on datatype GDT: UUID. CreationIdentityID is an identifier for an identity who performed a creation, and may be based on datatype GDT: IdentityID. CreationIdentityBusinessPartnerinternalID is a proprietary identifier for a business partner that is attributed to a creation identity and that can be reached following the relationships of a creation identity, and may be based on datatype GDT: BusinessPartnerinternalID. CreationIdentityBusinessPartnerPersonFamilyName is a family name of a business partner of a category person that is attributed to the creation identity and that can be reached following the relationships of a creation identity, and may be based on datatype GDT: LANGUAGEINDEPENDENT_MEDIUM_Name. CreationIdentityBusinessPartnerPersonGivenName is a given name of a business partner of a category person that is attributed to a creation identity and that can be reached following the relationships of the creation identity, and may be based on datatype GDT: LANGUAGEINDEPENDENT_MEDIUM_Name. CreationIdentityEmployeeID is an identifier for an employee that is attributed to a creation identity and that can be reached following the relationships of the creation identity, and may be based on datatype GDT: EmployeeID. LastChangeDateTime is a point in time date and time stamp of a last change, and may be based on datatype GDT: GLOBAL_DateTime. LastChangeIdentityUUID is a globally unique identifier for an identity who made last changes, and may be based on datatype GDT: UUID. LastChangeIdentityID is an identifier for an identity who made last changes, and may be based on datatype GDT: IdentityID. LastChangeIdentityBusinessPartnerinternalID is a proprietary identifier for a business partner that is attributed to a last change identity and that can be reached following the relationships of the last change identity, and may be based on datatype GDT: BusinessPartnerInternalID. LastChangeIdentityBusinessPartnerPersonFamilyName is a family name of a business partner of a category person that is attributed to a last change identity and that can be reached following the relationships of the last change identity, and may be based on datatype GDT: LANGUAGEINDEPENDENT_MEDIUM_Name. LastChangeIdentityBusinessPartnerPersonGivenName is a given name of a business partner of a category person that is attributed to a last change identity and that can be reached following the relationships of the last change identity, and may be based on datatype GDT: LANGUAGEINDEPENDENT_MEDIUM_Name. LastChangeIdentityEmployeeID is an identifier for an employee that is attributed to a last change identity and that can be reached following the relationships of the last change identity, and may be based on datatype GDT: EmployeeID. CustomsAuthorityCountryCode is a country to whose customs authority an export declaration was or will be submitted, and may be based on datatype GDT: CountryCode, with a qualifier of CustomsAuthority. CustomsExportSoftwareVersionCode is a version of an export software of a customs authority that was active for an ExportDeclaration during a last action on a business object, and may be based on datatype GDT: CustomsExportSoftwareVersionCode. The version may be determined from an associated CustomsArrangement. TypeCode is a type of an export declaration, and may be based on datatype GDT: ExportDeclarationTypeCode. Examples for an export declaration type are complete export declaration, incomplete export declaration, and supplementary export declaration. ExportTypeCode is a type of an export, and may be based on datatype GDT: ExportTypeCode. ExportExportingCountryCode is a country from which goods are exported, and may be based on datatype GDT: ExportExportingCountryCode. The ExportExportingCountryCode can differ from the CustomsAuthorityCountryCode, such as in cases (e.g., in the European Union) in which an export is declared in one country but goods ship from another country. ExportDestinationCountryCode is a destination country of an export, and may be based on datatype GDT: ExportDestinationCountryCode. PartyKey is an identifying key of a party, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. PartyRoleCategoryCode is a party role category of a party, and may be based on datatype GDT: PartyRoleCategoryCode. CustomsAuthorisationInternalID is an internal identifier of a customs authorisation, and may be based on datatype GDT: CustomsAuthorisationInternalID. BusinessTransactionDocumentReference may be based on datatype GDT: BusinessTransactionDocumentReference. LifecycleStatusCode is a lifecycle status of an export declaration, and may be based on datatype GDT: ExportDeclarationLifeCycleStatusCode. ConsistencyStatusCode may be based on datatype GDT: ConsistencyStatusCode. InformationRequestStatusCode may be based on datatype GDT: ExportDeclarationInformationRequestStatusCode. CustomsProcedureStatusCode may be based on datatype GDT: CustomsProcedureStatusCode. CustomsAuthorityCancellationStatusCode may be based on datatype GDT: CancellationStatusCode.

Item is a quantity of a product in an export declaration with additional information on amounts, quantities and packaging data. An item includes information on a corresponding product, including customs commodity, dangerous goods classification, and a region of origin. Item also includes information on goods weight, an associated consignment, an export procedure to apply, and value and weight information for foreign trade statistics. Furthermore, item includes information on the packaging of declared goods in packages and containers, and specifies supporting documents and previous documents needed for approval of an item by a customs authority. The elements located directly at the node Item are defined by the data type ExportDeclarationItemElements. These elements include: UUID, ID, Description, CustomsAuthorityID, CustomsCommodityClassificationCode, DangerousGoodsID, OriginExportRegionCode, Quantity, QuantityTypeCode, LegalComplianceQuantity, LegalComplianceQuantityTypeCode, NetWeightQuantity, NetWeightQuantityTypeCode, GrossWeightQuantity, GrossWeightQuantityTypeCode, GrossWeightQuantity, ConsignmentExportID, ExportTransportCostPaymentFormCode, ExportProcedureTypeCode, ExportPreviousProcedureTypeCode, ExportAdditionalProcedureTypeCode, LegalComplianceAmount, and SystemAdministrativeData.

UUID may be an alternative key, is a globally unique identifier for a node, and may be based on datatype GDT: UUID. ID is an identifier for an export declaration item, and may be based on datatype GDT: BusinessTransactionDocumentItemID. Description is a description of an export declaration item, and may be based on datatype GDT: LANGUAGEINDEPENDENT_LONG_Description. CustomsAuthorityID is an identifier for an export declaration item, may be assigned according to legal requirements of a customs authority, and may be based on datatype GDT: CustomsDeclarationItemCustomsAuthorityID. CustomsCommodityClassificationCode is a classification of an export declaration item according to a customs commodity classification catalog, may be issued by a customs authority, and may be based on datatype GDT: CustomsCommodityClassificationCode. DangerousGoodsID is an identifier for a kind of danger presented by an export declaration item, and may be based on datatype GDT: DangerousGoodsID. Classification may be subject to a United Nations Dangerous Goods number (UNDG) classification. OriginExportRegionCode is a region of origin of goods within an export declaration item, and may be based on datatype GDT: ExportRegionCode, with a qualifier of Origin. Quantity is a quantity of a product within an export declaration item, and may be based on datatype GDT: Quantity. QuantityTypeCode is a type of a quantity of an export declaration item, and may be based on datatype GDT: QuantityTypeCode. LegalComplianceQuantity is a quantity of an export declaration item, in a format and measure required by a customs authority, and may be based on datatype GDT: Quantity, with a qualifier of LegalCompliance. LegalComplianceQuantity may be used for foreign trade statistics. LegalComplianceQuantityTypeCode is a type of a quantity of an export declaration item, may be required by a customs authority, and may be based on datatype GDT: QuantityTypeCode, with a qualifier of LegalCompliance. LegalComplianceQuantityTypeCode may be used for foreign trade statistics. NetWeightQuantity is a net weight of an export declaration item, and may be based on datatype GDT: Quantity, with a qualifier of Weight. NetWeightQuantityTypeCode is a type of a NetWeightQuantity of an export declaration item, and may be based on datatype GDT: QuantityTypeCode, with a qualifier of Weight. GrossWeightQuantity is a gross weight of an export declaration item, and may be based on datatype GDT: Quantity, with a qualifier of Weight. Gross weight includes the packages of an item, excluding a weight of containers. GrossWeightQuantityTypeCode is a type of the GrossWeightQuantity of an export declaration item, and may be based on datatype GDT: QuantityTypeCode, with a qualifier of Weight. ConsignmentExportID is an identifier of a consignment an export declaration is part of, may be used to reference an export to external parties, and may be based on datatype GDT: ConsignmentExportID. ConsignmentExportID may be a shipment document identifier or a Unique Consignment Reference (UCR). ExportTransportCostPaymentFormCode is a payment form used to pay a transport cost for a single export declaration item, and may be based on datatype GDT: ExportTransportCostPaymentFormCode.

Examples of payment forms include cash and cheque. ExportProcedureTypeCode is a type of export procedure to apply to an export declaration item, and may be based on datatype GDT: ExportProcedureTypeCode. ExportPreviousProcedureTypeCode is a type of export procedure that was applied to an export declaration item in a preceding customs transaction, and may be based on datatype GDT: ExportPreviousProcedureTypeCode. ExportPreviousProcedureTypeCode may be used only in certain countries. ExportAdditionalProcedureTypeCode is a type of additional export procedure to apply to an export declaration item, may be based on datatype GDT: ExportAdditionalProcedureTypeCode, and may be used only in certain countries. LegalComplianceAmount is an amount of an export declaration item, may be in a format and currency required by a customs authority, may be based on datatype GDT: Amount, with a qualifier of LegalCompliance, and may be used for foreign trade statistics. SystemAdministrativeData is a System administrative data related to an export declaration item, and may be based on datatype GDT: SystemAdministrativeData.

The following composition relationships to subordinate nodes may exist: Item package Assignment with a cardinality of 1:CN, Item Product with a cardinality of 1:C, Item Supporting Document with a cardinality of 1:CN, Item Previous Document with a cardinality of 1:CN, Item Business Transaction Document Reference with a cardinality of 1:CN, Item Text Collection with a cardinality of 1:C, and Item Attachment Folder with a cardinality of 1:C. A Last Changed Identity inbound association relationship may exist from the business object Identity/node Identity, with a cardinality of 1:CN, which represents an identity that last changed an export declaration item. A Creation Identity inbound association relationship may exist from the business object Identity/node Identity, with a cardinality of 1:CN, which represents an identity that created an export declaration item. The following specialization associations for navigation may exist to node ItemBusinessTransactionDocumentReference: SalesOrderItemReference, with a target cardinality of C; OutboundDeliveryItemReference, with a target cardinality of C; CustomerInvoiceItemReference, with a target cardinality CN, IntraCompanyStockTransferRequirementItemReference, with a target cardinality C; PurchaseOrderItemReference, with a target cardinality of C; and ServiceOrderItemReference, with a target cardinality of C. A CommodityCatalogueItem association to business object ForeignTradeCommodityCatalogue/Node Item may exist with a target cardinality of C. In some implementations, if a quantity or a measure is set, a corresponding quantity or measure type may also be filled. In some implementations, provided elements on an item level override identical elements on a root level.

Item Package Assignment is an assignment to a package an export declaration item is packed in. The elements located directly at the node Item package Assignment are defined by the data type ExportDeclarationItempackageAssignmentElements. These elements include: PackageUUID, PackageKey, ExportDeclarationUUID, and ExportDeclarationPackageID. PackageUUID is a globally unique identifier of a package an export declaration item is packed in, and may be based on datatype GDT: UUID. PackageKey is a key of a package an export declaration item is packed in, and may be based on datatype KDT: ExportDeclarationPackageKey. ExportDeclarationUUID is an internally unique identifier of an export declaration, and may be based on datatype GDT: UUID. ExportDeclarationPackageID is an internal identifier of a package item, and may be based on datatype GDT: ExportDeclarationPackageID. A Package inbound association relationship may exist from the business object Export Declaration/node package, with a cardinality of package 1:CN, which represents a package an export declaration item is packed in.

Item Product is a product associated with an export declaration item. The elements located directly at the node Item Product are defined by the data type ExportDeclarationItemProductElements. These elements include: ProductUUID, ProductKey, ProductTypeCode, ProductIdentifierTypeCode, and ProductID. ProductUUID is a globally unique identifier for a product, and may be based on datatype GDT: UUID. ProductKey is a proprietary identifier for a product, and may be based on datatype KDT: ProductKey. ProductTypeCode is a coded representation of a product type, such as a material or service, and may be based on datatype GDT: ProductTypeCode. ProductIdentifierTypeCode is a coded representation of a product identifier type, and may be based on datatype GDT: ProductIdentifierTypeCode. ProductID is an identifier for a product, and may be based on datatype GDT: ProductID. An Individual Material inbound aggregation relationship may exist from the business object Individual Material/node Individual Material, with a cardinality of C:CN, which is an individual material of an export declaration item. A Material inbound aggregation relationship may exist from the business object Material/node Material, with a cardinality of C:CN, which is a material of an export declaration item.

Item Supporting Document is a document that verifies the correctness of certain data of an export declaration item. Item Supporting Document may be required by a customs authority to approve an export. An example of an Item Supporting Document is a certificate of origin. The elements located directly at the node Item Supporting Document are defined by the data type ExportDeclarationItemSupportingDocumentElements. These elements include ExportSupportingDocumentTypeCode, ExportSupportingDocumentID, ExportSupportingDocumentAddendumID, ExportSupportingDocumentDetailID, IssueDate, ValidityEndDate, LicenceWriteOffAmount, LicenceWriteOffQuantity, and LicenceWriteOffQuantityTypeCode.

Item Previous Document is a document that includes details on a previous business transaction related to an export declaration item. Item Previous Document may be required by a customs authority to approve an export. An example of an Item Previous Document is an import notification that documents a previous import of an item. The elements located directly at the node Item Previous Document are defined by the data type ExportDeclarationItemPreviousDocumentElements. These elements include: ExportPreviousDocumentTypeCode, ExportPreviousDocumentID, ExportSupportingDocumentTypeCode, ExportSupportingDocumentID, ExportSupportingDocumentAddendumID, ExportSupportingDocumentDetailID, IssueDate, ValidityEndDate, LicenceWriteOffAmount, LicenceWriteOffQuantity, and LicenceWriteOffQuantityTypeCode.

ExportPreviousDocumentTypeCode is a type of a previous document, and may be based on datatype GDT: ExportPreviousDocumentTypeCode. An example of a previous document is a preceding import declaration for an item that is now exported. ExportPreviousDocumentID is an identifier of a previous document, and may be based on datatype GDT: ExportPreviousDocumentID. ExportSupportingDocumentTypeCode is a type of a supporting document, and may be based on datatype GDT: ExportSupportingDocumentTypeCode. An example of a supporting document type is a certificate of origin. In some implementations, the ExportSupportingDocumentTypeCode determines which of the elements ExportSupportingDocumentID, ExportSupportingDocumentAddendumID and ExportSupportingDocumentDetailID are provided. In some implementations, at least one of the elements ExportSupportingDocumentID, ExportSupportingDocumentAddendumID and ExportSupportingDocumentDetailID is provided. ExportSupportingDocumentID is an identifier of a supporting document, and may be based on datatype GDT: ExportSupportingDocumentID. ExportSupportingDocumentAddendumID is an identifier of an addendum of a supporting document, and may be based on datatype GDT: ExportSupportingDocumentAddendumID. ExportSupportingDocumentDetailID is an identifier of the detail of a supporting document, and may be based on datatype GDT: ExportSupportingDocumentDetailID. IssueDate is a date a supporting document was issued, and may be based on datatype GDT: Date, with a qualifier of Issue. ValidityEndDate is a date the validity of a supporting document ends, and may be based on datatype GDT: Date, with a qualifier of End. LicenceWriteOffAmount is an amount to write off of a licence for an export declaration item, and may be based on datatype GDT: Amount, with a qualifier of LicenceWriteOff. A licence is a kind of supporting document. LicenceWriteOffQuantity is a quantity to write off of a licence for an export declaration item, and may be based on datatype GDT: Quantity, with a qualifier of LicenceWriteOff. LicenceWriteOffQuantityTypeCode is a type of the LicenceWriteOffQuantity, and may be based on datatype GDT: QuantityTypeCode, with a qualifier of LicenceWriteOff.

Item Previous Document is a document that includes details on a previous business transaction related to an export declaration item. In some implementations, Item Previous Document may be required by a customs authority to approve an export. An example of an Item Previous Document is an import notification that documents a previous import of an item. The elements located directly at the node Item Previous Document are defined by the data type ExportDeclarationItemPreviousDocumentElements. These elements include: ExportPreviousDocumentTypeCode and ExportPreviousDocumentID. ExportPreviousDocumentTypeCode is a type of a previous document, and may be based on datatype GDT: ExportPreviousDocumentTypeCode. An example of a previous document is a preceding import declaration for an item that is now exported. ExportPreviousDocumentID is an identifier of a previous document, and may be based on datatype GDT: ExportPreviousDocumentID.

Item Business Transaction Document Reference is a reference to a business transaction document from which an export declaration item was created. The elements located directly at the node Item Business Transaction Document Reference are defined by the data type ExportDeclarationItemBusinessTransactionDocumentReferenceElements. These elements include: BusinessTransactionDocumentReference and BusinessTransactionDocumentRelationshipRoleCode. BusinessTransactionDocumentReference is a unique identification of a business transaction document related to an export declaration item, and may be based on datatype GDT: BusinessTransactionDocumentReference. BusinessTransactionDocumentRelationshipRoleCode is a role of a referenced business transaction document in an export declaration item, and may be based on datatype GDT: BusinessTransactionDocumentRelationshipRoleCode.

A Customer Invoice Item inbound aggregation relationship may exist from the business object Customer Invoice/node Item Cross DU, with a cardinality of 1:CN, which represents a customer invoice item from which an export declaration item was created. A CustomerRequirementExternalRequestItem inbound aggregation relationship may exist from the business object Customer Requirement/node External Request Item Cross DU, with a cardinality of C:CN, which represents an item of a customer requirement from which an item of an export declaration request was created. An Outbound Delivery Item inbound aggregation relationship may exist from the business object Outbound Delivery/node Item Cross DU, with a cardinality of C:CN, which represents an outbound delivery item from which an export declaration item was created. A PurchaseOrderItem inbound aggregation relationship may exist from the business object Purchase Order/node Item Cross DU, with a cardinality of C:CN, which represents an item in a purchase order. A Sales Order Item inbound aggregation relationship may exist from the business object Sales Order/node Item Cross DU, with a cardinality of C:CN, which represents a sales order item from which an export declaration item was created. A Service Order Item inbound aggregation relationship may exist from the business object Service Order/node Item Cross DU, with a cardinality of C:CN, which represents an item of a service order.

Item Text Collection is a dependent object inclusion node. Item Text Collection includes natural language texts that describe an export declaration item or that specify export goods. Some of the texts are reported to and others are reported by a customs authority. Item Attachment Folder is a dependent object inclusion node which includes a collection of documents that are assigned to an export declaration item.

Time Point is a time point at which some processing of an export declaration took place, takes place, or will take place. The elements located directly at the node Time Point are defined by the data type ExportDeclarationTimePointElements. These elements include TimePointRoleCode, Date, and DateTime. TimePointRoleCode is a role of a time point in an export declaration, and may be based on datatype GDT: TimePointRoleCode. Examples of time points are PlannedExportExitTimePoint, PresentationToCustomsStartTimePoint, and PresentationToCustomsEndTimePoint. Date is a date of a time point, and may be based on datatype GDT: Date. DateTime is a date and time of a time point, and may be based on datatype GDT: GLOBAL_DateTime. In some implementations, only one of either Date or DateTime is filled. In some implementations, Date is used if no time is available or required.

Customs Authorisation is a document that authorizes an exporter to use simplifications in exports. For example, an authorization may entitle an exporter to use simplified customs procedures. The elements located directly at the node Customs Authorisation are defined by the data type ExportDeclarationCustomsAuthorisationElements. These elements include InternalID. InternalID is an internal identifier of a customs authorisation in a customs arrangement, and may be based on datatype GDT: CustomsAuthorisationInternalID. A Customs Arrangement Customs Authorisation inbound association relationship may exist from the business object Customs Arrangement/node Customs Authorisation, with a cardinality of 1:CN, which represents a customs authorisation to use for an export declaration.

Location is a location related to the processing of an export declaration. For example, Location may refer to a location where export goods can be inspected by customs officers. The elements located directly at the node Location are defined by the data type ExportDeclarationLocationElements. These elements include: LocationID, LocationUUID, RoleCategoryCode, and RoleCode. LocationID is an identifier for a location, and may be based on datatype GDT: LocationID. LocationUUID is a globally unique identifier for a location, and may be based on datatype GDT: UUID. RoleCategoryCode is a location's role category in an export declaration, and may be based on datatype GDT: LocationRoleCategoryCode. RoleCode is a location's role in an export declaration, and may be based on datatype GDT: LocationRoleCode. A Location inbound aggregation relationship may exist from the business object Location/node Location, with a cardinality of 1:CN, which represents a location involved in an export.

Customs Office is a customs office involved in an export. For example, Customs Office may refer to a customs office of export, a customs office of export for a supplementary export declaration, a customs office of exit, or a planned customs office of exit. The elements located directly at the node Customs Office are defined by the data type ExportDeclarationCustomsOfficeElements. These elements include: CustomsOfficeUUID, CustomsOfficeInternalID, RoleCategoryCode, and RoleCode. CustomsOfficeUUID is a globally unique identifier of a customs office party, and may be based on datatype GDT: UUID. CustomsOfficeInternalID is an internal identifier of a customs office business partner, and may be based on datatype GDT: BusinessPartnerinternalID. RoleCategoryCode is a role category of a customs office category in an export, and may be based on datatype GDT: PartyRoleCategoryCode. Examples for role category codes are ExportCustomsOfficeParty and ExitCustomsOfficeParty. RoleCode is a role of a customs office role in an export, and may be based on datatype GDT: PartyRoleCode.

A CustomsOffice inbound aggregation relationship may exist from the business object Business Partner/node Business Partner, with a cardinality of C:CN, which represents a customs office involved in an export. In some implementations, customs offices listed at ExportDeclarationInformationRequestResponse may not necessarily appear at the Customs Office node.

Party is a natural or legal person involved in an export as exporter or product recipient or on behalf of any of these parties. Examples of parties include exporter, declarant, representative of a declarant, sub-contractor and message exchange service provider. The elements located directly at the node Party are defined by the data type ExportDeclarationPartyElements. These elements include: PartyUUID, PartyKey, PartyTypeCode, PartyID, RoleCategoryCode, RoleCode, and AddressReference. PartyUUID is a globally unique identifier of a party, and may be based on datatype GDT: UUID. PartyKey is a key of a party, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. RoleCategoryCode is a role category of a party in an export declaration, and may be based on datatype GDT: PartyRoleCategoryCode. Examples for role categories include ExporterParty and DeclarantParty. RoleCode is a role of a party in an export declaration, and may be based on datatype GDT: PartyRoleCode. AddressReference is a reference to a party's address, and may be based on datatype GDT: PartyAddressReference. The following composition relationships to subordinate nodes may exist: Party Address with a cardinality of 1:C, and Party Contact Party with a cardinality of 1:C. A Party inbound aggregation relationship may exist from the business object Party/node Party, with a cardinality of C:CN, which represents a party involved in an export. Party Address is a dependent object inclusion node which represents an address of a party that is specific to an export declaration.

Party Contact Party is a natural person or organizational unit that can be contacted for a party. The contact can be a contact person or, as another example, a secretary's office. The PartyContactParty is used to communicate communication data to a customs authority. The elements located directly at the node Party Contact Party are defined by the data type ExportDeclarationPartyContactPartyElements. These elements include: PartyUUID, PartyKey, PartyTypeCode, PartyID, and AddressReference. PartyUUID is a globally unique identifier of a party's contact, and may be based on datatype GDT: UUID. PartyKey is a key of a party contact, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. AddressReference is a reference to a party contact's address, and may be based on datatype GDT: PartyAddressReference. A Party Contact Party inbound aggregation relationship may exist from the business object Party/node Party, with a cardinality of C:CN, which represents a contact party of a party.

Package is a logical group of one or more package elements. A package element is a physical object in which physical export goods are packed. The elements located directly at the node package are defined by the data type ExportDeclarationpackageElements. These elements include: UUID, Key, ExportDeclarationUUID, ExportDeclarationpackageID, ID, ElementNumberValue, ExportpackageTypeCode, packageExportID, ContainerUUID, ContainerKey, ExportDeclarationUUID, ExportDeclarationContainerID. UUID is an alternative key, is a globally unique identifier of a node, and may be based on datatype GDT: UUID. Key may be an alternative key, is a key of a package in an export declaration, and may be based on datatype KDT: ExportDeclarationpackageKey. ExportDeclarationUUID is an internally unique identifier of an export declaration, and may be based on datatype GDT: UUID. ExportDeclarationpackageID is an internal identifier of a package item, and may be based on datatype GDT: ExportDeclarationpackageID. ID is an internal identifier of a package, and may be based on datatype GDT: ExportDeclarationpackageID. ElementNumberValue is a number of package elements in a package, and may be based on datatype GDT: NumberValue, with a qualifier of Elements. ExportpackageTypeCode is a type of package elements in a package, and may be based on datatype GDT: ExportpackageTypeCode. In some implementations, all package elements of a package are of a same type. PackageExportID is an identifier of a package for reporting to a customs authority, and may be based on datatype GDT: packageExportID. In some implementations, if the number of package elements in a package is greater than one, this element may include the identifiers of several package elements, for example as an enumeration (e.g., "4711, 4712" or as a value range (e.g., "4711-4718"). ContainerUUID is a globally unique identifier of a container that includes all of the package elements in a package, and may be based on datatype GDT: UUID. ContainerKey is a key of a physical container that includes all of the package elements in a package, and may be based on datatype KDT: ExportDeclarationContainerKey. ExportDeclarationUUID is an internally unique identifier of an export declaration, and may be based on datatype GDT: UUID. ExportDeclarationContainerID is an internal identifier of a container, and may be based on datatype GDT: ExportDeclarationContainerID. A Container inbound association relationship may exist from the business object Export Declaration/node Container, with a cardinality of C:CN, which represents a container in which a package is included.

Container is a physical container that includes a portion of or all of the export goods in an export. The elements located directly at the node Container are defined by the data type ExportDeclarationContainerElements. These elements include: UUID, ID, ContainerExportID, Key, ExportDeclarationUUID, and ExportDeclarationContainerID. UUID is an alternative key, is a globally unique identifier of a node, and may be based on datatype GDT: UUID. ID is an internal identifier of a container, and may be based on datatype GDT: ExportDeclarationContainerID. ContainerExportID is an identifier of a container for reporting to a customs authority, and may be based on datatype GDT: ContainerExportID. Key may be an alternative key, is a key of a container, and may be based on datatype KDT: ExportDeclarationContainerKey. ExportDeclarationUUID is an internally unique identifier of an export declaration, and may be based on datatype GDT: UUID. ExportDeclarationContainerID is an internal identifier of a container, and may be based on datatype GDT: ExportDeclarationContainerID.

Message is a message that is exchanged with a customs authority. Exact reproduction of a message flow may be a legal requirement. The elements located directly at the node Message are defined by the data type ExportDeclarationMessageElements. These elements include: UUID, ExportMessageID, CustomsMessageExchangeServerFileID, OrdinalNumberValue, DirectionCode, ExportMessageSubTypeCode, MajorVersionCustomsAuthorityID, MinorVersionCustomsAuthorityID, CustomsExportSoftwareVersionCode, CreationIdentityUUID, ApplicationLogID, ApplicationLogUUID, DateTime, Status, and ExportMessageCommunicationStatusCode. UUID may be an alternative key, is a globally unique identifier of a message, and may be based on datatype GDT: UUID. ExportMessageID is an identifier of a message, may be based on datatype GDT: CustomsProcessMessageID, may be assigned internally if for an outbound message, may be assigned by a customs authority for an inbound message, and may be defined by a customs authority. CustomsMessageExchangeServerFileID is an identifier for a file in which a message was handled on a message exchange server for communication with a customs authority, and may be based on datatype GDT: CustomsMessageExchangeServerFileID. OrdinalNumberValue is an ordinal number used to represent an order in which the messages were sent or received, and may be based on datatype GDT: OrdinalNumberValue. DirectionCode is a direction of a message (e.g., inbound, outbound) from a declarant's point of view, and may be based on datatype GDT: BusinessDocumentMessageDirectionCode. ExportMessageSubTypeCode is an internal type of a message, and may be based on datatype GDT: ExportMessageSubTypeCode. MajorVersionCustomsAuthorityID is a major version of a message as defined by a customs authority, and may be based on datatype GDT: VersionPartyID, with a qualifier of Major. MinorVersionCustomsAuthorityID is a minor version of a message as defined by a customs authority, and may be based on datatype GDT: VersionPartyID, with a qualifier of Minor. CustomsExportSoftwareVersionCode is a version of export software of a customs authority that was active for an ExportDeclaration while a message was created or received, and may be based on datatype GDT: CustomsExportSoftwareVersionCode. The version may be determined from a CustomsArrangement while an outbound message is created or while an inbound message is received. CreationIdentityUUID is a reference to an identity that created a message, and may be based on datatype GDT: UUID. CreationIdentityUUID may only provide for outbound messages. ApplicationLogID is an identification of an ApplicationLog for an export declaration message, and may be based on datatype GDT: ApplicationLogID. ApplicationLogUUID is a globally unique identifier of an ApplicationLog root node for referencing an ApplicationLog that corresponds to an export declaration message, and may be based on datatype GDT: UUID. DateTime is a date and time a message was processed, and may be based on datatype GDT: GLOBAL_DateTime. In some implementations, for outbound messages, DateTime is a date and time of a message transmittsion to a customs authority. For inbound messages, DateTime may be a date and time of message arrival from a customs authority. Status is a status of a message and may be based on datatype BOIDT: ExportDeclarationMessageStatus. ExportMessageCommunicationStatusCode is a communication status of a message, and may be based on datatype GDT: ExportMessageCommunicationStatusCode. ExportMessageCommunicationStatusCode may indicate whether a message was successfully transmitted to a customs authority. In contrast to "message exchange", "message communication" here means a mere technical transmission. A composition relationship to subordinate node Message Attachment Folder may exist, with a cardinality of 1:CN. A CreationIdentity inbound association relationship may exist from the business object Identity/node Identity, with a cardinality of 1:CN, which represents an identity that created a message. A specialization association for navigation may exist to business object ApplicationLog/node Root Application Log, which represents an Application Log for an export declaration message.

A QueryByElements query may provide a list of all messages found based upon given parameters. The query elements are defined by the data type ExportDeclarationMessageElementsQueryElements. These elements include: DateTime, CreationIdentityUUID, ExportDeclarationID, CustomsProcessID, CustomsProcessCustomsAuthorityID, MajorVersionCustomsAuthorityID, ExportMessageID, ExportMessageCommunicationStatusCode, DirectionCode, and CustomsMessageExchangeServerFileID. DateTime is a date and time a message was sent or received, and may be based on datatype GDT: GLOBAL_DateTime. CreationIdentityUUID is an identity of a user that created a message, and may be based on datatype GDT: UUID. ExportDeclarationID is an identifier of an export declaration a message is associated with, and may be based on datatype GDT: BusinessTransactionDocumentID. CustomsProcessID is an identifier of a customs process a message is associated with, and may be based on datatype GDT: CustomsProcessID. CustomsProcessCustomsAuthorityID is an identifier assigned by a customs authority to a customs process a message is associated with, and may be based on datatype GDT: CustomsProcessID. MajorVersionCustomsAuthorityID is a major version of a message as specified by a customs authority, and may be based on datatype GDT: VersionPartyID. ExportMessageID is an identifier of a message, and may be based on datatype GDT: CustomsProcessMessageID. ExportMessageCommunicationStatusCode is a communication status of a message, and may be based on datatype GDT: ExportMessageCommunicationStatusCode. DirectionCode is a direction of a message, and may be based on datatype GDT: BusinessDocumentMessageDirectionCode. CustomsMessageExchangeServerFileID is an identifier of a file on an exchange server in which a customs message is transported, and may be based on datatype GDT: CustomsMessageExchangeServerFileID.

Message Attachment Folder is a dependent object inclusion node. MessageAttachmentFolder includes original messages sent to or received from a customs authority. Transport Route Country is a country an export starts in, passes through, or ends in. The sequence of all TransportRouteCountries in an ExportDeclaration represents a transport route. An OrdinalNumberValue is used to order the TransportRouteCountries in sequence. The same country can appear more than once in an ordered list of countries. The elements located directly at a node Transport Route Country are defined by the data type ExportDeclarationTransportRouteCountryElements. These elements include: ExportTransportRouteCountryCode and OrdinalNumberValue. ExportTransportRouteCountryCode is a country an export starts in, ends in, or one of the countries it passes through. ExportTransportRouteCountryCode may be based on datatype GDT: ExportTransportRouteCountryCode. OrdinalNumberValue is an ordinal number used to order countries in an order an export contacts them, and may be based on datatype GDT: OrdinalNumberValue.

Business Transaction Document Reference is a reference to a business transaction document related to an export. In some implementations, an export declaration can include at most one reference, namely to the OutboundDelivery it was created from. The elements located directly at the node Business Transaction Document Reference are defined by the data type ExportDeclarationBusinessTransactionDocumentReferenceElements. These elements include: BusinessTransactionDocumentReference and BusinessTransactionDocumentRelationshipRoleCode. BusinessTransactionDocumentReference is a unique identification of a business transaction document related to an export declaration, and may be based on datatype GDT: BusinessTransactionDocumentReference. BusinessTransactionDocumentRelationshipRoleCode is a role of a referenced business transaction document in an export declaration, and may be based on datatype GDT: BusinessTransactionDocumentRelationshipRoleCode. An Outbound Delivery inbound aggregation relationship may exist from the business object Outbound Delivery/node Outbound Delivery Cross DU, with a cardinality of C:CN.

Text Collection is a dependent object inclusion node which is a collection of natural language texts that describe an export declaration or that specify an export. Some of these natural language texts are reported to, and others are reported by, a customs authority.

Information Request is a request sent by a customs authority to inquire about a status of an export. The elements located directly at the node Information Request are defined by the data type ExportDeclarationInformationRequestElements. These elements include: UUID, Date, and ResponseDeadlineDate. UUID may be an alternative key, is a globally unique identifier for an information request, and may be based on datatype GDT: UUID. Date is a date information was requested by a customs authority, and may be based on datatype GDT: Date. ResponseDeadlineDate is a deadline until which a customs authority expects a response to its information request, and may be based on datatype GDT: Date, with a qualifier of ResponseDeadline. A composition relationship to subordinate nodes Information Request Response may exist, with a cardinality of 1:C. Information Request may be associated with the following enterprise service infrastructure actions: Respond and NotifyOfResponse. The Respond action sends a response on an information request to a customs authority. The Respond action may have a precondition that Information Request is in status “Requested” or “Response Rejected”. In response to the Respond action, Information Request may be set to “Responded”. The NotifyOfResponseRejection action states that a customs authority rejected a response to the information request. The NotifyOfResponseRejection action may have a precondition that Information Request is in status “Responded.” In response to the NotifyOfResponseRejection action, Information Request may be set to “Response Rejected.”

Information Request Response is a response sent to a customs authority upon an information request. The elements located directly at the node Information Request Response are defined by the data type ExportDeclarationInformationRequestResponseElements. These elements include: UUID, ExportExitDate, PlannedExportExitDate, ExitCustomsOfficeUUID, ExitCustomsOfficeInternalID, Status, and ExportExitStatusCode. UUID may be an alternative key, is a globally unique identifier for an information request response, and may be based on datatype GDT: UUID. ExportExitDate is a date an export left a customs territory (e.g., crossed a border), and may be based on datatype GDT: Date, with a qualifier of ExportExit. PlannedExportExitDate is a date an export is planned to exit a customs territory, and may be based on datatype GDT: Date, with a qualifier of PlannedExportExit. ExitCustomsOfficeUUID is a globally unique identifier of a customs office of exit that managed an export, and may be based on datatype GDT: UUID. ExitCustomsOfficeInternalID is an internal identifier for a customs office of exit that managed an export, and may be based on datatype GDT: BusinessPartnerinternalID. Status is a status of an information request response, and may be based on datatype BOIDT: ExportDeclarationInformationRequestResponseStatus.
ExportExitStatusCode is an exit status of an export, and may be based on datatype GDT: ExportExitStatusCode. A composition relationship to subordinate node Information Request Response Text Collection may exist, with a cardinality of 1:C. A Exit Customs Office inbound association relationship may exist from the business object Business Partner/node Business Partner Cross DU, with a cardinality of C:CN, which represents an Exit Customs Office for exporting goods. In some implementations, depending on an exit status of an export, two cases can be reported. In some implementations, in case an export has already left a customs territory, the ExportExitDate and ExitCustomsOfficeUUID and/or ExitCustomsOfficeInternalID are provided. In some implementations, the provided customs office is not mirrored at node ExportDeclarationCustomsOffice. In some implementations, in the case an export has not yet left a customs territory, the PlannedExportExitDate is provided. Information Request Response Text Collection is a dependent object inclusion node which is a collection of natural language texts reported to a customs authority in an information request response. Attachment Folder is a dependent object inclusion node which is a collection of documents that are assigned to an Export Declaration. Controlled Output Request is a dependent object inclusion node which includes information for printing.

Figure 33:
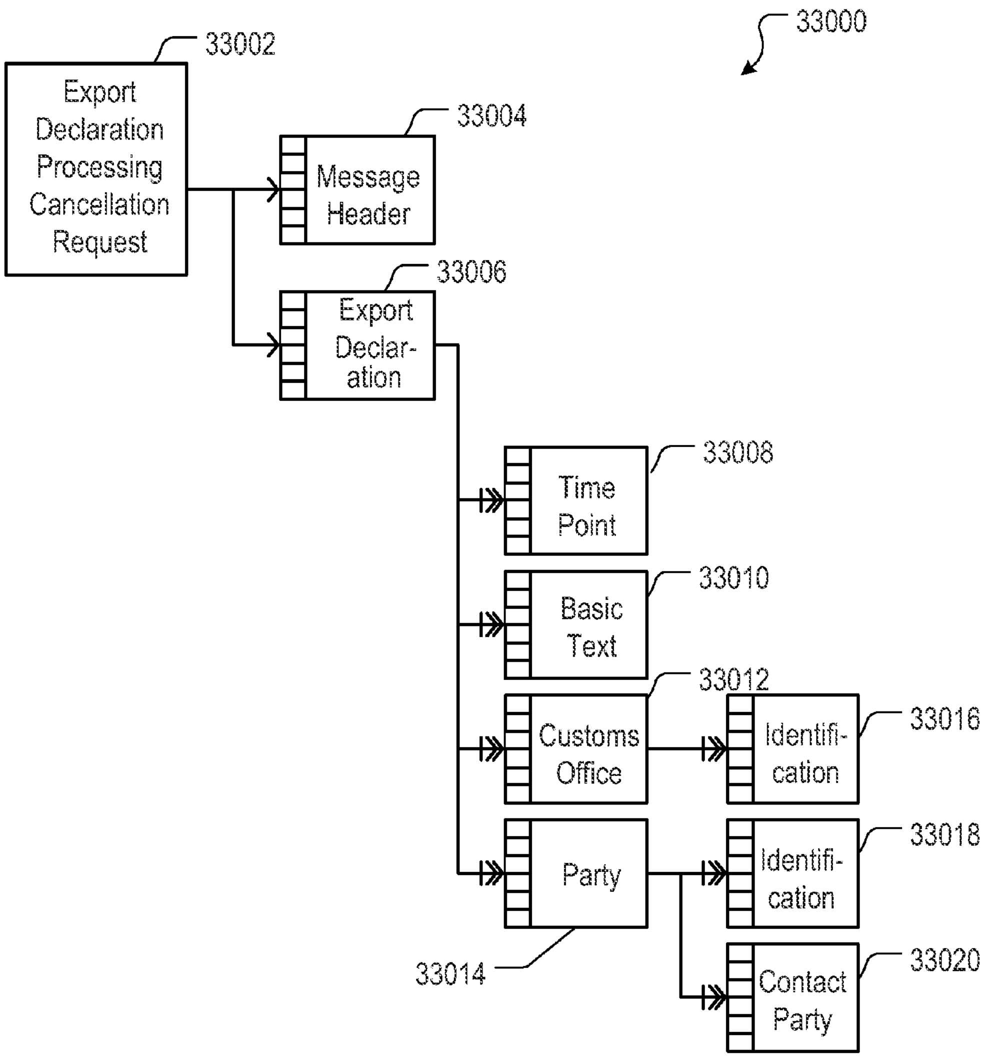
FIG. 33 depicts an example Export Declaration Processing Cancellation Request Message Data Type.

FIG. 33 depicts an example Export Declaration Processing Cancellation Request Message Data Type 33000, which comprises elements 33002-33020, hierarchically related as shown. For example, the Export Declaration Processing Cancellation Request 33002 includes a Message Header 33004.

The message type Export Declaration Processing Cancellation Request is derived from the business object Export Declaration as a leading object together with its operation signature. The message type Export Declaration Processing Cancellation Request is a request to cancel the processing of an export declaration. The structure of the message type Export Declaration Processing Cancellation Request is determined by the message data type ExportDeclarationProcessingCancellationRequestMessage. The message data type ExportDeclarationProcessingCancellationRequestMessage includes an object ExportDeclaration which is included in a business document, business information that is relevant for sending a business document in a message, the MessageHeader package, and an ExportDeclaration package. The message data type ExportDeclarationProcessingCancellationRequestMessage provides a structure for the Export Declaration Processing Cancellation Request message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and may be optionally information about the recipient. The MessageHeader includes SenderParty and RecipientParty. MessageHeader may be based on the datatype and may be based on datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type and may be based on datatype GDT:BusinessDocumentMessageHeaderParty. RecipientParty is of the type and may be based on datatype GDT:BusinessDocumentMessageHeaderParty. RecipientParty is the partner responsible for receiving a business document at a business application level.

The ExportDeclaration package is a grouping of ExportDeclaration with its TimePoint, BasicText, CustomsOffice, and Party packages and with an ExportDeclaration entity. ExportDeclaration is a business transaction document including data for a declaration to a customs authority for exporting goods according to legal requirements. ExportDeclaration includes the following non-node elements: ExportMessageSubTypeCode, ExportMessageID, ExportMessageReferenceID, CustomsAuthorityCountryCode, MajorVersionCustomsAuthorityID, MinorVersionCustomsAuthorityID, MainTestCaseID, SubTestCaseID, CustomsMessageExchangeServerFileID, CustomsProcessCustomsAuthorityID, ExportDeclarationCancellationTypeCode, and CustomsAuthenticationID.

ExportMessageSubTypeCode may be optional, is an internal type of a message, and may be based on datatype GDT: ExportMessageSubTypeCode. ExportMessageID may be optional, is an identifier of a message, and may be based on datatype GDT:CustomsProcessMessageID. ExportMessageReferenceID includes one or more identifiers of messages referenced by a message, and may be based on datatype GDT:CustomsProcessMessageID. CustomsAuthorityCountryCode may be optional, is a country in which a customs authority to which this processing request is sent is situated, and may be based on datatype GDT:CountryCode. MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and is an identifier for a main test case. If a message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional and is an identifier for a sub test case. If a message is sent as part of a test case, SubTestCaseID provides an identifier of a subordinate test case. Test cases and their identifiers may be issued by a customs authority. SubTestCaseID may be based on datatype GDT:TestCaseID. CustomsMessageExchangeServerFileID may be optional, is an identifier for a file a message is stored in on a message exchange server that communicates with a customs authority, and may be based on datatype GDT:CustomsMessageExchangeServerFileID. CustomsProcessCustomsAuthorityID may be optional, is an identifier for an export, may be assigned by a customs authority, and may be based on datatype GDT:CustomsProcessID. ExportDeclarationCancellationTypeCode may be optional, is a type of cancellation, and may be based on datatype GDT:ExportDeclarationCancellationTypeCode. CustomsAuthenticationID may be optional, is an authentication identifier for communicating with a customs authority, and may be based on datatype GDT:CustomsAuthenticationID.

ExportDeclaration may include the node element TimePoint with a cardinality of 1:CN, the node element BasicText with a cardinality of 1:CN, the node element CustomsOffice with a cardinality of 1:CN, and the node element Party with a cardinality of 1:CN.

The ExportDeclarationTimePoint package includes the TimePoint entity. TimePoint is a time point at which processing of an export declaration took place, takes place, or may take place. TimePoint includes the following non-node elements: TimePointRoleCode, DateTime, and Date. TimePointRoleCode may be optional, is a role a time point plays in processing of an export declaration, and may be based on datatype GDT:TimePointRoleCode. DateTime may be optional, is a date and time of a time point, and may be based on datatype CDT:LOCAL_DateTime. Date may be optional, is a date of a time point, and may be based on datatype CDT:Date.

The ExportDeclarationBasicText package includes the BasicText entity. BasicText includes natural language text that describes an export declaration or specifies an export. BasicText is typed by datatype TextCollectionBasicText.

The ExportDeclarationCustomsOffice package includes the CustomsOffice entity. CustomsOffice is a customs office involved in an export. CustomsOffice includes the RoleCategoryCode non-node element, which may be optional, is a role a customs office plays in processing of an export declaration, and may be based on datatype GDT:PartyRoleCategoryCode. The ExportCustomsOffice package may include the node element Identification in a 1:CN cardinality relationship. The ExportCustomsOfficeIdentification package includes the Identification entity. Identification is an identifier of a customs office. Identification includes the following non-node elements: PartyIdentifierTypeCode and PartyID. PartyIdentifierTypeCode may be optional, is a type code of an identifier for a customs office, and may be based on datatype GDT:PartyIdentifierTypeCode. PartyID may be optional, is an identifier for a customs office, and may be based on datatype GDT:NOALPHANUMERICCONVERSION_PartyID.

The ExportParty package includes the Party entity. Party is a natural or legal person involved in an export as exporter or product recipient or acting on behalf of an exporter or product recipient. Party includes the following non-node elements: RoleCategoryCode, PostalRegulationsCompliantStreetDescription, and Address. RoleCategoryCode may be optional, is role a party plays in processing of an export declaration, and may be based on datatype GDT:PartyRoleCategoryCode. Address may be optional, is an address of a party, and may be based on datatype GDT:Address. PostalRegulationsCompliantStreetDescription may be optional, is a street and house identifier, may be formatted to comply with postal regulations in a country a party is situated in, and may be based on datatype GDT:LANGUAGEINDEPENDENT_MEDIUM_Description. The ExportParty package may include the Identification node element in a 1:CN cardinality relationship and the ContactParty node element in a 1:C cardinality relationship.

The ExportPartyPartyIdentification package includes the Identification entity. Identification is an identifier for a party. Identification includes the following non-node elements: PartyIdentifierTypeCode and PartyID. PartyIdentifierTypeCode may be optional, is a type of an identifier of a party, and may be based on datatype GDT:PartyIdentifierTypeCode. PartyID may be optional, is an identifier for a party, and may be based on datatype GDT:NOALPHANUMERICCONVERSION_PartyID.

The ExportPartyPartyContactParty package includes the ContactParty entity. The ContactParty entity is a contact for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

Figures 1, 34:
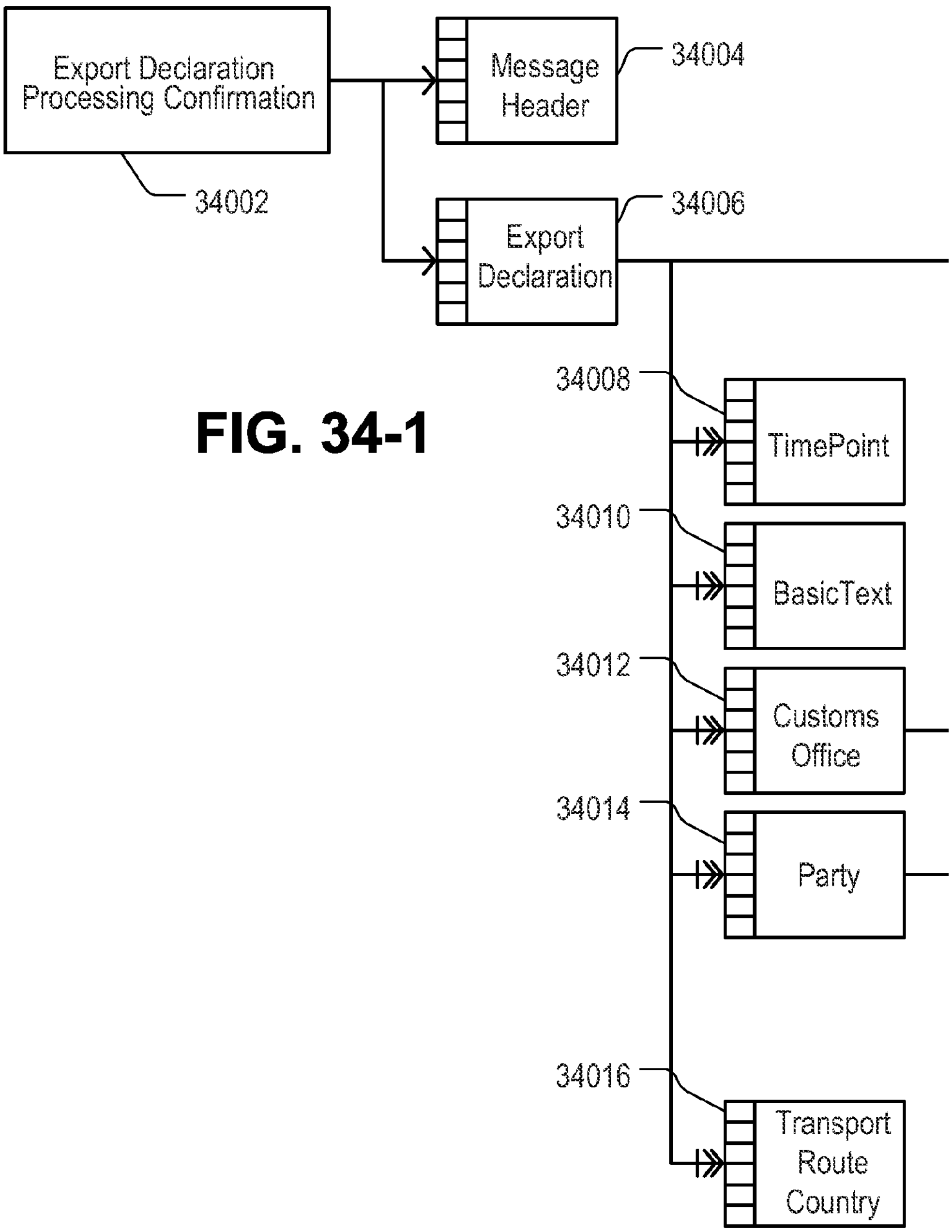
Figures 2, 34:
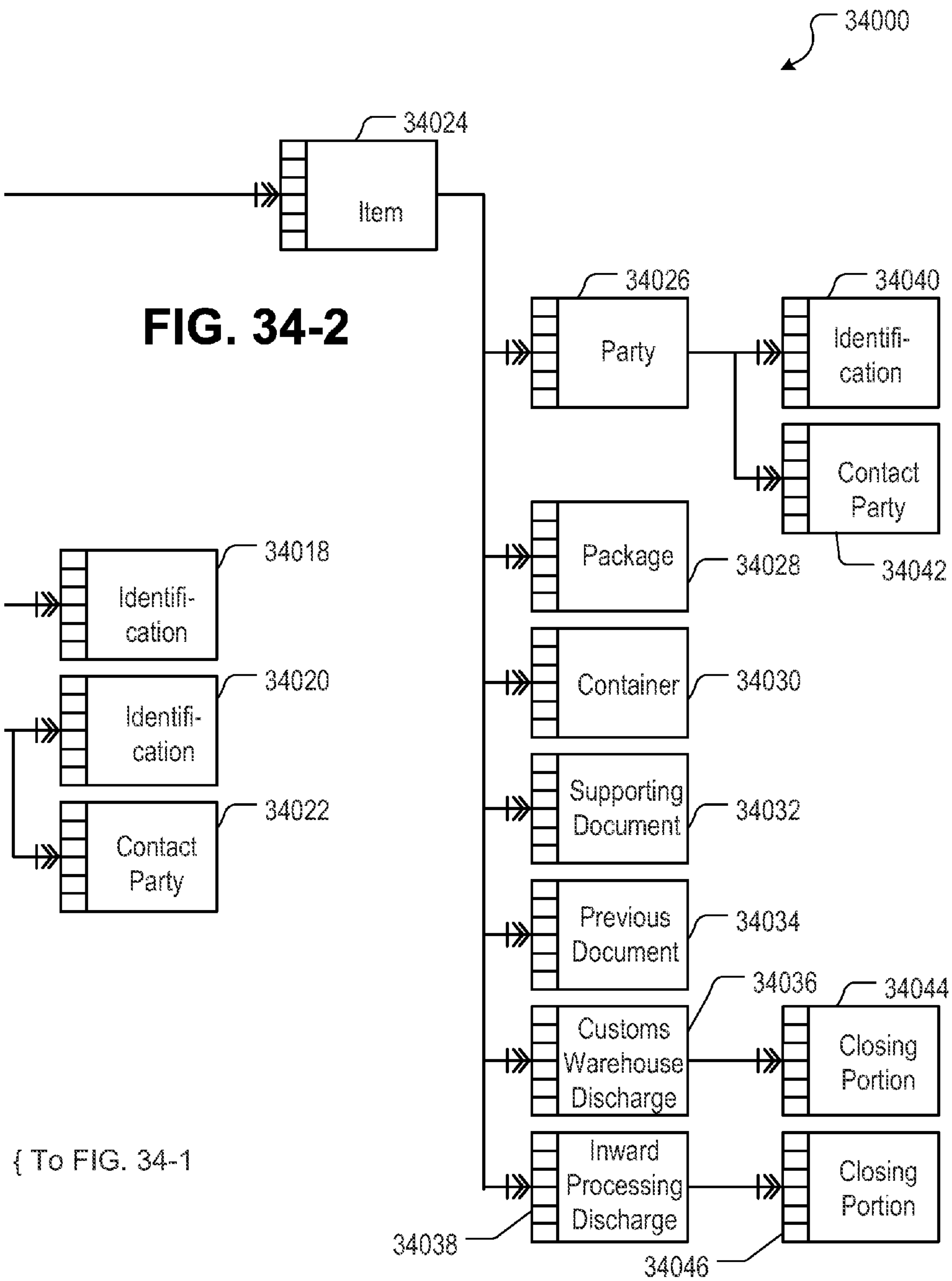

FIGS. 34-1 through 34-2 depict an example Export Declaration Processing Confirmation Message Data Type 34000, which comprises elements 34002-34046, hierarchically related as shown. For example, the Export Declaration Processing Confirmation 34002 includes a Message Header 34004.

The message type Export Declaration Processing Confirmation is derived from a business object Export Declaration as a leading object together with its operation signature. The message type Export Declaration Processing Confirmation is a confirmation to confirm processing of an export declaration. The structure of the message type Export Declaration Processing Confirmation is determined by a messagedata type ExportDeclarationProcessingConfirmationMessage. The messagedata type ExportDeclarationProcessingConfirmationMessage includes an object ExportDeclaration which is included in a business document, business information that is relevant for sending a business document in a message, the MessageHeader package, and the ExportDeclaration package. The message data type ExportDeclarationProcessingConfirmationMessage provides a structure for the Export Declaration Processing Confirmation message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The ExportDeclaration package is a grouping of ExportDeclaration with its CustomsAuthorisation, TimePoint, BasicText, Location, CustomsOffice, Party, TransportRouteCountry, Item, Document, and LogItem packages and with the ExportDeclaration entity. ExportDeclaration is a business transaction document including data for a declaration to a customs authority for exporting goods according to legal requirements. ExportDeclaration includes the following non-node elements: ExportMessageSubTypeCode, ExportMessageID, ExportMessageReferenceID, MajorVersionCustomsAuthorityID, MinorVersionCustomsAuthorityID, MainTestCaseID, SubTestCaseID, CustomsProcessID, CustomsProcessPartyID, CustomsProcessCustomsAuthorityID, ExportDeclarationTypeCode, ExportTypeCode, ExportExportingCountryCode, ExportDestinationCountryCode, ExportSpecialCircumstancesCode, ExportTransportCostPaymentFormCode, ContainerUsedIndicator, ExportPartyRepresentationCode, ItemTotalNumberValue, TotalGrossWeightQuantity, TotalGrossWeightQuantityTypeCode, ConsignmentExportID, InlandExportTransportModeCode, CrossBorderExportTransportModeCode, CrossBorderExportTransportMeansTypeCode, CrossBorderTransportMeansID, ExportCrossBorderTransportMeansNationalityCode, ExportBusinessTransactionTypeCode, InvoiceTotalNetAmount, ExportIncotermsClassificationCode, ExportIncotermsClassificationDescription, IncotermsTransferLocationName, PackageTotalNumberValue, and CommunicationDateTime.

ExportMessageSubTypeCode may be optional, is an internal type of a message, and may be based on datatype GDT:ExportMessageSubTypeCode. ExportMessageID may be optional, is an identifier for a message, and may be based on datatype GDT:CustomsProcessMessageID. ExportMessageReferenceID includes one or more identifiers of messages referenced by a message, and may be based on datatype GDT:CustomsProcessMessageID. MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and is an identifier for a main test case. If a message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional, is an identifier for a sub test case. If a message is sent as part of a test case, SubTestCaseID provides an identifier of a subordinate test case. Test cases and their identifiers may be issued by a customs authority. SubTestCaseID may be based on datatype GDT:TestCaseID. CustomsProcessID may be optional, is an identifier for an export, may be assigned internally, and may be based on datatype GDT:CustomsProcessID. CustomsProcessPartyID may be optional, is an identifier for an export, may be assigned by a third party, and may be based on datatype GDT:CustomsProcessID. CustomsProcessCustomsAuthorityID may be optional, is an identifier for an export, may be assigned by a customs authority, and may be based on datatype GDT:CustomsProcessID. ExportDeclarationTypeCode may be optional, is a type of an export declaration, and may be based on datatype GDT:ExportDeclarationTypeCode. ExportTypeCode may be optional, is a type of an export, and may be based on datatype GDT:ExportTypeCode. ExportExportingCountryCode may be optional, is a country from which goods are exported, and may be based on datatype GDT:ExportExportingCountryCode. ExportDestinationCountryCode may be optional, is a country to which goods are exported, and may be based on datatype GDT:ExportDestinationCountryCode. ExportSpecialCircumstancesCode may be optional, documents special circumstances accompanying an export, and may be based on datatype GDT:ExportSpecialCircumstancesCode. ExportTransportCostPaymentFormCode may be optional, is a payment form for a transport cost of an export, and may be based on datatype GDT:ExportTransportCostPaymentFormCode. ContainerUsedIndicator may be optional, indicates whether export goods are shipped in containers, and may be based on datatype CDT:Indicator. ExportPartyRepresentationCode may be optional, is a representation situation of parties involved in an export, and may be based on datatype GDT:ExportPartyRepresentationCode. ItemTotalNumberValue may be optional, is a total number of items in an export declaration, and may be based on datatype GDT:NumberValue. TotalGrossWeightQuantity may be optional, is a total gross weight of export declaration items, and may be based on datatype CDT:Quantity. TotalGrossWeightQuantityTypeCode may be optional, is a type of a total gross weight of export declaration items, and may be based on datatype GDT: QuantityTypeCode. ConsignmentExportID may be optional, is an identifier for a consignment underlying an export, and may be based on datatype GDT:ConsignmentExportID. InlandExportTransportModeCode may be optional, is a transport mode used to move an export goods in inland, and may be based on datatype GDT:ExportTransportModeCode. CrossBorderExportTransportModeCode may be optional, is a transport mode used to move export goods across a border, and may be based on datatype GDT:ExportTransportModeCode. CrossBorderExportTransportMeansTypeCode may be optional, is a transport means used to move export goods across a border, and may be based on datatype GDT:ExportTransportMeansTypeCode. CrossBorderTransportMeansID may be optional, is an identifier for a transport means used to move export goods across a border, and may be based on datatype GDT:TransportMeansID_V1. ExportCrossBorderTransportMeansNationalityCode may be optional, is a nationality of a transport means used to move export goods across a border, and may be based on datatype GDT:ExportCrossBorderTransportMeansNationalityCode. ExportBusinessTransactionTypeCode may be optional, is a type of a business transaction underlying an export, and may be based on datatype GDT:ExportBusinessTransactionTypeCode. InvoiceTotalNetAmount may be optional, is a total net amount of an invoice underlying an export, and may be based on datatype CDT:Amount. ExportIncotermsClassificationCode may be optional, is a classification of incoterms underlying an export, and may be based on datatype GDT: ExportIncotermsClassificationCode. ExportIncotermsClassificationDescription may be optional, is a description of incoterms underlying an export, and may be based on datatype GDT:LANGUAGEINDEPENDENT_MEDIUM_Description. IncotermsTransferLocationName may be optional, is a name of a transfer location of incoterms underlying an export, and may be based on datatype CDT:MEDIUM_Name. PackageTotalNumberValue may be optional, is a total number of packages in an export, and may be based on datatype GDT:NumberValue. CommunicationDateTime may be optional, is a date and time a message was communicated by a customs authority, and may be based on datatype GDT:GLOBAL_DateTime.

ExportDeclaration may include the node element CustomsAuthorisation in a 1:C cardinality relationship, the node element TimePoint in a 1:CN cardinality relationship, the node element BasicText in a 1:CN cardinality relationship, the node element Location in a 1:CN cardinality relationship, the node element CustomsOffice in a 1:CN cardinality relationship, the node element Party in a 1:CN cardinality relationship, the node element TransportRouteCountry in a 1:CN cardinality relationship, the node element Item in a 1:CN cardinality relationship, the node element Document in a 1:CN cardinality relationship, and the node element LogItem in a 1:CN cardinality relationship.

The ExportDeclarationCustomsAuthorisation package includes the CustomsAuthorisation entity. CustomsAuthorisation is a document that authorizes an exporter to use simplifications in exports. CustomsAuthorisation includes the following non-node elements: CustomsAuthorisationTypeCode and CustomsAuthorisationID. CustomsAuthorisationTypeCode may be optional, is a type of a customs authorization, and may be based on datatype GDT: CustomsAuthorisationTypeCode. CustomsAuthorisationID may be optional, is an identifier for a customs authorization, may be issued by a customs authority, and may be based on datatype GDT: CustomsAuthorisationID.

The ExportDeclarationTimePoint package includes the TimePoint entity. TimePoint is a time point at which some processing of an export declaration took place, takes place or will take place. TimePoint includes the following non-node elements: TimePointRoleCode, DateTime, and Date. TimePointRoleCode may be optional, is a role a time point plays in processing of an export declaration, and may be based on datatype GDT:TimePointRoleCode. DateTime may be optional, is a date and time of a time point, and may be based on datatype CDT:LOCAL_DateTime. Date may be optional, is a date of a time point, and may be based on datatype CDT:Date.

The ExportDeclarationBasicText package includes the BasicText entity. BasicText includes natural language text that describes an export declaration or specifies an export. BasicText is typed by datatype TextCollectionBasicText. The ExportDeclarationLocation package includes the Location entity. Location is a location related to processing of an export declaration. Location includes the following non-node elements: LocationRoleCategoryCode, CustomsAuthorityID, Address, and PostalRegulationsCompliantStreetDescription. LocationRoleCategoryCode may be optional, is a role a location plays in the processing of an export declaration, and may be based on datatype GDT:LocationRoleCategoryCode. CustomsAuthorityID may be optional, is an identifier for a location, may be issued by a customs authority, and may be based on datatype GDT:LocationPartyID. Address may be optional, is an address of a location, and may be based on datatype GDT:Address. PostalRegulationsCompliantStreetDescription may be optional, includes a street and house identifier of a location, may be formatted to comply with postal regulations of a country in which a location is situated, and may be based on datatype GDT:LANGUAGEINDEPENDENT_MEDIUM_Description.

The ExportDeclarationCustomsOffice package includes a CustomsOffice entity. CustomsOffice is a customs office involved in an export. CustomsOffice includes the RoleCategoryCode non-node element, which may be optional, is a role a customs office plays in processing of an export declaration, and may be based on datatype GDT:PartyRoleCategoryCode. The ExportCustomsOffice package may include the node element Identification in a 1:C cardinality relationship. The ExportCustomsOfficeIdentification package includes the Identification entity. Identification is an identifier of a customs office. Identification includes the following non-node elements: PartyIdentifierTypeCode and PartyID. PartyIdentifierTypeCode may be optional, is a type code of an identifier for a customs office, and may be based on datatype GDT:PartyIdentifierTypeCode. PartyID may be optional, is an identifier for a customs office, and may be based on datatype GDT:NOALPHANUMERICCONVERSION_PartyID.

The ExportDeclarationParty package includes the Party entity. Party is a natural or legal person involved in an export as exporter or product recipient or acting on behalf of an exporter or product recipient. Party includes the following non-node elements: RoleCategoryCode, PostalRegulationsCompliantStreetDescription, and Address. RoleCategoryCode may be optional, is role a party plays in processing of an export declaration, and may be based on datatype GDT:PartyRoleCategoryCode. Address may be optional, is an address of a party, and may be based on datatype GDT:Address.

PostalRegulationsCompliantStreetDescription may be optional, is a street and house identifier, may be formatted to comply with postal regulations in a country a party is situated in, and may be based on datatype GDT:LANGUAGEINDEPENDENT_MEDIUM_Description. The ExportParty package may include the Identification node element in a 1:CN cardinality relationship and the ContactParty node element in a 1:C cardinality relationship.

The ExportDeclarationPartyPartyIdentification package includes the Identification entity. Identification is an identifier for a party. Identification includes the following non-node elements: PartyIdentifierTypeCode and PartyID. PartyIdentifierTypeCode may be optional, is a type of an identifier of a party, and may be based on datatype GDT:PartyIdentifierTypeCode. PartyID may be optional, is an identifier for a party, and may be based on datatype GDT:NOALPHANUMERICCONVERSION_PartyID.

The ExportDeclarationPartyPartyContactParty package includes the ContactParty entity. The ContactParty entity is a contact for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

The ExportDeclarationTransportRouteCountry package includes the TransportRouteCountry entity. TransportRouteCountry is a country an export starts in, passes through, or ends in. TransportRouteCountry includes the following non-node elements: OrdinalNumberValue and ExportTransportRouteCountryCode. OrdinalNumberValue may be optional, is an ordinal number used order countries of a transport route in an order in which they are passed by an export, and may be based on datatype GDT:OrdinalNumberValue. ExportTransportRouteCountryCode may be optional, is a single country of a transport route, and may be based on datatype GDT: ExportTransportRouteCountryCode.

The ExportDeclarationItem package includes the Item entity. Item is an item in an export declaration. Item includes the following non-node elements: CustomsAuthorityID, Description, CustomsProcessPartyID, ConsignmentExportID, NetWeightQuantity, Net WeightQuantityTypeCode, Gross WeightQuantity, GrossWeightQuantityTypeCode, CustomsCommodityClassificationCode, ExportProcedureTypeCode, ExportPreviousProcedureTypeCode, ExportAdditionalProcedureTypeCode, OriginExportRegionCode, DangerousGoodsID, ExportTransportCostPaymentFormCode, LegalComplianceQuantity, LegalComplianceQuantityTypeCode, and LegalComplianceAmount.

CustomsAuthorityID may be optional, is an identifier for an export declaration item, may follow a schema specified by a customs authority, and may be based on datatype GDT: CustomsDeclarationItemCustomsAuthorityID. Description may be optional, is a description of an export declaration item in natural language, and may be based on datatype GDT: Description. CustomsProcessPartyID may be optional, is an identifier for an export, may be assigned internally, and may be based on datatype GDT:CustomsProcessID. ConsignmentExportID may be optional, is an identifier for a consignment underlying an export, and may be based on datatype GDT: ConsignmentExportID. NetWeightQuantity may be optional, is the net weight quantity of an item, and may be based on datatype CDT:Quantity. NetWeightQuantityTypeCode may be optional, is a type of net weight quantity of an item, and may be based on datatype GDT:QuantityTypeCode. GrossWeightQuantity may be optional, is the gross weight of an item, and may be based on datatype CDT:Quantity. GrossWeightQuantityTypeCode may be optional, is a type of gross weight of an item, and may be based on datatype GDT: QuantityTypeCode. CustomsCommodityClassificationCode may be optional, is a classification of an exported commodity according to specifications by a customs authority, and may be based on datatype GDT: CustomsCommodityClassificationCode. ExportProcedureTypeCode may be optional, is an export procedure to use for an item, and may be based on datatype GDT:ExportProcedureTypeCode. ExportPreviousProcedureTypeCode may be optional, is a customs procedure that was previously applied to an item, and may be based on datatype GDT:ExportPreviousProcedureTypeCode. ExportAdditionalProcedureTypeCode may be optional, is an additional export procedure to use for an item, and may be based on datatype GDT:ExportAdditionalProcedureTypeCode. OriginExportRegionCode may be optional, is a region of origin of an export item, and may be based on datatype GDT:ExportRegionCode. DangerousGoodsID may be optional, is an identifier for a risk and kind of danger posed by an item, and may be based on datatype GDT:DangerousGoodsID. ExportTransportCostPaymentFormCode may be optional, is a payment form for a transport cost of an export, and may be based on datatype GDT:ExportTransportCostPaymentFormCode. LegalComplianceQuantity may be optional, is a quantity of an item, may be formatted to comply with legal regulations, and may be based on datatype CDT: Quantity. LegalComplianceQuantityTypeCode may be optional, is a type of a quantity of an item, may be formatted to comply with legal regulations, and may be based on datatype GDT:QuantityTypeCode. LegalComplianceAmount may be optional, is an amount of an item, may be formatted to comply with legal regulations, and may be based on datatype CDT:Amount.

The ExportDeclarationDocument package includes the Document entity. Document is a document involved in an export. The ExportDeclarationLogItem package includes the LogItem entity. LogItem is an application log item based on processing of an export declaration. LogItem may be typed by datatype LogItem.

The ExportDeclarationItemParty package includes the Party entity. Party is a party involved in an export of an item. Party includes the following non-node elements: RoleCategoryCode, Address, and PostalRegulationsCompliantStreetDescription. RoleCategoryCode may be optional, is a role a party plays in an export of an item, and may be based on datatype GDT:PartyRoleCategoryCode. Address may be optional, is an address of a party, and may be based on datatype GDT:Address. PostalRegulationsCompliantStreetDescription may be optional, is a street and house identifier of a party, may be formatted to comply with local postal regulations in a country a party is situated in, and may be based on datatype GDT:LANGUAGEINDEPENDENT_MEDIUM_Description. Party may include an Identification node element in a 1:CN cardinality relationship and a ContactParty node element in a 1:C cardinality relationship.

The ExportDeclarationItemPartyIdentification package includes the Identification entity. Identification is an identifier for a party. Identification includes the following non-node elements: PartyIdentifierTypeCode and PartyID. PartyIdentifierTypeCode may be optional, is a type of a party identifier, and may be based on datatype GDT:PartyIdentifierTypeCode. PartyID may be optional, is an identifier for a party, and may be based on datatype GDT:NOALPHANUMERICCONVERSION_PartyID. The ExportDeclarationItemPartyContactParty package includes the ContactParty entity. ContactParty is a contact party for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

The ExportDeclarationItemPackage package includes the Package entity. Package is a package an item is packed in. Package includes the following non-node elements: OrdinalNumberValue, ElementNumberValue, ExportpackageTypeCode, and PackageExportID. OrdinalNumberValue may be optional, is an ordinal number used to order packages, and may be based on datatype GDT:OrdinalNumberValue. ElementNumberValue may be optional, is the number of physical containers in a package, and may be based on datatype GDT:NumberValue. ExportPackageTypeCode may be optional, is a type of a physical container in a package, and may be based on datatype GDT:ExportPackageTypeCode. PackageExportID may be optional, is an identifier for a physical container in a package, and may be based on datatype GDT:PackageExportID.

The ExportDeclarationItemContainer package includes the Container entity. Container is a container an item is packed in. Container includes the ContainerExportID non-node element, which may be optional, is an identifier for a container, and may be based on datatype GDT: ContainerExportID. The ExportDeclarationItemSupportingDocument package includes the SupportingDocument entity. SupportingDocument is a document providing additional information used to export an item. SupportingDocument includes the following non-node elements: ExportSupportingDocumentTypeCode, ExportSupportingDocumentID, ExportSupportingDocumentAddendumID, ExportSupportingDocumentDetailID, IssueDate, ValidityEndDate, LicenceWriteOffAmount, LicenceWriteOffQuantity, and LicenceWriteOffQuantityTypeCode.

ExportSupportingDocumentTypeCode may be optional, is a type of a supporting document, and may be based on datatype GDT:ExportSupportingDocumentTypeCode. ExportSupportingDocumentID may be optional, is an identifier for a supporting document, and may be based on datatype GDT:ExportSupportingDocumentID. ExportSupportingDocumentAddendumID may be optional, is an identifier for an addendum of a supporting document, and may be based on datatype GDT:ExportSupportingDocumentAddendumID. ExportSupportingDocumentDetailID may be optional, is an identifier for a detail of a supporting document, and may be based on datatype GDT:ExportSupportingDocumentDetailID. IssueDate may be optional, is a date a supporting document was issued, and may be based on datatype CDT:Date. ValidityEndDate may be optional, is a date a validity of a supporting document ends, and may be based on datatype CDT:Date. LicenceWriteOffAmount may be optional, is an amount to write off of a license for an export declaration item, and may be based on datatype CDT:Amount. LicenceWriteOffQuantity may be optional, is a quantity to write off of a licence for an export declaration item, and may be based on datatype CDT: Quantity. LicenceWriteOffQuantityTypeCode may be optional, is a type of a LicenceWriteOffQuantity, and may be based on datatype GDT:QuantityTypeCode.

The ExportDeclarationItemPreviousDocument package includes the PreviousDocument entity. PreviousDocument is a document that proves prior export-relevant processing of an item. PreviousDocument includes the following non-node elements: ExportPreviousDocumentTypeCode, ExportPreviousDocumentID, and ExportPreviousDocumentDescription. ExportPreviousDocumentTypeCode may be optional, is a type of a previous document, and may be based on datatype GDT:ExportPreviousDocumentTypeCode. ExportPreviousDocumentID may be optional, is an identifier for a previous document, and may be based on datatype GDT:ExportPreviousDocumentID. ExportPreviousDocumentDescription may be optional, is a description of a previous document, and may be based on datatype GDT:LANGUAGEINDEPENDENT_MEDIUM_Description.

The ExportDeclarationItemCustomsWarehouseDischarge package includes the CustomsWarehouseDischarge entity. CustomsWarehouseDischarge includes references and information for discharging an item from a customs warehouse. CustomsWarehouseDischarge includes the following non-node elements: ClosingPortionTotalNumberValue and CustomsAuthorisationID. ClosingPortionTotalNumberValue may be optional, is a total number of closing portions in a customs warehouse discharge, and may be based on datatype GDT:NumberValue. CustomsAuthorisationID may be optional, is an identifier for a customs authorization of an exporter for using a customs warehouse, and may be based on datatype GDT: CustomsAuthorisationID.

The ExportDeclarationItemCustomsWarehouseDischarge package may include the node element ClosingPortion in a 1:CN cardinality relationship. ClosingPortion is a closing portion of a customs warehouse discharge. ClosingPortion includes the following non-node elements: OrdinalNumberValue, CustomsProcessCustomsAuthorityID, CustomsDeclarationItemCustomsAuthorityID, CustomsCommodityClassificationCode, UsualFormsOfHandlingAppliedIndicator, ElectronicallyReportedIndicator, Description, OriginalQuantity, OriginalQuantityTypeCode, Quantity, and QuantityTypeCode.

OrdinalNumberValue may be optional, is an ordinal number to order closing portions of a customs warehouse discharge, and may be based on datatype GDT:OrdinalNumberValue. CustomsProcessCustomsAuthorityID may be optional, is an identifier for a customs process with which goods to be discharged are stored in a customs warehouse, and may be based on datatype GDT: CustomsProcessID. CustomsDeclarationItemCustomsAuthorityID may be optional, is an identifier of an item in a previous customs declaration with which goods to be discharged are stored in a customs warehouse, and may be based on datatype GDT: CustomsDeclarationItemCustomsAuthorityID. CustomsCommodityClassificationCode may be optional, is a classification of goods to be discharged, and may be based on datatype GDT: CustomsCommodityClassificationCode.

UsualFormsOfHandlingAppliedIndicator may be optional, indicates whether usual forms of handling have been applied to goods to be discharged, and may be based on datatype CDT:Indicator. ElectronicallyReportedIndicator may be optional, indicates whether a customs declaration with which goods to be discharged are stored in a customs warehouse, may be given electronically, and may be based on datatype CDT:Indicator. Description may be optional, is a natural language description of a closing portion, and may be based on datatype GDT:Description. OriginalQuantity may be optional, is an item portion to close with a closing portion, may be given with a unit of measure with which goods were originally reported, and may be based on datatype CDT: Quantity. OriginalQuantityTypeCode may be optional, is a type of an item portion to close with a closing portion, may be given with a unit of measure with which goods were originally reported, and may be based on datatype GDT:QuantityTypeCode. Quantity may be optional, is an item portion to close with a closing portion, may be given with a unit of measure with which goods are measured at a time of discharge, and may be based on datatype CDT:Quantity. QuantityTypeCode may be optional, is a type of an item portion to close with a closing portion, may be given with a unit of measure with which goods are measured at a time of discharge, and may be based on datatype GDT: QuantityTypeCode.

The ExportDeclarationItemInwardProcessingDischarge package includes the InwardProcessingDischarge entity. InwardProcessingDischarge includes references and information for discharging an item from inward processing. InwardProcessingDischarge includes the following non-node elements: ClosingPortionTotalNumberValue and CustomsAuthorisationID. ClosingPortionTotalNumberValue may be optional, is a total number of closing portions of an inward processing discharge, and may be based on datatype GDT: NumberValue. CustomsAuthorisationID may be optional, is an identifier of a customs authorisation of an exporter for inward processing, and may be based on datatype GDT: CustomsAuthorisationID.

ExportDeclarationItemInwardProcessingDischarge may include the ClosingPortion node element in a 1:CN cardinality relationship. The ExportDeclarationItemInwardProcessingDischargeIlemInwardProcessingClosingPortion package includes the ClosingPortion entity. ClosingPortion is a closing portion of an inward processing discharge. ClosingPortion includes the following non-node elements: OrdinalNumberValue, CustomsProcessCustomsAuthorityID, CustomsDeclarationItemCustomsAuthorityID, ElectronicallyReportedIndicator, and Description.

OrdinalNumberValue may be optional, is an ordinal number used to order closing portions, and may be based on datatype GDT: OrdinalNumberValue. CustomsProcessCustomsAuthorityID may be optional, is an identifier of a customs process that stated that goods are subject to inward processing, and may be based on datatype GDT: CustomsProcessID. CustomsDeclarationItemCustomsAuthorityID may be optional, is an identifier of an item in a customs declaration that stated that goods are subject to inward processing, and may be based on datatype GDT: CustomsDeclarationItemCustomsAuthorityID. ElectronicallyReportedIndicator may be optional, indicates whether a statement that goods are subject to inward processing was given electronically, and may be based on datatype CDT:Indicator. Description may be optional, is a description of a closing portion, and may be based on datatype GDT:Description.

Figures 1, 35:
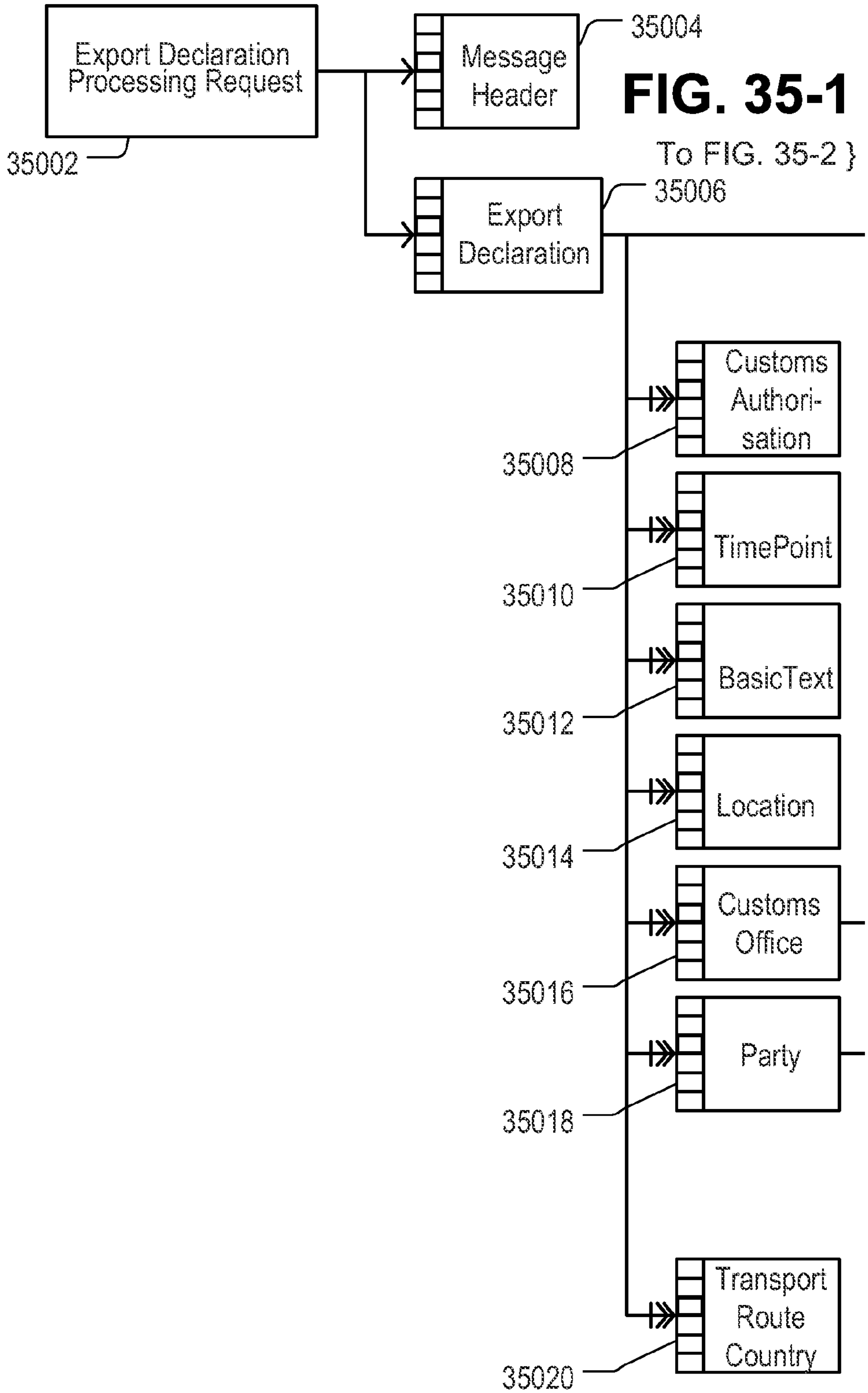
Figures 2, 35:
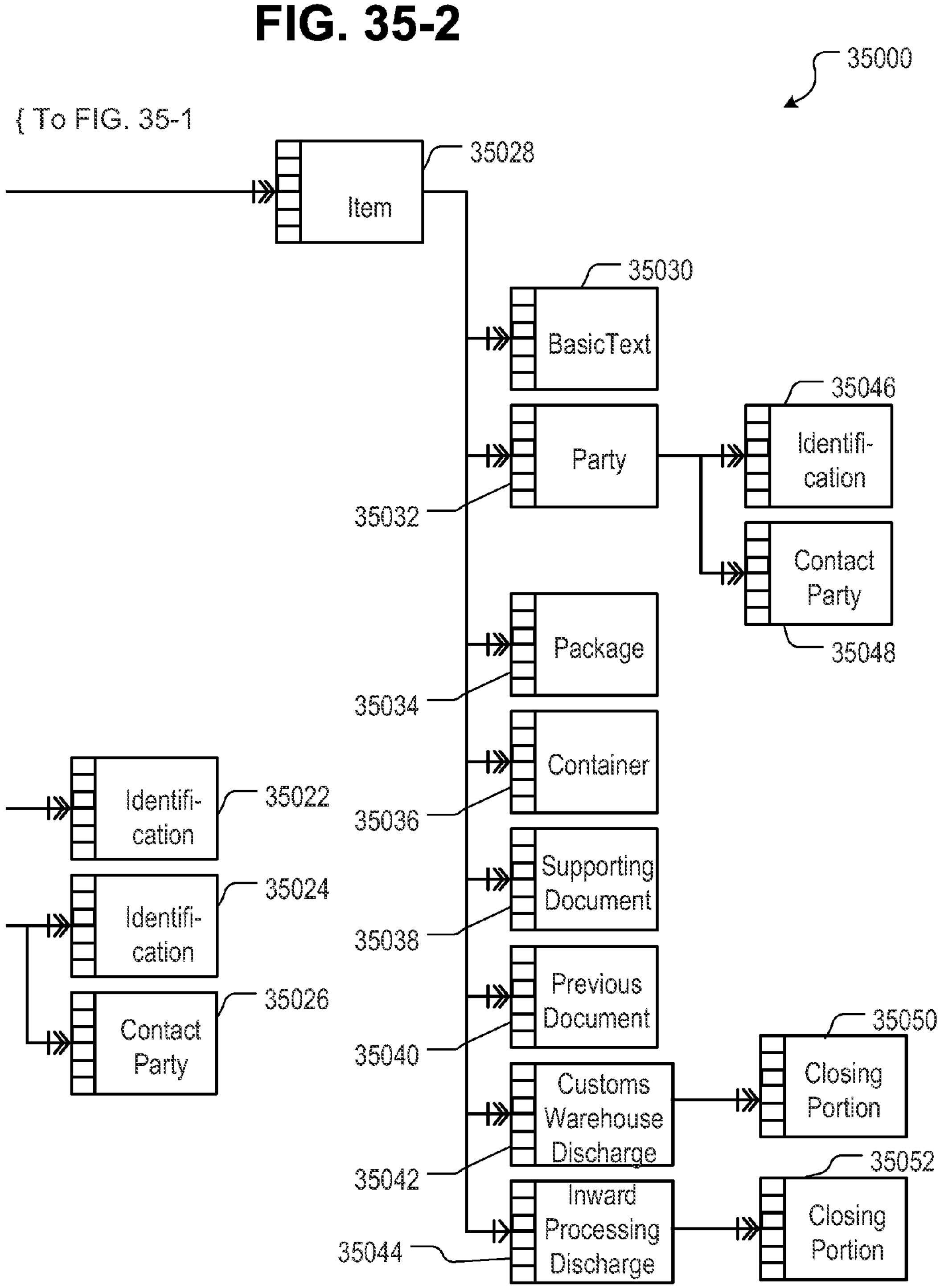

FIGS. 35-1 through 35-2 depict an example Export Declaration Processing Request Message Data Type 35000, which comprises elements 35002-35052, hierarchically related as shown. For example, the Export Declaration Processing Request 35002 includes a Message Header 35004.

The message type Export Declaration Processing Request is derived from a business object Export Declaration as a leading object together with its operation signature. The message type Export Declaration Processing Request is a request for processing an export declaration. The structure of the message type Export Declaration Processing Request is determined by a message data type ExportDeclarationProcessingRequestMessage. The message data type ExportDeclarationProcessingRequestMessage includes an object ExportDeclaration which is included in a business document, business information that is relevant for sending a business document in a message, the MessageHeader package, and the ExportDeclaration package. The message data type ExportDeclarationProcessingRequestMessage provides a structure for the Export Declaration Processing Request message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The ExportDeclaration package is a grouping of ExportDeclaration with its CustomsAuthorisation, TimePoint, BasicText, Location, CustomsOffice, Party, TransportRouteCountry, and Item and with the ExportDeclaration entity. ExportDeclaration is a business transaction document including data for a declaration to a customs authority for exporting goods according to legal requirements. ExportDeclaration includes the following non-node elements: ExportMessageSubTypeCode, ExportMessageID, ExportMessageReferenceID, CustomsAuthorityCountryCode, MajorVersionCustomsAuthorityID, MinorVersionCustomsAuthorityID, MainTestCaseID, SubTestCaseID, CustomsMessageExchangeServerFileID, CustomsProcessID, CustomsProcessPartyID, CustomsProcessCustomsAuthorityID, ExportDeclarationTypeCode, ExportTypeCode, ExportExportingCountryCode, ExportDestinationCountryCode, ExportSpecialCircumstancesCode, ExportTransportCostPaymentFormCode, ContainerUsedIndicator, ExportPartyRepresentationCode, ItemTotalNumberValue, TotalGrossWeightQuantity, TotalGrossWeightQuantityTypeCode, ConsignmentExportID, InlandExportTransportModeCode, CrossBorderExportTransportModeCode, CrossBorderExportTransportMeansTypeCode, CrossBorderTransportMeansID, ExportCrossBorderTransportMeansNationalityCode, ExportBusinessTransactionTypeCode, InvoiceTotalNetAmount, ExportIncotermsClassificationCode, ExportIncotermsClassificationDescription, IncotermsTransferLocationName, and CustomsAuthenticationID.

ExportMessageSubTypeCode may be optional, is an internal type of a message, and may be based on datatype GDT: ExportMessageSubTypeCode. ExportMessageID may be optional, is an identifier for a message, and may be based on datatype GDT:CustomsProcessMessageID. ExportMessageReferenceID includes one or more identifiers of previous messages referenced by a message, and may be based on datatype GDT:CustomsProcessMessageID. CustomsAuthorityCountryCode may be optional, is a country in which a customs authority to which a processing request is sent is situated, and may be based on datatype GDT:CountryCode. MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and is an identifier for a main test case. If a message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional, is an identifier for a sub test case. If a message is sent as part of a test case, SubTestCaseID provides an identifier of a subordinate test case. Test cases and their identifiers may be issued by a customs authority. SubTestCaseID may be based on datatype GDT:TestCaseID. CustomsMessageExchangeServerFileID may be optional, is an identifier for a file a message is stored in on a message exchange server that communicates with a customs authority, and may be based on datatype GDT:CustomsMessageExchangeServerFileID. CustomsProcessID may be optional, is an identifier for an export, may be assigned internally, and may be based on datatype GDT:CustomsProcessID. CustomsProcessPartyID may be optional, is an identifier for an export, may be assigned by a third party, and may be based on datatype GDT: CustomsProcessID. CustomsProcessCustomsAuthorityID may be optional, is an identifier for an export, may be assigned by a customs authority, and may be based on datatype GDT:CustomsProcessID. ExportDeclarationTypeCode may be optional, is a type of an export declaration, and may be based on datatype GDT:ExportDeclarationTypeCode. ExportTypeCode may be optional, is a type of an export, and may be based on datatype GDT:ExportTypeCode. ExportExportingCountryCode may be optional, is a country from which goods are exported, and may be based on datatype GDT:ExportExportingCountryCode. ExportDestinationCountryCode may be optional, is a country to which goods are exported, and may be based on datatype GDT: ExportDestinationCountryCode. ExportSpecialCircumstancesCode may be optional, documents special circumstances accompanying an export, and may be based on datatype GDT:ExportSpecialCircumstancesCode. ExportTransportCostPaymentFormCode may be optional, is a payment form for a transport cost of an export, and may be based on datatype GDT:ExportTransportCostPaymentFormCode. ContainerUsedIndicator may be optional, indicates whether export goods are shipped in containers, and may be based on datatype CDT:Indicator. ExportPartyRepresentationCode may be optional, is a representation situation of parties involved in an export, and may be based on datatype GDT: ExportPartyRepresentationCode. ItemTotalNumberValue may be optional, is a total number of items in an export declaration, and may be based on datatype GDT:NumberValue. TotalGrossWeightQuantity may be optional, is a total gross weight of export declaration items, and may be based on datatype CDT:Quantity. TotalGrossWeightQuantityTypeCode may be optional, is a type of a total gross weight of export declaration items, and may be based on datatype GDT: QuantityTypeCode. ConsignmentExportID may be optional, is an identifier for a consignment underlying an export, and may be based on datatype GDT:ConsignmentExportID. InlandExportTransportModeCode may be optional, is a transport mode used to move an export goods in inland, and may be based on datatype GDT:ExportTransportModeCode. CrossBorderExportTransportModeCode may be optional, is a transport mode used to move export goods across a border, and may be based on datatype GDT:ExportTransportModeCode. CrossBorderExportTransportMeansTypeCode may be optional, is a transport means used to move export goods across a border, and may be based on datatype GDT:ExportTransportMeansTypeCode. CrossBorderTransportMeansID may be optional, is an identifier for a transport means used to move export goods across a border, and may be based on datatype GDT:TransportMeansID_V1. ExportCrossBorderTransportMeansNationalityCode may be optional, is a nationality of a transport means used to move export goods across a border, and may be based on datatype GDT:ExportCrossBorderTransportMeansNationalityCode. ExportBusinessTransactionTypeCode may be optional, is a type of a business transaction underlying an export, and may be based on datatype GDT:ExportBusinessTransactionTypeCode. InvoiceTotalNetAmount may be optional, is a total net amount of an invoice underlying an export, and may be based on datatype CDT:Amount. ExportIncotermsClassificationCode may be optional, is a classification of incoterms underlying an export, and may be based on datatype GDT: ExportIncotermsClassificationCode. ExportIncotermsClassificationDescription may be optional, is a description of incoterms underlying an export, and may be based on datatype GDT:LANGUAGEINDEPENDENT_LONG_Description. IncotermsTransferLocationName may be optional, is a name of a transfer location of incoterms underlying an export, and may be based on datatype CDT:MEDIUM_Name. CustomsAuthenticationID may be optional, is an authentication identifier for communicating with a customs authority, and may be based on datatype GDT: CustomsAuthenticationID.

ExportDeclaration may include the node element CustomsAuthorisation in a 1:C cardinality relationship, the node element TimePoint in a 1:CN cardinality relationship, the node element BasicText in a 1:CN cardinality relationship, the node element Location in a 1:CN cardinality relationship, the node element CustomsOffice in a 1:CN cardinality relationship, the node element Party in a 1:CN cardinality relationship, the node element TransportRouteCountry in a 1:CN cardinality relationship, and the node element Item in a 1:CN cardinality relationship.

The ExportDeclarationCustomsAuthorisation package includes the CustomsAuthorisation entity. CustomsAuthorisation is a document that authorizes an exporter to use simplifications in exports. CustomsAuthorisation includes the following non-node elements: CustomsAuthorisationTypeCode and CustomsAuthorisationID. CustomsAuthorisationTypeCode may be optional, is a type of a customs authorization, and may be based on datatype GDT: CustomsAuthorisationTypeCode. CustomsAuthorisationID may be optional, is an identifier for a customs authorization, may be issued by a customs authority, and may be based on datatype GDT: CustomsAuthorisationID.

The ExportDeclarationTimePoint package includes the TimePoint entity. TimePoint is a time point at which some processing of an export declaration took place, takes place or will take place. TimePoint includes the following non-node elements: TimePointRoleCode, DateTime, and Date. TimePointRoleCode may be optional, is a role a time point plays in processing of an export declaration, and may be based on datatype GDT:TimePointRoleCode. DateTime may be optional, is a date and time of a time point, and may be based on datatype CDT:LOCAL_DateTime. Date may be optional, is a date of a time point, and may be based on datatype CDT:Date.

The ExportDeclarationBasicText package includes the BasicText entity. BasicText includes natural language text that describes an export declaration or specifies an export. BasicText is typed by datatype TextCollectionBasicText. The ExportDeclarationLocation package includes the Location entity. Location is a location related to processing of an export declaration. Location includes the following non-node elements: LocationRoleCategoryCode, CustomsAuthorityID, Address, and PostalRegulationsCompliantStreetDescription. LocationRoleCategoryCode may be optional, is a role a location plays in the processing of an export declaration, and may be based on datatype GDT:LocationRoleCategoryCode. CustomsAuthorityID may be optional, is an identifier for a location, may be issued by a customs authority, and may be based on datatype GDT:LocationPartyID. Address may be optional, is an address of a location, and may be based on datatype GDT:Address. PostalRegulationsCompliantStreetDescription may be optional, includes a street and house identifier of a location, may be formatted to comply with postal regulations of a country in which a location is situated, and may be based on datatype GDT:LANGUAGEINDEPENDENT_MEDIUM_Description.

The ExportDeclarationCustomsOffice package includes a CustomsOffice entity. CustomsOffice is a customs office involved in an export. CustomsOffice includes the RoleCategoryCode non-node element, which may be optional, is a role a customs office plays in processing of an export declaration, and may be based on datatype GDT:PartyRoleCategoryCode. The ExportCustomsOffice package may include the node element Identification in a 1:CN cardinality relationship. The ExportCustomsOfficeIdentification package includes the Identification entity. Identification is an identifier of a customs office. Identification includes the following non-node elements: PartyIdentifierTypeCode and PartyID. PartyIdentifierTypeCode may be optional, is a type code of an identifier for a customs office, and may be based on datatype GDT:PartyIdentifierTypeCode. PartyID may be optional, is an identifier for a customs office, and may be based on datatype GDT:NOALPHANUMERICCONVERSION_PartyID.

The ExportDeclarationParty package includes the Party entity. Party is a natural or legal person involved in an export as exporter or product recipient or acting on behalf of an exporter or product recipient. Party includes the following non-node elements: RoleCategoryCode, PostalRegulationsCompliantStreetDescription, and Address. RoleCategoryCode may be optional, is role a party plays in processing of an export declaration, and may be based on datatype GDT:PartyRoleCategoryCode. Address may be optional, is an address of a party, and may be based on datatype GDT:Address. PostalRegulationsCompliantStreetDescription may be optional, is a street and house identifier, may be formatted to comply with postal regulations in a country a party is situated in, and may be based on datatype GDT:LANGUAGEINDEPENDENT_MEDIUM_Description. The ExportParty package may include the Identification node element in a 1:CN cardinality relationship and the ContactParty node element in a 1:C cardinality relationship.

The ExportDeclarationPartyPartyIdentification package includes the Identification entity. Identification is an identifier for a party. Identification includes the following non-node elements: PartyIdentifierTypeCode and PartyID. PartyIdentifierTypeCode may be optional, is a type of an identifier of a party, and may be based on datatype GDT:PartyIdentifierTypeCode. PartyID may be optional, is an identifier for a party, and may be based on datatype GDT:NOALPHANUMERICCONVERSION_PartyID.

The ExportDeclarationPartyPartyContactParty package includes the ContactParty entity. The ContactParty entity is a contact for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

The ExportDeclarationTransportRouteCountry package includes the TransportRouteCountry entity. TransportRouteCountry is a country an export starts in, passes through, or ends in. TransportRouteCountry includes the following non-node elements: OrdinalNumberValue and ExportTransportRouteCountryCode. OrdinalNumberValue may be optional, is an ordinal number used order countries of a transport route in an order in which they are passed by an export, and may be based on datatype GDT:OrdinalNumberValue. ExportTransportRouteCountryCode may be optional, is a single country of a transport route, and may be based on datatype GDT:ExportTransportRouteCountryCode. A sequence of all TransportRouteCountries in an ExportDeclaration represents a transport route. An OrdinalNumberValue may be used to order the TransportRouteCountries in sequence. The same country can appear more than once in a ordered list of countries.

The ExportDeclarationItem package includes the Item entity. Item is an item in an export declaration. Item includes the following non-node elements: CustomsAuthorityID, Description, CustomsProcessPartyID, ConsignmentExportID, NetWeightQuantity, Net WeightQuantityTypeCode, Gross WeightQuantity, GrossWeightQuantityTypeCode, CustomsCommodityClassificationCode, ExportProcedureTypeCode, ExportPreviousProcedureTypeCode, ExportAdditionalProcedureTypeCode, OriginExportRegionCode, DangerousGoodsID, ExportTransportCostPaymentFormCode, LegalComplianceQuantity, LegalComplianceQuantityTypeCode, and LegalComplianceAmount. CustomsAuthorityID may be optional, is an identifier for an export declaration item, may follow a schema specified by a customs authority, and may be based on datatype GDT:CustomsDeclarationItemCustomsAuthorityID. Description may be optional, is a description of an export declaration item in natural language, and may be based on datatype GDT:Description. CustomsProcessPartyID may be optional, is an identifier for an export, may be assigned internally, and may be based on datatype GDT:CustomsProcessID. ConsignmentExportID may be optional, is an identifier for a consignment underlying an export, and may be based on datatype GDT: ConsignmentExportID. NetWeightQuantity may be optional, is the net weight quantity of an item, and may be based on datatype CDT:Quantity. NetWeightQuantityTypeCode may be optional, is a type of net weight quantity of an item, and may be based on datatype GDT:QuantityTypeCode. GrossWeightQuantity may be optional, is the gross weight of an item, and may be based on datatype CDT:Quantity. GrossWeightQuantityTypeCode may be optional, is a type of gross weight of an item, and may be based on datatype GDT: QuantityTypeCode. CustomsCommodityClassificationCode may be optional, is a classification of an exported commodity according to specifications by a customs authority, and may be based on datatype GDT: CustomsCommodityClassificationCode. ExportProcedureTypeCode may be optional, is an export procedure to use for an item, and may be based on datatype GDT:ExportProcedureTypeCode. ExportPreviousProcedureTypeCode may be optional, is a customs procedure that was previously applied to an item, and may be based on datatype GDT:ExportPreviousProcedureTypeCode. ExportAdditionalProcedureTypeCode may be optional, is an additional export procedure to use for an item, and may be based on datatype GDT:ExportAdditionalProcedureTypeCode. OriginExportRegionCode may be optional, is a region of origin of an export item, and may be based on datatype GDT:ExportRegionCode.

DangerousGoodsID may be optional, is an identifier for a risk and kind of danger posed by an item, and may be based on datatype GDT:DangerousGoodsID. ExportTransportCostPaymentFormCode may be optional, is a payment form for a transport cost of an export, and may be based on datatype GDT:ExportTransportCostPaymentFormCode. LegalComplianceQuantity may be optional, is a quantity of an item, may be formatted to comply with legal regulations, and may be based on datatype CDT:Quantity. LegalComplianceQuantityTypeCode may be optional, is a type of a quantity of an item, may be formatted to comply with legal regulations, and may be based on datatype GDT:QuantityTypeCode. LegalComplianceAmount may be optional, is an amount of an item, may be formatted to comply with legal regulations, and may be based on datatype CDT:Amount.

ExportDeclarationItem may include the node element BasicText in a 1:CN cardinality relationship, the node element Party in a 1:CN cardinality relationship, the node element Package in a 1:CN cardinality relationship, the node element Container in a 1:CN cardinality relationship, the node element SupportingDocument in a 1:CN cardinality relationship, the node element PreviousDocument in a 1:CN cardinality relationship, the node element CustomsWarehouseDischarge in a 1:C cardinality relationship, and the node element InwardProcessingDischarge in a 1:C cardinality relationship.

The ExportDeclarationItemBasicText package includes the BasicText entity. BasicText includes natural language text that describes an item or provides additional information for an item. BasicText is typed by datatype TextCollectionBasicText.

The ExportDeclarationItemParty package includes the Party entity. Party is a party involved in an export of an item. Party includes the following non-node elements: RoleCategoryCode, Address, and PostalRegulationsCompliantStreetDescription. RoleCategoryCode may be optional, is a role a party plays in an export of an item, and may be based on datatype GDT:PartyRoleCategoryCode. Address may be optional, is an address of a party, and may be based on datatype GDT:Address. PostalRegulationsCompliantStreetDescription may be optional, is a street and house identifier of a party, may be formatted to comply with local postal regulations in a country a party is situated in, and may be based on datatype GDT:LANGUAGEINDEPENDENT_MEDIUM_Description. Party may include an Identification node element in a 1:CN cardinality relationship and a ContactParty node element in a 1:C cardinality relationship.

The ExportDeclarationItemPartyIdentification package includes the Identification entity. Identification is an identifier for a party. Identification includes the following non-node elements: PartyIdentifierTypeCode and PartyID. PartyIdentifierTypeCode may be optional, is a type of a party identifier, and may be based on datatype GDT:PartyIdentifierTypeCode. PartyID may be optional, is an identifier for a party, and may be based on datatype GDT:NOALPHANUMERICCONVERSION_PartyID. The ExportDeclarationItemPartyContactParty package includes the ContactParty entity. ContactParty is a contact party for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

The ExportDeclarationItemPackage package includes the Package entity. Package is a package an item is packed in. Package includes the following non-node elements: OrdinalNumberValue, ElementNumberValue, ExportpackageTypeCode, and PackageExportID. OrdinalNumberValue may be optional, is an ordinal number used to order packages, and may be based on datatype GDT:OrdinalNumberValue. ElementNumberValue may be optional, is the number of physical containers in a package, and may be based on datatype GDT:NumberValue. ExportPackageTypeCode may be optional, is a type of a physical container in a package, and may be based on datatype GDT:ExportPackageTypeCode. PackageExportID may be optional, is an identifier for a physical container in a package, and may be based on datatype GDT:PackageExportID.

The ExportDeclarationItemContainer package includes the Container entity. Container is a container an item is packed in. Container includes the ContainerExportID non-node element, which may be optional, is an identifier for a container, and may be based on datatype GDT: ContainerExportID. The ExportDeclarationItemSupportingDocument package includes the SupportingDocument entity. SupportingDocument is a document providing additional information used to export an item. SupportingDocument includes the following non-node elements: ExportSupportingDocumentTypeCode, ExportSupportingDocumentID, ExportSupportingDocumentAddendumID, ExportSupportingDocumentDetailID, IssueDate, ValidityEndDate, LicenceWriteOffAmount, LicenceWriteOffQuantity, and LicenceWriteOffQuantityTypeCode.

ExportSupportingDocumentTypeCode may be optional, is a type of a supporting document, and may be based on datatype GDT:ExportSupportingDocumentTypeCode.

ExportSupportingDocumentID may be optional, is an identifier for a supporting document, and may be based on datatype GDT:ExportSupportingDocumentID. ExportSupportingDocumentAddendumID may be optional, is an identifier for an addendum of a supporting document, and may be based on datatype GDT:ExportSupportingDocumentAddendumID. ExportSupportingDocumentDetailID may be optional, is an identifier for a detail of a supporting document, and may be based on datatype GDT:ExportSupportingDocumentDetailID. IssueDate may be optional, is a date a supporting document was issued, and may be based on datatype CDT:Date. ValidityEndDate may be optional, is a date a validity of a supporting document ends, and may be based on datatype CDT:Date. LicenceWriteOffAmount may be optional, is an amount to write off of a licence for an export declaration item, and may be based on datatype CDT:Amount. LicenceWriteOffQuantity may be optional, is a quantity to write off of a licence for an export declaration item, and may be based on datatype CDT: Quantity. LicenceWriteOffQuantityTypeCode may be optional, is a type of a LicenceWriteOffQuantity, and may be based on datatype GDT:QuantityTypeCode.

The ExportDeclarationItemPreviousDocument package includes the PreviousDocument entity. PreviousDocument is a document that proves prior export-relevant processing of an item. PreviousDocument includes the following non-node elements: ExportPreviousDocumentTypeCode, ExportPreviousDocumentID, and ExportPreviousDocumentDescription. ExportPreviousDocumentTypeCode may be optional, is a type of a previous document, and may be based on datatype GDT:ExportPreviousDocumentTypeCode. ExportPreviousDocumentID may be optional, is an identifier for a previous document, and may be based on datatype GDT:ExportPreviousDocumentID. ExportPreviousDocumentDescription may be optional, is a description of a previous document, and may be based on datatype GDT:LANGUAGEINDEPENDENT_MEDIUM_Description.

The ExportDeclarationItemCustomsWarehouseDischarge package includes the CustomsWarehouseDischarge entity. CustomsWarehouseDischarge includes references and information for discharging an item from a customs warehouse. CustomsWarehouseDischarge includes the following non-node elements: ClosingPortionTotalNumberValue and CustomsAuthorisationID. ClosingPortionTotalNumberValue may be optional, is a total number of closing portions in a customs warehouse discharge, and may be based on datatype GDT:NumberValue. CustomsAuthorisationID may be optional, is an identifier for a customs authorization of an exporter for using a customs warehouse, and may be based on datatype GDT: CustomsAuthorisationID.

The ExportDeclarationItemCustomsWarehouseDischarge package may include the node element ClosingPortion in a 1:CN cardinality relationship. ClosingPortion is a closing portion of a customs warehouse discharge. ClosingPortion includes the following non-node elements: OrdinalNumberValue, CustomsProcessCustomsAuthorityID, CustomsDeclarationItemCustomsAuthorityID, CustomsCommodityClassificationCode, UsualFormsOfHandlingAppliedIndicator, ElectronicallyReportedIndicator, Description, OriginalQuantity, OriginalQuantityTypeCode, Quantity, and QuantityTypeCode.

OrdinalNumberValue may be optional, is an ordinal number to order closing portions of a customs warehouse discharge, and may be based on datatype GDT:OrdinalNumberValue. CustomsProcessCustomsAuthorityID may be optional, is an identifier for a customs process with which goods to be discharged are stored in a customs warehouse, and may be based on datatype GDT: CustomsProcessID. CustomsDeclarationItemCustomsAuthorityID may be optional, is an identifier of an item in a previous customs declaration with which goods to be discharged are stored in a customs warehouse, and may be based on datatype GDT: CustomsDeclarationItemCustomsAuthorityID. CustomsCommodityClassificationCode may be optional, is a classification of goods to be discharged, and may be based on datatype GDT: CustomsCommodityClassificationCode. UsualFormsOfHandlingAppliedIndicator may be optional, indicates whether usual forms of handling have been applied to goods to be discharged, and may be based on datatype CDT:Indicator. ElectronicallyReportedIndicator may be optional, indicates whether a customs declaration with which goods to be discharged are stored in a customs warehouse, may be given electronically, and may be based on datatype CDT:Indicator. Description may be optional, is a natural language description of a closing portion, and may be based on datatype GDT:Description. OriginalQuantity may be optional, is an item portion to close with a closing portion, may be given with a unit of measure with which goods were originally reported, and may be based on datatype CDT: Quantity. OriginalQuantityTypeCode may be optional, is a type of an item portion to close with a closing portion, may be given with a unit of measure with which goods were originally reported, and may be based on datatype GDT:QuantityTypeCode. Quantity may be optional, is an item portion to close with a closing portion, may be given with a unit of measure with which goods are measured at a time of discharge, and may be based on datatype CDT:Quantity. QuantityTypeCode may be optional, is a type of an item portion to close with a closing portion, may be given with a unit of measure with which goods are measured at a time of discharge, and may be based on datatype GDT: QuantityTypeCode.

The ExportDeclarationItemInwardProcessingDischarge package includes the InwardProcessingDischarge entity. InwardProcessingDischarge includes references and information for discharging an item from inward processing. InwardProcessingDischarge includes the following non-node elements: ClosingPortionTotalNumberValue and CustomsAuthorisationID. ClosingPortionTotalNumberValue may be optional, is a total number of closing portions of an inward processing discharge, and may be based on datatype GDT: NumberValue. CustomsAuthorisationID may be optional, is an identifier of a customs authorisation of an exporter for inward processing, and may be based on datatype GDT: CustomsAuthorisationID.

ExportDeclarationItemInwardProcessingDischarge may include the ClosingPortion node element in a 1:CN cardinality relationship. The ExportDeclarationItemInwardProcessingDischargeIlemInwardProcessingClosingPortion package includes the ClosingPortion entity. ClosingPortion is a closing portion of an inward processing discharge. ClosingPortion includes the following non-node elements: OrdinalNumberValue, CustomsProcessCustomsAuthorityID, CustomsDeclarationItemCustomsAuthorityID, ElectronicallyReportedIndicator, and Description. OrdinalNumberValue may be optional, is an ordinal number used to order closing portions, and may be based on datatype GDT: OrdinalNumberValue. CustomsProcessCustomsAuthorityID may be optional, is an identifier of a customs process that stated that goods are subject to inward processing, and may be based on datatype GDT: CustomsProcessID. CustomsDeclarationItemCustomsAuthorityID may be optional, is an identifier of an item in a customs declaration that stated that goods are subject to inward processing, and may be based on datatype GDT: CustomsDeclarationItemCustomsAuthorityID. ElectronicallyReportedIndicator may be optional, indicates whether a statement that goods are subject to inward processing was given electronically, and may be based on datatype CDT:Indicator. Description may be optional, is a description of a closing portion, and may be based on datatype GDT:Description.

Figure 36:
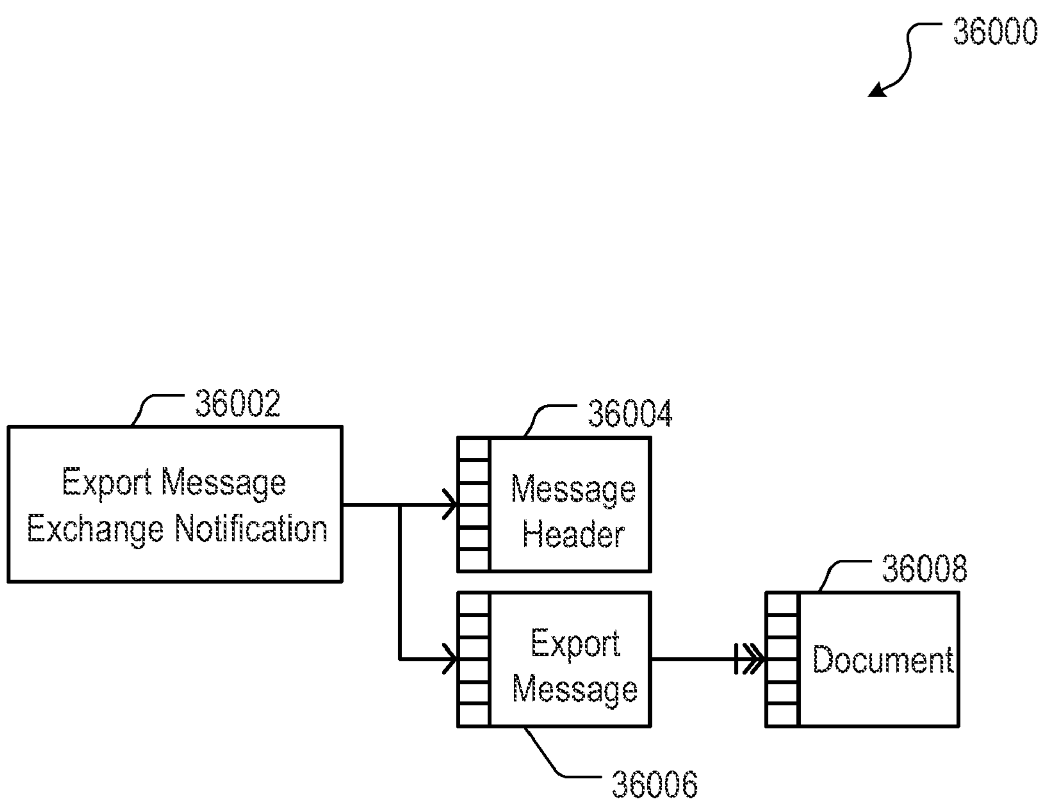
FIG. 36 depicts an example Export Message Exchange Notification Message Data Type.

FIG. 36 depicts an example Export Message Exchange Notification Message Data Type 36000, which comprises elements 36002-36008, hierarchically related as shown. For example, the Export Message Exchange Notification 36002 includes a Message Header 36004.

The message type Export Message Exchange Notification is derived from a business object Export Message_Virtual Object as a leading object together with its operation signature. The message type Export Message Exchange Notification is a notification about an export message exchange. The structure of the message type Export Message Exchange Notification is determined by a message data type ExportMessageExchangeNotificationMessage. The message data type ExportMessageExchangeNotificationMessage includes an object ExportMessage which is included in a business document, business information that is relevant for sending a business document in a message, the MessageHeader package, and the ExportMessage package. The message data type ExportMessageExchangeNotificationMessage provides a structure for the Export Message Exchange Notification message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty.

MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The ExportMessage package is a grouping of ExportMessage with its Document package and with the ExportMessage entity. ExportMessage is a business document including information on an exchange status of an export message. ExportMessage includes the following non-node elements: CustomsMessageExchangeServerFileReferenceID, ExportMessageID, ExportMessageReferenceID, CommunicationDateTime, and ExportMessageCommunicationStatusCode.

CustomsMessageExchangeServerFileReferenceID may be optional, is an identifier of a file on a message exchange server that includes an export message whose exchange status is given in a message, and may be based on datatype GDT: CustomsMessageExchangeServerFileID. ExportMessageID may be optional, is an identifier of a message, and may be based on datatype GDT:CustomsProcessMessageID. ExportMessageReferenceID includes one or more identifiers of messages referenced by a message, and may be based on datatype GDT:CustomsProcessMessageID. CommunicationDateTime may be optional, is a date and time a message was communicated to or from a customs authority, and may be based on datatype CDT:GLOBAL_DateTime. ExportMessageCommunicationStatusCode may be optional, is an exchange status of an export message, and may be based on datatype GDT:ExportMessageCommunicationStatusCode.

The ExportMessage package includes the Document node elements in a 1:CN cardinality relationship. The ExportMessageDocument package includes the Document entity. Document is a document attached to a message. Document includes the following non-node elements: DocumentTypeCode and FileContentBinaryObject. DocumentTypeCode may be optional, is a type of a document, and may be based on datatype GDT:DocumentTypeCode. FileContentBinaryObject may be optional, includes binary content of a document, and may be based on datatype CDT:BinaryObject.

Figure 37:
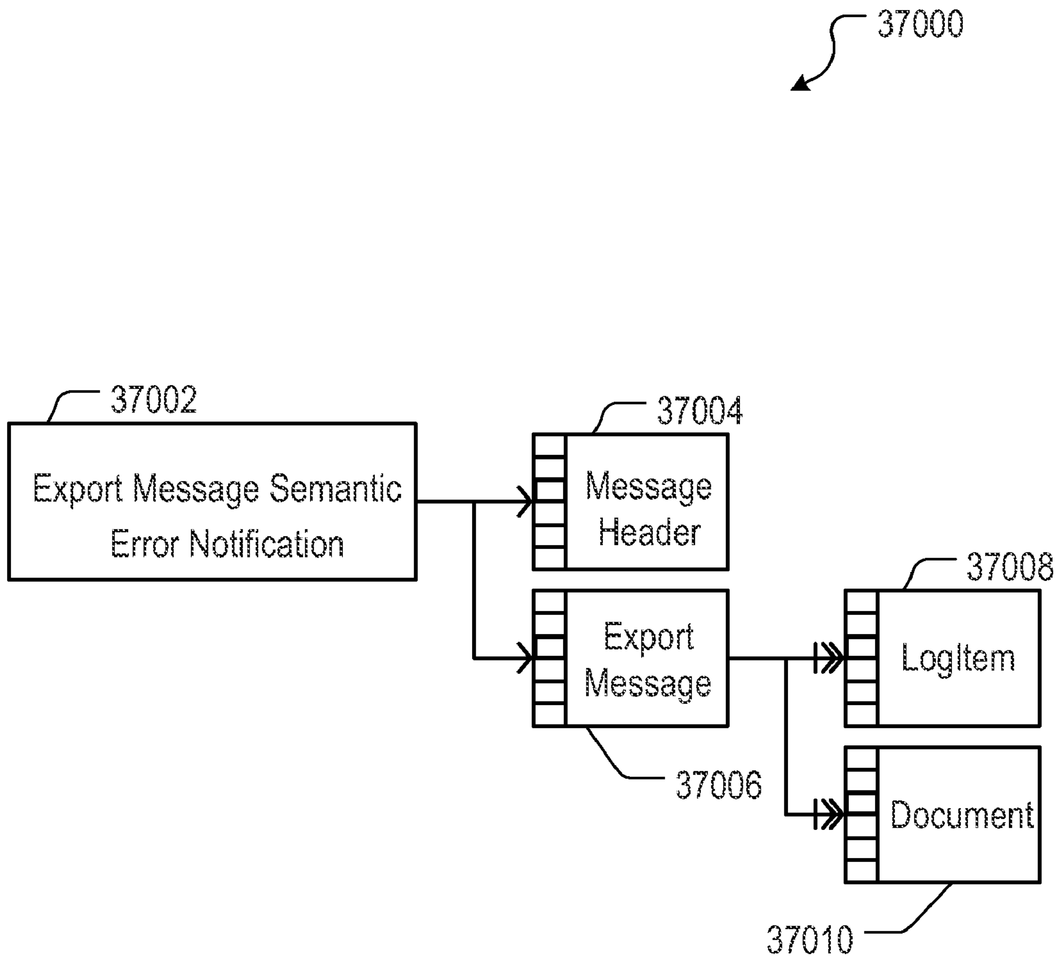
FIG. 37 depicts an example Export Message Semantic Error Notification Message Data Type.

FIG. 37 depicts an example Export Message Semantic Error Notification Message Data Type 37000, which comprises elements 37002-37010, hierarchically related as shown. For example, the Export Message Semantic Error Notification 37002 includes a Message Header 37004.

The message type Export Message Semantic Error Notification is derived from a business object Export Message_Virtual Object as a leading object together with its operation signature. The message type Export Message Semantic Error Notification is a notification about a semantic error in an export message. The structure of the message type Export Message Semantic Error Notification is determined by a messagedata type ExportMessageSemanticErrorNotificationMessage. The messagedata type ExportMessageSemanticErrorNotificationMessage includes an object ExportMessage which is included in a business document, business information that is relevant for sending a business document in a message, the MessageHeader package, and the ExportMessage package. The message data type ExportMessageSemanticErrorNotificationMessage provides a structure for the Export Message Semantic Error Notification message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty.

MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The ExportMessage package is a grouping of ExportMessage with its Log and Document packages and with the ExportMessage entity. ExportMessage is a business document including information on processing of a message related to an export of goods or services. ExportMessage includes the following non-node elements: ExportMessage- SubTypeCode, ExportMessageID, ExportMessageReferenceID MajorVersionCustomsAuthorityID, MinorVersionCustomsAuthorityID, MainTestCaseID, SubTestCaseID, CustomsProcessID, CustomsProcessPartyID, CustomsProcessCustomsAuthorityID, and CommunicationDateTime.

ExportMessageSubTypeCode may be optional, is an internal type of a message, and may be based on datatype GDT: ExportMessageSubTypeCode. ExportMessageID may be optional, is an identifier of a message, and may be based on datatype GDT:CustomsProcessMessageID. ExportMessageReferenceID includes one or more identifiers of messages referenced by a message and may be based on datatype GDT:CustomsProcessMessageID. MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and may be an identifier for a main test case. If a message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional and is an identifier for a sub test case. If a message is sent as part of a test case, SubTestCaseID provides an identifier of a subordinate test case. Test cases and their identifiers may be issued by a customs authority. SubTestCaseID may be based on datatype GDT:TestCaseID. CustomsProcessID may be optional, is an identifier for an export, may be assigned internally, and may be based on datatype GDT:CustomsProcessID. CustomsProcessPartyID may be optional, is an identifier for an export, may be assigned by a third party, and may be based on datatype GDT:CustomsProcessID. CustomsProcessCustomsAuthorityID may be optional, is an identifier for an export, may be assigned by a customs authority, and may be based on datatype GDT:CustomsProcessID. CommunicationDateTime may be optional, is a date and time a message was communicated by a customs authority, and may be based on datatype CDT:GLOBAL_DateTime.

The ExportMessage package includes a LogItem node element in a 1:CN cardinality relationship and a Document node element in a 1:CN cardinality relationship. ExportMessageLog package includes the LogItem entity. LogItem is a log entry on an error that occurred during the processing of a message. LogItem is typed by datatype LogItem. The ExportMessageDocument package includes the Document entity. Document is a document attached to a message. Document includes the following non-node elements: DocumentTypeCode and FileContentBinaryObject. DocumentTypeCode may be optional, is a type of a document, and may be based on datatype GDT:DocumentTypeCode. FileContentBinaryObject may be optional, includes binary content of a document, and may be based on datatype CDT:BinaryObject.

Figure 38:
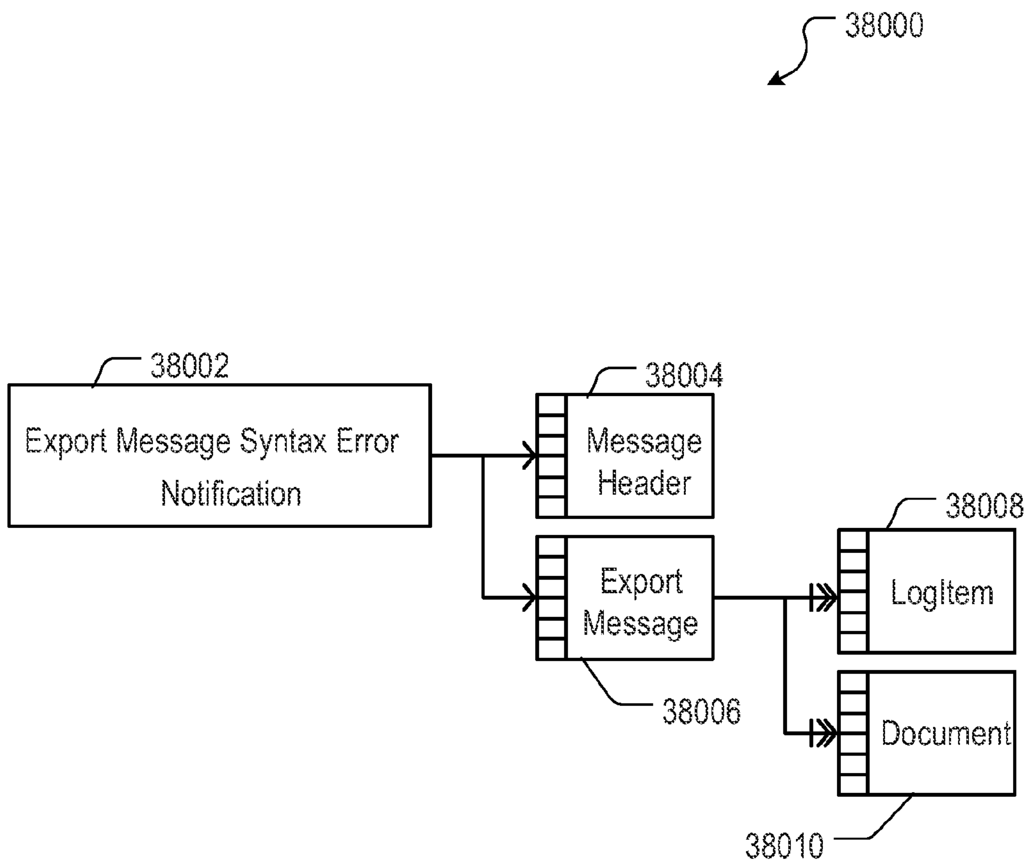
FIG. 38 depicts an example Export Message Syntax Error Notification Message Data Type.

FIG. 38 depicts an example Export Message Syntax Error Notification Message Data Type 38000, which comprises elements 38002-38010, hierarchically related as shown. For example, the Export Message Syntax Error Notification 38002 includes a Message Header 38004.

The message type Export Message Syntax Error Notification is derived from a business object Export Message_Virtual Object as a leading object together with its operation signature. The message type Export Message Syntax Error Notification is a notification about a syntax error in an export message. The structure of the message type Export Message Syntax Error Notification is determined by a messagedata type ExportMessageSyntaxErrorNotificationMessage. The messagedata type ExportMessageSyntaxErrorNotificationMessage includes an object ExportMessage which is included in a business document, business information that is relevant for sending a business document in a message, the MessageHeader package, and the ExportMessage package. The message data type ExportMessageSyntaxErrorNotificationMessage provides a structure for the message type Export Message Syntax Error Notification and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty.

MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The ExportMessage package is a grouping of ExportMessage with its Log and Document packages and with the ExportMessage entity. ExportMessage is a business document including information on processing of a message related to an export of goods or services. ExportMessage includes the following non-node elements: ExportMessageSubTypeCode, ExportMessageID, ExportMessageReferenceID, MajorVersionCustomsAuthorityID, MinorVersionCustomsAuthorityID, MainTestCaseID, SubTestCaseID, CommunicationDateTime, and CustomsMessageExchangeServerFileReferenceID.

ExportMessageSubTypeCode may be optional, is an internal type of a message, and may be based on datatype GDT: ExportMessageSubTypeCode. ExportMessageID may be optional, is an identifier of a message, and may be based on datatype GDT:CustomsProcessMessageID. ExportMessageReferenceID includes one or more identifiers of messages referenced by a message, and may be based on datatype GDT:CustomsProcessMessageID. MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and is an identifier for a main test case. If a message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional and is an identifier for a sub test case. If a message is sent as part of a test case, SubTestCaseID provides an identifier of a subordinate test case. Test cases and their identifiers may be issued by a customs authority. SubTestCaseID may be based on datatype GDT:TestCaseID.

CommunicationDateTime may be optional, is a date and time a message was communicated by a customs authority, and may be based on datatype CDT:GLOBAL_DateTime. CustomsMessageExchangeServerFileReferenceID may be optional, is an identifier of a file on a message exchange server in that an error occurred, and may be based on datatype GDT: CustomsMessageExchangeServerFileID.

ExportMessage may include a LogItem node element in a 1:CN cardinality relationship and a Document node element in a 1:CN cardinality relationship. The ExportMessageLog package includes the LogItem entity. LogItem is a log entry on an error that occurred during message processing. LogItem is typed by LogItem. The ExportMessageDocument package includes the Document entity. Document is a document attached to a message. Document includes the following non-node elements: DocumentTypeCode and FileContentBinaryObject. DocumentTypeCode may be optional, is a type of a document, and may be based on datatype GDT:DocumentTypeCode. FileContentBinaryObject may be optional, includes binary content of a document, and may be based on datatype CDT:BinaryObject.

Figure 39:
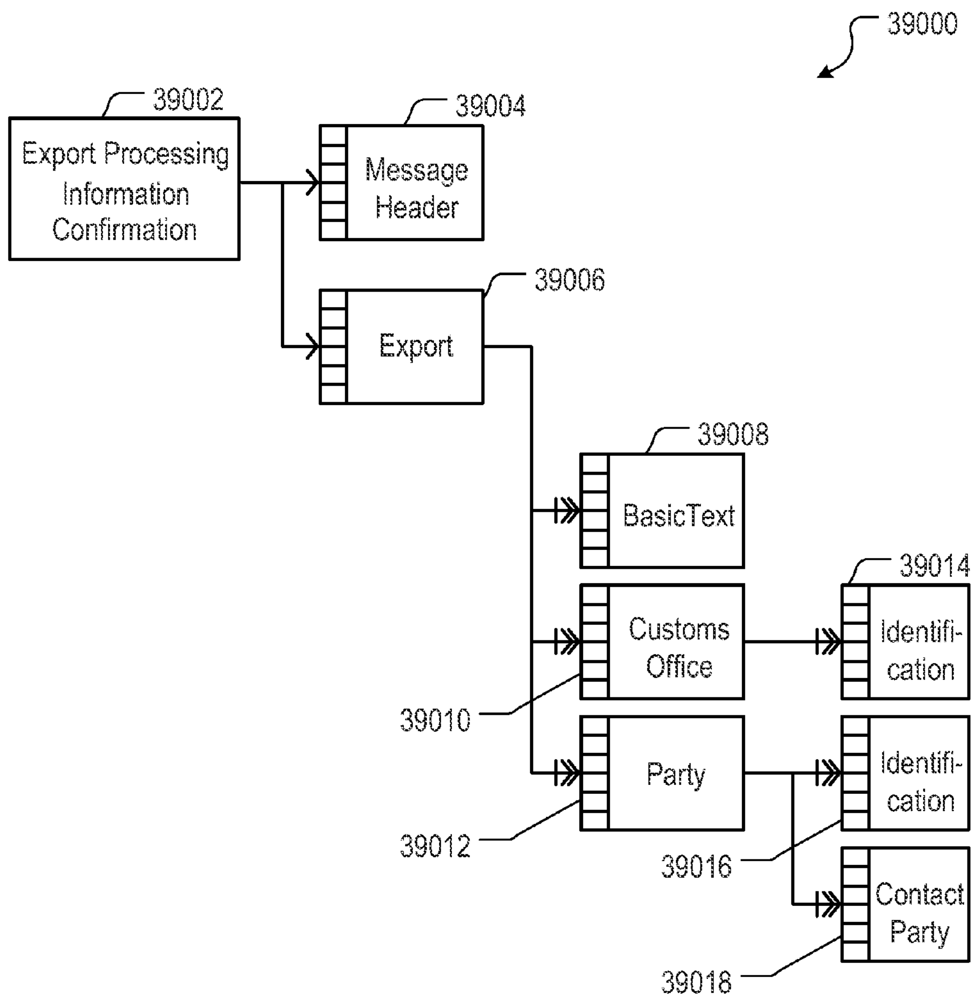
FIG. 39 depicts an example Export Processing Information Confirmation Message Data Type.

FIG. 39 depicts an example Export Processing Information Confirmation Message Data Type 39000, which comprises elements 39002-39018, hierarchically related as shown. For example, the Export Processing Information Confirmation 39002 includes a Message Header 39004.

The message type Export Processing Information Confirmation is derived from a business object Export_Virtual Object as a leading object together with its operation signature. The message type Export Processing Information Confirmation is a confirmation to a request for export processing information. The structure of the message type Export Processing Information Confirmation is determined by a message data type ExportProcessingInformationConfirmationMessage. The message data type ExportProcessingInformationConfirmationMessage includes an object Export which is included in a business document, business information that is relevant for sending a business document in a message, the MessageHeader package, and the Export package. The message data type ExportProcessingInformationConfirmationMessage provides a structure for the message type Export Processing Information Confirmation and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The Export package is a grouping of Export with its BasicText, CustomsOffice, and Party packages and with the Export entity. Export is a business transaction document including data on an export. Export includes the following non-node elements: ExportMessageSubTypeCode, ExportMessageID, ExportMessageReferenceID, CustomsAuthorityCountryCode, MajorVersionCustomsAuthorityID, MinorVersionCustomsAuthorityID, MainTestCaseID, SubTestCaseID, CustomsMessageExchangeServerFileID, CustomsProcessCustomsAuthorityID, ExportExitStatusCode, and CustomsAuthenticationID.

ExportMessageSubTypeCode may be optional, is an internal type of a message, and may be based on datatype GDT: ExportMessageSubTypeCode. ExportMessageID may be optional, is an identifier of a message, and may be based on datatype GDT:CustomsProcessMessageID. ExportMessageReferenceID includes one or more identifiers of messages referenced by a message and may be based on datatype GDT:CustomsProcessMessageID. CustomsAuthorityCountryCode may be optional, is a country in which a customs authority to which a processing request is sent is situated, and may be based on datatype GDT:CountryCode. MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and is an identifier for a main test case. If a message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional and is an identifier for a sub test case. If a message is sent as part of a test case, SubTestCaseID provides an identifier of a subordinate test case. Test cases and their identifiers may be issued by a customs authority. SubTestCaseID may be based on datatype GDT:TestCaseID. CustomsMessageExchangeServerFileID may be optional, is an identifier for a file a message is stored in on a message exchange server that communicates with a customs authority, and may be based on datatype GDT: CustomsMessageExchangeServerFileID. CustomsProcessCustomsAuthorityID may be optional, is an identifier for an export, assigned by a customs authority, and may be based on datatype GDT:CustomsProcessID. ExportExitStatusCode may be optional, is an exit status of an export, and may be based on datatype GDT: ExportExitStatusCode. CustomsAuthenticationID may be optional, is an authentication identifier for communicating with a customs authority, and may be based on datatype GDT: CustomsAuthenticationID.

Export may include a BasicText node element in a 1:CN cardinality relationship, a CustomsOffice node element in a 1:CN cardinality relationship, and a Party node element in a 1:CN cardinality relationship. The ExportBasicText package includes the BasicText entity. BasicText is natural language text that describes an export declaration or specifies an export. BasicText is typed by TextCollectionBasicText. The ExportCustomsOffice package includes the CustomsOffice entity. CustomsOffice is a customs office involved in an export. CustomsOffice includes a RoleCategoryCode node element, which may be optional, is a role a customs office plays in the processing of an export declaration, and may be based on datatype GDT:PartyRoleCategoryCode. ExportCustomsOffice may include an Identification node element in a 1:CN cardinality relationship. The ExportCustomsOfficeIdentification package includes the Identification entity. Identification is an identifier of a customs office. Identification includes the following non-node elements: PartyIdentifierTypeCode and PartyID. PartyIdentifierTypeCode may be optional, is a type code of an identifier for a customs office, and may be based on datatype GDT:PartyIdentifierTypeCode. PartyID may be optional, is an identifier for a customs office, and may be based on datatype GDT:NOALPHANUMERICCONVERSION_PartyID.

The ExportParty package includes the Party entity. Party is a natural or legal person involved in an export as exporter or product recipient or on behalf of an exporter or product recipient. Party includes the following non-node elements: RoleCategoryCode, Address, and PostalRegulationsCompliantStreetDescription. RoleCategoryCode may be optional, is a role a party plays in processing of an export declaration, and may be based on datatype GDT:PartyRoleCategoryCode. Address may be optional, is an address of a party, and may be based on datatype GDT:Address. PostalRegulationsCompliantStreetDescription may be optional, includes a street and house identifier, may be formatted to comply with postal regulations in a country a party is situated in, and may be based on datatype GDT:LANGUAGEINDEPENDENT_MEDIUM_Description. Party may include an Identification node element in a 1:CN cardinality relationship and a ContactParty node element in a 1:C cardinality relationship.

The ExportPartyPartyIdentification package includes the Identification entity. Identification is an identifier for a party. Identification includes the following non-node elements: PartyIdentifierTypeCode and PartyID. PartyIdentifierTypeCode may be optional, is a type of an identifier of a party, and may be based on datatype GDT:PartyIdentifierTypeCode. PartyID may be optional, is an identifier for a party, and may be based on datatype GDT:NOALPHANUMERICCONVERSION_PartyID. The ExportPartyPartyContactParty package includes the ContactParty entity. ContactParty is a contact for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

Figure 40:
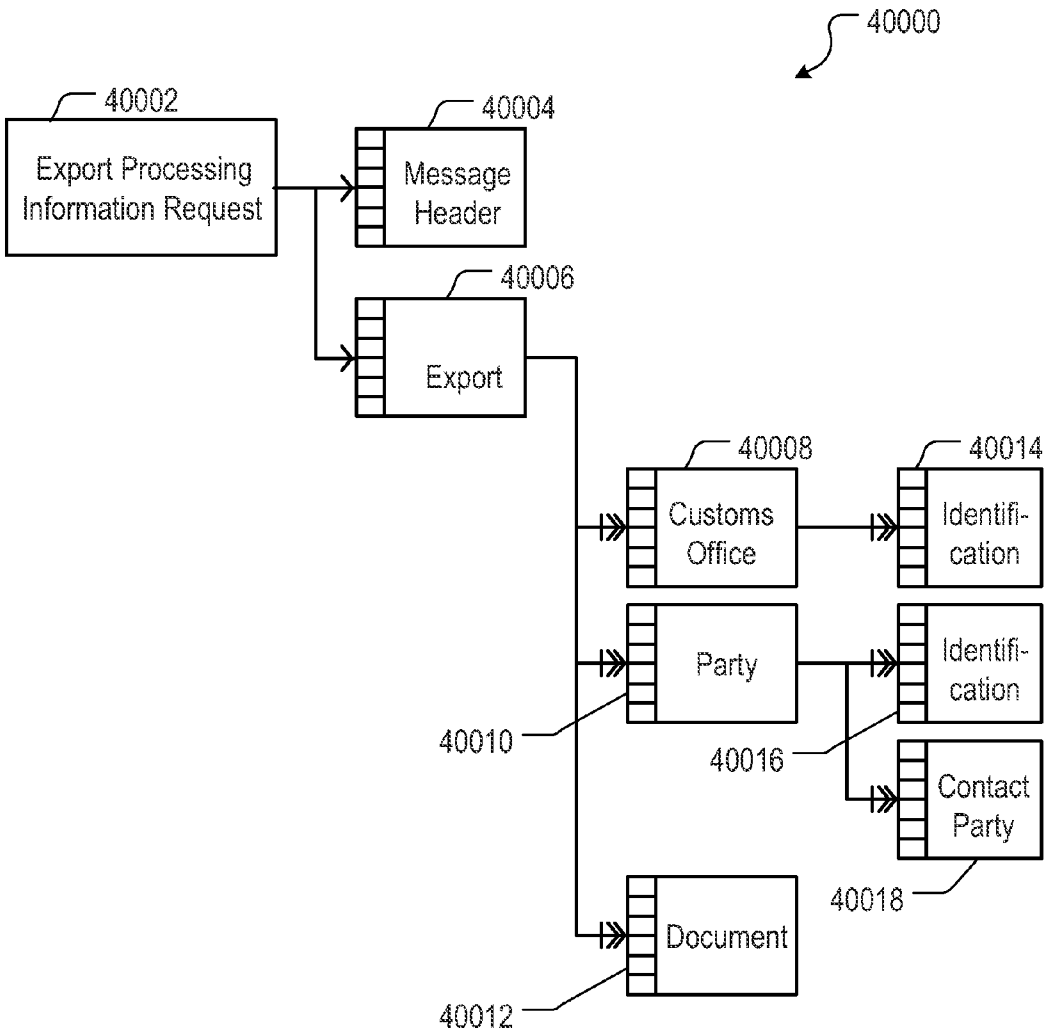
FIG. 40 depicts an example Export Processing Information Request Message Data Type.

FIG. 40 depicts an example Export Processing Information Request Message Data Type 40000, which comprises elements 40002-40018, hierarchically related as shown. For example, the Export Processing Information Request 40002 includes a Message Header 40004.

The message type Export Processing Information Request is derived from the business object Export_Virtual Object as a leading object together with its operation signature. The message type Export Processing Information Request is a request for export processing information. The structure of the message type Export Processing Information Request is determined by the message data type ExportProcessingInformationRequestMessage. The message data type ExportProcessingInformationRequestMessage includes an object Export which is included in a business document, business information that is relevant for sending a business document in a message, the MessageHeader package, and an Export package. The ExportProcessingInformationRequestMessage message data type provides a structure for an Export Processing Information Request message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The Export package is a grouping of Export with its CustomsOffice, Party, and Document packages and with an Export entity. Export is a business transaction document including data on an export. Export includes the following non-node elements: ExportMessageSubTypeCode, ExporMessageID, ExportMessageReferenceID, MajorVersionCustomsAuthorityID, MinorVersionCustomsAuthorityID, MainTestCaseID, SubTestCaseID, CustomsProcessID, CustomsProcessCustomsAuthorityID, ExportPartyRepresentationCode, CommunicationDateTime, RequestDate, and ResponseDeadlineDate.

ExportMessageSubTypeCode may be optional, is an internal type of a message, and may be based on datatype GDT:ExportMessageSubTypeCode. ExporMessageiD may be optional, is an identifier of a message, and may be based on datatype GDT:CustomsProcessMessageID. ExportMessageReferenceID includes one or more identifiers of messages referenced by a message and may be based on datatype GDT:CustomsProcessMessageID. MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and is an identifier for a main test case. In some implementations, if this message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional and is an identifier for a sub test case. In some implementations, if a message is sent as part of a test case, SubTestCaseID provides an identifier of a subordinate test case. Test cases and their identifiers may be issued by a customs authority. SubTestCaseID may be based on datatype GDT:TestCaseID. CustomsProcessID may be optional, is an identifier for an export, may be assigned internally, and may be based on datatype GDT:CustomsProcessID. CustomsProcessCustomsAuthorityID may be optional, is an identifier for an export, may be assigned by a customs authority, and may be based on datatype GDT:CustomsProcessID. ExportPartyRepresentationCode may be optional, is a representation of parties involved in an export, and may be based on datatype GDT: ExportPartyRepresentationCode. CommunicationDateTime may be optional, is a date and time at which a message was communicated from a customs authority, and may be based on datatype CDT:GLOBAL_DateTime. RequestDate may be optional, is a date information on processing of an export was requested by a customs authority, and may be based on datatype CDT:Date. ResponseDeadlineDate may be optional, is a date until which a customs authority expects an answer on its information request, and may be based on datatype CDT:Date. Export may include a CustomsOffice node element in a 1:CN cardinality relationship, a Party node element in a 1:CN cardinality relationship, and a Document node element in a 1:CN cardinality relationship.

The ExportCustomsOffice package includes the CustomsOffice entity. CustomsOffice is a customs office involved in an export. CustomsOffice includes the RoleCategoryCode non-node element, which may be optional, is a role a customs office plays in processing of an export declaration, and may be based on datatype GDT:PartyRoleCategoryCode. The ExportCustomsOffice package may include an Identification node element in a 1:CN cardinality relationship.

The ExportCustomsOfficeIdentification package includes the Identification entity. Identification is an identifier of a customs office. Identification includes the following non-node elements: PartyIdentifierTypeCode and PartyID. PartyIdentifierTypeCode may be optional, is a type code of an identifier for a customs office, and may be based on datatype GDT:PartyIdentifierTypeCode. PartyID may be optional, is an identifier for a customs office, and may be based on datatype GDT:NOALPHANUMERICCONVERSION_PartyID.

The ExportParty package includes the Party entity. Party is a natural or legal person involved in an export as exporter or product recipient or on behalf of an exporter or product recipient. Party includes the following non-node elements: RoleCategoryCode, Address, and PostalRegulationsCompliantStreetDescription. RoleCategoryCode may be optional, is a role a party plays in processing of an export declaration, and may be based on datatype GDT:PartyRoleCategoryCode. Address may be optional, is an address of a party, and may be based on datatype GDT:Address. PostalRegulationsCompliantStreetDescription may be optional, includes a street and house identifier, may be formatted to comply with postal regulations in a country a party is situated in, and may be based on datatype GDT:LANGUAGEINDEPENDENT_MEDIUM_Description. ExportPartyParty may include an Identification node element in a 1:CN cardinality relationship and a ContactParty node element in a 1:C cardinality relationship.

The ExportPartyPartyIdentification package includes the Identification entity. Identification is an identifier for a party. Identification includes the following non-node elements: PartyIdentifierTypeCode and PartyID. PartyIdentifierTypeCode may be optional, is a type of an identifier of a party, and may be based on datatype GDT:PartyIdentifierTypeCode. PartyID may be optional, is an identifier for a party, and may be based on datatype GDT:NOALPHANUMERICCONVERSION_PartyID.

The ExportPartyPartyContactParty package includes the ContactParty entity. ContactParty is a contact for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

The ExportDocument package includes the Document entity. Document is a document that is attached to a message. Document includes the following non-node elements: DocumentTypeCode and FileContentBinaryObject. DocumentTypeCode may be optional, is a type of a document, and may be based on datatype GDT:DocumentTypeCode. FileContentBinaryObject may be optional, includes binary content of a document, and may be based on datatype CDT:BinaryObject.

Figures 1, 41:
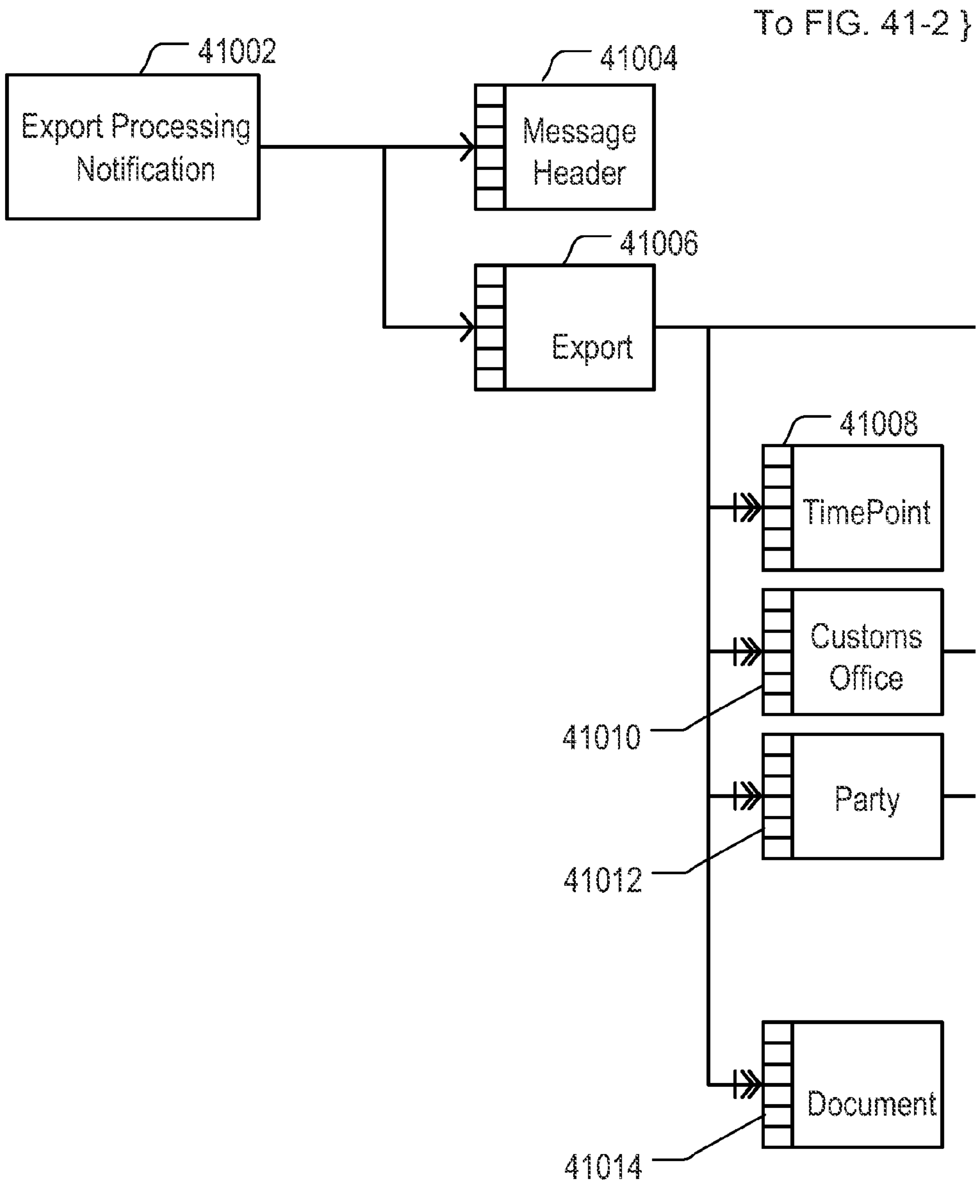
Figures 2, 41:
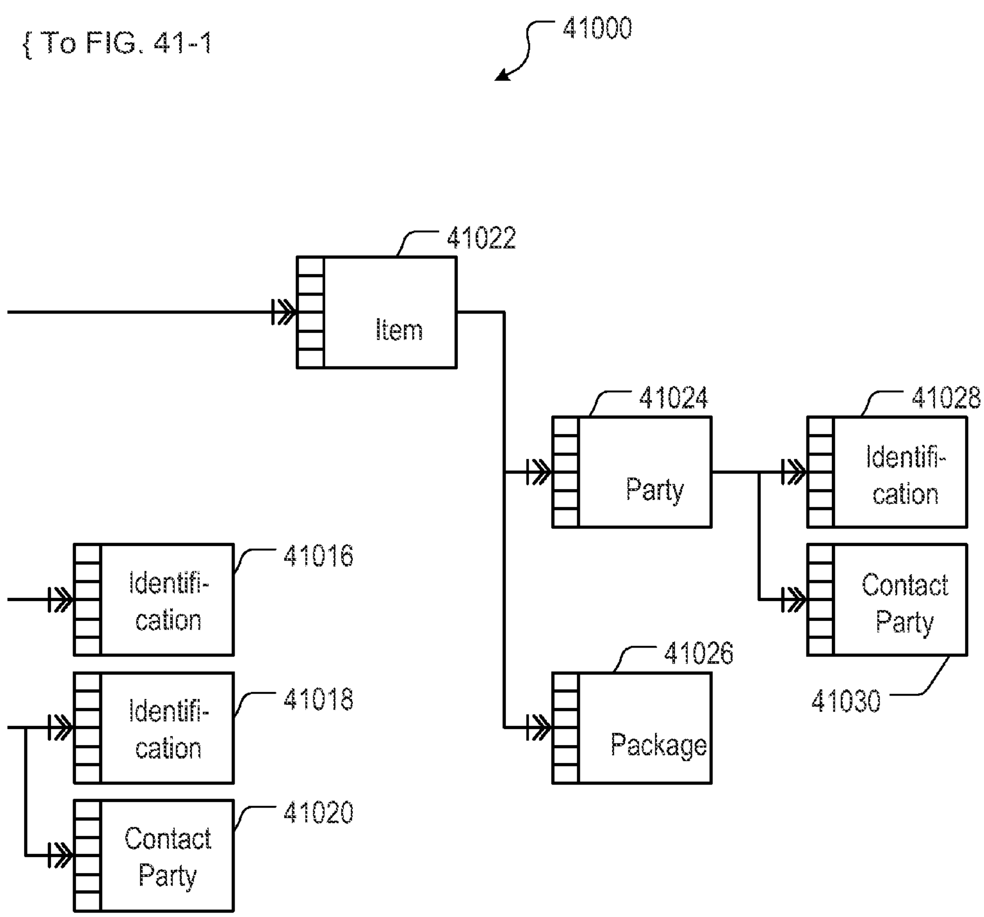

FIGS. 41-1 through 41-2 depict an example Export Processing Notification Message Data Type 41000, which comprises elements 41002-41030, hierarchically related as shown. For example, the Export Processing Notification 41002 includes a Message Header 41004.

The message type Export Processing Notification is derived from the business object Export_Virtual Object as a leading object together with its operation signature. The message type Export Processing Notification is a notification about export processing. The structure of the message type Export Processing Notification is determined by a message data type ExportProcessingNotificationMessage. The messagedata type ExportProcessingNotificationMessage includes the object Export which is included in a business document, business information that is relevant for sending a business document in a message, the MessageHeader package, and the Export package. The message data type ExportProcessingNotificationMessage provides a structure for the message type Export Processing Notification and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader and the following elements of the GDT are used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The Export package is a grouping of Export with its TimePoint, CustomsOffice, Party, Document, and Item packages and with the Export entity. The Export entity is a business transaction document including data about an export. Export includes the following non-node elements: ExportMessageSubTypeCode, ExportMessageID, ExportMessageReferenceID, MajorVersionCustomsAuthorityID, MinorVersion- CustomsAuthorityID, MainTestCaseID, SubTestCaseID, CustomsProcessID, CustomsProcessPartyID, CustomsProcessCustomsAuthorityID, ExportDeclarationTypeCode, ExportTypeCode, ExportExportingCountryCode, ExportDestinationCountryCode, ExportPartyRepresentationCode, ItemTotalNumberValue, TotalGrossWeightQuantity, TotalGrossWeightQuantityTypeCode, ConsignmentExportID, ExportBusinessTransactionTypeCode, InvoiceTotalNetAmount, ExportIncotermsClassificationCode, ExportIncotermsClassificationDescription, IncotermsTransferLocationName, CommunicationDateTime, ShortfallIndicator, and ExportExitConfirmationMethodCode.

ExportMessageSubTypeCode may be optional, is an internal type of a message, and may be based on datatype GDT: ExportMessageSubTypeCode. ExportMessageID may be optional, is an identifier of a message, and may be based on datatype GDT:CustomsProcessMessageID. ExportMessageReferenceID is one or more identifiers of messages referenced by a message and may be based on datatype GDT: CustomsProcessMessageID.

MajorVersionCustomsAuthorityID may be optional, is a major version of a message, may be issued by a customs authority, and may be based on datatype GDT:VersionPartyID. MinorVersionCustomsAuthorityID may be optional, is a minor version of a message, may be issued by a customs authority, and may be based on datatype GDT:VersionPartyID. MainTestCaseID may be optional and is an identifier for a main test case. If a message is sent as part of a test case, MainTestCaseID provides an identifier of a superordinate test case. Test cases and their identifiers may be issued by a customs authority. MainTestCaseID may be based on datatype GDT:TestCaseID. SubTestCaseID may be optional and is an identifier for a sub test case. If a message is sent as part of a test case, SubTestCaseID provides an identifier of a subordinate test case. Test cases and their identifiers may be issued by a customs authority. SubTestCaseID may be based on datatype GDT:TestCaseID. CustomsProcessID may be optional, is an identifier for an export, may be assigned internally, and may be based on datatype GDT:CustomsProcessID. CustomsProcessPartyID may be optional, is an identifier for an export, may be assigned by a third party, and may be based on datatype GDT: CustomsProcessID. CustomsProcessCustomsAuthorityID may be optional, is an identifier for an export, may be assigned by a customs authority, and may be based on datatype GDT:CustomsProcessID. ExportDeclarationTypeCode may be optional, is a type of an export declaration, and may be based on datatype GDT:ExportDeclarationTypeCode. ExportTypeCode may be optional, is a type of an export, and may be based on datatype GDT:ExportTypeCode. ExportExportingCountryCode may be optional, is a country from which goods are exported, and may be based on datatype GDT:ExportExportingCountryCode. ExportDestinationCountryCode may be optional, is a country to which goods are exported, and may be based on datatype GDT: ExportDestinationCountryCode. ExportPartyRepresentationCode may be optional, is a representation of parties involved in an export, and may be based on datatype GDT: ExportPartyRepresentationCode. ItemTotalNumberValue may be optional, is a total number of items in an export declaration, and may be based on datatype GDT:NumberValue. TotalGrossWeightQuantity may be optional, is a total gross weight of export declaration items, and may be based on datatype CDT:Quantity. TotalGrossWeightQuantityTypeCode may be optional, is a type of total gross weight of export declaration items, and may be based on datatype GDT:QuantityTypeCode. ConsignmentExportID may be optional, is an identifier for a consignment underlying an export, and may be based on datatype GDT:ConsignmentExportID. PackageTotalNumberValue may be optional, is the total number of packages in an export, and may be based on datatype GDT:NumberValue. ExportBusinessTransactionTypeCode may be optional, is a type of a business transaction underlying an export, and may be based on datatype GDT:ExportBusinessTransactionTypeCode. InvoiceTotalNetAmount may be optional, is the total net amount of an invoice underlying an export, and may be based on datatype CDT:Amount. ExportIncotermsClassificationCode may be optional, is a classification of an incoterms underlying an export, and may be based on datatype GDT:ExportIncotermsClassificationCode. ExportIncotermsClassificationDescription may be optional, is a description of an incoterms underlying an export, and may be based on datatype GDT:LANGUAGEINDEPENDENT_MEDIUM_Description. IncotermsTransferLocationName may be optional, is a name of a transfer location of an incoterms underlying an export, and may be based on datatype CDT:MEDIUM_Name. CommunicationDateTime may be optional, is a date and time a message was communicated by a customs authority, and may be based on datatype CDT:GLOBAL_DateTime. ShortfallIndicator may be optional, indicates whether a total quantity of goods that left a customs territory is less than a quantity originally declared in a corresponding export declaration, and may be based on datatype CDT:Indicator. ExportExitConfirmationMethodCode may be optional, is a method with which a confirmation that an export goods have crossed a border is given, and may be based on datatype GDT:ExportExitConfirmationMethodCode.

The Export package may include the node element TimePoint in a 1:CN cardinality relationship, a node element CustomsOffice in a 1:CN cardinality relationship, a node element Party in a 1:CN cardinality relationship, a node element Item in a 1:CN cardinality relationship, and a node element Document in a 1:CN cardinality relationship.

The ExportTimePoint package includes a TimePoint entity. TimePoint is a time point at which some processing of an export declaration took place, takes place or will take place. TimePoint includes the following non-node elements: TimePointRoleCode, DateTime, and Date. TimePointRoleCode may be optional, is a role a time point plays in processing of an export declaration, and may be based on datatype GDT:TimePointRoleCode. DateTime may be optional, is a date and time of a time point, and may be based on datatype CDT:LOCAL_DateTime. Date may be optional, is a date of a time point, and may be based on datatype CDT:Date.

The ExportCustomsOffice package includes a CustomsOffice entity. CustomsOffice is a customs office involved in an export. CustomsOffice includes the RoleCategoryCode non-node element, which may be optional, is a role a customs office plays in processing of an export declaration, and may be based on datatype GDT:PartyRoleCategoryCode. The ExportCustomsOffice package may include the node element Identification in a 1:CN cardinality relationship. The ExportCustomsOfficeIdentification package includes the Identification entity. Identification is an identifier of a customs office. Identification includes the following non-node elements: PartyIdentifierTypeCode and PartyID. PartyIdentifierTypeCode may be optional, is a type code of an identifier for a customs office, and may be based on datatype GDT:PartyIdentifierTypeCode. PartyID may be optional, is an identifier for a customs office, and may be based on datatype GDT:NOALPHANUMERICCONVERSION_PartyID.

The ExportParty package includes the Party entity. Party is a natural or legal person involved in an export as exporter or product recipient or acting on behalf of an exporter or product recipient. Party includes the following non-node elements: RoleCategoryCode, PostalRegulationsCompliantStreetDescription, and Address. RoleCategoryCode may be optional, is role a party plays in processing of an export declaration, and may be based on datatype GDT:PartyRoleCategoryCode. Address may be optional, is an address of a party, and may be based on datatype GDT:Address. PostalRegulationsCompliantStreetDescription may be optional, is a street and house identifier, may be formatted to comply with postal regulations in a country a party is situated in, and may be based on datatype GDT:LANGUAGEINDEPENDENT_MEDIUM_Description. The ExportParty package may include the Identification node element in a 1:CN cardinality relationship and the ContactParty node element in a 1:C cardinality relationship.

The ExportPartyPartyIdentification package includes the Identification entity. Identification is an identifier for a party. Identification includes the following non-node elements: PartyIdentifierTypeCode and PartyID. PartyIdentifierTypeCode may be optional, is a type of an identifier of a party, and may be based on datatype GDT:PartyIdentifierTypeCode. PartyID may be optional, is an identifier for a party, and may be based on datatype GDT:NOALPHANUMERICCONVERSION_PartyID.

The ExportPartyPartyContactParty package includes the ContactParty entity. The ContactParty entity is a contact for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

ExportDocument package includes the Document entity. Document is a document that is attached to a message. Document includes the following non-node elements: DocumentTypeCode and FileContentBinaryObject. DocumentTypeCode may be optional, is a type of a document, and may be based on datatype GDT:DocumentTypeCode. FileContentBinaryObject may be optional, is binary content of a document, and may be based on datatype CDT:BinaryObject.

ExportItem package includes the Item entity. Item is an item of an export. Item includes the following non-node elements: CustomsAuthorityID, Description, CustomsProcessPartyID, ConsignmentExportID, Net WeightQuantity, Net WeightQuantityTypeCode, GrossWeightQuantity, GrossWeightQuantityTypeCode, CustomsCommodityClassificationCode, ExportProcedureTypeCode, ExportPreviousProcedureTypeCode, and ExportAdditionalProcedureTypeCode.

CustomsAuthorityID may be optional, is an identifier for an export declaration item, may follow a schema specified by a customs authority, and may be based on datatype GDT: CustomsDeclarationItemCustomsAuthorityID. Description may be optional, is a description of an export declaration item in natural language, and may be based on datatype GDT: Description. CustomsProcessPartyID may be optional, is an identifier for an export, may be assigned internally, and may be based on datatype GDT:CustomsProcessID. ConsignmentExportID may be optional, is an identifier for a consignment underlying an export, and may be based on datatype GDT: ConsignmentExportID. NetWeightQuantity may be optional, is the net weight quantity of an item, and may be based on datatype CDT:Quantity. NetWeightQuantityTypeCode may be optional, is a type of net weight quantity of an item, and may be based on datatype GDT:QuantityTypeCode. GrossWeightQuantity may be optional, is the gross weight of an item, and may be based on datatype CDT:Quantity. GrossWeightQuantityTypeCode may be optional, is a type of gross weight of an item, and may be based on datatype GDT: QuantityTypeCode. CustomsCommodityClassificationCode may be optional, is a classification of an exported commodity according to specifications by a customs authority, and may be based on datatype GDT: CustomsCommodityClassificationCode. ExportProcedureTypeCode may be optional, is an export procedure to use for an item, and may be based on datatype GDT:ExportProcedureTypeCode. ExportPreviousProcedureTypeCode may be optional, is a customs procedure that was previously applied to an item, and may be based on datatype GDT:ExportPreviousProcedureTypeCode. ExportAdditionalProcedureTypeCode may be optional, is an additional export procedure to use for an item, and may be based on datatype GDT:ExportAdditionalProcedureTypeCode.

The ExportItem package may include a Party node element in a 1:CN cardinality relationship and a Package node element in a 1:CN cardinality relationship. The ExportItemParty package includes the Party entity. Party is a party involved in an export of an item. Party includes the following non-node elements: RoleCategoryCode, Address, and PostalRegulationsCompliantStreetDescription. RoleCategoryCode may be optional, is a role a party plays in an export of an item, and may be based on datatype GDT:PartyRoleCategoryCode. Address may be optional, is an address of a party, and may be based on datatype GDT:Address. PostalRegulationsCompliantStreetDescription may be optional, is a street and house identifier of a party, may be formatted to comply with local postal regulations in a country a party is situated in, and may be based on datatype GDT:LANGUAGEINDEPENDENT_MEDIUM_Description. Party may include an Identification node element in a 1:CN cardinality relationship and a ContactParty node element in a 1:C cardinality relationship.

The ExportItemPartyIdentification package includes the Identification entity. Identification is an identifier for a party. Identification includes the following non-node elements: PartyIdentifierTypeCode and PartyID. PartyIdentifierTypeCode may be optional, is a type of a party identifier, and may be based on datatype GDT:PartyIdentifierTypeCode. PartyID may be optional, is an identifier for a party, and may be based on datatype GDT:NOALPHANUMERICCONVERSION_PartyID. The ExportItemPartyContactParty package includes the ContactParty entity. ContactParty is a contact party for a party. ContactParty includes the following non-node elements: Address, BusinessPartnerFormattedName, FormattedConventionalPhoneNumberDescription, and FormattedFacsimileNumberDescription. Address may be optional, is an address of a contact party, and may be based on datatype GDT:Address. BusinessPartnerFormattedName may be optional, is a formatted name of a contact party, and may be based on datatype CDT:LANGUAGEINDEPENDENT_EXTENDED_Name. FormattedConventionalPhoneNumberDescription may be optional, is a formatted conventional phone number of a contact party, and may be based on datatype GDT:LANGUAGEINDEPENDENT_SHORT_Description. FormattedFacsimileNumberDescription may be optional, is a formatted facsimile number of a contact party, and may be based on datatype GDT:LANGUAGEINDEPENDENT_SHORT_Description.

The ExportItempackage package includes the Package entity. Package is a package an item is packed in. Package includes the following non-node elements: OrdinalNumberValue, ElementNumberValue, ExportpackageTypeCode, and PackageExportID. OrdinalNumberValue may be optional, is an ordinal number used to order packages, and may be based on datatype GDT:OrdinalNumberValue. ElementNumberValue may be optional, is the number of physical containers in a package, and may be based on datatype GDT:NumberValue. ExportPackageTypeCode may be optional, is a type of a physical container in a package, and may be based on datatype GDT:ExportPackageTypeCode. PackageExportID may be optional, is an identifier for a physical container in a package, and may be based on datatype GDT:PackageExportID.

Figures 1, 42:
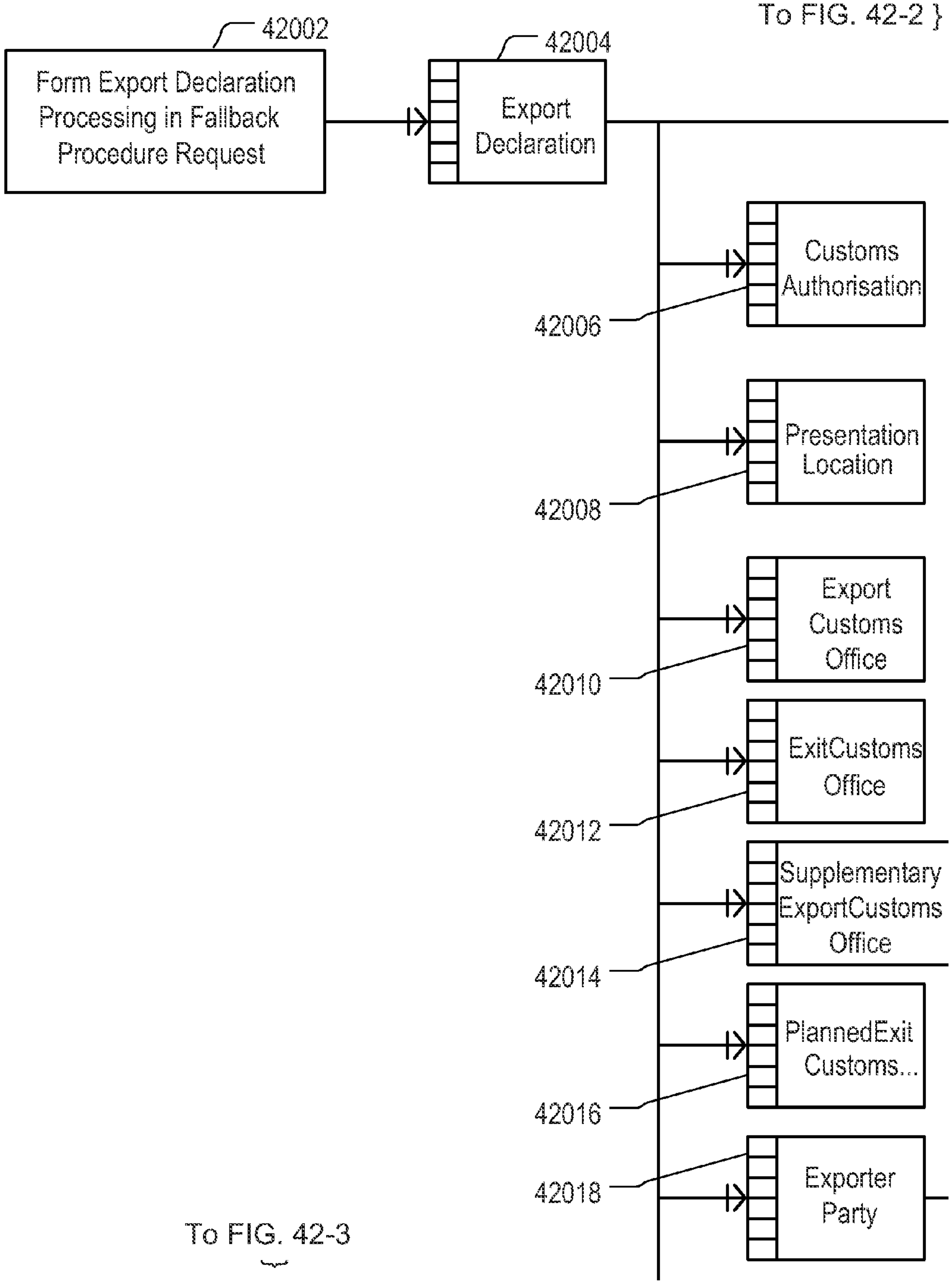
Figures 2, 42:
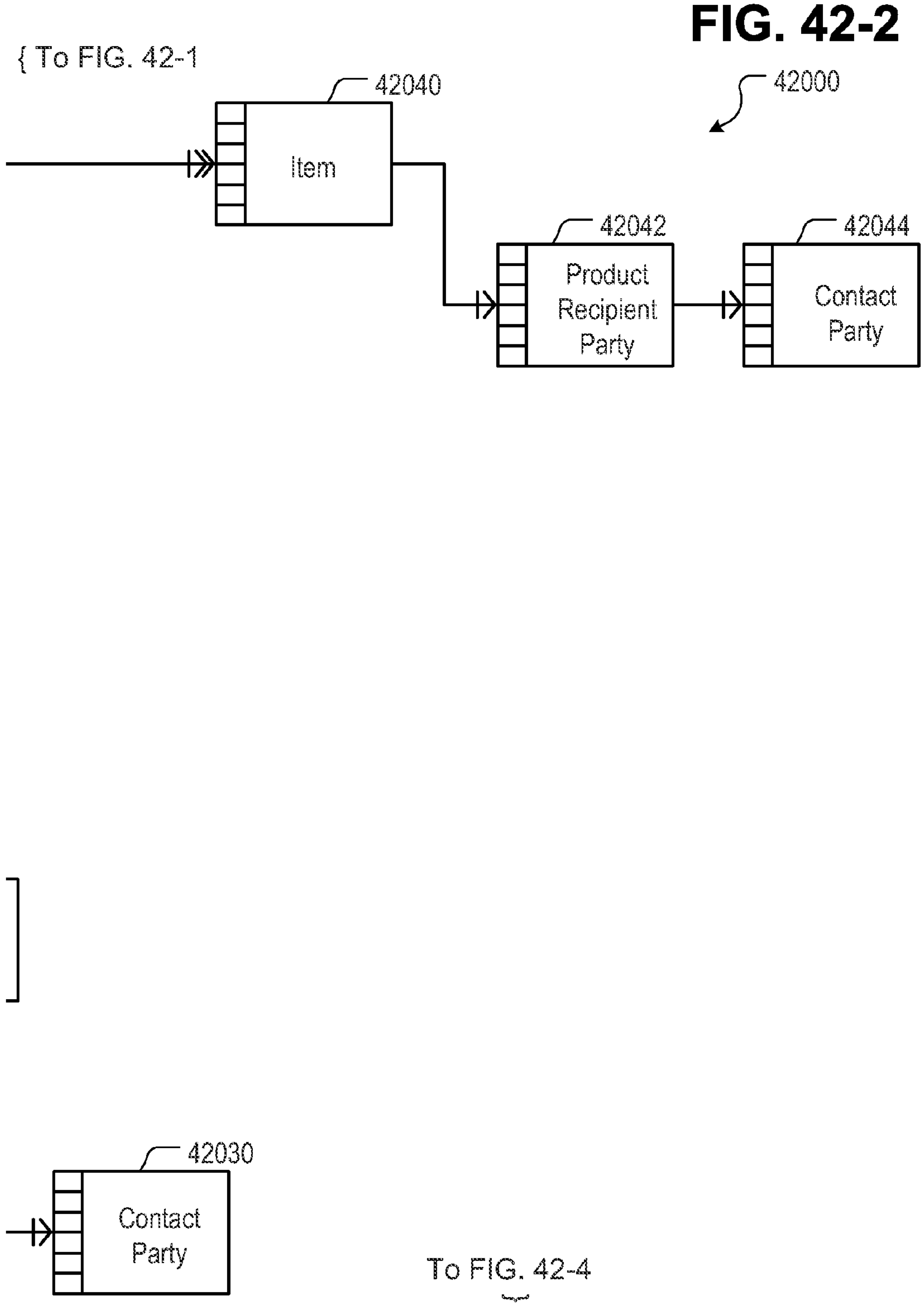
Figures 3, 42:
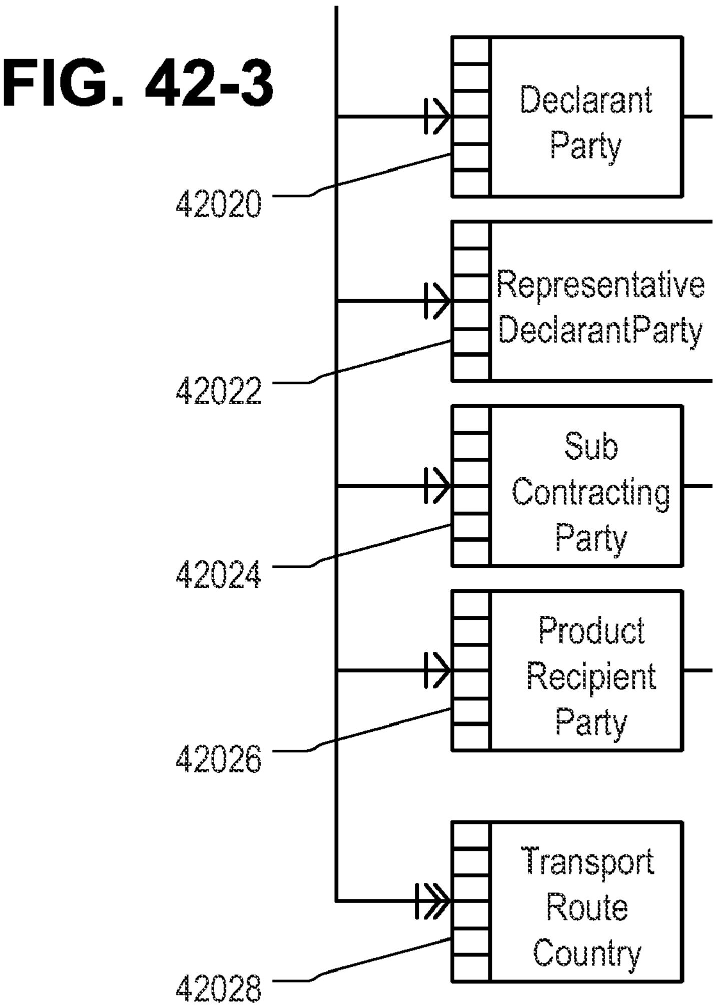
Figures 4, 42:
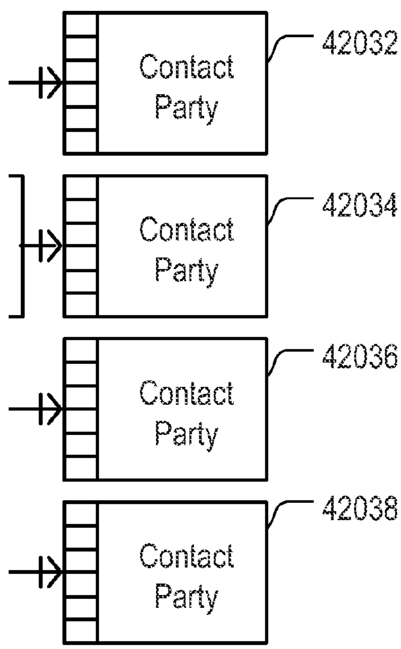

FIGS. 42-1 through 42-4 depict an example Form Export Declaration Processing in Fallback Procedure Request Message Data Type 42000, which comprises elements 42002-42044, hierarchically related as shown. For example, the Form Export Declaration Processing in Fallback Procedure Request 42002 includes an Export Declaration 42004.

The message type Form Export Declaration Processing in Fallback Procedure Request is derived from the business object Export Declaration as a leading object together with its operation signature. The message type Form Export Declaration Processing in Fallback Procedure Request enables a form-based output of an export declaration to request processing of an export declaration from a customs authority in a fallback procedure. The structure of the Form Export Declaration Processing in Fallback Procedure Request message type is determined by a message data type FormExportDeclarationProcessingInFallbackProcedureRequestMessage. The message data type FormExportDeclarationProcessingInFallbackProcedureRequestMessage includes the object ExportDeclaration which is included in a business document, business information that is relevant for sending a business document in a message, the MessageHeader package, and the ExportDeclaration package. The message data type FormExportDeclarationProcessingInFallbackProcedureRequestMessage provides a structure for the Form Export Declaration Processing in Fallback Procedure Request message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The ExportDeclaration package is a grouping of ExportDeclaration with the entity ExportDeclaration and with the following packages: CustomsAuthorisation, PresentationLocation, ExportCustomsOffice, ExitCustomsOffice, SupplementaryExportCustomsOffice, PlannedExitCustomsOffice, ExporterParty, DeclarantParty, RepresentativeDeclarantParty, SubContractingParty, ProductRecipientParty, TransportRouteCountry, and Item. The ExportDeclaration entity is a business transaction document including data for a declaration to a customs authority for exporting goods according to legal requirements.

ExportDeclaration includes the following non-node elements: CustomsAuthorityCountryCode, CustomsProcessID, ExportDeclarationTypeCode, ExportTypeCode, ExportExportingCountryCode, ExportDestinationCountryCode, ExportSpecialCircumstancesCode, ExportTransportCostPaymentFormCode, ContainerUsedIndicator, ExportPartyRepresentationCode, ItemTotalNumberValue, InlandExportTransportModeCode, CrossBorderExportTransportModeCode, CrossBorderTransportMeansID, ExportCrossBorderTransportMeansNationalityCode, ExportBusinessTransactionTypeCode, InvoiceTotalNetAmount, ExportIncotermsClassificationCode, IncotermsTransferLocationName, CustomsFallbackProcedureIncidentID, CustomsFallbackProcedureIncidentStartDateTime, and CreationDateTime.

CustomsAuthorityCountryCode may be optional, is a country in which the customs authority to which this processing request is sentis situated, and may be based on datatype GDT:CountryCode. CustomsProcessID may be optional, is an identifier for an export, may be assigned internally, and may be based on datatype GDT:CustomsProcessID. ExportDeclarationTypeCode may be optional, is a type of an export declaration, and may be based on datatype GDT:ExportDeclarationTypeCode. ExportTypeCode may be optional, is a type of an export, and may be based on datatype GDT: ExportTypeCode. ExportExportingCountryCode may be optional, is a country from which goods are exported, and may be based on datatype GDT:ExportExportingCountryCode. ExportDestinationCountryCode may be optional, is a country to which goods are exported, and may be based on datatype GDT:ExportDestinationCountryCode. ExportSpecialCircumstancesCode may be optional, is a representation of special circumstances accompanying an export, and may be based on datatype GDT:ExportSpecialCircumstancesCode. ExportTransportCostPaymentFormCode may be optional, is a payment form for a transport cost of an export, and may be based on datatype GDT:ExportTransportCostPaymentFormCode. ContainerUsedIndicator may be optional, indicates whether export goods are shipped in containers, and may be based on datatype CDT:Indicator. ExportPartyRepresentationCode may be optional, is a representation situation of parties involved in an export, and may be based on datatype GDT:ExportPartyRepresentationCode. ItemTotalNumberValue may be optional, is a total number of items in an export declaration, and may be based on datatype GDT:NumberValue. InlandExportTransportModeCode may be optional, is a transport mode used to move export goods inland, and may be based on datatype GDT:ExportTransportModeCode. CrossBorderExportTransportModeCode may be optional, is a transport mode used to move export goods across a border, and may be based on datatype GDT:ExportTransportModeCode. CrossBorderTransportMeansID may be optional, is an identifier for a transport means used to move export goods across a border, and may be based on datatype GDT:TransportMeansID_V1. ExportCrossBorderTransportMeansNationalityCode may be optional, is a nationality of a transport means used to move export goods across a border, and may be based on datatype GDT: ExportCrossBorderTransportMeansNationalityCode. ExportBusinessTransactionTypeCode may be optional, is a type of a business transaction underlying an export, and may be based on datatype GDT:ExportBusinessTransactionTypeCode. InvoiceTotalNetAmount may be optional, is a total net amount of an invoice underlying an export, and may be based on datatype CDT: Amount. ExportIncotermsClassificationCode may be optional, is a classification of incoterms underlying an export, and may be based on datatype GDT:ExportIncotermsClassificationCode. IncotermsTransferLocationName may be optional, is a name of a transfer location of incoterms underlying an export, and may be based on datatype CDT:MEDIUM_Name. CustomsFallbackProcedureIncidentID may be optional, is an incident that makes the usage of a customs fallback procedure necessary, and may be based on datatype GDT: CustomsFallbackProcedureIncidentID. CustomsFallbackProcedureIncidentStartDateTime may be optional, is a date and time at which the usage of a customs fallback procedure starts, and may be based on CDT:LOCAL_DateTime. CreationDateTime may be optional, is a date and time at which a message was created, and may be based on datatype CDT:LOCAL_DateTime.

ExportDeclaration may include CustomsAuthorisation in a 1:C cardinality relationship, PresentationLocation in a 1:C cardinality relationship, ExportCustomsOffice in a 1:C cardinality relationship, ExitCustomsOffice in a 1:C cardinality relationship, SupplementaryExportCustomsOffice in a 1:C cardinality relationship, PlannedExitCustomsOffice in a 1:C cardinality relationship, ExporterParty in a 1:C cardinality relationship, DeclarantParty in a 1:C cardinality relationship, RepresentativeDeclarantParty in a 1:C cardinality relationship, SubContractingParty in a 1:C cardinality relationship, ProductRecipientParty in a 1:C cardinality relationship, TransportRouteCountry in a 1:C cardinality relationship, and Item in a 1:CN cardinality relationship.

The ExportDeclarationCustomsAuthorisation package includes the CustomsAuthorisation entity. CustomsAuthorisation is a customs authorisation that authorizes an exporter to use simplifications and special procedures declared in a message. CustomsAuthorisation includes the following non-node elements: TypeCode, ID, ReleaseStampPrintingAllowedIndicator, and ReleaseStampPrintingCustomsAuthorisationID. TypeCode may be optional, is a type of a customs authorization, and may be based on datatype GDT: CustomsAuthorisationTypeCode. ID may be optional, is an identifier for a customs authorization, may be issued by a customs authority, and may be based on datatype GDT: CustomsAuthorisationID. ReleaseStampPrintingAllowedIndicator may be optional, indicates whether a declarant is allowed to print a release stamp on a form, and may be based on datatype CDT:Indicator. ReleaseStampPrintingCustomsAuthorisationID may be optional, is an identifier for a customs authorisation that allows a declarant to print a release stamp on a form, and may be based on datatype GDT:CustomsAuthorisationID.

The ExportDeclarationPresentationLocation package includes the PresentationLocation entity. PresentationLocation is a location at which export goods are presented to a customs authority. PresentationLocation includes the CustomsAuthorityID element, which may be optional, is an identifier for a location, may be issued by a customs authority, and may be based on datatype GDT:LocationPartyID.

The ExportDeclarationExportCustomsOffice package includes the ExportCustomsOffice entity. The ExportCustomsOffice is a customs office of export involved in an export. ExportCustomsOffice includes the following non-node elements: Address and EUCustomsOfficeNumberPartyID. Address may be optional, is an address of a customs office, and may be based on datatype GDT:FormAddress. EUCustomsOfficeNumberPartyID may be optional, is an EI (European Union) customs office number of a customs office, and may be based on datatype GDT:NOALPHANUMERICCONVERSION_PartyID.

The ExportDeclarationExitCustomsOffice package includes the ExitCustomsOffice entity. ExitCustomsOffice is a customs office of exit involved in an export. ExitCustomsOffice includes the following non-node elements: Address and EUCustomsOfficeNumberPartyID. Address may be optional, is an address of a customs office, and may be based on datatype GDT:FormAddress. EUCustomsOfficeNumberPartyID may be optional, is an EI (European Union) customs office number of a customs office, and may be based on datatype GDT:NOALPHANUMERICCONVERSION_PartyID.

The ExportDeclarationSupplementaryExportCustomsOffice package includes the SupplementaryExportCustomsOffice entity. SupplementaryExportCustomsOffice is a customs office of export that processes a supplementary declaration of an export. SupplementaryExportCustomsOffice includes the following non-node elements: Address and EUCustomsOfficeNumberPartyID. Address may be optional, is an address of a customs office, and may be based on datatype GDT:FormAddress. EUCustomsOfficeNumberPartyID may be optional, is an EI (European Union) customs office number of a customs office, and may be based on datatype GDT:NOALPHANUMERICCONVERSION_PartyID.

The ExportDeclarationPlannedExitCustomsOffice package includes the PlannedExitCustomsOffice entity. PlannedExitCustomsOffice is a customs office of exit at which goods are planned to exit a customs territory. PlannedExitCustomsOffice includes the following non-node elements: Address and EUCustomsOfficeNumberPartyID. Address may be optional, is an address of a customs office, and may be based on datatype GDT:FormAddress. EUCustomsOfficeNumberPartyID may be optional, is an EI (European Union) customs office number of a customs office, and may be based on datatype GDT:NOALPHANUMERICCONVERSION_PartyID.

The ExportDeclarationExporterParty package includes the ExporterParty entity. ExporterParty is a party that exports goods. ExporterParty includes the following non-node elements: Address and GermanCustomsNumberPartyID. Address may be optional, is an address of a party, and may be based on datatype GDT:FormAddress. GermanCustomsNumberPartyID may be optional, is a German customs number of a party, and may be based on datatype GDT:NOALPHANUMERICCONVERSION_PartyID. The ExportDeclarationExporterParty package may include a 1:C cardinality relationship with ContactParty.

The ExportDeclarationExporterPartyContactParty package includes the ContactParty entity. ContactParty is a contact party of a party. ContactParty includes Address as a non-node element. Address may be optional, is an address of a contact party, and may be based on datatype GDT:FormAddress. The ExportDeclarationDeclarantParty package includes DeclarantParty entity. DeclarantParty is a party that declares an export to a customs authority. DeclarantParty includes the following non-node elements: Address and GermanCustomsNumberPartyID. Address may be optional, is an address of a party, and may be based on datatype GDT: FormAddress. GermanCustomsNumberPartyID may be optional, is a German customs number of a party, and may be based on datatype GDT:NOALPHANUMERICCONVERSION_PartyID. The ExportDeclarationExporterPartyContactParty package may include a 1:C cardinality relationship with ContactParty.

The ExportDeclarationDeclarantPartyContactParty package includes the ContactParty entity. ContactParty is a contact party of a party. ContactParty includes Address as a non-node element. Address may be optional, is an address of a contact party, and may be based on datatype GDT:FormAddress.

The ExportDeclarationRepresentativeDeclarantParty package includes the RepresentativeDeclarantParty entity. RepresentativeDeclarantParty is a party that represents a declarant party to a customs authority. RepresentativeDeclarantParty includes the following non-node elements: Address and GermanCustomsNumberPartyID. Address may be optional, is an address of a party, and may be based on datatype GDT:FormAddress. GermanCustomsNumberPartyID may be optional, is a German customs number of a party, and may be based on datatype GDT:NOALPHANUMERICCONVERSION_PartyID. ExportDeclarationRepresentativeDeclarantParty may include the node element ContactParty in a 1:C cardinality relationship.

The ExportDeclarationRepresentativeDeclarantPartyContactParty package includes the ContactParty entity. ContactParty is a contact party of a party. ContactParty includes Address as a non-node element. Address may be optional, is an address of a contact party, and may be based on datatype GDT:FormAddress.

The ExportDeclarationSubContractingParty package includes the SubContractingParty entity. SubContractingParty is a party that sub-contracts in an export to carry goods across a border. SubContractingParty includes the following non-node elements: Address and GermanCustomsNumberPartyID. Address may be optional, is an address of a party, and may be based on datatype GDT:FormAddress. GermanCustomsNumberPartyID may be optional, is a German customs number of a party, and may be based on datatype GDT: NOALPHANUMERICCONVERSION_PartyID. ExportDeclarationSubContractingParty may include the node element ContactParty in a 1:C cardinality relationship.

The ExportDeclarationSubContractingPartyContactParty package includes the ContactParty entity. ContactParty is a contact party of a party. ContactParty includes Address as a non-node element. Address may be optional, is an address of a contact party, and may be based on datatype GDT:FormAddress.

The ExportDeclarationProductRecipientParty package includes the ProductRecipientParty. ProductRecipientParty is a party that receives export goods. ProductRecipientParty includes the following non-node elements: Address and GermanCustomsNumberPartyID. Address may be optional, is an address of a party, and may be based on datatype GDT: FormAddress. GermanCustomsNumberPartyID may be optional, is a German customs number of a party, and may be based on datatype GDT:NOALPHANUMERICCONVERSION_PartyID. ExportDeclarationProductRecipientParty may include the node element ContactParty in a 1:C cardinality relationship.

The ExportDeclarationProductRecipientPartyContactParty package includes the ContactParty entity. ContactParty is a contact party of a party. ContactParty includes Address as a non-node element. Address may be optional, is an address of a contact party, and may be based on datatype GDT:FormAddress.

The ExportDeclarationTransportRouteCountry package includes the TransportRouteCountry entity. TransportRouteCountry is a country wherein an export starts, passes through, or ends.

TransportRouteCountry includes the following non-node elements: OrdinalNumberValue and ExportTransportRouteCountryCode. OrdinalNumberValue may be optional, is an ordinal number used to order countries of the transport route in an order in which they are passed by an export, and may be based on datatype GDT:NumberValue. ExportTransportRouteCountryCode may be optional, is a single country of a transport route, and may be based on datatype GDT:ExportTransportRouteCountryCode. In some implementations, the sequence of all TransportRouteCountries in an ExportDeclaration represents a transport route. An OrdinalNumberValue may be used to put a TransportRouteCountries in sequence and the same country can appear more than once in this ordered list of countries.

The ExportDeclarationItem package includes the Item entity. Item is an item in an export declaration. Item includes the following non-node elements: CustomsAuthorityID, Description, OriginExportRegionCode, Net WeightQuantity, Net WeightQuantityTypeCode, GrossWeightQuantity, GrossWeightQuantityTypeCode, ExportTransportCostPaymentFormCode, CustomsCommodityClassificationCode, ExportProcedureTypeCode, ExportPreviousProcedureTypeCode, ExportAdditionalProcedureTypeCode, LegalComplianceQuantity, LegalComplianceQuantityTypeCode, PackageText, AdditionalInformationText, PreviousDocumentText, and LegalComplianceAmount.

CustomsAuthorityID may be optional, is an identifier for an export declaration item which may follow a schema specified by a customs authority, and may be based on datatype GDT: CustomsDeclarationItemCustomsAuthorityID. Description may be optional, is a description of an export declaration item in natural language, and may be based on datatype GDT:Description. OriginExportRegionCode may be optional, is a region of origin of an export item, and may be based on datatype GDT:ExportRegionCode. NetWeightQuantity may be optional, is a net weight quantity of an item, and may be based on datatype CDT:Quantity. NetWeightQuantityTypeCode may be optional, is a type of net weight quantity of an item, and may be based on datatype GDT: QuantityTypeCode. GrossWeightQuantity may be optional, is a gross weight of an item, and may be based on datatype CDT:Quantity. GrossWeightQuantityTypeCode may be optional, is a type of gross weight of an item, and may be based on datatype GDT:QuantityTypeCode. ExportTransportCostPaymentFormCode may be optional, is a payment form for a transport cost of an export, and may be based on datatype GDT:ExportTransportCostPaymentFormCode. CustomsCommodityClassificationCode may be optional, is a classification of an exported commodity according to specifications by a customs authority, and may be based on datatype GDT: CustomsCommodityClassificationCode. ExportProcedureTypeCode may be optional, is an export procedure to use for an item, and may be based on datatype GDT:ExportProcedureTypeCode. ExportPreviousProcedureTypeCode may be optional, is a customs procedure that was previously applied to an item, and may be based on datatype GDT:ExportPreviousProcedureTypeCode. ExportAdditionalProcedureTypeCode may be optional, is an additional export procedure to use for an item, and may be based on datatype GDT:ExportAdditionalProcedureTypeCode. LegalComplianceQuantity may be optional, is a quantity of an item formatted to comply with legal regulations, and may be based on datatype CDT:Quantity. LegalComplianceQuantityTypeCode may be optional, is a type of a quantity of an item formatted to comply with legal regulations, and may be based on datatype GDT:QuantityTypeCode. PackageText may be optional, is a textual description of packages in which an item is packed, and may be based on datatype CDT:Text.

AdditionalInformationText may be optional, includes additional information about an item, and may be based on datatype CDT:Text. PreviousDocumentText may be optional, is a textual description of previous documents related to an item, and may be based on datatype CDT:Text. LegalComplianceAmount may be optional, is an amount of an item formatted to comply with legal regulations, and may be based on datatype CDT:Amount. ExportDeclarationItem may include ProductRecipientParty as a node element in a 1:C cardinality relationship.

The ExportDeclarationItemProductRecipientParty package includes the ProductRecipientParty entity. ProductRecipientParty is a party that receives export goods. ProductRecipientParty includes the following non-node elements: Address and GermanCustomsNumberPartyID. Address may be optional, is an address of a party, and may be based on datatype GDT:FormAddress. GermanCustomsNumberPartyID may be optional, is a German customs number of a party, and may be based on datatype GDT:NOALPHANUMERICCONVERSION_PartyID. ExportDeclarationItemProductRecipientParty may include ProductRecipientParty as a node element in a 1:C cardinality relationship.

The ExportDeclarationItemProductRecipientPartyContactParty package includes the ContactParty entity. ContactParty is a contact party of a party. ContactParty includes Address as a non-node element. Address may be optional, is an address of a party, and may be based on datatype GDT:FormAddress.

FIGS. 43-1 through 43-42 show an example configuration of an Element Structure that includes an ExportDeclarationProcessingCancellationRequest 430000 package. Specifically, these figures depict the arrangement and hierarchy of various components such as one or more levels of packages, entities, and datatypes, shown here as 430000 through 431248. As described above, packages may be used to represent hierarchy levels. Entities are discrete business elements that are used during a business transaction. Data types are used to type object entities and interfaces with a structure. For example, the ExportDeclarationProcessingCancellationRequest 430000 includes, among other things, an ExportDeclarationProcessingCancellationRequest 430002. Accordingly, heterogeneous applications may communicate using this consistent message configured as such.

FIGS. 44-1 through 44-158 show an example configuration of an Element Structure that includes an ExportDeclarationProcessingConfirmation 440000 package. Specifically, these figures depict the arrangement and hierarchy of various components such as one or more levels of packages, entities, and datatypes, shown here as 440000 through 443142. As described above, packages may be used to represent hierarchy levels. Entities are discrete business elements that are used during a business transaction. Data types are used to type object entities and interfaces with a structure. For example, the ExportDeclarationProcessingConfirmation 440000 includes, among other things, an ExportDeclarationProcessingConfirmation 440002. Accordingly, heterogeneous applications may communicate using this consistent message configured as such.

FIGS. 45-1 through 45-143 show an example configuration of an Element Structure that includes an ExportDeclarationProcessingRequest 450000 package. Specifically, these figures depict the arrangement and hierarchy of various components such as one or more levels of packages, entities, and datatypes, shown here as 450000 through 453162. As described above, packages may be used to represent hierarchy levels. Entities are discrete business elements that are used during a business transaction. Data types are used to type object entities and interfaces with a structure. For example, the ExportDeclarationProcessingRequest 450000 includes, among other things, an ExportDeclarationProcessingRequest 450002. Accordingly, heterogeneous applications may communicate using this consistent message configured as such.

FIGS. 46-1 through 46-6 show an example configuration of an Element Structure that includes an ExportMessageExchangeNotification 460000 package. Specifically, these figures depict the arrangement and hierarchy of various components such as one or more levels of packages, entities, and datatypes, shown here as 460000 through 460252. As described above, packages may be used to represent hierarchy levels. Entities are discrete business elements that are used during a business transaction. Data types are used to type object entities and interfaces with a structure. For example, the ExportMessageExchangeNotification 460000 includes, among other things, an ExportMessageExchangeNotification 460002. Accordingly, heterogeneous applications may communicate using this consistent message configured as such.

FIGS. 47-1 through 47-7 show an example configuration of an Element Structure that includes an ExportMessageSemanticErrorNotification 470000 package. Specifically, these figures depict the arrangement and hierarchy of various components such as one or more levels of packages, entities, and datatypes, shown here as 470000 through 470290. As described above, packages may be used to represent hierarchy levels. Entities are discrete business elements that are used during a business transaction. Data types are used to type object entities and interfaces with a structure. For example, the ExportMessageSemanticErrorNotification 470000 includes, among other things, an ExportMessageSemanticErrorNotification 470002. Accordingly, heterogeneous applications may communicate using this consistent message configured as such.

FIGS. 48-1 through 48-7 show an example configuration of an Element Structure that includes an ExportMessageSyntaxErrorNotification 480000 package. Specifically, these figures depict the arrangement and hierarchy of various components such as one or more levels of packages, entities, and datatypes, shown here as 480000 through 480278. As described above, packages may be used to represent hierarchy levels. Entities are discrete business elements that are used during a business transaction. Data types are used to type object entities and interfaces with a structure. For example, the ExportMessageSyntaxErrorNotification 480000 includes, among other things, an ExportMessageSyntaxErrorNotification 480002. Accordingly, heterogeneous applications may communicate using this consistent message configured as such.

FIGS. 49-1 through 49-40 show an example configuration of an Element Structure that includes an ExportProcessingInformationConfirmation 490000 package. Specifically, these figures depict the arrangement and hierarchy of various components such as one or more levels of packages, entities, and datatypes, shown here as 490000 through 491210. As described above, packages may be used to represent hierarchy levels. Entities are discrete business elements that are used during a business transaction. Data types are used to type object entities and interfaces with a structure. For example, the ExportProcessingInformationConfirmation 490000 includes, among other things, an ExportProcessingInformationConfirmation 490002. Accordingly, heterogeneous applications may communicate using this consistent message configured as such.

FIGS. 50-1 through 50-41 show an example configuration of an Element Structure that includes an ExportProcessingInformationRequest 500000 package. Specifically, these figures depict the arrangement and hierarchy of various components such as one or more levels of packages, entities, and datatypes, shown here as 500000 through 501216. As described above, packages may be used to represent hierarchy levels. Entities are discrete business elements that are used during a business transaction. Data types are used to type object entities and interfaces with a structure. For example, the ExportProcessingInformationRequest 500000 includes, among other things, an ExportProcessingInformationRequest 500002. Accordingly, heterogeneous applications may communicate using this consistent message configured as such.

FIGS. 51-1 through 51-102 show an example configuration of an Element Structure that includes an ExportProcessingNotification 510000 package. Specifically, these figures depict the arrangement and hierarchy of various components such as one or more levels of packages, entities, and datatypes, shown here as 510000 through 512324. As described above, packages may be used to represent hierarchy levels. Entities are discrete business elements that are used during a business transaction. Data types are used to type object entities and interfaces with a structure. For example, the ExportProcessingNotification 510000 includes, among other things, an ExportProcessingNotification 510002. Accordingly, heterogeneous applications may communicate using this consistent message configured as such.

FIGS. 52-1 through 52-22 show an example configuration of an Element Structure that includes a FormExportDeclarationProcessingInFallbackProcedureRequest 520000 package. Specifically, these figures depict the arrangement and hierarchy of various components such as one or more levels of packages, entities, and datatypes, shown here as 520000 through 520610. As described above, packages may be used to represent hierarchy levels. Entities are discrete business elements that are used during a business transaction. Data types are used to type object entities and interfaces with a structure. For example, the FormExportDeclarationProcessingInFallbackProcedureRequest 520000 includes, among other things, a FormExportDeclarationProcessingInFallbackProcedureRequest 520002. Accordingly, heterogeneous applications may communicate using this consistent message configured as such.

Figures 1, 53:
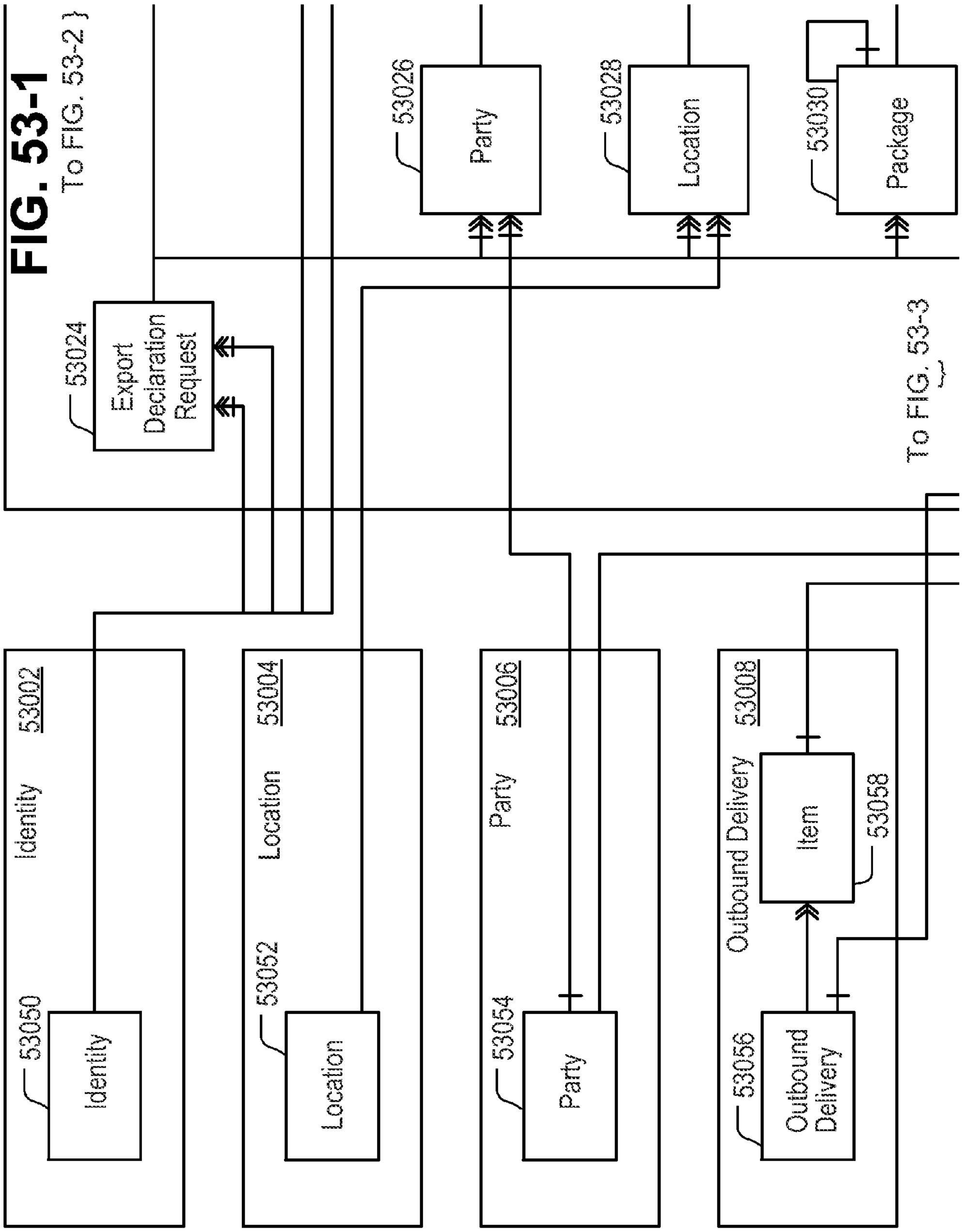
Figures 2, 53:
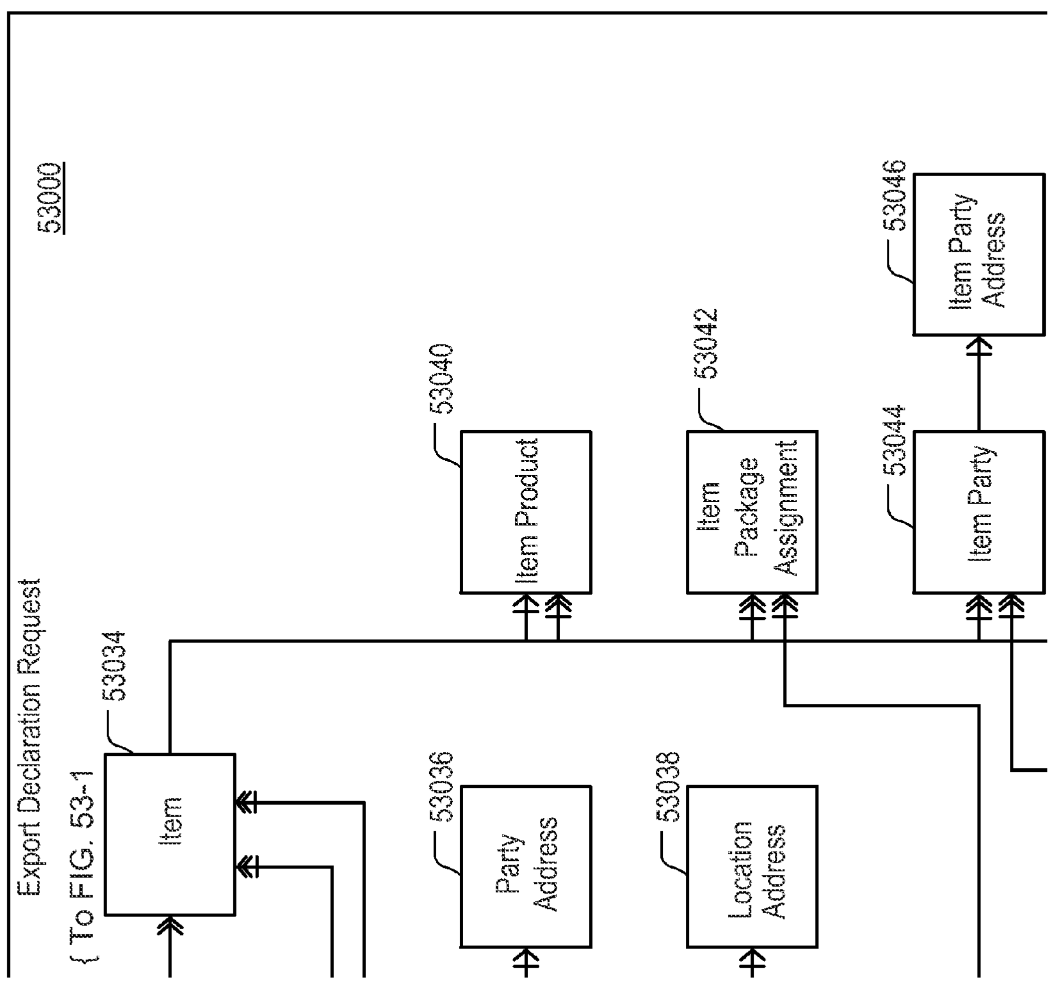
Figures 3, 53:
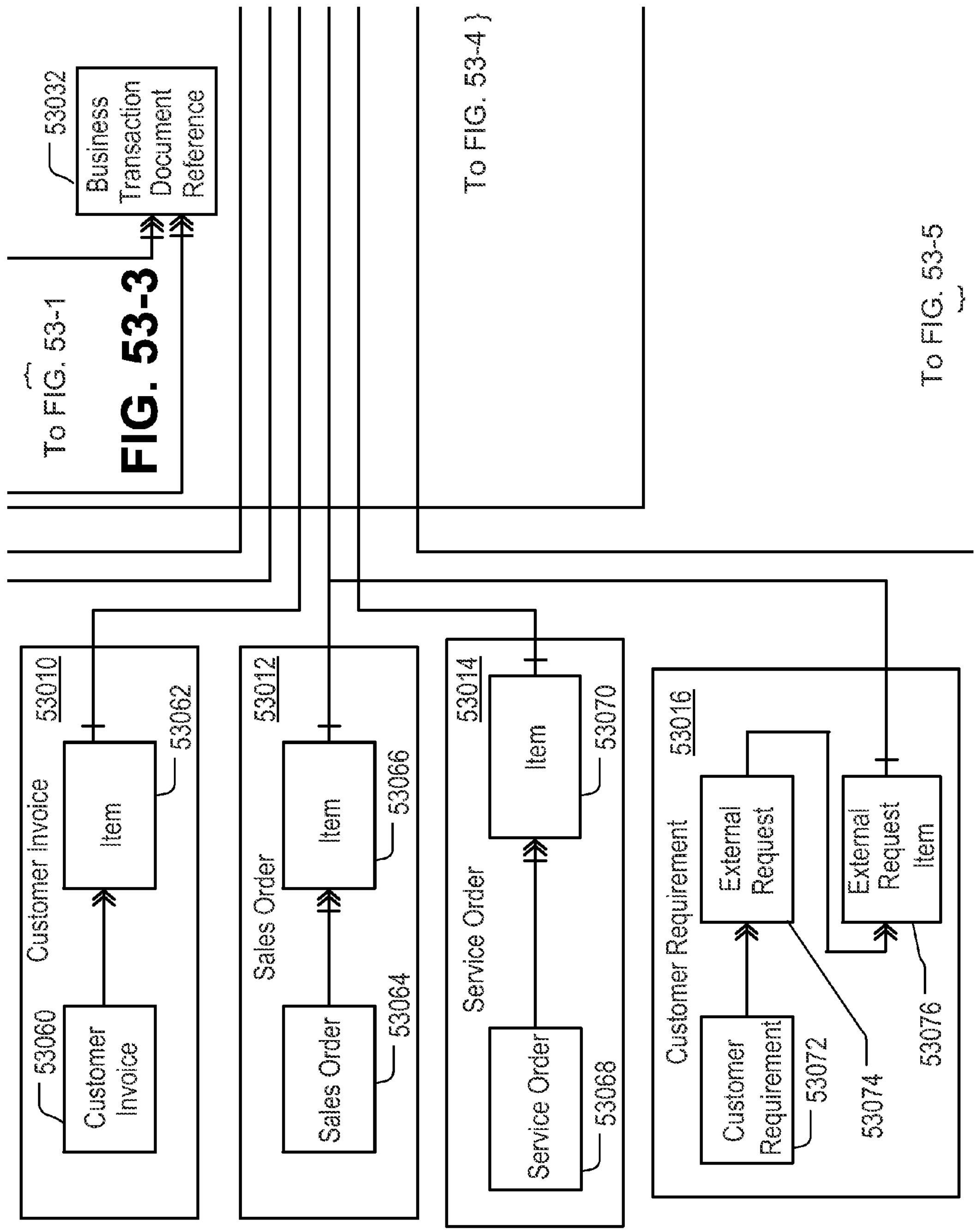
Figures 4, 53:
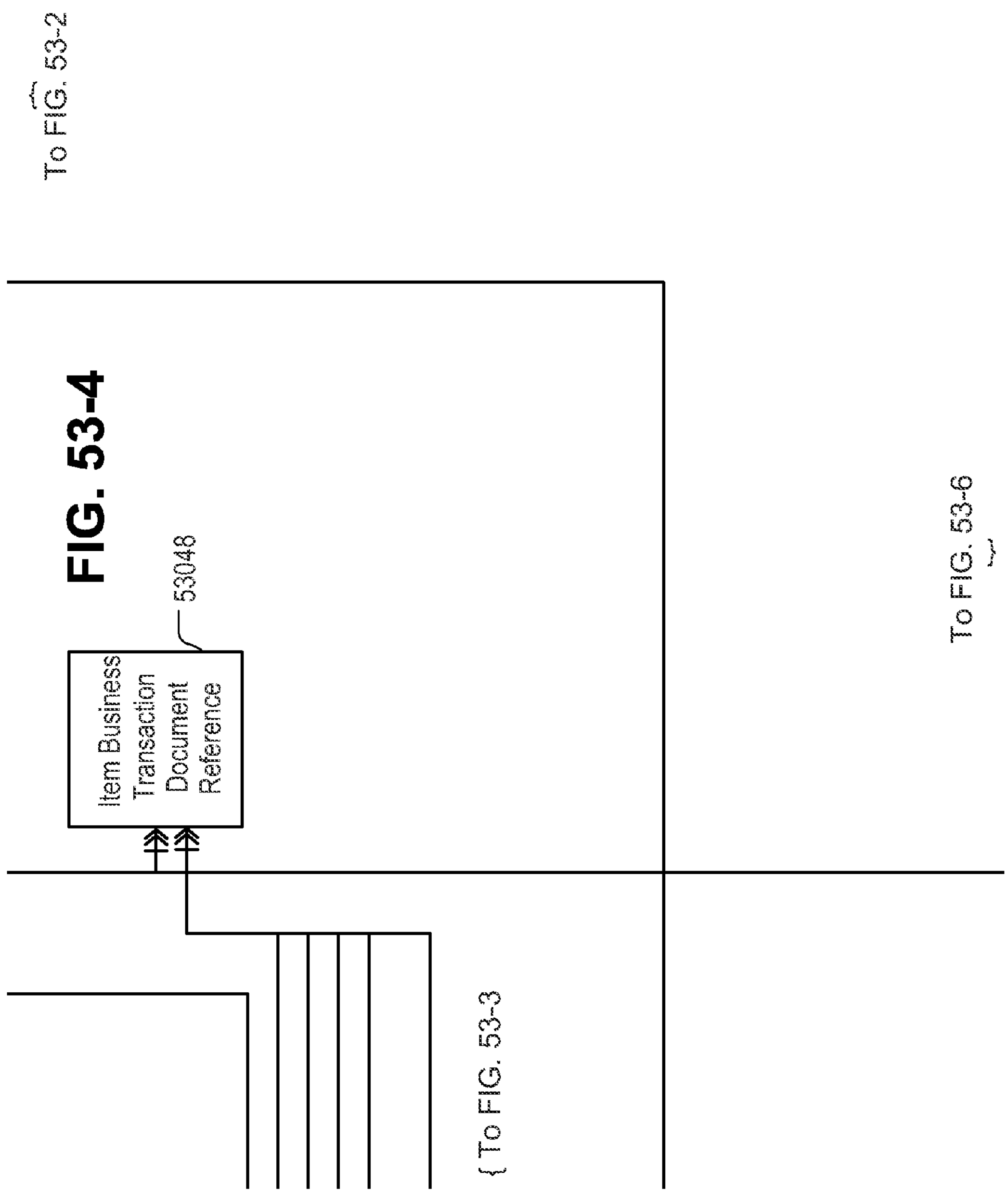
Figures 5, 53:
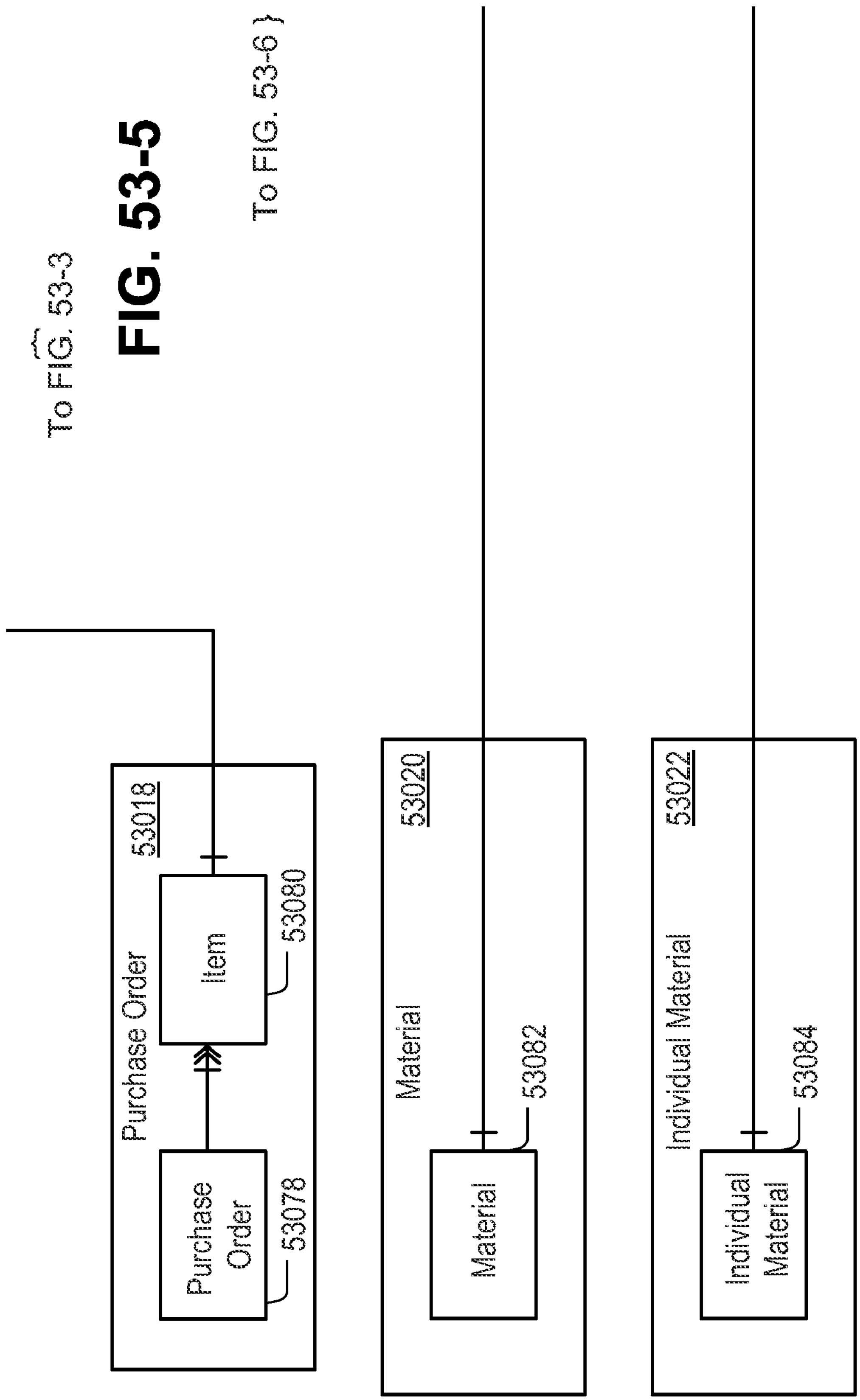
Figures 6, 53:
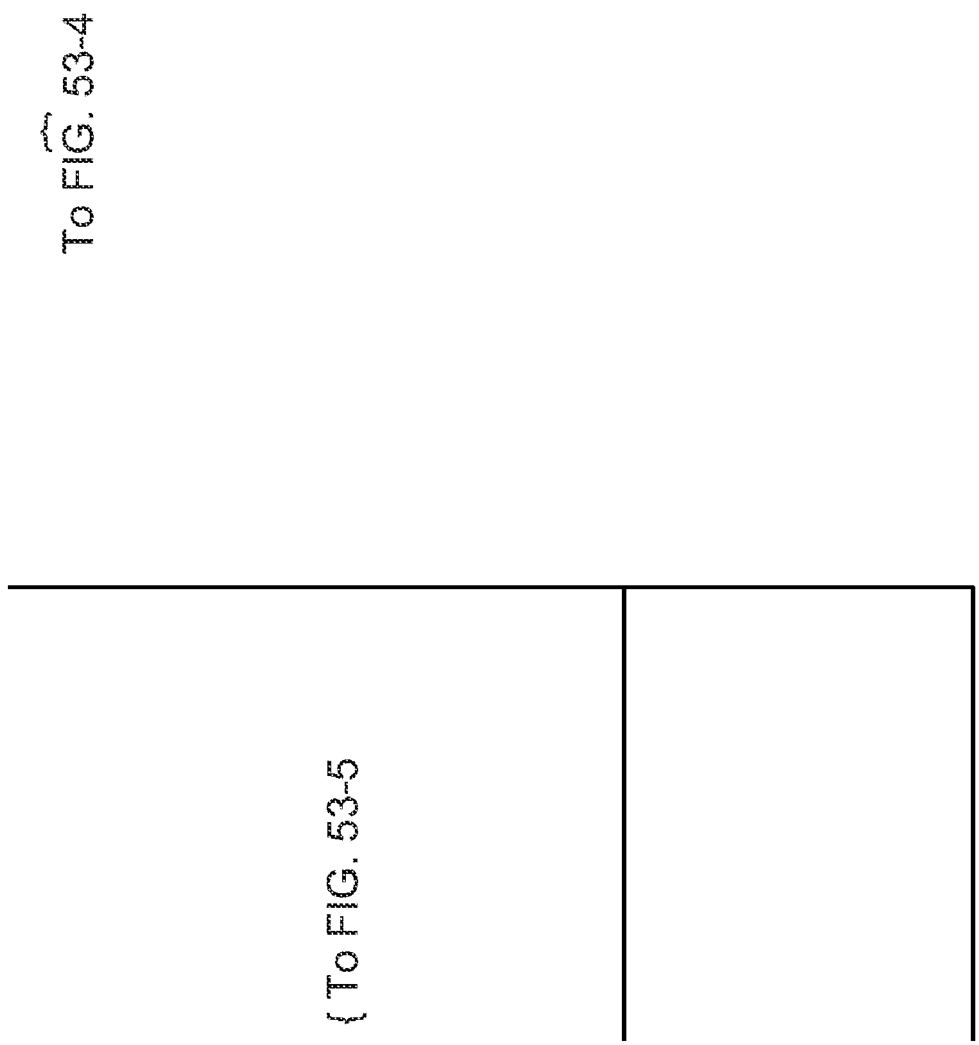

FIGS. 53-1 through 53-6 depict an example object model for a business object Export Declaration Request 53000. The business object 53000 has relationships with other objects 53002-53022, as shown with lines and arrows. The business object 53000 hierarchically comprises elements 53024-53048. The other objects 53002-53022 include respective elements 53050-53084 as shown.

The business object Export Declaration Request is a request to create or update an export declaration using customs-relevant business transactions, such as from customer invoicing or outbound delivery. The business object Export Declaration Request belongs to the process component Customs Processing. An export declaration request includes business transaction data about goods that are transported out of a customs territory, for example, quantities, values, and other customs-relevant information. The business object Export Declaration Request is involved in the following Process Component Interaction Models: Customer Invoice Processing_Customs Processing and Outbound Delivery Processing_ Customs Processing. The business object Export Declaration Request includes a root node. The elements located directly at the node Export Declaration Request are defined by the data type ExportDeclarationRequestElements. These elements include: UUID, ID, BaseBusinessTransactionDocumentTypeCode, Incoterms, TransportModeCode, TransportMeans, TotalNetWeightQuantity, TotalNetWeightQuantityTypeCode, TotalGrossWeightQuantity, TotalGrossWeightQuantityTypeCode, ExportDeclarationBlockIndicator, ExportDeclarationCancelIndicator, and SystemAdministrativeData. UUID is an alternative key, is a universally unique identifier of an export declaration request, and may be based on datatype GDT: UUID. ID is an alternative key, is an internally assigned identifier for an export declaration request, and may be based on datatype GDT: BusinessTransactionDocumentID. BaseBusinessTransactionDocumentTypeCode is a coded representation of a business document type used as base for an export declaration request, for example, a customer invoice or outbound delivery, and may be based on datatype GDT: BusinessTransactionDocumentTypeCode, with a qualifier of Base. Incoterms may be optional, are Incoterms of an export declaration request, and may be based on datatype GDT: Incoterms. TransportModeCode may be optional, is a coded representation of a transport mode of an export declaration request, and may be based on datatype GDT: TransportModeCode. TransportMeans may be optional, is a description of a means of transport of an export declaration request, and may be based on datatype GDT: TransportMeans. TotalNetWeightQuantity may be optional, is a total net weight of the goods of an export declaration request, and may be based on datatype GDT: Quantity, with a qualifier of Weight. TotalNetWeightQuantityTypeCode may be optional, is a coded representation of a type of the NetWeightQuantity of an export declaration request, and may be based on datatype GDT: QuantityTypeCode, with a qualifier of Weight. TotalGrossWeightQuantity may be optional, is a total gross weight of the goods of an export declaration request, and may be based on datatype GDT: Quantity, with a qualifier of Weight. TotalGrossWeightQuantityTypeCode may be optional, is a coded representation of a type of the GrossWeightQuantity of an export declaration request item, and may be based on datatype GDT: QuantityTypeCode, with a qualifier of Weight. ExportDeclarationBlockIndicator indicates that the processing of a requested export declaration may be blocked, and may be based on datatype GDT: Indicator, with a qualifier of Block. ExportDeclarationCancelIndicator indicates that an export declaration may be cancelled, and may be based on datatype GDT: Indicator, with a qualifier of Cancel. SystemAdministrativeData includes administrative data recorded by the system. This data includes system user and change times, and may be based on datatype GDT: SystemAdministrativeData.

The following composition relationships to subordinate nodes exist: Item, with a cardinality of 1:N; Party, with a cardinality of 1:CN; Location, with a cardinality of 1:CN; Package, with a cardinality of 1:CN; and Business Transaction Document Reference, with a cardinality of 1:CN. A Creation Identity inbound association relationship may exist from the business object Identity/node Identity, with a cardinality of 1:CN, which represents an identity of a user that created an Export Declaration Request. A Last Change Identity inbound association relationship may exist from the business object Identity/node Identity, with a cardinality of 1:CN, which represents an identity of the user that last changed an Export Declaration Request.

A Transfer Into Export Declaration enterprise service infrastructure action may be used to start a transfer of an Export Declaration Request into an Export Declaration. In some implementations, this action only influences the Data Transfer Result Status. In response to the Transfer Into Export Declaration action, the business object export declaration may be created or updated, which may mean that in the business object export declaration, one or more items can be created, changed or deleted. Also in response to the Transfer Into Export Declaration action, the Data Transfer Result Status is set to "Transferred."

The business object Export Declaration Request may be associated with a Select All query and with a Query by Elements query. The Select All query provides the NodeIDs of all instances of a node and may be used to enable an initial load of data for a fast search infrastructure. The Query By Elements query provides a list of all Export Declaration Requests found based on given parameters. The query elements are defined by the data type ExportDeclarationRequestElementsQueryElements. These elements include: UUID, ID, SystemAdministrativeData, CreationDateTime, CreationIdentityUUID, CreationIdentityID, CreationIdentityBusinessPartnerInternalID, CreationIdentityBusinessPartnerPersonFamilyName, CreationIdentityBusinessPartnerPersonGivenName, CreationIdentityEmployeeID, LastChangeDateTime, LastChangeIdentityUUID, LastChangeIdentityID, LastChangeIdentityBusinessPartnerInternalID, LastChangeIdentityBusinessPartnerPersonFamilyName, LastChangeIdentityBusinessPartnerPersonGivenName, LastChangeIdentityEmployeeID, BaseBusinessTransactionDocumentTypeCode, and BusinessTransactionDocumentReference.

UUID may be optional, is a universally unique identifier of an export declaration request, and may be based on datatype GDT: UUID. ID: may be optional, is an ID of an export declaration request, and may be based on datatype GDT: BusinessTransactionDocumentID. SystemAdministrativeData may be optional, includes administrative data recorded by the system, such as system user and change times, and may be based on datatype QueryIDT: QueryElementSystemAdministrativeData. CreationDateTime may be optional, is a point in time date and time stamp of a creation, and may be based on datatype GDT: GLOBAL_DateTime. CreationIdentityUUID may be optional, is a globally unique identifier for an identity who performed a creation, and may be based on datatype GDT: UUID. CreationIdentityID may be optional, is an identifier for an identity who performed a creation, and may be based on datatype GDT: IdentityID. CreationIdentityBusinessPartnerInternalID may be optional, is a proprietary identifier for a business partner that is attributed to a creation identity and that can be reached following the relationships of the creation identity, and may be based on datatype GDT: BusinessPartnerInternalID. CreationIdentityBusinessPartnerPersonFamilyName may be optional, is a family name of a business partner of a category person that is attributed to a creation identity and that can be reached following the relationships of the creation identity, and may be based on datatype GDT: LANGUAGEINDEPENDENT_MEDIUM Name. CreationIdentityBusinessPartnerPersonGivenName may be optional, is a given name of a business partner of a category person that is attributed to a creation identity and that can be reached following the relationships of the creation identity, and may be based on datatype GDT: LANGUAGEINDEPENDENT_MEDIUM Name. CreationIdentityEmployeeID may be optional, is an identifier for an employee that is attributed to a creation identity and that can be reached following the relationships of the creation identity, and may be based on datatype GDT: EmployeeID. LastChangeDateTime may be optional, is a point in time date and time stamp of a last change, and may be based on datatype GDT: GLOBAL_DateTime. LastChangeIdentityUUID may be optional, is a globally unique identifier for an identity who made last changes, and may be based on datatype GDT: UUID. LastChangeIdentityID may be optional, is an identifier for an identity who made last changes, and may be based on datatype GDT: IdentityID. LastChangeIdentityBusinessPartnerInternalID may be optional, is a proprietary identifier for a business partner that is attributed to a last change identity and that can be reached following the relationships of the last change identity, and may be based on datatype GDT: BusinessPartnerinternalID. LastChangeIdentityBusinessPartnerPersonFamilyName may be optional, is a family name of a business partner of a category person that is attributed to a last change identity and that can be reached following the relationships of the last change identity, and may be based on datatype GDT: LANGUAGEINDEPENDENT_MEDIUM Name. LastChangeIdentityBusinessPartnerPersonGivenName may be optional, is a given name of a business partner of a category person that is attributed to a last change identity and that can be reached following the relationships of the last change identity, and may be based on datatype GDT: LANGUAGEINDEPENDENT_MEDIUM_Name. LastChangeIdentityEmployeeID may be optional, is an identifier for an employee that is attributed to a last change identity and that can be reached following the relationships of the last change identity, and may be based on datatype GDT: EmployeeID. BaseBusinessTransactionDocumentTypeCode may be optional, is a coded representation of a business document type used as base for an export declaration request, for example, a customer invoice or outbound delivery, and may be based on datatype GDT: BusinessTransactionDocumentTypeCode, with a qualifier of Base. BusinessTransactionDocumentReference may be optional, is a reference to a delivery, and may be based on datatype GDT: BusinessTransactionDocumentReference.

Item is a quantity of a product in an export declaration request with additional information on amounts, quantities and packaging data. The elements located directly at the node Item are defined by a data type ExportDeclarationRequestItemElements. These elements include: UUID, ID, Description, Quantity, QuantityTypeCode, NetWeightQuantity, Net WeightQuantityTypeCode, Gross WeightQuantity, Gross WeightQuantityTypeCode, InvoiceNetAmount, CustomerInvoiceRequiredIndicator, ExportDeclarationBlockIndicator, and SystemAdministrativeData. UUID may be an alternative key, is a inversely unique identifier for an export declaration request item, and may be based on datatype GDT: UUID. ID is an internally assigned identifier for an export declaration request item, and may be based on datatype GDT: BusinessTransactionDocumentItemID. Description may be optional, is a description of an item, and may be based on datatype GDT: SHORT_Description. Quantity is a quantity of exported goods, and may be based on datatype GDT: Quantity. QuantityTypeCode is a coded representation of a type of the quantity of an export declaration request item, and may be based on datatype GDT: QuantityTypeCode. NetWeightQuantity may be optional, is a net weight of an export declaration request item, and may be based on datatype GDT: Quantity, with a qualifier of Weight. NetWeightQuantityTypeCode may be optional, is a coded representation of a type of a net weight quantity of an export declaration request item, and may be based on datatype GDT: QuantityTypeCode, with a qualifier of Weight. GrossWeightQuantity may be optional, is a gross weight of an export declaration request item, and may be based on datatype GDT: Quantity, with a qualifier of Weight. GrossWeightQuantityTypeCode may be optional, is a coded representation of a type of a gross weight quantity of an export declaration request item, and may be based on datatype GDT: QuantityTypeCode, with a qualifier of Weight. InvoiceNetAmount may be optional, is a net value of an invoice item, and may be based on datatype GDT: Amount, with a qualifier of Net. CustomerInvoiceRequiredIndicator indicates that a Customer Invoice that triggers an Export Declaration Request is required to complete an Export Declaration, and may be based on datatype GDT: Indicator, with a qualifier of Required. ExportDeclarationBlockIndicator indicates that the processing of a requested export declaration may be blocked, and may be based on datatype GDT: Indicator, with a qualifier of Block. SystemAdministrativeData includes administrative data recorded by the system, such as system user and change times, and may be based on datatype GDT: SystemAdministrativeData.

The following composition relationships to subordinate nodes may exist: Item Product, with a cardinality of 1:C; Item package Assignment, with a cardinality of 1:CN; Item Party, with a cardinality of 1:CN; and ItemBusinessTransactionDocumentReference, with a cardinality of 1:CN. A Creation Identity inbound association relationship may exist from the business object Identity/node Identity, with a cardinality of 1:CN, which is an identity of a user that created an Export Declaration Request Item. A Last Change Identity inbound association relationship may exist from the business object Identity/node Identity, with a cardinality of 1:CN, which is an identity of a user that last changed an Export Declaration Request Item.

The following specialization associations for navigation may exist to node ItemBusinessTransactionDocumentReference: SalesOrderItemReference, with a cardinality of C; OutboundDeliveryItemReference, with a cardinality of C; CustomerInvoiceItemReference, with a cardinality of CN; IntraCompanyStockTransferRequirementItemReference, with a cardinality of C; PurchaseOrderItemReference, with a cardinality of C; and ServiceOrderItemReference, with a cardinality of C. In some implementations, in the case that a quantity or a measure is set, a corresponding quantity or measure type may also be filled.

Item Product is a product of an export declaration request item. The elements located directly at the node Item Product are defined by the data type ExportDeclarationRequestItemProductElements. These elements include: ProductUUID, ProductKey, ProductTypeCode, ProductIdentifierTypeCode, and ProductID. ProductUUID may be optional, is a universally unique identifier of a product, and may be based on datatype GDT: UUID. ProductKey may be optional, is a proprietary identifier of a product, and may be based on datatype KDT: ProductKey. ProductTypeCode is a coded representation of a product type, such as a material or service, and may be based on datatype GDT: ProductTypeCode. ProductIdentifierTypeCode is a coded representation of a product identifier type, and may be based on datatype GDT: ProductIdentifierTypeCode. ProductID is an identifier for a product, and may be based on datatype GDT: ProductID. A Individual Material inbound aggregation relationship may exist from the business object Individual Material/node Individual Material, with a cardinality of C:CN, which is an individual material of an export declaration request item. A Material inbound aggregation relationship may exist from the business object Material/node Material, with a cardinality of C:CN, which is a material of an export declaration request item. In some implementations, at least one of the following elements is filled: ProductUUID or ProductKey. In some implementations, at least one of the following aggregations exists: material and individual material.

Item package Assignment is an assignment to a package an export declaration request item is packed in. The elements located directly at the node Item package Assignment are defined by the data type ExportDeclarationRequestItempackageAssignmentElements. These elements include: packageUUID, packageKey, ExportDeclarationRequestUUID, ExportDeclarationRequestpackageID, ProductQuantity, and ProductQuantityTypeCode. PackageUUID is a universally unique identifier for a package, and may be based on datatype GDT: UUID. PackageKey is a key of a package in an export declaration request, and may be based on datatype KDT: ExportDeclarationRequestpackageKey. ExportDeclarationRequestUUID is a universally unique identifier of an export declaration request, and may be based on datatype GDT: UUID. ExportDeclarationRequestpackageID is an internal identifier of a package, and may be based on datatype GDT: ExportDeclarationRequestpackageID. ProductQuantity may be optional, is a quantity of product of an item assigned to a package, and may be based on datatype GDT: Quantity, with a qualifier of Product. ProductQuantityTypeCode may be optional, is a coded representation of the type of the ProductQuantity of an item assigned to a package, and may be based on datatype GDT: QuantityTypeCode, with a qualifier of Product. A Package inbound aggregation relationship may exist from the business object Export Declaration Request/node package, with a cardinality of 1:CN, which is a package in which an item product is packed.

Item Party is a natural or legal person, or a business partner that is involved in an export declaration request. A Party is a natural or legal person, organization, organizational unit or group that is involved in an export declaration request in a PartyRole. An item party can occur in the following disjoint specializations: Buyer Party, such as a party Customer that purchases a good or a service; and Seller Party, such as a party Company that sells a good or a service. The elements located directly at the node Item Party are defined by the data type ExportDeclarationRequestItemPartyElements. These elements include: PartyUUID, PartyKey, PartyTypeCode, PartyID, RoleCategoryCode, RoleCode, and AddressReference. PartyUUID may be optional, is a universally unique identifier for referencing a party, and may be based on datatype GDT: UUID. PartyKey may be optional, is a unique identifier of a Party, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. RoleCategoryCode is a coded representation of a grouping of partner roles by process-controlling criteria, and may be based on datatype GDT: PartyRoleCategoryCode. RoleCode is a coded representation of a partner role, and may be based on datatype GDT: PartyRoleCode. AddressReference may be optional, is a reference to an item party's address, and may be based on datatype GDT: PartyAddressReference. A composition relationship to subordinate node Item Party Address may exist, with a cardinality of 1:C. A Party inbound aggregation relationship may exist from the business object Party/node Party, with a cardinality of C:CN, which represents either: a buyer to whom an invoice will be sent, who is requested to pay for goods and services to be exported; or a seller who was involved in a sales process on which an export declaration request item is based. A specialization association for navigation may exist to dependent business object item party address, with a target cardinality of C. In some implementations, at least one of the following elements is filled: PartyKey and PartyUUID. In some implementations, if the PartyUUID is specified, the PartyTypeCode is also present. In some implementations, if AddressHostUUID is specified, AddressHostTypeCode is also present.

Item Party Address is a dependent object inclusion node. The dependent object Address includes the data necessary to describe a postal or communication address of a party. Item Business Transaction Document Reference is a reference to a document that is part of a preceding process flow of a business transaction. The elements located directly at the node Item Business Transaction Document Reference are defined by the data type ExportDeclarationRequestItem-BusinessTransactionDocumentReferenceElements. These elements include BusinessTransactionDocumentReference and BusinessTransactionDocumentRelationshipRoleCode. BusinessTransactionDocumentReference is a unique identification of a business transaction document related to an export declaration item, and may be based on datatype GDT: BusinessTransactionDocumentReference.

BusinessTransactionDocumentRelationshipRoleCode is a role of a referenced business transaction document in an export declaration item, and may be based on datatype GDT: BusinessTransactionDocumentRelationshipRoleCode. A Customer Invoice Item inbound aggregation relationship may exist from the business object Customer Invoice/node Item Cross DU, with a cardinality of C:CN, which represents an item of a customer invoice from which an item of an export declaration request was created. A CustomerRequirementExternalRequestItem inbound aggregation relationship may exist from the business object Customer Requirement/node External Request Item Cross DU, with a cardinality of C:CN, which represents an item of a customer requirement from which an item of an export declaration request was created. A Outbound Delivery Item inbound aggregation relationship may exist from the business object Outbound Delivery/node Item Cross DU, with a cardinality of C:CN, which represents an item of an outbound delivery from which an item of an export declaration request was created. A PurchaseOrderItem inbound aggregation relationship may exist from the business object Purchase Order/node Item Cross DU, with a cardinality of C:CN, which represents an item of a purchase order from which an item of an export declaration request was created. A Sales Order Item inbound aggregation relationship may exist, from the business object Sales Order/node Item Cross DU, with a cardinality of C:CN, which represents an item of a sales order from which an item of an export declaration request was created. A Service Order Item inbound aggregation relationship may exist from the business object Service Order/node Item Cross DU, with a cardinality of C:CN, which represents an item of a service order from which an item of an export declaration request was created.

Party is a natural or legal person, or a business partner that is involved in an export declaration request. A Party is a natural or legal person, organization, organizational unit or group that is involved in a export declaration request in a PartyRole. A Party can occur in the following disjoint specializations: Buyer Party, such as a party Customer that purchases a good or a service; Seller Party, such as a party Company that sells a good or a service; Product Recipient Party, such as a party Customer that receives a good or a service; and Vendor Party, such as a party Company or Supplier that delivers a good or provides a service. The elements located directly at the node Party are defined by the data type ExportDeclarationRequestPartyElements. These elements include: PartyUUID, PartyKey, PartyTypeCode, PartyID, RoleCategoryCode, RoleCode, and AddressReference. PartyUUID may be optional, is a universally unique identifier of a party, and may be based on datatype GDT: UUID. PartyKey may be optional, is a key of a party in an export declaration request, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. RoleCategoryCode is a role category of a party in an export declaration request, and may be based on datatype GDT: PartyRoleCategoryCode. RoleCode is a role of a party in an export declaration request, and may be based on datatype GDT: PartyRoleCode. AddressReference may be optional, is a reference to a party's address, and may be based on datatype GDT: PartyAddressReference. A composition relationship to subordinate node Party Address may exist, with a cardinality of 1:C. A Party inbound aggregation relationship may exist from the business object Party/node Party, with a cardinality of C:CN, which may represent one of the following: a vendor that delivers goods to be exported; product recipient to whom goods will be sent; a buyer to whom an invoice will be sent, who is requested to pay for goods and services to be exported; or a seller who was involved in a sales process on which an export declaration request item is based. A specialization association for navigation may exist to dependent business object party address with a target cardinality of C. In some implementations, at least one of the following elements is filled: PartyKey and PartyUUID. In some implementations, if the PartyUUID is specified, the PartyTypeCode is also present. In some implementations, if AddressHostUUID is specified, AddressHostTypeCode is also present.

Party Address is a dependent object inclusion node. The dependent object Address includes the data necessary to describe a postal or communication address of a party. Location is a physical place which is part of an export process in a LocationRole. A location may be a reference to a business object location or a reference to an address. An example location is a location from where goods are shipped. The elements located directly at the node Location are defined by the data type ExportDeclarationRequestLocationElements. These elements include: LocationID, LocationUUID, AddressReference, AddressHostUUID, BusinessObjectTypeCode, AddressHostTypeCode, PartyKey, PartyTypeCode, PartyID, InstalledBaseID, InstallationPointID, RoleCode, and RoleCategoryCode. LocationID is an identifier for a location, and may be based on datatype GDT: LocationID. LocationUUID is a universally unique identifier for a location, and may be based on datatype GDT: UUID. AddressReference may be optional, is a reference to a location address, and may be based on datatype BOIDT: ObjectNodeLocationAddressReference. AddressHostUUID may be optional, is a universally unique identifier for an address of a business partner, an organizational unit or its specializations, the business object InstalledBase, or the business object InstallationPoint, and may be based on datatype GDT: UUID. BusinessObjectTypeCode may be optional, is a coded representation of a type of a business object in which an address referenced in the LocationAddressUUID is integrated as a dependent object, and may be based on datatype GDT: BusinessObjectTypeCode. AddressHostTypeCode may be optional, is a coded representation of an address host type of an address referenced by the AddressUUID or an address included using a Location Address composition, and may be based on datatype GDT: AddressHostTypeCode. PartyKey may be optional, is an alternative identifier of a party representing a business partner or an organizational unit that references an address using the AddressUUID, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. InstalledBaseID may be optional, is an identifier for an installed base that references an address using the AddressUUID, and may be based on datatype GDT: InstalledBaseID.

InstallationPointID may be optional, is an identifier for an installation point that references an address using the AddressUUID, and may be based on datatype GDT: InstallationPointID. RoleCode is a location role of a location, and may be based on datatype GDT: LocationRoleCode. RoleCategoryCode is a location role category of a location, and may be based on datatype GDT: LocationRoleCategoryCode. A composition relationship to subordinate node Location Address may exist, with a cardinality of 1:C. A Location inbound aggregation relationship may exist from the business object Location/node Location, with a cardinality of C:CN, which represents a location from which or to which exported goods will be delivered. A specialization association for navigation may exist to dependent business object party address with a target cardinality of C. In some implementations, there may only be one aggregation or one composition relationship to the dependent object Address. Location Address is a dependent object inclusion node. The dependent object Address includes the data necessary to describe a physical or logical location.

Package is a logical group of one or more package elements. A package element is a physical object in which physical export goods are packed. The elements located directly at a node package are defined by the data type ExportDeclarationRequestpackageElements. These elements include: UUID, ID, TypeCode, packageExportID, ElementNumberValue, ParentpackageUUID, NetWeightQuantity, NetWeightQuantityTypeCode, GrossWeightQuantity, and GrossWeightQuantityTypeCode. Key may be an alternative key, is a key of a package in an export declaration request, and may be based on datatype KDT: ExportDeclarationRequestpackageKey. ExportDeclarationRequestUUID is a universally unique identifier of an export declaration request, and may be based on datatype GDT: UUID. ExportDeclarationRequestpackageID is an internal identifier of a package, and may be based on datatype GDT: ExportDeclarationRequestpackageID. UUID may be an alternative key, is a globally unique identifier of a node, and may be based on datatype GDT: UUID. ID is an internal identifier of a package, and may be based on datatype GDT: ExportDeclarationRequestpackageID. TypeCode is a coded representation of the type of a packing unit as it is used in logistics for storing and shipping goods, and may be based on datatype GDT: packageTypeCode. PackageExportID may be optional, is an identifier of a package for reporting to a customs authority, and may be based on datatype GDT: packageExportID. If the number of package elements in a package is greater than one, this element can include the identifiers of several package elements, for example as an enumeration (e.g., "4711, 4712") or as a value range (e.g., "4711-4718"). ElementNumberValue is the number of package elements in a package, and may be based on datatype GDT: NumberValue, with a qualifier of Element. ParentpackageUUID may be optional, is a universally unique identification of a parent package, and may be based on datatype GDT: UUID. NetWeightQuantity may be optional, is a net weight of packed goods, and may be based on datatype GDT: Quantity, with a qualifier of Weight. NetWeightQuantityTypeCode may be optional, is a coded representation of the type of the NetWeightQuantity of a package, and may be based on datatype GDT: QuantityTypeCode, with a qualifier of Weight. GrossWeightQuantity may be optional, is a gross weight of the packed goods, and may be based on datatype GDT: Quantity, with a qualifier of Weight. GrossWeightQuantityTypeCode may be optional, is a coded representation of a type of the GrossWeightQuantity of a package, and may be based on datatype GDT: QuantityTypeCode, with a qualifier of Weight. A Package inbound association relationship may exist from the business object Export Declaration Request/node package, with a cardinality of C:CN, which specifies the UUID of a package in which the package is included.

Business Transaction Document Reference is a reference to a business transaction document related to an export. The elements located directly at the node Business Transaction Document Reference are defined by the data type ExportDeclarationRequestBusinessTransactionDocument ReferenceElements. These elements include: BusinessTransactionDocumentReference and BusinessTransaction DocumentRelationshipRoleCode. BusinessTransactionDocumentReference is a unique identification of a business transaction document referenced to in an export declaration request, and may be based on datatype GDT: BusinessTransactionDocumentReference. BusinessTransactionDocumentRelationshipRoleCode is a role of a referenced business transaction document in an export declaration request, and may be based on datatype GDT: BusinessTransactionDocumentRelationshipRoleCode. An Outbound Delivery inbound aggregation relationship may exist from the business object Outbound Delivery/node Outbound Delivery Cross DU, with a cardinality of C:CN, which represents an outbound delivery from which an export declaration request was created.

Figures 1, 54:
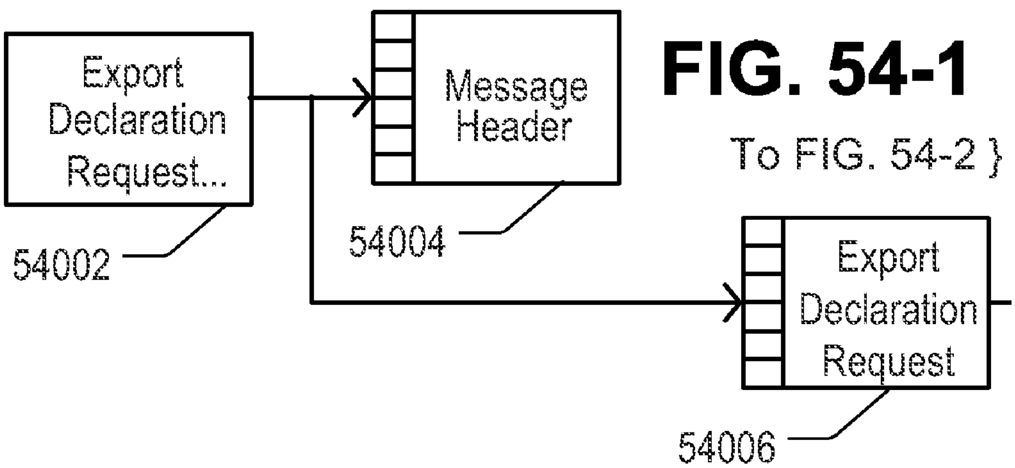
Figures 2, 54:
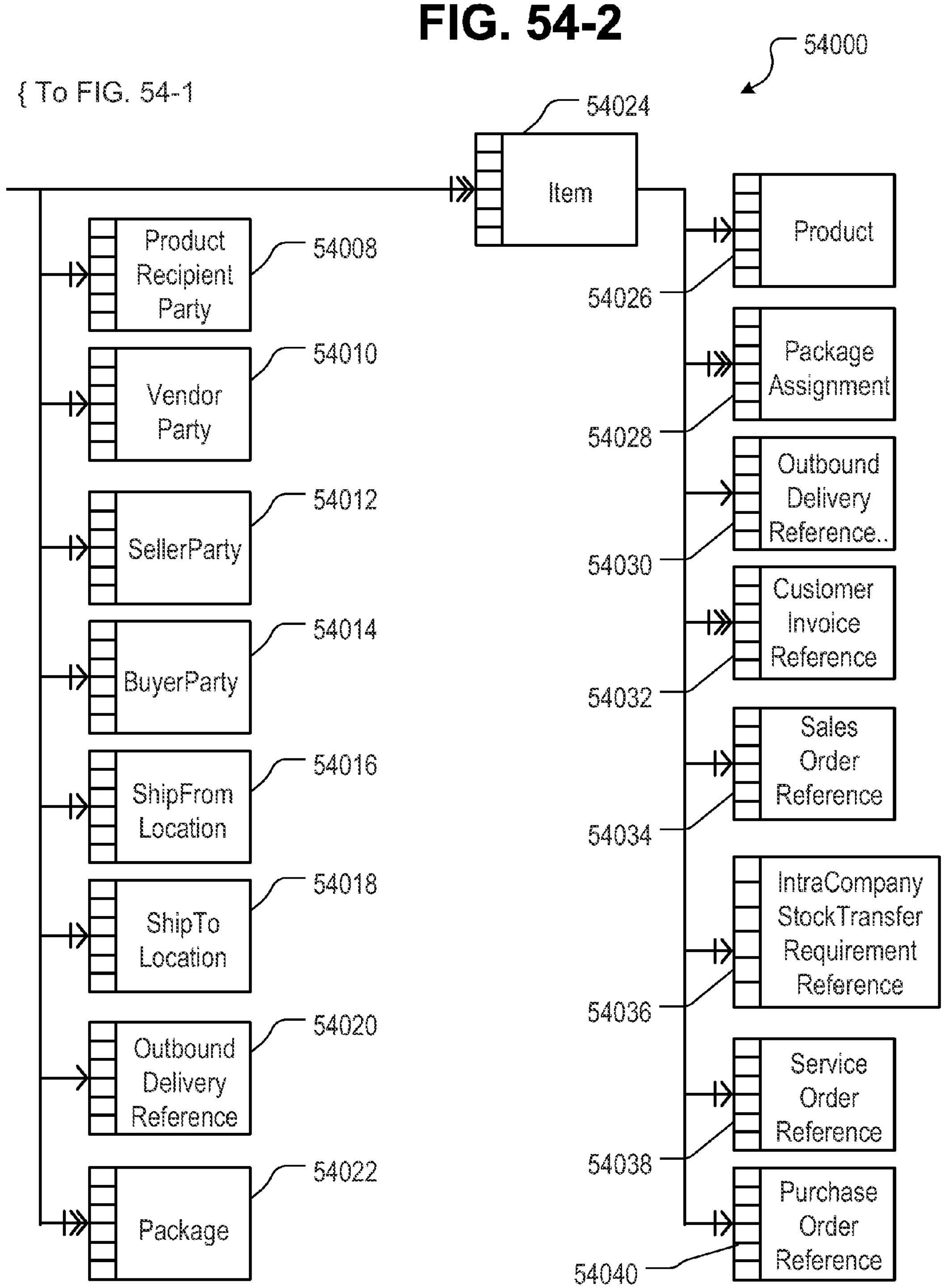

FIGS. 54-1 through 54-2 depict an example Export Declaration Request Request Message Data Type 54000, which comprises elements 54002-54040, hierarchically related as shown. For example, the Export Declaration Request Request 54002 includes a Message Header 54004.

The message type Export Declaration Request Request is derived from a business object Export Declaration Request as a leading object together with its operation signature. The message type Export Declaration Request Request is a request for an export declaration request. The structure of the message type Export Declaration Request Request is determined by a message data type ExportDeclarationRequestMessage. The message data type ExportDeclarationRequestMessage includes an object ExportDeclarationRequest which is included in a business document, business information that is relevant for sending a business document in a message, the MessageHeader package, and the ExportDeclarationRequest package. This message data type ExportDeclarationRequestMessage provides a structure for the Export Declaration Request Request and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader. SenderParty is the partner responsible for sending a business document at a business application level. The SenderParty is of the type GDT:BusinessDocumentMessageHeaderParty. RecipientParty is of the type GDT:BusinessDocumentMessageHeaderParty. RecipientParty is the partner responsible for receiving a business document at a business application level.

The ExportDeclarationRequest package is a grouping of ExportDeclarationRequest with Party, Location, BusinessTransactionDocumentReference, Item, and Package packages and with the ExportDeclarationRequest entity.

ExportDeclarationRequest is a business transaction document including data that is used to create an export declaration, including data on products, quantities, amounts, packaging, partners, and locations. ExportDeclarationRequest includes the following attributes: ReconciliationPeriodCounterValue and ItemListCompleteTransmissionIndicator. ReconciliationPeriodCounterValue is a counter for a reconciliation period. A reconciliation period is a time between two consecutive reconciliation messages in a same sequence context. ReconciliationPeriodCounterValue may be based on datatype GDT:CounterValue with a qualifier of ReconciliationPeriod. ItemListCompleteTransmissionIndicator specifies whether all the items in a base business document for a CustomerInvoiceRequest are to be transmitted, whether items that are not transmitted are to be implicitly classed as canceled, or whether new items or items that have been changed since a last transmission are to be transmitted. ItemListCompleteTransmissionIndicator may be based on datatype CDT:Indicator with a qualifier of CompleteTransmission.

ExportDeclarationRequest may include the non-node elements BaseBusinessTransactionDocumentTypeCode, ExportDeclarationRequestRequest, Incoterms, TransportModeCode, TransportMeans, TotalNetWeightQuantity, TotalNetWeightQuantityTypeCode, TotalGrossWeightQuantity, TotalGrossWeightQuantityTypeCode, ExportDeclarationBlockIndicator, and ExportDeclarationCancelIndicator. BaseBusinessTransactionDocumentTypeCode is a coded representation of a type of a base business document for a CustomerInvoiceRequest. The types outbound delivery and customer invoice are currently relevant for a message type ExportDeclarationRequestRequest. BaseBusinessTransactionDocumentTypeCode may be based on datatype GDT:BusinessTransactionDocumentTypeCode with a qualifier of Base. Incoterms may be optional, are typical contract formulations for delivery conditions that correspond to rules defined by the International Chamber of Commerce (ICC), and may be based on datatype GDT:Incoterms. TransportModeCode may be optional, is a coded representation of a transport mode of a delivery, and may be based on datatype GDT:TransportModeCode. TransportMeans may be optional, is a description of a means of transport and can also contain information to identify a means of transport, and may be based on datatype GDT:TransportMeans. TotalNetWeightQuantity may be optional, is a total net weight of goods of an export declaration request, and may be based on datatype CDT:Quantity with a qualifier of Weight. TotalNetWeightQuantityTypeCode may be optional, is a coded representation of a type of a NetWeightQuantity of an export declaration request, and may be based on datatype GDT:QuantityTypeCode with a qualifier of Weight. TotalGrossWeightQuantity may be optional, is a total gross weight of goods of an export declaration request, and may be based on datatype CDT:Quantity with a qualifier of Weight. TotalGrossWeightQuantityTypeCode may be optional, is a coded representation of a type of a GrossWeightQuantity of an export declaration request, and may be based on datatype GDT:QuantityTypeCode with a qualifier of Weight. ExportDeclarationBlockIndicator may be optional, indicates that processing of the requested export declaration may be blocked, and may be based on datatype CDT:Indicator with a qualifier of Block. ExportDeclarationCancelIndicator may be optional, indicates that a requested export declaration may be cancelled, and may be based on datatype CDT:Indicator with a qualifier of Cancel.

ExportDeclarationRequest may include the node element VendorParty in a 1:C cardinality relationship, the node element ProductRecipientParty in a 1:C cardinality relationship, the node element SellerParty in a 1:C cardinality relationship, the node element BuyerParty in a 1:C cardinality relationship, the node element ShipFromLocation in a 1:C cardinality relationship, the node element ShipToLocation in a 1:C cardinality relationship, the node element OutboundDeliveryReference in a 1:1 cardinality relationship, the node element Package in a 1:CN cardinality relationship, and the node element Item in a 1:N cardinality relationship.

The Party package includes the VendorParty, ProductRecipientParty, SellerParty, and BuyerParty entities. VendorParty is a company or person that delivers goods. VendorParty may be typed by BusinessTransactionDocumentParty. ProductRecipientParty is a company or person to which goods are to be delivered and may be typed by datatype BusinessTransactionDocumentParty. SellerParty is a company or person who sells goods and may be typed by datatype datatype BusinessTransactionDocumentParty. BuyerParty is a company or person who purchases goods and may be typed by datatype BusinessTransactionDocumentParty.

The Location package includes the ShipFromLocation entity. ShipToLocation is a location from which goods are shipped. ShipFromLocation may be typed by datatype BusinessTransactionDocumentLocation. ShipToLocation is a location to which goods are shipped. ShipToLocation may be typed by datatype BusinessTransactionDocumentLocation.

The BusinessTransactionDocumentReference package includes the OutboundDeliveryReference entity. OutboundDeliveryReference is a reference to a delivery. OutboundDeliveryReference may be typed by datatype BusinessTransactionDocumentReference. The Package package includes the Package entity. Package includes information about packages used in an underlying outbound delivery, including information about a type of package, weight, and hierarchy. Package includes the following non-node elements: OrdinalNumber, TypeCode, PackageExportID, ElementNumberValue, ParentPackageOrdinalNumber, NetWeightQuantity, NetWeightQuantityTypeCode, GrossWeightQuantity, and GrossWeightQuantityTypeCode. OrdinalNumber may be based on datatype GDT:OrdinalNumberValue. TypeCode may be based on datatype GDT:PackageTypeCode. PackageExportID may be optional and may be based on datatype GDT:PackageExportID. ElementNumberValue may be based on datatype GDT:NumberValue. ParentPackageOrdinalNumber may be optional and may be based on datatype GDT:OrdinalNumberValue. NetWeightQuantity may be optional, is a net weight of packed goods, and may be based on datatype CDT:Quantity with a qualifier of Weight. NetWeightQuantityTypeCode may be optional, is a coded representation of a type of a NetWeightQuantity of a package, and may be based on datatype GDT:QuantityTypeCode with a qualifier of Weight. GrossWeightQuantity may be optional, is a gross weight of packed goods, and may be based on datatype CDT:Quantity with a qualifier of Weight. GrossWeightQuantityTypeCode may be optional, is a coded representation of a type of a GrossWeightQuantity of a package, and may be based on datatype GDT:QuantityTypeCode with a qualifier of Weight.

The Item package includes the Item entity. An ExportDeclarationRequestItem summarizes information from a business document item that is to be taken into account in a future settlement. ExportDeclarationRequestItem may include information about a quantity of a product that is to be exported, such as amount, weight, and related business documents. Item includes the following non-node elements: Description, Quantity, QuantityTypeCode, NetWeightQuantity, NetWeightQuantityTypeCode, GrossWeightQuantity, GrossWeightQuantityTypeCode, InvoiceNetAmount, CustomerInvoiceRequiredIndicator, and ExportDeclarationBlockIndicator.

Description may be optional and may be based on datatype GDT:SHORT_Description. Quantity is an item's quantity and may be based on datatype CDT:Quantity. QuantityTypeCode is a coded representation of an item's quantity type and may be based on datatype GDT:QuantityTypeCode. NetWeightQuantity may be optional, is a net weight of goods of an export declaration request item, and may be based on datatype CDT:Quantity with a qualifier of Weight. NetWeightQuantityTypeCode may be optional, is a coded representation of a type of a NetWeightQuantity of an export declaration request item, and may be based on datatype GDT:QuantityTypeCode with a qualifier of Weight. GrossWeightQuantity may be optional, is a gross weight of goods of an export declaration request item, and may be based on datatype CDT:Quantity with a qualifier of Weight. GrossWeightQuantityTypeCode may be optional, is a coded representation of a type of a GrossWeightQuantity of an export declaration request item, and may be based on datatype GDT:QuantityTypeCode with a qualifier of Weight. InvoiceNetAmount may be optional, is a net value of an invoice item, and may be based on datatype CDT:Amount. CustomerInvoiceRequiredIndicator may be optional, indicates that an export declaration request based on a customer invoice is required to complete an export declaration, and may be based on datatype CDT:Indicator with a qualifier of Required. ExportDeclarationBlockIndicator may be optional, indicates that processing of a requested export declaration may be blocked, and may be based on datatype CDT:Indicator with a qualifier of Block.

Description may include the node element Product in a 1:C cardinality relationship. the node element PackageAssignment in a 1:C cardinality relationship, the node element OutboundDeliveryReference in a 1:1 cardinality relationship, the node element CustomerInvoiceReference in a 1:CN cardinality relationship, the node element SalesOrderReference in a 1:C cardinality relationship, the node element IntraCompanyStockTransferRequirementReference in a 1:C cardinality relationship, the node element ServiceOrderReference in a 1:C cardinality relationship, and the node element PurchaseOrderReference in a 1:C cardinality relationship.

The ItemProductInformation package includes the Product entity. Product identifies, describes, and classifies a product for which an export declaration is requested. Product is typed by datatype BusinessTransactionDocumentProduct. A product may be specified when a line item instance is not a grouping or unplanned delivery costs. The ItemPackage package includes the PackageAssignment entity. PackageAssignment represents packages assigned to an item. PackageAssignment includes the following non-node elements: PackageOrdinalNumber, ProductQuantity, and ProductQuantityTypeCode. PackageOrdinalNumber may be based on datatype GDT:OrdinalNumberValue. ProductQuantity may be optional, is a quantity of product of an item assigned to a package, and may be based on datatype CDT:Quantity with a qualifier of Product. ProductQuantityTypeCode may be optional, is a coded representation of a type of a ProductQuantity of an item assigned to a package, and may be based on datatype GDT:QuantityTypeCode with a qualifier of Product.

The ItemBusinessTransactionDocumentReference package includes the OutboundDeliveryReference, CustomerInvoiceReference, SalesOrderReference, IntraCompanyStockTransferRequirementReference, ServiceOrderReference, and PurchaseOrderReference entities. OutboundDeliveryReference is a reference to a delivery item and may be typed by datatype BusinessTransactionDocumentReference. CustomerInvoiceReference is a reference to a customer invoice item and may be typed by datatype BusinessTransactionDocumentReference. SalesOrderReference is a reference to a sales order item and may be typed by datatype BusinessTransactionDocumentReference. IntraCompanyStockTransferRequirementReference is a reference to a stock transfer order item and may be typed by datatype BusinessTransactionDocumentReference. ServiceOrderReference is a reference to a service order item and may be typed by datatype BusinessTransactionDocumentReference. PurchaseOrderReference is a reference to a purchase order item and may be typed by datatype BusinessTransactionDocumentReference.

FIGS. 55-1 through 55-167 show an example configuration of an Element Structure that includes an ExportDeclarationRequestRequest 550000 package. Specifically, these figures depict the arrangement and hierarchy of various components such as one or more levels of packages, entities, and datatypes, shown here as 550000 through 555520. As described above, packages may be used to represent hierarchy levels. Entities are discrete business elements that are used during a business transaction. Data types are used to type object entities and interfaces with a structure. For example, the ExportDeclarationRequestRequest 550000 includes, among other things, an ExportDeclarationRequestRequest 550002. Accordingly, heterogeneous applications may communicate using this consistent message configured as such.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for exchanging information regarding a declaration to a customs authority for exporting goods according to legal requirements, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for a request for processing an export declaration that includes a first message package derived from the common business object model and hierarchically organized in memory as:

an export declaration processing request message entity; and an export declaration package, where the export declaration package includes an export declaration entity, a custom authorization package, and a customs office package, where the export declaration entity includes an export message subtype code, an export message identification (ID), a customs authority country code, and a major version customs authority ID, where the custom authorization package includes at least one customs authorization entity, each customs authorization entity including a customer authorization type code and a customs authorization ID, and where the customs office package includes at least one customs office entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the export declaration package further comprises at least one of the following: a time point package, a basic text package, a location package, a party package, a transport route country package, and an item package.

3. The computer readable medium of claim 1, wherein the export declaration entity comprises at least one of the following: an export message sub type code, an export message identifier (ID), an export message reference ID, a customs authority country code, a major version customs authority ID, a minor version customs authority ID, a main test case ID, a sub test case ID, a customs message exchange server file ID, a customs process ID, a customs process party ID, a customs process customs authority ID, an export declaration type code, an export type code, an export exporting country code, an export destination country code, an export special circumstances code, an export transport cost payment form code, a container used indicator, an export party representation code, an item total number value, a total gross weight quantity, a total gross weight quantity type code, a consignment export ID, an inland export transport mode code, a cross border export transport mode code, a cross border export transport means type code, a cross border transport means ID, an export cross border transport means nationality code, an export business transaction type code, an invoice total net amount, an export incoterms classification code, an export incoterms classification description, an export incoterms transfer location name, and a customs authentication ID.

4. A distributed system operating in a plurality of computer systems providing message-based services defined in a service registry, the system comprising:

at least one processor operable to execute computer readable instructions embodied on non-transitory media;

a graphical user interface executable by the at least one processor and comprising computer readable instructions, embedded on non-transitory media, for a request for processing an export declaration using a request;

a first memory storing a user interface controller executable by the at least one processor for processing the request and involving a message including a message package derived from a common business object model, where the common business object model includes business objects having relationships that enable derivation of message-based service interfaces and message packages, the message package hierarchically organized as:

an export declaration processing request message header entity; and an export declaration package, where the export declaration package includes an export declaration entity, a custom authorization package, and a customs office package, where the export declaration entity includes an export message subtype code, an export message identification (ID), a customs authority country code, and a major version customs authority ID, where the custom authorization package includes at least one customs authorization entity, each customs authorization entity including a customer authorization type code and a customs authorization ID, and where the customs office package includes at least one customs office entity; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

5. The distributed system of claim 4, wherein the first memory is remote from the graphical user interface.

6. The distributed system of claim 4, wherein the first memory is remote from the second memory.

7. A non-transitory computer readable medium including program code for providing a message-based interface for exchanging information for a request to create or update an export declaration using customs-relevant business transactions, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for a request for an export declaration request that includes a first message package derived from the common business object model and hierarchically organized in memory as:

an export declaration request request message entity; and an export declaration request package comprising an export declaration request entity, where the export declaration request entity includes a reconciliation period counter value, an item list complete transmission indicator, a base business transaction document type code, an export declaration block indicator, and an export declaration cancel indicator;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

8. The computer readable medium of claim 7, wherein the export declaration request package further comprises at least one of the following: a party package, a location package, a business transaction document reference package, a package package, and an item package.

9. The computer readable medium of claim 7, wherein the export declaration request entity comprises at least one of the following: an incoterms, a transport mode code, a transport means, a total net weight quantity, a total net weight quantity type code, a total gross weight quantity, and a total gross weight quantity type code.

10. A distributed system operating in a plurality of computer systems providing message-based services defined in a service registry, the system comprising:

at least one processor operable to execute computer readable instructions embodied on non-transitory media;

a graphical user interface executable by the at least one processor and comprising computer readable instructions, embedded on non-transitory media, for a request for an export declaration request using a request;

a first memory storing a user interface controller executable by the at least one processor and for processing the request and involving a message including a message package derived from a common business object model, where the common business object model includes business objects having relationships that enable derivation of message-based service interfaces and message packages, the message package hierarchically organized as:

an export declaration request request message entity; and an export declaration request package comprising an export declaration request entity, where the export declaration request entity includes a reconciliation period counter value, an item list complete transmission indicator, a base business transaction document type code, an export declaration block indicator, and an export declaration cancel indicator; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

11. The distributed system of claim 10, wherein the first memory is remote from the graphical user interface.

12. The distributed system of claim 10, wherein the first memory is remote from the second memory.

* * * * *